(12) United States Patent
Murakami et al.

(10) Patent No.: US 11,811,479 B2
(45) Date of Patent: *Nov. 7, 2023

(54) INTEGRATED CIRCUIT

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,533

(22) Filed: Dec. 13, 2022

(65) Prior Publication Data

US 2023/0147488 A1 May 11, 2023

Related U.S. Application Data

(63) Continuation of application No. 17/171,812, filed on Feb. 9, 2021, now Pat. No. 11,563,476, which is a (Continued)

(30) Foreign Application Priority Data

Jul. 15, 2016 (JP) .................................. 2016-140331
Jan. 5, 2017 (JP) .................................. 2017-000512
(Continued)

(51) Int. Cl.
*H04B 7/06* (2006.01)
*H04B 7/0452* (2017.01)
(Continued)

(52) U.S. Cl.
CPC ........... *H04B 7/0682* (2013.01); *H04B 7/0452* (2013.01); *H04B 7/0456* (2013.01); (Continued)

(58) Field of Classification Search
CPC ... H04B 7/0452; H04B 7/0682; H04B 7/0456; (Continued)

(56) References Cited

U.S. PATENT DOCUMENTS 8,472,542 B1* 6/2013 Wang et al. ............. H04K 1/10 375/267
8,634,489 B1 1/2014 Nabar et al.
(Continued)

FOREIGN PATENT DOCUMENTS

CN 103477584 A 12/2013
CN 109155648 A 1/2019
(Continued)

OTHER PUBLICATIONS

Armin Dammann et al., "Standard Conformable Antenna Diversity Techniques for OFDM and its Application to the DVB-T System," IEEE Globecom 2001, Nov. 25, 2001, pp.3100-3105.
(Continued)

*Primary Examiner* — Leila Malek
(74) *Attorney, Agent, or Firm* — Seed IP Law Group LLP

(57) ABSTRACT

A transmission apparatus includes M signal processors that respectively generate modulated signals directed to M reception apparatuses, M being an integer equal to or greater than 2, and an antenna section. Each signal processor modulates a first bit sequence made up of two bits to generate a first modulated signal and a second modulated signal, and modulates a second bit sequence made up of other two bits to generate a third modulated signal and a fourth modulated signal, in a case of transmitting multiple streams to a corresponding one of the M reception apparatuses. The antenna section includes a first antenna that transmits the first modu-
(Continued)

lated signal and the third modulated signal and a second antenna that transmits the second modulated signal and the fourth modulated signal. At least either the signals transmitted from the first antenna or the signals transmitted from the second antenna are phase-changed signals.

7 Claims, 107 Drawing Sheets

Related U.S. Application Data

(63) continuation of application No. 16/773,204, filed on Jan. 27, 2020, now Pat. No. 10,951,294, which is a continuation of application No. 16/421,198, filed on May 23, 2019, now Pat. No. 10,587,327, which is a continuation of application No. 16/203,249, filed on Nov. 28, 2018, now Pat. No. 10,355,765, which is a continuation of application No. PCT/JP2017/022622, filed on Jun. 20, 2017.

(30) Foreign Application Priority Data

Mar. 3, 2017 (JP) ................................. 2017-040865
May 30, 2017 (JP) ................................. 2017-107012

(51) Int. Cl.
*H04L 1/06* (2006.01)
*H04L 1/00* (2006.01)
*H04B 7/0456* (2017.01)
*H04L 27/26* (2006.01)
*H04B 1/707* (2011.01)
*H04L 27/00* (2006.01)

(52) U.S. Cl.
CPC ........... *H04B 7/0697* (2013.01); *H04L 1/0003* (2013.01); *H04L 1/0618* (2013.01); *H04B 1/707* (2013.01); *H04B 7/0602* (2013.01); *H04B 2201/70703* (2013.01); *H04L 27/0008* (2013.01); *H04L 27/2602* (2013.01); *H04L 27/2626* (2013.01); *Y02D 30/70* (2020.08)

(58) Field of Classification Search
CPC .... H04B 7/0697; H04L 1/0003; H04L 1/0618; H04L 27/2626
USPC ....................................................... 375/262
See application file for complete search history.

(56) References Cited

U.S. PATENT DOCUMENTS

| | | | |
|---|---|---|---|
| 9,325,396 | B2 | 4/2016 | Murakami et al. |
| 9,362,989 | B2* | 6/2016 | Murakami et al. .. H04B 7/0891 |
| 2010/0189191 | A1 | 7/2010 | Taoka et al. |
| 2011/0080972 | A1 | 4/2011 | Xi et al. |
| 2014/0205032 | A1 | 7/2014 | Murakami et al. |
| 2014/0219389 | A1 | 8/2014 | Murakami et al. |
| 2015/0171983 | A1 | 6/2015 | Kusashima |
| 2016/0204846 | A1 | 7/2016 | Murakami et al. |
| 2017/0048092 | A1 | 2/2017 | Murakami et al. |
| 2019/0052323 | A1 | 2/2019 | Murakami et al. |

FOREIGN PATENT DOCUMENTS

| | | | |
|---|---|---|---|
| EP | 3468059 | A1 | 4/2019 |
| JP | 5094859 | B2 | 12/2012 |
| JP | 2013-511168 | A | 3/2013 |
| WO | 9619879 | A1 | 6/1996 |
| WO | 2015162886 | A1 | 10/2015 |

OTHER PUBLICATIONS

David Vargas et al., "MIMO for DVB-NGH, The Next Generation Mobile TV Broadcasting," IEEE Communications Magazine, Vol.57, No.7, Jul. 15, 2013, pp.130-137.
English Translation of Chinese Search Report dated Nov. 4, 2020 for the related Chinese Patent Application No. 201780032452.X, 3 pages.
English Translation of Russian Office Action dated May 20, 2020 for the related Russian Patent Application No. 2018145303, 6 pages.
Extended European Search Report, dated May 22, 2019 for the related European Patent Application No. 17827346.2.
IEEE P802.11 n(TM)/D3.00, Draft Standard for Information Technology-Telecommunications and information exchange between systems- Local and metropolitan area networks- Specific requirements- Part11: Wireless LAN Medium Access Control (MAC) and Physical Layer (PHY) specifications: Amendment4: Enhancements for Higher Throughput, Sep. 2007.
Indian Examination Report dated Nov. 8, 2021 for the related Indian Patent Application No. 201847044870.
International Search Report, mailed Sep. 5, 2017, for International Patent Application No. PCT/JP2017/022622.

* cited by examiner

FIG. 30

| 2801 | 2901 | 3001 | 3002 | 3003 |
|---|---|---|---|---|
| SUPPORT/NOT SUPPORT DEMODULATION OF MODULATED SIGNAL WITH PHASE CHANGE | SUPPORT/NOT SUPPORT RECEPTION FOR MULTIPLE STREAMS | SUPPORTED SCHEMES | SUPPORT/NOT SUPPORT MULTI-CARRIER SCHEME | SUPPORTED ERROR-CORRECTING CODING SCHEMES |

...

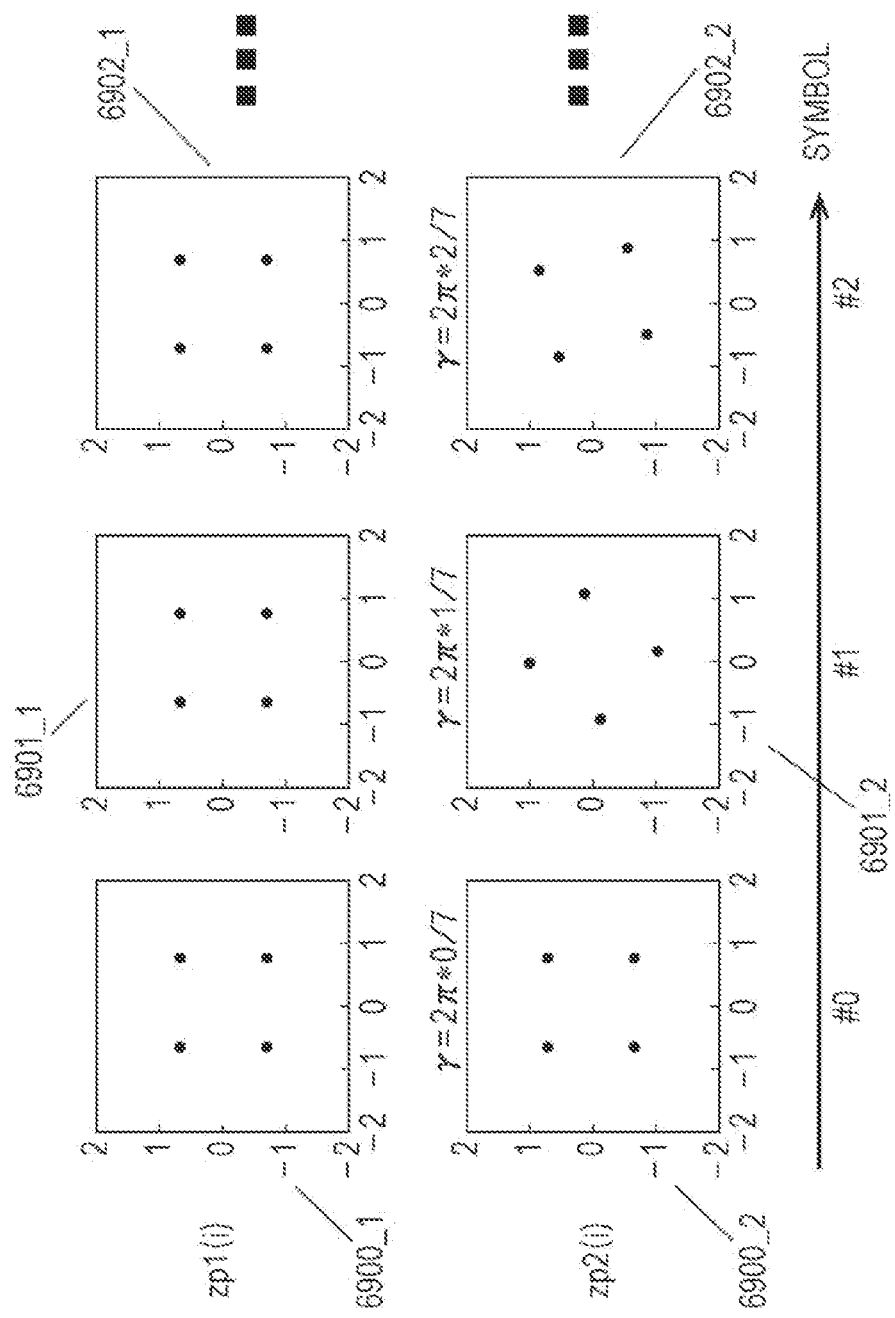

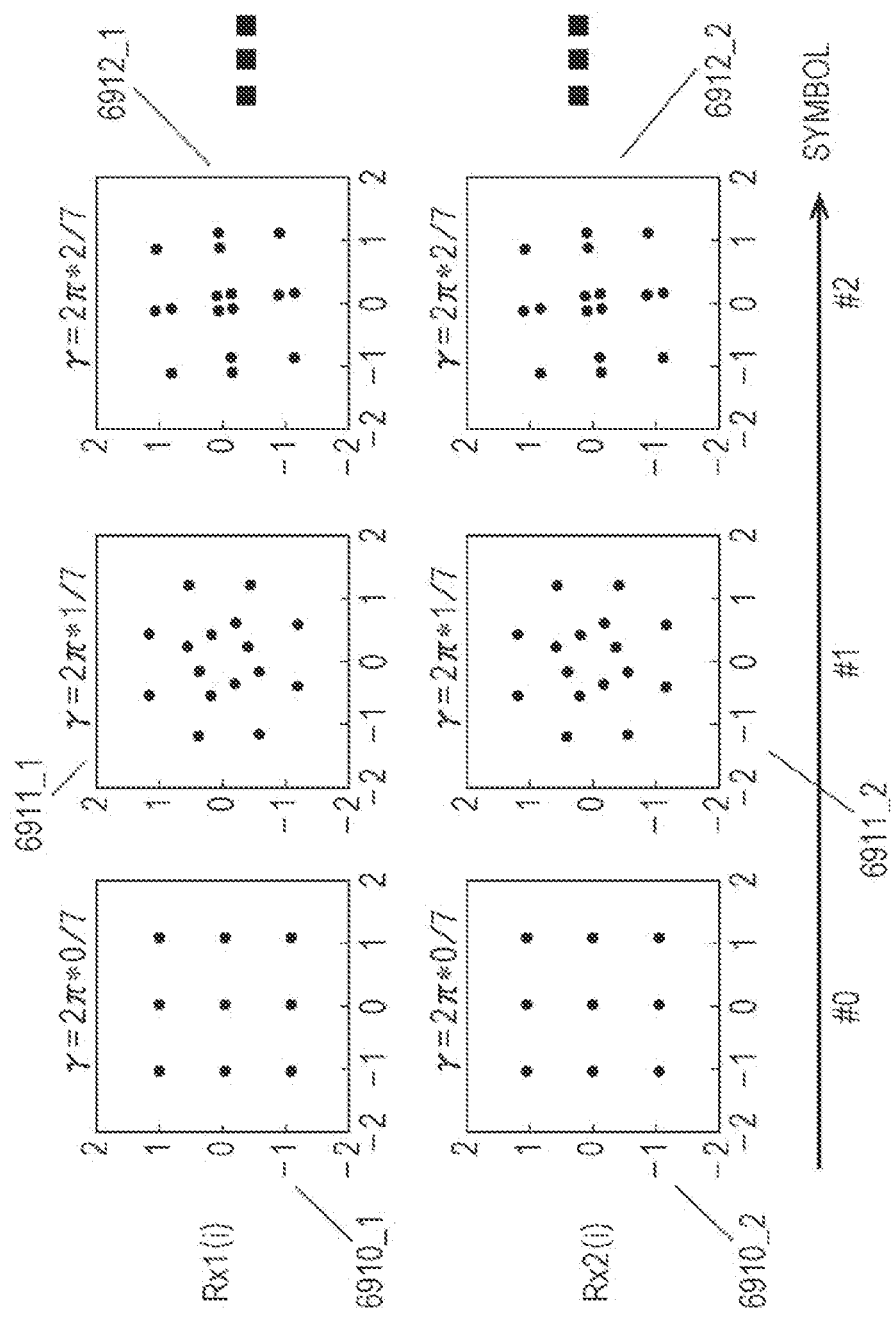

FIG. 71

| 2801 | 2901 | 3001 | 3002 | 3003 | 5301 |
|---|---|---|---|---|---|
| SUPPORT/NOT SUPPORT DEMODULATION OF MODULATED SIGNAL WITH PHASE CHANGE | SUPPORT/NOT SUPPORT RECEPTION FOR MULTIPLE STREAMS | SUPPORTED SCHEMES | SUPPORT/NOT SUPPORT MULTI-CARRIER SCHEME | SUPPORTED ERROR-CORRECTING CODING SCHEMES | SUPPORTED PRECODING METHODS |

| Capabilities ID | Capabilities Length | SUPPORT/NOT SUPPORT DEMODULATION OF MODULATED SIGNAL WITH PHASE CHANGE | SUPPORT/NOT SUPPORT RECEPTION FOR MULTIPLE STREAMS | ... |
|---|---|---|---|---|
| 10401 | 10402 | 2801 | 2901 | |

FIG. 92

| Capabilities ID (10401) | Capabilities Length (10402) | SUPPORT/NOT SUPPORT DEMODULATION OF MODULATED SIGNAL WITH PHASE CHANGE (2801) | SUPPORT/NOT SUPPORT RECEPTION FOR MULTIPLE STREAMS (2901) | SUPPORTED PRECODING METHODS (5301) | ... |

INTEGRATED CIRCUIT

BACKGROUND

1. Technical Field

The present disclosure relates to a transmission apparatus and a transmission method.

2. Description of the Related Art

A communication method called Multiple-Input Multiple-Output (MIMO), for example, is known as a communication method using multiple antennas. In multi-antenna communication for a single user represented by MIMO, multiple sequences of transmission data are individually modulated, modulated signals obtained accordingly are simultaneously transmitted from different antennas, and thus the data communication speed is increased.

FIG. 33 is a diagram illustrating an example of the configuration of a transmission apparatus that is based on the Digital Video Broadcasting-Next Generation Handheld (DVB-NGH) standard in a case where the number of transmission antennas is two and the number of modulated transmission signals (transmission streams) is two, which is described in "MIMO for DVB-NGH, the next generation mobile TV broadcasting," IEEE Commun. Mag., vol. 57, no. 7, pp. 130-137, July 2013. In the transmission apparatus, data 1 is input and coded by an encoder 2 to obtain data 3, which is divided into data 5A and data 5B by a distributer 4. The data 5A is subjected to interleaving processing performed by an interleaver 4A and mapping processing performed by a mapper 6A. Likewise, the data 5B is subjected to interleaving processing performed by an interleaver 4B and mapping process performed by a mapper 6B. The coding processing in the encoder 2, the interleaving processing in the interleavers 4A and 4B, and the mapping processing in the mappers 6A and 6B are performed on the basis of setting information included in a frame configuration signal 13.

Weight combiners 8A and 8B receive mapped signals 7A and 7B and perform weight combining thereon to generate weight combined signals 9A and 16B, respectively. After that, the weight combined signal 16B is subjected to phase change performed by a phase changer 17B, and a phase-changed signal 9B is output. Subsequently, radio sections 10A and 10B perform, for example, processing related to orthogonal frequency division multiplexing (OFDM), such as frequency conversion and amplification. In addition, a transmission signal 11A is transmitted from an antenna 12A, and a transmission signal 11B is transmitted from an antenna 12B. The weight combining processing in the weight combiners 8A and 8B and the phase change processing in the phase changer 17B are performed on the basis of signal processing method information 115 generated by a signal processing method information generator 114. The signal processing method information generator 114 generates the signal processing method information 115 on the basis of the frame configuration signal 13. At this time, in the phase changer 17B, for example, nine phase change values are provided and phase change in a period of 9 is regularly performed.

Accordingly, there is a high possibility of being able to avoid a situation where a reception apparatus as a communication partner falls into a steadily poor reception state in an environment in which direct waves are dominant. Accordingly, it is possible to improve the data reception quality at the reception apparatus as a communication partner.

SUMMARY

However, the transmission apparatus in FIG. 33 does not consider transmitting modulated signals to multiple terminals (multiple users) using identical times and identical frequencies (identical frequency bands).

One non-limiting and exemplary embodiment provides a transmission apparatus capable of transmitting modulated signals to multiple terminals (multiple users) by using identical times and identical frequencies (identical frequency bands). In particular, when transmitting modulated signals of multiple streams to the individual terminals (individual users), it is possible to avoid a situation where a reception apparatus as a communication partner falls into a steadily poor reception state in an environment in which direct waves are dominant. Accordingly, the data reception quality at the reception apparatus as a communication partner is improved.

In one general aspect, the techniques disclosed here feature a transmission apparatus including M signal processors that respectively generate modulated signals directed to M reception apparatuses, M being an integer equal to or greater than 2. Each of the M signal processors modulates a first bit sequence made up of two bits to generate a first modulated signal and a second modulated signal, and modulates a second bit sequence made up of other two bits to generate a third modulated signal and a fourth modulated signal, in a case of transmitting multiple streams to a corresponding one of the M reception apparatuses. The transmission apparatus also includes an antenna section including a first antenna that transmits the first modulated signal and the third modulated signal and a second antenna that transmits the second modulated signal and the fourth modulated signal, at least either the signals transmitted from the first antenna or the signals transmitted from the second antenna being phase-changed signals.

It should be noted that general or specific embodiments may be implemented as a system, a method, an integrated circuit, a computer program, a recording medium, or any selective combination thereof.

According to an aspect of the present disclosure, when transmitting modulated signals of multiple streams to individual terminals (individual users), it is possible to avoid a situation where each terminal falls into a steadily poor reception state in an environment in which direct waves are dominant. Accordingly, it is possible to improve the data reception quality in a reception apparatus as a communication partner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 30 is a diagram illustrating an example of data included in the reception capability notification symbol different from FIGS. 28 and 29;

FIG. 69A is a diagram illustrating a second example of the state of signal points of signals transmitted by the transmission apparatus including the configuration in FIG. 3;

FIG. 69B is a diagram illustrating a second example of the state of signal points of signals received by the reception apparatus as a communication partner of the transmission apparatus including the configuration in FIG. 3;

FIG. 71 is a diagram illustrating an example of data included in the reception capability notification symbol different from FIGS. 28, 29, and 30;

FIG. 78 is a diagram illustrating a first example of the configuration included in control information symbols or the like;

FIG. 79 is a diagram illustrating a second example of the configuration included in control information symbols or the like;

FIG. 91 is a diagram illustrating a first example of the Extended Capabilities field;

FIG. 92 is a diagram illustrating a second example of the Extended Capabilities field;

DETAILED DESCRIPTION

Hereinafter, embodiments of the present disclosure will be described in detail with reference to the drawings. The individual embodiments described below are examples, and the present disclosure is not limited to these embodiments.

First Embodiment

A detailed description will be given of a transmission method, a transmission apparatus, a reception method, and a reception apparatus according to the present embodiment.

Example of Configuration of Transmission Apparatus in Present Embodiment

Figure 1:
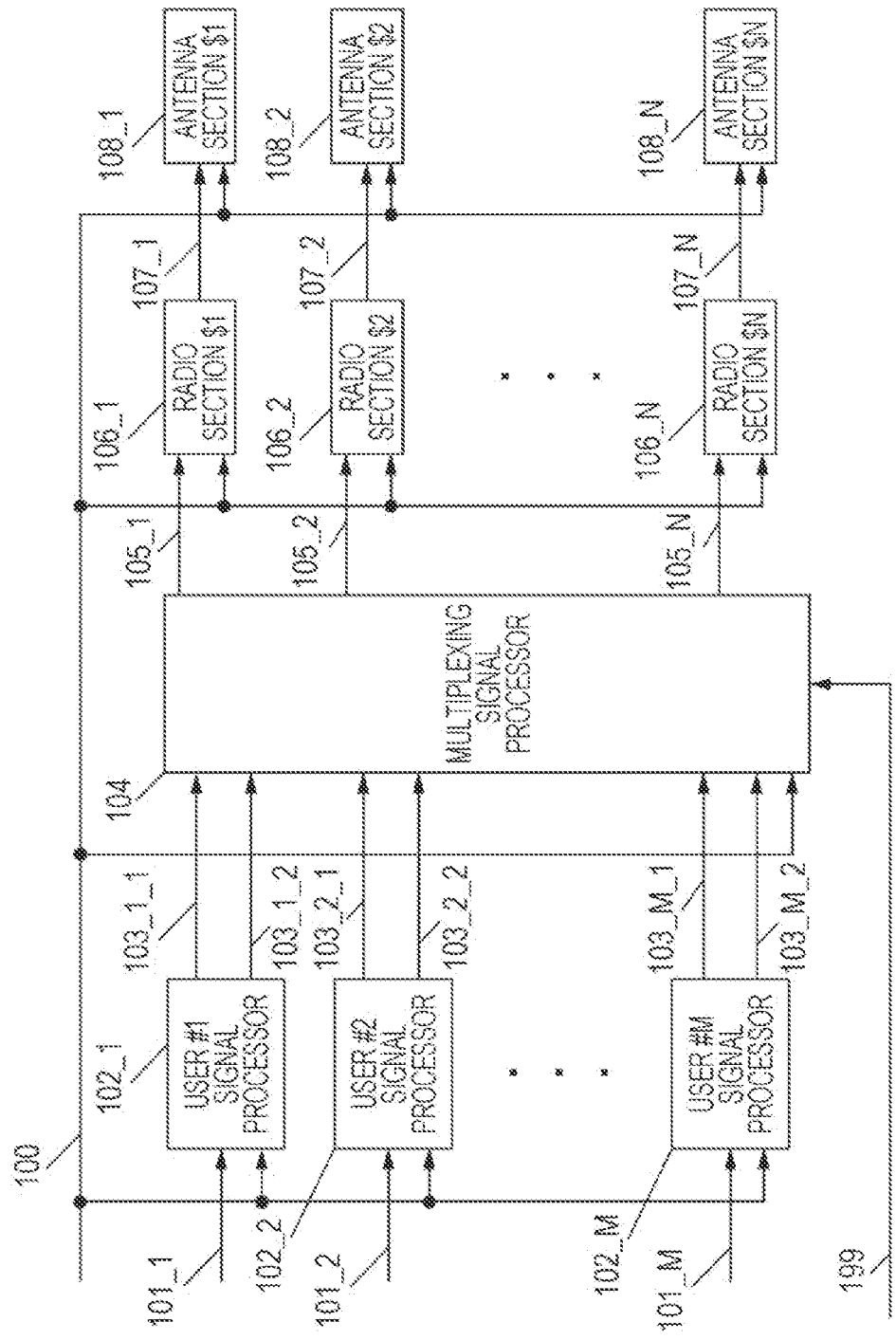
FIG. 1 is a diagram illustrating an example of the configuration of a transmission apparatus according to an embodiment of the present disclosure.

FIG. 1 is a diagram illustrating an example of the configuration of the transmission apparatus in the present embodiment. The transmission apparatus illustrated in FIG. 1 is, for example, a base station, an access point, a broadcast station, or the like. The transmission apparatus is a transmission apparatus that generates modulated signals to be transmitted to a user #1 reception apparatus (terminal) to a user #M reception apparatus (terminal) (M is an integer equal to or greater than 2) and transmits the modulated signals.

The transmission apparatus illustrated in FIG. 1 includes a user #1 signal processor 102_1 to a user #M signal processor 102_M, a multiplexing signal processor 104, a radio section $1 (106_1) to a radio section $N (106_N), and an antenna section $1 (108_1) to an antenna section $N (108_N) (N is an integer equal to or greater than 1).

The user #1 signal processor 102_1 receives a control signal 100 and user #1 data 101_1. On the basis of information about a transmission method for generating a user #1 modulated signal included in the control signal 100, the user #1 signal processor 102_1 performs signal processing and generates a user #1 first baseband signal 103_1_1 and/or a user #1 second baseband signal 103_1_2. The user #1 signal processor 102_1 outputs the generated user #1 first baseband signal 103_1_1 and/or user #1 second baseband signal 103_1_2 to the multiplexing signal processor 104. The transmission method for generating a modulated signal includes, for example, an error-correcting coding method (the coding rate of an error-correcting code and the code length of the error-correcting code), a modulation scheme, a transmission method (for example, single-stream transmission and multi-stream transmission), and the like.

For example, in a case where the control signal 100 includes information indicating that multi-stream transmission is selected, the user #1 signal processor 102_1 generates the user #1 first baseband signal 103_1_1 and the user #1 second baseband signal 103_1_2. In a case where the control signal 100 includes information indicating that single-stream transmission is selected, the user #1 signal processor 102_1 generates the user #1 first baseband signal 103_1_1.

Likewise, the user #2 signal processor 102_2 receives the control signal 100 and user #2 data 101_2. On the basis of information about a transmission method for generating a user #2 modulated signal included in the control signal 100, the user #2 signal processor 102_2 performs signal processing and generates a user #2 first baseband signal 103_2_1 and/or a user #2 second baseband signal 103_2_2. The user #2 signal processor 102_2 outputs the generated user #2 first baseband signal 103_2_1 and/or user #2 second baseband signal 103_2_2 to the multiplexing signal processor 104. The transmission method for generating a modulated signal includes, for example, an error-correcting coding method (the coding rate of an error-correcting code and the code length of the error-correcting code), a modulation scheme, a transmission method (for example, single-stream transmission and multi-stream transmission), and the like.

For example, in a case where the control signal 100 includes information indicating that multi-stream transmission is selected, the user #2 signal processor 102_2 generates the user #2 first baseband signal 103_2_1 and the user #2 second baseband signal 103_2_2. In a case where the control signal 100 includes information indicating that single-stream transmission is selected, the user #2 signal processor 102_2 generates the user #2 first baseband signal 103_2_1.

Likewise, the user #M signal processor 102_M receives the control signal 100 and user #M data 101_M. On the basis of information about a transmission method for generating a user #M modulated signal included in the control signal 100, the user #M signal processor 102_M performs signal processing and generates a user #M first baseband signal 103_M_1 and/or a user #M second baseband signal 103_M_2. The user #M signal processor 102_M outputs the generated user #M first baseband signal 103_M_1 and/or user #M second baseband signal 103_M_2 to the multiplexing signal processor 104. The transmission method for generating a modulated signal includes, for example, an error-correcting coding method (the coding rate of an error-correcting code and the code length of the error-correcting code), a modulation scheme, a transmission method (for example, single-stream transmission and multi-stream transmission), and the like.

For example, in a case where the control signal 100 includes information indicating that multi-stream transmission is selected, the user #M signal processor 102_M generates the user #M first baseband signal 103_M_1 and the user #M second baseband signal 103_M_2. In a case where the control signal 100 includes information indicating that single-stream transmission is selected, the user #M signal processor 102_M generates the user #M first baseband signal 103_M_1.

Accordingly, a user #p signal processor 102_p (p is an integer from 1 to M) receives the control signal 100 and user #p data 101_p. On the basis of information about a transmission method for generating a user #p modulated signal (for example, an error-correcting coding method (the coding rate of an error-correcting code and the code length of the error-correcting code), a modulation scheme, a transmission method (for example, single-stream transmission and multi-stream transmission), and the like) included in the control signal 100, the user #p signal processor 102_p performs signal processing and generates a user #p first baseband signal 103_p_1 and/or a user #p second baseband signal 103_p_2. The user #p signal processor 102_p outputs the generated user #p first baseband signal 103_p_1 and/or user #p second baseband signal 103_p_2 to the multiplexing signal processor 104.

For example, in a case where the control signal 100 includes information indicating that multi-stream transmission is selected, the user #p signal processor 102_p generates the user #p first baseband signal 103_p_1 and the user #p second baseband signal 103_p_2. In a case where the control signal 100 includes information indicating that single-stream transmission is selected, the user #p signal processor 102_p generates the user #p first baseband signal 103_p_1.

The configuration of each of the user #1 signal processor 102_1 to the user #M signal processor 102_M will be described below by taking the configuration of the user #p signal processor as an example.

The control signal 100 includes information indicating which of multi-stream transmission and single-stream transmission is selected for each of the user #1 signal processor 102_1 to the user #M signal processor 102_M.

The multiplexing signal processor 104 receives the control signal 100, the user #1 first baseband signal 103_1_1, the user #1 second baseband signal 103_1_2, the user #2 first baseband signal 103_2_1, the user #2 second baseband signal 103_2_2, ···, the user #M first baseband signal 103_M_1, the user #M second baseband signal 103_M_2, and a (common) reference signal 199. On the basis of the control signal 100, the multiplexing signal processor 104 performs multiplexing signal processing and generates a multiplexed signal $1 baseband signal 105_1 to a multiplexed signal $N baseband signal 105_N (N is an integer equal to or greater than 1). The multiplexing signal processor 104 outputs the generated multiplexed signal $1 baseband signal 105_1 to multiplexed signal $N baseband signal 105_N to the corresponding radio sections (the radio section $1 to the radio section $N).

The (common) reference signal 199 is a signal that is transmitted from the transmission apparatus for the reception apparatus to estimate a propagation environment. The (common) reference signal 199 is inserted into the baseband signal of each user. The multiplexing signal processing will be described below.

The radio section $1 (106_1) receives the control signal 100 and the multiplexed signal $1 baseband signal 105_1. On the basis of the control signal 100, the radio section $1 (106_1) performs processing such as frequency conversion and amplification, and outputs a transmission signal 107_1 to the antenna section $1 (108_1).

The antenna section $1 (108_1) receives the control signal 100 and the transmission signal 107_1. On the basis of the control signal 100, the antenna section $1 (108_1) performs processing on the transmission signal 107_1. Note that, in the antenna section $1 (108_1), the control signal 100 need not necessarily exist as input. The transmission signal 107_1 is output as a radio wave from the antenna section $1 (108_1).

The radio section $2 (106_2) receives the control signal 100 and the multiplexed signal $2 baseband signal 105_2. On the basis of the control signal 100, the radio section $2 (106_2) performs processing such as frequency conversion and amplification, and outputs a transmission signal 107_2 to the antenna section $2 (108_2).

The antenna section $2 (108_2) receives the control signal 100 and the transmission signal 107_2. On the basis of the control signal 100, the antenna section $2 (108_2) performs processing on the transmission signal 107_2. Note that, in the antenna section $2 (108_2), the control signal 100 need not necessarily exist as input. The transmission signal 107_2 is output as a radio wave from the antenna section $2 (108_2).

The radio section $N (106_N) receives the control signal 100 and the multiplexed signal $N baseband signal 105_N. On the basis of the control signal 100, the radio section $N (106_N) performs processing such as frequency conversion and amplification, and outputs a transmission signal 107_N to the antenna section $N (108_N).

The antenna section $N (108_N) receives the control signal 100 and the transmission signal 107_N. On the basis of the control signal 100, the antenna section $N (108_N) performs processing on the transmission signal 107_N. Note that, in the antenna section $N (108_N), the control signal 100 need not necessarily exist as input. The transmission signal 107_N is output as a radio wave from the antenna section $N (108_N).

Accordingly, a radio section $n (106_n) (n is an integer from 1 to N) receives the control signal 100 and a multiplexed signal $n baseband signal 105_n. On the basis of the control signal 100, the radio section $n (106_n) performs processing such as frequency conversion and amplification, and outputs a transmission signal 107_n to an antenna section $n (108_n).

The antenna section $n (108_n) receives the control signal 100 and the transmission signal 107_n. On the basis of the control signal 100, the antenna section $n (108_n) performs processing on the transmission signal 107_n. Note that, in the antenna section $n (108_n), the control signal 100 need not necessarily exist as input. The transmission signal 107_n is output as a radio wave from the antenna section $n (108_n).

An example of the configurations of the radio sections $1 to $N and the antenna sections $1 to $N will be described below.

The control signal 100 may be generated on the basis of information transmitted to the transmission apparatus in FIG. 1 by the reception apparatus as a communication partner of FIG. 1. Alternatively, the transmission apparatus in FIG. 1 may include an input section, and the control signal 100 may be generated on the basis of information input from the input section.

In the transmission apparatus in FIG. 1, not all the user #1 signal processor (102_1) to the user #M signal processor (102_M) may be operating. All of them may be operating or some of them may be operating. That is, the number of users with which the transmission apparatus is communicating is 1 to M. The number of communication partners (users) to which the transmission apparatus in FIG. 1 transmits a modulated signal is 1 to M.

Also, not all the radio section $1 (106_1) to the radio section $N (106_N) may be operating. All of them may be operating or some of them may be operating. Also, not all the antenna section $1 (108_1) to the antenna section $N (108_N) may be operating. All of them may be operating or some of them may be operating.

As described above, the transmission apparatus in FIG. 1 is able to transmit modulated signals (baseband signals) for multiple users by using identical times and identical frequencies (bands) and by using multiple antennas.

For example, the transmission apparatus in FIG. 1 is able to transmit the user #1 first baseband signal 103_1_1, the user #1 second baseband signal 103_1_2, the user #2 first baseband signal 103_2_1, and the user #2 second baseband signal 103_2_2 by using identical times and identical frequencies (bands). Also, the transmission apparatus in FIG. 1 is able to transmit the user #1 first baseband signal 103_1_1, the user #1 second baseband signal 103_1_2, and the user 2# first baseband signal 103_2_1 by using identical times and identical frequencies (bands). The combination of modulated signals (baseband signals) for multiple users transmitted by the transmission apparatus in FIG. 1 is not limited to the foregoing examples.

Example of Configuration of User #p Signal Processor

Figure 2:
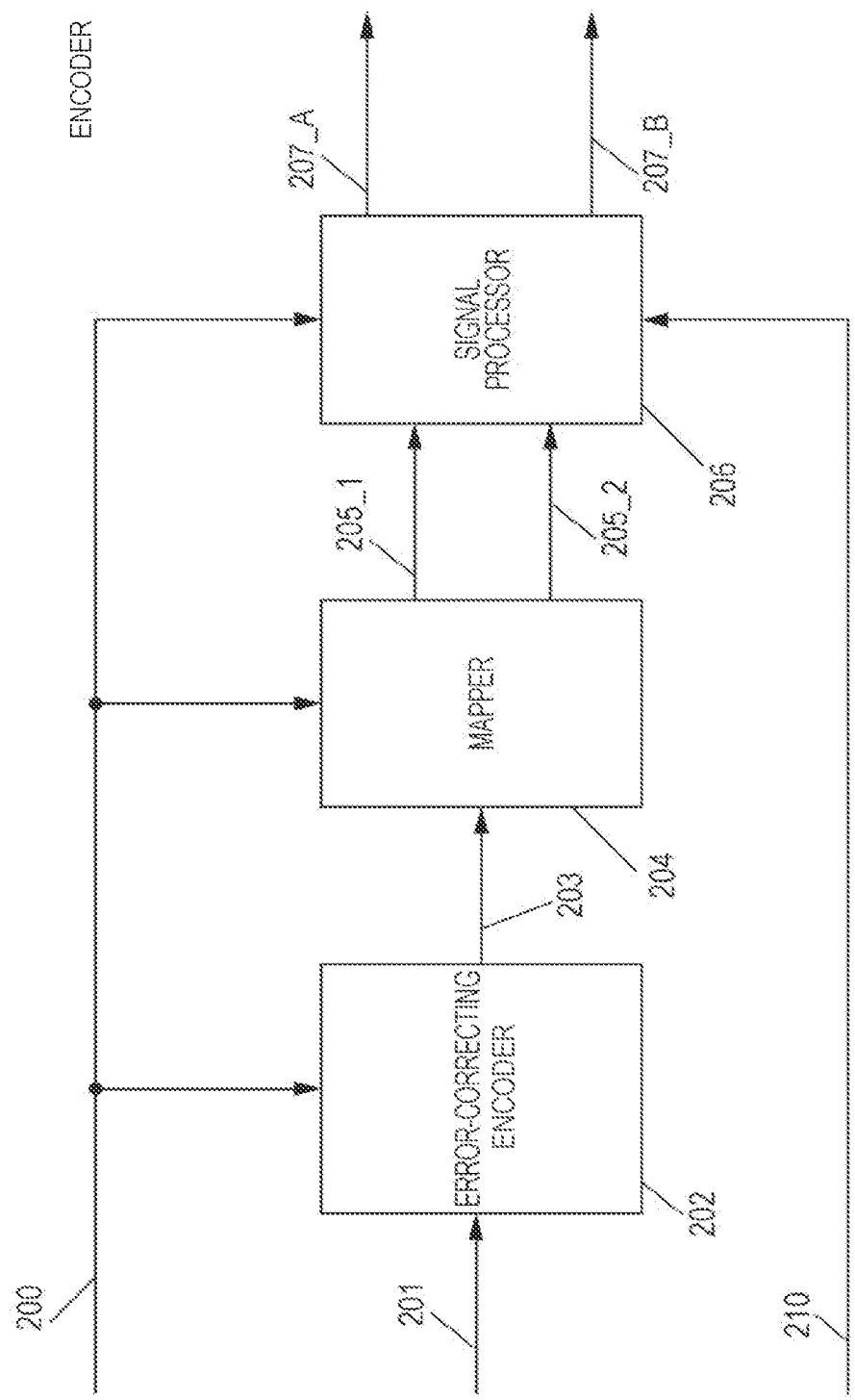
FIG. 2 is a diagram illustrating an example of the configuration of a signal processor for a user #p.

Next, a description will be given of the configuration of each of the user #1 signal processor 102_1 to the user #M signal processor 102_M in FIG. 1 by taking the configuration of the user #p signal processor 102_p as an example. FIG. 2 is a diagram illustrating an example of the configuration of the user #p signal processor 102_p.

The user #p signal processor 102_p includes an error-correcting encoder 202, a mapper 204, and a signal processor 206.

The error-correcting encoder 202 receives user #p data 201 and a control signal 200. The control signal 200 corresponds to the control signal 100 in FIG. 1, and the user #p data 201 corresponds to the user #p data 101_p in FIG. 1. On the basis of information about an error-correcting code (for example, error-correcting code information, a code length (block length), and a coding rate) included in the control signal 200, the error-correcting encoder 202 performs error-correcting coding, and outputs user #p coded data 203 to the mapper 204.

The error-correcting encoder 202 may include an interleaver. In a case where the error-correcting encoder 202 includes an interleaver, the error-correcting encoder 202 sorts data after coding the data and outputs the user #p coded data 203.

The mapper 204 receives the user #p coded data 203 and the control signal 200. On the basis of information about a modulation scheme included in the control signal 200, the mapper 204 performs mapping corresponding to the modulation scheme, and generates a user #p mapped signal (baseband signal) 205_1 and/or mapped signal (baseband signal) 205_2. The mapper 204 outputs the generated user #p mapped signal (baseband signal) 205_1 and/or mapped signal (baseband signal) 205_2 to the signal processor 206.

In a case where the control signal 200 includes information indicating that multi-stream transmission is selected, the mapper 204 divides the user #p coded data 203 into a first sequence and a second sequence. Subsequently, the mapper 204 generates the user #p mapped signal 205_1 by using the first sequence and generates the user #p mapped signal 205_2 by using the second sequence. At this time, it is assumed that the first sequence and the second sequence are different from each other. However, the operation can be performed similarly even if the first sequence and the second sequence are identical to each other.

In a case where the control signal 200 includes information indicating that multi-stream transmission is selected, the mapper 204 may divide the user #p coded data 203 into three or more sequences, perform mapping by using the individual sequences, and generate three or more mapped signals. In this case, the three or more sequences may be different from one another, or some or all of the three or more sequences may be identical to one another.

In a case where the control signal 200 includes information indicating that single-stream transmission is selected, the mapper 204 generates the user #p mapped signal 205_1 by using the user #p coded data 203 as one sequence.

The signal processor 206 receives the user #p mapped signal 205_1 and/or the user #p mapped signal 205_2, a signal group 210, and the control signal 200. On the basis of the control signal 200, the signal processor 206 performs signal processing, and outputs user #p processed signals 207_A and 207_B. The user #p processed signal 207_A corresponds to the user #p first baseband signal 103_p_1 in FIG. 1, and the user #p processed signal 207_B corresponds to the user #p second baseband signal 103_p_2 in FIG. 1.

At this time, the user #p processed signal 207_A is represented by up1(i), and the user #p processed signal 207_B is represented by up2(i). Here, i is a symbol number and is, for example, an integer equal to or greater than 0.

Next, the configuration of the signal processor 206 in FIG. 2 will be described with reference to FIG. 3.

Example of Configuration of Signal Processor 206

Figure 3:
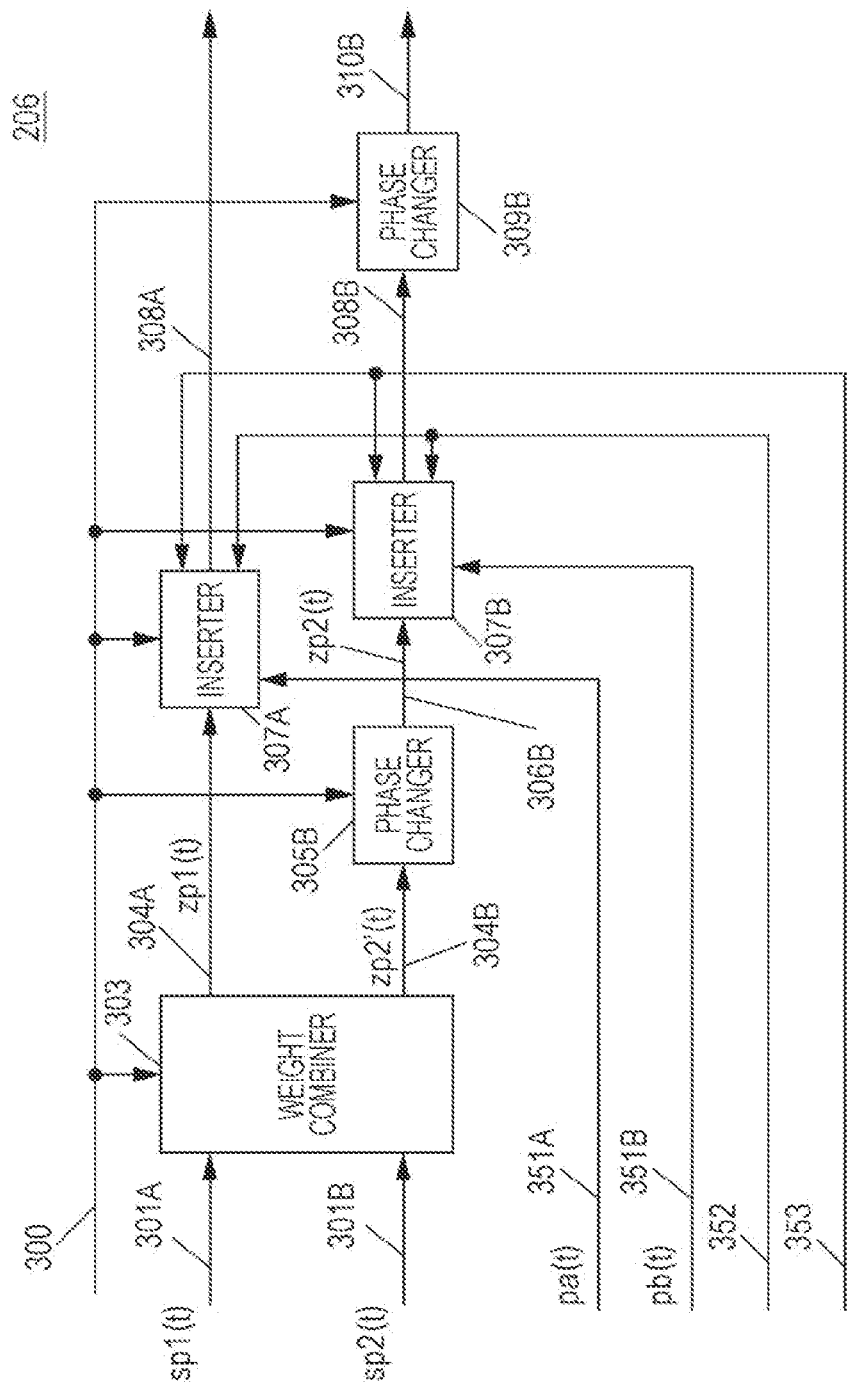
FIG. 3 is a diagram illustrating an example of the configuration of the signal processor in FIG. 2.

FIG. 3 is a diagram illustrating an example of the configuration of the signal processor 206 in FIG. 2. The signal processor 206 includes a weight combiner 303, a phase changer 305B, an inserter 307A, an inserter 307B, and a phase changer 309B. In FIG. 3, a description will be given of a case where the mapper 204 has generated the user #p mapped signal 205_1 and the user #p mapped signal 205_2 in FIG. 2 on the basis of information indicating that multi-stream transmission is selected.

The weight combiner (precoder) 303 receives a user #p mapped signal 301A, a user #p mapped signal 301B, and a control signal 300. The user #p mapped signal 301A corresponds to the user #p mapped signal 205_1 in FIG. 2, and the user #p mapped signal 301B corresponds to the user #p mapped signal 205_2 in FIG. 2. The control signal 300 corresponds to the control signal 200 in FIG. 2.

On the basis of the control signal 300, the weight combiner 303 performs weight combining (precoding) and generates a user #p weighted signal 304A and a user #p weighted signal 304B. The weight combiner 303 outputs the user #p weighted signal 304A to the inserter 307A. The weight combiner 303 outputs the user #p weighted signal 304B to the phase changer 305B.

The user #p mapped signal 301A is represented by sp1(t), the user #p mapped signal 301B is represented by sp2(t), the user #p weighted signal 304A is represented by zp1(t), and the user #p weighted signal 304B is represented by zp2'(t). Here, t represents time, for example. In addition, sp1(t), sp2(t), zp1(t), and zp2'(t) are defined as complex numbers. Thus, sp1(t), sp2(t), zp1(t), and zp2'(t) may be real numbers.

In this case, the weight combiner 303 performs computation that is based on the following Expression (1).

$$\begin{pmatrix} zp1(i) \\ zp2'(i) \end{pmatrix} = \begin{pmatrix} a & b \\ c & d \end{pmatrix} \begin{pmatrix} sp1(i) \\ sp2(i) \end{pmatrix} \qquad \text{Expression (1)}$$

In Expression (1), a, b, c, and d are defined as complex numbers, and may be real numbers. Note that i is a symbol number.

The phase changer 305B receives the weighted signal 304B and the control signal 300. On the basis of the control signal 300, the phase changer 305B performs phase change on the weighted signal 304B, and outputs a phase-changed signal 306B to the inserter 307B. The phase-changed signal 306B is represented by zp2(t). zp2(t) is defined as a complex number, and may be a real number.

A specific operation of the phase changer 305B will be described. It is assumed that the phase changer 305B performs phase change of yp(i) on zp2'(i), for example. This can be expressed by zp2(i) = yp(i)×zp2'(i). Here, i is a symbol number (i is an integer equal to or greater than 0).

For example, the phase changer 305B sets the value of phase change expressed as yp(i) as in the following Expression (2).

$$yp(i) = e^{j\frac{2\times\pi\times i}{Np}}$$ Expression (2)

In Expression (2), j is the imaginary unit. In addition, Np is an integer equal to or greater than 2 and represents the period of phase change. When Np is set to an odd number equal to or greater than 3, the data reception quality may be improved. However, Expression (2) is merely an example, and the value of phase change set in the phase changer 305B is not limited thereto. Thus, the phase change value is expressed by $yp(i) = e^{j\times\delta p(i)}$.

At this time, zp1(i) and zp2(i) can be expressed by the following Expression (3) by using the phase change value $yp(i) = e^{j\times\delta p(i)}$ and Expression (1).

$$\begin{pmatrix} zp1(i) \\ zp2(i) \end{pmatrix} = \begin{pmatrix} 1 & 0 \\ 0 & yp(i) \end{pmatrix} \begin{pmatrix} zp1(i) \\ zp2'(i) \end{pmatrix}$$
$$= \begin{pmatrix} 1 & 0 \\ 0 & yp(i) \end{pmatrix} \begin{pmatrix} a & b \\ c & d \end{pmatrix} \begin{pmatrix} sp1(i) \\ sp2(i) \end{pmatrix}$$
$$= \begin{pmatrix} 1 & 0 \\ 0 & e^{j\times\delta p(i)} \end{pmatrix} \begin{pmatrix} a & b \\ c & d \end{pmatrix} \begin{pmatrix} sp1(i) \\ sp2(i) \end{pmatrix}$$ Expression (3)

Here, $\delta p(i)$ is a real number. In addition, zp1(i) and zp2(i) are transmitted from the transmission apparatus at identical times and identical frequencies (identical frequency bands).

In Expression (3), the phase change value yp(i) is not limited to that expressed by Expression (2). For example, a method of changing the phase periodically or regularly may be used.

A description will be given of a matrix used in the computation by the weight combiner 303 expressed by Expression (1) and Expression (3). The matrix used in the computation by the weight combiner 303 is represented by Fp, as expressed by the following Expression (4).

$$\begin{pmatrix} a & b \\ c & d \end{pmatrix} = Fp$$ Expression (4)

For example, any of the matrices expressed by the following Expression (5) to Expression (12) may be used as the matrix Fp.

$$Fp = \begin{pmatrix} \beta \times e^{j0} & \beta \times \alpha \times e^{j0} \\ \beta \times \alpha \times e^{j0} & \beta \times e^{j\pi} \end{pmatrix}$$ Expression (5)

$$Fp = \frac{1}{\sqrt{\alpha^2+1}} \begin{pmatrix} e^{j0} & \alpha \times e^{j0} \\ \alpha \times e^{j0} & e^{j\pi} \end{pmatrix}$$ Expression (6)

$$Fp = \begin{pmatrix} \beta \times e^{j0} & \beta \times \alpha \times e^{j\pi} \\ \beta \times \alpha \times e^{j0} & \beta \times e^{j0} \end{pmatrix}$$ Expression (7)

$$Fp = \frac{1}{\sqrt{\alpha^2+1}} \begin{pmatrix} e^{j0} & \alpha \times e^{j\pi} \\ \alpha \times e^{j0} & e^{j0} \end{pmatrix}$$ Expression (8)

$$Fp = \begin{pmatrix} \beta \times \alpha \times e^{j0} & \beta \times e^{j\pi} \\ \beta \times e^{j0} & \beta \times \alpha \times e^{j0} \end{pmatrix}$$ Expression (9)

$$Fp = \frac{1}{\sqrt{\alpha^2+1}} \begin{pmatrix} \alpha \times e^{j0} & e^{j\pi} \\ e^{j0} & \alpha \times e^{j0} \end{pmatrix}$$ Expression (10)

$$Fp = \begin{pmatrix} \beta \times \alpha \times e^{j0} & \beta \times e^{j0} \\ \beta \times e^{j0} & \beta \times \alpha \times e^{j\pi} \end{pmatrix}$$ Expression (11)

$$Fp = \frac{1}{\sqrt{\alpha^2+1}} \begin{pmatrix} \alpha \times e^{j0} & e^{j0} \\ e^{j0} & \alpha \times e^{j\pi} \end{pmatrix}$$ Expression (12)

In Expression (5) to Expression (12), $\alpha$ may be a real number or an imaginary number. Also, $\beta$ may be a real number or an imaginary number. However, $\alpha$ is not 0 (zero). Also, $\beta$ is not 0 (zero).

Alternatively, any of the matrices expressed by the following Expression (13) to Expression (20) may be used as the matrix Fp.

$$Fp = \begin{pmatrix} \beta\times\cos\theta & \beta\times\sin\theta \\ \beta\times\sin\theta & -\beta\times\cos\theta \end{pmatrix}$$ Expression (13)

$$Fp = \begin{pmatrix} \cos\theta & \sin\theta \\ \sin\theta & -\cos\theta \end{pmatrix}$$ Expression (14)

$$Fp = \begin{pmatrix} \beta\times\cos\theta & -\beta\times\sin\theta \\ \beta\times\sin\theta & \beta\times\cos\theta \end{pmatrix}$$ Expression (15)

$$Fp = \begin{pmatrix} \cos\theta & -\sin\theta \\ \sin\theta & \cos\theta \end{pmatrix}$$ Expression (16)

$$Fp = \begin{pmatrix} \beta\times\sin\theta & -\beta\times\cos\theta \\ \beta\times\cos\theta & \beta\times\sin\theta \end{pmatrix}$$ Expression (17)

$$Fp = \begin{pmatrix} \sin\theta & -\cos\theta \\ \cos\theta & \sin\theta \end{pmatrix}$$ Expression (18)

$$Fp = \begin{pmatrix} \beta\times\sin\theta & \beta\times\cos\theta \\ \beta\times\cos\theta & -\beta\times\sin\theta \end{pmatrix}$$ Expression (19)

$$Fp = \begin{pmatrix} \sin\theta & \cos\theta \\ \cos\theta & -\sin\theta \end{pmatrix}$$ Expression (20)

In Expression (13) to Expression (20), $\theta$ is a real number. In Expression (13), Expression (15), Expression (17), and Expression (19), $\beta$ may be a real number or an imaginary number. However, $\beta$ is not 0 (zero).

Alternatively, any of the matrices expressed by the following Expression (21) to Expression (32) may be used as the matrix Fp.

$$Fp(i) = \begin{pmatrix} \beta\times e^{j\theta_{11}(i)} & \beta\times\alpha\times e^{j(\theta_{11}(i)+\lambda)} \\ \beta\times\alpha\times e^{j\theta_{21}(i)} & \beta\times e^{j(\theta_{21}(i)+\lambda+\pi)} \end{pmatrix}$$ Expression (21)

$$Fp(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix}$$ Expression (22)

$$Fp(i) = \begin{pmatrix} \beta \times \alpha \times e^{j\theta_{11}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix}$$ Expression (23)

$$Fp(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix}$$ Expression (24)

$$Fp(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times e^{j(\theta_{21}+\lambda(i)+\pi)} \end{pmatrix}$$ Expression (25)

$$Fp(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix}$$ Expression (26)

$$Fp(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix}$$ Expression (27)

$$Fp(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix}$$ Expression (28)

$$Fp = \begin{pmatrix} \beta \times e^{j\theta_{11}} & \beta \times \alpha \times e^{j(\theta_1+\lambda)} \\ \beta \times \alpha \times e^{j\theta_{21}} & \beta \times e^{j(\theta_1+\lambda+\pi)} \end{pmatrix}$$ Expression (29)

$$Fp = \frac{1}{\sqrt{\alpha^2+1}} \begin{pmatrix} e^{j\theta_{11}} & \alpha \times e^{j(\theta_1+\lambda)} \\ \alpha \times e^{j\theta_{21}} & e^{j(\theta_1+\lambda+\pi)} \end{pmatrix}$$ Expression (30)

$$Fp = \begin{pmatrix} \beta \times \alpha \times e^{j\theta_{21}} & \beta \times e^{j(\theta_1+\lambda+\pi)} \\ \beta \times e^{j\theta_{11}} & \beta \times \alpha \times e^{j(\theta_1+\lambda)} \end{pmatrix}$$ Expression (31)

$$Fp = \frac{1}{\sqrt{\alpha^2+1}} \begin{pmatrix} \alpha \times e^{j\theta_{21}} & e^{j(\theta_1+\lambda+\pi)} \\ e^{j\theta_{11}} & \alpha \times e^{j(\theta_1+\lambda)} \end{pmatrix}$$ Expression (32)

Note that $\theta_{11}(i)$, $\theta_{21}(i)$, and $\lambda(i)$ are functions of i (of a symbol number) and are real number values. For example, $\lambda$ is a real number fixed value. Here, $\lambda$ need not necessarily be a fixed value. $\alpha$ may be a real number or an imaginary number. $\beta$ may be a real number or an imaginary number. However, $\alpha$ is not 0 (zero). Also, $\beta$ is not 0 (zero). In addition, $\theta_{11}$ and $\theta_{21}$ are real numbers.

Alternatively, any of the matrices expressed by the following Expression (33) to Expression (36) may be used as the matrix Fp.

$$Fp = \begin{pmatrix} 1 & 0 \\ 0 & 1 \end{pmatrix}$$ Expression (33)

$$Fp = \begin{pmatrix} \beta & 0 \\ 0 & \beta \end{pmatrix}$$ Expression (34)

$$Fp = \begin{pmatrix} 1 & 0 \\ 0 & -1 \end{pmatrix}$$ Expression (35)

$$F_p = \begin{pmatrix} \beta & 0 \\ 0 & -\beta \end{pmatrix}$$ Expression (36)

In Expression (34) and Expression (36), $\beta$ may be a real number or an imaginary number. However, $\beta$ is not 0 (zero).

The individual embodiments can be carried out also by using a precoding matrix different from those expressed by Expressions (5) to (36) given above.

In a case where the precoding matrix Fp is expressed by Expression (33) or Expression (34), the weight combiner 303 in FIG. 3 does not perform signal processing on the mapped signals 301A and 301B and outputs the mapped signal 301A as the weighted signal 304A and the mapped signal 301B as the weighted signal 304B. That is, the weight combiner 303 need not necessarily exist. In a case where the weight combiner 303 exists, control of whether or not to perform weight combining may be performed by the control signal 300.

The inserter 307A receives the weighted signal 304A, a pilot symbol signal (pa(t)) (351A), a preamble signal 352, a control information symbol signal 353, and the control signal 300. On the basis of information about a frame configuration included in the control signal 300, the inserter 307A outputs a baseband signal 308A that is based on the frame configuration to the multiplexing signal processor 104.

Likewise, the inserter 307B receives the phase-changed signal 306B, a pilot symbol signal (pb(t)) (351B), the preamble signal 352, the control information symbol signal 353, and the control signal 300. On the basis of information about a frame configuration included in the control signal 300, the inserter 307B outputs a baseband signal 308B that is based on the frame configuration to the phase changer 309B.

The generation of control information for generating the control information symbol signal 353 and the frame configuration in the transmission apparatus used in the inserter 307A and the inserter 307B will be described below.

The phase changer 309B receives the baseband signal 308B and the control signal 300. On the basis of the control signal 300, the phase changer 309B performs phase change on the baseband signal 308B, and outputs a phase-changed signal 310B to the multiplexing signal processor 104.

The baseband signal 308B is regarded as a function of the symbol number i and is represented by xp'(i). Accordingly, the phase-changed signal 310B (xp(i)) output from the phase changer 309B can be expressed by xp(i) = $e^{jx\epsilon(i)} \times$ xp'(i).

The operation of the phase changer 309B may be Cyclic Delay Diversity (CDD) (Cyclic Shift Diversity (CSD)) described in the following documents: Standard conformable antenna diversity techniques for OFDM and its application to the DVB-T system," IEEE Globecom 2001, pp. 3100-3105, November 2001; and IEEE P802.11n (D3.00) Draft STANDARD for Information Technology-Telecommunications and information exchange between systems-Local and metropolitan area networks-Specific requirements-Part 11: Wireless LAN Medium Access Control (MAC) and Physical Layer (PHY) specifications, 2007. A characteristic of the phase changer 309B is performing phase change on symbols existing in the frequency-axis direction. The phase changer 309B performs phase change on data symbols, pilot symbols, control information symbols, and the like.

FIG. 3 illustrates the signal processor 206 including the phase changer 309B, but the phase changer 309B need not necessarily be included in the signal processor 206. Alternatively, in a case where the phase changer 309B is included in the signal processor 206, whether or not the phase changer 309B operates may be switched. In a case where the phase changer 309B is not included in the signal processor 206 or in a case where the phase changer 309B does not operate, the inserter 307B outputs the baseband signal 308B to the multiplexing signal processor 104 in FIG. 1. In this way, in FIG. 3, in a case where the phase changer 309B does not exist or in a case where the phase changer 309B does not operate, the baseband signal 308B serves as a signal output to the multiplexing signal processor 104 instead of the phase-changed signal 310B. Hereinafter, a description will be given of, for the convenience of description, a case where the phase changer 309B does not operate.

In a case where weight combining (precoding) processing is performed by using the (precoding) matrix Fp expressed by Expression (33) or Expression (34), the weight combiner 303 does not perform signal processing for weight combining on the mapped signals 301A and 301B, but outputs the mapped signal 301A as the weighted signal 304A and outputs the mapped signal 301B as the weighted signal 304B.

In this case, the weight combiner 303 performs, on the basis of the control signal 300, control to switch between processing (i) of performing signal processing corresponding to weight combining to generate and output the weighted signals 304A and 304B, and processing (ii) of not performing signal processing for weight combining, but outputting the mapped signal 301A as the weighted signal 304A and outputting the mapped signal 301B as the weighted signal 304B.

In a case where weight combining (precoding) processing is performed by using only the (precoding) matrix Fp expressed by Expression (33) or Expression (34), the signal processor 206 in FIG. 2 need not necessary include the weight combiner 303.

A description has been given above of a case where the mapper 204 in FIG. 2 generates two sequences of signals in a case where multi-stream transmission is selected for the user #p. However, in a case where single-stream transmission is selected for the user #p, in FIG. 3, the weight combiner 303, the phase changer 305B, and the inserter 307B need not necessarily operate, and the user #p mapped signal 301A may be input to the inserter 307A without being weighted. Alternatively, in a case where single-stream transmission is selected, the user #p signal processor 102_p in FIG. 1 need not necessarily include the weight combiner 303, the phase changer 305B, and the inserter 307B among the elements in FIG. 3.

A description has been given above of a case where the mapper 204 in FIG. 2 generates two sequences of signals in a case where multi-stream transmission is selected for the user #p. However, the mapper 204 in FIG. 2 may generate three or more sequences of signals in a case where multi-stream transmission is selected for the user #p. In a case where the mapper 204 in FIG. 2 generates three or more sequences of signals, the weight combiner 303 in FIG. 3 performs, for example, weight combining by using a precoding matrix corresponding to the number of input signals and outputs three or more weighted signals. The number of signals input to the weight combiner 303 in FIG. 3 may be different from the number of signals output from the weight combiner 303. That is, the precoding matrix used in the weight combiner 303 need not necessarily be a square matrix.

In a case where the weight combiner 303 outputs three or more weighted signals, the signal processor 102_p may perform phase change on all or some of the three or more weighted signals. Alternatively, the signal processor 102_p need not necessarily perform phase change on all of the three or more weighted signals.

Figure 4:
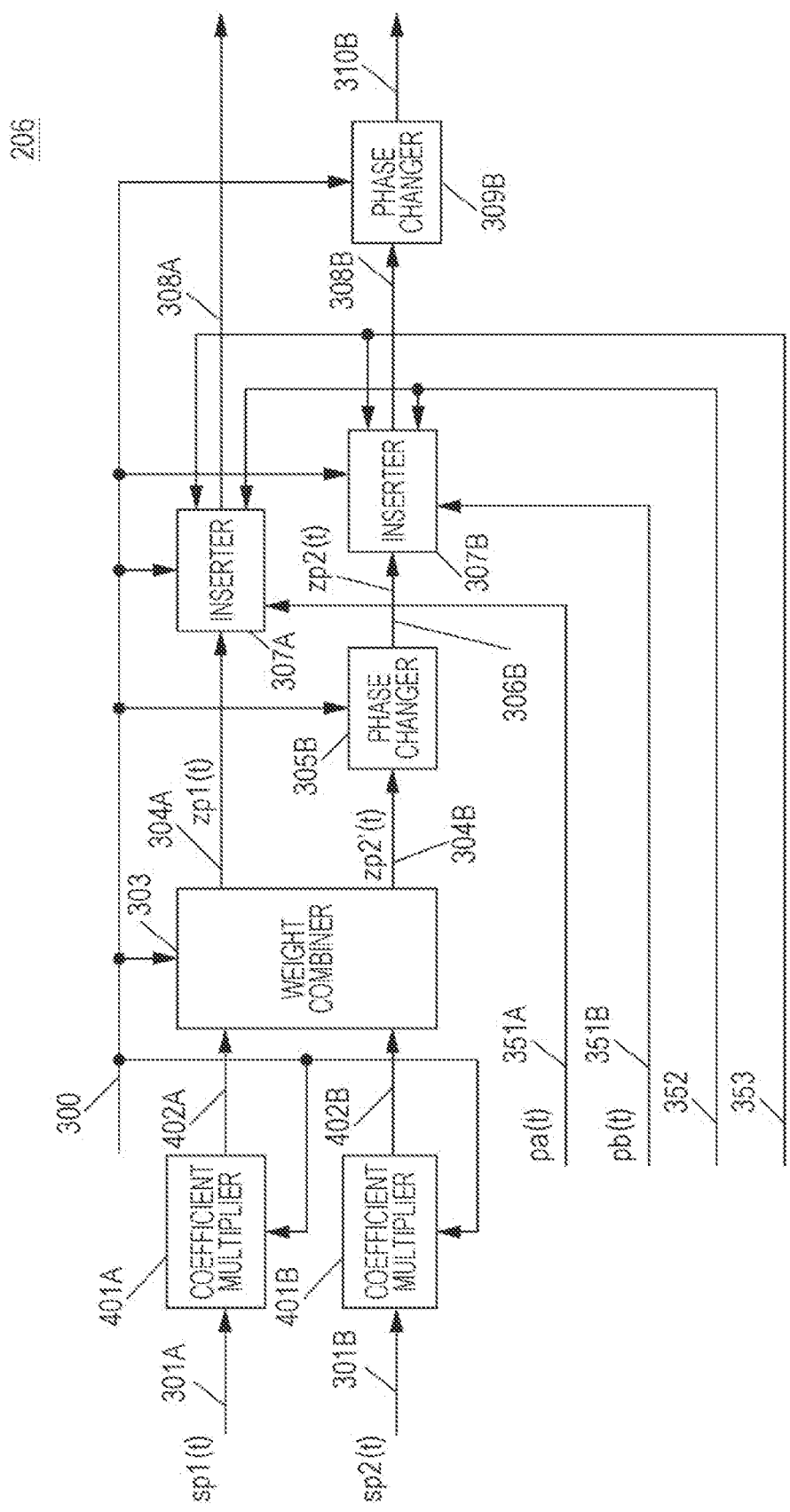
FIG. 4 is a diagram illustrating an example of the configuration of the signal processor in FIG. 2 different from FIG. 3.

FIG. 4 is a diagram illustrating an example of the configuration of the signal processor 206 in FIG. 2, which is different from the example in FIG. 3. In FIG. 4, the elements similar to those in FIG. 3 are denoted by the same numerals. The description of the elements similar to those in FIG. 3 is omitted here.

The signal processor 206 in FIG. 4 has a configuration in which a coefficient multiplier 401A and a coefficient multiplier 401B are added to the signal processor 206 in FIG. 3.

The coefficient multiplier 401A receives the mapped signal 301A (sp1(i)) and the control signal 300. On the basis of the control signal 300, the coefficient multiplier 401A multiplies the mapped signal 301A (sp1(i)) by a coefficient, and outputs a coefficient-multiplied signal 402A to the weight combiner 303. When the coefficient is represented by up, the coefficient-multiplied signal 402A is expressed by up×sp1(i). Here, up may be a real number or a complex number. However, up is not 0 (zero). In a case where up = 1, the coefficient multiplier 401A does not multiply the mapped signal 301A (sp1(i)) by the coefficient, and outputs the mapped signal 301A (sp1(i)) as the coefficient-multiplied signal 402A.

Likewise, the coefficient multiplier 401B receives the mapped signal 301B (sp2(i)) and the control signal 300. On the basis of the control signal 300, the coefficient multiplier 401B multiplies the mapped signal 301B (sp2(i)) by a coefficient, and outputs a coefficient-multiplied signal 402B to the weight combiner 303. When the coefficient is represented by vp, the coefficient-multiplied signal 402B is expressed by vp×sp2(i). Here, vp may be a real number or a complex number. However, vp is not 0 (zero). In a case where vp = 1, the coefficient multiplier 401B does not multiply the mapped signal 301B (sp2(i)) by the coefficient, and outputs the mapped signal 301B (sp2(i)) as the coefficient-multiplied signal 402B.

In FIG. 4, the weighted signal 304A (zp1(i)) output from the weight combiner 303 and the phase-changed signal 306B (zp2(i)) output from the phase changer 305B are expressed by the following Expression (37) using the coefficient up of the coefficient multiplier 401A, the coefficient vp of the coefficient multiplier 401B, and Expression (3).

Expression (37)

$$\begin{pmatrix} zp1(i) \\ zp2(i) \end{pmatrix} = \begin{pmatrix} 1 & 0 \\ 0 & yp(i) \end{pmatrix} Fp \begin{pmatrix} up & 0 \\ 0 & vp \end{pmatrix} \begin{pmatrix} sp1(i) \\ sp2(i) \end{pmatrix}$$

$$= \begin{pmatrix} 1 & 0 \\ 0 & yp(i) \end{pmatrix} \begin{pmatrix} a & b \\ c & d \end{pmatrix} \begin{pmatrix} up & 0 \\ 0 & vp \end{pmatrix} \begin{pmatrix} sp1(i) \\ sp2(i) \end{pmatrix}$$

$$= \begin{pmatrix} 1 & 0 \\ 0 & e^{j \times \delta p(i)} \end{pmatrix} \begin{pmatrix} a & b \\ c & d \end{pmatrix} \begin{pmatrix} up & 0 \\ 0 & vp \end{pmatrix} \begin{pmatrix} sp1(i) \\ sp2(i) \end{pmatrix}$$

Examples of the (precoding) matrix Fp are Expressions (5) to (36) as described above. An example of the phase change value yp(i) is expressed by Expression (2), but the (precoding) matrix Fp and the phase change value yp(i) are not limited thereto.

With use of FIG. 1 to FIG. 4 and Expression (1) to Expression (37) as an example, a description has been given of a method in which the user #p signal processor 102_p generates symbols (for example, $zp1(i)$ and $zp2(i)$). The generated symbols may be arranged in the time-axis direction. In the case of using a multi-carrier scheme such as Orthogonal Frequency Division Multiplexing (OFDM), the generated symbols may be arranged in the frequency-axis direction or in the time-axis and frequency-axis directions. In addition, the generated symbols may be interleaved (i.e., the symbols may be sorted), and arranged in the time-axis direction, the frequency-axis direction, or the time-axis and frequency-axis directions.

The symbols are arranged by, for example, the error-correcting encoder 202 and/or the mapper 204 illustrated in FIG. 2 in the user #p signal processor 102_p.

A method for arranging the symbols will be described below.

The transmission apparatus illustrated in FIG. 1 transmits $zp1(i)$ and $zp2(i)$ having the same symbol number i by using identical times and identical frequencies (identical frequency bands).

The user #1 baseband signal 103_1_1 in FIG. 1 is $zp1(i)$ when p = 1, and the user #1 baseband signal 103_1_2 is $zp2(i)$ when p = 1. Likewise, the user #2 baseband signal 103_2_1 is $zp1(i)$ when p = 2, and the user #2 baseband signal 103_2_2 is $zp2(i)$ when p = 2. Likewise, the user #M baseband signal 103_M_1 is $zp1(i)$ when p = M, and the user #M baseband signal 103_M_2 is $zp2(i)$ when p = M.

The user #1 signal processor 102_1 generates the user #1 baseband signal 103_1_1 and the user #1 baseband signal 103_1_2 by using Expression (3) or Expression (37). Likewise, the user #2 signal processor 102_2 generates the user #2 baseband signal 103_2_1 and the user #2 baseband signal 103_2_2 by using Expression (3) or Expression (37). Likewise, the user #M signal processor 102_M generates the user #M baseband signal 103_M_1 and the user #M baseband signal 103_M_2.

At that time, in the case of generating the user #p baseband signal 103_p_1 and the user #p baseband signal 103_p_2 by applying precoding and phase change, the precoding matrix Fp made up of a, b, c, and d and/or the phase change value yp(i) in Expression (3) or Expression (37) are set in accordance with the value of p.

That is, the precoding matrix Fp and/or the phase change value yp(i) used in the user #p signal processor 102_p are set in accordance with the value of p, that is, for each user. The information for setting the precoding matrix Fp and/or the phase change value yp(i) is included in the control signal.

However, not all the user #1 signal processor 102_1 to the user #M signal processor 102_M in FIG. 1 may apply precoding and phase change. For example, a signal processor that does not perform phase change may exist among the user #1 signal processor 102_1 to the user #M signal processor 102_M. Also, a signal processor that generates one baseband signal (one stream of a baseband signal) may exist among the user #1 signal processor 102_1 to the user #M signal processor 102_M.

As described above, in a case where precoding and phase change are performed in the user #1 signal processor 102_1 to the user #M signal processor 102_M in FIG. 1 as described in the present embodiment, a possibility of being able to avoid falling into a steadily poor reception state in an environment in which direct waves are dominant is increased. Accordingly, the data reception quality at a terminal can be improved. In addition, by transmitting modulated signals of multiple users as in FIG. 1, the data transmission efficiency of the transmission apparatus in FIG. 1 increases.

In a case where the control signal 300 includes information indicating "the phase changer 305B does not perform phase change", the phase changer 305B does not perform phase change. That is, the phase changer 305B may omit phase change for the weighted signal 304B input thereto and may output the weighted signal 304B as 306B.

Example of Multiplexing Signal Processing in Multiplexing Signal Processor 104

A detailed description will be given of the multiplexing signal processing (weight combining processing) in the multiplexing signal processor 104 in FIG. 1.

It is assumed that the user #p first baseband signal 103_p_1 and the user #p second baseband signal 103_p_2 output from the user #p signal processor 102_p (p is an integer from 1 to M) in FIG. 1 are respectively represented by $zp1(i)$ and $zp2(i)$ on the basis of Expression (3). It is assumed that i is a symbol number and is, for example, an integer equal to or greater than 0. At this time, it is assumed that signals $b\{2p-1\}(i)$ and $b\{2p\}(i)$ are expressed by the following Expressions (38) and (39).

$$b\{2p-1\}(i) = zp1(i) \quad \text{Expression (38)}$$

$$b\{2p\}(i) = zp2(i) \quad \text{Expression (39)}$$

For example, the user #1 first baseband signal 103_1_1 and the user #1 second baseband signal 103_1_2 are respectively represented by $b\{1\}(i)$ and $b\{2\}(i)$. That is, in a case where each of the user #1 signal processor 102_1 to the user #M signal processor 102_M outputs two signals, the output signals are represented by $b\{1\}(i)$ to $b\{2M\}(i)$.

In the case of transmitting a single stream (single modulated signal), either $zp1(i)$ or $zp2(i)$ may be zero.

The multiplexed signal $1 baseband signal 105_1 to the multiplexed signal $N baseband signal 105_N, which are outputs of the multiplexing signal processor 104, are respectively represented by vl(i) to vN(i). That is, the multiplexed signal $n baseband signal 105_N is represented by vn(i) (n is an integer from 1 to N). At this time, vn(i) can be expressed by the following Expression (40).

$$vn(i) = \sum_{k=1}^{2M} \Omega\{n\}\{k\} \times b\{k\}(i) \quad \text{Expression (40)}$$

At this time, $\Omega\{n\}\{k\}$ is a weighted coefficient of multiplexing and can be defined as a complex number. Thus, $\Omega\{n\}\{k\}$ may be a real number. In addition, $\Omega\{n\}\{k\}$ is decided by feedback information of each terminal.

In the present embodiment, a description is given of, as an example, a case where the user #p signal processor 102_p in FIG. 1 outputs one or two modulated signals, but the embodiment is not limited thereto. The user #p signal processor 102_p may output three or more modulated signals. In this case, the processing of the multiplexing signal processor 104 needs to be expressed by an expression different from Expression (40).

Example of Configuration of Radio Section

The radio section $1 (106_1) to the radio section $N (106_N) in FIG. 1 each perform processing such as frequency conversion and amplification on a signal input thereto and generate a transmission signal, as described above. At this time, in the radio section $1 (106_1) to the radio section $N (106_N), either a single-carrier scheme or a multi-carrier scheme such as the Orthogonal Frequency Division Multiplexing (OFDM) scheme may be used. Hereinafter, a description will be given of, as an example, the radio section $n (106_N) that uses the OFDM scheme.

Figure 5:
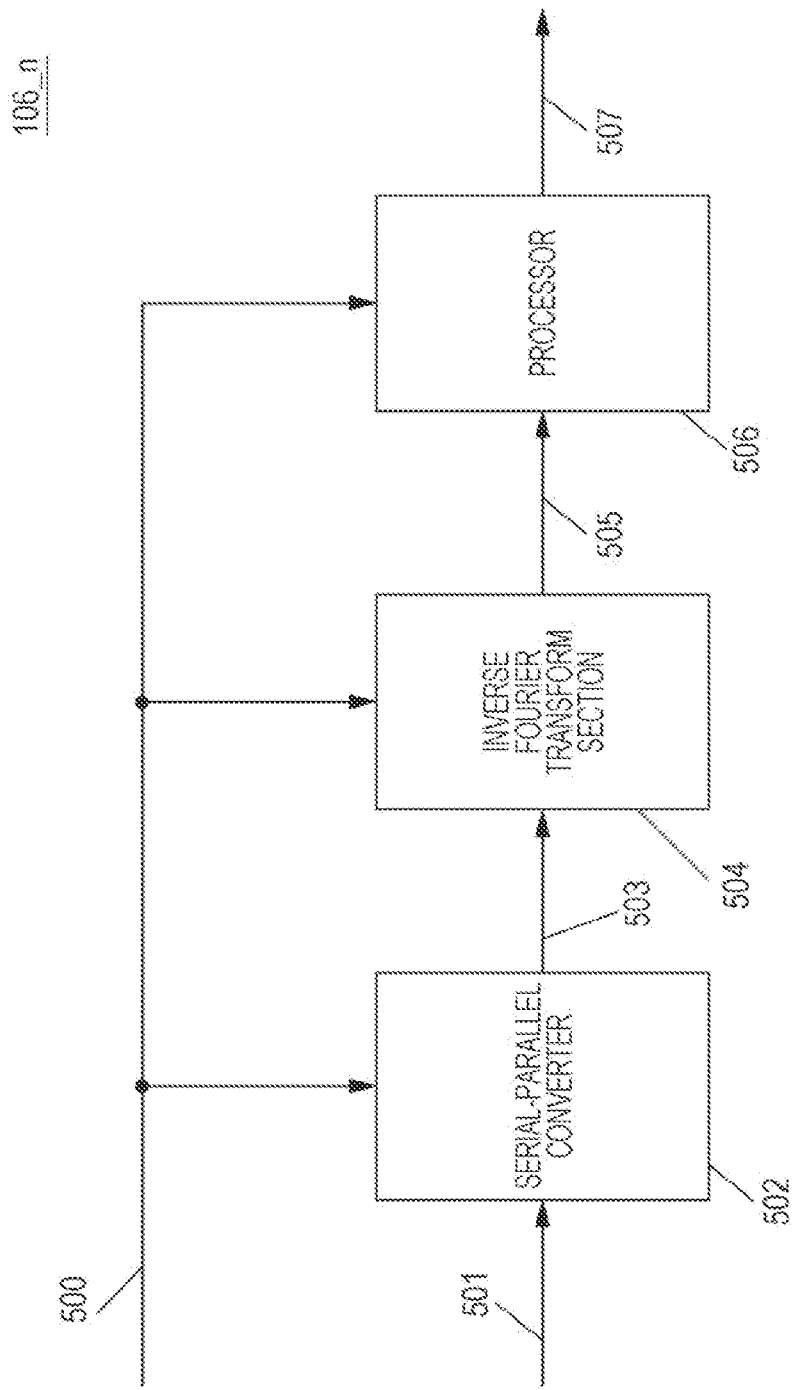
FIG. 5 is a diagram illustrating an example of the configuration of a radio section $n that uses the OFDM scheme.

FIG. 5 is a diagram illustrating an example of the configuration of the radio section $n (106_N) that uses the OFDM scheme. The radio section $n (106_N) includes a serial-parallel converter 502, an inverse Fourier transform section 504, and a processor 506.

The serial-parallel converter 502 receives a signal 501 and a control signal 500. On the basis of the control signal 500, the serial-parallel converter 502 performs serial-parallel conversion on the signal 501 input thereto, and outputs a serial-parallel-converted signal 503 to the inverse Fourier transform section 504. The signal 501 corresponds to the multiplexed signal $n baseband signal 105_N in FIG. 1, and the control signal 500 corresponds to the control signal 100 in FIG. 1.

The inverse Fourier transform section 504 receives the serial-parallel-converted signal 503 and the control signal 500. On the basis of the control signal 500, the inverse Fourier transform section 504 performs inverse Fourier transform (for example, inverse fast Fourier transform (IFFT)) and outputs an inverse-Fourier-transformed signal 505 to the processor 506.

The processor 506 receives the inverse-Fourier-transformed signal 505 and the control signal 500. On the basis of the control signal 500, the processor 506 performs processing such as frequency conversion and amplification, and outputs a modulated signal 507 to the antenna section $n (108_N). The modulated signal 507 output from the processor 506 corresponds to the transmission signal 107_N in FIG. 1.

Example of Configuration of Antenna Section

Figure 6:
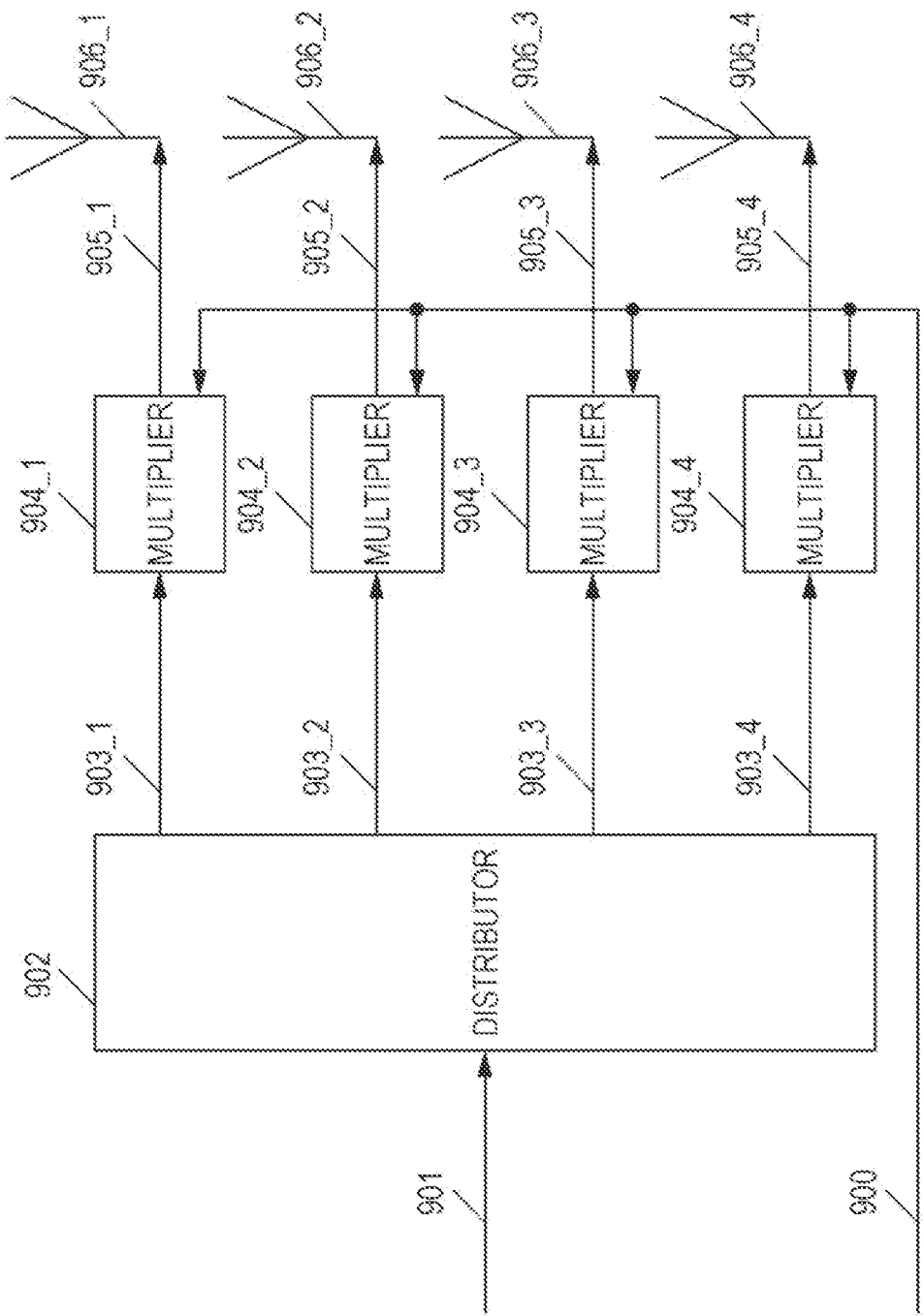
FIG. 6 is a diagram illustrating an example of the configuration of an antenna section in FIG. 1.

FIG. 6 is a diagram illustrating an example of the configuration of each of the antenna sections (the antenna section $1 (108_1) to the antenna section $N (108_N)) in FIG. 1. The configuration in FIG. 6 is an example in which the antenna section $1 (108_1) to the antenna section $N (108_N) are each constituted by four antennas. The antenna section includes a distributor 902, multipliers 904_1 to 904_4, and antennas 906_1 to 906_4.

The distributor 902 receives a transmission signal 901. The distributor 902 distributes the transmission signal 901 and outputs transmission signals 903_1, 903_2, 903_3, and 903_4 to the corresponding multipliers (the multiplier 904_1 to the multiplier 904_4).

When the antenna section $1 (108_1) in FIG. 1 has the configuration in FIG. 6, the transmission signal 901 corresponds to the transmission signal 107_1 in FIG. 1. When the antenna section $2 (108_2) in FIG. 1 has the configuration in FIG. 6, the transmission signal 901 corresponds to the transmission signal 107_2 in FIG. 1. When the antenna section $N (108_N) in FIG. 1 has the configuration in FIG. 6, the transmission signal 901 corresponds to the transmission signal 107_N in FIG. 1.

The multiplier 904_1 receives the transmission signal 903_1 and a control signal 900. On the basis of information about a multiplication coefficient included in the control signal 900, the multiplier 904_1 multiplies the transmission signal 903_1 by the multiplication coefficient, and outputs a multiplied signal 905_1 to the antenna 906_1. The multiplied signal 905_1 is output as a radio wave from the antenna 906_1.

When the transmission signal 903_1 is represented by Tx1(t) (t is time) and the multiplication coefficient is represented by W1, the multiplied signal 905_1 is expressed by Tx1(t)×W1. Here, W1 can be defined as a complex number and thus may be a real number.

The multiplier 904_2 receives the transmission signal 903_2 and the control signal 900. On the basis of information about a multiplication coefficient included in the control signal 900, the multiplier 904_2 multiplies the transmission signal 903_2 by the multiplication coefficient, and outputs a multiplied signal 905_2 to the antenna 906_2. The multiplied signal 905_2 is output as a radio wave from the antenna 906_2.

When the transmission signal 903_2 is represented by Tx2(t) and the multiplication coefficient is represented by W2, the multiplied signal 905_2 is expressed by Tx2(t)×W2. Here, W2 can be defined as a complex number and thus may be a real number.

The multiplier 904_3 receives the transmission signal 903_3 and the control signal 900. On the basis of information about a multiplication coefficient included in the control signal 900, the multiplier 904_3 multiplies the transmission signal 903_3 by the multiplication coefficient, and outputs a multiplied signal 905_3 to the antenna 906_3. The multiplied signal 905_3 is output as a radio wave from the antenna 906_3.

When the transmission signal 903_3 is represented by Tx3(t) and the multiplication coefficient is represented by W3, the multiplied signal 905_3 is expressed by Tx3(t)×W3. Here, W3 can be defined as a complex number and thus may be a real number.

The multiplier 904_4 receives the transmission signal 903_4 and the control signal 900. On the basis of information about a multiplication coefficient included in the control signal 900, the multiplier 904_4 multiplies the transmission signal 903_4 by the multiplication coefficient, and outputs a multiplied signal 905_4 to the antenna 906_4. The multiplied signal 905_4 is output as a radio wave from the antenna 906_4.

When the transmission signal 903_4 is represented by Tx4(t) and the multiplication coefficient is represented by W4, the multiplied signal 905_4 is expressed by Tx4(t)×W4. Here, W4 can be defined as a complex number and thus may be a real number.

Here, "the absolute value of W1, the absolute value of W2, the absolute value of W3, and the absolute value of W4 may be equal". This corresponds to a state where phase change has been performed. Obviously, the absolute value of W1, the absolute value of W2, the absolute value of W3, and the absolute value of W4 may be unequal.

In FIG. 6, a description is given of an example in which each antenna section is constituted by four antennas (and four multipliers). However, the number of antennas is not limited four, and it is sufficient that each antenna section be constituted by one or more antennas.

In addition, the antenna section $1 (108_1) to the antenna section $N (108_N) each need not necessarily have the configuration as in FIG. 6, and the antenna section need not necessarily receive the control signal 100, as described above. For example, each of the antenna section $1 (108_1) to the antenna section $N (108_N) in FIG. 1 may be constituted by one antenna or multiple antennas.

Generation of Control Information

Figure 7:
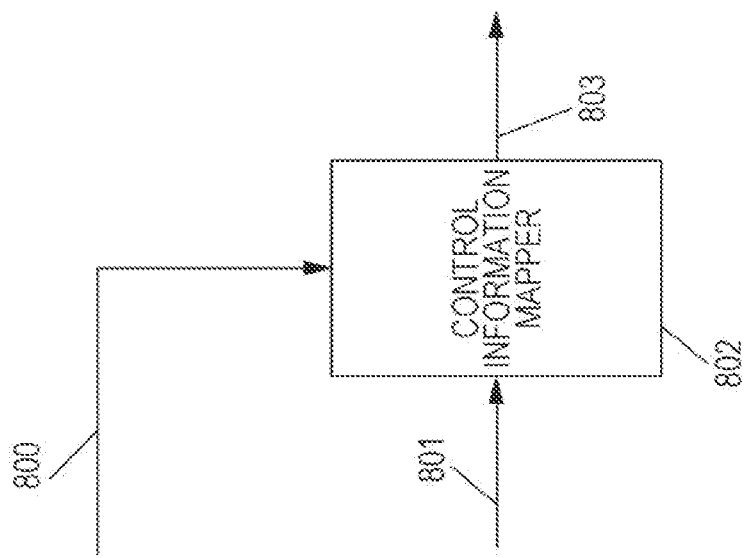
FIG. 7 is a diagram illustrating an example of the configuration of a portion related to control information generation for generating a control information symbol signal in FIGS. 3 and 4.

FIG. 7 is a diagram illustrating an example of the configuration of a portion related to control information generation for generating the control information symbol signal 353 in FIGS. 3 and 4.

A control information mapper 802 receives control information-related data 801 and a control signal 800. The control information mapper 802 performs mapping on the control information-related data 801 by using a modulation scheme that is based on the control signal 800, and outputs a control information mapped signal 803. The control information mapped signal 803 corresponds to the control information symbol signal 353 in FIGS. 3 and 4.

First Example of Frame Configuration in Transmission Apparatus

Next, a frame configuration in the transmission apparatus will be described. The frame configuration shows the arrangement of data symbols, pilot symbols, and other symbols to be transmitted. Information about the frame configuration is included in the control signal 300 (see FIGS. 3 and 4). The inserter 307A and the inserter 307B illustrated in FIGS. 3 and 4 respectively generate the baseband signal 308A and the baseband signal 308B that are based on the frame configuration.

Hereinafter, an example is given in which a multi-carrier transmission scheme such as OFDM is used, the inserter 307A in the user #p signal processor 102_p outputs the user #p first baseband signal 103_p_1 in FIG. 1 as the baseband signal 308A, and the inserter 307B outputs the user #p second baseband signal 103_p_2 in FIG. 1 as the baseband signal 308B. The frame configurations of the user #p first baseband signal 103_p_1 and the user #p second baseband signal 103_p_2 in this case will be described as an example.

Figure 8:
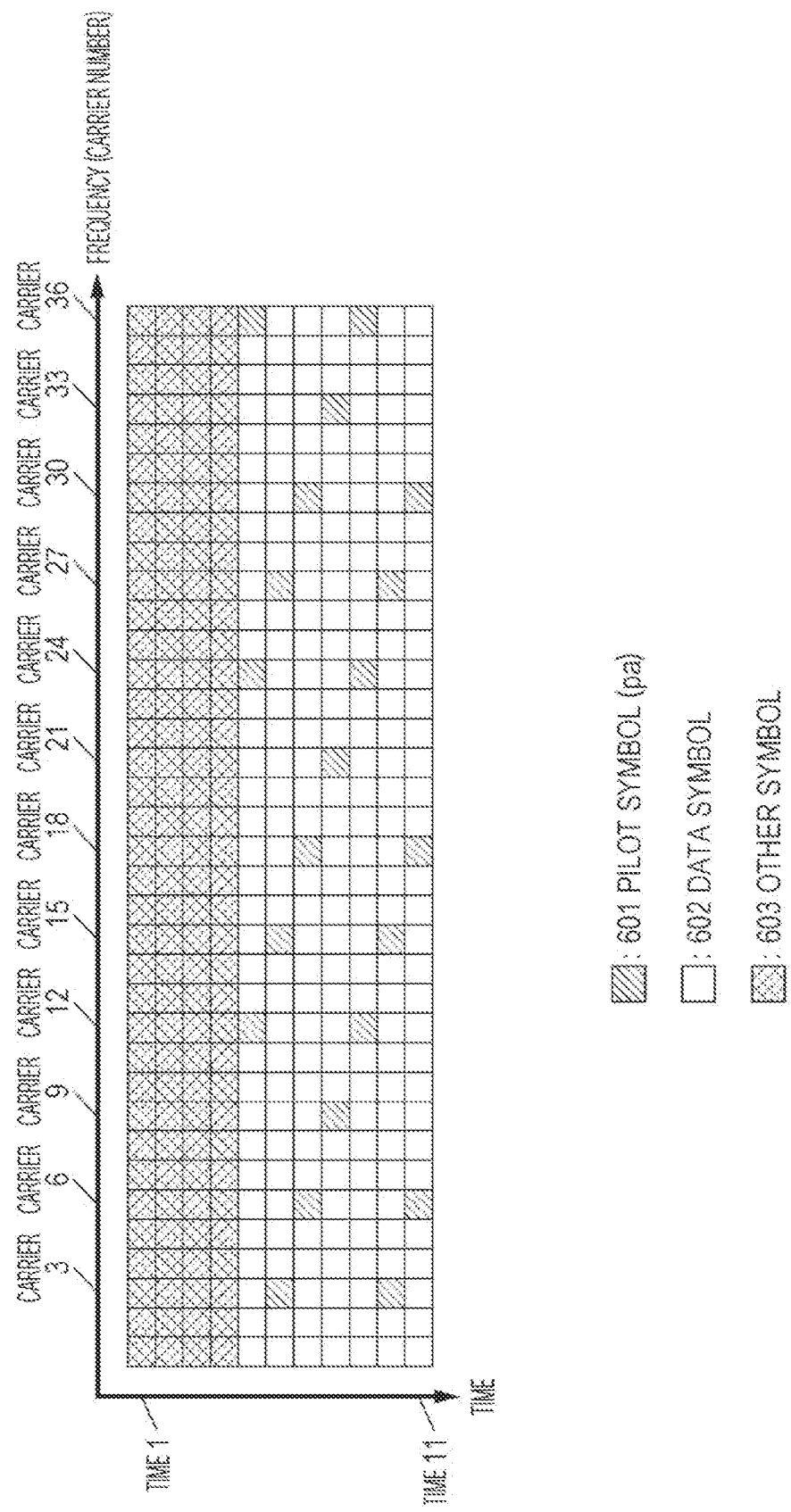
FIG. 8 is a diagram illustrating an example of the frame configuration of a first baseband signal for the user #p.

FIG. 8 is a diagram illustrating an example of the frame configuration of the user #p first baseband signal 103_p_1. In FIG. 8, the horizontal axis indicates frequency (carrier), and the vertical axis indicates time. Since a multi-carrier transmission scheme such as OFDM is used, symbols exist in the carrier direction. FIG. 8 illustrates, as an example, symbols from carrier 1 to carrier 36. In addition, FIG. 8 illustrates symbols from time 1 to time 11.

In FIG. 8, 601 denotes a pilot symbol (the pilot symbol signal 351A (corresponding to pa(t)) in FIGS. 3 and 4), 602 denotes a data symbol, and 603 denotes another symbol. At this time, the pilot symbols are Phase Shift Keying (PSK) symbols, for example, and are symbols used by a reception apparatus that receives this frame to perform channel estimation (estimation of propagation path variation) and estimation of frequency offset/phase variation. For example, the transmission apparatus in FIG. 1 and the reception apparatus that receives a signal having the frame configuration in FIG. 8 may preferably share a method for transmitting the pilot symbols.

Here, the user #p mapped signal 205_1 is called "stream #1", and the user #p mapped signal 205_2 is called "stream #2". The same applies to the description given below.

The data symbols 602 are symbols corresponding to the data symbols included in the baseband signal 207_A generated in FIG. 2. Thus, the data symbols 602 are any of "symbols including both the symbols of "stream #1" and the symbols of "stream #2'"", "the symbols of "stream #1'"", and "the symbols of "stream #2'"". This is decided by the configuration of the precoding matrix used by the weight combiner 303 in FIG. 3. That is, the data symbols 602 correspond to the weighted signal 304A ($zp1(i)$).

The other symbols 603 are symbols corresponding to the preamble signal 352 and the control information symbol signal 353 in FIGS. 3 and 4. However, the other symbols may include symbols other than a preamble and control information symbols. At this time, the preamble may transmit data (for control), and are made up of symbols for signal detection, symbols for performing frequency synchronization/time synchronization, symbols for channel estimation (symbols for estimating propagation path variation), and so forth. The control information symbols are symbols including control information that is used by the reception apparatus that has received the frame in FIG. 8 to demodulate and decode the data symbols.

For example, carrier 1 to carrier 36 from time 1 to time 4 in FIG. 8 correspond to the other symbols 603. Carrier 1 to carrier 11 at time 5 correspond to the data symbols 602. In the following, carrier 12 at time 5 corresponds to the pilot symbol 601, carrier 13 to carrier 23 at time 5 correspond to the data symbols 602, carrier 24 at time 5 corresponds to the pilot symbol 601, carrier 1 and carrier 2 at time 6 correspond to the data symbols 602, carrier 3 at time 6 corresponds to the pilot symbol 601, carrier 30 at time 11 corresponds to the pilot symbol 601, and carrier 31 to carrier 36 at time 11 correspond to the data symbols 602.

Figure 9:
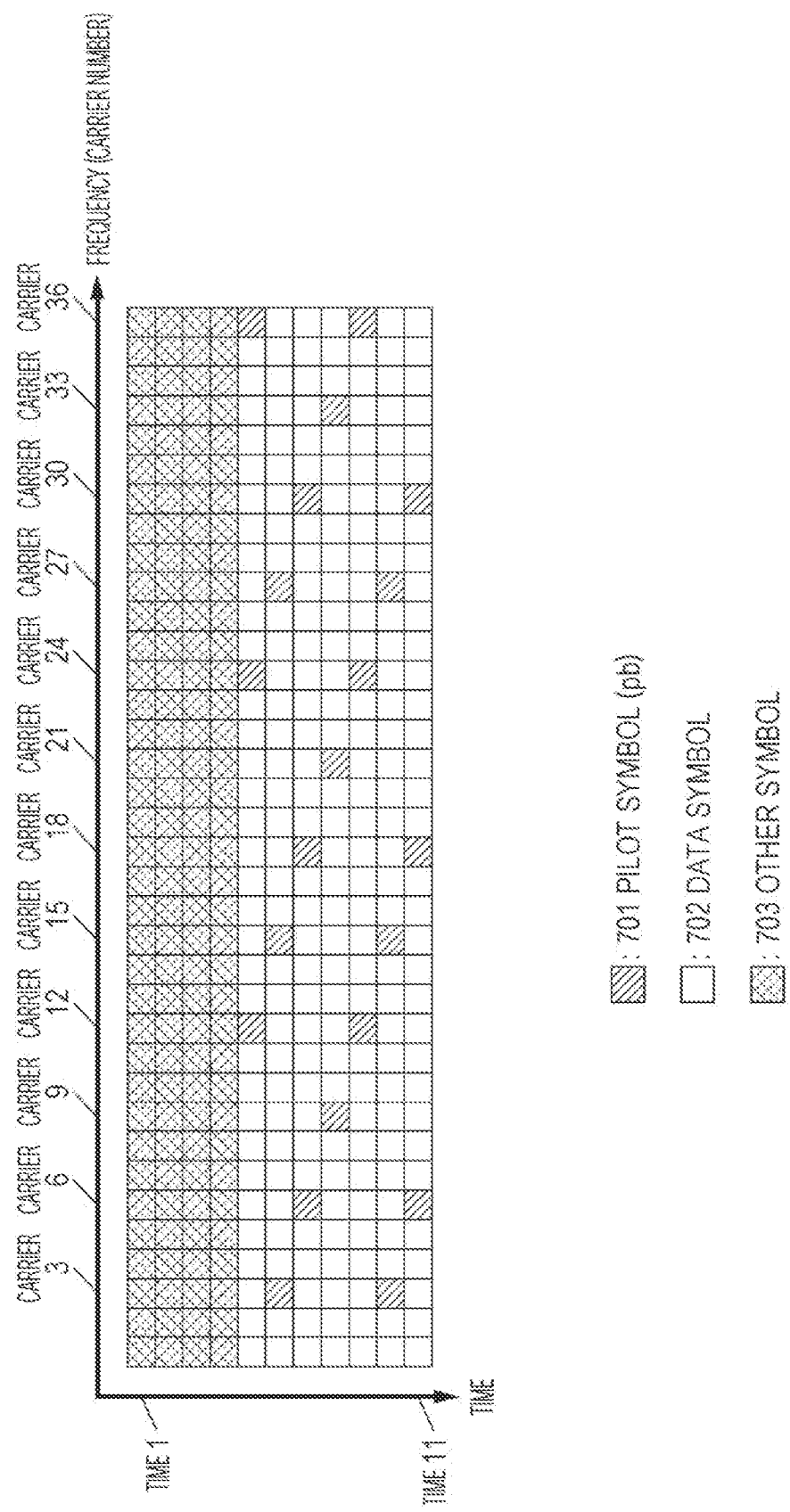
FIG. 9 is a diagram illustrating an example of the frame configuration of a second baseband signal for the user #p.

FIG. 9 is a diagram illustrating an example of the frame configuration of the user #p second baseband signal 103_p_2. In FIG. 9, the horizontal axis indicates frequency (carrier), and the vertical axis indicates time. Since a multi-carrier transmission scheme such as OFDM is used, symbols exist in the carrier direction. FIG. 9 illustrates, as an example, symbols from carrier 1 to carrier 36. In addition, FIG. 9 illustrates symbols from time 1 to time 11.

In FIG. 9, 701 denotes a pilot symbol (the pilot symbol signal 351B (corresponding to pb(t)) in FIGS. 3 and 4), 702 denotes a data symbol, and 703 denotes an other symbol. At this time, the pilot symbols are PSK symbols, for example, and are symbols used by a reception apparatus that receives this frame to perform channel estimation (estimation of propagation path variation) and estimation of frequency offset/phase variation. For example, the transmission apparatus in FIG. 1 and the reception apparatus that receives a signal having the frame configuration in FIG. 9 may preferably share a method for transmitting the pilot symbols.

The data symbols 702 are symbols corresponding to the data symbols included in the baseband signal 207_B generated in FIG. 2. Thus, the data symbols 702 are any of "symbols including both the symbols of "stream #1" and the symbols of "stream #2'"", "the symbols of "stream #1'"", and "the symbols of "stream #2'"". Which symbols among the above three are to be used is decided by the configuration of the precoding matrix used by the weight combiner 303 in FIG. 3. That is, the data symbols 702 correspond to the phase-changed signal 306B ($zp2(i)$).

The other symbols 703 are symbols corresponding to the preamble signal 352 and the control information symbol signal 353 in FIGS. 3 and 4. However, the other symbols may include symbols other than a preamble and control information symbols. At this time, the preamble may transmit data (for control), and are made up of symbols for signal detection, symbols for performing frequency synchronization/time synchronization, symbols for channel estimation (symbols for estimating propagation path variation), and so forth. The control information symbols are symbols including control information that is used by the reception apparatus that has received the frame in FIG. 9 to demodulate and decode the data symbols.

For example, carrier 1 to carrier 36 from time 1 to time 4 in FIG. 9 correspond to the other symbols 703. Carrier 1 to carrier 11 at time 5 correspond to the data symbols 702. In the following, carrier 12 at time 5 corresponds to the pilot symbol 701, carrier 13 to carrier 23 at time 5 correspond to the data symbols 702, carrier 24 at time 5 corresponds to the pilot symbol 701, carrier 1 and carrier 2 at time 6 correspond to the data symbols 702, carrier 3 at time 6 corresponds to the pilot symbol 701, carrier 30 at time 11 corresponds to the pilot symbol 701, and carrier 31 to carrier 36 at time 11 correspond to the data symbols 702.

When a symbol exists at carrier A and time B in FIG. 8 and a symbol exists at carrier A and time B in FIG. 9, the symbol at carrier A and time B in FIG. 8 and the symbol at carrier A and time B in FIG. 9 are transmitted at identical times and identical frequencies. The frame configuration is not limited to those in FIGS. 8 and 9. The frame configurations in FIGS. 8 and 9 are merely examples.

The other symbols 603 and 703 in FIGS. 8 and 9 are symbols corresponding to "the preamble signal 352 and the control information symbol signal 353 in FIGS. 3 and 4". Thus, in a case where the other symbols 603 in FIG. 8 and the other symbols 703 in FIG. 9 at the identical times and identical frequencies (identical carriers) are transmitting control information, identical data (identical control information) is being transmitted.

The reception apparatus expects to simultaneously receive the frame in FIG. 8 and the frame in FIG. 9. However, the reception apparatus is able to obtain data transmitted by the transmission apparatus even if the reception apparatus receives only the frame in FIG. 8 or only the frame in FIG. 9.

In a case where the user #1 signal processor 102_1 in FIG. 1 outputs the first baseband signal 103_1_1 and the second baseband signal 103_1_2, the first baseband signal 103_1_1 and the second baseband signal 103_1_2 respectively have the frame configurations in FIGS. 8 and 9. Likewise, in a case where the user #2 signal processor 102_2 in FIG. 1 outputs the first baseband signal 103_2_1 and the second baseband signal 103_2_2, the first baseband signal 103_2_1 and the second baseband signal 103_2_2 respectively have the frame configurations in FIGS. 8 and 9. Likewise, in a case where the user #M signal processor 102_M in FIG. 1 outputs the first baseband signal 103_M_1 and the second baseband signal 103_M_2, the first baseband signal 103_M_1 and the second baseband signal 103_M_2 respectively have the frame configurations in FIGS. 8 and 9. Second Example of Frame Configuration in Transmission apparatus In FIGS. 8 and 9, a description has been given of a frame configuration in a case where a multi-carrier transmission scheme such as OFDM is used. Now, a description will be given of a frame configuration in the transmission apparatus in a case where a single-carrier scheme is used.

Figure 10:
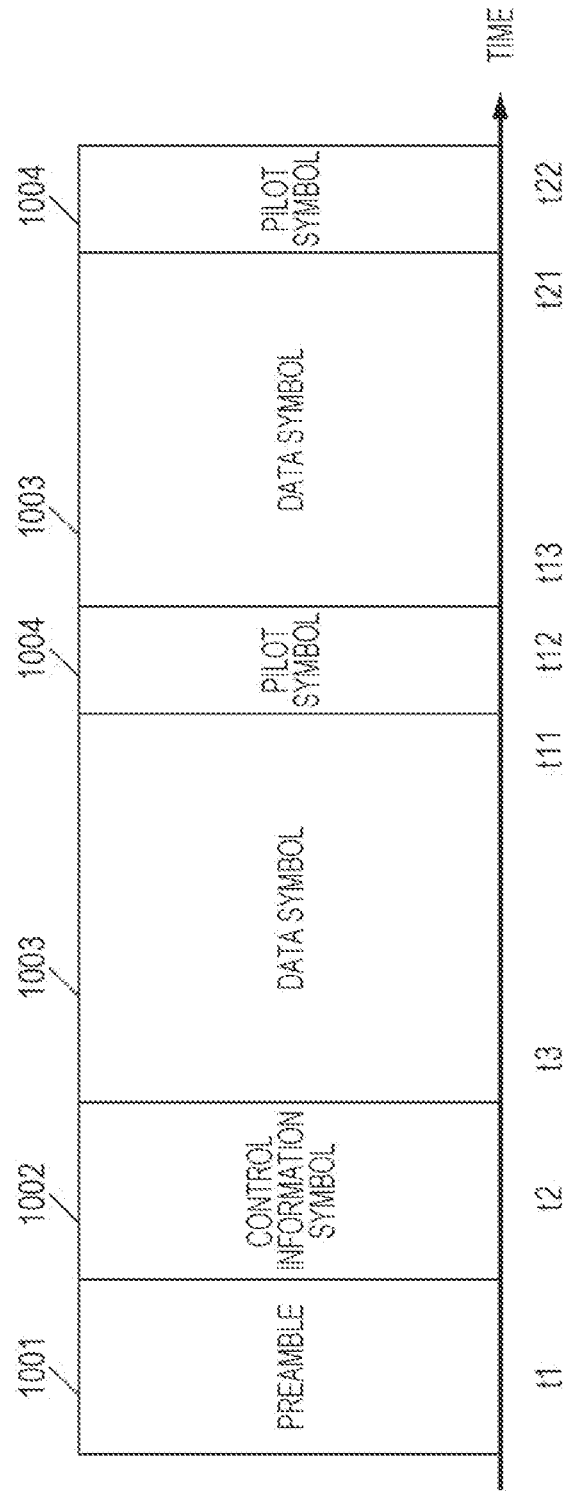
FIG. 10 is a diagram illustrating another example of the frame configuration of the first baseband signal for the user #p.

FIG. 10 is a diagram illustrating another example of the frame configuration of the user #p first baseband signal 103_p_1. In FIG. 10, the horizontal axis indicates time. The difference between FIGS. 10 and 8 is that the frame configuration in FIG. 10 is an example of the frame configuration for a single-carrier scheme and symbols exist in the time direction. In addition, FIG. 10 illustrates symbols from time t1 to t22.

A preamble 1001 in FIG. 10 corresponds to the preamble signal 352 in FIGS. 3 and 4. At this time, the preamble may transmit data (for control), and may be made up of symbols for signal detection, symbols for performing frequency synchronization/time synchronization, symbols for performing channel estimation (symbols for estimating propagation path variation), and so forth.

A control information symbol 1002 in FIG. 10 is a symbol corresponding to the control information symbol signal 353 in FIGS. 3 and 4, and is a symbol including control information that is used by the reception apparatus that has received a signal having the frame configuration in FIG. 10 to demodulate and decode data symbols.

A pilot symbol 1004 in FIG. 10 is a symbol corresponding to the pilot signal 351A (pa(t)) in FIGS. 3 and 4. The pilot symbol 1004 is a PSK symbol, for example, and is a symbol that is used by the reception apparatus that receives this frame to perform channel estimation (estimation of propagation path variation) and estimation of frequency offset/estimation of phase variation. For example, the transmission apparatus in FIG. 1 and the reception apparatus that receives a signal having the frame configuration in FIG. 10 may preferably share a method for transmitting the pilot symbol.

In FIG. 10, 1003 denotes data symbols for transmitting data.

The user #p mapped signal 205_1 is called "stream #1", and the user #p mapped signal 205_2 is called "stream #2".

The data symbols 1003 are symbols corresponding to the data symbols included in the baseband signal 207_A generated in FIG. 2. Thus, the data symbols 1003 are any symbols among three candidates: "symbols including both the symbols of "stream #1" and the symbols of "stream #2"", "the symbols of "stream #1"", and "the symbols of "stream #2"". Which symbols among the above three are to be used is decided by the configuration of the precoding matrix used by the weight combiner 303 in FIG. 3. That is, the data symbols 1003 correspond to the weighted signal 304A ($zp1(i)$).

For example, it is assumed that the transmission apparatus transmits the preamble 1001 at time t1 in FIG. 10, transmits the control information symbol 1002 at time t2, transmits the data symbols 1003 from time t3 to t11, transmits the pilot symbol 1004 at time t12, transmits the data symbols 1003 from time t13 to t21, and transmits the pilot symbol 1004 at time t22.

Although not illustrated in FIG. 10, the frame may include symbols other than the preamble, the control information symbol, the data symbols, and the pilot symbols. In addition, the frame need not necessarily include all of the preamble, the control information symbol, and the pilot symbols.

Figure 11:
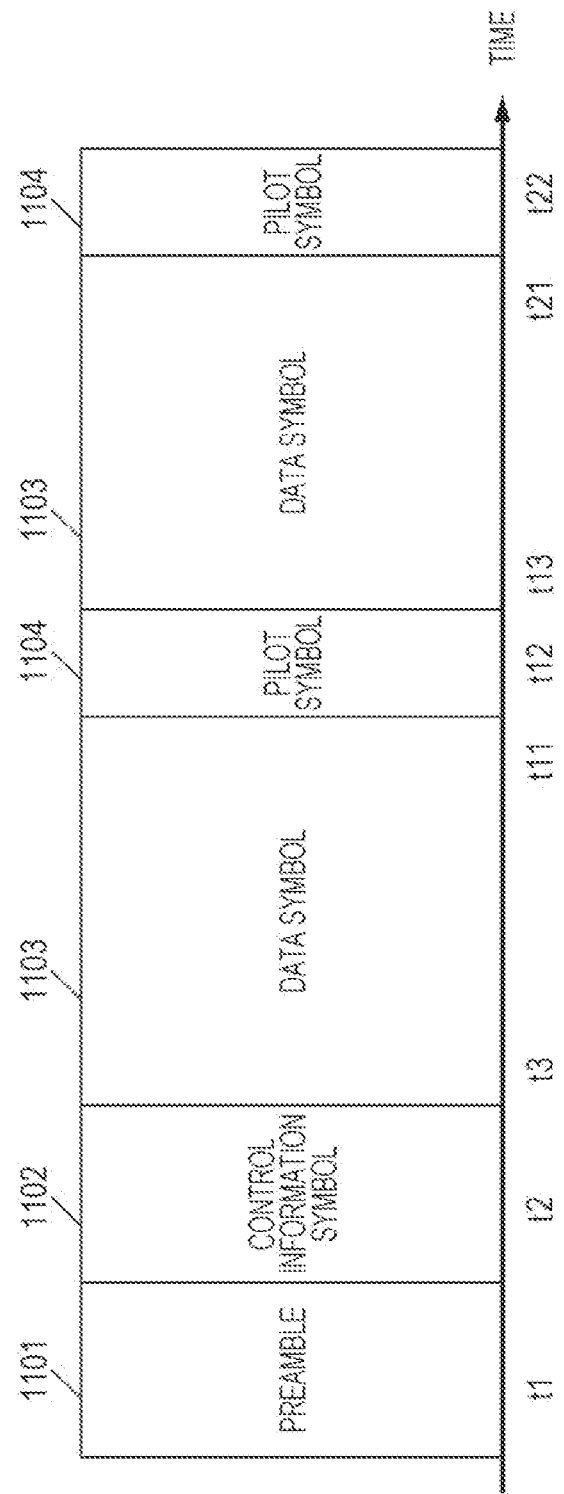
FIG. 11 is a diagram illustrating another example of the frame configuration of the second baseband signal for the user #p.

FIG. 11 is a diagram illustrating another example of the frame configuration of the user #p second baseband signal 103_p_2. In FIG. 11, the horizontal axis indicates time. The difference between FIGS. 11 and 9 is that the frame configuration in FIG. 11 is an example of the frame configuration for a single-carrier scheme and symbols exist in the time direction. In addition, FIG. 11 illustrates symbols from time t1 to t22.

A preamble 1101 in FIG. 11 corresponds to the preamble signal 352 in FIGS. 3 and 4. At this time, the preamble may transmit data (for control), and may be made up of symbols for signal detection, symbols for performing frequency synchronization/time synchronization, symbols for performing channel estimation (symbols for estimating propagation path variation), and so forth.

A control information symbol 1102 in FIG. 11 is a symbol corresponding to the control information symbol signal 353 in FIGS. 3 and 4, and is a symbol including control information that is used by the reception apparatus that has received a signal having the frame configuration in FIG. 11 to demodulate and decode data symbols.

A pilot symbol 1104 in FIG. 11 is a symbol corresponding to the pilot signal 351B (pb(t)) in FIGS. 3 and 4. The pilot symbol 1104 is a PSK symbol, for example, and is a symbol that is used by the reception apparatus that receives this frame to perform channel estimation (estimation of propagation path variation) and estimation of frequency offset/estimation of phase variation. For example, the transmission apparatus in FIG. 1 and the reception apparatus that receives a signal having the frame configuration in FIG. 11 may preferably share a method for transmitting the pilot symbol.

In FIG. 11, 1103 denotes data symbols for transmitting data.

The user #p mapped signal 205_1 is called "stream #1", and the user #p mapped signal 205_2 is called "stream #2"

The data symbols 1103 are symbols corresponding to the data symbols included in the baseband signal 207_B generated in FIG. 2. Thus, the data symbols 1103 are any symbols among three candidates: "symbols including both the symbols of "stream #1" and the symbols of "stream #2″'", "the symbols of "stream #1′″", and "the symbols of "stream #2′″". Which symbols among the above three are to be used is decided by the configuration of the precoding matrix used by the weight combiner 303 in FIG. 3. That is, the data symbols 1103 correspond to the phase-changed signal 306B ($zp2(i)$).

For example, it is assumed that the transmission apparatus transmits the preamble 1101 at time $t1$ in FIG. 11, transmits the control information symbol 1102 at time $t2$, transmits the data symbols 1103 from time $t3$ to $t11$, transmits the pilot symbol 1104 at time $t12$, transmits the data symbols 1103 from time $t13$ to $t21$, and transmits the pilot symbol 1104 at time $t22$.

Although not illustrated in FIG. 11, the frame may include symbols other than the preamble, the control information symbol, the data symbols, and the pilot symbols. In addition, the frame need not necessarily include all of the preamble, the control information symbol, and the pilot symbols.

When a symbol exists at time tz in FIG. 10 and a symbol exists at time tz in FIG. 11 (z is an integer equal to or greater than 1), the symbol at time tz in FIG. 10 and the symbol at time tz in FIG. 11 are transmitted at identical times and identical frequencies. For example, the data symbol at time $t3$ in FIG. 10 and the data symbol at time $t3$ in FIG. 11 are transmitted at identical times and identical frequencies. The frame configuration is not limited to those in FIGS. 10 and 11. The frame configurations in FIGS. 10 and 11 are merely examples.

The preamble and the control information symbol in FIGS. 10 and 11 may transmit identical data (identical control information).

The reception apparatus expects to simultaneously receive the frame in FIG. 10 and the frame in FIG. 11. However, the reception apparatus is able to obtain data transmitted by the transmission apparatus even if the reception apparatus receives only the frame in FIG. 10 or only the frame in FIG. 11.

In a case where the user #1 signal processor 102_1 in FIG. 1 outputs the first baseband signal 103_1_1 and the second baseband signal 103_1_2, the first baseband signal 103_1_1 and the second baseband signal 103_1_2 respectively have the frame configurations in FIGS. 10 and 11. Likewise, in a case where the user #2 signal processor 102_2 in FIG. 1 outputs the first baseband signal 103_2_1 and the second baseband signal 103_2_2, the first baseband signal 103_2_1 and the second baseband signal 103_2_2 respectively have the frame configurations in FIGS. 10 and 11. Likewise, in a case where the user #M signal processor 102_M in FIG. 1 outputs the first baseband signal 103_M_1 and the second baseband signal 103_M_2, the first baseband signal 103_M_1 and the second baseband signal 103_M_2 respectively have the frame configurations in FIGS. 10 and 11.

Method for Arranging Symbols

Next, a description will be given of a method for arranging symbols in the present embodiment. Symbols are sorted with respect to the frequency axis and/or the time axis by an interleaver. For example, symbols are arranged by the error-correcting encoder 202 and/or the mapper 204 illustrated in FIG. 2 in the user #p signal processor 102_p.

Figure 12:
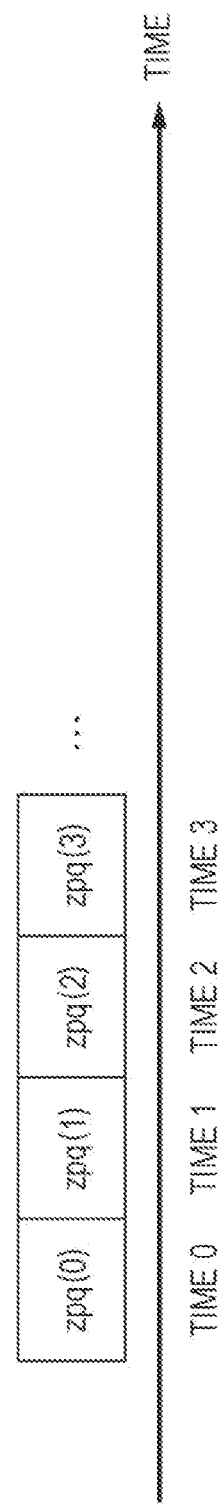
FIG. 12 is a diagram illustrating an example of a method for arranging symbols with respect to a time axis.

FIG. 12 is a diagram illustrating an example of a method for arranging symbols of the weighted signal 304A ($zp1(i)$) and the phase-changed signal 306B ($zp2(i)$) with respect to the time axis.

In FIG. 12, a symbol is denoted by $zpq(0)$. At this time, q is 1 or 2. Thus, $zpq(0)$ in FIG. 12 represents "in $zp1(i)$ and $zp2(i)$, $zp1(0)$ and $zp2(0)$ when the symbol number i = 0". Likewise, $zpq(1)$ represents "in $zp1(i)$ and $zp2(i)$, $zp1(1)$ and $zp2(1)$ when the symbol number i = 1". That is, zpq(X) represents "in $zp1(i)$ and $zp2(i)$, $zp1(X)$ and $zp2(X)$ when the symbol number i = X". The same applies to FIGS. 13, 14, and 15.

In the example in FIG. 12, the symbol $zpq(0)$ with the symbol number i = 0 is arranged at time 0, the symbol $zpq(1)$ with the symbol number i = 1 is arranged at time 1, the symbol $zpq(2)$ with the symbol number i = 2 is arranged at time 2, and the symbol $zpq(3)$ with the symbol number i = 3 is arranged at time 3. In this way, symbols of the weighted signal 304A ($zp1(i)$) and the phase-changed signal 306B ($zp2(i)$) are arranged with respect to the time axis. However, FIG. 12 is an example, and the relationship between the symbol number and time is not limited thereto.

Figure 13:
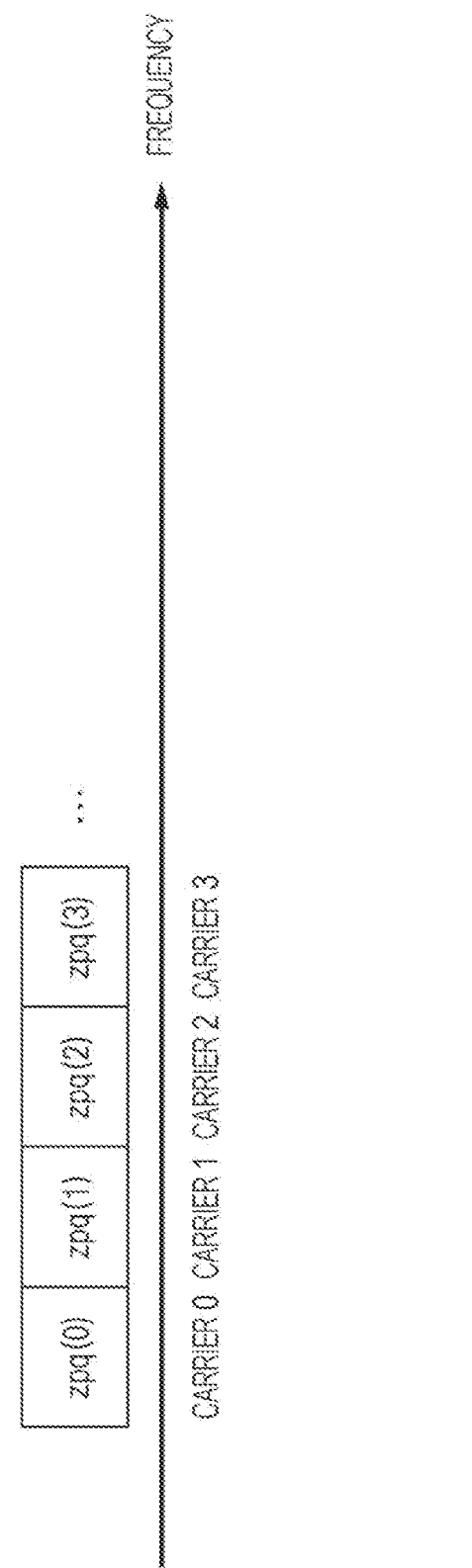
FIG. 13 is a diagram illustrating an example of a method for arranging symbols with respect to a frequency axis.

FIG. 13 is a diagram illustrating an example of a method for arranging symbols of the weighted signal 304A ($zp1(i)$) and the phase-changed signal 306B ($zp2(i)$) with respect to the frequency axis.

In the example in FIG. 13, the symbol $zpq(0)$ with the symbol number i = 0 is arranged at carrier 0, the symbol $zpq(1)$ with the symbol number i = 1 is arranged at carrier 1, the symbol $zpq(2)$ with the symbol number i = 2 is arranged at carrier 2, and the symbol $zpq(3)$ with the symbol number i = 3 is arranged at carrier 3. In this way, symbols of the weighted signal 304A ($zp1(i)$) and the phase-changed signal 306B ($zp2(i)$) are arranged with respect to the frequency axis. However, FIG. 13 is an example, and the relationship between the symbol number and frequency is not limited thereto.

Figure 14:
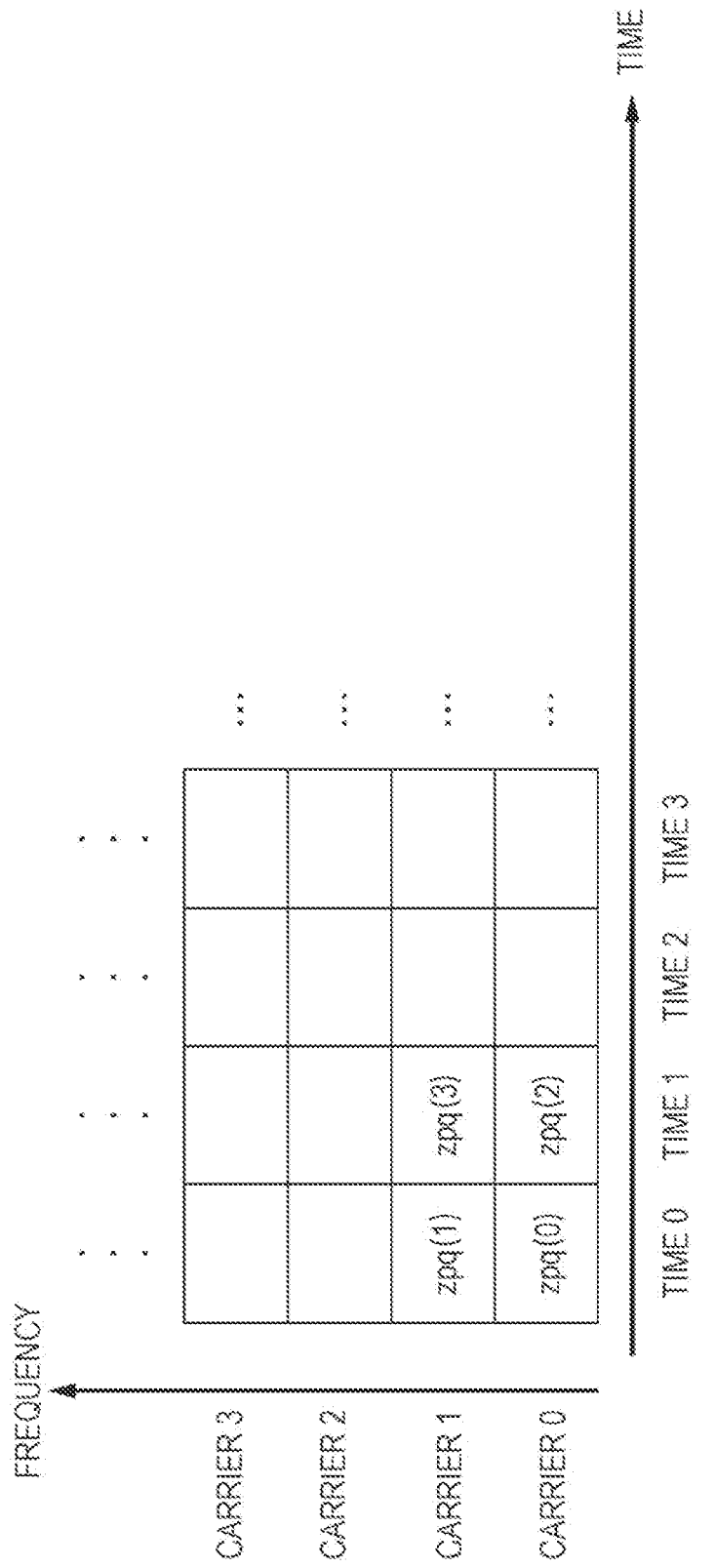
FIG. 14 is a diagram illustrating an example of arrangement of symbols with respect to the time and frequency axes.

FIG. 14 is a diagram illustrating an example of the arrangement of symbols of the weighted signal 304A ($zp1(i)$) and the phase-changed signal 306B ($zp2(i)$) with respect to the time and frequency axes.

In the example in FIG. 14, the symbol $zpq(0)$ with the symbol number i = 0 is arranged at time 0 and carrier 0, the symbol $zpq(1)$ with the symbol number i = 1 is arranged at time 0 and carrier 1, the symbol $zpq(2)$ with the symbol number i = 2 is arranged at time 1 and carrier 0, and the symbol $zpq(3)$ with the symbol number i = 3 is arranged at time 1 and carrier 1. In this way, symbols of the weighted signal 304A ($zp1(i)$) and the phase-changed signal 306B ($zp2(i)$) are arranged with respect to the time and frequency axes. However, FIG. 14 is an example, and the relationship between the symbol number and time/frequency is not limited thereto.

Figure 15:
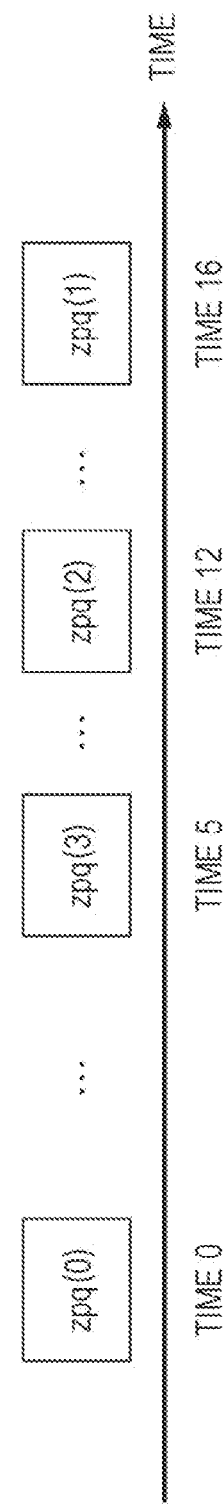
FIG. 15 is a diagram illustrating an example of arrangement of symbols with respect to the time axis.

FIG. 15 is a diagram illustrating an example of the arrangement of symbols of the weighted signal 304A (zp1(i)) and the phase-changed signal 306B (zp2(i)) with respect to the time axis.

In the example in FIG. 15, the symbol zpq(0) with the symbol number i = 0 is arranged at time 0, the symbol zpq(1) with the symbol number i = 1 is arranged at time 16, the symbol zpq(2) with the symbol number i = 2 is arranged at time 12, and the symbol zpq(3) with the symbol number i = 3 is arranged at time 5. In this way, symbols of the weighted signal 304A (zp1(i)) and the phase-changed signal 306B (zp2(i)) in FIG. 3 are arranged with respect to the time axis. That is, in the example in FIG. 15, the symbols are sorted in the time-axis direction. However, FIG. 15 is an example, and the relationship between the symbol number and time is not limited thereto.

In FIG. 15, each symbol is denoted by zpq(i), which may be a symbol generated by multiplexing signals directed to multiple users by the multiplexing signal processor 104 in FIG. 1. In addition, the example in FIG. 15 may be the arrangement of symbols in a case where each of the radio section $1 (106_1) to the radio section $N (106_N) in FIG. 1 includes an interleaver (a section that sorts symbols) and each interleaver sorts symbols. The position where interleaving is performed is not limited to the user signal processor or the radio section.

Figure 16:
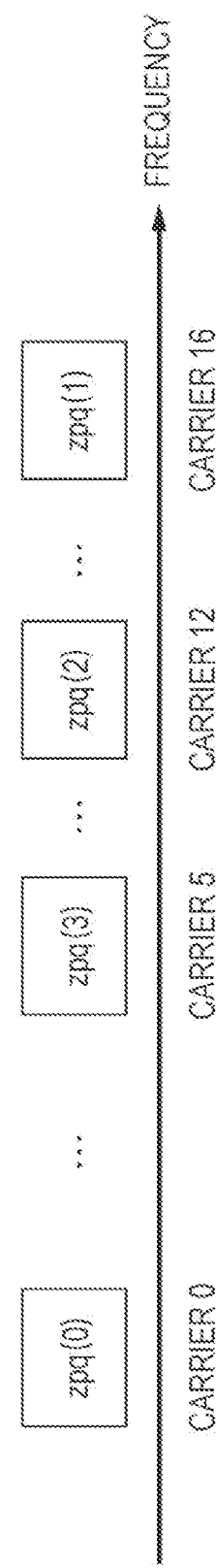
FIG. 16 is a diagram illustrating an example of arrangement of symbols with respect to the frequency axis.

FIG. 16 is a diagram illustrating an example of the arrangement of symbols of the weighted signal 304A (zp1(i)) and the phase-changed signal 306B (zp2(i)) with respect to the frequency axis.

In the example in FIG. 16, the symbol zpq(0) with the symbol number i = 0 is arranged at carrier 0, the symbol zpq(1) with the symbol number i = 1 is arranged at carrier 16, the symbol zpq(2) with the symbol number i = 2 is arranged at carrier 12, and the symbol zpq(3) with the symbol number i = 3 is arranged at carrier 5. In this way, symbols of the weighted signal 304A (zp1(i)) and the phase-changed signal 306B (zp2(i)) in FIG. 3 are arranged with respect to the frequency axis. However, FIG. 16 is an example, and the relationship between the symbol number and frequency is not limited thereto.

In FIG. 16, each symbol is denoted by zpq(i), which may be a symbol generated by multiplexing signals directed to multiple users by the multiplexing signal processor 104 in FIG. 1. In addition, the example in FIG. 16 may be the arrangement of symbols in a case where each of the radio section $1 (106_1) to the radio section $N (106_N) in FIG. 1 includes an interleaver (a section that sorts symbols) and each interleaver sorts symbols. The position where interleaving is performed is not limited to the user signal processor or the radio section.

Figure 17:
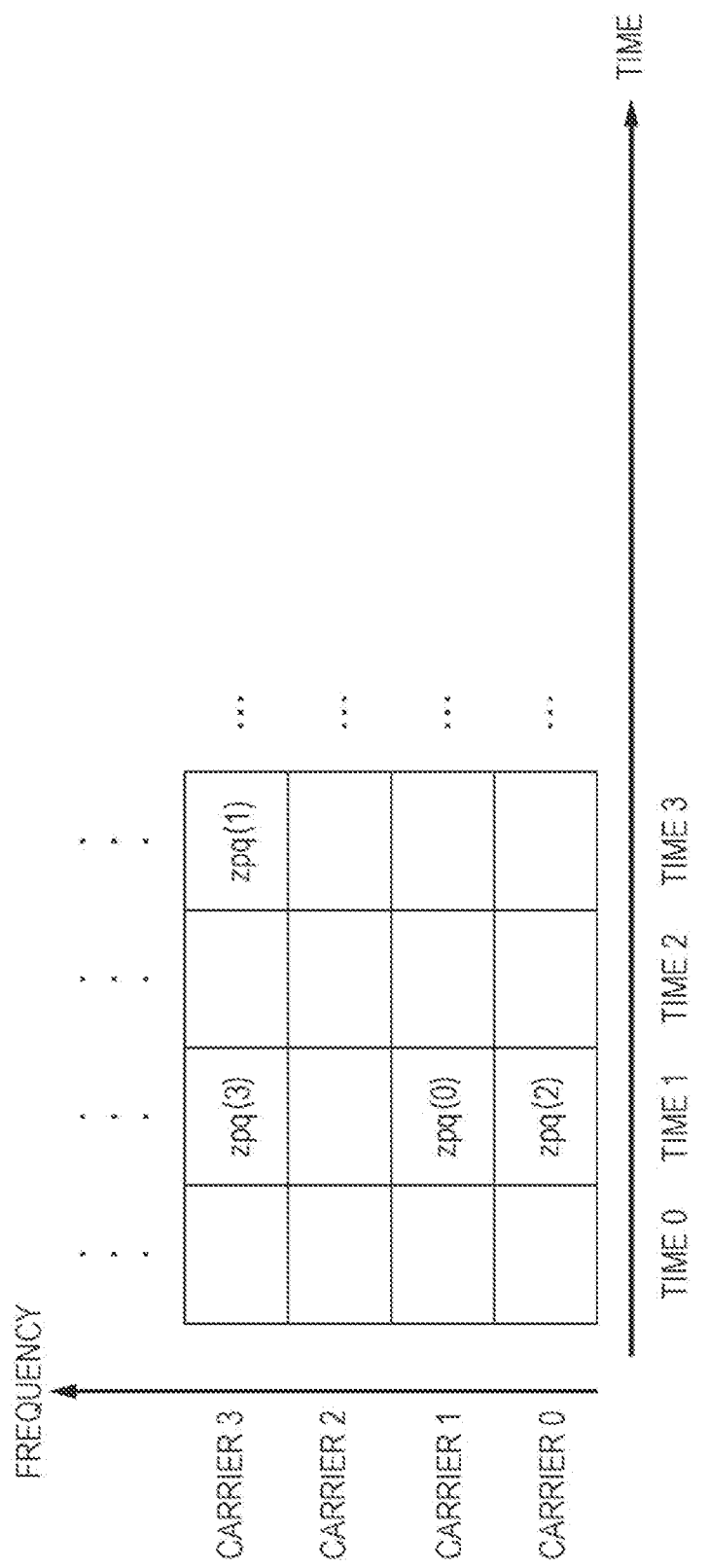
FIG. 17 is a diagram illustrating an example of arrangement of symbols with respect to the time and frequency axes.

FIG. 17 is a diagram illustrating an example of the arrangement of symbols of the weighted signal 304A (zp1(i)) and the phase-changed signal 306B (zp2(i)) with respect to the time and frequency axes.

In the example in FIG. 17, the symbol zpq(0) with the symbol number i = 0 is arranged at time 1 and carrier 1, the symbol zpq(1) with the symbol number i = 1 is arranged at time 3 and carrier 3, the symbol zpq(2) with the symbol number i = 2 is arranged at time 1 and carrier 0, and the symbol zpq(3) with the symbol number i = 3 is arranged at time 1 and carrier 3. In this way, symbols of the weighted signal 304A (zp1(i)) and the phase-changed signal 306B (zp2(i)) in FIG. 3 are arranged with respect to the time and frequency axes. However, FIG. 17 is an example, and the relationship between the symbol number and time/frequency is not limited thereto.

In FIG. 17, each symbol is denoted by zpq(i), which may be a symbol generated by multiplexing signals directed to multiple users by the multiplexing signal processor 104 in FIG. 1. In addition, the example in FIG. 17 may be the arrangement of symbols in a case where each of the radio section $1 (106_1) to the radio section $N (106_N) in FIG. 1 includes an interleaver (a section that sorts symbols) and each interleaver sorts symbols. The position where interleaving is performed is not limited to the user signal processor or the radio section.

According to the description given above, the arrangement of symbols is performed by, for example, the error-correcting encoder 202 and/or the mapper 204 illustrated in FIG. 2 in the user #p signal processor 102_p, but the embodiment is not limited thereto. As described above, each of the radio section $1 (106_1) to the radio section $N (106_N) in FIG. 1 may include an interleaver (a section that sorts symbols) and each interleaver may sort symbols. Alternatively, the multiplexing signal processor 104 may include an interleaver, and the interleaver may perform the arrangement of symbols illustrated in FIGS. 12 to 17. Hereinafter, a description will be given of the multiplexing signal processor 104 that includes an interleaver with reference to FIG. 18.

Another Example of Configuration of Multiplexing Signal Processor

Figure 18:
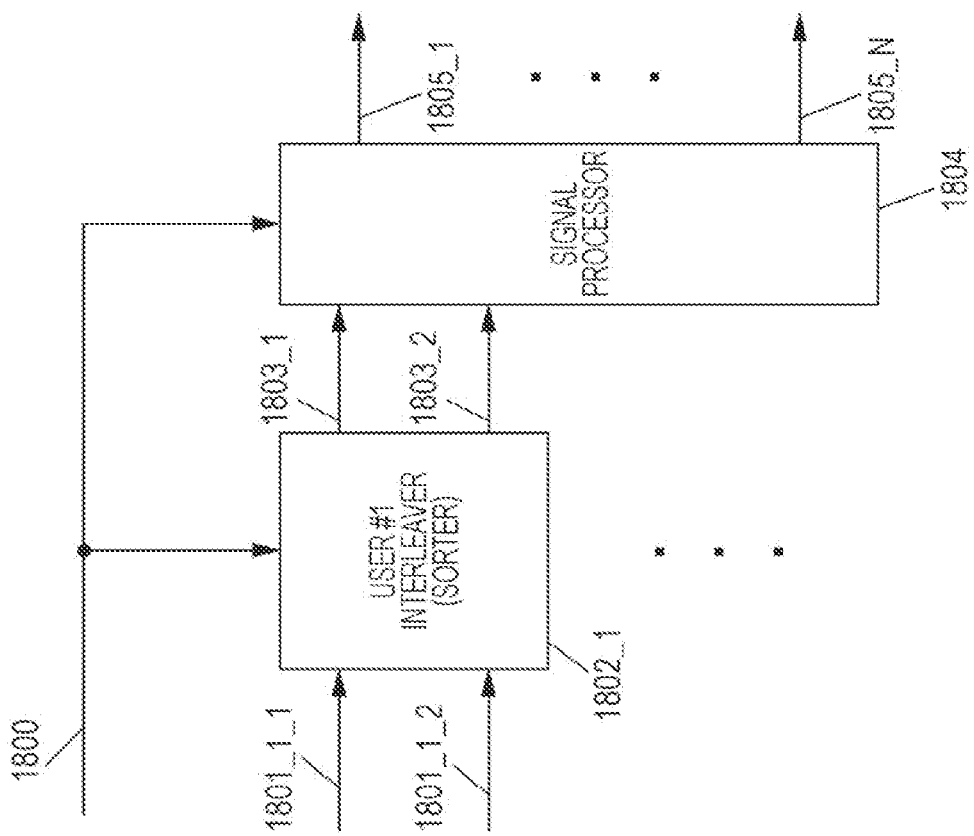
FIG. 18 is a diagram illustrating the configuration of a multiplexing signal processor that includes an interleaver.

FIG. 18 is a diagram illustrating the configuration of the multiplexing signal processor 104 in FIG. 1 that includes an interleaver (a section that sorts symbols).

A user #1 interleaver (sorter) 1802_1 receives processed signals 1801_1_1 and 1801_1_2 and a control signal 1800. The processed signals 1801_1_1 and 1801_1_2 respectively correspond to the user#1 first baseband signal 103_1_1 and the user #1 second baseband signal 103_1_2 in FIG. 1. The control signal 1800 corresponds to the control signal 100 in FIG. 1.

In accordance with the control signal 1800, the user #1 interleaver (sorter) 1802_1 sorts symbols as in FIGS. 12 to 17, and outputs user#1 sorted signals 1803_1 and 1803_2, for example.

The multiplexing signal processor 104 also includes a user #2 interleaver to a user #M interleaver. The user #2 interleaver to the user #M interleaver each have a function similar to that of the user #1 interleaver 1802_1.

A signal processor 1804 receives the control signal 1800, the user #1 sorted signals 1803_1 and 1803_2, and so forth. The signal processor 1804 also receives sorted signals for other users. In accordance with the control signal 1800, the signal processor 1804 performs signal processing such as the weight combining described above on the sorted signals and outputs a multiplexed signal $1 baseband signal 1805_1 to a multiplexed signal $N baseband signal 1805_N. The multiplexed signal $1 baseband signal 1805_1 to the multiplexed signal $N baseband signal 1805_N respectively correspond to the multiplexed signal $1 baseband signal 105_1 to the multiplexed signal $N baseband signal 105_N in FIG. 1.

An example of the transmission apparatus according to the present embodiment has been described above. Next, an example of the configuration of the reception apparatus according to the present embodiment will be described.

Example of Configuration of Reception Apparatus

Figure 19:
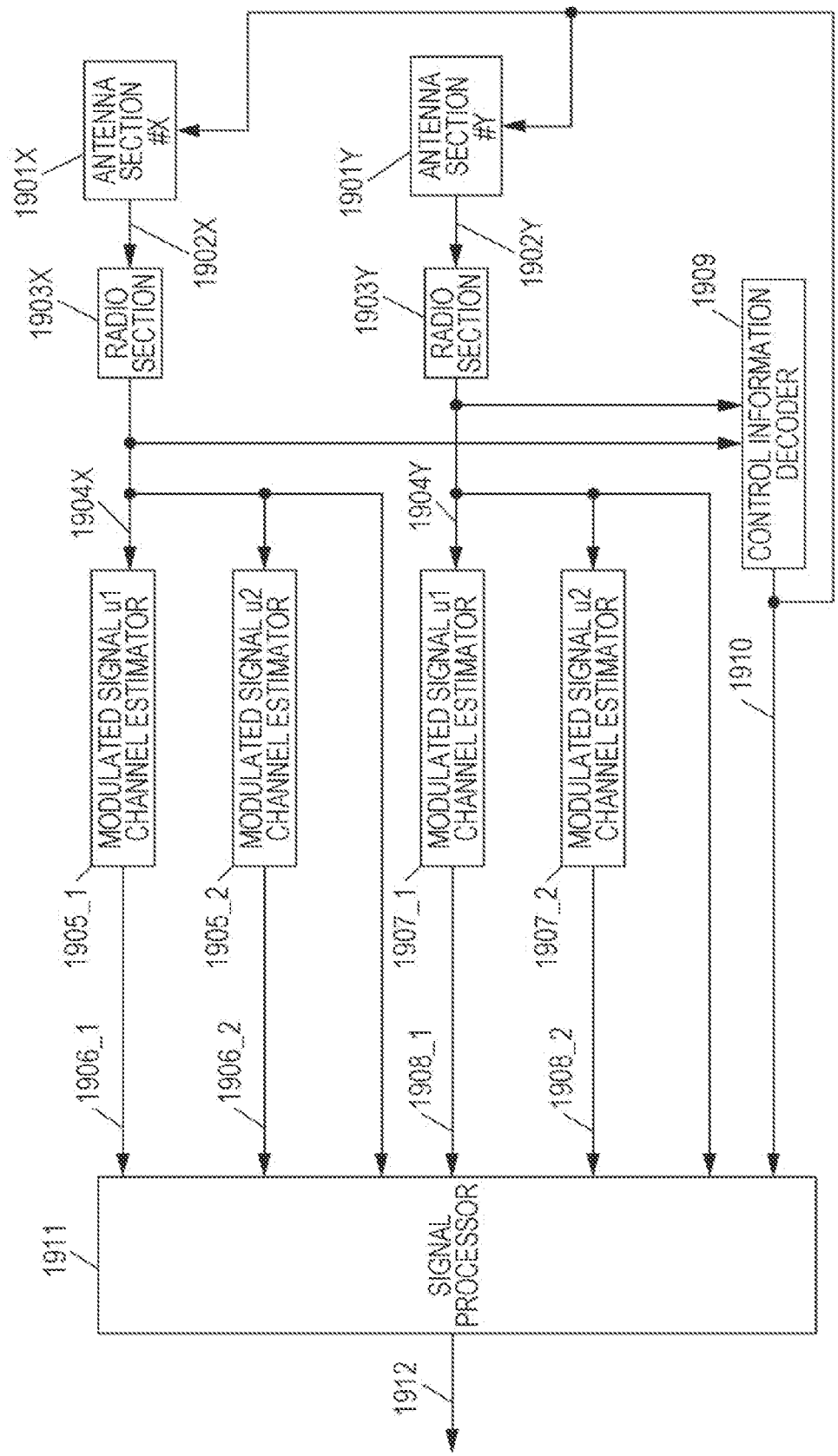
FIG. 19 is a diagram illustrating an example of the configuration of a reception apparatus according to the present embodiment.

FIG. 19 is a diagram illustrating an example of the configuration of the reception apparatus according to the present embodiment. The reception apparatus in FIG. 19 is a reception apparatus of a terminal corresponding to a user #p among a user #1 to a user #M that receive modulated signals when the transmission apparatus in FIG. 1 transmits, for example, transmission signals having the frame configurations in FIGS. 8 and 9 or transmission signals having the frame configurations in FIGS. 10 and 11.

A radio section 1903X receives a reception signal 1902X received by an antenna section #X (1901X). The radio section 1903X performs reception processing such as frequency conversion and Fourier transform, and outputs a baseband signal 1904X to a modulated signal u1 channel estimator 1905_1 and a modulated signal $u2$ channel estimator 1905_2.

Likewise, a radio section 1903Y receives a reception signal 1902Y received by an antenna section #Y (1901Y). The radio section 1903Y performs reception processing such as frequency conversion and Fourier transform, and outputs a baseband signal 1904Y.

FIG. 19 illustrates a configuration in which a control signal 1910 is input to the antenna section #X (1901X) and the antenna section #Y (1901Y), but the control signal 1910 need not necessarily be input thereto. The configuration of an antenna section in a case where the control signal 1910 exists as input will be described below.

The modulated signal u1 channel estimator 1905_1 and the modulated signal $u2$ channel estimator 1905_2 perform channel estimation on the basis of the baseband signal 1904X. A modulated signal u1 channel estimator 1907_1 and a modulated signal $u2$ channel estimator 1907_2 perform channel estimation on the basis of the baseband signal 1904Y. The channel estimation will be described with reference to FIG. 20.

Figure 20:
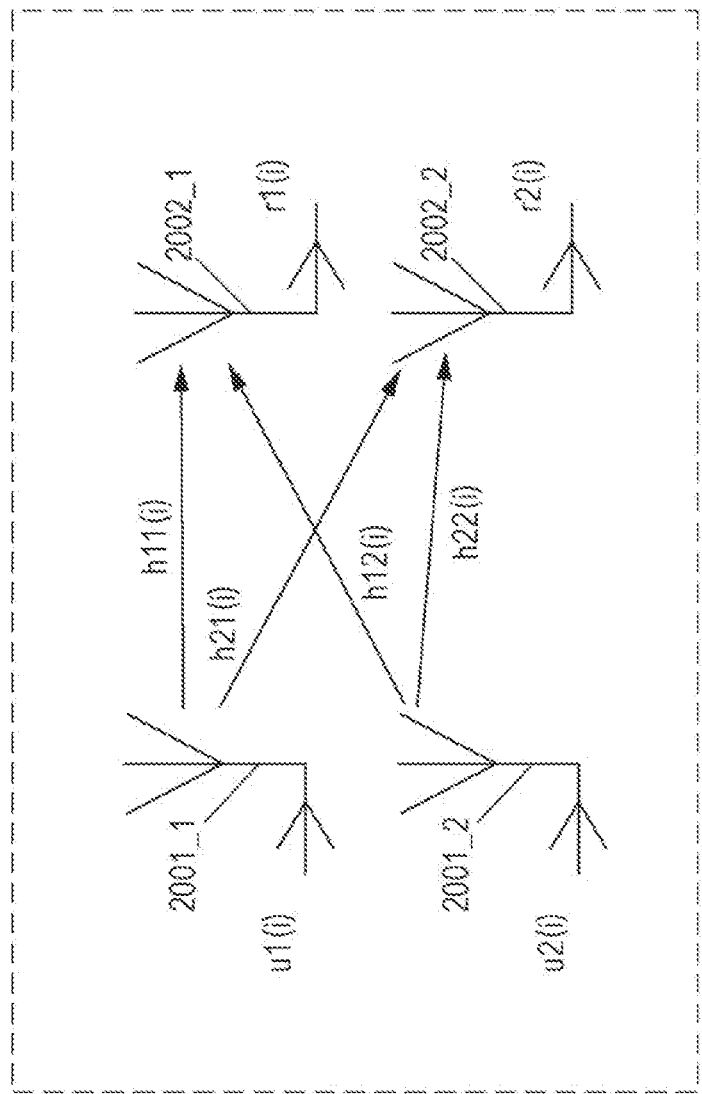
FIG. 20 is a diagram illustrating the relationship between the transmission apparatus and the reception apparatus.

FIG. 20 is a diagram illustrating the relationship between the transmission apparatus and the reception apparatus. Antennas 2001_1 and 2001_2 in FIG. 20 are transmission antennas. The antenna 2001_1 in FIG. 20 corresponds to, for example, the antenna section in FIG. 1 used to transmit a transmission signal $u1(i)$. Also, the antenna 2001_2 in FIG. 20 corresponds to, for example, the antenna section in FIG. 1 used to transmit a transmission signal $u2(i)$. The correspondence between FIGS. 20 and 1 is not limited thereto.

Antennas 2002_1 and 2002_2 in FIG. 20 are reception antennas. The antenna 2002_1 in FIG. 20 corresponds to the antenna section #X (1901X) in FIG. 19. The antenna 2002_2 in FIG. 20 corresponds to the antenna section #Y (1901Y) in FIG. 19.

As in FIG. 20, the signal transmitted from the transmission antenna 2001_1 is represented by $u1(i)$, the signal transmitted from the transmission antenna 2001_2 is represented by $u2(i)$, the signal received by the reception antenna 2002_1 is represented by $r1(i)$, and the signal received by the reception antenna 2002_2 is represented by $r2(i)$. Here, i represents a symbol number and is, for example, an integer equal to or greater than 0.

In addition, a propagation coefficient from the transmission antenna 2001_1 to the reception antenna 2002_1 is represented by $h11(i)$, a propagation coefficient from the transmission antenna 2001_1 to the reception antenna 2002_2 is represented by $h21(i)$, a propagation coefficient from the transmission antenna 2001_2 to the reception antenna 2002_1 is represented by $h12(i)$, and a propagation coefficient from the transmission antenna 2001_2 to the reception antenna 2002_2 is represented by $h22(i)$. Accordingly, the following Expression (41) as a relational expression holds.

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \quad \text{Expression (41)}$$

Here, n1(i) and n2(i) represent noise.

The modulated signal u1 channel estimator 1905_1 in FIG. 19 receives the baseband signal 1904X, performs channel estimation of the modulated signal u1, that is, estimates $h11(i)$ in Expression (41), by using the preamble and/or the pilot symbols in FIGS. 8 and 9 (or FIGS. 10 and 11), and outputs a channel estimation signal 1906_1.

The modulated signal $u2$ channel estimator 1905_2 receives the baseband signal 1904X, performs channel estimation of the modulated signal $u2$, that is, estimates $h12(i)$ in Expression (41), by using the preamble and/or the pilot symbols in FIGS. 8 and 9 (or FIGS. 10 and 11), and outputs a channel estimation signal 1906_2.

The modulated signal u1 channel estimator 1907_1 receives the baseband signal 1904Y, performs channel estimation of the modulated signal u1, that is, estimates $h21(i)$ in Expression (41), by using the preamble and/or the pilot symbols in FIGS. 8 and 9 (or FIGS. 10 and 11), and outputs a channel estimation signal 1908_1.

The modulated signal $u2$ channel estimator 1907_2 receives the baseband signal 1904Y, performs channel estimation of the modulated signal $u2$, that is, estimates $h22(i)$ in Expression (41), by using the preamble and/or the pilot symbols in FIGS. 8 and 9 (or FIGS. 10 and 11), and outputs a channel estimation signal 1908_2.

A control information decoder 1909 receives the baseband signals 1904X and 1904Y, demodulates and decodes the control information in FIGS. 8 and 9 (or FIGS. 10 and 11), and outputs the control signal 1910 including the control information.

A signal processor 1911 receives the channel estimation signals 1906_1, 1906_2, 1908_1, and 1908_2, the baseband signals 1904X and 1904Y, and the control signal 1910. The signal processor 1911 performs demodulation and decoding by using the relationship in Expression (41) on the basis of the control information in the control signal 1910 (for example, information about a modulation scheme and a scheme related to error-correcting code), and outputs reception data 1912.

The control signal 1910 need not necessarily be a signal generated by using the method illustrated in FIG. 19. For example, the control signal 1910 in FIG. 19 may be a signal generated on the basis of information transmitted by the transmission apparatus (FIG. 1) as a communication partner of FIG. 19. Alternatively, the reception apparatus in FIG. 19 may include an input section, and the control signal 1910 may be generated on the basis of information input from the input section.

Example of Configuration of Antenna Section

Figure 21:
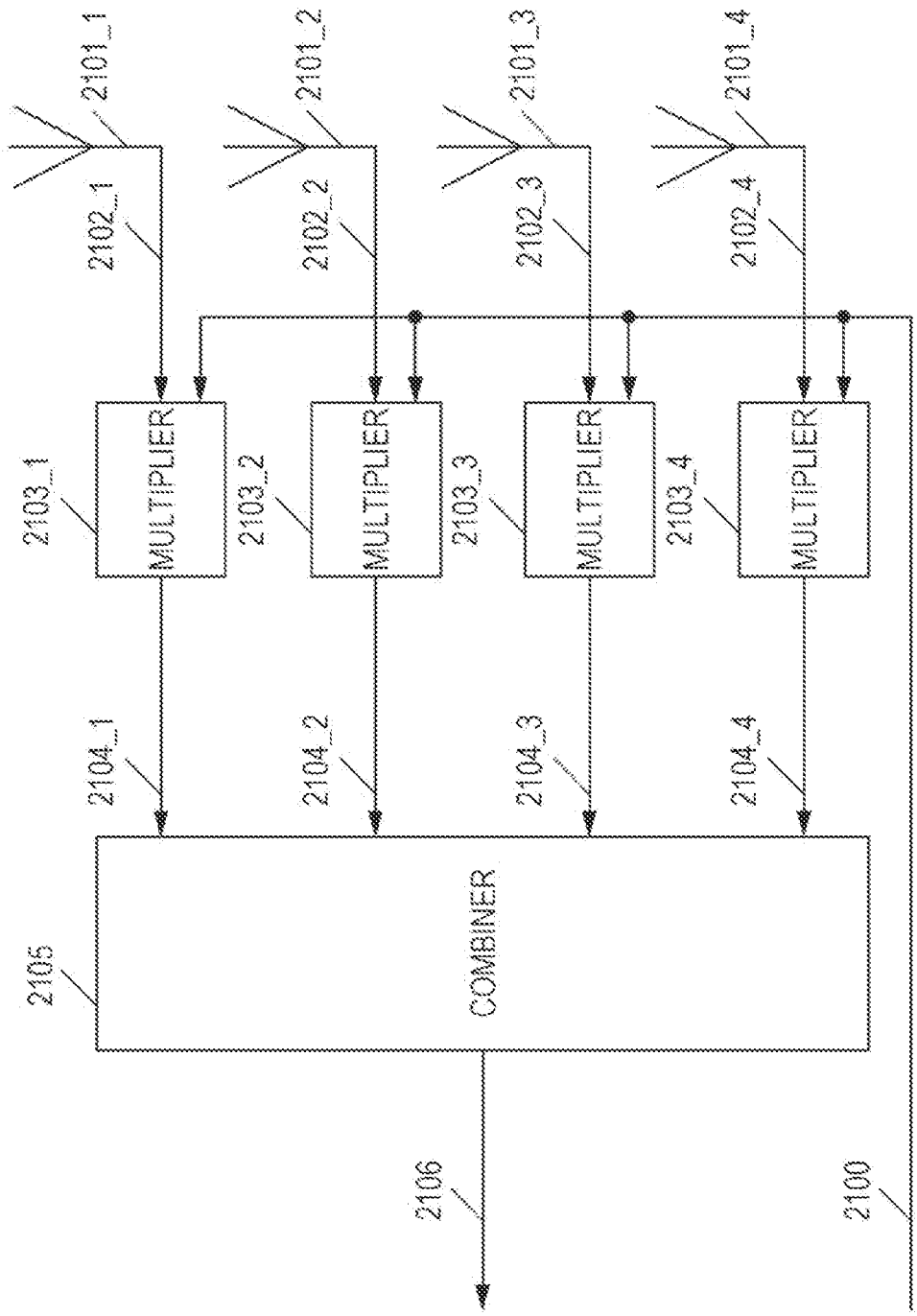
FIG. 21 is a diagram illustrating an example of the configuration of the antenna section in FIG. 19.

Next, a description will be given of the configuration of the antenna section in which the control signal 1910 exists as input. FIG. 21 is a diagram illustrating an example of the configuration of the antenna section in FIG. 19 (the antenna section #X (1901X) or the antenna section #Y (1901Y)).

The example in FIG. 19 is an example in which the antenna section is constituted by four antennas 2101_1 to 2101_4.

A multiplier 2103_1 receives a reception signal 2102_1 received by the antenna 2101_1 and a control signal 2100. On the basis of information about a multiplication coefficient included in the control signal 2100, the multiplier 2103_1 multiplies the reception signal 2102_1 by the multiplication coefficient, and outputs a multiplied signal 2104_1.

When the reception signal 2102_1 is represented by Rx1(t) (t is time) and the multiplication coefficient is represented by D1 (D1 can be defined as a complex number and thus may be a real number), the multiplied signal 2104_1 is expressed by Rx1(t)×D1.

A multiplier 2103_2 receives a reception signal 2102_2 received by the antenna 2101_2 and the control signal 2100. On the basis of information about a multiplication coefficient included in the control signal 2100, the multiplier 2103_2 multiplies the reception signal 2102_2 by the multiplication coefficient, and outputs a multiplied signal 2104_2.

When the reception signal 2102_2 is represented by Rx2(t) and the multiplication coefficient is represented by D2 (D2 can be defined as a complex number and thus may be a real number), the multiplied signal 2104_2 is expressed by Rx2(t)×D2.

A multiplier 2103_3 receives a reception signal 2102_3 received by the antenna 2101_3 and the control signal 2100. On the basis of information about a multiplication coefficient included in the control signal 2100, the multiplier 2103_3 multiplies the reception signal 2102_3 by the multiplication coefficient, and outputs a multiplied signal 2104_3.

When the reception signal 2102_3 is represented by Rx3(t) and the multiplication coefficient is represented by D3 (D3 can be defined as a complex number and thus may be a real number), the multiplied signal 2104_3 is expressed by Rx3(t)×D3.

A multiplier 2103_4 receives a reception signal 2102_4 received by the antenna 2101_4 and the control signal 2100. On the basis of information about a multiplication coefficient included in the control signal 2100, the multiplier 2103_4 multiplies the reception signal 2102_4 by the multiplication coefficient, and outputs a multiplied signal 2104_4.

When the reception signal 2102_4 is represented by Rx4(t) and the multiplication coefficient is represented by D4 (D4 can be defined as a complex number and thus may be a real number), the multiplied signal 2104_4 is expressed by Rx4(t)×D4.

A combiner 2105 receives the multiplied signals 2104_1, 2104_2, 2104_3, and 2104_4. The combiner 2105 combines the multiplied signals 2104_1, 2104_2, 2104_3, and 2104_4, and outputs a combined signal 2106. The combined signal 2106 is expressed by Rx1(t)×D1 + Rx2(t)×D2 + Rx3(t)×D3 + Rx4(t)×D4.

In FIG. 21, a description is given of an example in which the antenna section is constituted by four antennas (and four multipliers), but the number of antennas is not limited to four, and is it sufficient that the antenna section be constituted by two or more antennas.

In a case where the antenna section #X (1901X) in FIG. 19 has the configuration in FIG. 21, the reception signal 1902X corresponds to the combined signal 2106 in FIG. 21 and the control signal 1910 corresponds to the control signal 2100 in FIG. 21. In a case where the antenna section #Y (1901Y) in FIG. 19 has the configuration in FIG. 21, the reception signal 1902Y corresponds to the combined signal 2106 in FIG. 21 and the control signal 1910 corresponds to the control signal 2100 in FIG. 21.

However, the antenna section #X (1901X) and the antenna section #Y (1901Y) need not necessarily have the configuration as in FIG. 21, and the antenna section need not necessarily receive the control signal 1910, as described above. The antenna section #X (1901X) and the antenna section #Y (1901Y) each may be one antenna.

The control signal 1910 may be generated on the basis of information transmitted by the transmission apparatus as a communication partner. Alternatively, the reception apparatus may include an input section, and the control signal 1910 may be generated on the basis of information input from the input section.

As described above, in the present embodiment, the transmission apparatus in FIG. 1 is able to transmit modulated signals (baseband signals) for multiple users at identical times and identical frequencies (bands) by using multiple antennas. Accordingly, the data transmission efficiently of the transmission apparatus in FIG. 1 can be increased. The transmission apparatus in FIG. 1 sets, for each user, whether to transmit multiple streams or a single stream (or not to transmit a modulated signal), and also sets, for each user, a modulation scheme (a set of modulation schemes in a case where there are multiple mappers) and an error-correcting coding scheme, thereby being able to preferably control the data transmission efficiency.

When the transmission apparatus in FIG. 1 transmits multiple modulated signals (baseband signals) to users, performing phase change increases a possibility of being able to avoid falling into a steadily poor reception state in an environment in which direct waves are dominant. Accordingly, the data reception quality at the reception apparatus as a communication partner can be improved.

Second Embodiment

In the present embodiment, a description will be given of an example of a communication apparatus including the transmission apparatus in FIG. 1 described in the first embodiment, a communication apparatus including the reception apparatus in FIG. 19 described in the first embodiment, and a flow of communication between the communication apparatuses.

For the description given below, the communication apparatus including the transmission apparatus in FIG. 1 is called a "base station (access point (AP))", and the communication apparatus including the reception apparatus in FIG. 19 is called a "terminal".

Thus, the user #1 signal processor 102_1 in FIG. 1 is a signal processor for generating a modulated signal for transmitting data to a terminal #1, the user #2 signal processor 102_2 is a signal processor for generating a modulated signal for transmitting data to a terminal #2, and the user #M signal processor 102_M is a signal processor for generating a modulated signal for transmitting data to a terminal #M.

Figure 22:
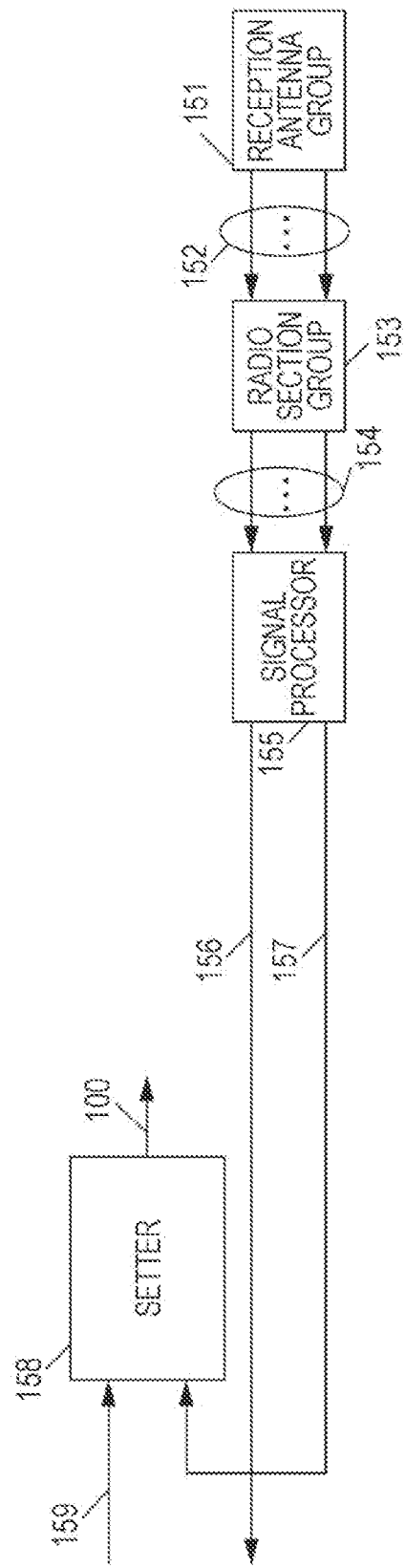
FIG. 22 is a diagram illustrating an example of the configuration of a base station (AP) including the transmission apparatus in FIG. 1.

FIG. 22 is a diagram illustrating an example of the configuration of the base station (AP) including the transmission apparatus in FIG. 1. In FIG. 22, the elements similar to those in FIG. 1 are denoted by the same numerals, and the description thereof is omitted.

A radio section group 153 receives a reception signal group 152 received by a reception antenna group 151. The radio section group 153 performs processing such as frequency conversion on the reception signal group 152, and outputs a baseband signal group 154 to a signal processor 155.

The signal processor 155 performs processing such as demodulation and error-correcting decoding on the baseband signal group input thereto, and outputs reception data 156 and control information 157. At this time, the control information 157 includes feedback information transmitted by each terminal.

A setter 158 receives base station (AP) setting information 159 and the control information 157. The setter 158 performs "deciding of an error-correcting coding method, a transmission method, a modulation scheme (or a modulation scheme set), and so forth in the user #1 signal processor 102_1 in FIG. 1", "deciding of an error-correcting coding method, a transmission method, a modulation scheme (or a modulation scheme set), and so forth in the user #2 signal processor 102_2 in FIG. 1", and "deciding of an error-correcting coding method, a transmission method, a modulation scheme (or a modulation scheme set), and so forth in the user #M signal processor 102_M in FIG. 1", and outputs a signal including the decided information as the control signal 100.

In addition, on the basis of the feedback information included in the control information 157 and transmitted by each terminal, the setter 158 decides the processing method to be used by the multiplexing signal processor 104, and outputs a signal including information about the decided processing method as the control signal 100.

In FIG. 22, the term "group" is used, but it is sufficient that a receiving section have one or more systems.

Figure 23:
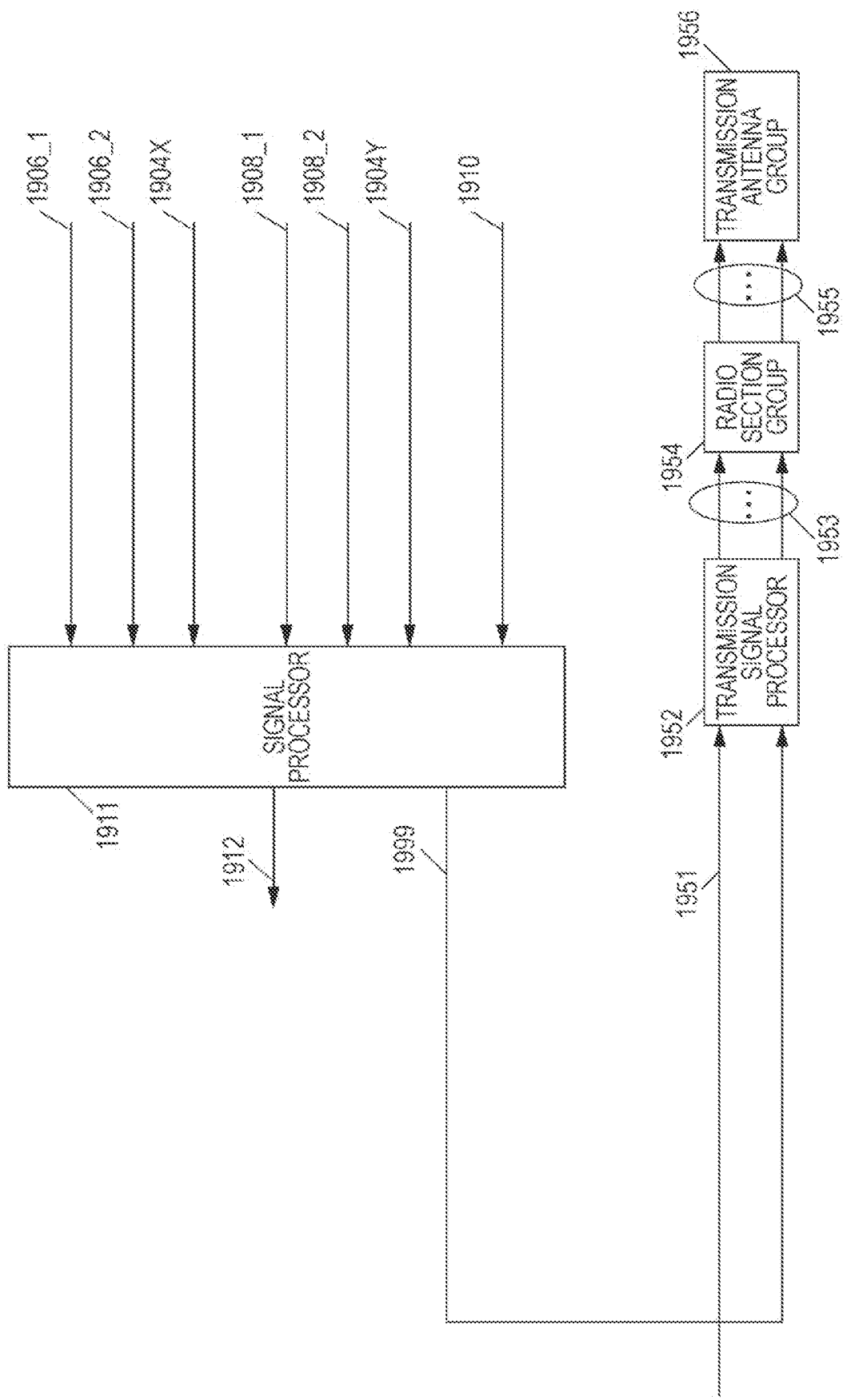
FIG. 23 is a diagram illustrating an example of the configuration of a terminal including the reception apparatus in FIG. 19.

FIG. 23 is a diagram illustrating an example of the configuration of the terminal including the reception apparatus in FIG. 19. In FIG. 23, the elements that operate similarly to those in FIG. 19 are denoted by the same numerals.

The signal processor 1911 receives the channel estimation signal 1906_1, the channel estimation signal 1906_2, the baseband signal 1904X, the channel estimation signal 1908_1, the channel estimation signal 1908_2, the baseband signal 1904Y, and the control signal 1910. The signal processor 1911 performs processing of demodulation and error-correcting decoding, and outputs the reception data 1912. In addition, the signal processor 1911 generates feedback information about the state of the reception signal on the basis of the signal transmitted by the base station (AP), and outputs feedback information 1999.

A transmission signal processor 1952 receives data 1951 and the feedback information 1999. The transmission signal processor 1952 performs processing such as error-correcting coding and modulation on the data 1951 and the feedback information 1999 to generate a baseband signal group 1953, and outputs the baseband signal group 1953 to a radio section group 1954.

The radio section group 1954 performs processing such as frequency conversion and amplification on the baseband signal group 1953 input thereto to generate a transmission signal group 1955. The radio section group 1954 outputs the transmission signal group 1955 to a transmission antenna group 1956. Subsequently, the transmission signal group 1955 is output as radio waves from the transmission antenna group 1956.

In FIG. 23, the term "group" is used, but it is sufficient that a transmitting section have one or more systems.

The base station (AP) transmits a signal to a terminal by using the configuration of the transmission apparatus in FIG. 1 and receives a signal from the terminal by using the configuration in FIG. 22. The terminal receives a signal from the base station (AP) by using the configuration of the reception apparatus in FIG. 19 and transmits a signal to the base station by using the configuration in FIG. 23. With these configurations, communication is performed between the base station (AP) and the terminal.

Next, a description will be given of a flow of communication between a base station (AP) and terminals.

Figure 24:
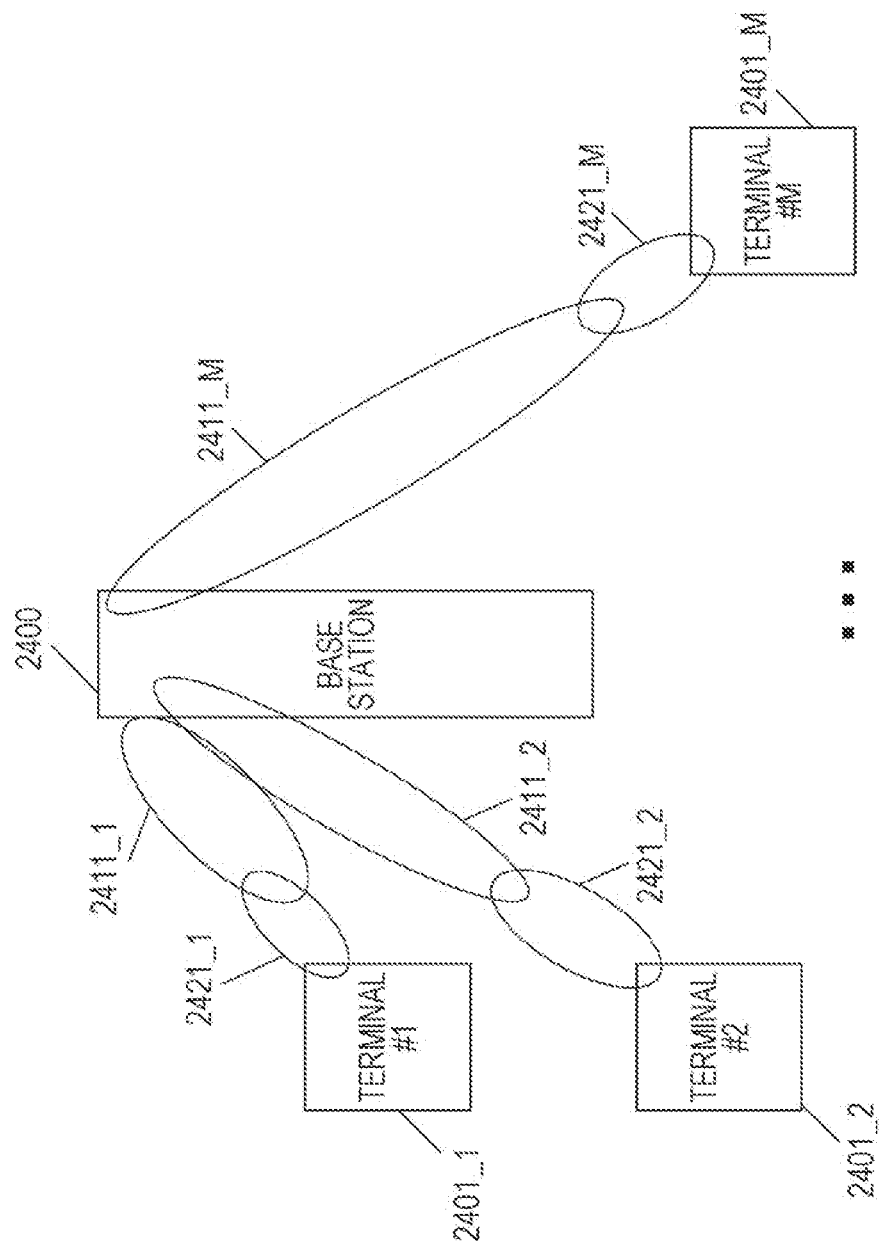
FIG. 24 is a diagram illustrating an example of the relationship between the base station (AP) and terminals.

FIG. 24 is a diagram illustrating an example of the relationship between a base station (AP) and terminals. In a base station (AP) 2400, the user #1 signal processor 102_1 in FIG. 1 generates a modulated signal to be transmitted to a terminal #1 (2401_1), for example, the user #1 signal processor 102_2 in FIG. 1 generates a modulated signal to be transmitted to a terminal #2 (2401_2), for example, and the user #M signal processor 102_M in FIG. 1 generates a modulated signal to be transmitted to a terminal #M (2401_M), for example.

The base station (AP) 2400 generates a transmission directivity 2411_1, and the terminal #1 (2401_1) generates a reception directivity 2421_1. With use of the transmission directivity 2411_1 and the reception directivity 2421_1, the transmission signal for the terminal #1 transmitted by the base station (AP) 2400 is received by the terminal #1 (2401_1).

Also, the base station (AP) 2400 generates a transmission directivity 2411_2, and the terminal #2 (2401_2) generates a reception directivity 2421_2. With use of the transmission directivity 2411_2 and the reception directivity 2421_2, the transmission signal for the terminal #2 transmitted by the base station (AP) 2400 is received by the terminal #2 (2401_2).

The base station (AP) 2400 generates a transmission directivity 2411_M, and the terminal #M (2401_M) generates a reception directivity 2421_M. With use of the transmission directivity 2411_M and the reception directivity 2421_M, the transmission signal for the terminal #M transmitted by the base station (AP) 2400 is received by the terminal #M (2401_M).

In the example in FIG. 24, it is assumed that the base station (AP) 2400 transmits the modulated signal to the terminal #1, the modulated signal to the terminal #2, and the modulated signal to the terminal #M by using identical times and identical frequencies (bands). This point has been described in the first embodiment. FIG. 24 illustrates "transmits the modulated signal to the terminal #1, the modulated signal to the terminal #2, and the modulated signal to the terminal #M by using identical times and identical frequencies (bands)", but this is merely an example. The number of modulated signals transmitted by the base station (AP) 2400 by using identical times and identical frequencies (bands) is not limited to this example. In addition, there may be a time at which modulated signals are not multiplexed.

Figure 25:
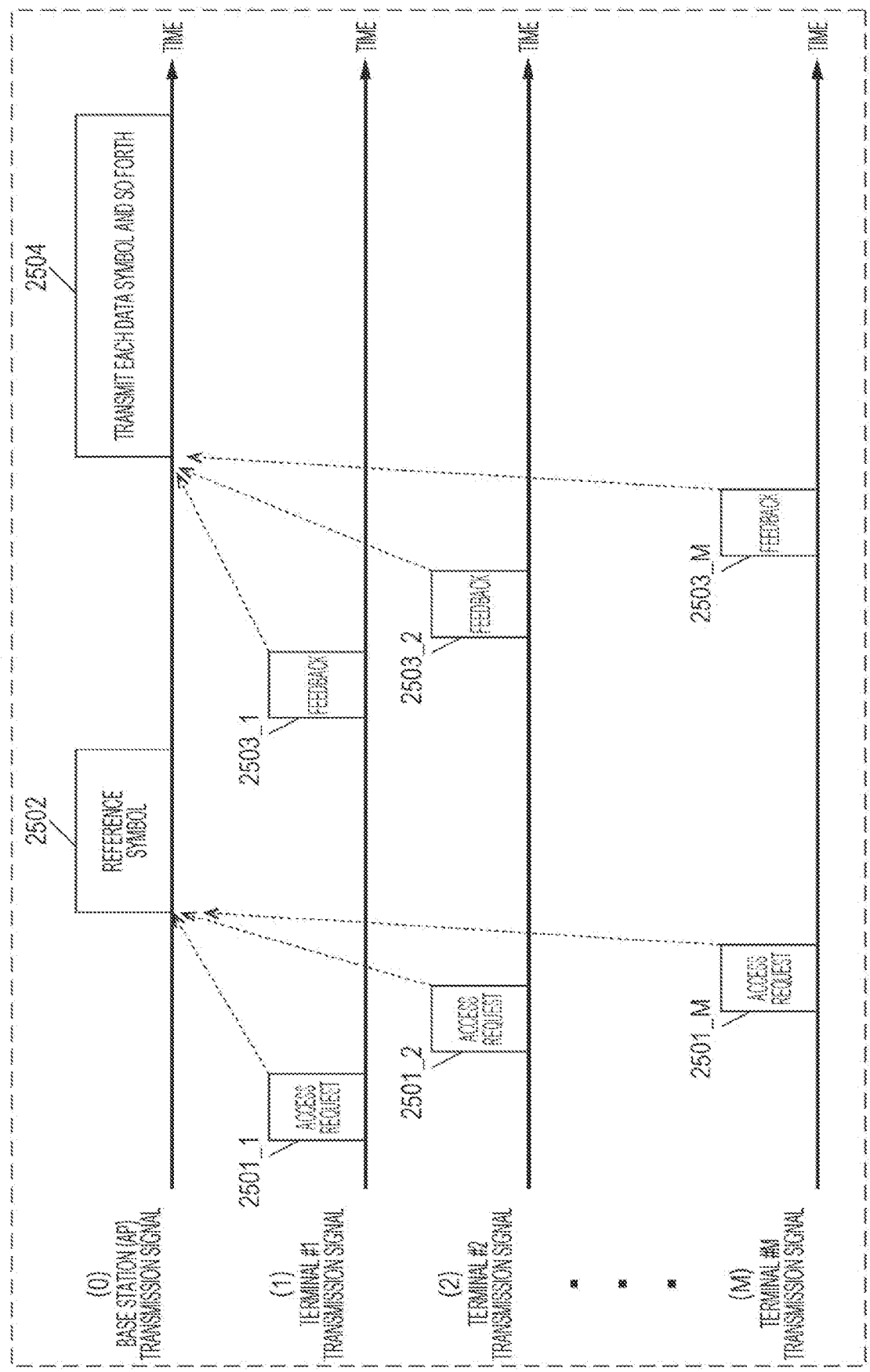
FIG. 25 is a diagram illustrating an example of a temporal flow of communication between the base station (AP) and the terminals.

FIG. 25 is a diagram illustrating an example of a temporal flow of communication between the base station (AP) and the terminals. FIG. 25 illustrates transmission signals of the base station (AP), transmission signals of the terminal #1, transmission signals of the terminal #2, and transmission signals of the terminal #M. The horizontal axis in FIG. 25 indicates time. A terminal other than the terminal #1, the terminal #2, and the terminal #M may transmit transmission signals.

As illustrated in FIG. 25, it is assumed that the terminal #1 issues an access request (transmission of data by the base station (AP)) 2501_1 to the base station (AP). Likewise, it is assumed that the terminal #2 issues an access request (transmission of data by the base station (AP)) 2501_2 to the base station (AP). It is assumed that the terminal #M issues an access request (transmission of data by the base station (AP)) 2501_M to the base station (AP).

It is assumed that the base station (AP) transmits a reference symbol (2502) in response to the access requests. For example, a PSK symbol that is known to the terminals is transmitted as the reference symbol 2502. However, the configuration of the reference symbol 2502 is not limited thereto. The reference symbol 2502 corresponds to the (common) reference signal 199 illustrated in FIG. 1.

Accordingly, the terminal #1 receives the reference symbol 2502 transmitted by the base station. Subsequently, for example, the terminal #1 estimates the reception state at each reception antenna of the terminal #1 and transmits information about the reception state at each reception antenna as feedback information 2503_1. Likewise, the terminal #2 receives the reference symbol 2502 transmitted by the base station. Subsequently, for example, the terminal #2 estimates the reception state at each reception antenna of the terminal #2 and transmits information about the reception state at each reception antenna as feedback information 2503_2. Likewise, the terminal #M receives the reference symbol 2502 transmitted by the base station. For example, the terminal #M estimates the reception state at each reception antenna of the terminal #M and transmits information about the reception state at each reception antenna as feedback information 2503_M.

The base station (AP) receives the pieces of feedback information transmitted by the individual terminals. For example, in FIG. 22, it is assumed that the control information 157 includes the pieces of feedback information transmitted by the individual terminals. The setter 158 in FIG. 22 receives the control information 157 including the pieces of feedback information transmitted by the individual terminals, decides the processing method to be performed by the multiplexing signal processor 104 in FIG. 1, and outputs the control signal 100 including this information.

Subsequently, the base station (AP) transmits each data symbol to each terminal (2504_1), for example, as illustrated in FIG. 25. Regarding "transmit each data symbol and so forth" 2504_1 illustrated in FIG. 25, symbols other than data symbols may exist, such as pilot symbols, control information symbols, reference symbols, and a preamble. The base station (AP) transmits modulated signals for individual terminals by using identical times and identical frequencies (bands). The details of this point have been described in the first embodiment.

Third Embodiment

In the first embodiment, a description has been given mainly of an example in which, when the transmission apparatus in FIG. 1 generates multiple modulated signals to be transmitted to the user #p, the phase changer 305B (see FIGS. 3 and 4) performs phase change on at least one modulated signal that has been subjected to precoding. In a third embodiment, a description will be given of processing in which the transmission apparatus in FIG. 1 switches, in accordance with the control signal 300, between "perform phase change and not perform phase change" in the phase changer 305B. Also, in the third embodiment, a description will be given of processing in which, when the transmission apparatus in FIG. 1 transmits a signal, the transmission scheme of the signal is changed on the basis of information received from a communication partner.

Hereinafter, a description will be given of a case where the base station (AP) including the transmission apparatus in FIG. 1 is communicating with terminals.

At this time, it is assumed that the base station (AP) is able to transmit multiple modulated signals including multiple streams of data to individual users (individual terminals) by using multiple antennas.

For example, it is assumed that the base station (AP) includes the transmission apparatus in FIG. 1 to transmit multiple modulated signals including multiple streams of data to the user #p (p is an integer from 1 to M) by using multiple antennas.

In FIG. 1, it is assumed that, when generating multiple modulated signals to be transmitted to the user #p, phase change is performed on at least one modulated signal that has been subjected to precoding. The operation for performing phase change has been described in the first embodiment, and thus the description thereof is omitted.

Here, it is assumed that the base station (AP) is able to switch between "perform phase change and not perform phase change" in accordance with a control signal when generating multiple modulated signals including multiple streams of data for the user #p. Specifically, it is assumed that it is possible to switch between "perform phase change and not perform phase change" in the phase changer 305B in FIG. 3 in accordance with the control signal 300. The operation for performing phase change has been described in the first embodiment. In the case of not performing phase change, the phase changer 305B outputs the signal 304B as 306B.

Thus, the following operations are performed in the case of performing phase change and in the case of not performing phase change.

Case of Performing Phase Change

The base station (AP) performs phase change on at least one modulated signal, and then transmits multiple modulated signals by using multiple antennas.

The method for performing phase change on at least one modulated signal and transmitting multiple modulated signals by using multiple antennas has been described in the first embodiment, for example.

Case of Not Performing Phase Change

The base station (AP) performs precoding (weight combining) on modulated signals (baseband signals) of multiple streams and transmits the generated multiple modulated signals by using multiple antennas. However, the precoder (weight combiner) need not necessarily perform precoding.

The base station (AP) transmits control information for notifying the terminal as a communication partner of the setting of performing or not performing phase change by using a preamble, for example.

As described above, "phase change is performed on at least one modulated signal". Specifically, a description has been given, with reference to FIG. 3, that phase change is performed on one modulated signal among multiple modulated signals. Now, a description will be given of the case of "performing phase change on multiple modulated signals" with reference to FIG. 26, instead of FIG. 3.

Figure 26:
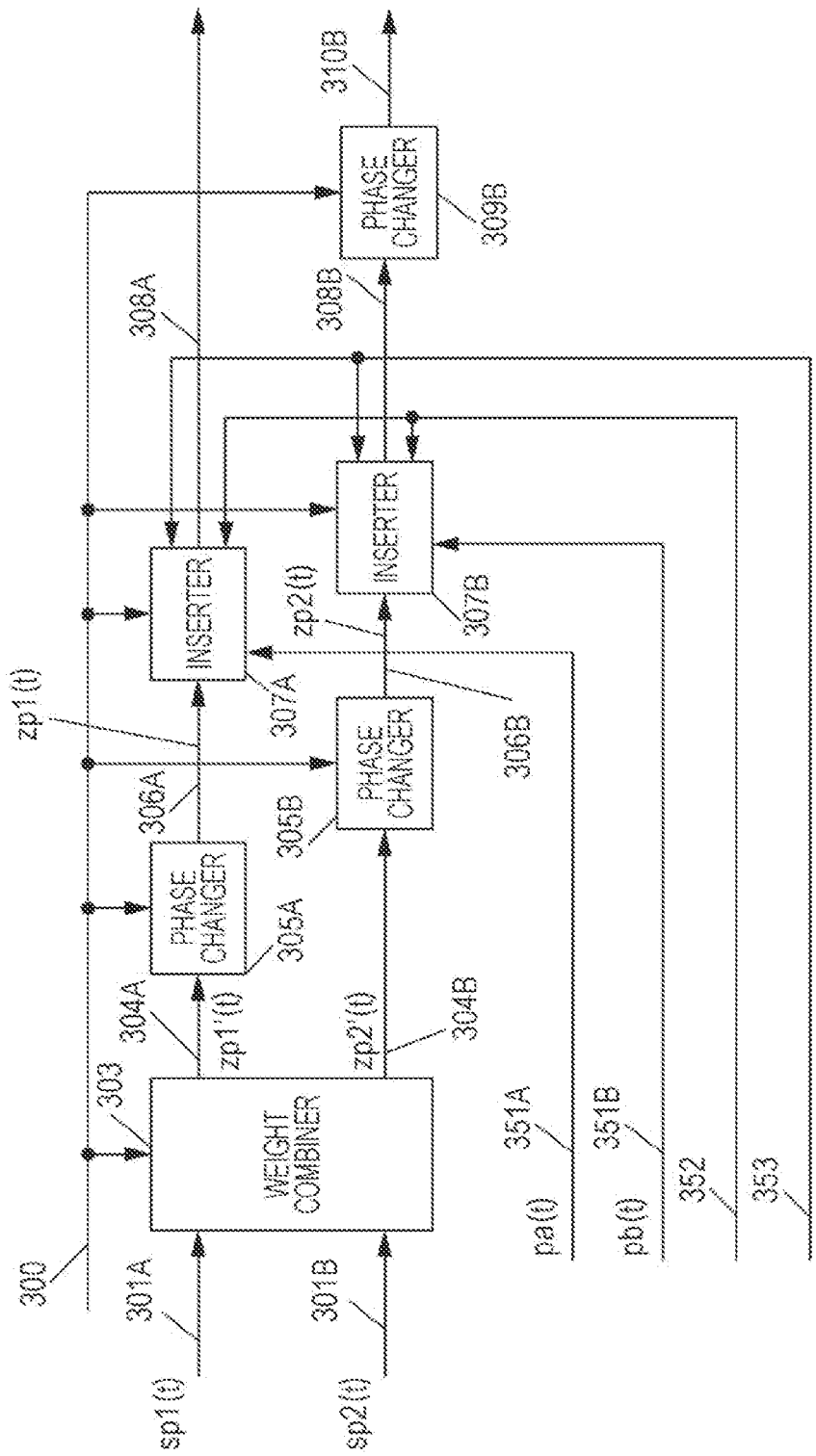
FIG. 26 is a diagram illustrating an example of the configuration of the signal processor in FIG. 2 different from FIG. 3.

FIG. 26 is a diagram illustrating an example of the configuration of the signal processor 206 in FIG. 2, different from the example in FIG. 3. In FIG. 26, a point different from FIG. 3 will be described.

A phase changer 305A receives the control signal 300. On the basis of the control signal 300, the phase changer 305A determines whether or not to perform phase change. In a case where the phase changer 305A determines to perform phase change, the phase changer 305A performs phase change on the user #p weighted signal 304A (zp1′(t)) and outputs a phase-changed signal 306A. In a case where the phase changer 305A determines not to perform phase change, the phase changer 305A outputs the signal 306A without performing phase change on the user #p weighted signal 304A (zp1′(t)).

In FIG. 26, zp1(i) and zp2(i) are based on Expression (3) as in the first embodiment. In a case where phase change is performed on zp1(i) and zp2(i) in FIG. 26, it can be expressed by the following Expression (42).

Expression (42)
$$\begin{pmatrix} zp1(i) \\ zp2(i) \end{pmatrix} = \begin{pmatrix} Y_p(i) & 0 \\ 0 & yp(i) \end{pmatrix} \begin{pmatrix} a & b \\ c & d \end{pmatrix} \begin{pmatrix} sp1(i) \\ sp2(i) \end{pmatrix}$$
$$= \begin{pmatrix} e^{j \times \lambda p(i)} & 0 \\ 0 & e^{j \times \delta p(i)} \end{pmatrix} \begin{pmatrix} a & b \\ c & d \end{pmatrix} \begin{pmatrix} sp1(i) \\ sp2(i) \end{pmatrix}$$

Here, λp(i) is a real number. Also, zp1(i) and zp2(i) are transmitted from the transmission apparatus at identical times and identical frequencies (identical frequency bands). The phase change in the phase changer 305A may be performed by using, for example, a method for changing the phase periodically or regularly.

In other embodiments such as the first embodiment and the second embodiment, each embodiment can be carried out even by using FIG. 26 instead of FIG. 3 as the configuration of the signal processor 206 in FIG. 2.

Next, a description will be given of communication between the base station (AP) and the terminal #p and processing based on data that is transmitted and received in the communication.

Figure 27:
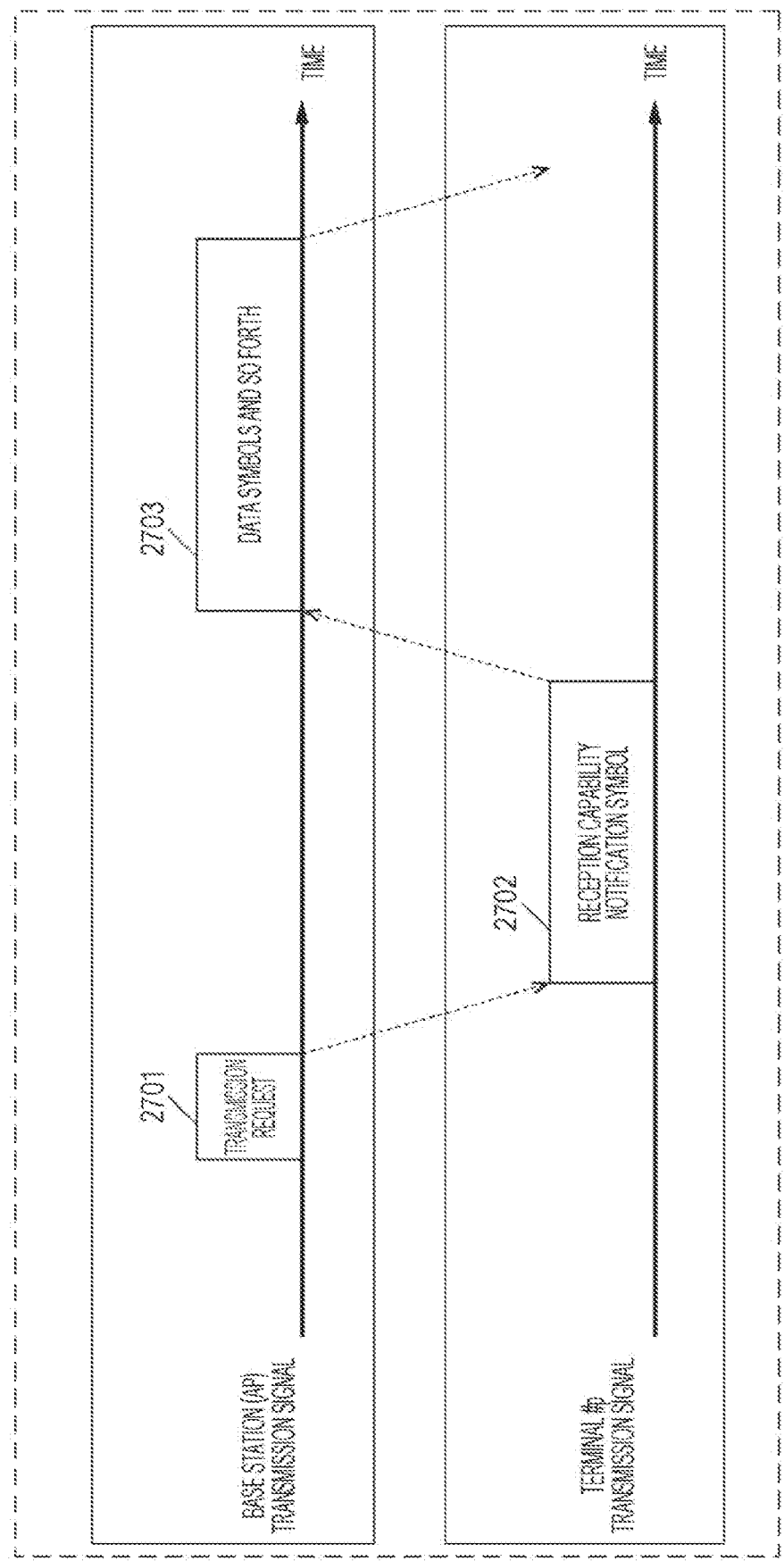
FIG. 27 is a diagram illustrating an example of communication between the base station (AP) and a terminal #p.

FIG. 27 is a diagram illustrating an example of communication between the base station (AP) and the terminal #p. FIG. 27 illustrates a state over time of a transmission signal from the base station (AP) and a state over time of a transmission signal from the terminal #p. In FIG. 27, the horizontal axis indicates time.

First, the base station (AP) transmits a transmission request 2701 indicating "request information for transmitting a modulated signal" to the terminal #p.

Subsequently, the terminal #p receives the transmission request 2701 transmitted by the base station (AP) and transmits a reception capability notification symbol 2702 indicating the reception capability of the terminal to the base station (AP).

The base station (AP) receives the reception capability notification symbol 2702 transmitted by the terminal #p, and decides an error-correcting coding method, a modulation scheme (or a set of modulation schemes), and a transmission method on the basis of the information of the reception capability notification symbol 2702. On the basis of these methods that have been decided, the base station (AP) performs error-correcting coding, mapping in the modulation scheme, and other signal processing (for example, precoding, phase change, and so forth) on the information (data) to be transmitted, and transmits a modulated signal 2703 including data symbols and so forth to the terminal #p.

The data symbols and so forth 2703 may include, for example, control information symbols. At this time, when transmitting data symbols by using "a transmission method for transmitting multiple modulated signals including multiple streams of data by using multiple antennas", a control symbol including information for notifying the communication partner whether phase change has been performed on at least one modulated signal or the foregoing phase change has not been performed may preferably be transmitted. Accordingly, the communication partner is able to easily change the demodulation method.

The terminal #p receives the data symbols and so forth 2703 transmitted by the base station and obtains data.

The communication between the base station (AP) and the terminal in FIG. 27 is performed by one or more terminals among the terminal #1 to the terminal #M and the base station (AP). The data symbols (including other symbols) transmitted to each terminal are transmitted by the base station by using identical times and identical frequencies (bands). This point has been described in the first embodiment, the second embodiment, and so forth.

Figure 28:
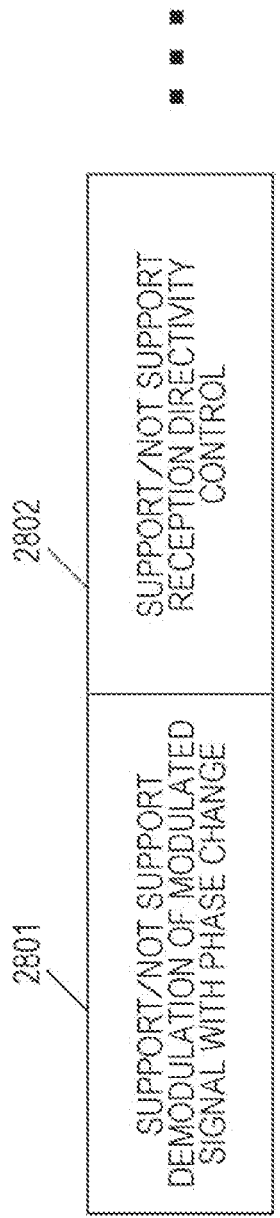
FIG. 28 is a diagram illustrating an example of data included in a reception capability notification symbol.

FIG. 28 is a diagram illustrating an example of data included in the reception capability notification symbol 2702 transmitted by the terminal #p in FIG. 27. The data included in the reception capability notification symbol 2702 is, for example, data indicating the reception capability of the terminal #p. The terminal #p transmits the data indicating the reception capability to the base station (AP), and thereby the base station (AP) is able to transmit a transmission signal corresponding to the reception capability to the terminal #p.

In FIG. 28, 2801 denotes data about "support/not support demodulation of modulated signal with phase change", and 2802 denotes data about "support/not support reception directivity control".

In the data 2801 about "support/not support demodulation of modulated signal with phase", "support demodulation of modulated signal with phase change" means the following.

"Support demodulation of modulated signal with phase change":
This means that, in a case where the base station (AP) performs phase change on at least one modulated signal and transmits multiple modulated signals (multiple modulated signals including multiple streams) by using multiple antennas, the terminal #p is able to receive and demodulate the modulated signals. That is, this means that the terminal #p is able to perform demodulation in consideration of phase change and to obtain data. The transmission method for performing phase change on at least one modulated signal and transmitting multiple modulated signals by using multiple antennas has already been described in an embodiment.

In the data 2801 about "support/not support demodulation of modulated signal with phase change", "not support demodulation of modulated signal with phase change" means the following.

"Not support demodulation of modulated signal with phase change":
This means that, in a case where the base station (AP) performs phase change on at least one modulated signal and transmits multiple modulated signals (multiple modulated signals including multiple streams) by using multiple antennas, the terminal #p is able to receive the modulated signals but is unable to demodulate the modulated signals. That is, this means that the terminal #p is unable to perform demodulation in consideration of phase change. The transmission method for performing phase change on at least one modulated signal and transmitting multiple modulated signals by using multiple antennas has already been described in an embodiment.

For example, it is assumed that the data 2801 about "support/not support demodulation of modulated signal with phase change" (hereinafter referred to as "data 2801") is expressed by 1-bit data. Also, it is assumed that, in a case where the terminal #p "supports phase change" as described above, the terminal #p transmits the data 2801 as "0". Also, it is assumed that, in a case where the terminal #p "does not support phase change" as described above, the terminal #p transmits the data 2801 as "1". The base station (AP) receives the data 2801 transmitted by the terminal #p.

In a case where the data 2801 indicates "support phase change" (i.e., the data 2801 is "0") and the base station (AP) decides to transmit modulated signals of multiple streams to the terminal #p by using multiple antennas (for example, in the case of deciding to generate multiple modulated signals for transmitting multiple streams in the user #p signal processor 102_p illustrated in FIG. 1), the base station (AP) may generate modulated signals addressed to the user #p by using either of Method #1 and Method #2 described below and transmit the modulated signals. Alternatively, the base station (AP) generates modulated signals addressed to the user #p by using Method #2 described below and transmits the modulated signals.

Method #1

The base station (AP) performs precoding (weight combining) on modulated signals (baseband signals) of multiple streams to be transmitted to the terminal #p and transmits the generated multiple modulated signals by using multiple antennas. At this time, phase change is not performed. However, the precoder (weight combiner) need not necessarily perform precoding, as described above.

Method #2

The base station (AP) performs phase change on at least one modulated signal among multiple modulated signals to be transmitted to the terminal #p. Subsequently, the base station (AP) transmits the multiple modulated signals to the terminal #p by using multiple antennas.

Here, it is important that the transmission methods selectable by the base station (AP) include Method #2. Thus, the base station (AP) may transmit the modulated signals by using a method other than Method #1 and Method #2.

On the other hand, in a case where the data 2801 indicates "not support phase change" (i.e., the data 2801 is "1") and the base station (AP) decides to transmit modulated signals of multiple streams to the terminal #p by using multiple antennas, the base station (AP) transmits the modulated signals to the terminal #p by using Method #1, for example.

Here, it is important that, when the base station (AP) transmits the modulated signals to the terminal #p, the transmission methods selectable by the base station (AP) do not include Method #2. Thus, the base station (AP) may transmit the modulated signals to the terminal #p by using a method that is different from Method #1 and that is not Method #2.

The reception capability notification symbol 2702 may include information other than the data 2801. For example, the reception capability notification symbol 2702 may include the data 2802 about "support/not support reception directivity control" indicating whether or not the reception apparatus of the terminal supports reception directivity control (hereinafter referred to as "data 2802"). Thus, the configuration of the reception capability notification symbol 2702 is not limited to that in FIG. 28.

For example, in a case where the terminal #p is able to perform reception directivity control, the data 2802 is set to "0". In a case where the terminal #p is unable to perform reception directivity control, the data 2802 is set to "1".

The terminal #p transmits the reception capability notification symbol 2702 including the data 2802, and the base station (AP) determines, on the basis of the reception capability notification symbol 2702, whether or not the terminal #p is able to perform reception directivity control. If the base station (AP) determines that the terminal #p "supports reception directivity control", the base station (AP) and the terminal #p may transmit training symbols, reference symbols, control information symbols, and so forth for reception directivity control of the terminal #p.

Figure 29:
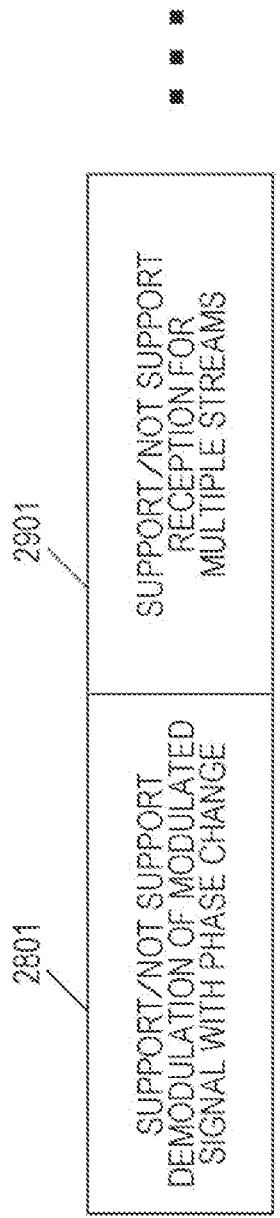
FIG. 29 is a diagram illustrating an example of data included in the reception capability notification symbol different from FIG. 28.

FIG. 29 is a diagram illustrating an example of data included in the reception capability notification symbol 2702 transmitted by the terminal #p in FIG. 27, different from the example in FIG. 28. The data 2801 is the same as that in FIG. 28.

Hereinafter, a description will be given of data 2901 about "support/not support reception for multiple streams" in FIG. 29.

In the data 2901 about "support/not support reception for multiple streams", "support reception for multiple streams" means the following.

"Support reception for multiple streams":
This means that, in a case where the base station (AP) transmits multiple modulated signals addressed to the terminal #p from multiple antennas to transmit multiple streams to the terminal #p, the terminal #p is able to receive and demodulate the multiple modulated signals addressed to the terminal #p and transmitted by the base station.

However, for example, in a case where the base station (AP) transmits multiple modulated signals addressed to the terminal #p from the multiple antennas, it is not concerned about whether or not phase change has been performed. That is, in a case where multiple transmission methods are defined as a transmission method in which the base station (AP) transmits multiple modulated signals addressed to the terminal #p by using multiple antennas to transmit multiple streams to the terminal #p, it is sufficient that there be at least one transmission method that allows the terminal #p to demodulate the modulated signals.

In the data 2901 about "support/not support reception for multiple streams", "not support reception for multiple streams" means the following.

"Not support reception for multiple streams":
In a case where multiple transmission methods are defined as a transmission method in which the base station transmits multiple modulated signals addressed to the terminal #p by using multiple antennas to transmit multiple streams to the terminal #p, the terminal is unable to demodulate the modulated signals even if the base station transmits the modulated signals by using any transmission method.

For example, it is assumed that the data 2901 about "support/not support reception for multiple streams" (hereinafter referred to as "data 2901") is expressed by 1-bit data. In a case where the terminal #p "supports reception for multiple streams", the terminal #p sets "0" as the data 2901. In a case where the terminal #p "does not support reception for multiple streams", the terminal #p sets "1" as the data 2901.

The base station (AP) performs phase change on at least one modulated signal among multiple modulated signals (multiple modulated signals including multiple streams). Thus, in a case where the terminal #p does not support reception for multiple streams, the base station (AP) is unable to transmit multiple modulated signals, and eventually is unable to perform phase change.

Thus, in a case where the terminal #p sets "0" as the data 2901, the data 2801 is valid. At this time, the base station (AP) decides, on the basis of the data 2801 and the data 2901, a transmission method for transmitting data.

In a case where the terminal #p sets "1" as the data 2901, the data 2801 is invalid. At this time, the base station (AP) decides, on the basis of the data 2901, a transmission method for transmitting data.

In the above-described manner, the terminal transmits the reception capability notification symbol 2702, and the base station (AP) decides, on the basis of the symbol, a transmission method for transmitting data. Accordingly, it is possible to reduce cases where data is transmitted by a transmission method that does not allow the terminal #p to perform demodulation, which is advantageous in that data can be appropriately transmitted to the terminal #p. Thus, the data transmission efficiency of the base station (AP) can be increased.

In addition, there is the data 2801 about "support/not support demodulation of modulated signal with phase change" as the reception capability notification symbol 2702. Thus, in a case where the terminal #p that supports phase change demodulation communicates with the base station (AP), the base station (AP) is able to appropriately select a mode in which "modulated signals are transmitted by using a transmission method that performs phase change". Accordingly, the terminal #p is able to obtain data of high reception quality even in an environment in which direct waves are dominant. In addition, in a case where the terminal #p that does not support phase change demodulation communicates with the base station (AP), the base station (AP) is able to appropriately select a transmission method that allows the terminal to perform reception. Accordingly, the data transmission efficiency can be increased.

FIG. 27 illustrates the transmission signal from the base station (AP) and the transmission signal from the terminal #p, but the transmission signals are not limited thereto. For example, the signal illustrated as the transmission signal from the base station (AP) in FIG. 27 may be the transmission signal from the terminal, and the signal illustrated as the transmission signal from the terminal #p in FIG. 27 may be the transmission signal from the base station (AP).

Alternatively, the signal illustrated as the transmission signal from the base station (AP) in FIG. 27 may be a transmission signal from a terminal other than the terminal #p. That is, the transmission and reception of the signals illustrated in FIG. 27 may be transmission and reception between terminals.

Alternatively, the transmission and reception of the signals illustrated in FIG. 27 may be transmission and reception between base stations (APs).

The transmission and reception is not limited to these examples, and any communication between communication apparatuses may be performed.

The data symbols in the data symbols and so forth 2703 in FIG. 27 may be a signal of a multi-carrier scheme such as OFDM or may be a signal of a single-carrier scheme. Likewise, the reception capability notification symbol 2702 in FIG. 27 may be a signal of a multi-carrier scheme such as OFDM or may be a signal of a single-carrier scheme.

For example, in a case where the reception capability notification symbol 2702 in FIG. 27 is of a single-carrier scheme, the terminal is able to reduce power consumption in the case of FIG. 27.

In the description given above, when the base station (AP) is communicating with multiple terminals, the base station (AP) receives reception capability notification symbols (see 2702) from the multiple terminals. At this time, each terminal transmits, as the "reception capability notification symbol", the data illustrated in FIGS. 28 or 29, for example, and the base station (AP) decides a transmission method for modulated signals for each terminal. When the base station (AP) transmits modulated signals to the multiple terminals, the base station (AP) transmits the modulated signals addresses to the individual terminals by using the methods described in the first embodiment and the second embodiment, for example.

Next, a description will be given of another example of the reception capability notification symbol 2702 with reference to FIG. 30.

FIG. 30 is a diagram illustrating an example of data included in the reception capability notification symbol 2702 transmitted by the terminal #p in FIG. 27, different from the examples in FIGS. 28 and 29. The data 2801 about "support/not support demodulation of modulated signal with phase change" is the same as those in FIGS. 28 and 29. Also, the data 2901 about "support/not support reception for multiple streams" is the same as that in FIG. 29.

A description will be given of data 3001 about "supported schemes" (hereinafter referred to as "data 3001") in FIG. 30. It is assumed that the transmission of modulated signals to the terminals by the base station (AP) and the transmission of modulated signals to the base station (AP) by the terminals in FIG. 24 are the transmission of modulated signals in a communication scheme in a specific frequency (band). Also, it is assumed that a communication scheme #A and a communication scheme #B exist as examples of the "communication scheme in a specific frequency (band)".

It is assumed that "communication scheme #A" does not support a "scheme for transmitting multiple modulated signals including multiple streams by using multiple antennas". That is, there is no option of a "scheme for transmitting multiple modulated signals including multiple streams by using multiple antennas" as "communication scheme #A". In addition, it is assumed that "communication scheme #B" supports a "scheme for transmitting multiple modulated signals including multiple streams by using multiple antennas". That is, the "scheme for transmitting multiple modulated signals including multiple streams by using multiple antennas" is selectable as "communication scheme #B".

For example, it is assumed that the data 3001 is made up of 2 bits. Also, it is assumed that the 2-bit data is set as follows.

. In a case where the terminal #p supports only "communication scheme #A", the data 3001 is set to "01". In a case where the data 3001 is set to "01", even if the base station (AP) transmits a modulated signal of "communication scheme #B", the terminal #p is unable to demodulate the modulated signal and obtain data.

In a case where the terminal #p supports only "communication scheme #B", the data 3001 is set to "10". In a case where the data 3001 is set to "10", even if the base station (AP) transmits a modulated signal of "communication scheme #A", the terminal #p is unable to demodulate the modulated signal and obtain data.

In a case where the terminal #p supports both "communication scheme #A" and "communication scheme #B", the data 3001 is set to "11".

Next, a description will be given of data 3002 about "support/not support multi-carrier scheme" (hereinafter referred to as data 3002) in FIG. 30. It is assumed that "communication scheme #A" is able to select a "single-carrier scheme" or a "multi-carrier scheme such as the OFDM scheme" as a transmission method for modulated signals. Also, it is assumed that "communication scheme #B" is able to select a "single-carrier scheme" or a "multi-carrier scheme such as the OFDM scheme" as a transmission method for modulated signals.

For example, it is assumed that the data 3002 is made up of 2 bits. Also, it is assumed that the 2-bit data is set as follows.

In a case where the terminal #p supports only "single-carrier scheme", the data 3002 is set to "01". In a case where the data 3002 is set to "01", even if the base station (AP) transmits a modulated signal of "multi-carrier scheme such as the OFDM scheme", the terminal #p is unable to demodulate the modulated signal and obtain data.

In a case where the terminal #p supports only "multi-carrier scheme such as the OFDM scheme", the data 3002 is set to "10". In a case where the data 3002 is set to "10", even if the base station (AP) transmits a modulated signal of "single-carrier scheme", the terminal #p is unable to demodulate the modulated signal and obtain data.

In a case where the terminal #p supports both "single-carrier scheme" and "multi-carrier scheme such as the OFDM scheme", the data 3002 is set to "11".

Next, a description will be given of data 3003 about "supported error-correcting coding schemes" (hereinafter referred to as data 3003) in FIG. 30. For example, it is assumed that "error-correcting coding scheme #C" is an "error-correcting coding method that supports one or more coding rates with a code length (block length) of c bits (c is an integer equal to or greater than 1)". It is assumed that "error-correcting coding scheme #D" is an "error-correcting coding method that supports one or more coding rates with a code length (block length) of d bits (d is an integer equal to or greater than 1 and is greater than c (d>c))". As a method that supports one or more coding rates, an error-correcting code that varies according to a coding rate may be used, or one or more coding rates may be supported by puncturing. In addition, one or more coding rates may be supported by both of them.

It is assumed that only "error-correcting coding scheme #C" is selectable in "communication scheme #A" and that "error-correcting coding scheme #C" and "error-correcting coding scheme #D" are selectable in "communication scheme #B".

For example, it is assumed that the data 3003 is made up of 2 bits. Also, it is assumed that the 2-bit data is set as follows.

In a case where the terminal #p supports only "error-correcting coding scheme #C", the data 3003 is set to "01". In a case where the data 3003 is set to "01", even if the base station (AP) generates and transmits a modulated signal by using "error-correcting coding scheme #D", the terminal #p is unable to demodulate and decode the modulated signal and obtain data.

In a case where the terminal #p supports only "error-correcting coding scheme #D", the data 3003 is set to "10". In a case where the data 3003 is set to "10", even if the base station (AP) generates and transmits a modulated signal by using "error-correcting coding scheme #C", the terminal #p is unable to demodulate and decode the modulated signal and obtain data.

In a case where the terminal #p supports both "error-correcting coding scheme #C" and "error-correcting coding scheme #D", the data 3003 is set to "11".

The base station (AP) receives the reception capability notification symbol 2702 that is transmitted by the terminal #p and that has the configuration illustrated in FIG. 30, for example. Subsequently, the base station (AP) decides a method for generating modulated signals including data symbols addressed to the terminal #p on the basis of the content of the reception capability notification symbol 2702, and transmits the modulated signals addressed to the terminal #p.

Characteristic points at this time will be described.

Example 1

In a case where the terminal #p transmits the data 3001 set to "01" (i.e., "communication scheme #A" is supported), the base station (AP) that has obtained the data determines that the data 3003 is invalid because "error-correcting coding scheme #D" is not selectable in "communication scheme #A". When generating modulated signals addressed to the terminal #p, the base station (AP) performs error-correcting coding by using "error-correcting coding scheme #C".

Example 2

In a case where the terminal #p transmits the data 3001 set to "01" (i.e., "communication scheme #A" is supported), the base station (AP) that has obtained the data determines that the data 2801 and the data 2901 are invalid because the "scheme for transmitting multiple modulated signals including multiple streams by using multiple antennas" is not supported in "communication scheme #A". When generating modulated signals addressed to the terminal, the base station (AP) generates a modulated signal of a single stream and transmits it.

In addition to the above, a case with the following constraints will be discussed. Constraint condition 1: In "communication scheme #B", it is assumed that, in the single-carrier scheme, in the "scheme for transmitting multiple modulated signals including multiple streams by using multiple antennas", the scheme for "performing phase change on at least one modulated signal among multiple modulated signals" is not supported (other schemes may be supported), and that, in the multi-carrier scheme such as the OFDM scheme, at least the scheme for "performing phase change on at least one modulated signal among multiple modulated signals" is supported (other schemes may be supported).

In this case, the following arises.

Example 3

In a case where the terminal #p transmits the data 3002 set to "01" (i.e., only the single-carrier scheme is supported), the base station (AP) that has obtained the data determines that the data 2801 is invalid. When generating modulated signals addressed to the terminal #p, the base station (AP) does not use the scheme for "performing phase change on at least one modulated signal among multiple modulated signals".

FIG. 30 is an example of the reception capability notification symbol 2702 transmitted by the terminal #p. As described above by using FIG. 30, in a case where the terminal #p transmits multiple pieces of reception capability information (for example, the data 2801, the data 2901, the data 3001, the data 3002, and the data 3003 in FIG. 30), the base station (AP) may need to determine that some of the multiple pieces of reception capability information are invalid when deciding a method for generating modulated signals addressed to the terminal #p on the basis of the reception capability notification symbol 2702. In consideration of this, if the terminal #p bundles the multiple pieces of reception capability information and transmits it as the reception capability notification symbol 2702, the base station (AP) is able to easily decide the generation of the modulated signals addressed to the terminal #p in a short processing time.

The data structure descried in the third embodiment is merely an example and is not limited thereto. In addition, the number of bits of each piece of data and a bit setting method are not limited to the examples described in the third embodiment.

Fourth Embodiment

In the first embodiment, the second embodiment, and the third embodiment, a description has been given that either of the case of generating multiple modulated signals including multiple streams and the case of generating a modulated signal of a single stream is possible in the user #p signal processor 102_*p* (p is an integer from 1 to M) in FIG. 1. In a fourth embodiment, a description will be given of another example of the configuration of the user #p signal processor 102_*p* at this time.

Figure 31:
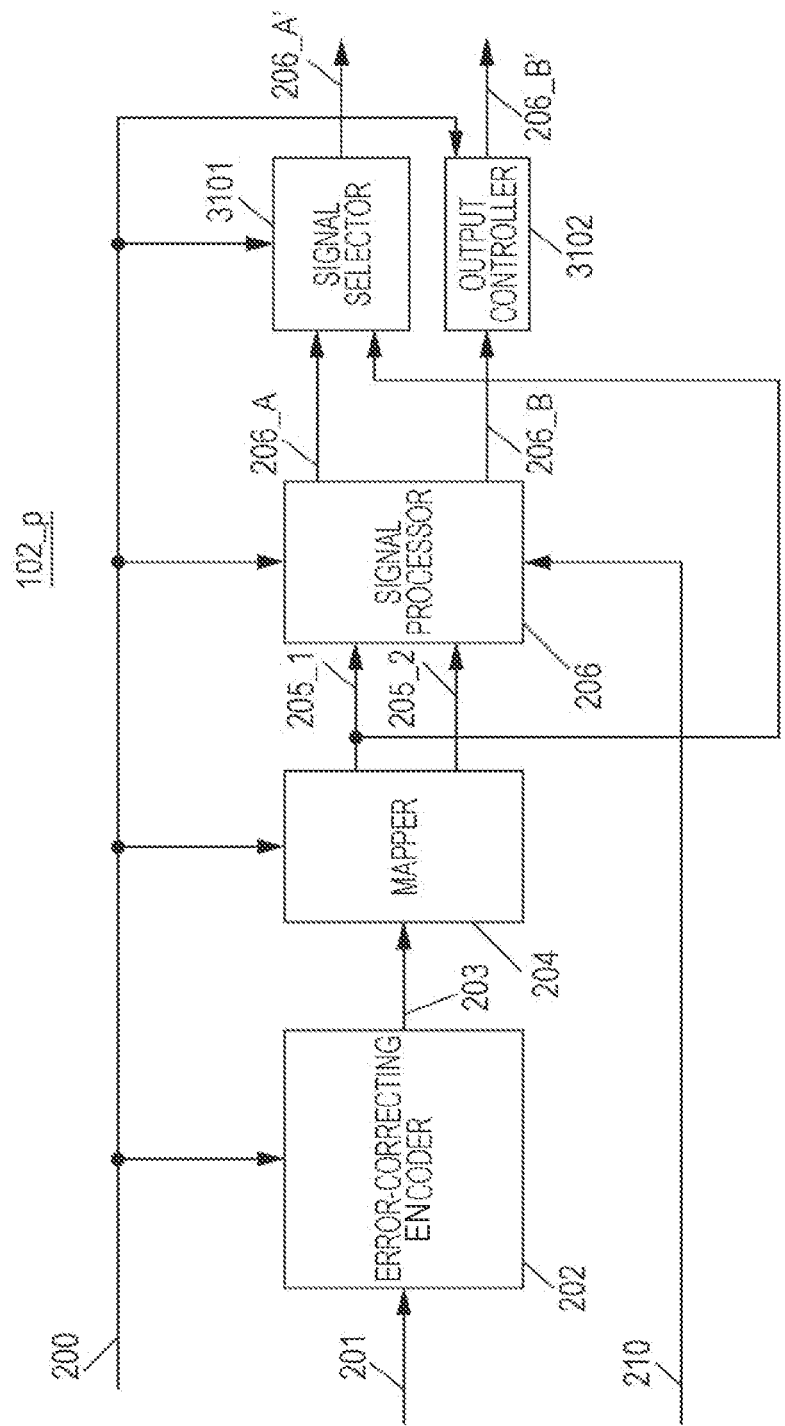
FIG. 31 is a diagram illustrating an example of the configuration of the signal processor for the user #p.

FIG. 31 is a diagram illustrating an example of the configuration of the user #p signal processor 102_*p*. In FIG. 31, the elements that operate similarly to those in FIG. 2 are denoted by the same numerals. In FIG. 31, the detailed operation of the signal processor 206 has been described in the first embodiment and thus the description thereof is omitted. Hereinafter, characteristic operations will be described.

It is assumed that the control signal 200 includes information indicating which of the "method for transmitting a modulated signal of a single stream" and the "method for transmitting multiple modulated signals including multiple streams" is to be used in each user signal processor.

In a case where generation of modulated signals using the "method for transmitting multiple modulated signals including multiple streams" is designated by the control signal 200 in the user #p signal processor 102_*p*, the signal processor 206 generates multiple modulated signals including multiple streams, outputs a user #p processed signal 206_A to a signal selector 3101, and outputs a user #p processed signal 206_B to an output controller 3102.

The signal selector 3101 receives the control signal 200, the user #p processed signal 206_A, and the mapped signal 205_1. Since the generation of modulated signals using the "method for transmitting multiple modulated signals including multiple streams" is designated by the control signal 200, the signal selector 3101 outputs the user #p processed signal 206_A as a selected signal 206_A′. The selected signal 206_A′ corresponds to the user #p first baseband signal 103_*p*_1 in FIG. 1.

The output controller 3102 receives the control signal 200 and the user #p processed signal 206_B. Since the generation of modulated signals using the "method for transmitting multiple modulated signals including multiple streams" is designated by the control signal 200, the output controller 3102 outputs the user #p processed signal 206_B as an output signal 206_B′. The output signal 206_B′ corresponds to the user #p second baseband signal 103_*p*_2 in FIG. 1.

In the user #p signal processor 102_*p*, in a case where the generation of a modulated signal using the "method for transmitting a modulated signal of a single stream" is designated by the control signal 200, the signal processor 206 does not operate.

In addition, the mapper 204 does not output the mapped signal 205_2.

The signal selector 3101 receives the control signal 200, the user #p processed signal 206_A, and the mapped signal 205_1. Since the generation of a modulated signal using the "method for transmitting a modulated signal of a single stream" is designated by the control signal 200, the signal selector 3101 outputs the mapped signal 205_1 as the selected signal 206_A′. The selected signal 206_A′ corresponds to the user #p first baseband signal 103_*p*_1 in FIG. 1.

The output controller 3102 receives the control signal 200 and the user #p processed signal 206_B. Since the generation of a modulated signal using the "method for transmitting a modulated signal of a single stream" is designated by the control signal 200, the output controller 3102 does not output the output signal 206_B′.

With the above-described operation, in the user #p signal processor 102_*p* in FIG. 1, outputting of a modulated signal can be realized in either of the case of generating multiple modulated signals including multiple streams and the case of generating a modulated signal of a single stream.

A description has been given that either of the case of generating multiple modulated signals including multiple streams and the case of generating a modulated signal of a single stream is possible in the user #p signal processor 102_*p* (p is an integer from 1 to M) in FIG. 1. Now, with reference to FIG. 32, a description will be given of an example of the configuration of the user #p signal processor 102_*p* different from the example in FIG. 31.

Figure 32:
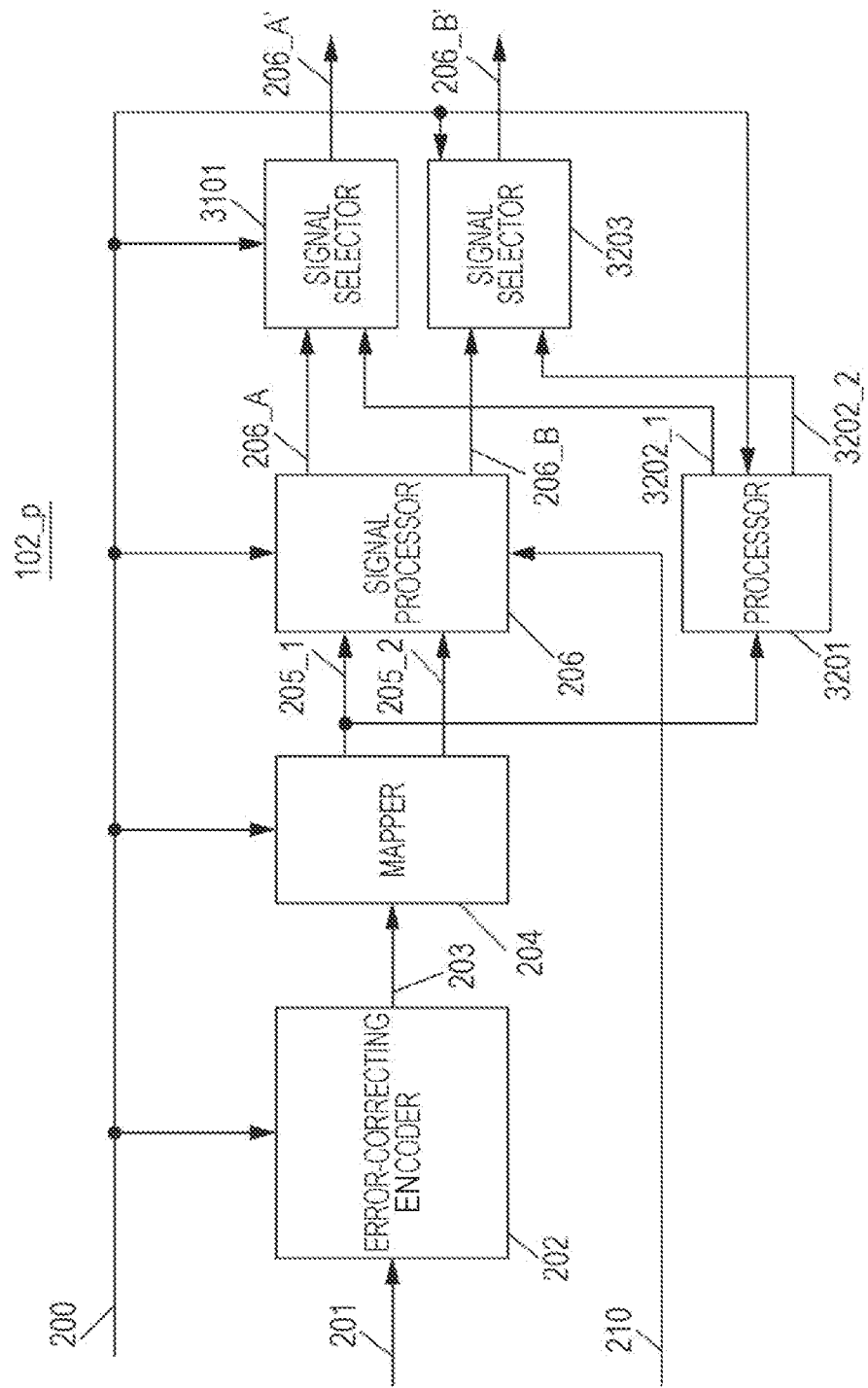
FIG. 32 is a diagram illustrating an example of the configuration of the signal processor for the user #p.
Figure 33:
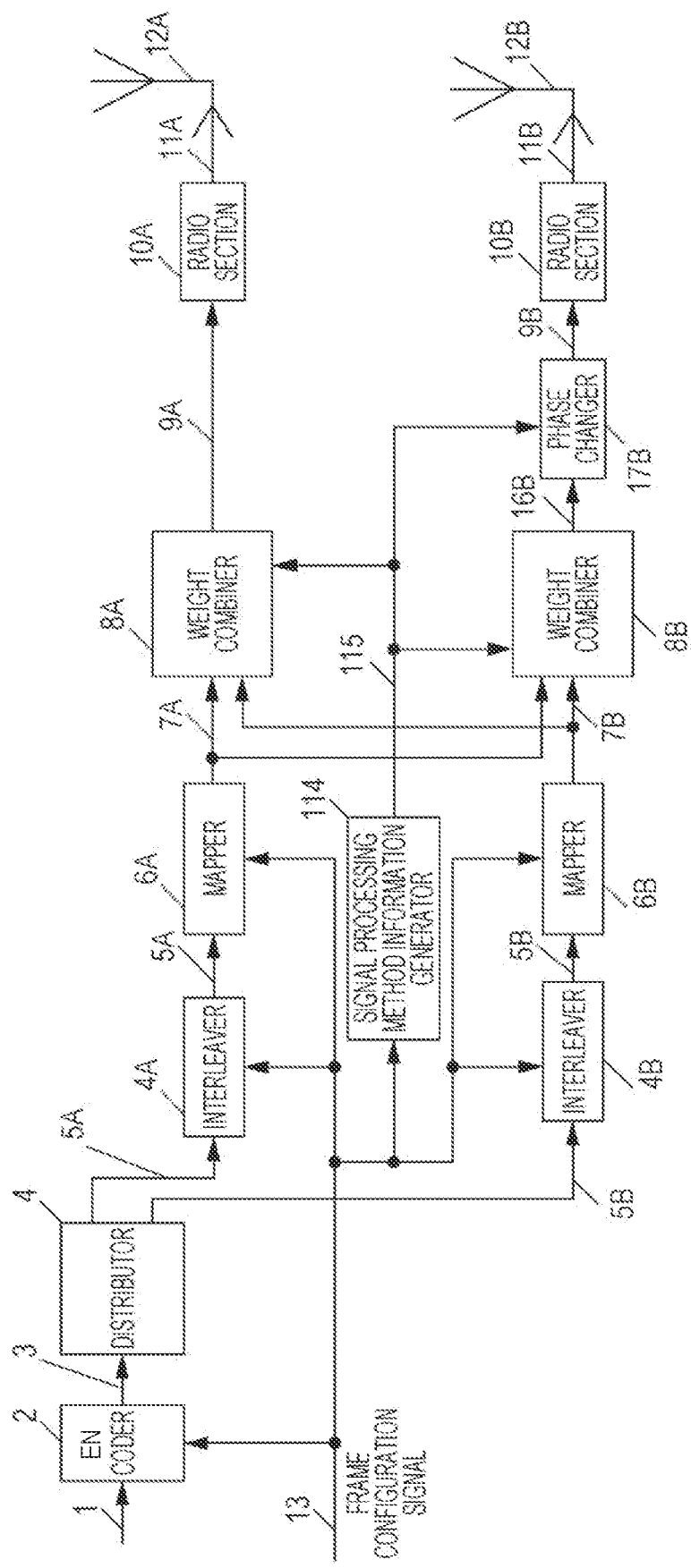
FIG. 33 is a diagram illustrating an example of the configuration of a transmission apparatus that is based on the DVB-NGH standard described in "MIMO for DVB-NGH, the next generation mobile TV broadcasting," IEEE Commun. Mag., vol. 57, no. 7, pp. 130-137, July 2013.

FIG. 32 is a diagram illustrating an example of the configuration of the user #p signal processor 102_*p*. The elements similar to those in FIGS. 2 and 31 are denoted by the same numerals. In FIG. 32, the detailed operation of the signal processor 206 has been described in the first embodiment, and thus the description thereof is omitted. Hereinafter, characteristic operations will be described.

It is assumed that the control signal 200 includes information indicating whether the "scheme for transmitting a modulated signal of a single stream" or the "scheme for transmitting multiple modulated signals including multiple streams" is to be used in each user signal processor.

In a case where the generation of modulated signals using the "method for transmitting multiple modulated signals including multiple streams" is designated by the control signal 200 in the user #p signal processor 102_*p*, the signal processor 206 operates, generates multiple modulated signals including multiple streams, and outputs the user #p processed signals 206_A and 206_B.

The signal selector 3101 receives the control signal 200, the user #p processed signal 206_A, and a processed signal 3202_1. Since the generation of modulated signals using the "method for transmitting multiple modulated signals including multiple streams" is designated by the control signal 200, the signal selector 3101 outputs the user #p processed signal 206_A as the selected signal 206_A′. The selected signal 206_A′ corresponds to the user #p first baseband signal 103_*p*_1 in FIG. 1.

A signal selector 3203 receives the control signal 200, the user #p processed signal 206_B, and a processed signal 3202_2. Since the generation of modulated signals using the "method for transmitting multiple modulated signals including multiple streams" is designated by the control signal 200, the signal selector 3203 outputs the user #p processed signal 206_B as the selected signal 206_B′. The selected signal 206_B′ corresponds to the user #p second baseband signal 103_*p*_2 in FIG. 1.

In the user #p signal processor 102_*p*, in a case where the generation of a modulated signal using the "method for transmitting a modulated signal of a single stream" is designated by the control signal 200, the signal processor 206 does not operate.

In addition, the mapper 204 does not output the mapped signal 205_2.

A processor 3201 receives the control signal 200 and the mapped signal 205_1. Since the generation of a modulated signal using the "method for transmitting a modulated signal of a single stream" is designated by the control signal 200, the processor 3201 generates and outputs processed signals 3202_1 and 3202_2 corresponding to the mapped signal 205_1. At this time, it is assumed that the data included in the mapped signal 205_1 is identical to the data included in the processed signal 3202_1, and the data included in the mapped signal 205_1 is identical to the data included in the processed signal 3202_2.

The signal selector 3101 receives the control signal 200, the user #p processed signal 206_A, and the processed signal 3202_1. Since the generation of a modulated signal using the "method for transmitting a modulated signal of a single stream" is designated by the control signal 200, the signal selector 3101 outputs the processed signal 3202_1 as the selected signal 206_A'. The selected signal 206_A' corresponds to the user #p first baseband signal 103_p_1 in FIG. 1.

The signal selector 3203 receives the control signal 200, the user #p processed signal 206_B, and the processed signal 3202_2. Since the generation of a modulated signal using the "method for transmitting a modulated signal of a single stream" is designated by the control signal 200, the signal selector 3203 outputs the processed signal 3202_2 as the selected signal 206_B'. The selected signal 206_B' corresponds to the user #p second baseband signal 103_p_2 in FIG. 1.

A description has been given above of operation examples in the case of generating multiple modulated signals including multiple streams and the case of generating a modulated signal of a single stream in the user #p signal processor 102_p (p is an integer from 1 to M) in FIG. 1 by using two example configurations. In the signal processors for individual users in FIG. 1, either of the above described generation of multiple modulated signals including multiple streams and generation of a modulated signal of a single stream may be performed. In addition, as described in the first embodiment and so forth, the signal processors for users in FIG. 1 do not necessarily output modulated signals.

First Supplement

In Expression (1) to Expression (42), an expression of a function of i (symbol number) is included. With reference to FIGS. 12 to 17, a description has been given that symbols may be arranged in the time-axis direction, the frequency-axis direction, or the time-axis and frequency-axis directions. Thus, an expression described as a function of i in Expression (1) to Expression (42) may be interpreted as a function of time, interpreted as a function of frequency, or interpreted as a function of time and frequency.

In this specification, for example, it is assumed that the transmission apparatus in FIG. 1 is able to generate and transmit "modulated signals using the OFDM scheme and modulated signals of a single-carrier scheme in a specific frequency band". At this time, in a case where the transmission apparatus in FIG. 1 transmits multiple modulated signals (baseband signals) for a certain user and performs phase change as described in this specification, setting may be performed so that the period of phase change in the case of using the OFDM scheme is different from the period of phase change in the case of using the single-carrier scheme. Since the frame configurations are different, it may be preferable to perform setting so that the periods are different. However, the period of phase change in the case of using the OFDM scheme may be identical to the period of phase change in the case of using the single-carrier scheme.

In addition, the user #1 signal processor 102_1 to the user #M signal processor 102_M in FIG. 1 may generate modulated signals of a single-carrier or may generate modulated signals of a multi-carrier scheme such as the OFDM scheme, for example. Thus, single-carrier modulated signals and multi-carrier modulated signals such as the OFDM scheme may be transmitted from the transmission apparatus in FIG. 1 by using identical times and identical frequencies (frequency bands that overlap each other at least partially).

For example, the user #1 signal processor 102_1 may generate the user #1 baseband signal 103_1_1 corresponding to a modulated signal of the single-carrier scheme and the user #1 baseband signal 103_1_2 corresponding to a modulated signal of the single-carrier scheme, the user #2 signal processor 102_2 may generate the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme, and the transmission apparatus in FIG. 1 may transmit "the user #1 baseband signal 103_1_1 corresponding to a modulated signal of the single-carrier scheme and the user #1 baseband signal 103_1_2 corresponding to a modulated signal of the single-carrier scheme" and "the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme" at identical times and identical frequencies (frequency bands that overlap each other at least partially). At this time, "the user #1 baseband signal 103_1_1 corresponding to a modulated signal of the single-carrier scheme and the user #1 baseband signal 103_1_2 corresponding to a modulated signal of the single-carrier scheme" may be baseband signals generated by using any of the methods: "perform precoding and phase change", "perform precoding", "not perform precoding but perform phase change", and "perform neither precoding nor phase change". Likewise, "the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme" may be baseband signals generated by using any of the methods: "perform precoding and phase change", "perform precoding", "not perform precoding but perform phase change", and "perform neither precoding nor phase change".

For another example, the user #1 signal processor 102_1 may generate a baseband signal of a single stream of the single-carrier scheme, the user #2 signal processor 102_2 may generate the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme, and the transmission apparatus in FIG. 1 may transmit "the baseband signal of a single stream of the single-carrier scheme" and "the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme" at identical times and identical frequencies (frequency bands that overlap each other at least partially). At this time, "the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme" may be baseband signals generated by using any of the methods: "perform precoding and phase change", "perform precoding", "not perform precoding but perform phase change", and "perform neither precoding nor phase change".

For another example, the user #1 signal processor 102_1 may generate the user #1 baseband signal 103_1_1 corresponding to a modulated signal of the single-carrier scheme and the user #1 baseband signal 103_1_2 corresponding to a modulated signal of the single-carrier scheme, the user #2 signal processor 102_2 may generate a baseband signal of a single stream of the multi-carrier scheme such as the OFDM scheme, and the transmission apparatus in FIG. 1 may transmit "the user #1 baseband signal 103_1_1 corresponding to a modulated signal of the single-carrier scheme and the user #1 baseband signal 103_1_2 corresponding to a modulated signal of the single-carrier scheme" and "the baseband signal of a single stream of the multi-carrier scheme such as the OFDM scheme" at identical times and identical frequencies (frequency bands that overlap each other at least partially). At this time, "the user #2 baseband signal 103_2_1 corresponding to a modulated signal of the multi-carrier scheme such as the OFDM scheme and the user #2 baseband signal 103_2_2 corresponding to a modulated signal of the multi-carrier scheme such as the OFDM scheme" may be baseband signals generated by using any of the methods: "perform precoding and phase change", "perform precoding", "not perform precoding but perform phase change", and "perform neither precoding nor phase change".

For another example, the user #1 signal processor 102_1 may generate a baseband signal of a single stream of the single-carrier scheme, the user #2 signal processor 102_2 may generate a baseband signal of a single stream of the multi-carrier scheme such as the OFDM scheme, and the transmission apparatus in FIG. 1 may transmit "the baseband signal of a single stream of the single-carrier scheme" and "the baseband signal of a single stream of the multi-carrier scheme such as the OFDM scheme" at identical times and identical frequencies (frequency bands that overlap each other at least partially).

FIGS. 2 and 31 illustrate the configurations in which each user signal processor includes one error-correcting encoder and one mapper, but the configuration is not limited thereto. For example, a configuration including a first error-correcting encoder and a first mapper for generating the user #p mapped signal (baseband signal) 205_1 for transmitting first data, and including a second error-correcting encoder and a second mapper for generating the user #p mapped signal (baseband signal) 205_2 for transmitting second data may be adopted. Alternatively, the number of error-correcting encoders and the number of mappers may be three.

Fifth Embodiment

Figure 34:
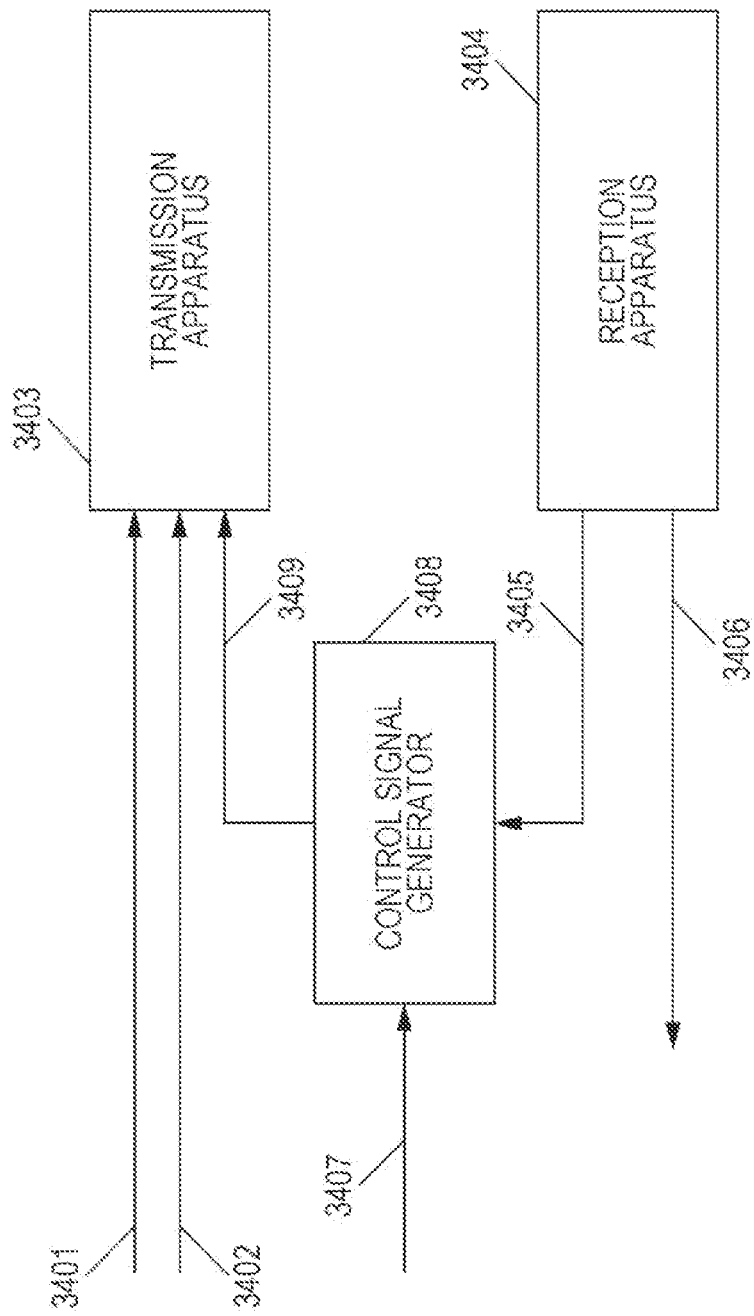
FIG. 34 is a diagram illustrating an example of the configuration of the terminal #p as a communication partner of the base station illustrated in FIG. 24.

In the present embodiment, a description will be given of an example operation of a terminal by using the example described in the third embodiment. FIG. 34 is a diagram illustrating an example of the configuration of the terminal #p as a communication partner of the base station in FIG. 24. The terminal #p includes a transmission apparatus 3403, a reception apparatus 3404, and a control signal generator 3408.

The transmission apparatus 3403 receives data 3401, a signal group 3402, and a control signal 3409. The transmission apparatus 3403 generates a modulated signal corresponding to the data 3401 and the signal group 3402 and transmits the modulated signal from its antenna.

The reception apparatus 3404 receives a modulated signal transmitted by a communication partner, for example, the base station, performs signal processing, demodulation, and decoding on the modulated signal, and outputs a control information signal 3405 and reception data 3406 from the communication partner.

The control signal generator 3408 receives the control information signal 3405 from the communication partner and a setting signal 3407. On the basis of these pieces of information, the control signal generator 3408 generates the control signal 3409 and outputs it to the transmission apparatus 3403.

Figure 35:
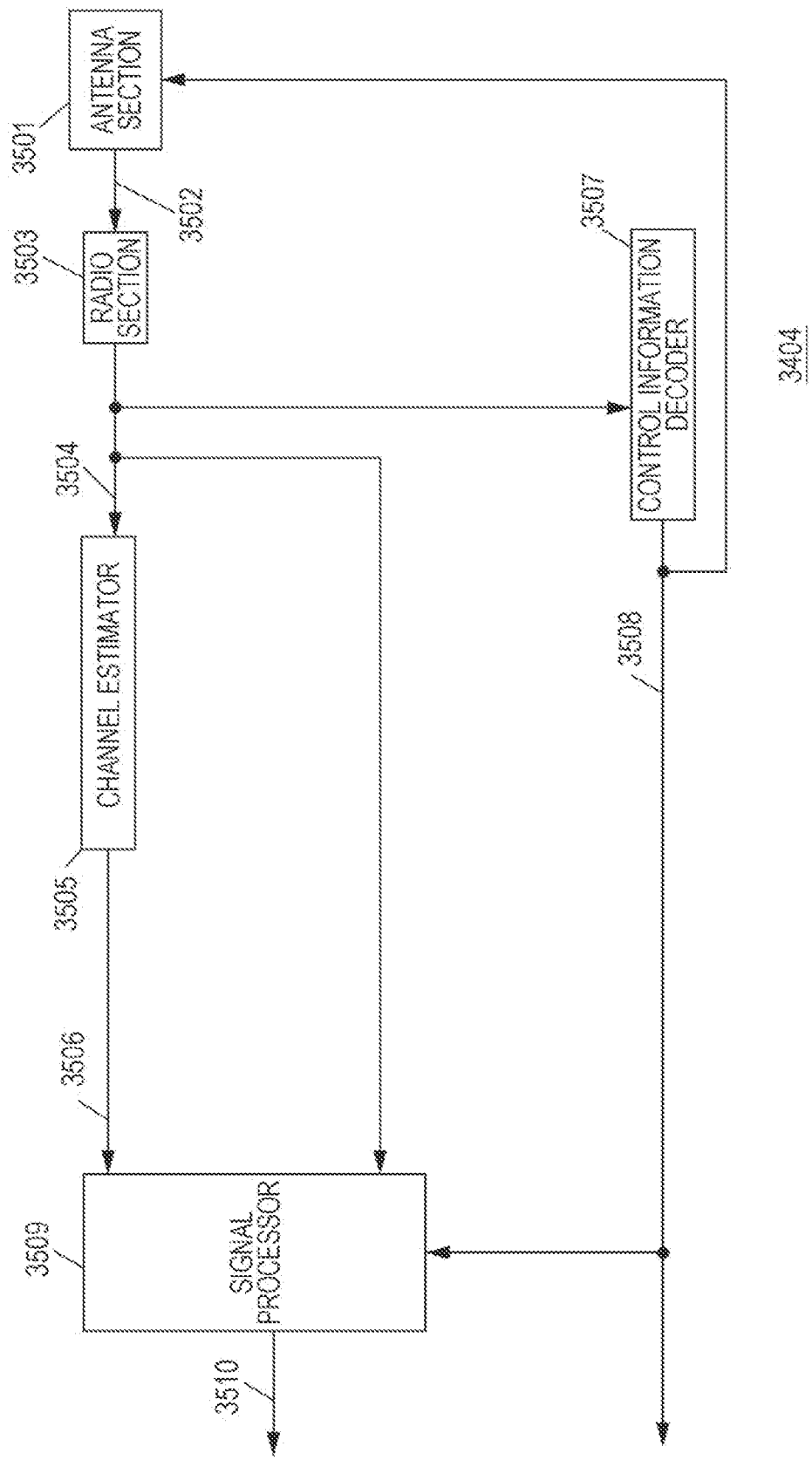
FIG. 35 is a diagram illustrating an example of the configuration of the reception apparatus of the terminal #p illustrated in FIG. 34.

FIG. 35 is a diagram illustrating an example of the configuration of the reception apparatus 3404 of the terminal #p illustrated in FIG. 34. The reception apparatus 3404 includes an antenna section 3501, a radio section 3503, a channel estimator 3505, a signal processor 3509, and a control information decoder 3507.

The radio section 3503 receives a reception signal 3502 received by the antenna section 3501. The radio section 3503 performs processing such as frequency conversion on the reception signal 3502 to generate a baseband signal 3504. The radio section 3503 outputs the baseband signal 3504 to the channel estimator 3505, the control information decoder 3507, and the signal processor 3509.

The control information decoder 3507 receives the baseband signal 3504. The control information decoder 3507 outputs control information 3508, which is obtained by demodulating the control information symbols included in the baseband signal 3504.

The channel estimator 3505 receives the baseband signal 3504. The channel estimator 3505 extracts a preamble and pilot symbols included in the baseband signal 3504. The channel estimator 3505 estimates channel variation on the basis of the preamble and the pilot symbols, and generates a channel estimation signal 3506 indicating the estimated channel variation. The channel estimator 3505 outputs the channel estimation signal 3506 to the signal processor 3509.

The signal processor 3509 receives the baseband signal 3504, the channel estimation signal 3506, and the control information 3508. On the basis of the channel estimation signal 3506 and the control information 3508, the signal processor 3509 performs demodulation and error-correcting decoding on data symbols included in the baseband signal 3504, and generates reception data 3510. The signal processor 3509 outputs the reception data 3510.

Figure 36:
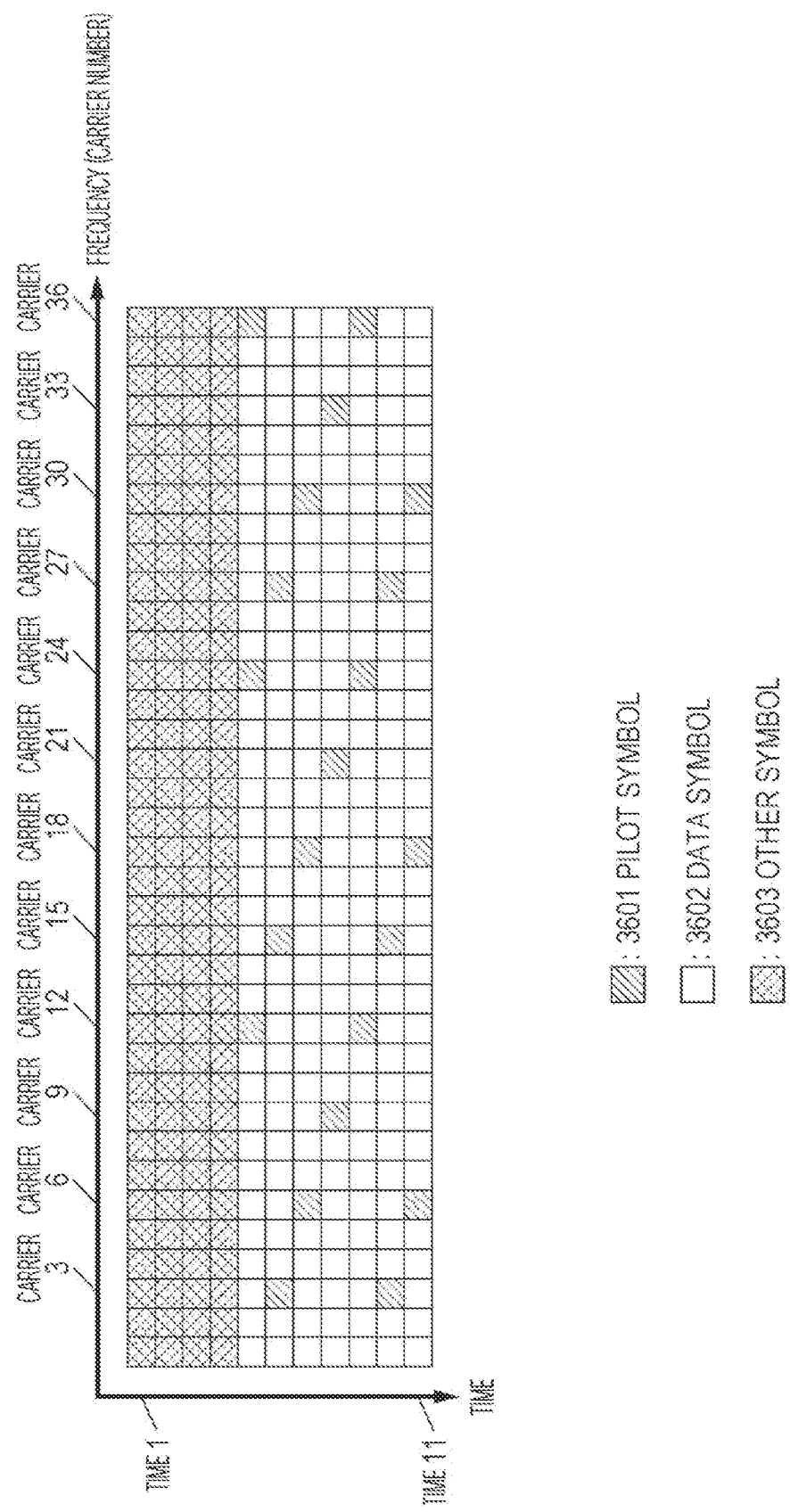
FIG. 36 is a diagram illustrating an example of the frame configuration of a modulated signal of a single stream transmitted by using a multi-carrier transmission scheme such as the OFDM scheme.

FIG. 36 is a diagram illustrating an example of the frame configuration of a modulated signal of a single stream transmitted by using a multi-carrier transmission scheme such as the OFDM scheme. In FIG. 36, the horizontal axis indicates frequency and the vertical axis indicates time. FIG. 36 illustrates, as an example, symbols from carrier 1 to carrier 36. FIG. 36 also illustrates symbols from time 1 to time 11. The frame configuration illustrated in FIG. 36 is an example of the frame configuration of a modulated signal of a single stream transmitted by using a multi-carrier transmission scheme such as the OFDM scheme by the base station (AP), which is a communication partner of the terminal #p.

In FIG. 36, 3601 denotes a pilot symbol, 3602 denotes a data symbol, and 3603 denotes an other symbol. It is assumed that the pilot symbols 3601 are symbols used by the terminal #p to estimate channel variation, for example. It is assumed that the data symbols 3602 are symbols used by the base station or AP to transmit data to the terminal #p. It is assumed that the other symbols 3603 include, for example, symbols used by the terminal #p to perform signal detection, frequency offset estimation, frequency synchronization, and time synchronization, and/or control information symbols for demodulating the data symbols 3602 (information about the transmission method, modulation scheme, and error-correcting coding method of the data symbols 3602).

For example, the transmission apparatus of the base station in FIGS. 1 or 24 may transmit a modulated signal of a single stream having the frame configuration in FIG. 36 to the terminal #p.

Figure 37:
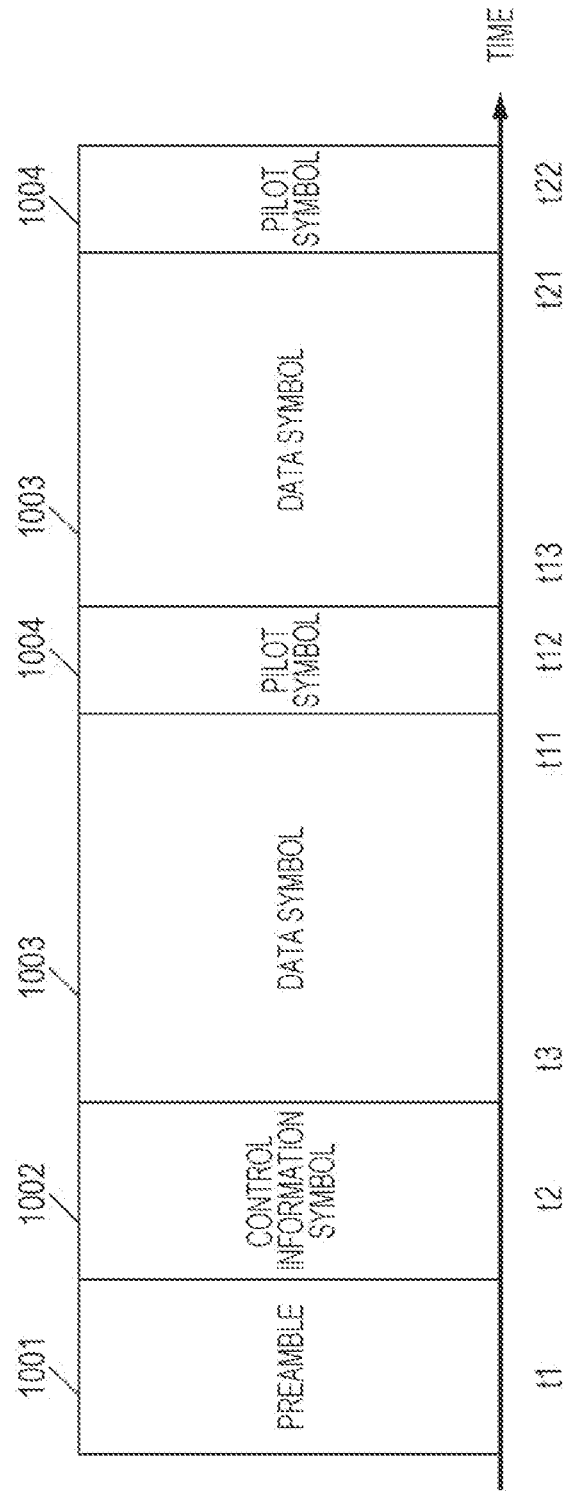
FIG. 37 is a diagram illustrating an example of the frame configuration of a modulated signal of a single stream transmitted by using a single-carrier transmission scheme.

FIG. 37 is a diagram illustrating an example of the frame configuration of a modulated signal of a single stream transmitted by using a single-carrier transmission scheme. In FIG. 37, the elements similar to those in FIG. 10 are denoted by the same numerals. In FIG. 37, the horizontal axis indicates time, and FIG. 37 illustrates symbols from time t1 to t22. The frame configuration illustrated in FIG. 37 is an example of the frame configuration of a modulated signal of a single stream transmitted by using a single-carrier transmission scheme by the base station or AP, which is a communication partner of the terminal #p.

For example, the transmission apparatus of the base station in FIGS. 1 or 24 may transmit a modulated signal of a single stream having the frame configuration in FIG. 37 to the terminal #p.

Also, for example, the transmission apparatus of the base station in FIGS. 1 or 24 may transmit multiple modulated signals of multiple streams having the frame configurations in FIGS. 8 and 9 to the terminal #p.

Furthermore, for example, the transmission apparatus of the base station in FIGS. 1 or 24 may transmit multiple modulated signals of multiple streams having the frame configurations in FIGS. 10 and 11 to the terminal #p.

Next, a description will be given of, using first to tenth examples, the reception capability in the reception apparatus of the terminal #p illustrated in FIG. 35, that is, the schemes supported by the reception apparatus, and the processing of the terminal #p and the processing of the base station (AP) based on the supported schemes.

First Example

As the first example, it is assumed that the reception apparatus of the terminal #p has the configuration illustrated in FIG. 35 and the reception apparatus of the terminal #p supports the following.

For example, the reception of "communication scheme #A" described in the third embodiment is supported.
Thus, if the communication partner transmits multiple modulated signals of multiple streams, the terminal #p does not support the reception of the modulated signals.
Thus, in a case where the communication partner performs phase change when transmitting multiple modulated signals of multiple streams, the terminal #p does not support the reception of the modulated signals.
Only the single-carrier scheme is supported.
Only the decoding of "error-correcting coding scheme #C" is supported as the error-correcting coding scheme.

Thus, the terminal #p having the configuration in FIG. 35 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example. Subsequently, the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes" (see FIG. 30), that the terminal #p supports "communication scheme #A".

Thus, the signal processor 155 of the base station determines not to transmit a modulated signal whose phase has been changed because the data 2801 about "support/not support phase demodulation of modulated signal with phase change" in FIG. 30 is invalid and the communication scheme #A is supported, and outputs the control information 157 (see FIG. 22) including this information. This is because the communication scheme #A does not support the transmission and reception of multiple modulated signals for multiple streams.

In addition, the signal processor 155 of the base station determines not to transmit multiple modulated signals for multiple streams because the data 2901 about "support/not support reception for multiple streams" in FIG. 30 is invalid and the communication scheme #A is supported, and outputs the control information 157 including this information. This is because the communication scheme #A does not support the transmission and reception of multiple modulated signals for multiple streams.

In addition, the signal processor 155 of the base station determines to use "error-correcting coding scheme #C" because the data 3003 about "supported error-correcting coding schemes" in FIG. 30 is invalid and the communication scheme #A is supported, and outputs the control information 157 including this information. This is because the communication scheme #A supports "error-correcting coding scheme #C".

For example, as in FIG. 35, "communication scheme #A" is supported, and thus the base station or AP performs the above-described operations so as not to transmit multiple modulated signals for multiple streams. Thus, the base station (AP) appropriately transmits a modulated signal of "communication scheme #A", and accordingly the data transmission efficiency in the system constituted by the base station (AP) and the terminal #p can be increased.

Second Example

As the second example, it is assumed that the reception apparatus of the terminal #p has the configuration illustrated in FIG. 35 and the reception apparatus of the terminal #p supports the following.

For example, the reception of "communication scheme #B" described in the third embodiment is supported.

Since the reception apparatus has the configuration illustrated in FIG. 35, if the communication partner transmits multiple modulated signals of multiple streams, the terminal #p does not support the reception of the modulated signals.

Thus, in a case where the communication partner performs phase change when transmitting multiple modulated signals of multiple streams, the terminal #p does not support the reception of the modulated signals.

The single-carrier scheme and the multi-carrier scheme such as the OFDM scheme are supported.

The decoding of "error-correcting coding scheme #C" and "error-correcting coding scheme #D" are supported as the error-correcting coding scheme.

Thus, the terminal #p having the configuration in FIG. 35 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example. Subsequently, the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #B".

Also, the signal processor 155 of the base station learns, from the data 2901 about "support/not support reception for multiple streams" in FIG. 30, that the terminal #p as a communication partner is unable to demodulate multiple modulated signals for multiple streams.

Thus, the signal processor 155 of the base station determines that the data 2801 about "support/not support demodulation of modulated signal with phase change" in FIG. 30 is invalid and determines not to transmit a modulated signal whose phase has been changed, and outputs the control information 157 including this information. This is because the terminal #p does not support "reception for multiple streams".

In addition, on the basis of the data 3002 about "support/not support multi-carrier scheme" in FIG. 30, the signal processor 155 of the base station outputs the control information 157 including information about whether the terminal #p as a communication partner supports the multi-carrier scheme and/or supports the single-carrier scheme.

In addition, on the basis of the data 3003 about "supported error-correcting coding schemes" in FIG. 30, the signal processor 155 of the base station outputs the control information 157 including information about whether the terminal #p as a communication partner supports "error-correcting coding scheme #C" and/or "error-correcting coding scheme #D".

Thus, the base station (AP) performs the above-described operations so as not to transmit multiple modulated signals for multiple streams, thereby being able to appropriately transmit a modulated signal of a single stream. Accordingly, the data transmission efficiency in the system constituted by the base station (AP) and the terminal #p can be increased.

Third Example

As the third example, it is assumed that the reception apparatus of the terminal #p has the configuration illustrated in FIG. 35 and the reception apparatus of the terminal #p supports the following.

The reception of "communication scheme #A" and the reception of "communication scheme #B" described in the third embodiment are supported.

In both "communication scheme #A" and "communication scheme #B", if the communication partner transmits multiple modulated signals of multiple streams, the terminal #p does not support the reception of the modulated signals.

Thus, in a case where the communication partner performs phase change when transmitting multiple modulated signals of multiple streams, the terminal #p does not support the reception of the modulated signals.

In both "communication scheme #A" and "communication scheme #B", only the single-carrier scheme is supported.

Regarding the error-correcting coding scheme, the decoding of "error-correcting coding scheme #C" is supported as "communication scheme #A", and the decoding of "error-correcting coding scheme #C" and "error-correcting coding scheme #D" is supported as "communication scheme #B".

Thus, the terminal #p having the configuration in FIG. 35 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example. Subsequently, the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

Also, the signal processor 155 of the base station learns, from the data 2901 about "support/not support reception for multiple streams" in FIG. 30, that the terminal #p "does not support reception for multiple streams".

Thus, the signal processor 155 of the base station determines not to transmit a modulated signal whose phase has been changed because the data 2801 about "support/not support demodulation of modulated signal with phase change" in FIG. 30 is invalid and the communication scheme #A is supported, and outputs the control information 157 including this information. This is because the terminal #p does not support the transmission and reception of multiple modulated signals for multiple streams.

Also, the signal processor 155 of the base station learns, from the data 3002 about "support/not support multi-carrier scheme" in FIG. 30, whether the terminal #p supports the single-carrier scheme or the multi-carrier scheme such as the OFDM scheme.

In addition, the signal processor 155 of the base station learns, from the data 3003 about "supported error-correcting coding schemes" in FIG. 30, that the terminal #p supports the decoding of "error-correcting coding scheme #C" and "error-correcting coding scheme #D".

Thus, the base station (AP) performs the above-described operations so as not to transmit multiple modulated signals for multiple streams, thereby being able to appropriately transmit a modulated signal of a single stream. Accordingly, the data transmission efficiency in the system constituted by the base station (AP) and the terminal #p can be increased.

Fourth Example

As the fourth example, it is assumed that the reception apparatus of the terminal #p has the configuration illustrated in FIG. 35 and the reception apparatus of the terminal #p supports the following.

The reception of "communication scheme #A" and the reception of "communication scheme #B" described in the third embodiment are supported.

In both "communication scheme #A" and "communication scheme #B", if the communication partner transmits multiple modulated signals of multiple streams, the terminal #p does not support the reception of the modulated signals.

Thus, in a case where the communication partner performs phase change when transmitting multiple modulated signals of multiple streams, the terminal #p does not support the reception of the modulated signals.

The single-carrier scheme is supported as "communication scheme #A", and the single-carrier scheme and the multi-carrier scheme such as the OFDM scheme are supported as "communication scheme #B".

Regarding the error-correcting coding scheme, the decoding of "error-correcting coding scheme #C" is supported as "communication scheme #A", and the decoding of "error-correcting coding scheme #C" and "error-correcting coding scheme #D" is supported as "communication scheme #B".

Thus, the terminal #p having the configuration in FIG. 35 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

Also, the signal processor 155 of the base station learns, from the data 2901 about "support/not support reception for multiple streams" in FIG. 30, that the terminal #p "does not support reception for multiple streams".

Thus, the signal processor 155 of the base station determines not to transmit a modulated signal whose phase has been changed because the data 2801 about "support/not support demodulation of modulated signal with phase change" in FIG. 30 is invalid and the communication scheme #A is supported, and outputs the control information 157 including this information. This is because the terminal #p does not support the transmission and reception of multiple modulated signals for multiple streams.

The signal processor 155 of the base station learns, from the data 3002 about "support/not support multi-carrier scheme" in FIG. 30, whether the terminal #p supports the single-carrier scheme or the multi-carrier scheme such as the OFDM scheme.

At this time, the data 3002 about "support/not support multi-carrier scheme" needs the configuration described below, for example.

The data 3002 about "support/not support multi-carrier scheme" is made up of 4 bits, and the 4 bits are represented by g0, g1, g2, and g3. At this time, the terminal #p sets g0, g1, g2, and g3 in the following manner in accordance with the reception capability of the terminal #p and transmits the data 3002 about "support/not support multi-carrier scheme".

In a case where the terminal #p supports the demodulation of the single-carrier scheme regarding "communication scheme #A", the terminal #p sets (g0, g1) = (0, 0).

In a case where the terminal #p supports the demodulation of the multi-carrier scheme such as OFDM regarding "communication scheme #A", the terminal #p sets (g0, g1) = (0, 1).

In a case where the terminal #p supports the demodulation of the single-carrier scheme and demodulation of the multi-carrier scheme such as OFDM regarding "communication scheme #A", the terminal #p sets (g0, g1) = (1, 1).

In a case where the terminal #p supports the demodulation of the single-carrier scheme regarding "communication scheme #B", the terminal #p sets (g2, g3) = (0, 0).

In a case where the terminal #p supports the demodulation of the multi-carrier scheme such as OFDM regarding "communication scheme #B", the terminal #p sets (g2, g3) = (0, 1).

In a case where the terminal #p supports the demodulation of the single-carrier scheme and demodulation of the multi-carrier scheme such as OFDM regarding "communication scheme #B", the terminal #p sets (g2, g3) = (1, 1).

In addition, the signal processor 155 of the base station learns, from the data 3003 about "supported error-correcting coding schemes" in FIG. 30, that the terminal #p supports the decoding of "error-correcting coding scheme #C" and "error-correcting coding scheme #D".

Thus, the base station (AP) performs the above-described operations so as not to transmit multiple modulated signals for multiple streams, thereby being able to appropriately transmit a modulated signal of a single stream. Accordingly, the data transmission efficiency in the system constituted by the base station (AP) and the terminal #p can be increased.

Fifth Example

As the fifth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

In a case where the communication partner performs phase change when transmitting modulated signals of multiple streams, the terminal #p supports the reception of the modulated signals.

Only the single-carrier scheme is supported.

Only the decoding of "error-correcting coding scheme #C" is supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station learns, from the data 2901 about "support/not support reception for multiple streams" in FIG. 30, that "if the communication partner transmits multiple modulated signals of multiple streams in "communication scheme #B″, the terminal #p supports the reception of the modulated signals". Also, the signal processor 155 of the base station learns, from the data 2901 about "support/not support reception for multiple streams" in FIG. 30, that "if the communication partner transmits a modulated signal of a single stream in "communication scheme #A" and "communication scheme #B″, the terminal #p supports the reception of the modulated signal".

Also, the signal processor 155 of the base station learns, from the data 2801 about "support/not support demodulation of modulated signal with phase change" in FIG. 30, that the terminal #p "supports phase change demodulation".

The signal processor 155 of the base station learns, from the data 3002 about "support/not support multi-carrier scheme" in FIG. 30, that the terminal #p "supports only the single-carrier scheme".

The signal processor 155 of the base station learns, from the data 3003 about "supported error-correcting coding schemes" in FIG. 30, that the terminal #p "supports only the decoding of "error-correcting coding scheme #C‴".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

Sixth Example

As the sixth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

In a case where the communication partner performs phase change when transmitting modulated signals of multiple streams, the terminal #p does not support the reception of the modulated signals.

Only the single-carrier scheme is supported.

The decoding of "error-correcting coding scheme #C" and the decoding of "error-correcting coding scheme #D" are supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station learns, from the data 2901 about "support/not support reception for multiple streams" in FIG. 30, that "if the communication partner transmits multiple modulated signals of multiple streams in "communication scheme #B″, the terminal #p supports the reception of the modulated signals". Also, the signal processor 155 of the base station learns, from the data 2901 about "support/not support reception for multiple streams" in FIG. 30, that "if the communication partner transmits a modulated signal of a single stream in "communication scheme #A" and "communication scheme #B″, the terminal #p supports the reception of the modulated signal".

Also, the signal processor 155 of the base station learns, from the data 2801 about "support/not support demodulation of modulated signal with phase change" in FIG. 30, that the terminal #p "does not support phase change demodulation". Thus, the base station (AP) transmits multiple modulated signals of multiple streams to the terminal #p without performing phase change.

The signal processor 155 of the base station learns, from the data 3002 about "support/not support multi-carrier scheme" in FIG. 30, that the terminal #p "supports only the single-carrier scheme".

The signal processor 155 of the base station learns, from the data 3003 about "supported error-correcting coding schemes" in FIG. 30, that the terminal #p "supports the decoding of "error-correcting coding scheme #C" and the decoding of "error-correcting coding scheme #D'''".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

Seventh Example

As the seventh example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

The single-carrier scheme is supported as "communication scheme #A", and the single-carrier scheme and the multi-carrier scheme such as the OFDM scheme are supported as "communication scheme #B". However, it is assumed that, only in the case of the multi-carrier scheme such as the OFDM scheme in "communication scheme #B", "the communication partner is able to perform phase change when transmitting modulated signals of multiple streams".

In a case where the communication partner performs phase change when transmitting modulated signals of multiple streams, the terminal #p supports the reception of the modulated signals.

The decoding of "error-correcting coding scheme #C" and the decoding of "error-correcting coding scheme #D" are supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and the present embodiment, and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station learns, from the data 2901 about "support/not support reception for multiple streams" in FIG. 30, that "if the communication partner transmits multiple modulated signals of multiple streams in "communication scheme #B", the terminal #p supports the reception of the modulated signals". In addition, the signal processor 155 of the base station learns, from the data 2901 about "support/not support reception for multiple streams" in FIG. 30, that "if the communication partner transmits a modulated signal of a single stream in "communication scheme #A" and "communication scheme #B", the terminal #p supports the reception of the modulated signal".

Also, the signal processor 155 of the base station learns, from the data 2801 about "support/not support demodulation of modulated signal with phase change" in FIG. 30, that the terminal #p "does not support phase change demodulation". Thus, the base station (AP) transmits multiple modulated signals of multiple streams to the terminal #p without performing phase change. When the terminal #p obtains information "support phase change demodulation" from the data 2801 about "support/not support demodulation of modulated signal with phase change" as described above, the terminal #p understands that it is only in "communication scheme #B".

The signal processor 155 of the base station learns, from the data 3002 about "support/not support multi-carrier scheme" in FIG. 30, that the terminal #p supports the single-carrier scheme as "communication scheme #A" and supports the single-carrier scheme and the multi-carrier scheme such as the OFDM scheme as "communication scheme #B". At this time, as described above, the terminal #p may preferably notify the base station or AP of the situation of supporting the single-carrier scheme and the multi-carrier scheme such as OFDM in "communication scheme #A" and supporting the single-carrier scheme and the multi-carrier scheme such as OFDM in "communication scheme #B".

The signal processor 155 of the base station learns, from the data 3003 about "supported error-correcting coding schemes" in FIG. 30, that the terminal #p "supports the decoding of "error-correcting coding scheme #C" and the decoding of "error-correcting coding scheme #D'''".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

Eighth Example

As the eighth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

In the single-carrier scheme in "communication scheme #B", if the communication partner transmits multiple modulated signals of multiple streams, the terminal #p supports the reception of the modulated signals. On the other hand, in the multi-carrier scheme such as OFDM in "communication scheme #B", if the communication partner transmits multiple modulated signals of multiple streams, the terminal #p does not support the reception of the modulated signals.

In the single-carrier scheme in "communication scheme #A", when the communication partner transmits a modulated signal of a single stream, the terminal #p supports the reception of the modulated signal. The reception of the multi-carrier scheme such as the OFDM scheme is not supported.

In a case where the communication partner performs phase change when transmitting modulated signals of multiple streams, the terminal #p supports the reception of the modulated signals.

The decoding of "error-correcting coding scheme #C" and the decoding of "error-correcting coding scheme #D" are supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station learns, from the data 2901 about "support/not support reception for multiple streams" in FIG. 30, that "if the base station transmits multiple modulated signals of multiple streams in the single-carrier scheme of "communication scheme #B", the terminal #p supports the reception of the modulated signals". In addition, the signal processor 155 of the base station learns, from the data 2901 about "support/not support reception for multiple streams" in FIG. 30, that "if the base station transmits multiple modulated signals of multiple streams in the multi-carrier scheme such as OFDM of "communication scheme #B", the terminal #p does not support the reception of the modulated signals". In addition, the signal processor 155 of the base station learns, from the data 2901 about "support/not support reception for multiple streams" in FIG. 30, that "if the base station transmits a modulated signal of a single stream in "communication scheme #A" and "communication scheme #B", the terminal #p supports the reception of the modulated signal".

At this time, the data 2901 about "support/not support reception for multiple streams" needs the data configuration described below, for example.

The data 2901 about "support/not support reception for multiple streams" is made up of 2 bits, and the 2 bits are represented by h0 and h1.

In a case where the terminal #p supports the demodulation of multiple modulated signals of multiple streams transmitted by the communication partner in the single-carrier scheme of "communication scheme #B", the terminal #p sets h0 = 1. If the terminal #p does not support the demodulation, the terminal #p sets h0 = 0.

In a case where the terminal #p supports the demodulation of multiple modulated signals of multiple streams transmitted by the communication partner in the multi-carrier scheme such as OFDM of "communication scheme #B", the terminal #p sets h1 = 1. If the terminal #p does not support the demodulation, the terminal #p sets h1 = 0.

The signal processor 155 of the base station learns, from the data 2801 about "support/not support demodulation of modulated signal with phase change" in FIG. 30, that the terminal #p "supports phase change demodulation".

The signal processor 155 of the base station learns, from the data 3002 about "support/not support multi-carrier scheme" in FIG. 30, that the terminal #p "supports only the single-carrier scheme".

The signal processor 155 of the base station learns, from the data 3003 about "supported error-correcting coding schemes" in FIG. 30, that the terminal #p supports the decoding of "error-correcting coding scheme #C" and "error-correcting coding scheme #D".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

Ninth Example

As the ninth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

In "communication scheme #B", the base station (AP) as a communication partner is able to transmit multiple modulated signals for multiple streams in the single-carrier scheme and the multi-carrier scheme such as OFDM. However, the communication partner is able to perform phase change when transmitting multiple modulated signals of multiple streams only in the multi-carrier scheme such as the OFDM scheme of "communication scheme #B". In a case where the communication partner performs phase change when transmitting multiple modulated signals of multiple streams, the terminal #p supports the reception of the modulated signals.

The decoding of "error-correcting coding scheme #C" and the decoding of "error-correcting coding scheme #D" are supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station in FIG. 22 extracts the data included in the reception capability notification symbol 2702 and learns, from the data 3001 about "supported schemes", that the terminal #p supports "communication scheme #A" and "communication scheme #B".

The signal processor 155 of the base station learns, from the data 2901 about "support/not support reception for multiple streams" in FIG. 30, that "if the communication partner transmits multiple modulated signals of multiple streams in "communication scheme #B", the terminal #p supports the reception of the modulated signals". Also, the signal processor 155 of the base station learns, from the data 2901 about "support/not support reception for multiple streams" in FIG. 30, that "if the communication partner transmits a modulated signal of a single stream in "communication scheme #A" and "communication scheme #B", the terminal #p supports the reception of the modulated signal".

In addition, the signal processor 155 of the base station learns, from the data 3002 about "support/not support multi-carrier scheme" in FIG. 30, whether the terminal #p supports "single-carrier scheme", supports "multi-carrier scheme such as OFDM", or supports "both the single-carrier scheme and the multi-carrier scheme such as OFDM".

When the signal processor 155 of the base station learns that the terminal #p "supports the single-carrier scheme", the signal processor 155 of the base station interprets that the data 2801 about "support/not support demodulation of modulated signal with phase change" in FIG. 30 is invalid and interprets that "phase change demodulation is not supported". This is because the base station as a communication partner does not support phase change at the time of the single-carrier scheme.

When the signal processor 155 of the base station learns that the terminal #p "supports the multi-carrier scheme such as OFDM" or "supports both the single-carrier scheme and the multi-carrier scheme such as OFDM", the signal processor 155 of the base station does not interpret that the data 2801 about "support/not support demodulation of modulated signal with phase change" in FIG. 30 is invalid (i.e., interprets that the data 2801 is valid). The signal processor 155 of the base station obtains, from the data 2801 about "support/not support demodulation of modulated signal with phase change" in FIG. 30, information indicating whether or not the terminal #p supports phase change demodulation in the multi-carrier scheme such as OFDM.

The signal processor 155 of the base station learns, from the data 3003 about "supported error-correcting coding schemes" in FIG. 30, that the terminal #p" supports the decoding of "error-correcting coding scheme #C" and the decoding of "error-correcting coding scheme #D'''".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

Tenth Example

As the tenth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits multiple modulated signals of multiple streams, the terminal #p supports the reception of the modulated signals. In "communication scheme #A" and "communication scheme #B", if the communication partner transmits a modulated signal of a single stream, the terminal #p supports the reception of the modulated signal.

In "communication scheme #B", the base station or AP is able to transmit multiple modulated signals for multiple streams in the single-carrier scheme and the multi-carrier scheme such as OFDM.

In the single-carrier scheme, when the communication partner transmits modulated signals of multiple streams, whether or not to perform phase change can be set. In the multi-carrier scheme such as OFDM, when the communication partner transmits modulated signals of multiple streams, whether or not to perform phase change can be set.

The decoding of "error-correcting coding scheme #C" and the decoding of "error-correcting coding scheme #D" are supported as the error-correcting coding scheme.

Thus, the terminal #p having the configuration in FIG. 19 and supporting the above generates the reception capability notification symbol 2702 illustrated in FIG. 30 on the basis of the rules described in the third embodiment and transmits the reception capability notification symbol 2702 in accordance with the procedure in FIG. 27, for example.

At this time, the terminal #p generates the reception capability notification symbol 2702 illustrated in FIG. 30 in the transmission apparatus 3403 in FIG. 34, for example, and the transmission apparatus 3403 in FIG. 34 transmits the reception capability notification symbol 2702 illustrated in FIG. 30 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

The signal processor 155 of the base station learns, from the data 2901 about "support/not support reception for multiple streams" in FIG. 30, that "if the communication partner transmits multiple modulated signals of multiple streams in "communication scheme #B", the terminal #p supports the reception of the modulated signals". Also, the signal processor 155 of the base station learns, from the data 2901 about "support/not support reception for multiple streams" in FIG. 30, that "if the communication partner transmits a modulated signal of a single stream in "communication scheme #A" and "communication scheme #B", the terminal #p supports the reception of the modulated signal".

In addition, the signal processor 155 of the base station learns, from the data 3002 about "support/not support multi-carrier scheme" in FIG. 30, whether the terminal #p supports "single-carrier scheme", supports "multi-carrier scheme such as OFDM", or supports "both the single-carrier scheme and the multi-carrier scheme such as OFDM".

Also, the signal processor 155 of the base station learns, from the data 2801 about "support/not support demodulation of modulated signal with phase change" in FIG. 30, whether the terminal #p supports phase change.

At this time, the data 2801 about "support/not support demodulation of modulated signal with phase change" needs the configuration described below, for example.

The data 2801 about "support/not support demodulation of modulated signal with phase change" is made up of 2 bits, and the 2 bits are represented by k0 and k1.

When the communication partner transmits multiple modulated signals of multiple streams in the single-carrier scheme of "communication scheme #B" and performs phase change at that time, in a case where the terminal #p supports the demodulation of the modulated signals, the terminal #p sets k0 = 1. In a case where the terminal #p does not support the demodulation, the terminal #p sets k0 = 0.

When the communication partner transmits multiple modulated signals of multiple streams in the multi-carrier scheme such as OFDM of "communication scheme #B" and performs phase change at that time, in a case where the terminal #p supports the demodulation of the modulated signals, the terminal #p sets k1 = 1. In a case where the terminal #p does not support the demodulation, the terminal #p sets k1 = 0.

The signal processor 155 of the base station learns, from the data 3003 about "supported error-correcting coding schemes" in FIG. 30, that the terminal #p supports the decoding of "error-correcting coding scheme #C'" and "error-correcting coding scheme #D".

Thus, the base station (AP) appropriately generates and transmits a modulated signal that can be received by the terminal #p in consideration of a communication scheme supported by the terminal #p and a communication environment, and accordingly the data transmission efficiency in the system constituted by the base station (AP) and the terminal #p can be increased.

As described above, the base station (AP) obtains, from the terminal #p as a communication partner, information about a scheme in which the terminal #p supports demodulation, and decides the number of modulated signals, the communication method for the modulated signals, the signal processing method for the modulated signals, and so forth on the basis of the information, thereby being able to appropriately generate and transmit a modulated signal that can be received by the terminal #p. Accordingly, the data transmission efficiency in the system constituted by the base station (AP) and the terminal #p can be increased.

At this time, for example, when the reception capability notification symbol is made up of multiple pieces of data as in FIG. 30, the base station (AP) is able to easily determine whether the data included in the reception capability notification symbol is valid or invalid. Accordingly, there is an advantage of being able to quickly determine the scheme of modulated signals to be transmitted, the signal processing method, and so forth.

The base station (AP) transmits modulated signals to individual terminals #p by using a preferable transmission method on the basis of the details of information of the reception capability notification symbols transmitted by the individual terminals #p. Accordingly, the data transmission efficiency is increased.

The method for configuring the data of the reception capability notification symbol described in the present embodiment is an example, and the method for configuring the data of the reception capability notification symbol is not limited thereto. In addition, the transmission procedure and transmission timing for transmitting the reception capability notification symbol to the base station (AP) by the terminal #p according to the present embodiment are merely an example, and the transmission procedure and transmission timing are not limited thereto.

The reception capability notification symbol as described above is transmitted by each terminal. However, there may be a terminal that does not transmit the reception capability notification symbol. The base station (AP) receives the reception capability notification symbols transmitted by the individual terminals and generates modulated signals to be transmitted to the individual terminals. In particular, the base station (AP) described in this specification transmits the modulated signals to the individual terminals at identical frequencies (or using a certain frequency in common) and at identical times (or using a certain time in common). Accordingly, the data transmission efficiency in the system constituted by the base station (AP) and the terminals can be increased.

Sixth Embodiment

The configuration in FIG. 26 has been described as an example of the configuration of the signal processor 206 in FIG. 2 in embodiments such as the first embodiment, the second embodiment, and the third embodiment. Hereinafter, a description will be given of an example of the operations of the phase changers 305A and 305B in FIG. 26.

As described in the third embodiment, the phase change value in the phase changer 305A is represented by Yp(i) and the phase change value in the phase changer 305B is represented by yp(i).

At this time, $zp1(i)$ and $zp2(i)$ are expressed by Expression (42). The period of phase change in the phase changer 305A is N, and the period of phase change in the phase changer 305B is N. However, it is assumed that N is an integer equal to or greater than 3, that is, an integer greater than 2, which is the number of streams to be transmitted or the number of modulated signals to be transmitted. At this time, the phase change value Yp(i) and the phase change value yp(i) are given as in the following Expression (43) and Expression (44), respectively.

$$Yp(i) = e^{j\left(\frac{\pi \times i}{N} + \Delta\right)} \quad \text{Expression (43)}$$

$$yp(i) = e^{j\left(\frac{-\pi \times i}{N} + \Omega\right)} \quad \text{Expression (44)}$$

Here, $\Delta$ in Expression (43) and $\Omega$ in Expression (44) are real numbers. As an example, $\Delta$ and $\Omega$ are zero. However, $\Delta$ and $\Omega$ are not limited thereto. With such settings, the peak-to-average power ratio (PAPR) of the signal $zp1(t)$ (or $zp1(i)$) and the PAPR of the signal $zp2(t)$ (or $zp2(i)$) in FIG. 26 are equivalent to each other in the single-carrier scheme. Accordingly, the phase noise and the request criterion for linearity of a transmission power amplifier are equivalent among the radio sections 106_1 to 106_N in FIG. 1 and so forth, which is advantageous in that low power consumption can be easily realized and that a common configuration can be used for the radio sections. Also, there is a high possibility that a similar effect can be obtained also in the multi-carrier scheme such as OFDM.

Alternatively, the phase change values Yp(i) and yp(i) may be given as in the following Expression (45) and Expression (46), respectively.

$$Yp(i) = e^{j\left(\frac{-\pi \times i}{N} + \Delta\right)} \quad \text{Expression (45)}$$

$$yp[i] = e^{j\left(\frac{\pi \times i}{N} + \Omega\right)} \quad \text{Expression (46)}$$

Also with Expression (45) and Expression (46), an effect similar to that described above can be obtained.

Alternatively, the phase change values Yp(i) and yp(i) may be given as in the following Expression (47) and Expression (48), respectively.

$$Yp(i) = e^{j\left(\frac{k \times \pi \times i}{N} + \Delta\right)} \quad \text{Expression (47)}$$

$$yp(i) = e^{j\left(\frac{-k \times \pi \times i}{N} + \Omega\right)} \quad \text{Expression (48)}$$

Here, k is an integer except 0. For example, k may be 1, -1, 2, or -2. The value of k is not limited thereto. Also with Expression (47) and Expression (48), an effect similar to that described above can be obtained.

Seventh Embodiment

Figure 38:
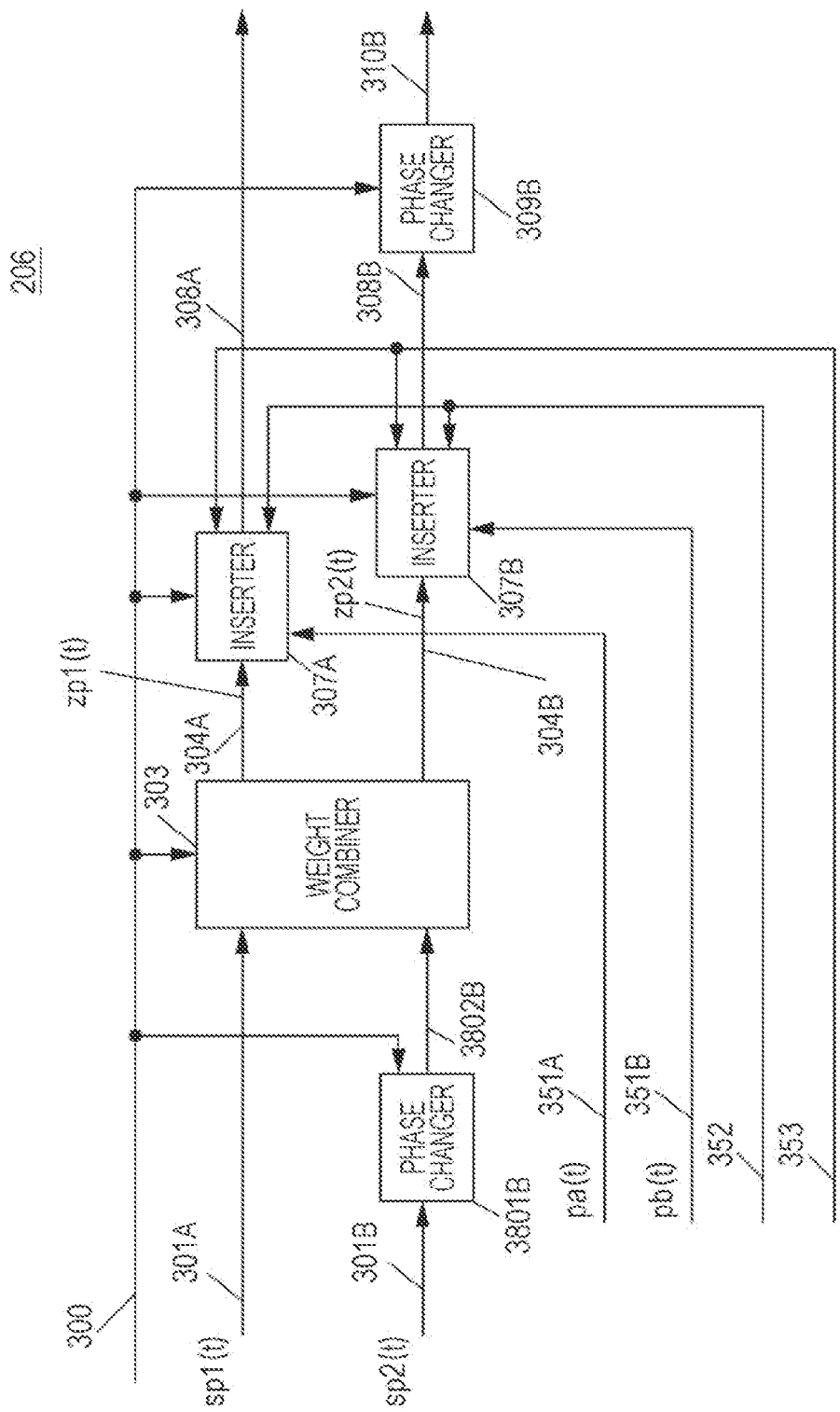
FIG. 38 is a diagram illustrating still another example of the configuration of the signal processor in FIG. 2.

In embodiments such as the first embodiment, the second embodiment, and the third embodiment, examples of the configuration of the signal processor 206 in FIG. 2 have been described. Hereinafter, an example of the configuration of the signal processor 206 in FIG. 2 different from the examples in FIGS. 3, 4, and 26 will be described. FIG. 38 is a diagram illustrating still another example of the configuration of the signal processor 206 in FIG. 2. In FIG. 38, the elements that operate similarly to those in FIG. 3 are denoted by the same numerals, and the description thereof is omitted.

A phase changer 3801B receives the user #p mapped signal 301B represented by $sp2(t)$ and the control signal 300. On the basis of the control signal 300, the phase changer 3801B performs phase change on the user #p mapped signal 301B, and outputs a phase-changed signal 3802B to the weight combiner 303.

When the weight combined signal 304A (for user #p), which is an output of the weight combiner 303, is represented by $zp1(i)$ and the weight combined signal 304B (for user #p), which is an output of the weight combiner 303, is represented by $zp2(i)$, $zp1(i)$ and $zp2(i)$ are expressed by the following Expression (49).

$$\begin{pmatrix} zp1(i) \\ zp2(i) \end{pmatrix} = \begin{pmatrix} a & b \\ c & d \end{pmatrix}\begin{pmatrix} 1 & 0 \\ 0 & vp(i) \end{pmatrix}\begin{pmatrix} sp1(i) \\ sp2(i) \end{pmatrix}$$
$$= \begin{pmatrix} a & b \\ c & d \end{pmatrix}\begin{pmatrix} 1 & 0 \\ 0 & e^{j \times \delta p(i)} \end{pmatrix}\begin{pmatrix} sp1(i) \\ sp2(i) \end{pmatrix} \quad \text{Expression (49)}$$

Here, a, b, c, and d are defined as complex numbers, and thus may be real numbers. Also, i is a symbol number. Here, j is the imaginary unit, and $\delta p(i)$ is a real number. In addition, $zp1(i)$ and $zp2(i)$ are transmitted from the transmission apparatus at identical times and identical frequencies (identical frequency bands).

For example, a phase change value vp(i) in the phase changer 3801B is set as in the following Expression (50).

$$vp(i) = e^{j\frac{2 \times \pi \times i}{Np}} \quad \text{Expression (50)}$$

In Expression (50), j is the imaginary unit. In addition, Np is an integer equal to or greater than 2 and represents the period of phase change. If Np is set to an odd number equal to or greater than 3, there is a possibility that the data reception quality is improved. In addition, Np may preferably be set to be greater than 2, which is the number of streams (the number of modulated signals) to be transmitted for the user #p. However, Expression (50) is merely an example, and the phase change value set in the phase changer 3801B is not limited thereto.

Figure 39:
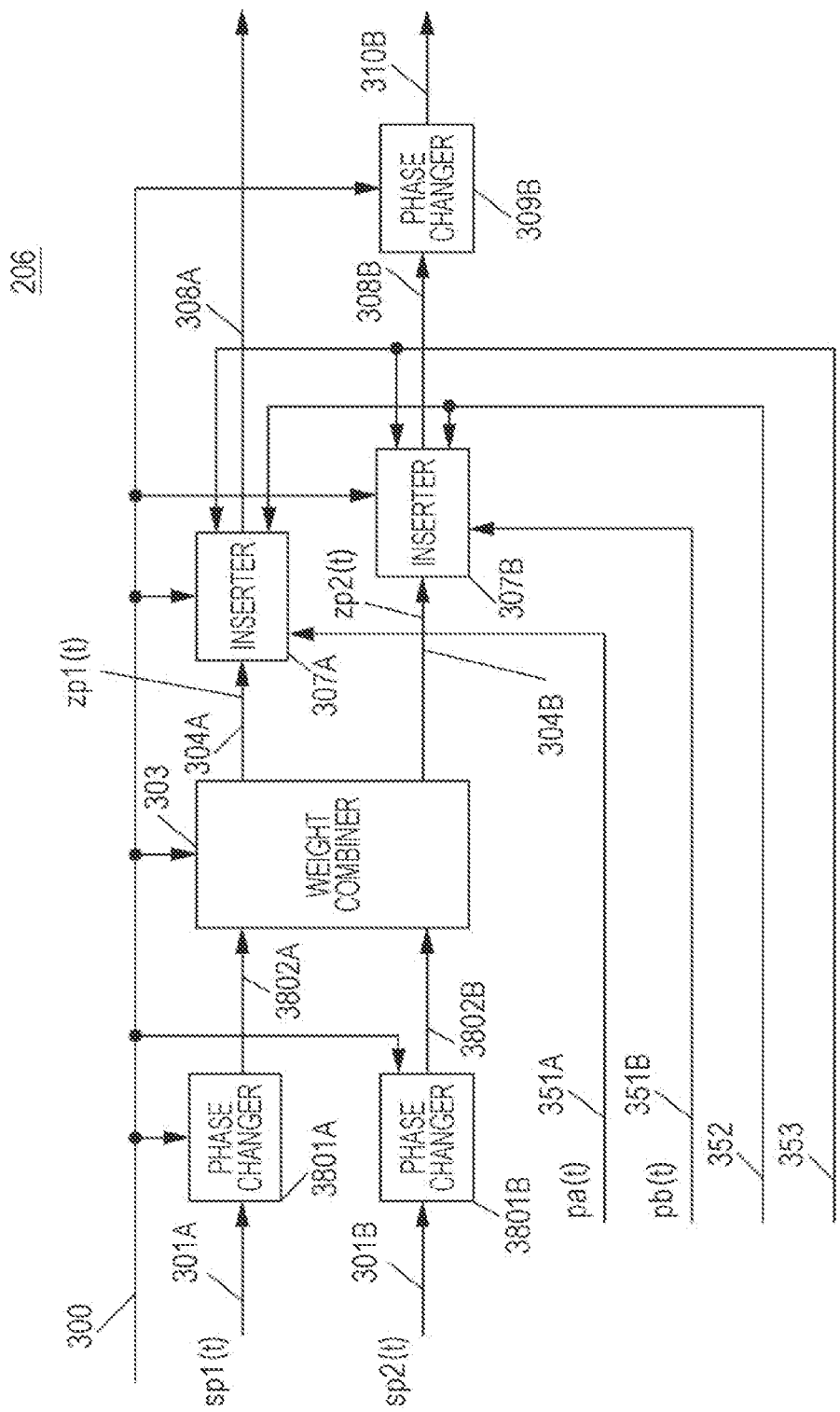
FIG. 39 is a diagram illustrating still another example of the configuration of the signal processor in FIG. 2.

Next, a configuration different from those in FIGS. 3, 4, 26, and 38 will be described. FIG. 39 is a diagram illustrating still another example of the configuration of the signal processor 206 in FIG. 2. In FIG. 39, the elements that operate similarly to those in FIGS. 3 and 38 are denoted by the same numerals, and the description thereof is omitted.

A phase changer 3801A receives the user #p mapped signal 301A represented by $sp1(t)$ and the control signal 300. On the basis of the control signal 300, the phase changer 3801A performs phase change on the user #p mapped signal 301A, and outputs a phase-changed signal 3802A.

When the weight combined signal 304A (for user #p), which is an output of the weight combiner 303, is represented by $zp1(i)$ and the weight combined signal 304B (for user #p), which is an output of the weight combiner 303, is represented by $zp2(i)$, $zp1(i)$ and $zp2(i)$ are expressed by the following Expression (51).

$$\begin{pmatrix} zp1(i) \\ zp2(i) \end{pmatrix} = \begin{pmatrix} a & b \\ c & d \end{pmatrix}\begin{pmatrix} Vp(i) & 0 \\ 0 & vp(i) \end{pmatrix}\begin{pmatrix} sp1(i) \\ sp2(i) \end{pmatrix}$$
$$= \begin{pmatrix} a & b \\ c & d \end{pmatrix}\begin{pmatrix} e^{j \times \lambda p(i)} & 0 \\ 0 & e^{j \times \delta p(i)} \end{pmatrix}\begin{pmatrix} sp1(i) \\ sp2(i) \end{pmatrix} \quad \text{Expression (51)}$$

Here, a, b, c, and d are defined as complex numbers, and thus may be real numbers. Also, i is a symbol number. Here, j is the imaginary unit, and λp(i) is a real number. In addition, $zp1(i)$ and $zp2(i)$ are transmitted from the transmission apparatus at identical times (or using a certain time in common) and identical frequencies (identical frequency bands) (or using a certain frequency in common).

By carrying out the embodiment as above, particularly in an environment in which direct waves are dominant, when the base station transmits a modulated signal by using the above-described transmission method, a terminal as a communication partner is able to obtain high data reception quality.

Eighth Embodiment

In embodiments such as the first embodiment, the second embodiment, the third embodiment, and the seventh embodiment, examples of the configuration of the signal processor 206 in FIG. 2 have been described. Hereinafter, a description will be given of an example of the operations of the phase changers 3801A and 3801B in FIG. 39.

As described in the seventh embodiment, the phase change value in the phase changer 3801A is represented by Vp(i), and the phase change value in the phase changer 3801B is represented by vp(i). At this time, $zp1(i)$ and $zp2(i)$ are expressed by Expression (51). The period of phase change in the phase changer 3801A is N, and the period of phase change in the phase changer 3801B is N. However, it is assumed that N is an integer equal to or greater than 3, that is, an integer greater than 2, which is the number of streams to be transmitted or the number of modulated signals to be transmitted. At this time, the phase change value Vp(i) and the phase change value vp(i) are given as in the following Expression (52) and Expression (53), respectively.

$$Vp(i) = e^{j\left(\frac{\pi \times i}{N} + \Delta\right)} \quad \text{Expression (52)}$$

$$vp(i) = e^{j\left(\frac{-\pi \times i}{N} + \Omega\right)} \quad \text{Expression (53)}$$

Here, Δ in Expression (52) and Ω in Expression (53) are real numbers. As an example, Δ and Ω are zero. However, Δ and Ω are not limited thereto. With such settings, the peak-to-average power ratio (PAPR) of the signal $zp1(t)$ (or $zp1(i)$) and the PAPR of the signal $zp2(t)$ (or $zp2(i)$) in FIG. 39 are equivalent to each other in the single-carrier scheme. Accordingly, the phase noise and the request criterion for linearity of a transmission power amplifier are equivalent among the radio sections 106_1 to 106_N in FIG. 1 and so forth, which is advantageous in that low power consumption can be easily realized and that a common configuration can be used for the radio sections. Also, there is a high possibility that a similar effect can be obtained also in the multi-carrier scheme such as OFDM.

Alternatively, the phase change values Vp(i) and vp(i) may be given as in the following Expression (54) and Expression (55), respectively.

$$Vp(i) = e^{j\left(\frac{-\pi \times i}{N} + \Delta\right)} \quad \text{Expression (54)}$$

$$vp(i) = e^{j\left(\frac{\pi \times i}{N} + \Omega\right)} \quad \text{Expression (55)}$$

Also with Expression (54) and Expression (55), an effect similar to that described above can be obtained.

Alternatively, the phase change values Vp(i) and vp(i) may be given as in the following Expression (56) and Expression (57), respectively.

$$Vp(i) = e^{j\left(\frac{k \times \pi \times i}{N} + \Delta\right)} \quad \text{Expression (56)}$$

$$vp(i) = e^{j\left(\frac{-k \times \pi \times i}{N} + \Omega\right)} \quad \text{Expression (57)}$$

Here, k is an integer except 0. For example, k may be 1, -1, 2, or -2. The value of k is not limited thereto. Also with Expression (56) and Expression (57), an effect similar to that described above can be obtained.

Ninth Embodiment

In the present embodiment, the arrangement of phase changers will be described. In FIGS. 3 and 26 described above, a configuration in which phase changers are arranged on the output side of the weight combiner 303 (hereinafter referred to as downstream of the weight combiner 303 as appropriate) is illustrated. In FIGS. 38 and 39, a configuration in which phase changers are arranged on the input side of the weight combiner 303 (hereinafter referred to as upstream of the weight combiner 303 as appropriate) is illustrated. The phase changers may be arranged both upstream and downstream of the weight combiner 303. In the present embodiment, a description will be given of an example in which phase changes are arranged upstream and downstream of the weight combiner 303.

Figure 40:
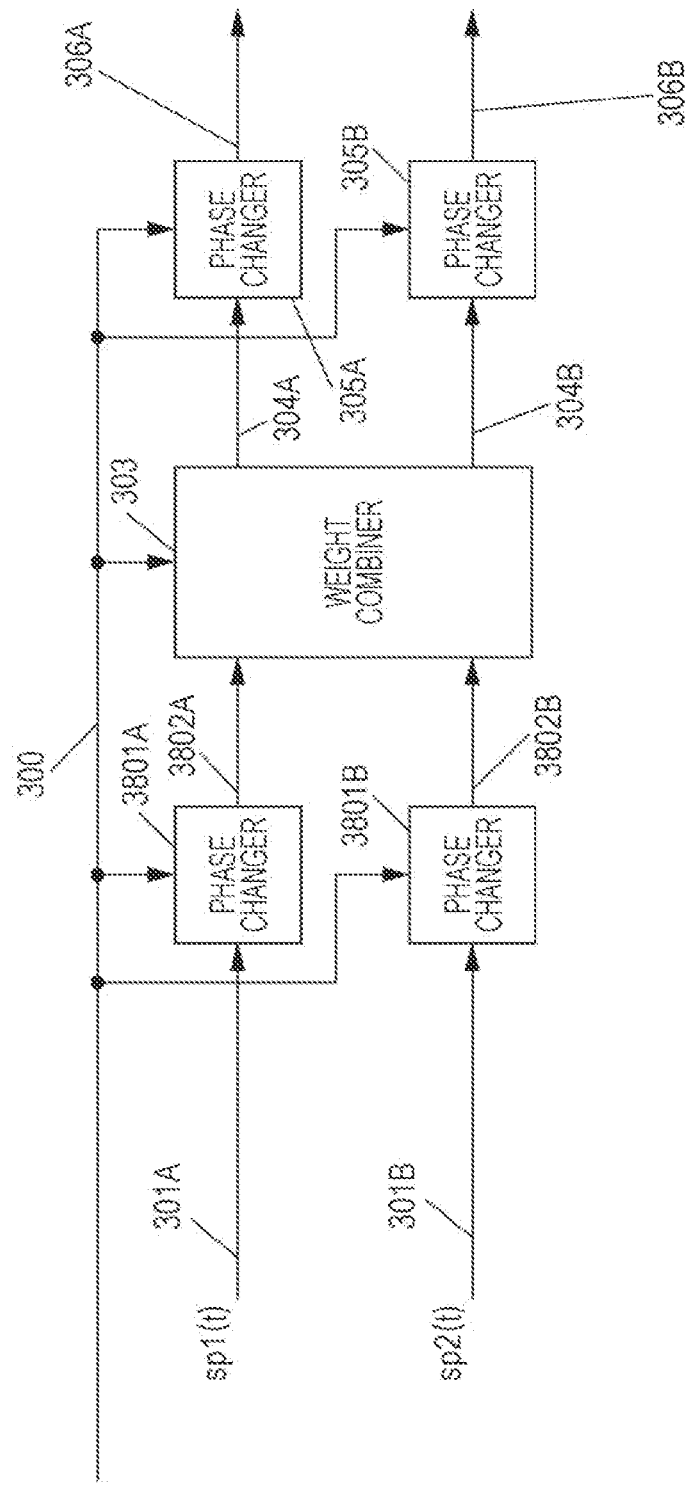
FIG. 40 is a diagram illustrating a first example in which phase changers are arranged upstream and downstream of a weight combiner.

FIG. 40 is a diagram illustrating a first example in which phase changers are arranged upstream and downstream of the weight combiner 303. In FIG. 40, the elements similar to those in FIGS. 3, 26, 38, and 39 are denoted by the same numerals, and the description thereof is omitted.

As illustrated in FIG. 40, the phase changer 3801A is arranged upstream of the weight combiner 303, on the side where the user #p mapped signal 301A of $sp1(t)$ is input (i.e., the upper stage on the page). The phase changer 3801B is arranged upstream of the weight combiner 303, on the side where the user #p mapped signal 301B of $sp2(t)$ is input (i.e., the lower stage). The phase changer 305A is arranged downstream of the weight combiner 303, on the side where the user #p weighted signal 304A is output (i.e., the upper stage). The phase changer 305B is arranged downstream of the weight combiner 303, on the side where the user #p weighted signal 304B is output (i.e., the lower stage).

As illustrated in FIG. 40, the phase changer 3801A receives the user #p mapped signal 301A of $sp1(t)$ and the control signal 300. On the basis of information about a phase change method included in the control signal 300, for example, the phase changer 3801A performs phase change on the user #p mapped signal 301A, and outputs the phase-changed signal 3802A.

Likewise, the phase changer 3801B receives the user #p mapped signal 301B of $sp2(t)$ and the control signal 300. On the basis of information about a phase change method included in the control signal 300, for example, the phase changer 3801B performs phase change on the user #p mapped signal 301B, and outputs the phase-changed signal 3802B.

The phase-changed signal 306A is input to the inserter 307A illustrated in FIGS. 3, 26, 38, and 39, and the phase-changed signal 306B is input to the inserter 307B illustrated in FIGS. 3, 26, 38, and 39.

Figure 41:
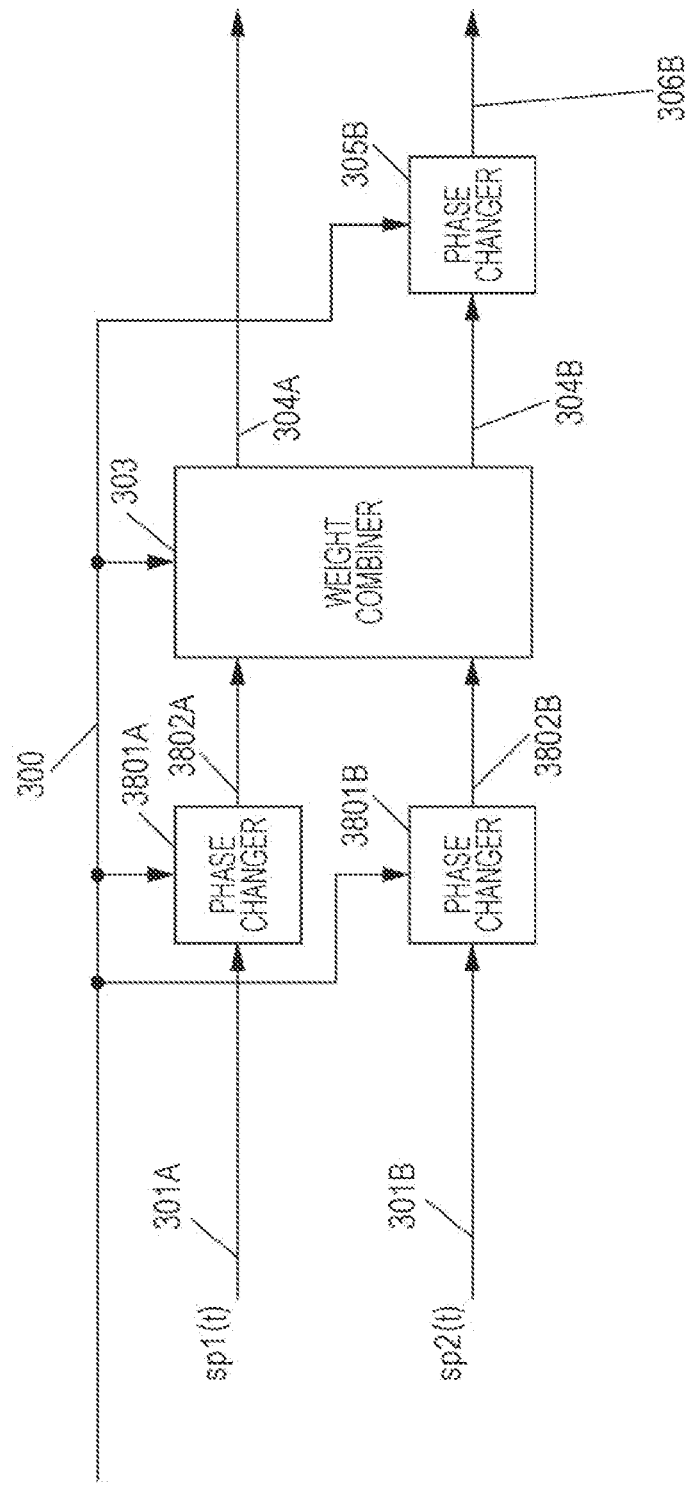
FIG. 41 is a diagram illustrating a second example in which phase changers are arranged upstream and downstream of the weight combiner.

FIG. 41 is a diagram illustrating a second example in which phase changers are arranged upstream and downstream of the weight combiner 303. In FIG. 41, the elements similar to those in FIGS. 3, 26, 38, 39, and 40 are denoted by the same numerals, and the description thereof is omitted.

In FIG. 41, unlike in FIG. 40, only the phase changer 305B is arranged downstream of the weight combiner 303. The weighted signal 304A is input to the inserter 307A illustrated in FIGS. 3, 26, 38, and 39. Also, the phase-changed signal 306B is input to the inserter 307B illustrated in FIGS. 3, 26, 38, and 39.

Figure 42:
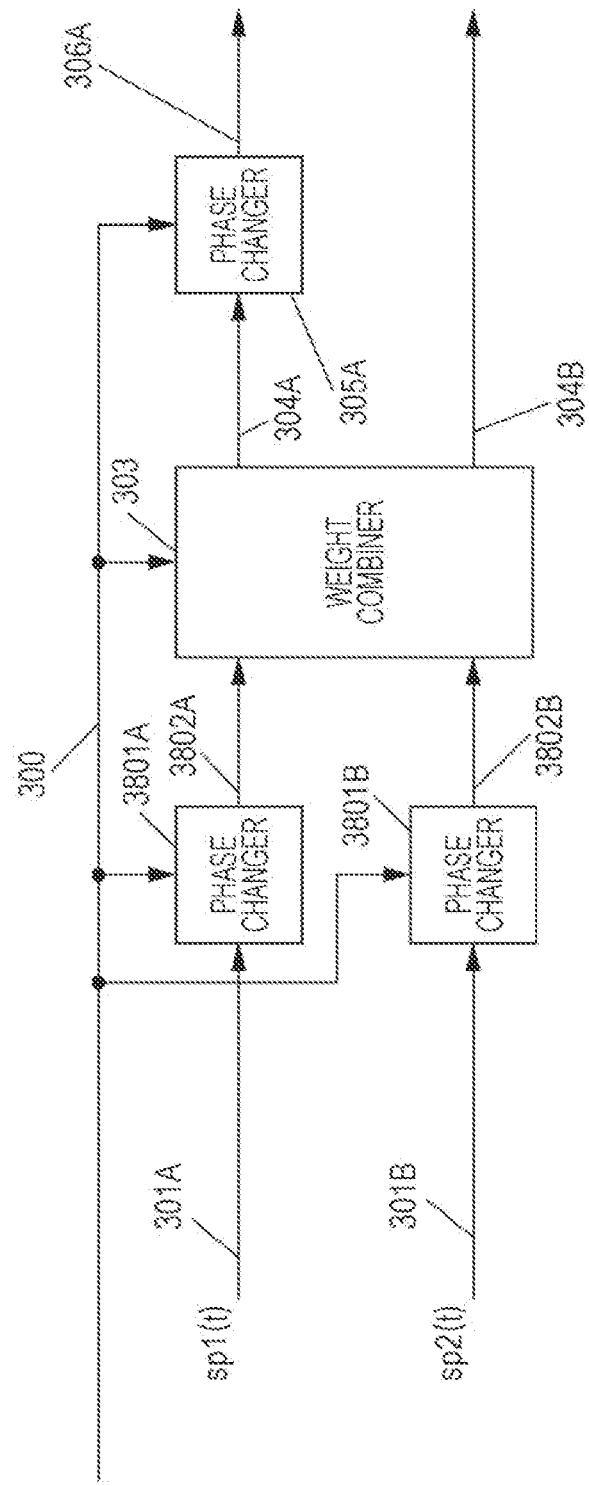
FIG. 42 is a diagram illustrating a third example in which phase changers are arranged upstream and downstream of the weight combiner.

FIG. 42 is a diagram illustrating a third example in which phase changers are arranged upstream and downstream of the weight combiner 303. In FIG. 42, the elements similar to those in FIGS. 3, 26, 38, 39, and 40 are denoted by the same numerals, and the description thereof is omitted.

In FIG. 42, unlike in FIG. 41, the phase changer 305A exists downstream of the weight combiner 303 in the upper stage. The phase-changed signal 306A is input to the inserter 307A illustrated in FIGS. 3, 26, 38, and 39. Also, the weighted signal 304B is input to the inserter 307B illustrated in FIGS. 3, 26, 38, and 39.

Figure 43:
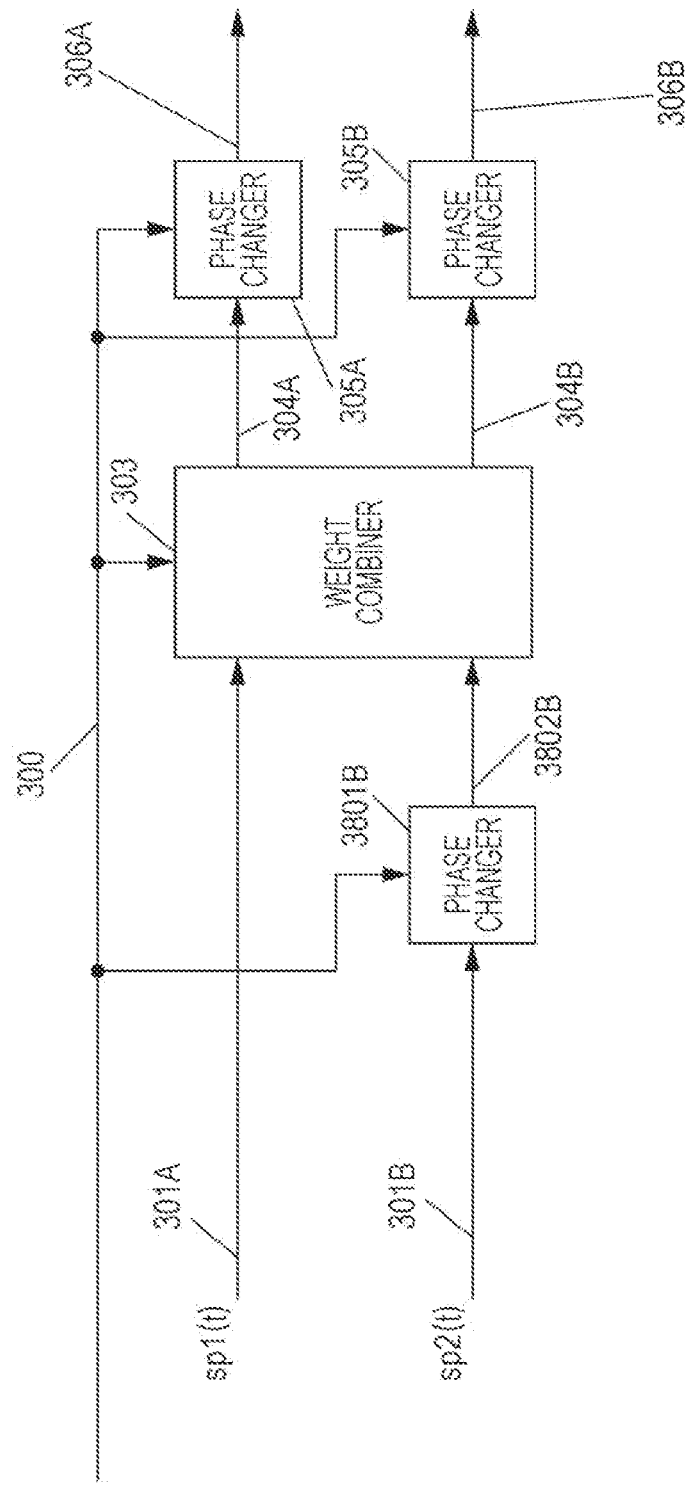
FIG. 43 is a diagram illustrating a fourth example in which phase changers are arranged upstream and downstream of the weight combiner.

FIG. 43 is a diagram illustrating a fourth example in which phase changers are arranged upstream and downstream of the weight combiner 303. In FIG. 43, the elements similar to those in FIGS. 3, 26, 38, 39, and 40 are denoted by the same numerals, and the description thereof is omitted.

In FIG. 43, unlike in FIG. 40, only the phase changer 3801B exists upstream of the weight combiner 303. The phase-changed signal 306A is input to the inserter 307A illustrated in FIGS. 3, 26, 38, and 39. Also, the phase-changed signal 306B is input to the inserter 307B illustrated in FIGS. 3, 26, 38, and 39.

Figure 44:
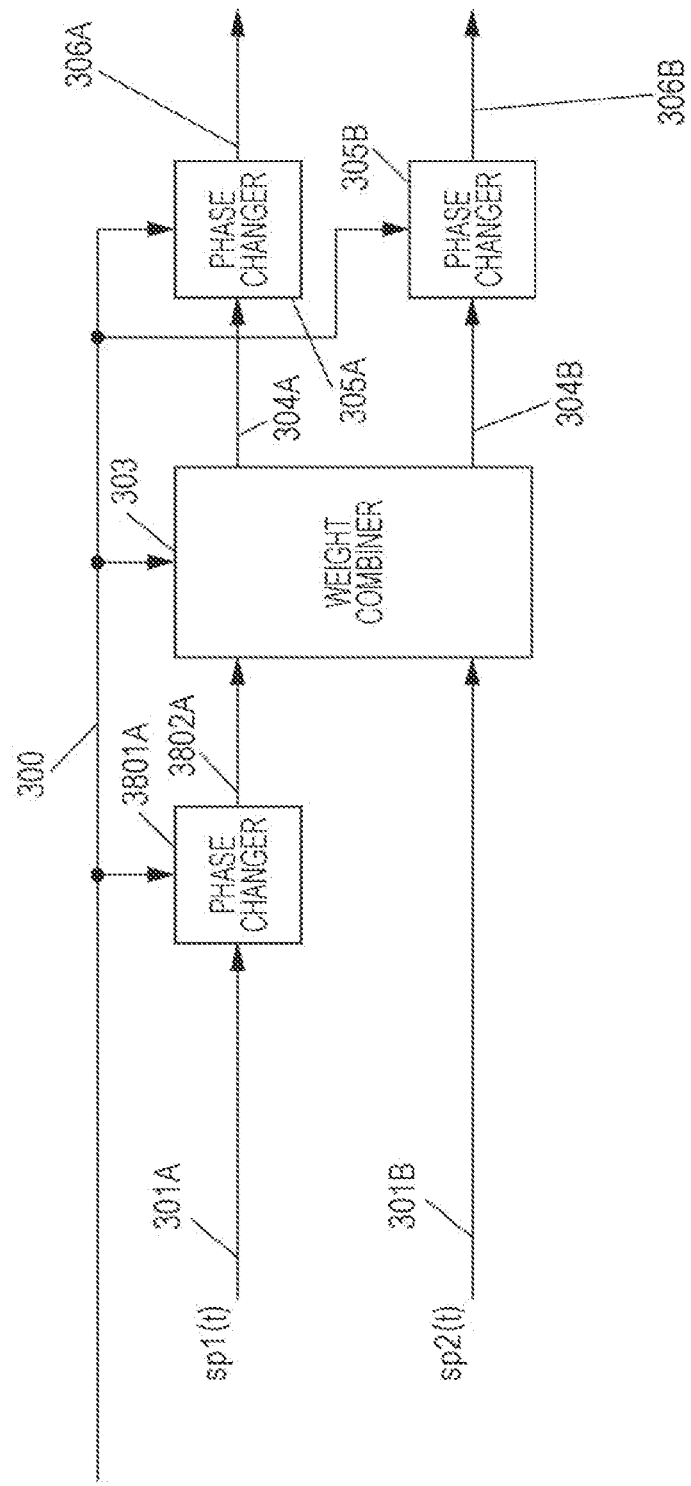
FIG. 44 is a diagram illustrating a fifth example in which phase changers are arranged upstream and downstream of the weight combiner.

FIG. 44 is a diagram illustrating a fifth example in which phase changers are arranged upstream and downstream of the weight combiner 303. In FIG. 44, the elements similar to those in FIGS. 3, 26, 38, 39, and 40 are denoted by the same numerals, and the description thereof is omitted.

In FIG. 44, unlike in FIG. 43, the phase changer 3801A exists upstream of the weight combiner 303 in the upper stage. The phase-changed signal 306A is input to the inserter 307A illustrated in FIGS. 3, 26, 38, and 39. Also, the phase-changed signal 306B is input to the inserter 307B illustrated in FIGS. 3, 26, 38, and 39.

Figure 45:
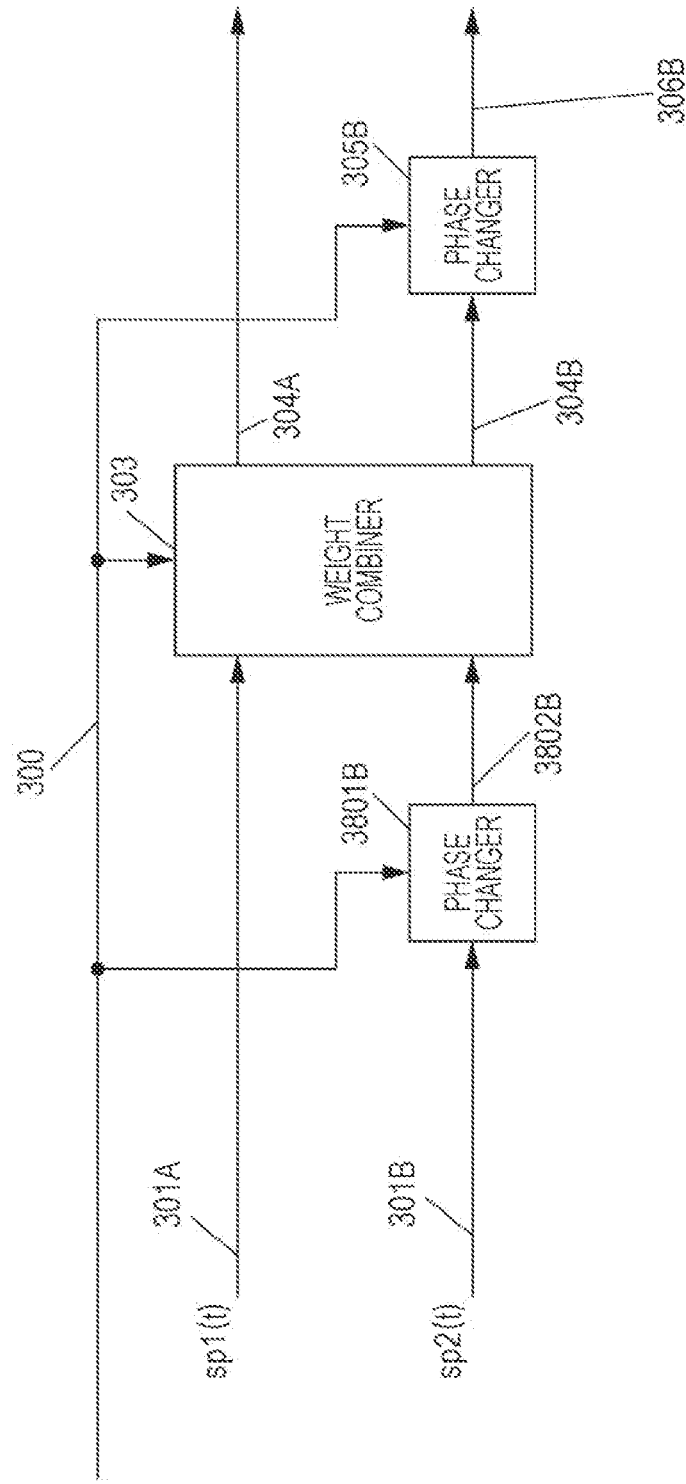
FIG. 45 is a diagram illustrating a sixth example in which phase changers are arranged upstream and downstream of the weight combiner.

FIG. 45 is a diagram illustrating a sixth example in which phase changers are arranged upstream and downstream of the weight combiner 303. In FIG. 45, the elements similar to those in FIGS. 3, 26, 38, 39, and 40 are denoted by the same numerals, and the description thereof is omitted.

In FIG. 45, the phase changer 3801B is arranged upstream of the weight combiner 303 in the lower stage, and the phase changer 305B is arranged downstream of the weight combiner 303 in the lower stage. The weighted signal 304A is input to the inserter 307A illustrated in FIGS. 3, 26, 38, and 39. Also, the phase-changed signal 306B is input to the inserter 307B illustrated in FIGS. 3, 26, 38, and 39.

Figure 46:
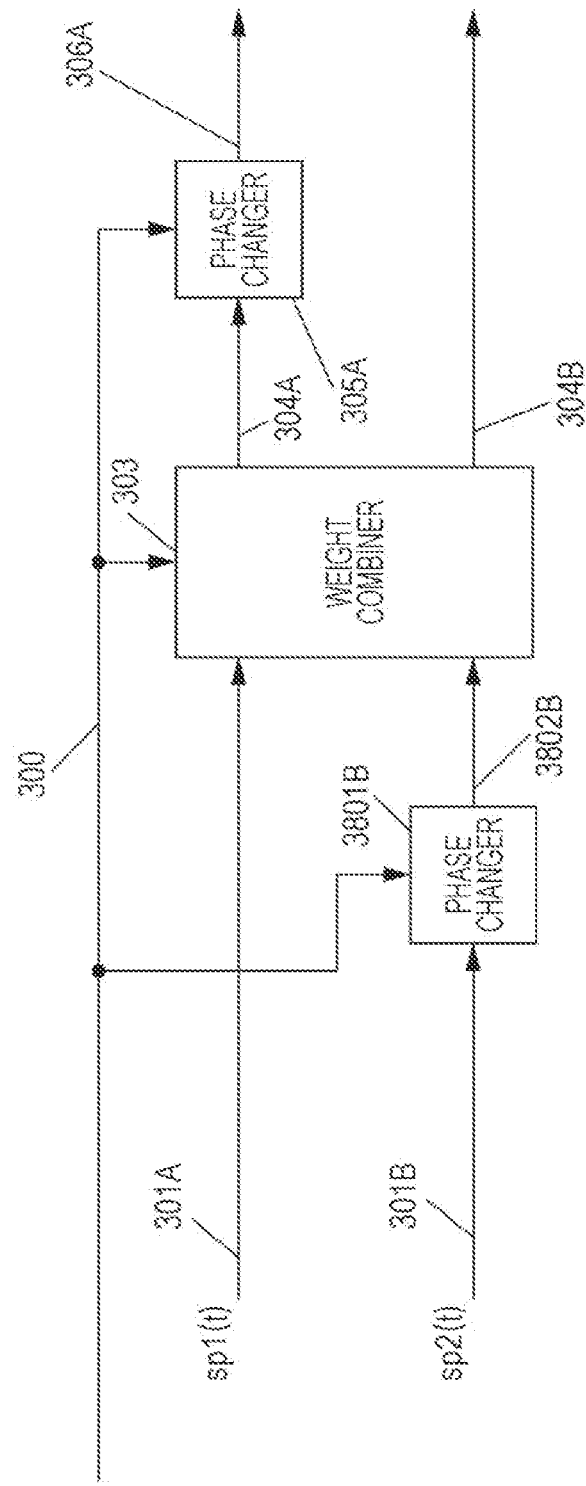
FIG. 46 is a diagram illustrating a seventh example in which phase changers are arranged upstream and downstream of the weight combiner.

FIG. 46 is a diagram illustrating a seventh example in which phase changers are arranged upstream and downstream of the weight combiner 303. In FIG. 46, the elements similar to those in FIGS. 3, 26, 38, 39, and 40 are denoted by the same numerals, and the description thereof is omitted.

In FIG. 46, the phase changer 3801B is arranged upstream of the weight combiner 303 in the lower stage, and the phase changer 305A is arranged downstream of the weight combiner 303 in the upper stage. The phase-changed signal 306A is input to the inserter 307A illustrated in FIGS. 3, 26, 38, and 39. Also, the weighted signal 304B is input to the inserter 307B illustrated in FIGS. 3, 26, 38, and 39.

Figure 47:
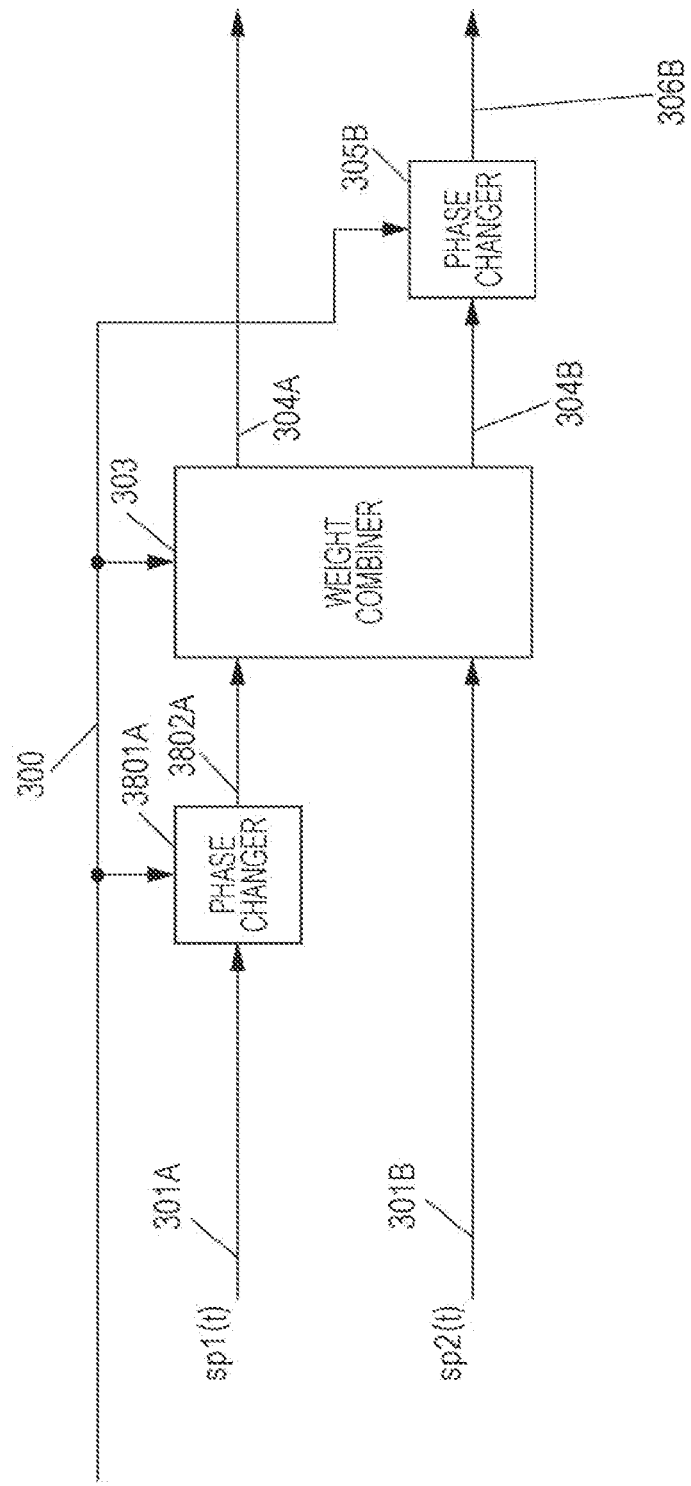
FIG. 47 is a diagram illustrating an eighth example in which phase changers are arranged upstream and downstream of the weight combiner.

FIG. 47 is a diagram illustrating an eighth example in which phase changers are arranged upstream and downstream of the weight combiner 303. In FIG. 47, the elements similar to those in FIGS. 3, 26, 38, 39, and 40 are denoted by the same numerals, and the description thereof is omitted.

In FIG. 47, the phase changer 3801A is arranged upstream of the weight combiner 303 in the upper stage, and the phase changer 305B is arranged downstream of the weight combiner 303 in the lower stage. The weighted signal 304A is input to the inserter 307A illustrated in FIGS. 3, 26, 38, and 39. Also, the phase-changed signal 306B is input to the inserter 307B illustrated in FIGS. 3, 26, 38, and 39.

Figure 48:
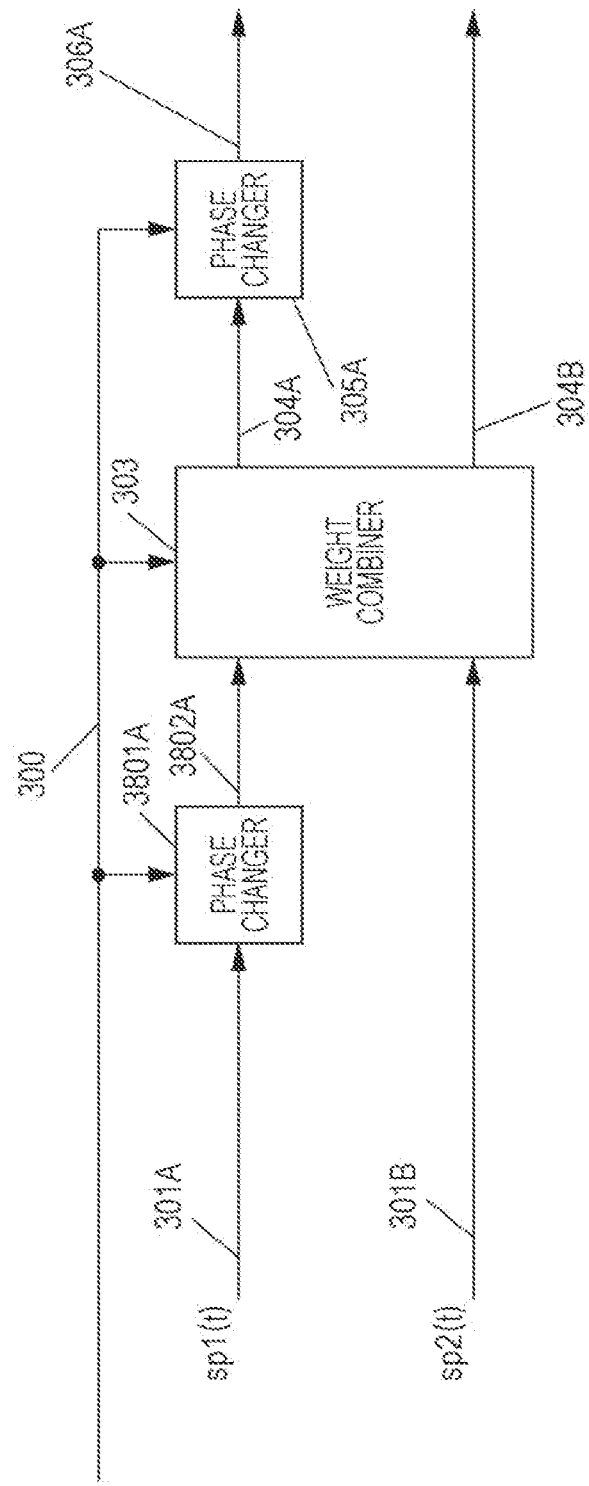
FIG. 48 is a diagram illustrating a ninth example in which phase changers are arranged upstream and downstream of the weight combiner.

FIG. 48 is a diagram illustrating a ninth example in which phase changers are arranged upstream and downstream of the weight combiner 303. In FIG. 48, the elements similar to those in FIGS. 3, 26, 38, 39, and 40 are denoted by the same numerals, and the description thereof is omitted.

In FIG. 48, the phase changer 3801A is arranged upstream of the weight combiner 303 in the upper stage, and the phase changer 305A is arranged downstream of the weight combiner 303 in the upper stage. The phase-changed signal 306A is input to the inserter 307A illustrated in FIGS. 3, 26, 38, and 39. Also, the weighted signal 304B is input to the inserter 307B illustrated in FIGS. 3, 26, 38, and 39.

Also with the above-described configurations, individual embodiments in this specification can be carried out, and the effects described in the individual embodiments can be obtained. The phase change methods for the phase changers 3801A, 3801B, 305A, and 305B in FIGS. 40, 41, 42, 43, 44, 45, 46, 47, and 48 are set by the control signal 300, for example.

Tenth Embodiment

FIGS. 3, 26, 38, and 39 illustrate a configuration including the phase changer 309B as the configuration after the inserter 307A (i.e., on the output side of the inserter 307A) and after the inserter 307B (i.e., on the output side of the inserter 307B). In the present embodiment, a description will be given of an example configuration different from this configuration. The configurations illustrated in FIGS. 40 to 48 may be used as the configuration before the inserter 307A and before the inserter 307B.

Figure 49:
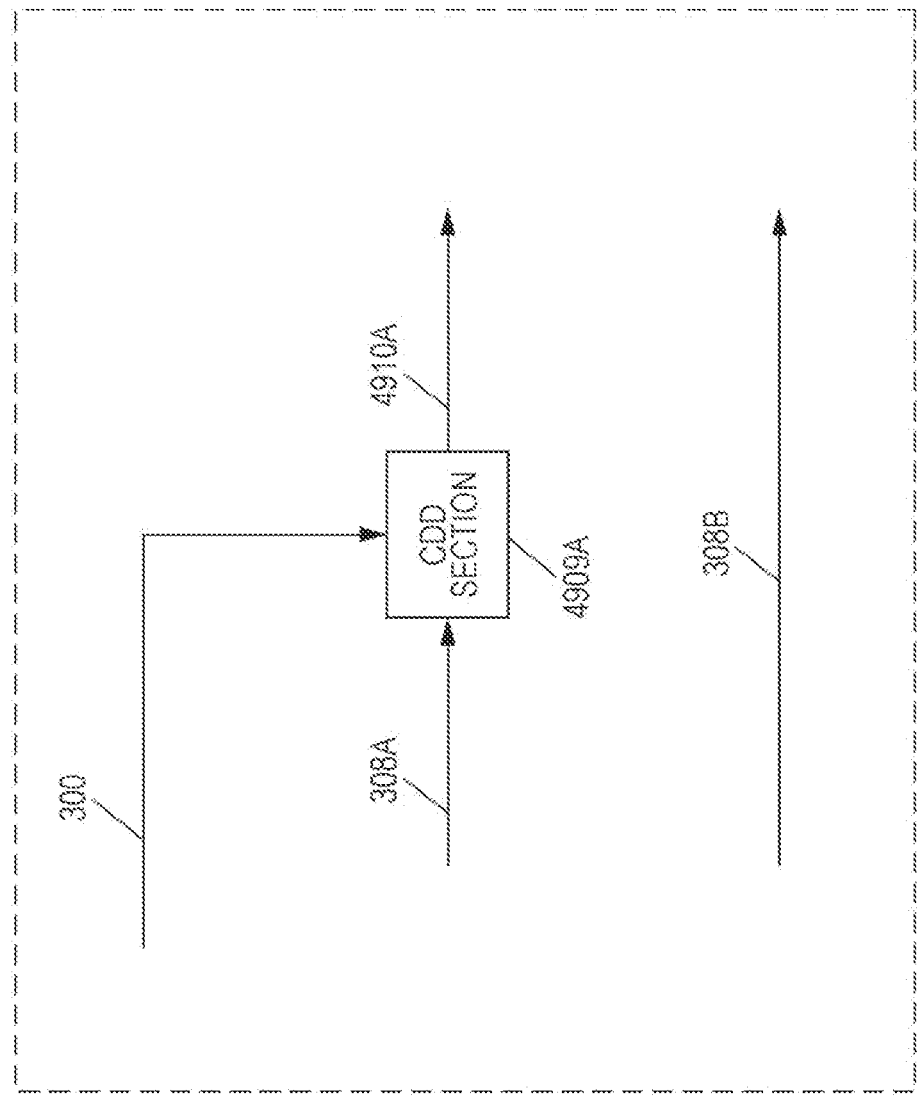
FIG. 49 is a diagram illustrating a first example configuration on the output side of an inserter.

FIG. 49 is a diagram illustrating a first example configuration on the output side of the inserter. In FIG. 49, the elements similar to those in FIGS. 3, 26, 38, 39, and so forth are denoted by the same numerals, and the description thereof is omitted.

A Cyclic Delay Diversity (CDD) section 4909A receives the baseband signal 308A and the control signal 300. On the basis of the control signal 300, the CDD section 4909A performs CDD processing on the baseband signal 308A, and outputs a CDD-processed baseband signal 4910A. CDD may also be called Cyclic Shift Diversity (CSD).

The CDD-processed baseband signal 4910A in FIG. 49 corresponds to the signal denoted by 207_A in FIG. 2, and the baseband signal 308B corresponds to the signal denoted by 207_B in FIG. 2.

Figure 50:
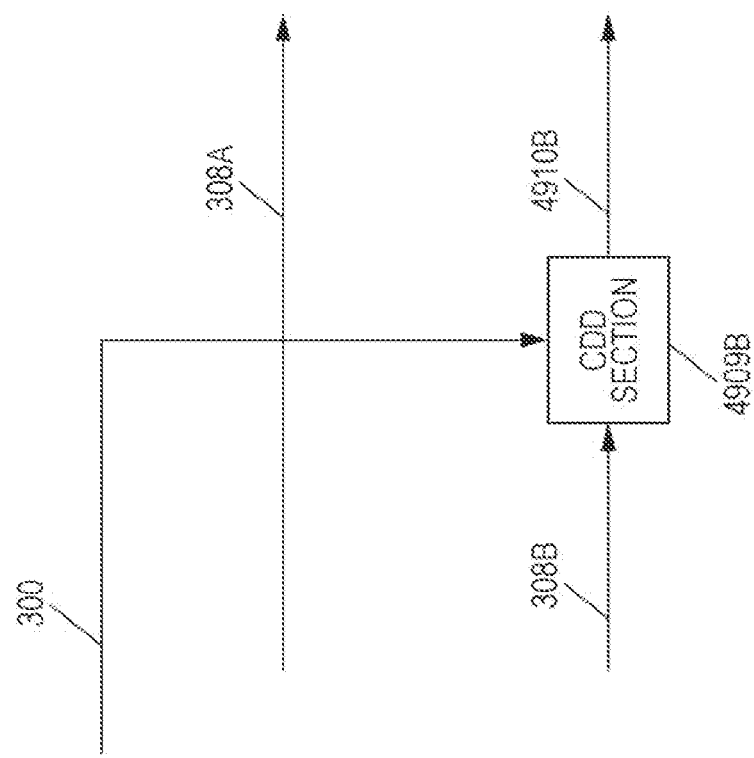
FIG. 50 is a diagram illustrating a second example configuration on the output side of the inserter.

FIG. 50 is a diagram illustrating a second example configuration on the output side of the inserter. In FIG. 50, the elements similar to those in FIGS. 3, 26, 38, 39, and so forth are denoted by the same numerals, and the description thereof is omitted.

A CDD section 4909B receives the baseband signal 308B and the control signal 300. On the basis of the control signal 300, the CDD section 4909B performs CDD processing on the baseband signal 308B, and outputs a CDD-processed baseband signal 4910B.

The baseband signal 308A in FIG. 50 corresponds to the signal denoted by 207_A in FIG. 2, and the CDD-processed baseband signal 4910B corresponds to the signal denoted by 207_B in FIG. 2.

Figure 51:
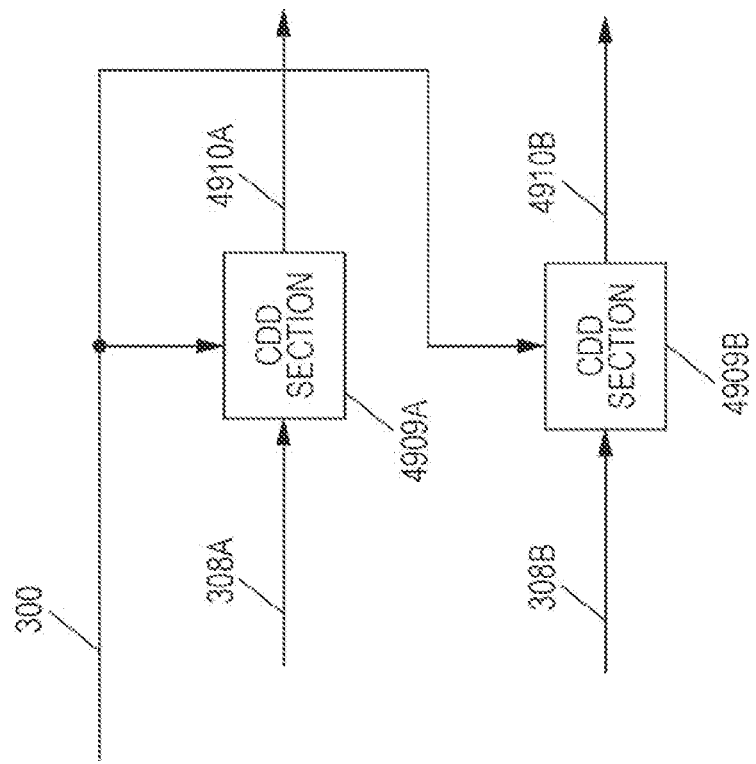
FIG. 51 is a diagram illustrating a third example configuration on the output side of the inserter.

FIG. 51 is a diagram illustrating a third example configuration on the output side of the inserter. In FIG. 51, the elements similar to those in FIGS. 3, 26, 38, 39, 49, and 50 are denoted by the same numerals, and the description thereof is omitted. The example configuration illustrated in FIG. 51 is an example configuration in which both the CDD section 4909A illustrated in FIG. 49 and the CDD section 4909B illustrated in FIG. 50 are arranged.

The CDD-processed baseband signal 4910A in FIG. 51 corresponds to the signal denoted by 207_A in FIG. 2, and the CDD-processed baseband signal 4910B corresponds to the signal denoted by 207_B in FIG. 2.

FIGS. 49, 50, and 51 illustrate example configurations in which the CDD section is arranged on the output side of the inserter. Alternatively, a phase changer may be arranged on the output side of the inserter, as illustrated in FIGS. 3, 26, and 38. The position of the phase changer may be different from that in FIGS. 3, 26, and 38. Hereinafter, the arrangement of a phase changer will be described.

Figure 52:
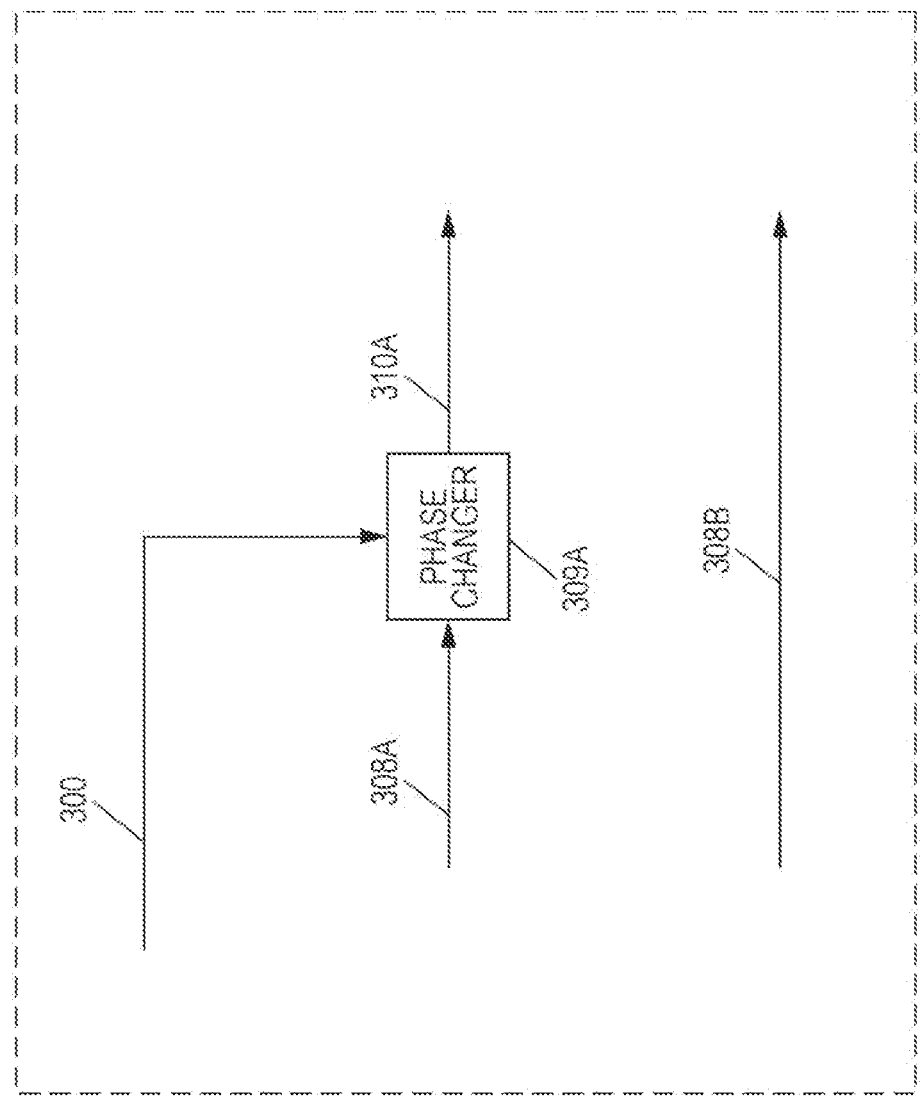
FIG. 52 is a diagram illustrating a fourth example configuration on the output side of the inserter.

FIG. 52 is a diagram illustrating a fourth example configuration on the output side of the inserter. In FIG. 52, the elements similar to those in FIGS. 3, 26, 38, 39, and so forth are denoted by the same numerals, and the description thereof is omitted.

A phase changer 309A receives the baseband signal 308A and the control signal 300. On the basis of the control signal 300, the phase changer 309A performs phase change processing on the baseband signal 308A, and outputs a phase-changed baseband signal 310A.

The phase-changed baseband signal 310A in FIG. 52 corresponds to the signal denoted by 207_A in FIG. 2, and the baseband signal 308B corresponds to the signal denoted by 207_B in FIG. 2.

Figure 53:
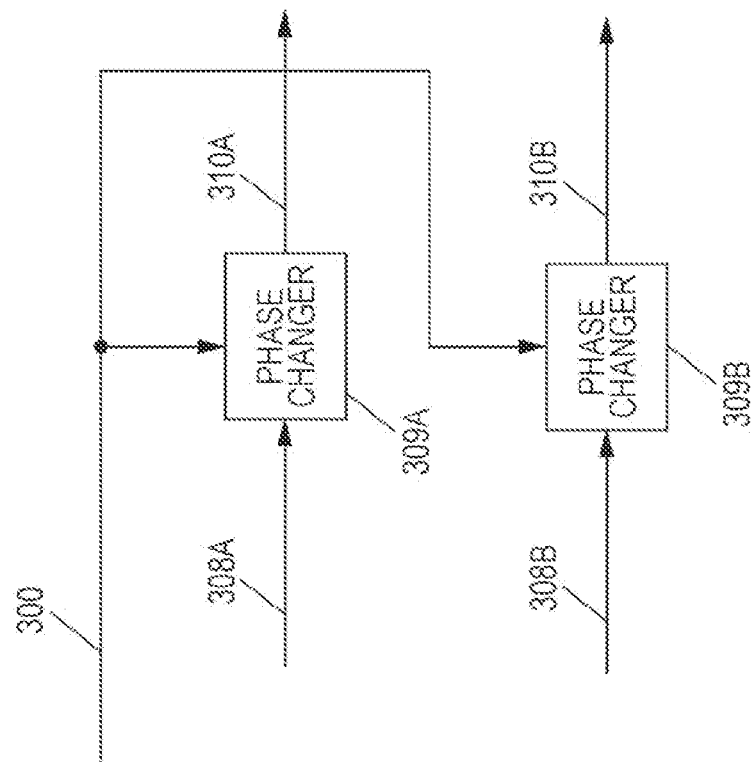
FIG. 53 is a diagram illustrating a fifth example configuration on the output side of the inserter.

FIG. 53 is a diagram illustrating a fifth example configuration on the output side of the inserter. In FIG. 53, the elements similar to those in FIGS. 3, 26, 38, 39, 52, and so forth are denoted by the same numerals, and the description thereof is omitted.

The phase-changed baseband signal 310A in FIG. 53 corresponds to the signal denoted by 207_A in FIG. 2, and the phase-changed baseband signal 310B corresponds to the signal denoted by 207_B in FIG. 2.

Figure 54:
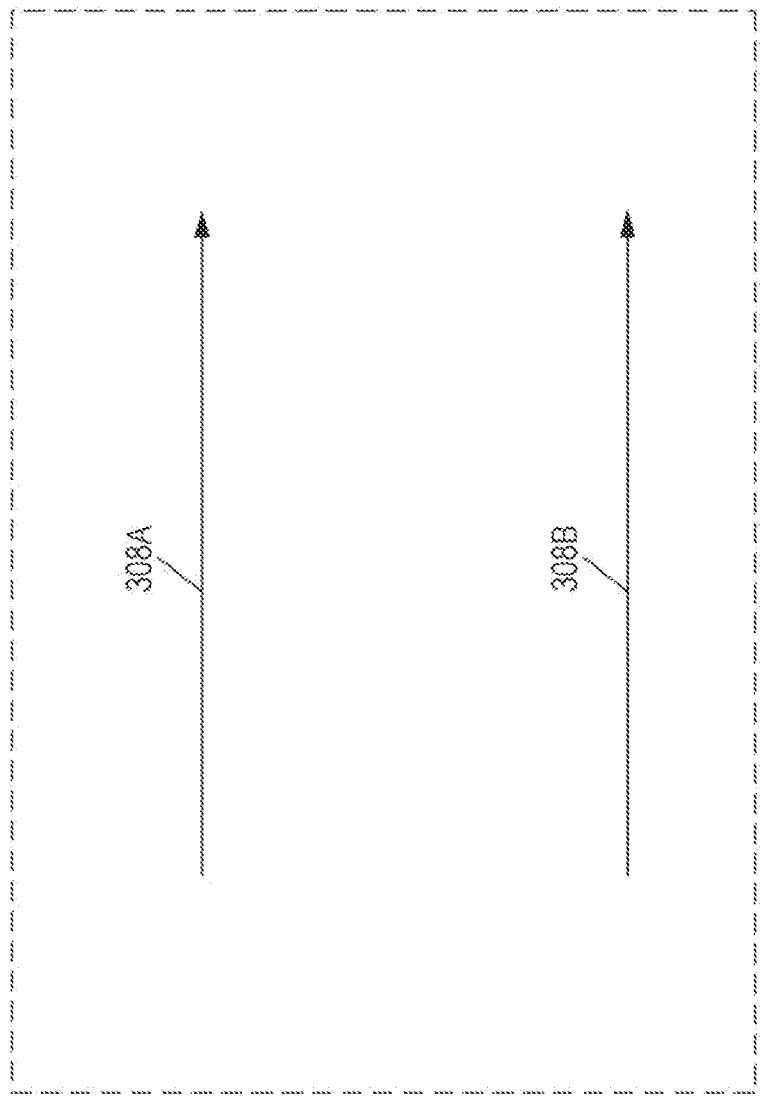
FIG. 54 is a diagram illustrating a sixth example configuration on the output side of the inserter.

FIG. 54 is a diagram illustrating a sixth example configuration on the output side of the inserter. In FIG. 54, the elements similar to those in FIGS. 3, 26, 38, 39, 52, and so forth are denoted by the same numerals, and the description thereof is omitted.

The baseband signal 308A in FIG. 54 corresponds to the signal denoted by 207_A in FIG. 2, and the baseband signal 308B corresponds to the signal denoted by 207_B in FIG. 2.

Also with the above-described configurations, individual embodiments in this specification can be carried out, and the effects described in the individual embodiments can be obtained.

Regarding CDD (CSD)

In the first embodiment, the ninth embodiment, and so forth, CDD (CSD) is described. In FIGS. 49, 50, and 51, the CDD sections 4909A and 4909B are illustrated. In addition, in FIGS. 3, 26, 38, 39, 52, 53, and 54, the phase changers 309A and 309B are illustrated.

Hereinafter, a supplemental description will be given of specific processing of CDD (CSD) and phase change.

Figure 55:
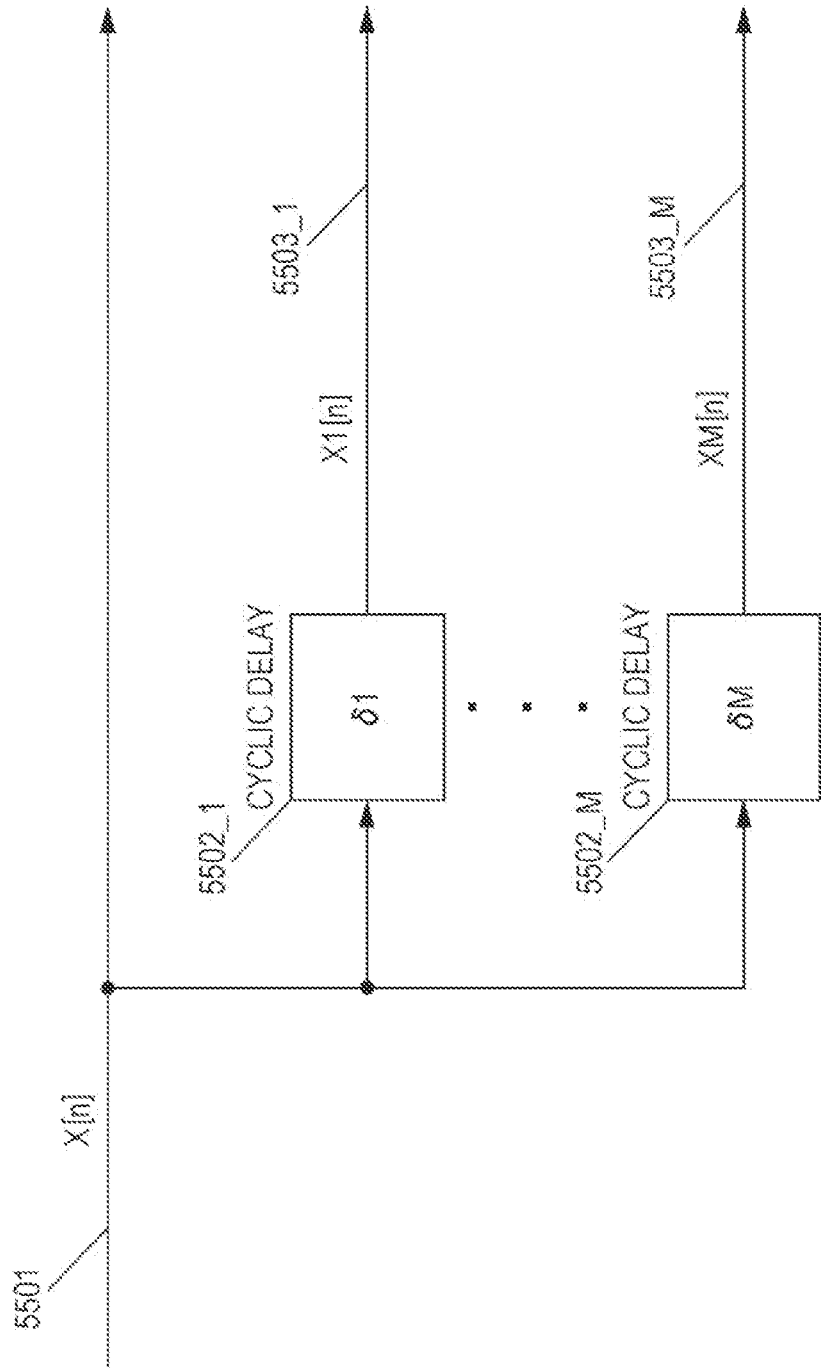
FIG. 55 is a diagram for describing CDD (CSD)

FIG. 55 is a diagram for describing CDD (CSD). In FIG. 55, 5502_1 to 5502_M denote the sections that perform processing similar to the processing performed by the CDD sections 4909A and 4909B in FIGS. 49, 50, and 51. In FIG. 55, a modulated signal 5501 that is to be subjected to cyclic delay is represented by X[n]. It is assumed that X[n] is made up of N samples (N is an integer equal to or greater than 2), and thus n is an integer from 0 to N-1.

The cyclic delay section 5502_1 receives the modulated signal 5501, performs cyclic delay processing, and outputs a cyclic-delay-processed signal 5503_1. When the cyclic-delay-processed signal 5503_1 is represented by X1[n], X1[n] is given as the following Expression (58).

$$X1[n] = X[(n-\delta 1) \bmod N] \quad \text{Expression (58)}$$

Here, δ1 is a cyclic delay amount (δ1 is a real number). In addition, mod represents modulo, and "A mod B" means "a remainder obtained by dividing A by B". That is, X1[n] is a signal obtained by delaying the modulated signal X[n] having N samples by δ1 and moving the portion in the range from (N-δ1) to N of the modulated signal X[n] to the top. In the description given above, a discrete signal is described as an example, but similarprocessing may be performed on a continuous signal. The same applies to an output signal of cyclic delay in the following description.

The cyclic delay section 5502_M receives the modulated signal 5501, performs cyclic delay processing, and outputs a cyclic-delay-processed signal 5503_M. When the cyclic-delay-processed signal 5503_M is represented by XM[n], XM[n] is given as the following Expression (59).

$$XM[n] = X[(n-\delta M) \bmod N] \quad \text{Expression (59)}$$

Here, δM is a cyclic delay amount (δM is an integer).

Thus, a cyclic delay section 5502_i (i is in integer from 1 to M (M is an integer equal to or greater than 1) receives the modulated signal 5501, performs cyclic delay processing, and outputs a cyclic-delay-processed signal 5503_i. When the cyclic-delay-processed signal 5503_i is represented by Xi[n], Xi[n] is given as the following Expression (60).

$$Xi[n] = X[(n-\delta i) \bmod N] \quad \text{Expression (60)}$$

Here, δi is an amount of cyclic delay (δi is an integer).

The cyclic-delay-processed signal 5503_i is transmitted from an antenna i (thus, the cyclic-delay-processed signal 5503_1, ..., and the cyclic-delay-processed signal 5503_M are transmitted from different antennas).

Accordingly, a diversity effect of cyclic delay can be obtained (in particular, a negative influence of a delayed wave can be reduced), and the data reception quality can be improved in the reception apparatus.

For example, the phase changers 309A and 309B in FIGS. 3, 26, 38, 39, 52, 53, and 54 may be replaced with the cyclic delay sections illustrated in FIG. 55, and the operations of the phase changers 309A and 309B may be the same as the operations of the cyclic delay sections.

Thus, a cyclic delay amount δ (δ is an integer) is given in the phase changers 309A and 309B in FIGS. 3, 26, 38, 39, 52, 53, and 54, and the input signal of the phase changers 309A and 309B is represented by Y[n]. When the output signal of the phase changer 209B is represented by Z[n], Z[n] is given as Expression (61).

$$Z[n] = Y[(n-\delta) \bmod N] \qquad \text{Expression (61)}$$

Here, Y[n] is made up of N symbols (N is an integer equal to or greater than 2). Thus, n is an integer from 0 to N-1.

Next, a description will be given of the relationship between a cyclic delay amount and phase change. For example, the case of applying CDD (CSD) to OFDM will be discussed. It is assumed that the carrier of the lowest frequency is "carrier 1", and "carrier 2", "carrier 3", and "carrier 4" follow in this order.

For example, it is assumed that a cyclic delay amount μ is given in the phase changers 309A and 309B in FIGS. 3, 26, 38, 39, 52, 53, and 54. Then, a phase change value Ω[i] in "carrier i" is expressed by the following Expression (62).

$$\Omega[i] = e^{j \cdot \mu \cdot i} \qquad \text{Expression (62)}$$

Here, μ is a value that can be obtained from a cyclic delay amount, a fast Fourier transform (FFT) size, and so forth.

When "carrier i" before phase change (before cyclic delay processing) and the baseband signal at time t are represented by v'[i][t], "carrier i" after phase change and the signal v[i][t] at time t can be expressed by v[i][t] = Ω[i]×v'[i][t].

Eleventh Embodiment

In this specification, the example configuration illustrated in FIG. 2 has been described as an example of the configuration of the user #p signal processor 102_p in FIG. 1. In the present embodiment, a description will be given of a configuration different from that in FIG. 2 as the configuration of the user #p signal processor 102_p in FIG. 1.

Figure 56:
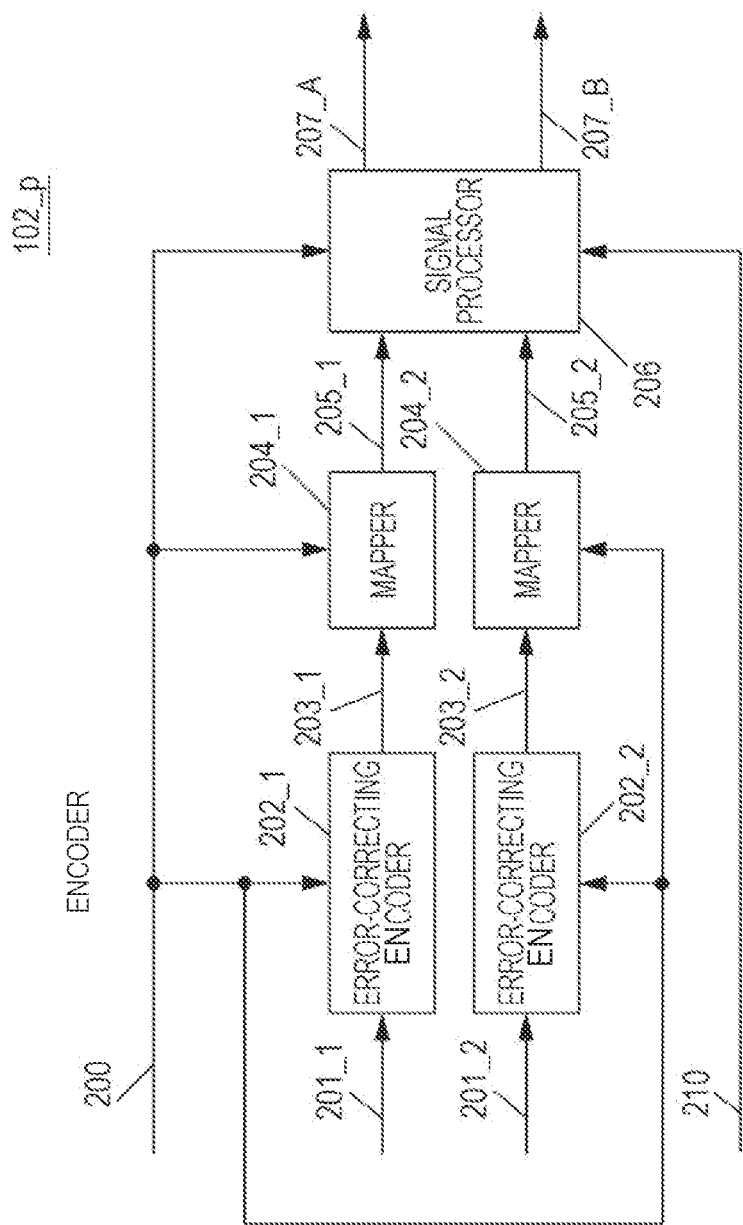
FIG. 56 is a diagram illustrating an example of the configuration of the signal processor for the user #p different from FIG. 2.

FIG. 56 is a diagram illustrating an example of the configuration of the user #p signal processor different from that in FIG. 2. In FIG. 56, the elements similar to those in FIG. 2 are denoted by the same reference numerals, and the description thereof is omitted. In FIG. 56, the point different from FIG. 2 is that multiple error-correcting encoders and multiple mappers exist.

Specifically, in FIG. 56, two error-correcting encoders (error-correcting encoders 202_1 and 202_2) exist. FIG. 2 illustrates a configuration including one error-correcting encoder 202 and FIG. 56 illustrates a configuration including two error-correcting encoders (202_1 and 202_2), but the number of error-correcting encoders is not limited thereto. For example, in a case where there are three or more error-correcting encoders, the mapper 204 (204_1 and 204_2) performs mapping by using the data output from each error-correcting encoder.

In FIG. 56, the error-correcting encoder 202_1 receives first data 201_1 and the control signal 200. On the basis of information about an error-correcting coding method included in the control signal 200, the error-correcting encoder 202_1 performs error-correcting coding on the first data 201_1, and outputs coded data 203_1.

The mapper 204_1 receives the coded data 203_1 and the control signal 200. On the basis of information about a modulation scheme included in the control signal 200, the mapper 204_1 performs mapping on the coded data 203_1, and outputs the mapped signal 205_1.

The error-correcting encoder 202_2 receives second data 201_2 and the control signal 200. On the basis of information about an error-correcting coding method included in the control signal 200, the error-correcting encoder 202_2 performs error-correcting coding on the second data 201_2, and outputs coded data 203_2.

The mapper 204_2 receives the coded data 203_2 and the control signal 200. On the basis of information about a modulation scheme included in the control signal 200, the mapper 204_2 performs mapping on the coded data 203_2, and outputs the mapped signal 205_2.

In the each embodiment described in this specification, even if the configuration of the user #p signal processor 102_p illustrated in FIG. 2 is replaced with the configuration illustrated in FIG. 56, the embodiment can be carried out similarly and a similar effect can be obtained.

In addition, for example, the case of generating a signal with the configuration in FIG. 2 and the case of generating a signal with the configuration in FIG. 56 may be switched in the user #p signal processor 102_p.

Twelfth Embodiment

In the above embodiments, a description has been given of the configurations in which a mapper is included in the user #p signal processor, with reference to FIGS. 2, 31, 32, and 56, for example. In the present embodiment, a description will be given of a method for realizing robust communication in the mapper, by using the following first to sixth examples.

First Example

Figure 57:
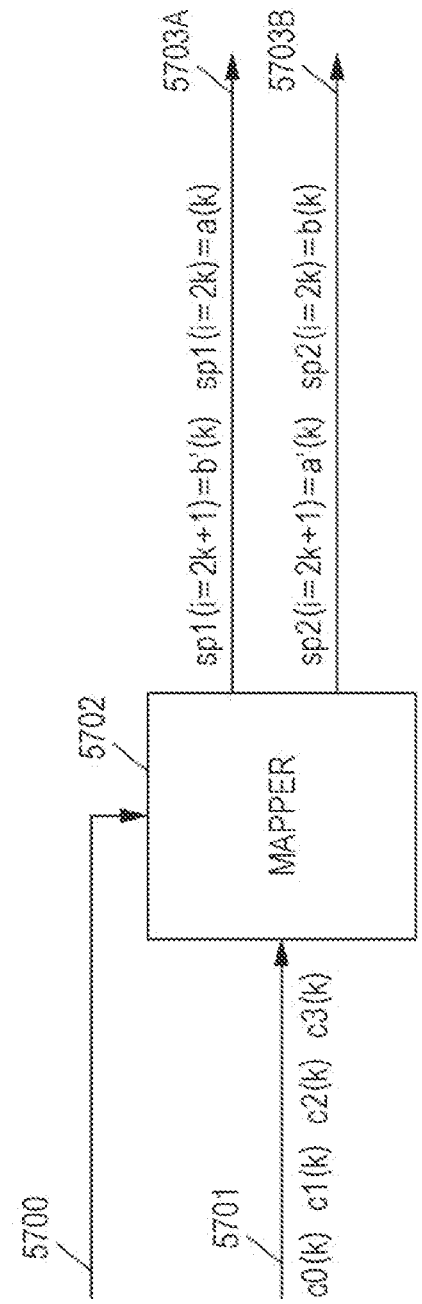
FIG. 57 is a diagram illustrating a first example of the operation of a mapper.

FIG. 57 is a diagram illustrating the first example of the operation of a mapper 5702. The operation of the mapper 5702 illustrated in FIG. 57 corresponds to an example of the operation of the mapper 204 in the user #p signal processor 102_p illustrated in FIG. 2. In addition, a control signal 5700 corresponds to the control signal 200 in FIG. 2, coded data 5701 corresponds to the user #p data 203 in FIG. 2, a mapped signal 5703A corresponds to the mapped signal 205_1 in FIG. 2, and a mapped signal 5703B corresponds to the mapped signal 205_2 in FIG. 2.

The mapper 5702 receives the coded data 5701 and the control signal 5700. In a case where a robust transmission method is designated by the control signal 5700, the mapper 5702 performs the mapping described below, and outputs the mapped signals 5703A and 5703B (for the user #p).

It is assumed that bit c0(k), bit c1(k), bit c2(k), and bit c3(k) are input as the coded data 5701 to the mapper 5702. Here, k is an integer equal to or greater than 0.

It is assumed that the mapper 5702 performs QPSK modulation on c0(k) and c1(k) to obtain a mapped signal a(k). In addition, it is assumed that the mapper 5702 performs QPSK modulation on c2(k) and c3(k) to obtain a mapped signal b(k).

Also, it is assumed that the mapper 5702 performs QPSK modulation on c0(k) and c1(k) to obtain a mapped signal a'(k). In addition, it is assumed that the mapper 5702 performs QPSK modulation on c2(k) and c3(k) to obtain a mapped signal b'(k).

The mapped signal 5703A with a symbol number i = 2k is represented by sp1(i = 2k), and the mapped signal 5703B with a symbol number i = 2k is represented by sp2(i = 2k). Also, the mapped signal 5703A with a symbol number i = 2k+1 is represented by sp1(i = 2k+1), and the mapped signal 5703B with a symbol number i = 2k+1 is represented by sp2(i = 2k+1).

In addition, sp1(i = 2k), which is the mapped signal 5703A with a symbol number i = 2k, is represented by a(k), and sp2(i = 2k), which is the mapped signal 5703B with a symbol number i = 2k, is represented by b(k). Also, sp1(i = 2k+1), which is the mapped signal 5703A with a symbol number i = 2k+1, is represented by b'(k), and sp2(i = 2k+1), which is the mapped signal 5703B with a symbol number i = 2k+1, is represented by a'(k).

That is, the mapper 5702 performs QPSK modulation on c0(k) and c1(k) to generate a(k) as the mapped signal 5703A (sp1(i = 2k)) with a symbol number i = 2k. Also, the mapper 5702 performs QPSK modulation on c0(k) and c1(k) to generate a'(k) as the mapped signal 5703B (sp2(i = 2k+1)) with a symbol number i = 2k+1.

Also, the mapper 5702 performs QPSK modulation on c2(k) and c3(k) to generate b(k) as the mapped signal 5703B (sp2(i = 2k)) with a symbol number i = 2k. Also, the mapper 5702 performs QPSK modulation on c2(k) and c3(k) to generate b'(k) as the mapped signal 5703A (sp1(i = 2k+1)) with a symbol number i = 2k+1.

In this way, the mapper 5702 outputs two mapped signals (for example, a(k) and a'(k)) with different symbol numbers i and different streams (i.e., sp1 or sp2) by using identical bits (for example, c0(k) and c1(k)).

As described above, a(k) and a'(k) are generated from the identical bits c0(k) and c1(k) and output from the mapper 5702 as different symbol numbers and different streams. Likewise, b(k) and b'(k) are generated from the identical bits c2(k) and c3(k) and output from the mapper 5702 as different symbol numbers and different streams.

The mapper 5702 may change signal point arrangement when generating a(k) and a'(k). Also, the mapper 5702 may change signal point arrangement when generating b(k) and b'(k). Hereinafter, a description will be given of an example of signal point arrangement of QPSK modulation, an example of the relationship between a(k) and a'(k), and an example of the relationship between b(k) and b'(k).

Example of Signal Point Arrangement of QPSK Modulation

Figure 58:
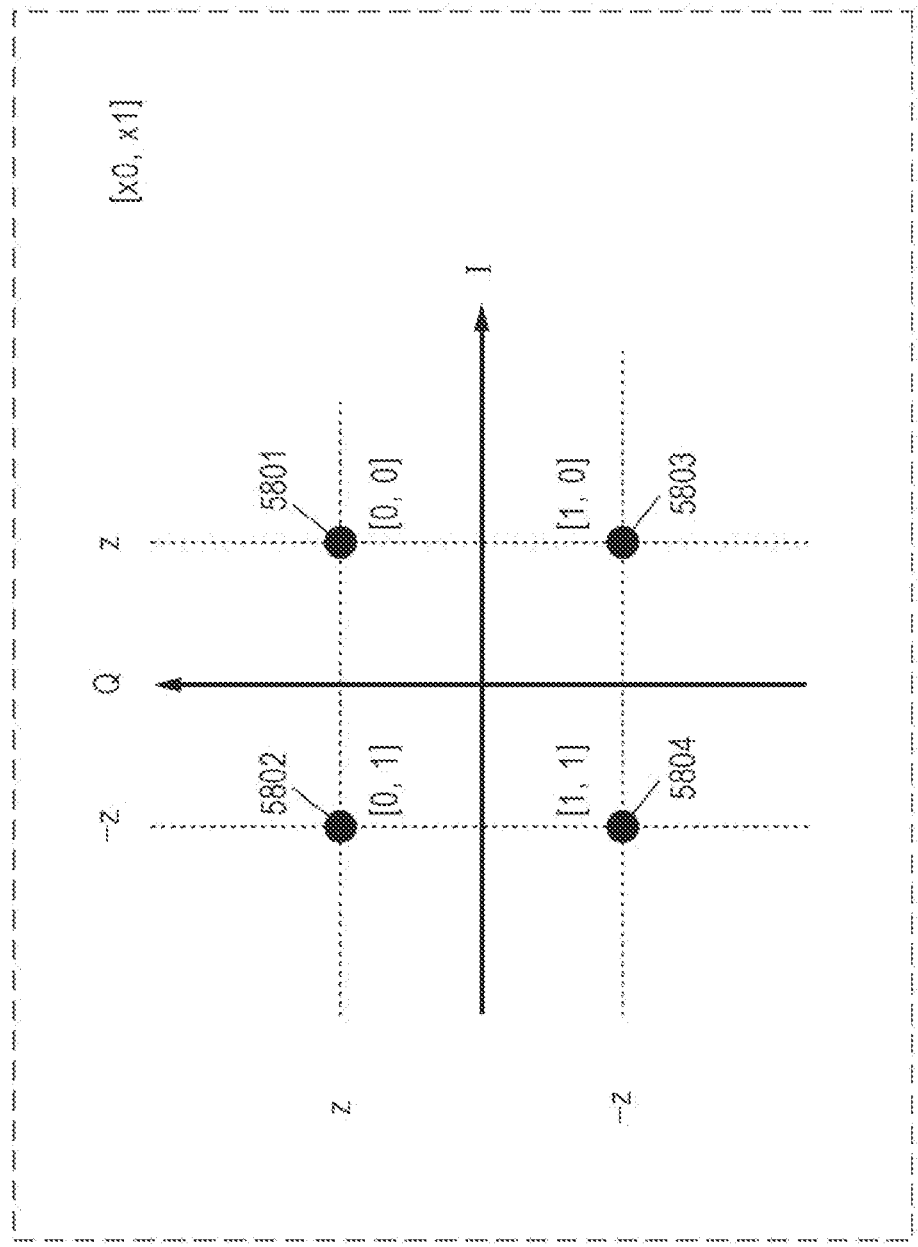
FIG. 58 is a diagram illustrating a first example of signal point arrangement of QPSK modulation on the in-phase I quadrature Q plane.

FIG. 58 is a diagram illustrating a first example of signal point arrangement of QPSK modulation on the in-phase I quadrature Q plane. FIG. 58 illustrates the relationship among signal points for the values of bit x0 and bit x1.

When bit [x0, x1] = [0, 0] (x0 is 0, x1 is 0), an in-phase component I = z and a quadrature component Q = z are set. This is a signal point 5801. Here, z is a real number greater than 0. When bit [x0, x1] = [0, 1] (x0 is 0, x1 is 1), an in-phase component I = -z and a quadrature component Q = z are set. This is a signal point 5802. When bit [x0, x1] = [1, 0] (x0 is 1, x1 is 0), an in-phase component I = z and a quadrature component Q = -z are set. This is a signal point 5803. When bit [x0, x1] = [1, 1] (x0 is 1, x1 is 1), an in-phase component I = -z and a quadrature component Q = -z are set. This is a signal point 5804.

Figure 59:
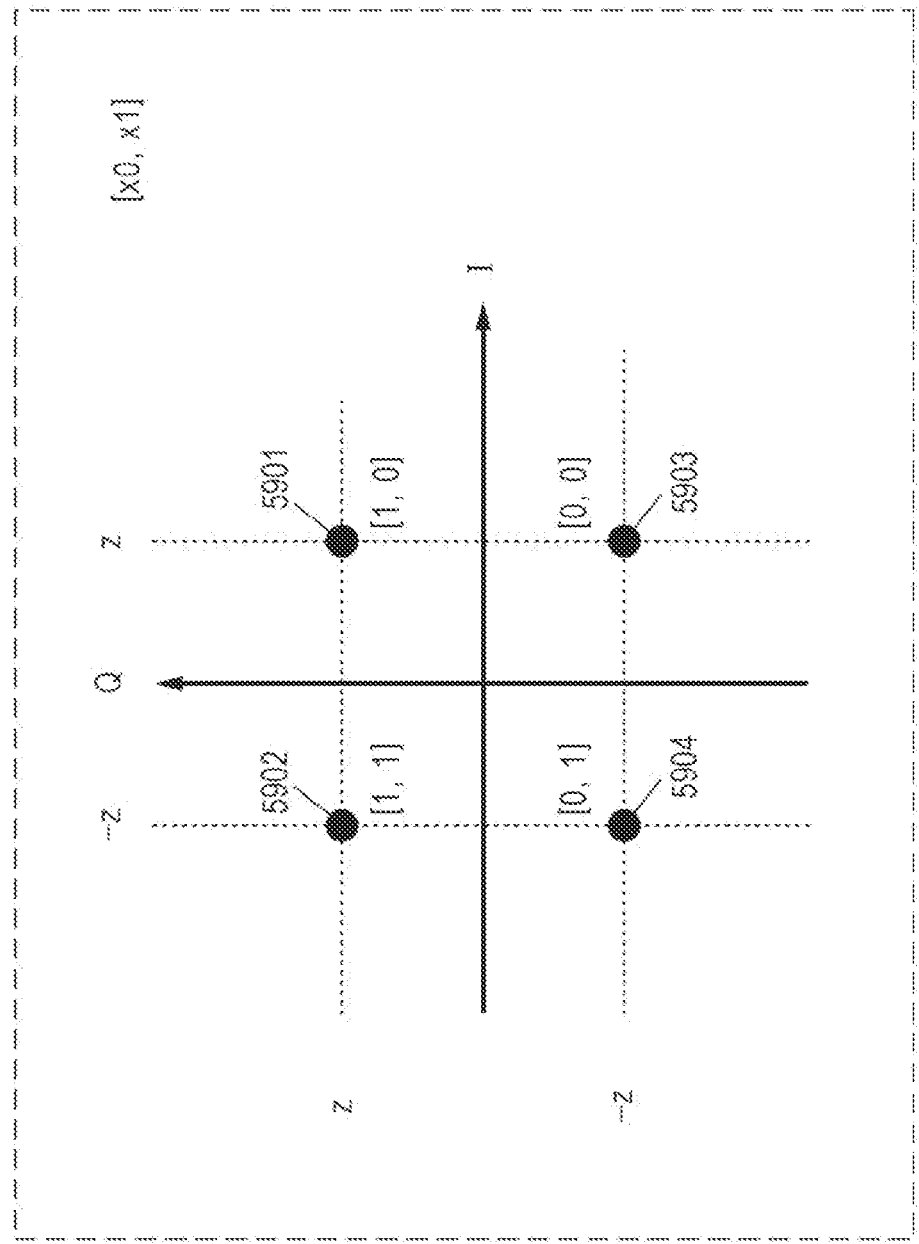
FIG. 59 is a diagram illustrating a second example of signal point arrangement of QPSK modulation on the in-phase I quadrature Q plane.

FIG. 59 is a diagram illustrating a second example of signal point arrangement of QPSK modulation on the in-phase I quadrature Q plane. FIG. 59 illustrates the relationship among signal points for the values of bit x0 and bit x1.Note that the relationship of signal points with respect to the values of bit x0 and bit x1 in FIG. 58 is different from the relationship of signal points with respect to the values of bit x0 and bit x1 in FIG. 59.

When bit [x0, x1] = [0, 0] (x0 is 0, x1 is 0), an in-phase component I = z and a quadrature component Q = -z are set. This is a signal point 5903. Here, z is a real number greater than 0. When bit [x0, x1] = [0, 1] (x0 is 0, x1 is 1), an in-phase component I = -z and a quadrature component Q = -z are set. This is a signal point 5904. When bit [x0, x1] = [1, 0] (x0 is 1, x1 is 0), an in-phase component I = z and a quadrature component Q = z are set. This is a signal point 5901. When bit [x0, x1] = [1, 1] (x0 is 1, x1 is 1), an in-phase component I = -z and a quadrature component Q = z are set. This is a signal point 5902.

Figure 60:
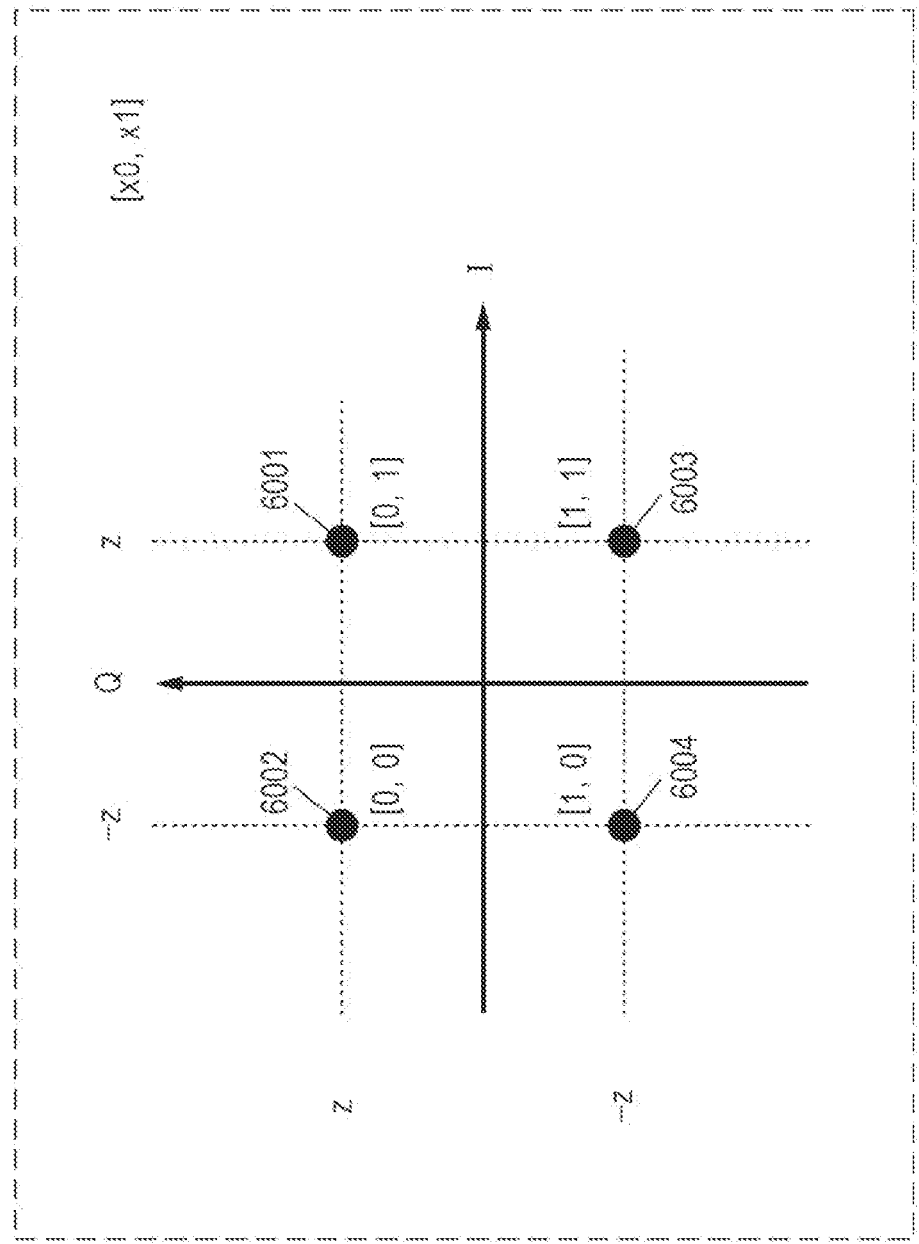
FIG. 60 is a diagram illustrating a third example of signal point arrangement of QPSK modulation on the in-phase I quadrature Q plane.

FIG. 60 is a diagram illustrating a third example of signal point arrangement of QPSK modulation on the in-phase I quadrature Q plane. FIG. 60 illustrates the relationship among signal points for the values of bit x0 and bit x1.Note that the "relationship of signal points with respect to the values of bit x0 and bit x1" in FIG. 60 is different from the "relationship of signal points with respect to the values of bit x0 and bit x1" in FIG. 58 and the "relationship of signal points with respect to the values of bit x0 and bit x1" in FIG. 59.

When bit [x0, x1] = [0, 0] (x0 is 0, x1 is 0), an in-phase component I = -z and a quadrature component Q = z are set. This is a signal point 6002. Here, z is a real number greater than 0. When bit [x0, x1] = [0, 1] (x0 is 0, x1 is 1), an in-phase component I = z and a quadrature component Q = z are set. This is a signal point 6001. When bit [x0, x1] = [1, 0] (x0 is 1, x1 is 0), an in-phase component I = -z and a quadrature component Q = -z are set. This is a signal point 6004. When bit [x0, x1] = [1, 1] (x0 is 1, x1 is 1), an in-phase component I = z and a quadrature component Q = -z are set. This is a signal point 6003.

Figure 61:
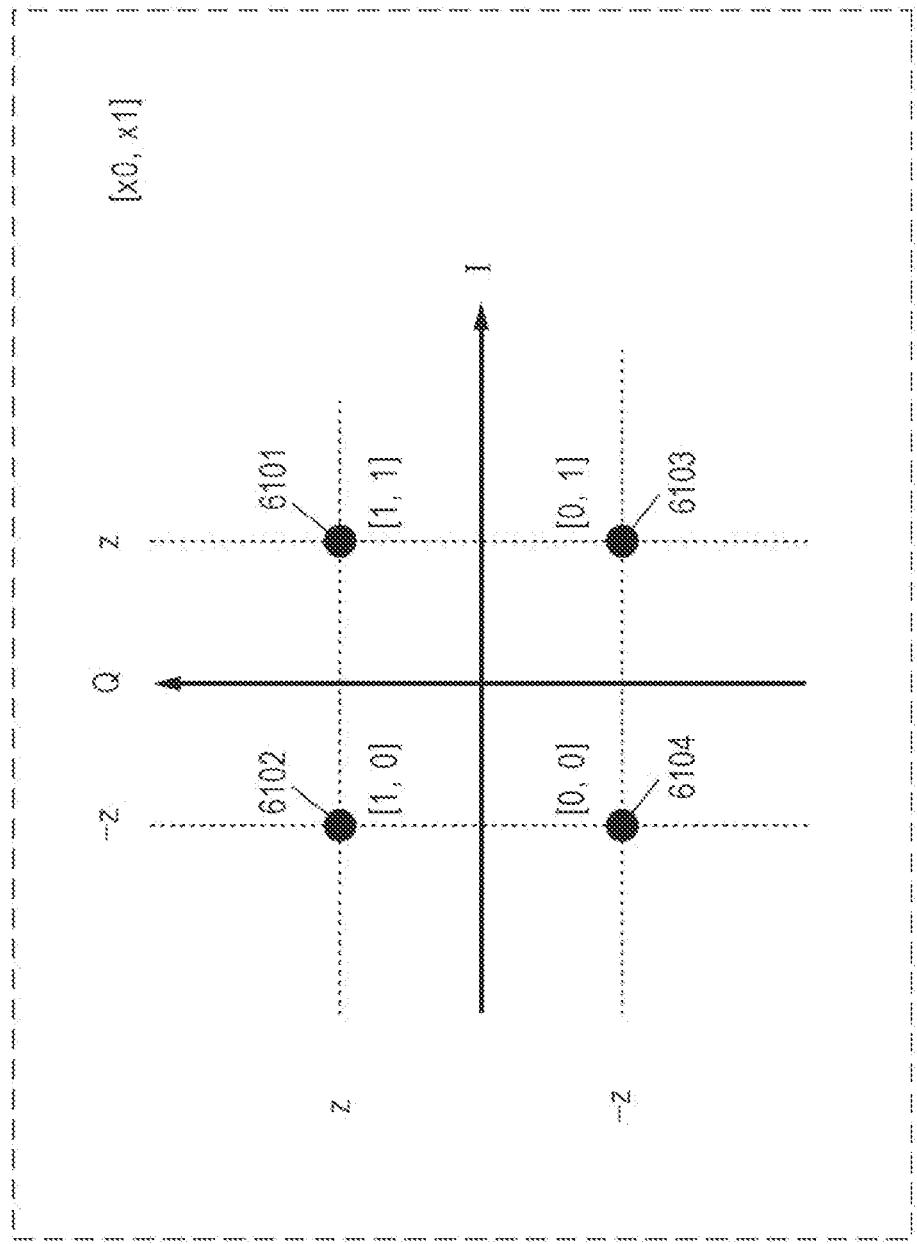
FIG. 61 is a diagram illustrating a fourth example of signal point arrangement of QPSK modulation on the in-phase I quadrature Q plane.

FIG. 61 is a diagram illustrating a fourth example of signal point arrangement of QPSK modulation on the in-phase I quadrature Q plane. FIG. 61 illustrates the relationship among signal points for the values of bit x0 and bit x1.Note that the "relationship of signal points with respect to the values of bit x0 and bit x1" in FIG. 61 is different from the "relationship of signal points with respect to the values of bit x0 and bit x1" in FIG. 58, the "relationship of signal points with respect to the values of bit x0 and bit x1" in FIG. 59, and the "relationship of signal points with respect to the values of bit x0 and bit x1" in FIG. 60.

When bit [x0, x1] = [0, 0] (x0 is 0, x1 is 0), an in-phase component I = -z and a quadrature component Q = -z are set. This is a signal point 6104. Here, z is a real number greater than 0. When bit [x0, x1] = [0, 1] (x0 is 0, x1 is 1), an in-phase component I = z and a quadrature component Q = -z are set. This is a signal point 6103. When bit [x0, x1] = [1, 0] (x0 is 1, x1 is 0), an in-phase component I = -z and a quadrature component Q = z are set. This is a signal point 6102. When bit [x0, x1] = [1, 1] (x0 is 1, x1 is 1), an in-phase component I = z and a quadrature component Q = z are set. This is a signal point 6101.

Example of Relationship Between a(k) and a'(k)

For example, it is assumed that the mapper 5702 uses the signal point arrangement in FIG. 58 to generate a(k). In a case where c0(k) = 0 and c1(k) = 0, the mapper 5702 maps c0(k) = 0 and c1(k) = 0 to the signal point 5801 on the basis of the signal point arrangement in FIG. 58. That is, in this case, the signal point 5801 corresponds to a(k).

Settings are made so that the mapper 5702 uses any of the signal point arrangement in FIG. 58, the signal point arrangement in FIG. 59, the signal point arrangement in FIG. 60, and the signal point arrangement in FIG. 61 to generate a′(k).

<1> In a case where settings are made so that the signal point arrangement in FIG. 58 is used to generate a′(k), c0(k) = 0 and c1(k) = 0, and thus the mapper 5702 maps c0(k) = 0 and c1(k) = 0 to the signal point 5801 on the basis of the signal point arrangement in FIG. 58. That is, in this case, the signal point 5801 corresponds to a′(k).

<2> In a case where settings are made so that the signal point arrangement in FIG. 59 is used to generate a′(k), c0(k) = 0 and c1(k) = 0, and thus the mapper 5702 maps c0(k) = 0 and c1(k) = 0 to the signal point 5903 on the basis of the signal point arrangement in FIG. 59. That is, in this case, the signal point 5903 corresponds to a′(k).

<3> In a case where settings are made so that the signal point arrangement in FIG. 60 is used to generate a′(k), c0(k) = 0 and c1(k) = 0, and thus the mapper 5702 maps c0(k) = 0 and c1(k) = 0 to the signal point 6002 on the basis of the signal point arrangement in FIG. 60. That is, in this case, the signal point 6002 corresponds to a′(k).

<4> In a case where settings are made so that the signal point arrangement in FIG. 61 is used to generate a′(k), c0(k) = 0 and c1(k) = 0, and thus the mapper 5702 maps c0(k) = 0 and c1(k) = 0 to the signal point 6104 on the basis of the signal point arrangement in FIG. 61. That is, in this case, the signal point 6104 corresponds to a′(k).

As described above, the relationship between "the bits and signal point arrangement for generating a(k)" and the relationship between "the bits and signal point arrangement for generating a′(k)" may be identical to or different from each other.

As an "example of a case where the relationships are identical", a description has been given of an example of using FIG. 58 to generate a(k) and using FIG. 58 to generate a′(k).

As an "example of a case where the relationships are different", a description has been given of an example of using FIG. 58 to generate a(k) and using FIG. 59 to generate a′(k), an example of using FIG. 58 to generate a(k) and using FIG. 60 to generate a′(k), and an example of using FIG. 58 to generate a(k) and using FIG. 61 to generate a′(k).

For another example, the modulation scheme for generating a(k) may be different from the modulation scheme for generating a′(k). Alternatively, the signal point arrangement on the in-phase I quadrature Q plane for generating a(k) may be different from the signal point arrangement on the in-phase I quadrature Q plane for generating a′(k).

For example, QPSK may be used as described above as the modulation scheme for generating a(k), and a modulation scheme of signal point arrangement different from QPSK may be used as the modulation scheme for generating a′(k). In addition, the signal point arrangement in FIG. 58 may be used as the signal point arrangement on the in-phase I quadrature Q plane for generating a(k), and a signal point arrangement different from that in FIG. 58 may be used as the signal point arrangement on the in-phase I quadrature Q plane for generating a′(k).

A state where the signal point arrangement on the in-phase I quadrature Q plane is different means, for example, when the coordinates of the four signal points on the in-phase I quadrature Q plane for generating a(k) is those in FIG. 58, at least one of the four signal points on the in-phase I quadrature Q plane for generating a′(k) does not overlap any of the four signal points in FIG. 58.

Example of Relationship Between B(k) and B′(k)

For example, it is assumed that the mapper 5702 uses the signal point arrangement in FIG. 58 to generate b(k). In a case where c2(k) = 0 and c3(k) = 0, the mapper 5702 maps c2(k) = 0 and c3(k) = 0 to the signal point 5801 on the basis of the signal point arrangement in FIG. 58. That is, in this case, the signal point 5801 corresponds to b(k).

Settings are made so that the mapper 5702 uses any of the signal point arrangement in FIG. 58, the signal point arrangement in FIG. 59, the signal point arrangement in FIG. 60, and the signal point arrangement in FIG. 61 to generate b′(k).

<5> In a case where settings are made so that the signal point arrangement in FIG. 58 is used to generate b′(k), c2(k) = 0 and c3(k) = 0, and thus the mapper 5702 maps c2(k) = 0 and c3(k) = 0 to the signal point 5801 on the basis of the signal point arrangement in FIG. 58. That is, in this case, the signal point 5801 corresponds to b′(k).

<6> In a case where settings are made so that the signal point arrangement in FIG. 59 is used to generate b′(k), c2(k) = 0 and c3(k) = 0, and thus the mapper 5702 maps c2(k) = 0 and c3(k) = 0 to the signal point 5903 on the basis of the signal point arrangement in FIG. 59. That is, in this case, the signal point 5903 corresponds to b′(k).

<7> In a case where settings are made so that the signal point arrangement in FIG. 60 is used to generate b′(k), c2(k) = 0 and c3(k) = 0, and thus the mapper 5702 maps c2(k) = 0 and c3(k) = 0 to the signal point 6002 on the basis of the signal point arrangement in FIG. 60. That is, in this case, the signal point 6002 corresponds to b′(k).

<8> In a case where settings are made so that the signal point arrangement in FIG. 61 is used to generate b′(k), c2(k) = 0 and c3(k) = 0, and thus the mapper 5702 maps c2(k) = 0 and c3(k) = 0 to the signal point 6104 on the basis of the signal point arrangement in FIG. 61. That is, in this case, the signal point 6104 corresponds to b′(k).

As described above, the relationship between "the bits and signal point arrangement for generating b(k)" and the relationship between "the bits and signal point arrangement for generating b′(k)" may be identical to or different from each other.

As an "example of a case where the relationships are identical", a description has been given of an example of using FIG. 58 to generate b(k) and using FIG. 58 to generate b′(k).

As an "example of a case where the relationships are different", a description has been given of an example of using FIG. 58 to generate b(k) and using FIG. 59 to generate b′(k), an example of using FIG. 58 to generate b(k) and using FIG. 60 to generate b′(k), and an example of using FIG. 58 to generate b(k) and using FIG. 61 to generate b′(k).

For another example, the modulation scheme for generating b(k) may be different from the modulation scheme for generating b′(k). Alternatively, the signal point arrangement on the in-phase I quadrature Q plane for generating b(k) may be different from the signal point arrangement on the in-phase I quadrature Q plane for generating b′(k).

For example, QPSK may be used as described above as the modulation scheme for generating b(k), and a modulation scheme of signal point arrangement different from QPSK may be used as the modulation scheme for generating b′(k). In addition, the signal point arrangement in FIG. 58 may be used as the signal point arrangement on the in-phase I quadrature Q plane for generating b(k), and a signal point arrangement different from that in FIG. 58 may be used as the signal point arrangement on the in-phase I quadrature Q plane for generating b′(k).

A state where the signal point arrangement on the in-phase I quadrature Q plane is different means, for example, when the coordinates of the four signal points on the in-phase I quadrature Q plane for generating b(k) is those in FIG. 58, at least one of the four signal points on the in-phase I quadrature Q plane for generating b'(k) does not overlap any of the four signal points in FIG. 58.

As described above, the mapped signal 5703A corresponds to the mapped signal 205_1 in FIG. 2, and the mapped signal 5703B corresponds to the mapped signal 205_2 in FIG. 2. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 2 and so forth. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

Second Example

Figure 62:
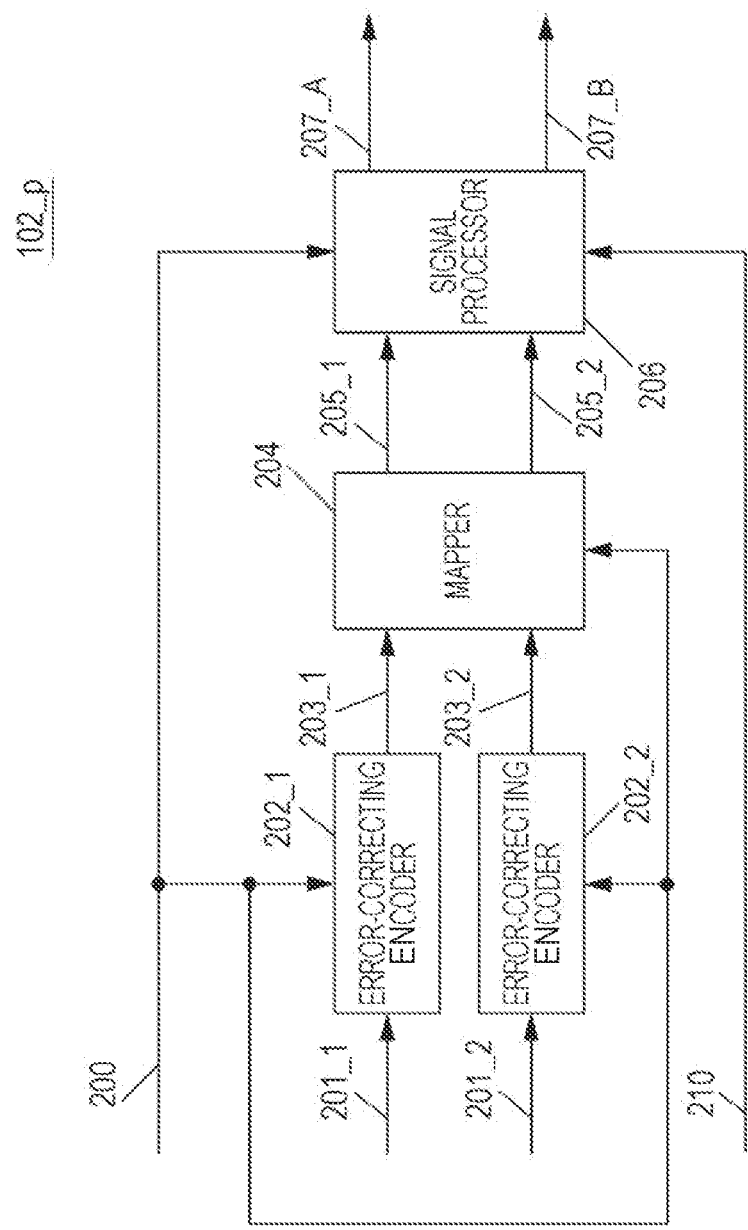
FIG. 62 is a diagram illustrating an example of the configuration of the signal processor for the user #p different from FIGS. 2 and 56.

FIG. 62 is a diagram illustrating an example of the configuration of the user #p signal processor 102_p different from the configurations in FIGS. 2 and 56. In FIG. 62, the elements similar to those in FIGS. 2 and 56 are denoted by the same numerals, and the description thereof is omitted. The user #p signal processor 102_p in FIG. 62 is different from that in FIG. 2 in that two error-correcting encoders 202_1 and 202_2 are included. In addition, the user #p signal processor 102_p in FIG. 62 is different from that in FIG. 56 in that one mapper 204 is included.

The mapper 204 in FIG. 62 receives the coded data 203_1 and 203_2 and the control signal 200. On the basis of information about a mapping method included in the control signal 200, the mapper 204 in FIG. 62 performs mapping, and outputs the mapped signals 205_1 and 205_2.

Figure 63:
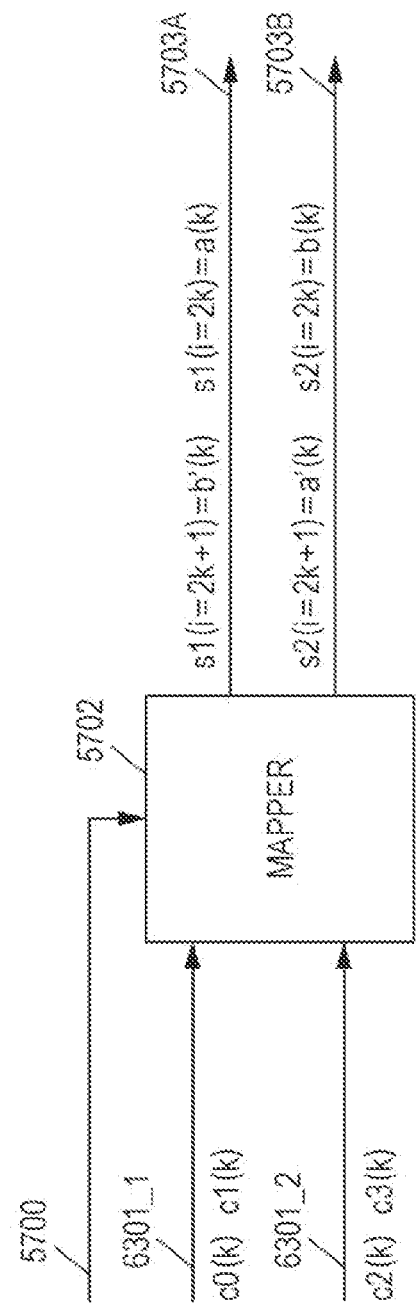
FIG. 63 is a diagram illustrating a second example of the operation of the mapper.

FIG. 63 is a diagram illustrating the second example of the operation of the mapper 5702. The operation of the mapper 5702 illustrated in FIG. 63 corresponds to an example of the operation of the mapper 204 illustrated in FIG. 62. In FIG. 63, the elements that operate similarly to those in FIG. 57 are denoted by the same numerals, and the description thereof is omitted. In addition, the control signal 5700 corresponds to the control signal 200 in FIG. 62, coded data 6301_1 corresponds to the coded data 203_1 in FIG. 62, coded data 6301_2 corresponds to the coded data 203_2 in FIG. 62, the mapped signal 5703A corresponds to the mapped signal 205_1 in FIG. 62, and the mapped signal 5703B corresponds to the mapped signal 205_2 in FIG. 62.

The mapper 5702 receives the coded data 6301_1 and 6301_2 and the control signal 5700. In a case where a robust transmission method is designated by the control signal 5700, the mapper 5702 performs the mapping described below, and outputs the mapped signals 5703A and 5703B.

For example, it is assumed that bit c0(k) and bit c1(k) are input as the coded data 6301_1 to the mapper 5702, and bit c2(k) and bit c3(k) are input as the coded data 6301_2 to the mapper 5702. Here, k is an integer equal to or greater than 0.

It is assumed that the mapper 5702 performs QPSK modulation on c0(k) and c1(k) to obtain a mapped signal a(k). In addition, it is assumed that the mapper 5702 performs QPSK modulation on c2(k) and c3(k) to obtain a mapped signal b(k).

Also, it is assumed that the mapper 5702 performs QPSK modulation on c0(k) and c1(k) to obtain a mapped signal a '(k). In addition, it is assumed that the mapper 5702 performs QPSK modulation on c2(k) and c3(k) to obtain a mapped signal b'(k).

The mapped signal 5703A with a symbol number i = 2k is represented by s1(i = 2k), and the mapped signal 5703B with a symbol number i = 2k is represented by s2(i = 2k). Also, the mapped signal 5703A with a symbol number i = 2k+1 is represented by s1(i = 2k+1), and the mapped signal 5703B with a symbol number i = 2k+1 is represented by s2(i = 2k+1).

In addition, s1(i = 2k), which is the mapped signal 5703A with a symbol number i = 2k, is represented by a(k), and s2(i = 2k), which is the mapped signal 5703B with a symbol number i = 2k, is represented by b(k). Also, s1(i = 2k+1), which is the mapped signal 5703A with a symbol number i = 2k+1, is represented by b'(k), and s2(i = 2k+1), which is the mapped signal 5703B with a symbol number i = 2k+1, is represented by a'(k).

An example of the relationship between a(k) and a'(k), and an example of the relationship between b(k) and b'(k) are similar to the relationships described by using FIGS. 58, 59, 60, and 61.

As described above, the mapped signal 5703A corresponds to the mapped signal 205_1 in FIG. 62, and the mapped signal 5703B corresponds to the mapped signal 205_2 in FIG. 62. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 62. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

Third Example

The third example is, like the second example, an example of the operation of the mapper 204 in the configuration of the user #p signal processor 102_p illustrated in FIG. 62, that is, the configuration including the two error-correcting encoders 202_1 and 202_2 and the one mapper 204.

Figure 64:
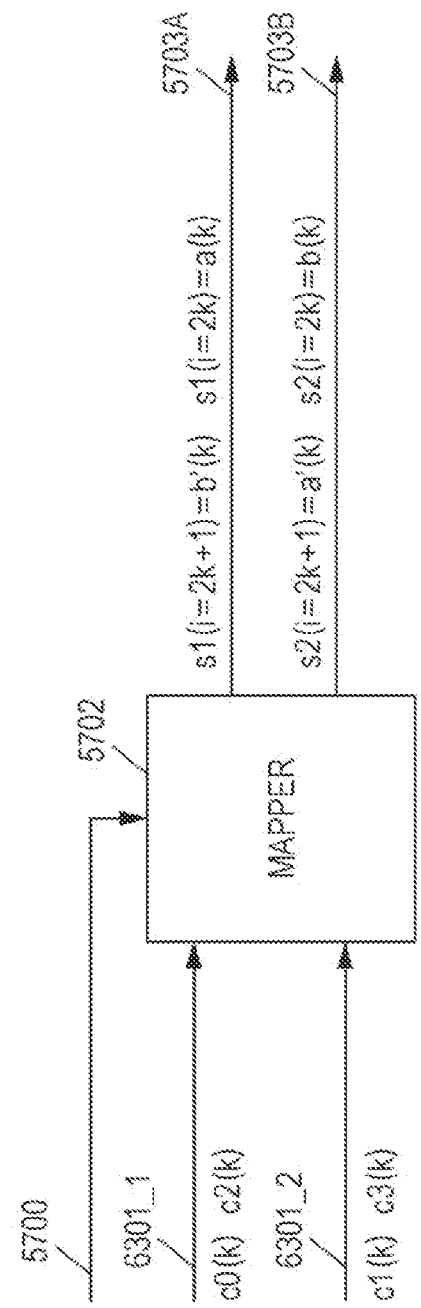
FIG. 64 is a diagram illustrating a third example of the operation of the mapper.

FIG. 64 is a diagram illustrating the third example of the operation of the mapper 5702. The operation of the mapper 5702 illustrated in FIG. 64 corresponds to an example of the operation of the mapper 204 illustrated in FIG. 62. In FIG. 64, the elements that operate similarly to those in FIGS. 57 and 63 are denoted by the same numerals, and the description thereof is omitted. In addition, the control signal 5700 corresponds to the control signal 200 in FIG. 62, the coded data 6301_1 corresponds to the coded data 203_1 in FIG. 62, the coded data 6301_2 corresponds to the coded data 203_2 in FIG. 62, the mapped signal 5703A corresponds to the mapped signal 205_1 in FIG. 62, and the mapped signal 5703B corresponds to the mapped signal 205_2 in FIG. 62.

The mapper 5702 receives the coded data 6301_1 and 6301_2 and the control signal 5700. In a case where a robust transmission method is designated by the control signal 5700, the mapper 5702 performs the mapping described below, and outputs the mapped signals 5703A and 5703B.

For example, bit c0(k) and bit c2(k) are input as the coded data 6301_1 to the mapper 5702, and bit c1(k) and bit c3(k) are input as the coded data 6301_2 to the mapper 5702. Here, k is an integer equal to or greater than 0.

It is assumed that the mapper 5702 performs QPSK modulation on c0(k) and c1(k) to obtain a mapped signal a(k). In addition, it is assumed that the mapper 5702 performs QPSK modulation on c2(k) and c3(k) to obtain a mapped signal b(k). Also, it is assumed that the mapper 5702 performs QPSK modulation on c0(k) and c1(k) to obtain a mapped signal a'(k). In addition, it is assumed that the mapper 5702 performs QPSK modulation on c2(k) and c3(k) to obtain a mapped signal b'(k).

The mapped signal 5703A with a symbol number i = 2k is represented by s1(i = 2k), and the mapped signal 5703B with a symbol number i = 2k is represented by s2(i = 2k). Also, the mapped signal 5703A with a symbol number i = 2k+1 is represented by s1(i = 2k+1), and the mapped signal 5703B with a symbol number i = 2k+1 is represented by s2(i = 2k+1).

In addition, s1(i = 2k), which is the mapped signal 5703A with a symbol number i = 2k, is represented by a(k), and s2(i = 2k), which is the mapped signal 5703B with a symbol number i = 2k, is represented by b(k). Also, s1(i = 2k+1), which is the mapped signal 5703A with a symbol number i = 2k+1, is represented by b'(k), and s2(i = 2k+1), which is the mapped signal 5703B with a symbol number i = 2k+1, is represented by a'(k).

An example of the relationship between a(k) and a'(k), and an example of the relationship between b(k) and b'(k) are similar to the relationships described by using FIGS. 58, 59, 60, and 61.

As described above, the mapped signal 5703A corresponds to the mapped signal 205_1 in FIG. 62, and the mapped signal 5703B corresponds to the mapped signal 205_2 in FIG. 62. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 62. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

The first to third examples given above are examples of the case of modulating 2-bit data. Hereinafter, fourth to sixth examples of the case of modulating 4-bit data will be given.

Fourth Example

The fourth example is, like the first example described by using FIG. 57, an example of the operation of the mapper 204 in the configuration of the user #p signal processor 102_p illustrated in FIG. 2, that is, the configuration including the one error-correcting encoder 202 and the one mapper 204. However, the modulation scheme used in the fourth example is different from that in the first example, as described above.

Figure 65:
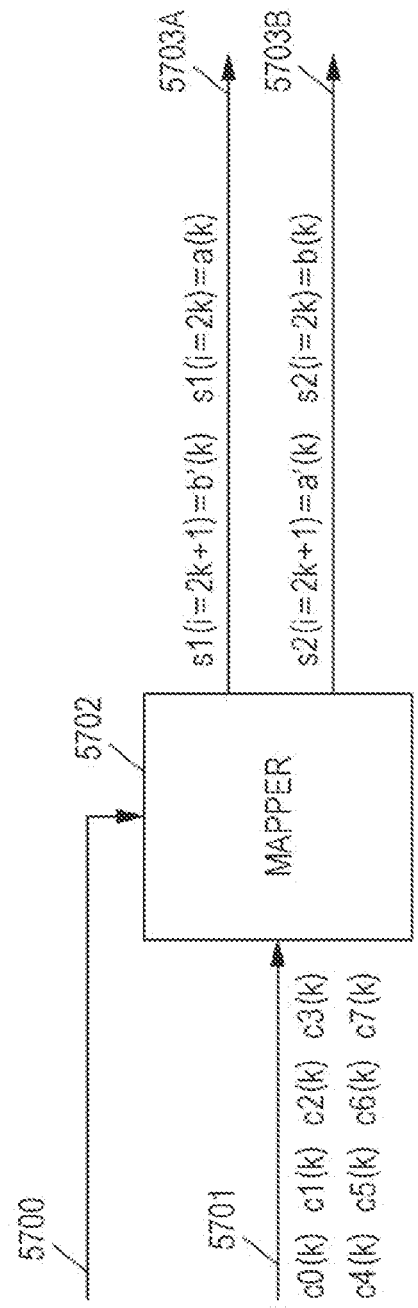
FIG. 65 is a diagram illustrating a fourth example of the operation of the mapper.

FIG. 65 is a diagram illustrating the fourth example of the operation of the mapper 5702. The operation of the mapper 5702 illustrated in FIG. 65 corresponds to an example of the operation of the mapper 204 in the user #p signal processor 102_p illustrated in FIG. 2. The control signal 5700 corresponds to the control signal 200 in FIG. 2, the coded data 5701 corresponds to the user #p data 203 in FIG. 2, the mapped signal 5703A corresponds to the mapped signal 205_1 in FIG. 2, and the mapped signal 5703B corresponds to the mapped signal 205_2 in FIG. 2.

The mapper 5702 receives the coded data 5701 and the control signal 5700. In a case where a robust transmission method is designated by the control signal 5700, the mapper 5702 performs the mapping described below, and outputs the mapped signals 5703A and 5703B.

Bit c0(k), bit c1(k), bit c2(k), bit c3(k), bit c4(k), bit c5(k), bit c6(k), and bit c7(k) are input as the coded data 5701 to the mapper 5702. Here, k is an integer equal to or greater than 0.

It is assumed that the mapper 5702 performs modulation on bit c0(k), bit c1(k), bit c2(k), and bit c3(k) by using a modulation scheme having sixteen signal points, such as 16QAM, to obtain a mapped signal a(k). In addition, it is assumed that the mapper 5702 performs modulation on bit c4(k), bit c5(k), bit c6(k), and bit c7(k) by using a modulation scheme having sixteen signal points, such as 16QAM, to obtain a mapped signal b(k).

Also, it is assumed that the mapper 5702 performs modulation on bit c0(k), bit c1(k), bit c2(k), and bit c3(k) by using a modulation scheme having sixteen signal points, such as 16QAM, to obtain a mapped signal a'(k). In addition, it is assumed that the mapper 5702 performs modulation on bit c4(k), bit c5(k), bit c6(k), and bit c7(k) by using a modulation scheme having sixteen signal points, such as 16QAM, to obtain a mapped signal b'(k).

The mapped signal 5703A with a symbol number i = 2k is represented by s1(i = 2k), and the mapped signal 5703B with a symbol number i = 2k is represented by s2(i = 2k). Also, the mapped signal 5703A with a symbol number i = 2k+1 is represented by s1(i = 2k+1), and the mapped signal 5703B with a symbol number i = 2k+1 is represented by s2(i = 2k+1).

In addition, s1(i = 2k), which is the mapped signal 5703A with a symbol number i = 2k, is represented by a(k), and s2(i = 2k), which is the mapped signal 5703B with a symbol number i = 2k, is represented by b(k). Also, s1(i = 2k+1), which is the mapped signal 5703A with a symbol number i = 2k+1, is represented by b'(k), and s2(i = 2k+1), which is the mapped signal 5703B with a symbol number i = 2k+1, is represented by a'(k).

An example of the relationship between a(k) and a'(k) is similar to the above-described example. For example, the relationship between "the bits and signal point arrangement for generating a(k)" and the relationship between "the bits and signal point arrangement for generating a'(k)" may be identical to or different from each other.

For another example, the modulation scheme for generating a(k) may be different from the modulation scheme for generating a'(k). Alternatively, the signal point arrangement on the in-phase I quadrature Q plane for generating a(k) may be different from the signal point arrangement on the in-phase I quadrature Q plane for generating a'(k).

A state where the signal point arrangement on the in-phase I quadrature Q plane is different means that, for example, the coordinates of sixteen signal points exist in the signal point arrangement on the in-phase I quadrature Q plane for generating a(k), and at least one of the sixteen signal points existing in the signal point arrangement on the in-phase I quadrature Q plane for generating a'(k) does not overlap any of the sixteen signal points in the signal point arrangement on the in-phase I quadrature Q plane for generating a(k).

The relationship between b(k) and b'(k) is similar to the above-described example. For example, the relationship between "the bits and signal point arrangement for generating b(k)" and the relationship between "the bits and signal point arrangement for generating b'(k)" may be identical to or different from each other.

For another example, the modulation scheme for generating b(k) may be different from the modulation scheme for generating b'(k). Alternatively, the signal point arrangement on the in-phase I quadrature Q plane for generating b(k) may be different from the signal point arrangement on the in-phase I quadrature Q plane for generating b'(k).

A state where the signal point arrangement on the in-phase I quadrature Q plane is different means that, for example, the coordinates of sixteen signal points exist in the signal point arrangement on the in-phase I quadrature Q plane for generating b(k), and at least one of the sixteen signal points existing in the signal point arrangement on the in-phase I quadrature Q plane for generating b'(k) does not overlap any of the sixteen signal points in the signal point arrangement on the in-phase I quadrature Q plane for generating b(k).

As described above, the mapped signal 5703A corresponds to the mapped signal 205_1 in FIG. 2, and the mapped signal 5703B corresponds to the mapped signal 205_2 in FIG. 2. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 2. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

Fifth Example

The fifth example is an example of the operation of the mapper 204 in the configuration of the user #p signal processor 102_p illustrated in FIG. 62, that is, the configuration including the two error-correcting encoders 202_1 and 202_2 and the one mapper 204.

In FIG. 62, the elements similar to those in FIG. 2 are denoted by the same numerals, and the description thereof is omitted.

The mapper 204 in FIG. 62 receives the coded data 203_1 and 203_2 and the control signal 200. On the basis of information about a mapping method included in the control signal 200, the mapper 204 in FIG. 62 performs mapping, and outputs the mapped signals 205_1 and 205_2.

Figure 66:
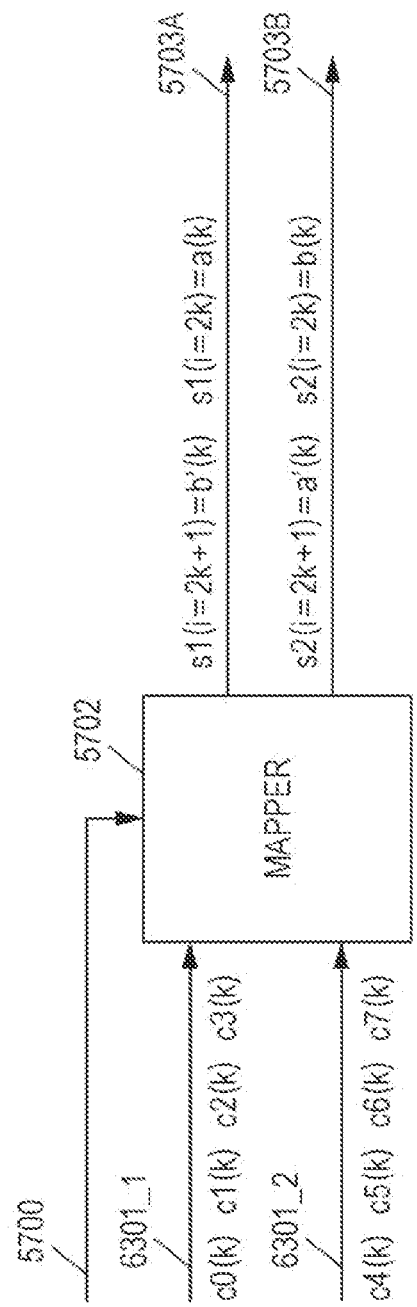
FIG. 66 is a diagram illustrating a fifth example of the operation of the mapper.

FIG. 66 is a diagram illustrating the fifth example of the operation of the mapper 5702. The operation of the mapper 5702 illustrated in FIG. 66 corresponds to an example of the operation of the mapper 204 illustrated in FIG. 62. In FIG. 66, the elements that operate similarly to those in FIGS. 57 and 63 are denoted by the same numerals, and the description thereof is omitted. In addition, the control signal 5700 corresponds to the control signal 200 in FIG. 62, the coded data 6301_1 corresponds to the coded data 203_1 in FIG. 62, the coded data 6301_2 corresponds to the coded data 203_2 in FIG. 62, the mapped signal 5703A corresponds to the mapped signal 205_1 in FIG. 62, and the mapped signal 5703B corresponds to the mapped signal 205_2 in FIG. 62.

The mapper 5702 receives the coded data 6301_1 and 6301_2 and the control signal 5700. In a case where a robust transmission method is designated by the control signal 5700, the mapper 5702 performs the mapping described below, and outputs the mapped signals 5703A and 5703B.

For example, it is assumed that bit c0(k), bit c1(k), bit c2(k), and bit c3(k) are input as the coded data 6301_1 to the mapper 5702, and bit c4(k), bit c5(k), bit c6(k), and bit c7(k) are input as the coded data 6301_2 to the mapper 5702. Here, k is an integer equal to or greater than 0.

It is assumed that the mapper 5702 performs modulation on bit c0(k), bit c1(k), bit c2(k), and bit c3(k) by using a modulation scheme having sixteen signal points, such as 16QAM, to obtain a mapped signal a(k). In addition, it is assumed that the mapper 5702 performs modulation on bit c4(k), bit c5(k), bit c6(k), and bit c7(k) by using a modulation scheme having sixteen signal points, such as 16QAM, to obtain a mapped signal b(k).

Also, it is assumed that the mapper 5702 performs modulation on bit c0(k), bit c1(k), bit c2(k), and bit c3(k) by using a modulation scheme having sixteen signal points, such as 16QAM, to obtain a mapped signal a'(k). In addition, it is assumed that the mapper 5702 performs modulation on bit c4(k), bit c5(k), bit c6(k), and bit c7(k) by using a modulation scheme having sixteen signal points, such as 16QAM, to obtain a mapped signal b'(k).

The mapped signal 5703A with a symbol number i = 2k is represented by s1(i = 2k), and the mapped signal 5703B with a symbol number i = 2k is represented by s2(i = 2k). Also, the mapped signal 5703A with a symbol number i = 2k+1 is represented by s1(i = 2k+1), and the mapped signal 5703B with a symbol number i = 2k+1 is represented by s2(i = 2k+1).

Also, s1(i = 2k), which is the mapped signal 5703A with a symbol number i = 2k, is represented by a(k), and s2(i = 2k), which is the mapped signal 5703B with a symbol number i = 2k, is represented by b(k). Also, s1(i = 2k+1), which is the mapped signal 5703A with a symbol number i = 2k+1, is represented by b'(k), and s2(i = 2k+1), which is the mapped signal 5703B with a symbol number i = 2k+1, is represented by a'(k).

An example of the relationship between a(k) and a'(k) and an example of the relationship between b(k) and b'(k) are as described in the fourth example.

As described above, the mapped signal 5703A corresponds to the mapped signal 205_1 in FIG. 62, and the mapped signal 5703B corresponds to the mapped signal 205_2 in FIG. 62. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 62. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

Sixth Example

The sixth example is, like the fifth example, an example of the operation of the mapper 204 in the configuration of the user #p signal processor 102_p illustrated in FIG. 62, that is, the configuration including the two error-correcting encoders 202_1 and 202_2 and the one mapper 204.

Figure 67:
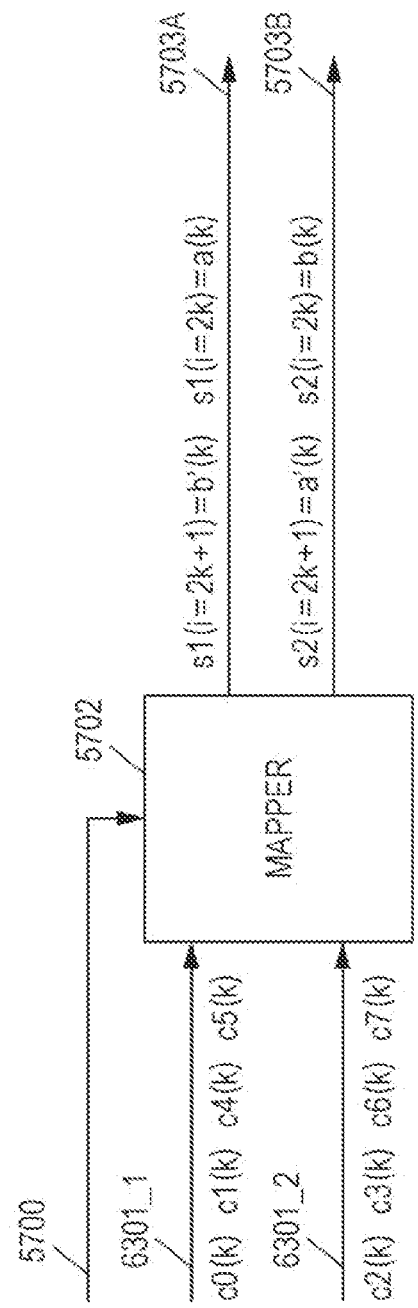
FIG. 67 is a diagram illustrating a sixth example of the operation of the mapper.

FIG. 67 is a diagram illustrating the sixth example of the operation of the mapper 5702. The operation of the mapper 5702 illustrated in FIG. 67 corresponds to an example of the operation of the mapper 204 illustrated in FIG. 62. In FIG. 67, the elements that operate similarly to those in FIGS. 57 and 63 are denoted by the same numerals, and the description thereof is omitted. In addition, the control signal 5700 corresponds to the control signal 200 in FIG. 62, the coded data 6301_1 corresponds to the coded data 203_1 in FIG. 62, the coded data 6301_2 corresponds to the coded data 203_2 in FIG. 62, the mapped signal 5703A corresponds to the mapped signal 205_1 in FIG. 62, and the mapped signal 5701B corresponds to the mapped signal 205_2 in FIG. 62.

The mapper 5702 receives the coded data 6301_1 and 6301_2 and the control signal 5700. In a case where a robust transmission method is designated by the control signal 5700, the mapper 5702 performs the mapping described below, and outputs the mapped signals 5703A and 5703B.

For example, bit c0(k), bit c1(k), bit c4(k), and bit c5(k) are input as the coded data 6301_1 to the mapper 5702, and bit c2(k), bit c3(k), bit c6(k), and bit c7(k) are input as the coded data 6301_2 to the mapper 5702. Here, k is an integer equal to or greater than 0.

It is assumed that the mapper 5702 performs modulation on bit c0(k), bit c1(k), bit c4(k), and bit c5(k) by using a modulation scheme having sixteen signal points, such as 16QAM, to obtain a mapped signal a(k). In addition, it is assumed that the mapper 5702 performs modulation on bit c2(k), bit c3(k), bit c6(k), and bit c7(k) by using a modulation scheme having sixteen signal points, such as 16QAM, to obtain a mapped signal b(k). Also, it is assumed that the mapper 5702 performs modulation on bit c0(k), bit c1(k), bit c4(k), and bit c5(k) by using a modulation scheme having sixteen signal points, such as 16QAM, to obtain a mapped signal a'(k). In addition, it is assumed that the mapper 5702 performs modulation on bit c2(k), bit c3(k), bit c6(k), and bit c7(k) by using a modulation scheme having sixteen signal points, such as 16QAM, to obtain a mapped signal b'(k).

In addition, the mapped signal 5703A with a symbol number i = 2k is represented by s1(i = 2k), and the mapped signal 5703B with a symbol number i = 2k is represented by s2(i = 2k). Also, the mapped signal 5703A with a symbol number i = 2k+1 is represented by s1(i = 2k+1), and the mapped signal 5703B with a symbol number i = 2k+1 is represented by s2(i = 2k+1).

In addition, s1(i = 2k), which is the mapped signal 5703A with a symbol number i = 2k, is represented by a(k), and s2(i = 2k), which is the mapped signal 5703B with a symbol number i = 2k, is represented by b(k). Also, s1(i = 2k+1), which is the mapped signal 5703A with a symbol number i = 2k+1, is represented by b'(k), and s2(i = 2k+1), which is the mapped signal 5703B with a symbol number i = 2k+1, is represented by a'(k).

An example of the relationship between a(k) and a'(k) and an example of the relationship between b(k) and b'(k) are as described in the fourth example.

As described above, the mapped signal 5703A corresponds to the mapped signal 205_1 in FIG. 62, and the mapped signal 5703B corresponds to the mapped signal 205_2 in FIG. 62. Thus, the mapped signal 5703A and the mapped signal 5703B are to be subjected to phase change, CDD processing, and weight combining processing performed as in FIGS. 3, 26, 38, 39, 40 to 48, 49 to 54, and so forth related to the signal processor 206 in FIG. 62. However, in a case where ON/OFF of phase change is possible, phase change may be set to OFF, that is, phase change is not performed. In addition, in FIGS. 3, 26, 38, 39, 40 to 48, and 49 to 54, a configuration not including a phase changer may be adopted.

As described above in the present embodiment, when the transmission apparatus transmits a modulated signal, the reception apparatus is able to obtain high data reception quality. In particular, in an environment in which direct waves are dominant, favorable data reception quality can be obtained.

A case where a base station or AP is able to select a communication method (transmission method) described in the present embodiment and a case where the terminal #p transmits a reception capability notification symbol described in the second embodiment, the third embodiment, and the fifth embodiment may be carried out in combination with each other.

For example, in a case where the terminal #p notifies the base station or AP that the terminal #p supports phase change demodulation by using the information 2801 about "support/not support demodulation of modulated signal with phase change" in FIG. 30 or the terminal #p notifies the base station or AP that the terminal #p supports the transmission method (communication method) described in the present embodiment by using the information 2901 about "support/not support reception for multiple streams", the base station or AP is able to decide to transmit multiple modulated signals for multiple streams by using the transmission method (communication method) described in the present embodiment and is able to transmit the modulated signals. Accordingly, the terminal #p is able to obtain high data reception quality. In addition, the base station or AP appropriately generates and transmits modulated signals that can be received by the terminal #p in consideration of the communication scheme supported by the terminal #p and a communication environment, and accordingly the data transmission efficiency can be improved in the system constituted by the base station or AP and the terminal #p.

In addition, the base station or AP may generate a modulated signal by using the above-described method and transmit the modulated signal to a terminal A, and at the same time may generate a modulated signal by using another method and transmit the modulated signal to another terminal.

Second Supplement

In this specification, a description is given of performing phase change in the phase changer 305A and/or the phase changer 305B in FIGS. 3, 26, 38, 39, 40 to 48, 49 to 54, and so forth related to the signal processor 206 in FIG. 2. At this time, in a case where the period of phase change in the phase changer 205A is represented by NA and in a case where NA is an integer equal to or greater than 3, that is, an integer greater than 2, which is the number of streams to be transmitted or the number of modulated signals to be transmitted, there is a high possibility that the reception apparatus as a communication partner obtains favorable data reception quality. Likewise, in a case where the period of phase change in the phase changer 205B is represented by NB and in a case where NB is an integer equal to or greater than 3, that is, an integer greater than 2, which is the number of streams to be transmitted or the number of modulated signals to be transmitted, there is a high possibility that the reception apparatus as a communication partner obtain favorable data reception quality.

In this specification, in a case where weight combining (precoding) processing is performed by using only the (precoding) matrix Fp of Expression (33) or Expression (34) in FIGS. 3, 26, 38, 39, 40 to 48, and so forth related to the signal processor 206 in FIGS. 2, 56, and so forth, the signal processor 206 in FIGS. 2, 56, and so forth need not necessarily include the weight combiner 303.

In this specification, a description has been given mainly of performing phase change in the phase changer 305A and/ or the phase changer 305B and/or the phase changer 3801A and/or the phase changer 3801B in FIGS. 3, 26, 38, 39, 40 to 48, and so forth related to the signal processor 206 in FIGS. 2, 56, and so forth. However, switching between perform and not perform phase change may be controlled by the control signal 300 input to the phase changer 305A, the phase changer 305B, the phase changer 3801A, or the phase changer 3801B. Thus, for example, the control signal 300 may include control information about "perform or not perform phase change in the phase changer 305A", control information about "perform or not perform phase change in the phase changer 305B", control information about "perform or not perform phase change in the phase changer 3801A", or control information about "perform or not perform phase change in the phase changer 3801B". In addition, "perform or not perform phase change in the phase changer 305A, the phase changer 305B, the phase changer 3801A, or the phase changer 3801B" may be controlled by such control information.

For example, in a case where the phase changer 3801A receives the control signal 300 and receives an instruction not to perform phase change through the control signal 300, the phase changer 3801A outputs the input signal 301A as 3802A. Also, in a case where the phase changer 3801B receives the control signal 300 and receives an instruction not to perform phase change through the control signal 300, the phase changer 3801B outputs the input signal 301B as 3802B. In a case where the phase changer 305A receives the control signal 300 and receives an instruction not to perform phase change through the control signal 300, the phase changer 305A outputs the input signal 304A as 306A. In a case where the phase changer 305B receives the control signal 300 and receives an instruction not to perform phase change through the control signal 300, the phase changer 305B outputs the input signal 304B as 306B.

In this specification, a description has been given mainly of performing phase change in the phase changer 309A and the phase changer 309B in FIGS. 3, 26, 38, 39, 49, 50, 51, 52, 53, and so forth. Also, a description has been given mainly of performing CDD (CSD) processing in the CDD (CSD) section 4909A and the CDD (CSD) section 4909B. However, switching between perform and not perform phase change may be controlled by the control signal 300 input to the phase changer 309A or the phase changer 309B.

Thus, for example, the control signal 300 may include control information about "perform or not perform phase change in the phase changer 309A" or control information about "perform or not perform phase change in the phase changer 309B", and "perform or not perform phase change in the phase changer 309A or the phase changer 309B" may be controlled by such control information.

In addition, switching between perform and not perform CDD (CSD) processing may be controlled by the control signal 300 input to the CDD (CSD) section 4909A or the CDD (CSD) section 4909B. Thus, for example, the control signal 300 may include control information about "perform or not perform CDD (CSD) processing in the CDD (CSD) section 4909A" or control information about "perform or not perform CDD (CSD) processing in the CDD (CSD) section 4909B", and "perform or not perform CDD (CSD) processing in the CDD (CSD) section 4909A or 4909B" may be controlled by such control information.

For example, in a case where the phase changer 309A receives the control signal 300 and receives an instruction not to perform phase change through the control signal 300, the phase changer 309A outputs the input signal 308A as 310A. In a case where the phase changer 309B receives the control signal 300 and receives an instruction not to perform phase change through the control signal 300, the phase changer 309B outputs the input signal 308B as 310B. In a case where the CDD (CSD) section 4909A receives the control signal 300 as input and receives an instruction not to perform CDD (CSD) processing through the control signal 300, the CDD (CSD) section 4909A outputs the input signal 308A as 4910A. In a case where the CDD (CSD) section 4909B receives the control signal 300 and receives an instruction not to perform CDD (CSD) processing through the control signal 300, the CDD (CSD) section 4909B outputs the input signal 308B as 4910B.

Obviously, the embodiments described in this specification and other things described in supplements may be carried out in combination with one another.

In the description of this specification, the terms "base station (or AP)" and "terminal" are used for describing the individual embodiments, and these are not limited to such terms. Thus, in the individual embodiments, the operation described as the operation of "base station (or AP)" may be the operation of "terminal", "communication apparatus", "broadcast station", "mobile phone", "personal computer", "television receiver", or the like. Also, in the individual embodiments, the operation described as the operation of "terminal" may be the operation of "base station (or AP)", "communication apparatus", "broadcast station", "mobile phone", "personal computer", "television receiver", or the like. Thirteenth Embodiment The phase change performed by the phase changers 305A, 305B, 3801A, and 3801B have been described above with reference to FIGS. 3, 26, 38, 39, 40 to 48, and so forth. In the present embodiment, a description will be given of an example of a transmission state and an example of a reception state at that time. As an example, the operation in FIG. 3 will be described.

First, a description will be given of, for comparison, a case where phase change is not performed by the phase changer 305B in FIG. 3.

Figure 68A:
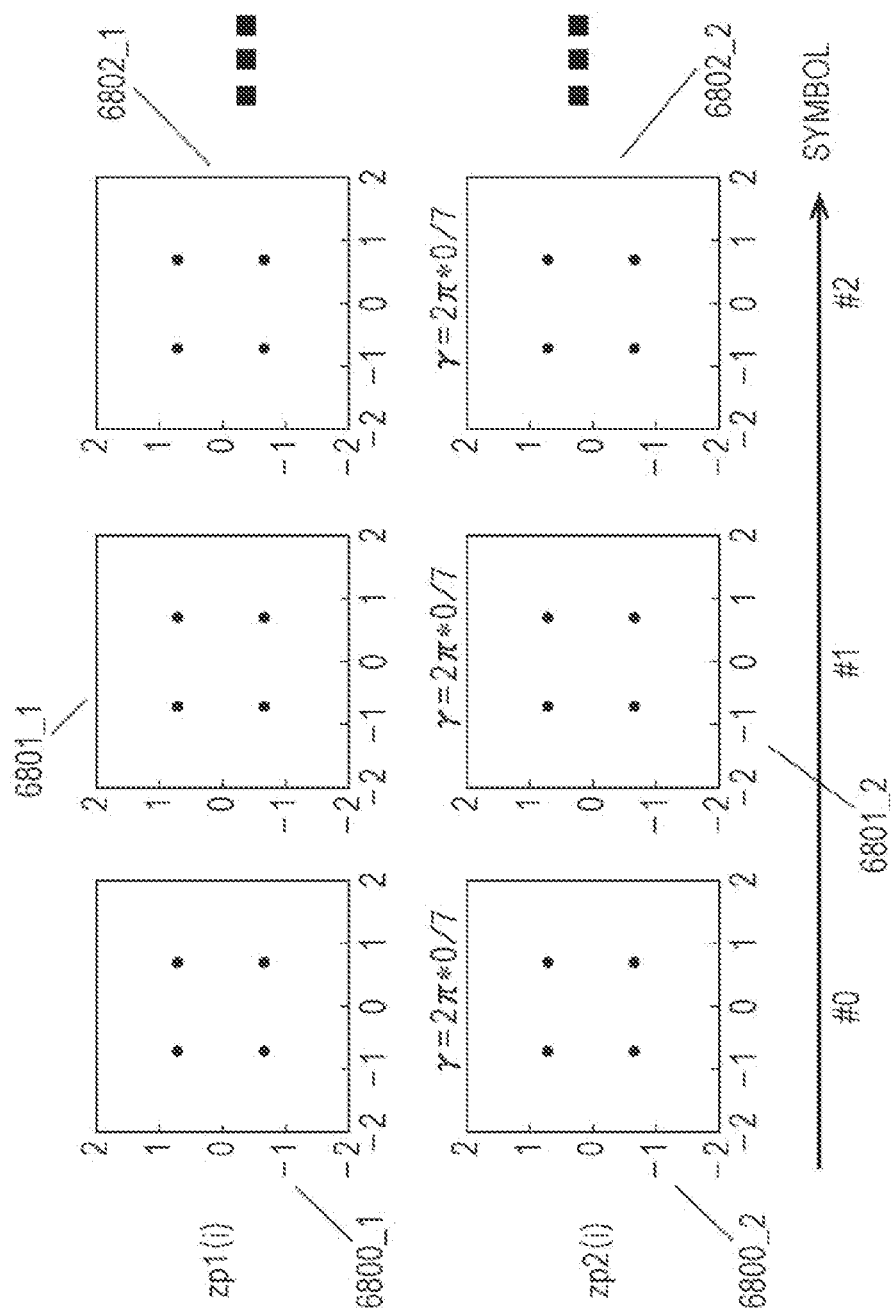
FIG. 68A is a diagram illustrating a first example of the state of signal points of signals transmitted by the transmission apparatus including the configuration in FIG. 3.
Figure 68B:
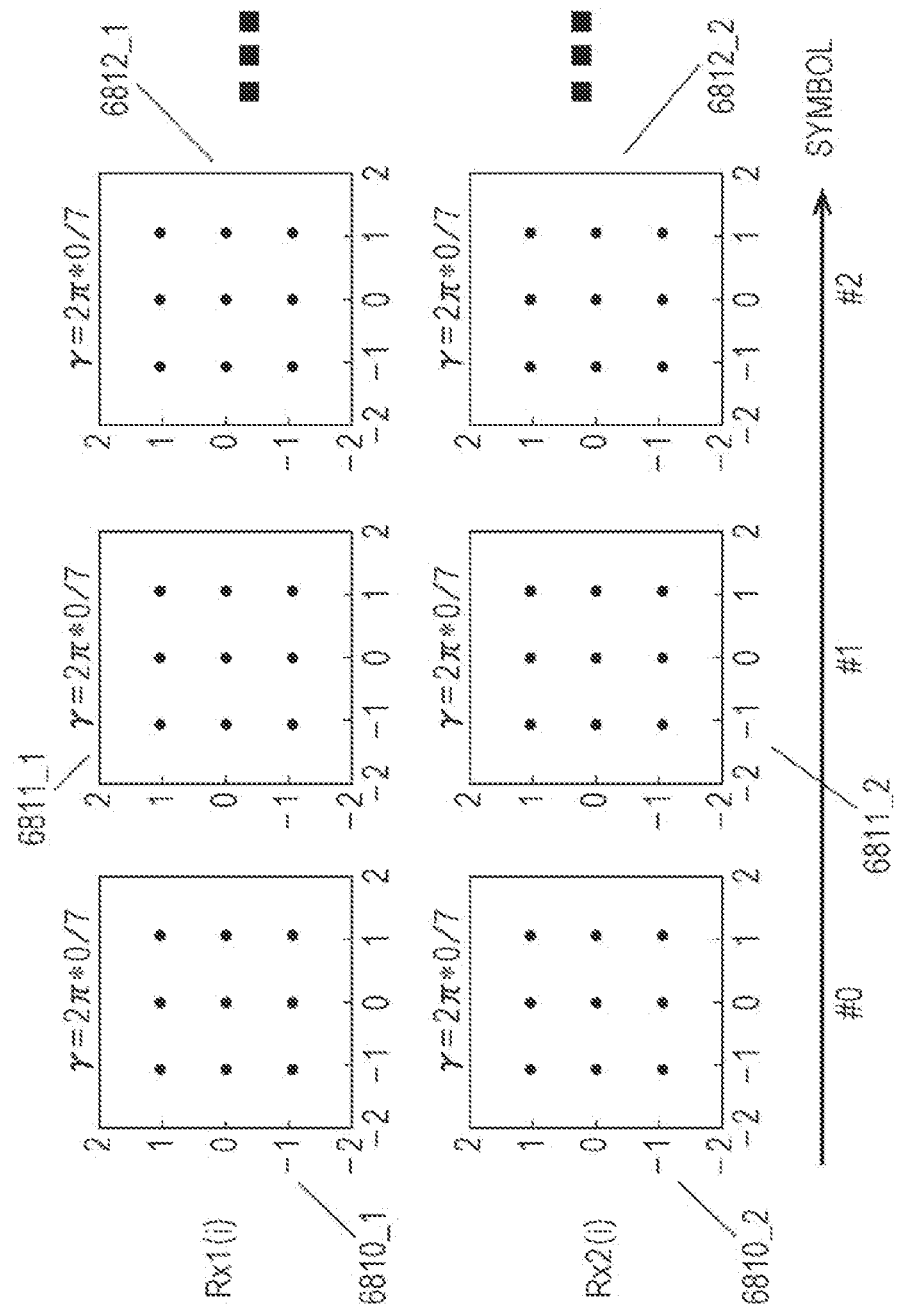
FIG. 68B is a diagram illustrating a first example of the state of signal points of signals received by the reception apparatus as a communication partner of the transmission apparatus including the configuration in FIG. 3.

FIG. 68A is a diagram illustrating a first example of the state of signal points of signals transmitted by the transmission apparatus including the configuration in FIG. 3. FIG. 68B is a diagram illustrating a first example of the state of signal points of signals received by the reception apparatus as a communication partner of the transmission apparatus including the configuration in FIG. 3. In FIGS. 68A and 68B, the state of signal points on the in-phase I quadrature Q plane is sequentially illustrated in the horizontal-axis direction for each symbol number.

The example illustrated in FIGS. 68A and 68B is an example of a case where, in the transmission apparatus, the phase changer 305B in FIG. 3 does not operate, and the weight combiner 303 performs weight combining of any of Expressions (33), (34), (35), and (36). In addition, the modulation scheme applied to $sp1(i)$ of the mapped signal 301A is QPSK, and the modulation scheme applied to $sp2(i)$ of the mapped signal 301B is QPSK.

In FIG. 68A, 6800_1 denotes the state of signal points of $zp1(i)$ of the signal 304A with a symbol number #0, and • represents a signal point. There are four signal points. In FIG. 68A, 6800_2 denotes the state of signal points of $zp2(i)$ of the signal 306B with the symbol number #0, and • represents a signal point. There are four signal points. In FIG. 68A, 6801_1 denotes the state of signal points of $zp1(i)$ of the signal 304A with a symbol number #1, and • represents a signal point. There are four signal points. In FIG. 68A, 6801_2 denotes the state of signal points of $zp2(i)$ of the signal 306B with the symbol number #1, and • represents a signal point. There are four signal points. In FIG. 68A, 6802_1 denotes the state of signal points of $zp1(i)$ of the signal 304A with a symbol number #2, and • represents a signal point. There are four signal points. In FIG. 68A, 6802_2 denotes the state of signal points of $zp2(i)$ of the signal 306B with the symbol number #2, and • represents a signal point. There are four signal points.

FIG. 68B illustrates the state of signal points at the time of reception corresponding to the state of signal points of the transmitted signals illustrated in FIG. 68A. To simplify the description, the channel matrix of Expression (41) is expressed by the following Expression (63) as an example of an LOS environment.

$$\begin{pmatrix} h11(i) & h12(i) \\ h21(i) & h22(i) \end{pmatrix} = \begin{pmatrix} 1 & 1 \\ 1 & 1 \end{pmatrix}$$ Expression (63)

In FIG. 68B, 6810_1 denotes the state of signal points at the time of reception of $Rx1(i)$, which is the reception signal 1902X in FIG. 19 with the symbol number #0, and • represents a signal point. There are nine signal points. In FIG. 68B, 6810_2 denotes the state of signal points at the time of reception of $Rx2(i)$, which is the reception signal 1902Y in FIG. 19 with the symbol number #0, and • represents a signal point. There are nine signal points. In FIG. 68B, 6811_1 denotes the state of signal points at the time of reception of $Rx1(i)$, which is the reception signal 1902X in FIG. 19 with the symbol number #1, and • represents a signal point. There are nine signal points. In FIG. 68B, 6811_2 denotes the state of signal points at the time of reception of $Rx2(i)$, which is the reception signal 1902Y in FIG. 19 with the symbol number #1, and • represents a signal point. There are nine signal points. In FIG. 68B, 6812_1 denotes the state of signal points at the time of reception of $Rx1(i)$, which is the reception signal 1902X in FIG. 19 with the symbol number #2, and • represents a signal point. There are nine signal points. In FIG. 68B, 6812_2 denotes the state of signal points at the time of reception of $Rx2(i)$, which is the reception signal 1902Y in FIG. 19 with the symbol number #2, and • represents a signal point. There are nine signal points.

In a case where modulated signals are transmitted in the manner illustrated in FIG. 68A, the signal points in the reception apparatus are those illustrated in FIG. 68B. In this case, the number of signal points at the time of reception is nine, and this state has a characteristic of not changing even if the symbol number changes. Ideally, there are sixteen signal points. In this state, it is difficult to obtain high data reception quality at the reception apparatus.

Next, a description will be given of a case where phase change is performed by the phase changer 305B in FIG. 3.

FIG. 69A is a diagram illustrating a second example of the state of signal points of signals transmitted by the transmission apparatus including the configuration in FIG. 3. FIG. 69B is a diagram illustrating a second example of the state of signal points of signals received by the reception apparatus as a communication partner of the transmission apparatus including the configuration in FIG. 3. In FIGS. 69A and 69B, the state of signal points on the in-phase I quadrature Q plane is sequentially illustrated in the horizontal-axis direction for each symbol number.

The example illustrated in FIGS. 69A and 69B is an example of a case where, in the transmission apparatus, the phase changer 305B operates, and the weight combiner 303 performs weight combining of any of Expressions (33), (34), (35), and (36). In addition, the modulation scheme applied to $sp1(i)$ of the mapped signal 301A is QPSK, and the modulation scheme applied to $sp2(i)$ of the mapped signal 301B is QPSK.

In FIG. 69A, 6900_1 denotes the state of signal points of $zp1(i)$ of the signal 304A with the symbol number #0, and • represents a signal point. There are four signal points. In FIG. 69A, 6900_2 denotes the state of signal points of $zp2(i)$ of the signal 306B with the symbol number #0, and • represents a signal point. There are four signal points. In FIG. 69A, 6901_1 denotes the state of signal points of $zp1(i)$ of the signal 304A with the symbol number #1, and • represents a signal point. There are four signal points. In FIG. 69A, 6901_2 denotes the state of signal points of $zp2(i)$ of the signal 306B with the symbol number #1, and • represents a signal point. There are four signal points. Since the phase changer 305B operates and performs phase change, the phase of the signal points denoted by 6901_2 is changed from the signal points denoted by 6900_2. In FIG. 69A, 6902_1 denotes the state of signal points of $zp1(i)$ of the signal 304A with the symbol number #2, and • represents a signal point. There are four signal points. In FIG. 69A, 6902_2 denotes the state of signal points of $zp2(i)$ of the signal 306B with the symbol number #2, and • represents a signal point. There are four signal points. Since the phase changer 305B operates and performs phase change, the phase of the signal points denoted by 6902_2 is changed from the signal points denoted by 6901_2.

FIG. 69B illustrates the state of signal points at the time of reception corresponding to the state of signal points of the transmitted signals illustrated in FIG. 69A. To simplify the description, the channel matrix is expressed by Expression (63) as an example of an LOS environment.

In FIG. 69B, 6910_1 denotes the state of signal points at the time of reception of $Rx1(i)$, which is the reception signal 1902X in FIG. 19 with the symbol number #0, and • represents a signal point. There are nine signal points. In FIG. 69B, 6910_2 denotes the state of signal points at the time of reception of $Rx2(i)$, which is the reception signal 1902Y in FIG. 19 with the symbol number #0, and • represents a signal point. There are nine signal points. In FIG. 69B, 6911_1 denotes the state of signal points at the time of reception of $Rx1(i)$, which is the reception signal 1902X in FIG. 19 with the symbol number #1, and • represents a signal point. There are sixteen signal points. The positions and the number of signal points are changed from 6910_1. This is because, as illustrated in FIG. 69A, the phase of the signal points denoted by 6901_2 is changed from the signal points denoted by 6900_2. In FIG. 69B, 6911_2 denotes the state of signal points at the time of reception of $Rx2(i)$, which is the reception signal 1902Y in FIG. 19 with the symbol number #1, and • represents a signal point. There are sixteen signal points. The positions and the number of signal points are changed from 6910_2. This is because, as illustrated in FIG. 69A, the phase of the signal points denoted by 6901_2 is changed from the signal points denoted by 6900_2. In FIG. 69B, 6912_1 denotes the state of signal points at the time of reception of $Rx1(i)$, which is the reception signal 1902X in FIG. 19 with the symbol number #2, and • represents a signal point. There are sixteen signal points. The positions of signal points are changed from 6911_1. This is because, as illustrated in FIG. 69A, the phase of the signal points denoted by 6902_2 is changed from the signal points denoted by 6901_2. In FIG. 69B, 6912_2 denotes the state of signal points at the time of reception of $Rx2(i)$, which is the reception signal 1902Y in FIG. 19 with the symbol number #2, and • represents a signal point. There are sixteen signal points. The positions of signal points are changed from 6911_2. This is because, as illustrated in FIG. 69A, the phase of the signal points denoted by 6902_2 is changed from the signal points denoted by 6901_2.

In a case where modulated signals are transmitted in the manner illustrated in FIG. 69A, the signal points in the reception apparatus are those illustrated in FIG. 69B, and the number of signal points may be sixteen. If the symbol number changes, the positions of signal points on the in-phase I quadrature Q plane change.

In this way, in a state where the radio wave condition is steady as in an LOS environment, phase change performed in the transmission apparatus causes a change in the state of signal points at the time of reception in the reception apparatus. Thus, there is an increased possibility that the data reception quality at the reception apparatus is improved.

The description given above is merely an example. To induce the above-described situation "in a steady state such as an LOS environment, the state at the time of reception in the reception apparatus changes", a method of performing phase change by the phase changers 305A, 305B, 3801A, and 3801B may be used as in FIGS. 3, 26, 38, 39, 40 to 48, and so forth, for example. Also with this configuration, a possibility of improving the data reception quality is increased, as described above.

Description of Operation of Reception Apparatus

As described above, the reception apparatus illustrated in FIG. 19 receives, as a result of phase change, a reception signal in which the signal point arrangement at the time of reception changes. Hereinafter, a supplemental description will be given of the operation of the reception apparatus in FIG. 19. A description will be given of a case where the transmission apparatus has the configuration illustrated in FIGS. 3, 26, or the like, that is, the transmission apparatus has a configuration in which a phase changer is arranged downstream of a weight combiner and generates and transmits modulated signals.

The transmission apparatus transmits modulated signals with the frame configurations in (FIGS. 8 and 9) or (FIGS. 10 and 11), for example.

In the reception apparatus of the terminal #p in FIG. 19, the control information decoder 1909 obtains, from the control information symbol in (FIGS. 8 and 9) or (FIGS. 10 and 11), information about the transmission method, modulation scheme, error-correcting coding method, and so forth used to generate data symbols. In a case where the transmission apparatus performs phase change, the control information decoder 1909 obtains information about "what phase change has been performed on data symbols" included in the control information symbol, and outputs a control signal 1901 including information about a phase change method so that the data symbols can be demodulated in consideration of phase change. It is assumed that the control signal 1901 includes information about the transmission method, modulation scheme, error-correcting coding method, and so forth.

As described in FIG. 20, the reception signals $r1(i)$ and $r2(i)$ are expressed by Expression (41). On the basis of Expression (3), Expression (41), and Expression (42), the reception signals $r1(i)$ and $r2(i)$ are expressed by the following Expression (64).

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} Yp(i) & 0 \\ 0 & yp(i) \end{pmatrix} Fp \begin{pmatrix} sp1(i) \\ sp2(i) \end{pmatrix} + \begin{pmatrix} n1(i) \\ n2(i) \end{pmatrix}$$
$$= \begin{pmatrix} h11(i) & h12(i) \\ h21(i) & h22(i) \end{pmatrix} \begin{pmatrix} Yp(i) & 0 \\ 0 & yp(i) \end{pmatrix} \begin{pmatrix} a & b \\ c & d \end{pmatrix} \begin{pmatrix} sp1(i) \\ sp2(i) \end{pmatrix} + \begin{pmatrix} n1(i) \\ n2(i) \end{pmatrix}$$

Expression (64)

In a case where the phase changer 305A does not perform phase change (or in a case where the phase changer 305A does not exist), $Yp(i) = 1$. In a case where the phase changer 305B does not perform phase change (or in a case where the phase changer 305B does not exist), $yp(i) = 1$.

The modulated signal $u1$ channel estimator 1905_1 estimates $h11(i)$ in Expression (64) by using the preamble and pilot symbols in (FIGS. 8 and 9) or (FIGS. 10 and 11) and outputs it (see 1906_1 in FIG. 19). The modulated signal $u2$ channel estimator 1905_2 estimates $h12(i)$ in Expression (64) by using the preamble and pilot symbols in (FIGS. 8 and 9) or (FIGS. 10 and 11) and outputs it (see 1906_2 in FIG. 19). The modulated signal $u1$ channel estimator 1907_1 estimates $h21(i)$ in Expression (64) by using the preamble and pilot symbols in (FIGS. 8 and 9) or (FIGS. 10 and 11) and outputs it (see 1908_1 in FIG. 19). The modulated signal $u2$ channel estimator 1907_2 estimates $h22(i)$ in Expression (64) by using the preamble and pilot symbols in (FIGS. 8 and 9) or (FIGS. 10 and 11) and outputs it (see 1908_2 in FIG. 19).

The signal processor 1911 learns the relationship in Expression (64) from input signals, and thus demodulates $sp1(i)$ and $sp2(i)$ on the basis of the relationship in Expression (64) and then performs error-correcting decoding to obtain and output the reception data 1912.

A description will be given of a case where the transmission apparatus has the configuration in any of FIGS. 40 to 48, that is, a configuration in which phase changers are arranged both upstream and downstream of the weight combiner, and generates and transmits modulated signals.

The transmission apparatus transmits modulated signals with the frame configurations in (FIGS. 8 and 9) or (FIGS. 10 and 11), for example.

In the reception apparatus of the terminal #p in FIG. 19, the control information decoder 1909 obtains, from the control information symbol in (FIGS. 8 and 9) or (FIGS. 10 and 11), information about the transmission method, modulation scheme, error-correcting coding method, and so forth used to generate data symbols. In a case where the transmission apparatus performs phase change, the control information decoder 1909 obtains information about "what phase change has been performed on data symbols" included in the control information symbol, and outputs the control signal 1901 including information about a phase change method so that the data symbols can be demodulated in consideration of phase change. It is assumed that the control signal 1901 includes information about the transmission method, modulation scheme, error-correcting coding method, and so forth.

As described in FIG. 20, the reception signals $r1(i)$ and $r2(i)$ are expressed by Expression (41). At this time, on the basis of Expression (3), Expression (41), Expression (42), and Expression (51), the reception signals $r1(i)$ and $r2(i)$ are expressed by the following Expression (65).

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} Yp(i) & 0 \\ 0 & yp(i) \end{pmatrix} Fp \begin{pmatrix} Vp(i) & 0 \\ 0 & vp(i) \end{pmatrix} \begin{pmatrix} sp1(i) \\ sp2(i) \end{pmatrix} + \begin{pmatrix} n1(i) \\ n2(i) \end{pmatrix}$$
$$= \begin{pmatrix} h11(i) & h12(i) \\ h21(i) & h22(i) \end{pmatrix} \begin{pmatrix} Yp(i) & 0 \\ 0 & yp(i) \end{pmatrix} \begin{pmatrix} a & b \\ c & d \end{pmatrix} \begin{pmatrix} Vp(i) & 0 \\ 0 & vp(i) \end{pmatrix} \begin{pmatrix} sp1(i) \\ sp2(i) \end{pmatrix} + \begin{pmatrix} n1(i) \\ n2(i) \end{pmatrix}$$

Expression (65)

In a case where the phase changer 305A does not perform phase change (or in a case where the phase changer 305A does not exist), Yp(i) = 1. In a case where the phase changer 305B does not perform phase change (or in a case where the phase changer 305B does not exist), yp(i) = 1. In a case where the phase changer 3801A does not perform phase change (or in a case where the phase changer 3801A does not exist), Vp(i) = 1. In a case where the phase changer 3801B does not perform phase change (or in a case where the phase changer 3801B does not exist), vp(i) = 1.

The modulated signal $u1$ channel estimator 1905_1 estimates $h11(i)$ in Expression (65) by using the preamble and pilot symbols in (FIGS. 8 and 9) or (FIGS. 10 and 11) and outputs it (see 1906_1 in FIG. 19). The modulated signal $u2$ channel estimator 1905_2 estimates $h12(i)$ in Expression (65) by using the preamble and pilot symbols in (FIGS. 8 and 9) or (FIGS. 10 and 11) and outputs it (see 1906_2 in FIG. 19). The modulated signal $u1$ channel estimator 1907_1 estimates $h21(i)$ in Expression (65) by using the preamble and pilot symbols in (FIGS. 8 and 9) or (FIGS. 10 and 11) and outputs it (see 1908_1 in FIG. 19). The modulated signal $u2$ channel estimator 1907_2 estimates $h22(i)$ in Expression (65) by using the preamble and pilot symbols in (FIGS. 8 and 9) or (FIGS. 10 and 11) and outputs it (see 1908_2 in FIG. 19).

The signal processor 1911 learns the relationship in Expression (65) from input signals, and thus demodulates $sp1(i)$ and $sp2(i)$ on the basis of the relationship in Expression (65) and then performs error-correcting decoding to obtain and output the reception data 1912.

Fourteenth Embodiment

In the present embodiment, a description will be given of a configuration of the transmission apparatus, such as a base station, an access point, or a broadcast station, different from the configuration in FIG. 1.

Figure 70:
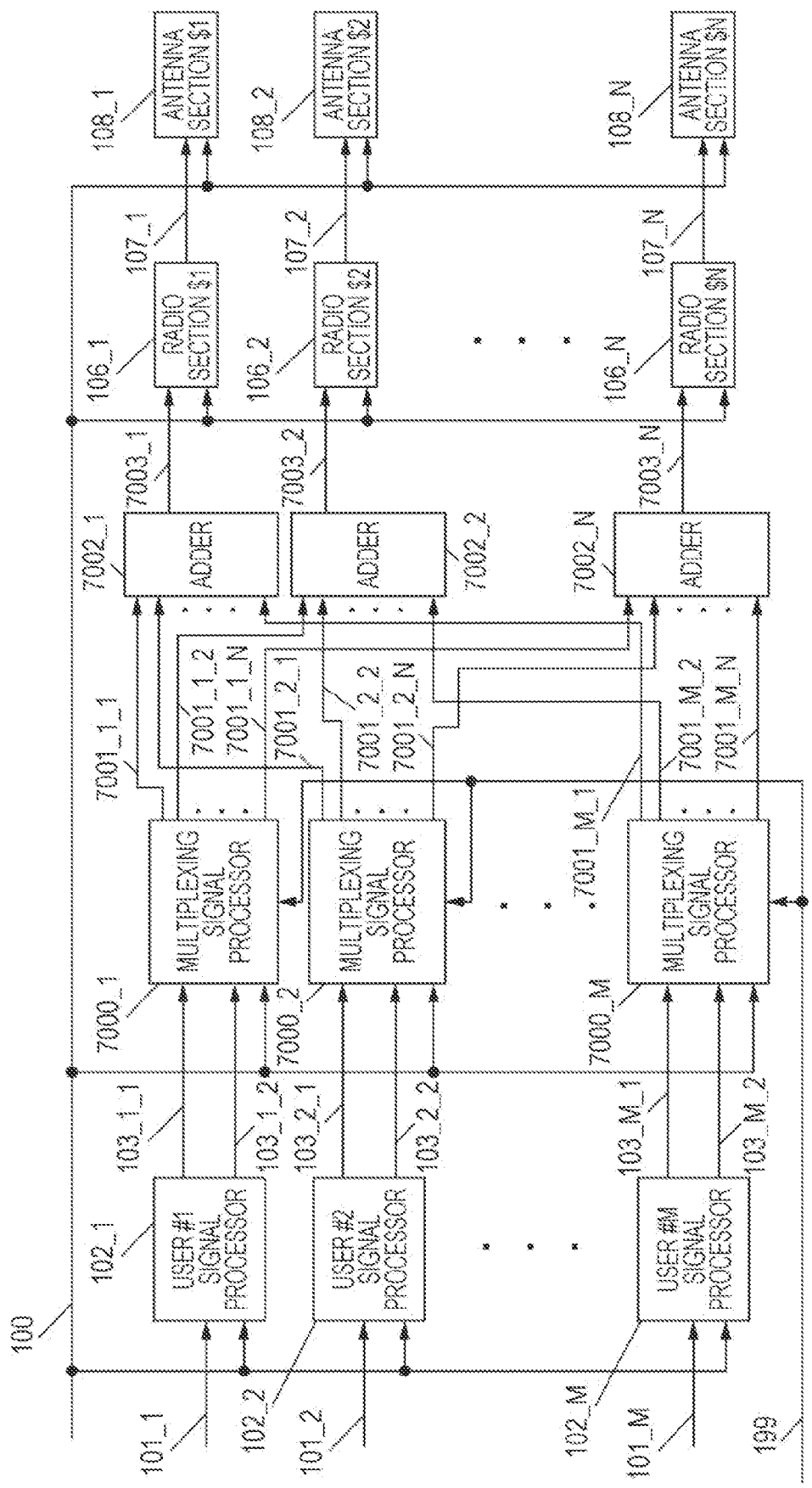
FIG. 70 is a diagram illustrating an example configuration of the transmission apparatus of the base station (AP) different from FIG. 1.

FIG. 70 is a diagram illustrating an example configuration of the transmission apparatus of a base station (AP), different from the configuration in FIG. 1. In FIG. 70, the elements similar to those in FIG. 1 are denoted by the same numerals, and the description thereof is omitted.

FIG. 70 is different from FIG. 1 in that multiplexing signal processors for individual users (multiplexing signal processors 7000_1 to 7000_M) are provided in FIG. 70 instead of the multiplexing signal processor 104 in FIG. 1, and that adders (adders 7002_1 to 7002_N) are provided downstream of the multiplexing signal processors.

The multiplexing signal processor 7000_1 receives the control signal 100, the user #1 first baseband signal 103_1_1, the user #1 second baseband signal 103_1_2, and the (common) reference signal 199. On the basis of the control signal 100, the multiplexing signal processor 7000_1 performs multiplexing signal processing on the user #1 first baseband signal 103_1_1 and the user #1 second baseband signal 103_1_2, and generates and outputs a user #1 multiplexed signal $1 baseband signal 7001_1_1 to a user #1 multiplexed signal $N baseband signal 7001_1_N. Here, N is an integer equal to or greater than 1. In a case where q is an integer from 1 to N, a user #1 multiplexed signal $q baseband signal 7001_1_$q$ exists. In addition, the user #1 multiplexed signal $1 baseband signal 7001_1_1 to the user #1 multiplexed signal $N baseband signal 7001_1_N may include a reference signal.

Likewise, the multiplexing signal processor 7000_2 receives the control signal 100, the user #2 first baseband signal 103_2_1, the user #2 second baseband signal 103_2_2, and the (common) reference signal 199. On the basis of the control signal 100, the multiplexing signal processor 7000_2 performs multiplexing signal processing on the user #2 first baseband signal 103_2_1 and the user #2 second baseband signal 103_2_2, and generates and outputs a user #2 multiplexed signal $1 baseband signal 7001_2_1 to a user #2 multiplexed signal $N baseband signal 7001_2_N. Here, N is an integer equal to or greater than 1. In a case where q is an integer from 1 to N, a user #2 multiplexed signal $q baseband signal 7001_2_$q$ exists. In addition, the user #2 multiplexed signal $1 baseband signal 7001_2_1 to the user #2 multiplexed signal $N baseband signal 7001_2_N may include a reference signal.

Likewise, the multiplexing signal processor 7000_M receives the control signal 100, the user #M first baseband signal 103_M_1, the user #M second baseband signal 103_M_2, and the (common) reference signal 199. On the basis of the control signal 100, the multiplexing signal processor 7000_M performs multiplexing signal processing on the user #M first baseband signal 103_M_1 and the user #M second baseband signal 103_M_2, and generates and outputs a user #M multiplexed signal $1 baseband signal 7001_M_1 to a user #M multiplexed signal $N baseband signal 7001_M_N. Here, N is an integer equal to or greater than 1. In a case where q is an integer from 1 to N, a user #M multiplexed signal $q baseband signal 7001_M_$q$ exists. In addition, the user #M multiplexed signal $1 baseband signal 7001_M_1 to the user #M multiplexed signal $N baseband signal 7001_M_N may include a reference signal.

Thus, a multiplexing signal processor 7000_$p$ (p is an integer from 1 to M) receives the control signal 100, a user #p first baseband signal 103_$p$_1, and a user #p second baseband signal 103_$p$_2. On the basis of the control signal 100, the multiplexing signal processor 7000_$p$ performs multiplexing signal processing on the user #p first baseband signal 103_$p$_1 and the user #p second baseband signal 103_$p$_2, and generates and outputs a user #p multiplexed signal $1 baseband signal 7001_$p$_1 to a user #p multiplexed signal $N baseband signal 7001_$p$_N. Here, N is an integer equal to or greater than 1. In a case where q is an integer from 1 to N, a user #p multiplexed signal $q baseband signal 7001_$p$_$q$ exists. In addition, the user #p multiplexed signal $1 baseband signal 7001_$p$_1 to the user #p multiplexed signal $N baseband signal 7001_$p$_N may include a reference signal.

The adder 7002_1 receives the user #1 multiplexed signal $1 baseband signal 7001_1_1 to the user #M multiplexed signal $1 baseband signal 7001_M_1. That is, in a case where p is an integer from 1 to M, the adder 7002_1 receives the user #p multiplexed signal $1 baseband signal 7001_$p$_1. The adder 7002_1 adds the user #1 multiplexed signal $1 baseband signal 7001_1_1 to the user #M multiplexed signal $1 baseband signal 7001_M_1 and outputs a first added signal 7003_1.

Likewise, the adder 7002_2 receives the user #1 multiplexed signal $2 baseband signal 7001_1_2 to the user #M multiplexed signal $2 baseband signal 7001_M_2. That is, in a case where p is an integer from 1 to M, the adder 7002_2 receives the user #p multiplexed signal $2 baseband signal 7001_$p$_2. The adder 7002_2 adds the user #1 multiplexed signal $2 baseband signal 7001_1_2 to the user #M multiplexed signal $2 baseband signal 7001_M_2 and outputs a second added signal 7003_2.

The adder 7002_N receives the user #1 multiplexed signal $N baseband signal 7001_1_N to the user #M multiplexed signal $N baseband signal 7001_M_N. That is, in a case where p is an integer from 1 to M, the adder 7002_N receives the user #p multiplexed signal $N baseband signal 7001_p_N. The adder 7002_N adds the user #1 multiplexed signal $N baseband signal 7001_1_N to the user #M multiplexed signal $N baseband signal 7001_M_N and outputs an N-th added signal 7003_N.

Thus, an adder 7002_q receives the user #1 multiplexed signal $q baseband signal 7001_1_q to the user #M multiplexed signal $q baseband signal 7001_M_q. That is, in a case where p is an integer from 1 to M, the adder 7002_q receives the user #p multiplexed signal $q baseband signal 7001_p_q. The adder 7002_q adds the user #1 multiplexed signal $q baseband signal 7001_1_q to the user #M multiplexed signal $q baseband signal 7001_M_q and outputs a q-th added signal 7003_q. At this time, q is an integer from 1 to N.

The radio section $1 (106_1) receives the control signal 100 and the first added signal 7003_1, performs processing such as frequency conversion and amplification on the first added signal 7003_1 on the basis of the control signal 100, and outputs the transmission signal 107_1.

Likewise, the radio section $2 (106_2) receives the control signal 100 and the second added signal 7003_2, performs processing such as frequency conversion and amplification on the second added signal 7003_2 on the basis of the control signal 100, and outputs the transmission signal 107_2.

Likewise, the radio section $N (106_N) receives the control signal 100 and the N-th added signal 7003_N, performs processing such as frequency conversion and amplification on the N-th added signal 7003_N on the basis of the control signal 100, and outputs the transmission signal 107_N.

Thus, a radio section $q (106_q) receives the control signal 100 and the q-th added signal 7003_q, performs processing such as frequency conversion and amplification on the q-th added signal 7003_q on the basis of the control signal 100, and outputs a transmission signal 107_q. At this time, q is an integer from 1 to N.

Next, a description will be given of an example of the operation of the multiplexing signal processor 7000_p.

For example, on the basis of Expression (3), Expression (42), or the like, the user #p first baseband signal 103_p_1 and the user #p second baseband signal 103_p_2 output from the user #p signal processor 102_p (p is an integer from 1 to M) in FIG. 70 are represented by zp1(i) and zp2(i), respectively. Note that zp1(i) and zp2(i) may be generated by processing other than Expression (3) and Expression (42), and zp1(i) = 0 and zp2(i) = 0 may hold. When zp1(i) = 0, zp1(i) does not exist. When zp2(i) = 0, zp2(i) does not exist.

When the user #p multiplexed signal $q baseband signal 7001_p_q output from the multiplexing signal processor 7000_p is represented by gpq(i), gpq(i) is expressed by the following Expression (66).

$$gpq(i) = a\_p\_q\_1(i) \times zp1(i) + a\_p\_q\_2(i) \times zp2(i) \quad \text{Expression (66)}$$

At this time, a_p_q_1(i) and a_p_q_2(i) are weighting coefficients for multiplexing and may be defined as complex numbers. Thus, a_p_q_1(i) and a_p_q_2(i) may be real numbers. Here, a_p_q_1(i) and a_p_q_2(i) are each expressed by a function of a symbol number i, but the value need not necessarily change for each symbol. In addition, a_p_q_1(i) and a_p_q_2(i) are decided on the basis of feedback information of each terminal.

In FIG. 70, the number of user #p baseband signals output from the user #p signal processor 102_p is not limited to two. For example, it is assumed that the number of user #p baseband signals output from the user #p signal processor 102_p is equal to or smaller than S. Here, S is an integer equal to or greater than 1. The user #p k-th baseband signal (k is an integer from 1 to S) is represented by zpk(i).

At this time, when the user #p multiplexed signal $q baseband signal 7001_p_q output from the multiplexing signal processor 7000_p is represented by gpq(i), gpq(i) is expressed by the following Expression (67).

$$gpq(i) = \sum_{k=1}^{S} a\_p\_q\_k(i) \times zpk(i) \quad \text{Expression (67)}$$

At this time, a_p_q_k(i) is a weighting coefficient for multiplexing and may be defined as a complex number. Thus, a_p_q_k(i) may be a real number. Here, a_p_q_k(i) is each expressed by a function of a symbol number i, but the value need not necessarily change for each symbol. In addition, a_p_q_k(i) is decided on the basis of feedback information of each terminal.

Next, a description will be given of an example of the operation of the adder 7002_q.

The q-th added signal 7003_q output from the adder 7002_q in FIG. 70 is represented by eq(i). Then, eq(i) is expressed by the following Expression (68).

$$eq(i) = \sum_{k=1}^{M} gkq(i) \quad \text{Expression (68)}$$

As described above, also with the configuration in FIG. 70 of the transmission apparatus of the base station or AP, the individual embodiments described in this specification can be carried out similarly, and the effects described in the individual embodiments can be obtained similarly.

Third Supplement

In this specification, FIG. 35 illustrates an example of the configuration of the reception apparatus of the terminal #p, which is a communication partner of the base station or AP, in a case where the transmission apparatus of the base station or AP transmits a modulated signal of a single stream. The configuration of the terminal #p that receives the modulated signal of the single stream is not limited to that in FIG. 35. For example, the reception apparatus of the terminal #p may include multiple reception antennas. For example, in FIG. 19, in a case where the modulated signal u2 channel estimators 1905_2 and 1907_2 do not operate, a channel estimator for one modulated signal operates. With this configuration, a modulated signal of a single stream can be received.

Thus, in the description of this specification, the embodiment described using FIG. 35 can be carried out similarly by using the above-described configuration of the reception apparatus instead of the configuration in FIG. 35, and similar effects can be obtained. Fifteenth Embodiment In the present embodiment, a description will be given of another method for performing the operation of the terminal #p described in the third embodiment, the fifth embodiment, and so forth.

An example of the configuration of the terminal #p has already been described by using FIG. 34 and so forth, and thus the description thereof is omitted. Also, an example of the configuration of the reception apparatus 3404 of the terminal #p in FIG. 34 has been described by using FIG. 35 and so forth, and thus the description thereof is omitted.

An example of the frame configuration that is used when the base station or AP as a communication partner of the terminal #p transmits a modulated signal of a single stream using the multi-carrier scheme such as the OFDM scheme has been described by using FIG. 36 and so forth, and thus the description thereof is omitted.

For example, the transmission apparatus of the base station (AP) in FIG. 1 may transmit a modulated signal of a single stream having the frame configuration in FIG. 36.

An example of the frame configuration that is used when the base station or AP as a communication partner of the terminal #p transmits a modulated signal of a single stream using the single-carrier scheme has been described by using FIG. 37 and so forth, and thus the description thereof is omitted.

For example, the transmission apparatus of the base station (AP) in FIG. 1 may transmit a modulated signal of a single stream having the frame configuration in FIG. 37.

In addition, for example, the transmission apparatus of the base station (AP) in FIG. 1 may transmit modulated signals of multiple streams having the frame configurations in FIGS. 8 and 9.

Furthermore, for example, the transmission apparatus of the base station (AP) in FIG. 1 may transmit modulated signals of multiple streams having the frame configurations in FIGS. 10 and 11.

FIG. 71 is a diagram illustrating an example of the data included in the reception capability notification symbol 2702 transmitted by the terminal #p in FIG. 27, different from the examples in FIGS. 28, 29, and 30. The elements similar to those in FIGS. 28, 29, and 30 are denoted by the same numerals. The elements that function similarly to those in FIGS. 28, 29, and 30 will not be described.

The example of data illustrated in FIG. 71 has a configuration in which data 5301 about "supported precoding methods" is added to the example of data in FIG. 30. Hereinafter, a description will be given of the data 5301 about "supported precoding methods".

It is assumed that, when the base station or AP transmits multiple modulated signals for multiple streams, the base station or AP is able to select one precoding method from among multiple precoding methods, perform weight combining (for example, by the weight combiner 303 in FIG. 3) by using the selected precoding method, and generate and transmit the modulated signals. As described in this specification, the base station or AP may perform phase change.

At this time, the data that is used by the terminal #p to notify the base station or AP "whether modulated signals can be demodulated when the base station or AP performs any of the multiple precoding operations" corresponds to the data 5301 about "supported precoding methods".

For example, it is assumed that, when the base station or AP generates modulated signals of multiple streams for the terminal #p, there is a possibility that precoding using the precoding matrix in Expression (33) or Expression (34) is supported as a precoding method #A, for example, and precoding using the precoding matrix in which θ = π/4 radians in Expression (15) or Expression (16) is supported as a precoding method #B, for example.

It is assumed that, when the base station or AP generates modulated signals of multiple streams for the terminal #p, the base station or AP selects either of the precoding method #A and the precoding method #B as a precoding method, performs precoding (weight combining) by using the selected precoding method, and transmits the modulated signals.

At this time, the terminal #p transmits a modulated signal including "information indicating whether or not the terminal #p is able to receive multiple modulated signals, demodulate the modulated signals, and obtain data when the base station or AP transmits the multiple modulated signals to the terminal #p by using the precoding method #A" and "information indicating whether or not the terminal #p is able to receive multiple modulated signals, demodulate the modulated signals, and obtain data when the base station or AP transmits the multiple modulated signals to the terminal #p by using the precoding method #B". By receiving this modulated signal, the base station or AP is able to learn "whether the terminal #p as a communication partner supports the precoding method #A and the precoding method #B and is able to demodulate the modulated signals".

For example, the data 5301 about "supported precoding methods" in FIG. 71 included in the reception capability notification symbol 2702 transmitted by the terminal #p is configured as follows.

It is assumed that the data 5301 about "supported precoding methods" is made up of 2 bits, bit m0 and bit m1. The terminal #p transmits bit m0 and bit m1 as the data 5301 about "supported precoding methods" to the base station or AP as a communication partner.

For example, in a case where the terminal #p is able to receive and demodulate (support demodulation) "a modulated signal generated by the base station or AP by using the precoding method #A", m0 = 1 is set, and bit m0 is transmitted as a part of the data 5301 about "supported precoding methods" to the base station or AP as a communication partner.

In a case where the terminal #p is able to receive but unable to demodulate "a modulated signal generated by the base station or AP by using the precoding method #A", m0 = 0 is set, and bit m0 is transmitted as a part of the data 5301 about "supported precoding methods" to the base station or AP as a communication partner.

For example, in a case where the terminal #p is able to receive and demodulate (support demodulation) "a modulated signal generated by the base station or AP by using the precoding method #B", m1 = 1 is set, and bit m1 is transmitted as a part of the data 5301 about "supported precoding methods" to the base station or AP as a communication partner.

In a case where the terminal #p is able to receive but unable to demodulate "a modulated signal generated by the base station or AP by using the precoding method #B", m1 = 0 is set, and bit m1 is transmitted as a part of the data 5301 about "supported precoding methods" to the base station or AP as a communication partner.

Next, specific operation examples will be described below by using first to fifth examples.

First Example

As the first example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits modulated signals of multiple streams to the terminal #p, the terminal #p supports the reception of the modulated signals. In "communication scheme #A" and "communication scheme #B", if the communication partner transmits a modulated signal of a single stream to the terminal #p, the terminal #p supports the reception of the modulated signal.

In a case where the communication partner performs phase change when transmitting modulated signals of multiple streams to the terminal #p, the terminal #p supports the reception of the modulated signals.

The single-carrier scheme and the OFDM scheme are supported.

The decoding of "error-correcting coding scheme #C" and the decoding of "error-correcting coding scheme #D" are supported as the error-correcting coding scheme.

The reception of "precoding method #A" and the reception of "precoding method #B" described above are supported.

Thus, the terminal #p having the configuration in FIG. 19 and supporting the above generates the reception capability notification symbol 2702 having the configuration illustrated in FIG. 71 on the basis of the rules described in the third embodiment and the description of the present embodiment, and transmits the reception capability notification symbol 2702 in accordance with the procedure in FIG. 27, for example.

At this time, the terminal #p generates the reception capability notification symbol 2702 having the configuration illustrated in FIG. 71 in the transmission apparatus 3403 in FIG. 34, for example, and the transmission apparatus 3403 in FIG. 34 transmits the reception capability notification symbol 2702 having the configuration illustrated in FIG. 71 in accordance with the procedure in FIG. 27.

In the case of the first example, the terminal #p supports the reception of "precoding method #A" and the reception of "precoding method #B", and thus bit m0 is set to 1 and bit m1 is set to 1 in the data 5301 about "supported precoding methods".

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station (AP) learns, from the data 2901 about "support/not support reception for multiple streams" in FIG. 71, that "if the communication partner transmits modulated signals of multiple streams to the terminal #p, the terminal #p supports the reception of the modulated signals", and "if the communication partner in "communication scheme #A" and "communication scheme #B" transmits a modulated signal of a single stream to the terminal #p, the terminal #p supports the reception of the modulated signal".

In addition, the signal processor 155 of the base station (AP) learns, from the data 2801 about "support/not support demodulation of modulated signal with phase change" in FIG. 71, that the terminal #p "supports phase change demodulation".

The signal processor 155 of the base station (AP) learns, from the data 3002 about "support/not support multi-carrier scheme" in FIG. 71, that "the terminal #p supports "single-carrier scheme" and "OFDM scheme'".

The signal processor 155 of the base station (AP) learns, from the data 3003 about "supported error-correcting coding schemes" in FIG. 71, that the terminal #p "supports the decoding of "error-correcting coding scheme #C" and the decoding of "error-correcting coding scheme #D'".

The signal processor 155 of the base station (AP) learns, from the data 5301 about "supported precoding methods" in FIG. 71, that the terminal #p "supports the reception of "precoding method #A" and the reception of "precoding method #B'".

Thus, the base station or AP appropriately generates and transmits a modulated signal that can be received by the terminal #p in consideration of a communication scheme supported by the terminal #p and a communication environment, and accordingly the data transmission efficiency in the system constituted by the base station or AP and the terminal #p can be increased.

Second Example

As the second example, it is assumed that the reception apparatus of the terminal #p has the configuration illustrated in FIG. 35 and the reception apparatus of the terminal #p supports the following, for example.

For example, the reception of "communication scheme #A" and "communication scheme #B" described in the third embodiment is supported.

If the communication partner transmits modulated signals of multiple streams to the terminal #p, the terminal #p does not support the reception of the modulated signals.

Thus, in a case where the communication partner performs phase change when transmitting modulated signals of multiple streams to the terminal #p, the terminal #p does not support the reception of the modulated signals.

The single-carrier scheme and the OFDM scheme are supported.

The decoding of "error-correcting coding scheme #C" and the decoding of "error-correcting coding scheme #D" are supported as the error-correcting coding scheme.

The reception of "precoding method #A" and the reception of "precoding method #B" described above are not supported.

Thus, the terminal #p having the configuration in FIG. 35 and supporting the above generates the reception capability notification symbol 2702 having the configuration illustrated in FIG. 71 on the basis of the rules described in the third embodiment and the description of the present embodiment, and transmits the reception capability notification symbol 2702 in accordance with the procedure in FIG. 27, for example.

At this time, the terminal #p generates the reception capability notification symbol 2702 having the configuration illustrated in FIG. 71 in the transmission apparatus 3403 in FIG. 34, for example, and the transmission apparatus 3403 in FIG. 34 transmits the reception capability notification symbol 2702 having the configuration illustrated in FIG. 71 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station (AP) learns, from the data 2901 about "support/not support reception for multiple streams" in FIG. 71, that "if the communication partner transmits modulated signals of multiple streams to the terminal #p, the terminal #p does not support the reception of the modulated signals".

Thus, the signal processor 155 of the base station (AP) determines that the data 2801 about "support/not support demodulation of modulated signal with phase change" in FIG. 71 is invalid and determines not to transmit a modulated signal whose phase has been changed, and outputs the control information 157 including this information.

In addition, the signal processor 155 of the base station (AP) determines that the data 5301 about "supported precoding methods" in FIG. 71 is invalid and determines not to transmit modulated signals for multiple streams, and outputs the control information 157 including this information.

The signal processor 155 of the base station (AP) learns, from the data 3002 about "support/not support multi-carrier scheme" in FIG. 71, that "the terminal #p supports "single-carrier scheme" and "OFDM scheme"'".

The signal processor 155 of the base station (AP) learns, from the data 3003 about "supported error-correcting coding schemes" in FIG. 71, that the terminal #p "supports the decoding of "error-correcting coding scheme #C" and the decoding of "error-correcting coding scheme #D'"".

For example, the terminal #p has the configuration in FIG. 35, and thus the base station or AP performs the above-described operations so as not to transmit modulated signals for multiple streams to the terminal #p. Thus, the base station or AP is able to appropriately transmit a modulated signal that can be demodulated/decoded by the terminal #p. Accordingly, the data transmission efficiency in the system constituted by the base station or AP and the terminal #p can be increased.

Third Example

As the third example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits modulated signals of multiple streams to the terminal #p, the terminal #p supports the reception of the modulated signals. In "communication scheme #A" and "communication scheme #B", if the communication partner transmits a modulated signal of a single stream to the terminal #p, the terminal #p supports the reception of the modulated signal.

In a case where the communication partner performs phase change when transmitting modulated signals of multiple streams to the terminal #p, the terminal #p supports the reception of the modulated signals.

The single-carrier scheme and the OFDM scheme are supported.

The decoding of "error-correcting coding scheme #C" and the decoding of "error-correcting coding scheme #D" are supported as the error-correcting coding scheme.

The reception of "precoding method #A" described above is supported. That is, in the third example, the reception of "precoding method #B" described above is not supported.

Thus, the terminal #p having the configuration in FIG. 19 and supporting the above generates the reception capability notification symbol 2702 having the configuration illustrated in FIG. 71 on the basis of the rules described in the third embodiment and the description of the present embodiment, and transmits the reception capability notification symbol 2702 in accordance with the procedure in FIG. 27, for example.

At this time, the terminal #p generates the reception capability notification symbol 2702 having the configuration illustrated in FIG. 71 in the transmission apparatus 3403 in FIG. 34, for example, and the transmission apparatus 3403 in FIG. 34 transmits the reception capability notification symbol 2702 having the configuration illustrated in FIG. 71 in accordance with the procedure in FIG. 27.

In the case of the third example, the terminal #p supports the reception of "precoding method #A" and does not support the reception of "precoding method #B", and thus bit m0 is set to 1 and the bit m1 is set to 0 in the data 5301 about "supported precoding methods".

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A" and "communication scheme #B".

In addition, the signal processor 155 of the base station (AP) learns, from the data 2901 about "support/not support reception for multiple streams" in FIG. 71, that "if the communication partner transmits modulated signals of multiple streams to the terminal #p, the terminal #p supports the reception of the modulated signals", and "if the communication partner in "communication scheme #A" and "communication scheme #B" transmits a modulated signal of a single stream to the terminal #p, the terminal #p supports the reception of the modulated signal".

In addition, the signal processor 155 of the base station (AP) learns, from the data 2801 about "support/not support demodulation of modulated signal with phase change" in FIG. 71, that the terminal #p "supports phase change demodulation".

The signal processor 155 of the base station (AP) learns, from the data 3002 about "support/not support multi-carrier scheme" in FIG. 71, that "the terminal #p supports "single-carrier scheme" and "OFDM scheme'"".

The signal processor 155 of the base station (AP) learns, from the data 3003 about "supported error-correcting coding schemes" in FIG. 71, that the terminal #p "supports the decoding of "error-correcting coding scheme #C" and the decoding of "error-correcting coding scheme #D'"".

The signal processor 155 of the base station (AP) learns, from the data 5301 about "supported precoding methods" in FIG. 71, that the terminal #p "supports the reception of "precoding method #A'"".

Thus, the base station or AP appropriately generates and transmits a modulated signal that can be received by the terminal #p in consideration of a communication method supported by the terminal #p and a communication environment, and accordingly the data transmission efficiency in the system constituted by the base station or AP and the terminal #p can be increased.

Fourth Example

As the fourth example, it is assumed that the reception apparatus of the terminal #p has the configuration illustrated in FIG. 19 and the reception apparatus of the terminal #p supports the following, for example.

For example, the reception of "communication scheme #A" and "communication scheme #B" described in the third embodiment is supported.

In "communication scheme #B", if the communication partner transmits modulated signals of multiple streams to the terminal #p, the terminal #p supports the reception of the modulated signals. In "communication scheme #A" and "communication scheme #B", if the communication partner transmits a modulated signal of a single stream to the terminal #p, the terminal #p supports the reception of the modulated signal.

The single-carrier scheme is supported. In the single-carrier scheme, the base station as a communication partner does not support "perform phase change in the case of modulated signals of multiple streams" and does not support "perform precoding".

Thus, in a case where the communication partner performs phase change when transmitting modulated signals of multiple streams to the terminal #p, the terminal #p does not support the reception of the modulated signals.

The decoding of "error-correcting coding scheme #C" and the decoding of "error-correcting coding scheme #D" are supported as the error-correcting coding scheme.

The reception of "precoding method #A" described above is supported.

Thus, the terminal #p having the configuration in FIG. 19 and supporting the above generates the reception capability notification symbol 2702 having the configuration illustrated in FIG. 71 on the basis of the rules described in the third embodiment and the description of the present embodiment, and transmits the reception capability notification symbol 2702 in accordance with the procedure in FIG. 27, for example.

At this time, the terminal #p generates the reception capability notification symbol 2702 illustrated in FIG. 71 in the transmission apparatus 3403 in FIG. 34, for example, and the transmission apparatus 3403 in FIG. 34 transmits the reception capability notification symbol 2702 illustrated in FIG. 71 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 2901 about "support/not support reception for multiple streams" in FIG. 71, "if the communication partner transmits modulated signals of multiple streams to the terminal #p, the terminal #p supports the reception of the modulated signals" and "if the communication partner in "communication scheme #A" and "communication scheme #B″ transmits a modulated signal of a single stream to the terminal #p, the terminal #p supports the reception of the modulated signal".

The signal processor 155 of the base station (AP) learns, from the data 3002 about "support/not support multi-carrier scheme" in FIG. 71, that "the terminal #p supports "single-carrier scheme′″".

Thus, the signal processor 155 of the base station (AP) determines that the data 2801 about "support/not support demodulation of modulated signal with phase change" in FIG. 71 is invalid and determines not to transmit a modulated signal whose phase has been changed, and outputs the control information 157 including this information.

In addition, the signal processor 155 of the base station (AP) determines that the data 5301 about "supported precoding methods" in FIG. 71 is invalid, and outputs the control information 157 indicating "precoding is not performed".

The signal processor 155 of the base station (AP) learns, from the data 3003 about "supported error-correcting coding schemes" in FIG. 71, that the terminal #p "supports the decoding of "error-correcting coding scheme #C" and the decoding of "error-correcting coding scheme #D′″".

Thus, the base station or AP appropriately generates and transmits a modulated signal that can be received by the terminal #p in consideration of a communication method supported by the terminal #p and a communication environment, and accordingly the data transmission efficiency in the system constituted by the base station or AP and the terminal #p can be increased.

Fifth Example

As the fifth example, it is assumed that the reception apparatus of the terminal #p has the configuration illustrated in FIG. 35 and the reception apparatus of the terminal #p supports the following, for example.

For example, the reception of "communication scheme #A" described in the third embodiment is supported.

Thus, if the communication partner transmits modulated signals of multiple streams to the terminal #p, the terminal #p does not support the reception of the modulated signals.

Thus, in a case where the communication partner performs phase change when transmitting modulated signals for multiple streams to the terminal #p, the terminal #p does not support the reception of the modulated signals.

Furthermore, if the communication partner transmits modulated signals for multiple streams generated by using "precoding method #A", the terminal #p does not support the reception of the modulated signals. Also, if the communication partner transmits modulated signals for multiple streams generated by using "precoding method #B", the terminal #p does not support the reception of the modulated signals.

Only the single-carrier scheme is supported.

Only the decoding of "error-correcting coding scheme #C" is supported as the error-correcting coding scheme.

Thus, the terminal #p having the configuration in FIG. 35 and supporting the above generates the reception capability notification symbol 2702 having the configuration illustrated in FIG. 71 on the basis of the rules described in the third embodiment and the description of the present embodiment, and transmits the reception capability notification symbol 2702 in accordance with the procedure in FIG. 27, for example.

At this time, the terminal #p generates the reception capability notification symbol 2702 having the configuration illustrated in FIG. 71 in the transmission apparatus 3403 in FIG. 34, for example, and the transmission apparatus 3403 in FIG. 34 transmits the reception capability notification symbol 2702 having the configuration illustrated in FIG. 71 in accordance with the procedure in FIG. 27.

The signal processor 155 of the base station (AP) in FIG. 22 obtains the baseband signal group 154 including the reception capability notification symbol 2702 transmitted by the terminal #p, through the reception antenna group 151 and the radio section group 153. Subsequently, the signal processor 155 of the base station (AP) in FIG. 22 extracts the data included in the reception capability notification symbol 2702 and learns, from the data 3001 about "supported schemes", that the terminal #p supports "communication scheme #A".

Thus, since the data 2801 about "support/not support demodulation of modulated signal with phase change" in FIG. 71 is invalid and the communication scheme #A is supported, the signal processor 155 of the base station (AP) determines not to transmit a modulated signal whose phase has been changed, and outputs the control information 157 including this information. This is because the communication scheme #A does not support the transmission and reception of modulated signals for multiple streams.

In addition, since the data 2901 about "support/not support reception for multiple streams" in FIG. 71 is invalid and the communication scheme #A is supported, the signal processor 155 of the base station (AP) determines not to transmit modulated signals for multiple streams to the terminal #p, and outputs the control information 157 including this information. This is because the communication scheme #A does not support the transmission and reception of modulated signals for multiple streams.

In addition, since the data 5301 about "supported precoding methods" in FIG. 71 is invalid and the communication scheme #A is supported, the signal processor 155 of the base station (AP) determines not to transmit modulated signals for multiple streams, and outputs the control information 157 including this information.

In addition, since the data 3003 about "supported error-correcting coding schemes" in FIG. 71 is invalid and the communication scheme #A is supported, the signal processor 155 of the base station (AP) determines to use "error-correcting coding scheme #C" and outputs the control information 157 including this information. This is because the communication scheme #A supports "error-correcting coding scheme #C".

For example, as in FIG. 35, "communication scheme #A" is supported, and thus the base station or AP performs the above-described operations so as not to transmit modulated signals for multiple streams to the terminal #p. Thus, the base station or AP is able to appropriately transmit a modulated signal of "communication scheme #A". As a result, the data transmission efficiency in the system constituted by the base station or AP and the terminal #p can be increased.

As described above, the base station or AP obtains, from the terminal #p as a communication partner of the base station or AP, information about a scheme in which the terminal #p supports the demodulation, and decides the number of modulated signals, the communication scheme of the modulated signals, the signal processing method of the modulated signals, and so forth on the basis of the information, thereby being able to transmit a modulated signal that can be received by the terminal #p. As a result, the data transmission efficiency in the system constituted by the base station or AP and the terminal #p can be increased.

At this time, for example, when the reception capability notification symbol 2702 is made up of multiple pieces of information as in FIG. 71, the base station or AP is able to easily determine whether the information included in the reception capability notification symbol 2702 is valid or invalid. This results in an advantage of being able to quickly decide the scheme of modulated signals to be transmitted and/or the signal processing method or the like.

The base station or AP transmits modulated signals to individual terminals #p by using preferable transmission methods on the basis of the details of information included in the reception capability notification symbols 2702 transmitted by the individual terminals #p, and accordingly the data transmission efficiency increases.

In addition, the base station or AP in the present embodiment has the configuration in FIG. 1 and communicates with multiple terminals. The reception capabilities (schemes in which demodulation is supported) of the multiple terminals as communication partners of the base station or AP in FIG. 1 may be identical to or different from one another. Each of the multiple terminals transmits a reception capability notification symbol including information about a scheme in which demodulation is supported. The base station or AP obtains, from each terminal, the information about a scheme in which demodulation is supported, and decides the number of modulated signals, the communication scheme of the modulated signals, the signal processing method of the modulated signals, and so forth on the basis of the information, thereby being able to transmit modulated signals that can be received by each terminal on the basis of the reception capability (scheme in which demodulation is supported) of each terminal. Accordingly, the data transmission efficiency in the system constituted by the base station or AP and the multiple terminals can be increased. The base station or AP transmits modulated signals to the multiple terminals by using a certain time section and certain frequencies. At this time, the base station or AP transmits one or more modulated signals to each terminal. Thus, each terminal may transmit, for example, the reception capability notification symbol as described above to the base station or AP.

The method for configuring the information of the reception capability notification symbol described in the present embodiment is an example, and the method for configuring the information of the reception capability notification symbol is not limited thereto. In addition, the description of the present embodiment about the transmission procedure and transmission timing for transmitting the reception capability notification symbol from the terminal #p to the base station or AP is merely an example, and the transmission procedure and transmission timing are not limited thereto.

In addition, the present embodiment describes an example in which each of multiple terminals transmits a reception capability notification symbol. The method for configuring the information of the reception capability notification symbol transmitted by the multiple terminals may be different or identical among the terminals. Also, the transmission procedure and transmission timing for transmitting the reception capability notification symbol by the multiple terminals may be different or identical among the terminals.

Fourth Supplement

In this specification, FIG. 35 illustrates an example of the configuration of the reception apparatus of the terminal #p as a communication partner of the base station or AP in a case where the transmission apparatus of the base station or AP transmits a modulated signal of a single stream, but the configuration of the terminal #p that receives the modulated signal of a single stream is not limited to FIG. 35. For example, the reception apparatus of the terminal #p may include multiple reception antennas. For example, in FIG. 19, in a case where the modulated signal $u2$ channel estimators 1905_2 and 1907_2 do not operate, the channel estimator for one modulated signal operates, and thus a modulated signal of a single stream can be received even with this configuration.

Thus, in the description of this specification, the operation of the embodiment described by using FIG. 35 can be achieved similarly with the above-described configuration of the reception apparatus instead of the configuration in FIG. 19, and also similar effects can be obtained.

Additionally, in this specification, the configurations in FIGS. 28, 29, 30, and 71 have been described as examples of the configuration of the reception capability notification symbol transmitted by the terminal #p. At this time, an effect of the reception capability notification symbol "being made up of multiple pieces of information (multiple pieces of data)" has been described. Hereinafter, a description will be given of a method for transmitting "multiple pieces of information (multiple pieces of data)" constituting the reception capability notification symbol transmitted by the terminal #p.

Example Configuration 1

In FIG. 30, for example, among the data 2801 about "support/not support demodulation of modulated signal with phase change", the data 2901 about "support/not support reception for multiple streams", the data 3001 about "supported schemes", the data 3002 about "support/not support multi-carrier scheme", and the data 3003 about "supported error-correcting coding schemes", at least two or more pieces of data (information) are transmitted by using the same frame or the same subframe.

Example Configuration 2

In FIG. 71, for example, among the data 2801 about "support/not support demodulation of modulated signal with phase change", the data 2901 about "support/not support reception for multiple streams", the data 3001 about "supported schemes", the data 3002 about "support/not support multi-carrier scheme", the data 3003 about "supported error-correcting coding schemes", and the data 5301 about "supported precoding methods", at least two or more pieces of data (information) are transmitted by using the same frame or the same subframe.

Now, a "frame" and a "subframe" will be described.

Figure 72:
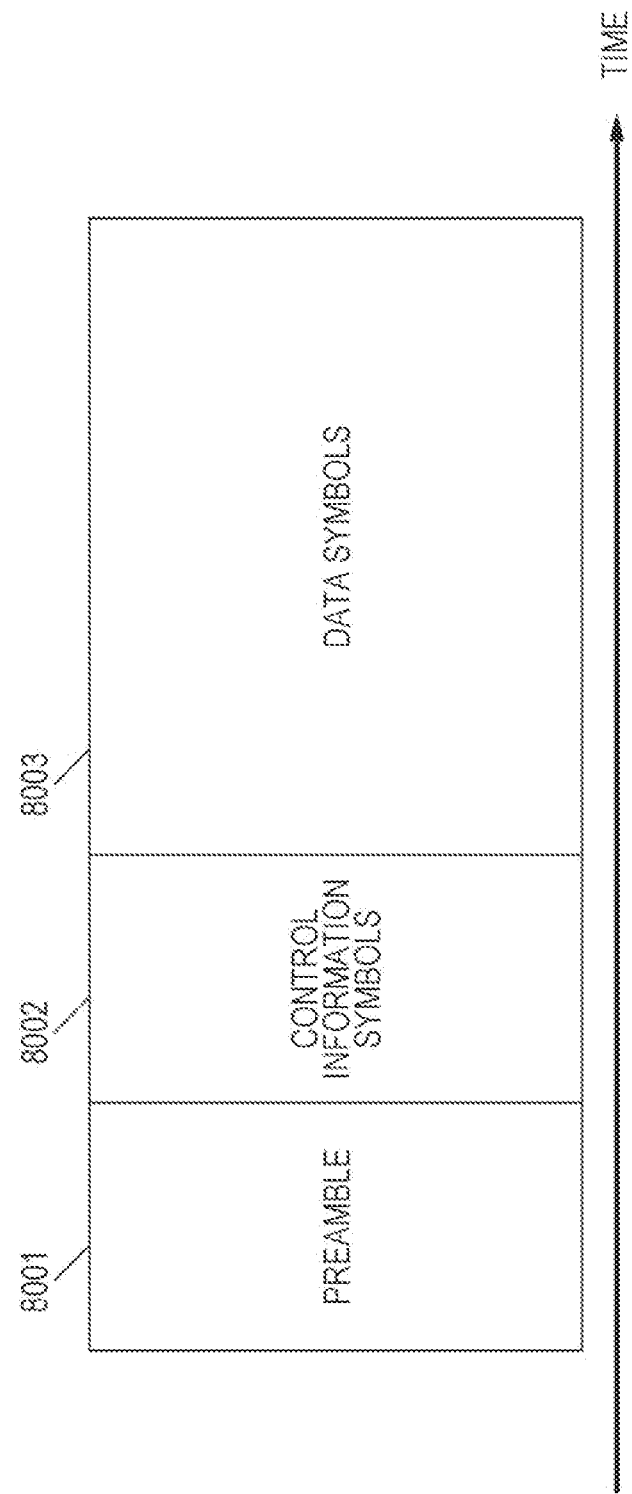
FIG. 72 is a diagram illustrating an example of the configuration of a frame.

FIG. 72 is a diagram illustrating an example of the configuration of a frame. In FIG. 72, the horizontal axis indicates time. For example, in FIG. 72, it is assumed that the frame includes a preamble 8001, control information symbols 8002, and data symbols 8003. However, the frame need not necessarily include all of the three items. For example, the frame may "at least include the preamble 8001", "at least include the control information symbols 8002", "at least include the preamble 8001 and the data symbols 8003", "at least include the preamble 8001 and the control information symbols 8002", or "at least include the preamble 8001, the control information symbols 8002, and the data symbols 8003".

The terminal #p transmits the reception capability notification symbol by using any symbol among the preamble 8001, the control information symbols 8002, and the data symbols 8003.

FIG. 72 may be called a subframe. Alternatively, a term other than "frame" and "subframe" may be used.

By using the above-described method, the terminal #p transmits at least two or more pieces of information included in the reception capability notification symbol, and accordingly the effects described in the third embodiment, the fifth embodiment, the eleventh embodiment, and so forth can be obtained.

Example Configuration 3

In FIG. 30, for example, among the data 2801 about "support/not support demodulation of modulated signal with phase change", the data 2901 about "support/not support reception for multiple streams", the data 3001 about "supported schemes", the data 3002 about "support/not support multi-carrier scheme", and the data 3003 about "supported error-correcting coding schemes", at least two or more pieces of data (information) are transmitted by using the same packet.

Example Configuration 4

In FIG. 71, for example, among the data 2801 about "support/not support demodulation of modulated signal with phase change", the data 2901 about "support/not support reception for multiple streams", the data 3001 about "supported schemes", the data 3002 about "support/not support multi-carrier scheme", the data 3003 about "supported error-correcting coding schemes", and the data 5301 about "supported precoding methods", at least two or more pieces of data (information) are transmitted by using the same packet.

The frame in FIG. 72 will be discussed. It is assumed that the frame "at least includes the preamble 8001 and the data symbols 8003", "at least includes the control information symbols 8002 and the data symbols 8003", or "at least includes the preamble 8001, the control information symbols 8002, and the data symbols 8003".

At this time, there are two methods for transmitting the packet, for example.

First Method

The data symbols 8003 are made up of multiple packets. In this case, at least two or more pieces of data (information) included in the reception capability notification symbol are transmitted by using the data symbols 8003.

Second Method

The packet is transmitted by the data symbols of multiple frames. In this case, at least two or more pieces of data (information) included in the reception capability notification symbol are transmitted by using multiple frames.

The terminal #p transmits at least two or more pieces of data (information) included in the reception capability notification symbol by using the above-described methods, and accordingly the effects described in the third embodiment, the fifth embodiment, the eleventh embodiment, and so forth can be obtained.

The term "preamble" is used in FIG. 72, but the term is not limited thereto. It is assumed that "preamble" includes at least one or more symbols or signals among "a symbol or signal used by the communication partner to detect a modulated signal", "a symbol or signal used by the communication partner to perform channel estimation (propagation environment estimation)", "a symbol or signal used by the communication partner to perform time synchronization", "a symbol or signal used by the communication partner to perform frequency synchronization", and "a symbol or signal used by the communication partner to estimate frequency offset".

The term "control information symbols" is used in FIG. 72, but the term is not limited thereto. It is assumed that "control information symbols" are symbols including at least one or more pieces of information among "information about the error-correcting coding scheme for generating data symbols", "information about the modulation scheme for generating data symbols", "information about the number of symbols constituting the data symbols", "information about the method for transmitting data symbols", "information that needs to be transmitted to the communication partner other than data symbols", and "information other than data symbols".

The order in which the preamble 8001, the control information symbols 8002, and the data symbols 8003 are transmitted, that is, the frame configuration method, is not limited to that in FIG. 72.

In the third embodiment, the fifth embodiment, the eleventh embodiment, and so forth, the terminal #p transmits the reception capability notification symbol, and the communication partner of the terminal #p is the base station or AP, but the embodiments are not limited thereto. For example, the communication partner of the base station or AP may be the terminal #p, and the base station or AP may transmit the reception capability notification symbol to the terminal #p as the communication partner. Alternatively, the communication partner of the terminal #p may be another terminal, and the terminal #p may transmit the reception capability notification symbol to the other terminal as the communication partner. Alternatively, the communication partner of the base station or AP may be another base station or AP, and the base station or AP may transmit the reception capability notification symbol to the other base station or AP as the communication partner.

Sixteenth Embodiment

In the first to fifteenth embodiments, the first to fourth supplements, and so forth, in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth, a description is given by using, for example, Expression (2), Expression (50), and so forth. In addition, a description is given that the value of a phase change value need not be based on these expressions and "it is sufficient to change the phase periodically or regularly".

Figure 73:
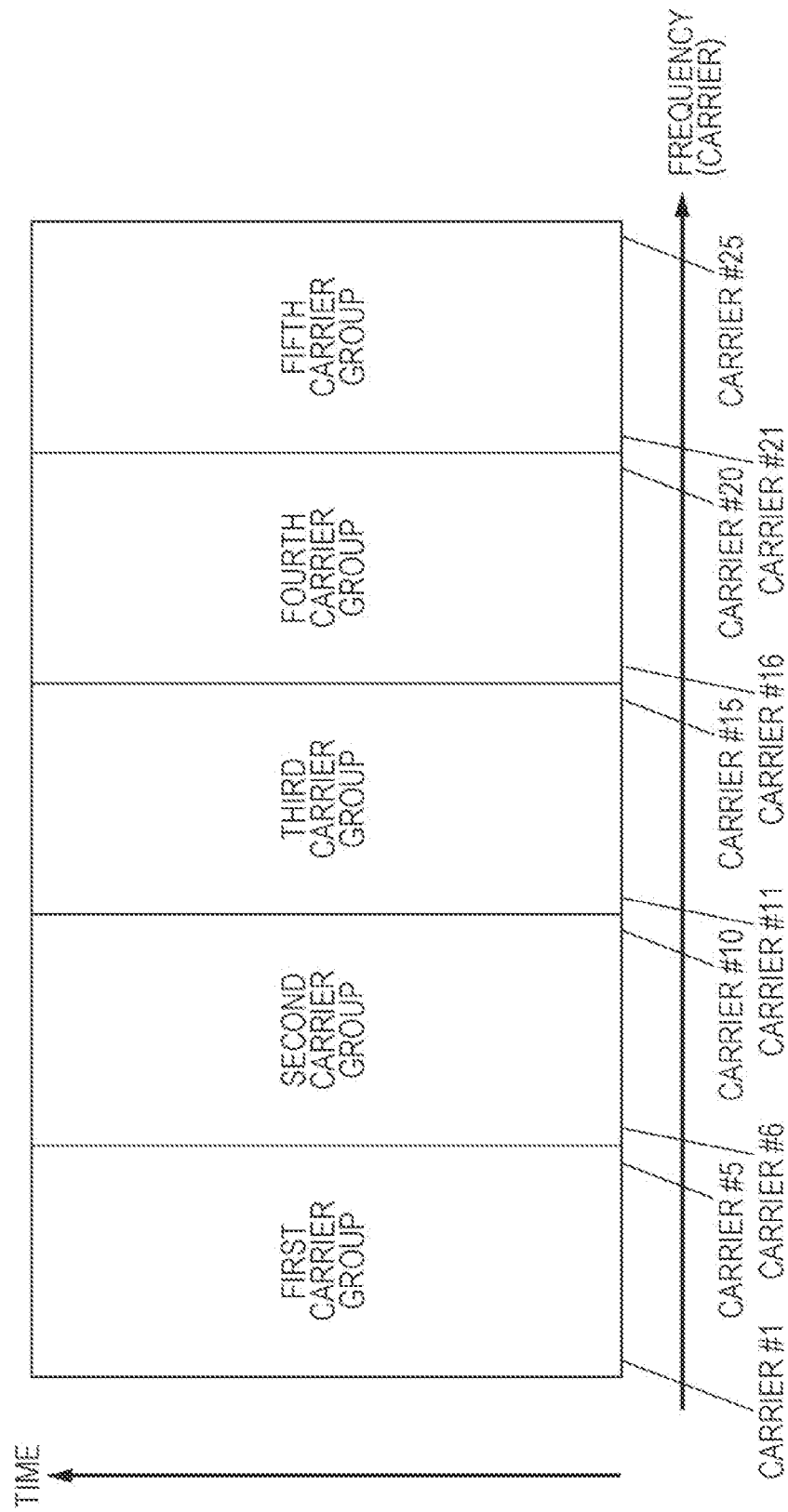
FIG. 73 is a diagram illustrating an example of carrier groups of modulated signals transmitted by the base station or AP.

In the present embodiment, a description will be given of another example of "it is sufficient to change the phase periodically or regularly". FIG. 73 is a diagram illustrating an example of carrier groups of modulated signals transmitted by the base station or AP. In FIG. 73, the horizontal axis indicates frequency (carrier), and the vertical axis indicates time.

For example, as in FIG. 73, a first carrier group made up of carrier #1 to carrier #5, a second carrier group made up of carrier #6 to carrier #10, a third carrier group made up of carrier #11 to carrier #15, a fourth carrier group made up of carrier #16 to carrier #20, and a fifth carrier group made up of carrier #21 to carrier #25 are considered. It is assumed that the base station or AP uses the first carrier group, the second carrier group, the third carrier group, the fourth carrier group, and the fifth carrier group to transmit data to a certain terminal (certain user) (terminal #p).

The phase change value used by the phase changer 305A is Yp(i), the phase change value used by the phase changer 305B is yp(i), the phase change value used by the phase changer 3801A is Vp(i), and the phase change value used by the phase changer 3801B is vp(i) in FIGS. 3, 4, 26, 38, 39, 40, 41, 42, 43, 44, 45, 46, 47, 48, 52, and so forth.

At this time, it is assumed that the phase changer 305A performs phase change on the symbols belonging to the first carrier group in FIG. 73 by using $e^{j \times E1}$ as the phase change value Yp(i). It is assumed that E1 is a real number. For example, E1 is 0 (radians) $\leq$ E1 $<$ 2x$\pi$ (radians).

Also, it is assumed that the phase changer 305A performs phase change on the symbols belonging to the second carrier group in FIG. 73 by using $e^{j \times E2}$ as the phase change value Yp(i). It is assumed that E2 is a real number. For example, E2 is 0 (radians) $\leq$ E2 $<$ 2x$\pi$ (radians).

It is assumed that the phase changer 305A performs phase change on the symbols belonging to the third carrier group in FIG. 73 by using $e^{j \times E3}$ as the phase change value Yp(i). It is assumed that E3 is a real number. For example, E3 is 0 (radians) $\leq$ E3 $<$ 2x$\pi$ (radians).

It is assumed that the phase changer 305A performs phase change on the symbols belonging to the fourth carrier group in FIG. 73 by using $e^{j \times E4}$ as the phase change value Yp(i). It is assumed that E4 is a real number. For example, E4 is 0 (radians) $\leq$ E4 $<$ 2x$\pi$ (radians).

It is assumed that the phase changer 305A performs phase change on the symbols belonging to the fifth carrier group in FIG. 73 by using $e^{j \times E5}$ as the phase change value Yp(i). It is assumed that E5 is a real number. For example, E5 is 0 (radians) $\leq$ E5 $<$ 2x$\pi$ (radians).

As a first example, there is a method in which "E1$\neq$E2 and E1$\neq$E3 and E1$\neq$E4 and E1$\neq$E5 and E2$\neq$E3 and E2$\neq$E4 and E2$\neq$E5 and E3$\neq$E4 and E3$\neq$E5 and E4$\neq$E5" holds. When generalized, this is a method in which "x is an integer equal to or greater than 1, y is an integer equal to or greater than 1, x$\neq$y holds, and Ex$\neq$Ey holds in all x and all y satisfying these conditions".

As a second example, there is a method in which "E1$\neq$E2 or E1$\neq$E3 or E1$\neq$E4 or E1$\neq$E5 or E2$\neq$E3 or E2$\neq$E4 or E2$\neq$E5 or E3$\neq$E4 or E3$\neq$E5 or E4$\neq$E5" holds. When generalized, this is a method in which "there is a set of x and y in which x is an integer equal to or greater than 1, y is an integer equal to or greater than 1, x$\neq$y holds, and Ex$\neq$Ey holds".

In addition, it is assumed that the phase changer 305B performs phase change on the symbols belonging to the first carrier group in FIG. 73 by using $e^{j \times F1}$ as the phase change value yp(i). It is assumed that F1 is a real number. For example, F1 is 0 (radians) $\leq$ F1 $<$ 2x$\pi$ (radians).

Also, it is assumed that the phase changer 305B performs phase change on the symbols belonging to the second carrier group in FIG. 73 by using $e^{j \times F2}$ as the phase change value yp(i). It is assumed that F2 is a real number. For example, F2 is 0 (radians) $\leq$ F2 $<$ 2x$\pi$ (radians).

It is assumed that the phase changer 305B performs phase change on the symbols belonging to the third carrier group in FIG. 73 by using $e^{j \times F3}$ as the phase change value yp(i). It is assumed that F3 is a real number. For example, F3 is 0 (radians) $\leq$ F3 $<$ 2x$\pi$ (radians).

It is assumed that the phase changer 305B performs phase change on the symbols belonging to the fourth carrier group in FIG. 73 by using $e^{j \times F4}$ as the phase change value yp(i). It is assumed that F4 is a real number. For example, F4 is 0 (radians) $\leq$ F4 $<$ 2x$\pi$ (radians).

It is assumed that the phase changer 305B performs phase change on the symbols belonging to the fifth carrier group in FIG. 73 by using $e^{j \times F5}$ as the phase change value yp(i). It is assumed that F5 is a real number. For example, F5 is 0 (radians) $\leq$ F5 $<$ 2x$\pi$ (radians).

As a first example, there is a method in which "F1$\neq$F2 and F1$\neq$F3 and F1$\neq$F4 and F1$\neq$F5 and F2$\neq$F3 and F2$\neq$F4 and F2$\neq$F5 and F3$\neq$F4 and F3$\neq$F5 and F4$\neq$F5" holds. When generalized, this is a method in which "x is an integer equal to or greater than 1, y is an integer equal to or greater than 1, x≠y holds, and Fx≠Fy holds in all x and all y satisfying these conditions".

As a second example, there is a method in which "F1≠F2 or F1≠F3 or F1≠F4 or F1≠F5 or F2≠F3 or F2≠F4 or F2≠F5 or F3≠F4 or F3≠F5 or F4≠F5" holds. When generalized, this is a method in which "there is a set of x and y in which x is an integer equal to or greater than 1, y is an integer equal to or greater than 1, x≠y holds, and Fx≠Fy holds".

In addition, it is assumed that the phase changer 3801A performs phase change on the symbols belonging to the first carrier group in FIG. 73 by using $e^{jxG1}$ as the phase change value Vp(i). It is assumed that G1 is a real number. For example, G1 is 0 (radians) ≤ G1 < 2xπ (radians).

Also, it is assumed that the phase changer 3801A performs phase change on the symbols belonging to the second carrier group in FIG. 73 by using $e^{jxG2}$ as the phase change value Vp(i). It is assumed that G2 is a real number. For example, G2 is 0 (radians) ≤G2 < 2xπ (radians).

It is assumed that the phase changer 3801A performs phase change on the symbols belonging to the third carrier group in FIG. 73 by using $e^{jxG3}$ as the phase change value Vp(i). It is assumed that G3 is a real number. For example, G3 is 0 (radians) ≤G3 < 2xπ (radians).

It is assumed that the phase changer 3801A performs phase change on the symbols belonging to the fourth carrier group in FIG. 73 by using $e^{jxG4}$ as the phase change value Vp(i). It is assumed that G4 is a real number. For example, G4 is 0 (radians) ≤G4 < 2xπ (radians).

It is assumed that the phase changer 3801A performs phase change on the symbols belonging to the fifth carrier group in FIG. 73 by using $e^{jxG5}$ as the phase change value Vp(i). It is assumed that G5 is a real number. For example, G5 is 0 (radians) ≤G5 < 2xπ (radians).

As a first example, there is a method in which "G1≠G2 and G1≠G3 and G1≠G4 and G1≠G5 and G2≠G3 and G2≠G4 and G2≠G5 and G3≠G4 and G3≠G5 and G4≠G5" holds. When generalized, this is a method in which "x is an integer equal to or greater than 1, y is an integer equal to or greater than 1, x≠y holds, and Gx≠Gy holds in all x and all y satisfying these conditions".

As a second example, there is a method in which "G1≠G2 or G1≠G3 or G1≠G4 or G1≠G5 or G2≠G3 or G2≠G4 or G2≠G5 or G3≠G4 or G3≠G5 or G4≠G5" holds. When generalized, this is a method in which "there is a set of x and y in which x is an integer equal to or greater than 1, y is an integer equal to or greater than 1, x≠y holds, and Gx≠Gy holds".

In addition, it is assumed that the phase changer 3801B performs phase change on the symbols belonging to the first carrier group in FIG. 73 by using $e^{jxH1}$ as the phase change value vp(i). It is assumed that H1 is a real number. For example, H1 is 0 (radians) ≤ H1 < 2xπ (radians).

Also, it is assumed that the phase changer 3801B performs phase change on the symbols belonging to the second carrier group in FIG. 73 by using $e^{jxH2}$ as the phase change value vp(i). It is assumed that H2 is a real number. For example, H2 is 0 (radians) ≤H2 < 2xπ (radians).

It is assumed that the phase changer 3801B performs phase change on the symbols belonging to the third carrier group in FIG. 73 by using $e^{jxH3}$ as the phase change value vp(i). It is assumed that H3 is a real number. For example, H3 is 0 (radians) ≤H3 < 2xπ (radians).

It is assumed that the phase changer 3801B performs phase change on the symbols belonging to the fourth carrier group in FIG. 73 by using $e^{jxH4}$ as the phase change value vp(i). It is assumed that H4 is a real number. For example, H4 is 0 (radians) ≤H4 < 2xπ (radians).

It is assumed that the phase changer 3801B performs phase change on the symbols belonging to the fifth carrier group in FIG. 73 by using $e^{jxH5}$ as the phase change value vp(i). It is assumed that H5 is a real number. For example, H5 is 0 (radians) ≤H5 < 2xπ (radians).

As a first example, there is a method in which "H1≠H2 and H1≠H3 and H1≠H4 and H1≠H5 and H2≠H3 and H2≠H4 and H2≠H5 and H3≠H4 and H3≠H5 and H4≠H5" holds. When generalized, this is a method in which "x is an integer equal to or greater than 1, y is an integer equal to or greater than 1, x≠y holds, and Hx≠Hy holds in all x and all y satisfying these conditions".

As a second example, there is a method in which "H1≠H2 or H1≠H3 or H1≠H4 or H1≠H5 or H2≠H3 or H2≠H4 or H2≠H5 or H3≠H4 or H3≠H5 or H4≠H5" holds. When generalized, this is a method in which "there is a set of x and y in which x is an integer equal to or greater than 1, y is an integer equal to or greater than 1, x≠y holds, and Hx≠Hy holds".

FIG. 73 illustrates the first carrier group to the fifth carrier group, but the number of carrier groups is not limited to five. The embodiment can be carried out similarly when two or more carrier groups exist. Alternatively, the number of carrier groups may be set to one. For example, one or more carrier groups may exist on the basis of a communication situation, feedback information from a terminal, or the like. When there is one carrier group, phase change is not performed. As in the example in FIG. 73, each carrier group may be set to a value of a fixed number.

In addition, each of the first carrier group, the second carrier group, the third carrier group, the fourth carrier group, and the fifth carrier group has a configuration including five carriers, but the configuration is not limited thereto. Thus, it is sufficient for each carrier group to include one or more carriers. Among different carrier groups, the number of carriers included may be identical or different. For example, in FIG. 73, the number of carriers included in the first carrier group is five, and the number of carriers included in the second carrier group is also five (identical). For another example, in FIG. 73, the number of carriers included in the first carrier group may be five, and the number of carriers included in the second carrier group may be different, for example, ten.

Figure 74:
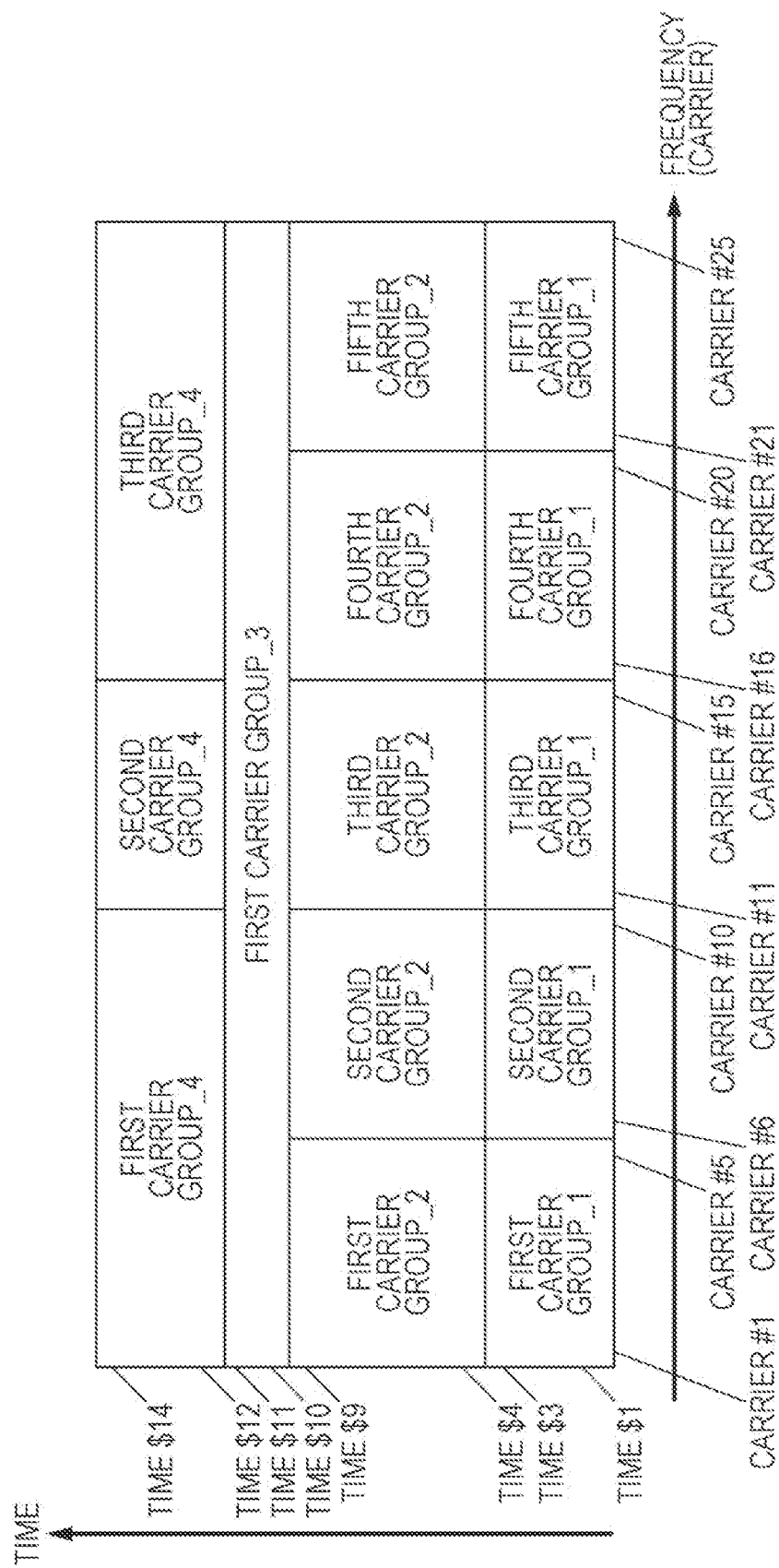
FIG. 74 is a diagram illustrating an example of carrier groups of modulated signals transmitted by the base station or AP different from FIG. 73.

FIG. 74 is a diagram illustrating an example of carrier groups of modulated signals transmitted by the base station or AP, different from the example in FIG. 73. In FIG. 74, the horizontal axis indicates frequency (carrier), and the vertical axis indicates time.

A first carrier *group_1* is made up of carrier #1 to carrier #5 and time $1 to time $3. A second carrier *group_1* is made up of carrier #6 to carrier #10 and time $1 to time $3. A third carrier *group_1* is made up of carrier #11 to carrier #15 and time $1 to time $3. A fourth carrier *group_1* is made up of carrier #16 to carrier #20 and time $1 to time $3. A fifth carrier *group_1* is made up of carrier #21 to carrier #25 and time $1 to time $3.

A first carrier *group_2* is made up of carrier #1 to carrier #5 and time $4 to time $9. A second carrier *group_2* is made up of carrier #6 to carrier #10 and time $4 to time $9. A third carrier *group_2* is made up of carrier ##11 to carrier #15 and time $4 to time $9. A fourth carrier *group_2* is made up of carrier #16 to carrier #20 and time $4 to time $9. A fifth carrier *group_2* is made up of carrier #21 to carrier #25 and time $4 to time $9.

A first carrier group_3 is made up of carrier #1 to carrier #25 and time $10 to time $11.

A first carrier group_4 is made up of carrier #1 to carrier #10 and time $12 to time $14. A second carrier group_4 is made up of carrier #11 to carrier #15 and time $12 to time $14. A third carrier group_4 is made up of carrier #16 to carrier #25 and time $12 to time $14.

In FIG. 74, it is assumed that the base station or AP uses carrier #1 to carrier #25 and time $1 to time $14 to transmit data to a certain terminal (certain user) (terminal #p).

The phase change value used by the phase changer 305A is Yp(i), the phase change value used by the phase changer 305B is yp(i), the phase change value used by the phase changer 3801A is Vp(i), and the phase change value used by the phase changer 3801B is vp(i) in FIGS. 3, 4, 26, 38, 39, 40, 41, 42, 43, 44, 45, 46, 47, 48, 52, and so forth.

At this time, it is assumed that the phase changer 305A performs phase change on the symbols belonging to the first carrier group_1 in FIG. 74 by using $e^{jxE11}$ as the phase change value Yp(i). It is assumed that E11 is a real number. For example, E11 is 0 (radians) $\leq$ E11 $< 2x\pi$ (radians).

Also, it is assumed that the phase changer 305A performs phase change on the symbols belonging to the second carrier group_1 in FIG. 74 by using $e^{jxE21}$ as the phase change value Yp(i). It is assumed that E21 is a real number. For example, E21 is 0 (radians) $\leq$ E21 $< 2x\pi$ (radians).

It is assumed that the phase changer 305A performs phase change on the symbols belonging to the third carrier group_1 in FIG. 74 by using $e^{jxE31}$ as the phase change value Yp(i). It is assumed that E31 is a real number. For example, E31 is 0 (radians) $\leq$ E31 $< 2x\pi$ (radians).

It is assumed that the phase changer 305A performs phase change on the symbols belonging to the fourth carrier group_1 in FIG. 74 by using $e^{jxE41}$ as the phase change value Yp(i). It is assumed that E41 is a real number. For example, E41 is 0 (radians) $\leq$ E41 $< 2x\pi$ (radians).

It is assumed that the phase changer 305A performs phase change on the symbols belonging to the fifth carrier group_1 in FIG. 74 by using $e^{jxE51}$ as the phase change value Yp(i). It is assumed that E51 is a real number. For example, E51 is 0 (radians) $\leq$ E51 $< 2x\pi$ (radians).

As a first example, there is a method in which "E11$\neq$E21 and E11$\neq$E31 and E11$\neq$E41 and E11$\neq$E51 and E21$\neq$E31 and E21$\neq$E41 and E21$\neq$E51 and E31$\neq$E41 and E31$\neq$E51 and E41$\neq$E51" holds. When generalized, this is a method in which "x is an integer equal to or greater than 1, y is an integer equal to or greater than 1, x$\neq$y holds, and Ex1$\neq$Ey1 holds in all x and all y satisfying these conditions".

As a second example, there is a method in which "E11$\neq$E21 or E11$\neq$E31, or E11$\neq$E41 or E11$\neq$E51 or E21$\neq$E31 or E21$\neq$E41 or E21$\neq$E51 or E31$\neq$E41 or E31$\neq$E51 or E41$\neq$E51" holds. When generalized, this is a method in which "there is a set of x and y in which x is an integer equal to or greater than 1, y is an integer equal to or greater than 1, x$\neq$y holds, and Ex1$\neq$Ey1 holds".

In addition, it is assumed that the phase changer 305B performs phase change on the symbols belonging to the first carrier group_1 in FIG. 74 by using $e^{jxF11}$ as the phase change value yp(i). It is assumed that F11 is a real number. For example, F11 is 0 (radians) $\leq$ F11 $< 2x\pi$ (radians).

Also, it is assumed that the phase changer 305B performs phase change on the symbols belonging to the second carrier group_1 in FIG. 74 by using $e^{jxF21}$ as the phase change value yp(i). It is assumed that F21 is a real number. For example, F21 is 0 (radians) $\leq$ F21 $< 2x\pi$ (radians).

It is assumed that the phase changer 305B performs phase change on the symbols belonging to the third carrier group_1 in FIG. 74 by using $e^{jxF31}$ as the phase change value yp(i). It is assumed that F31 is a real number. For example, F31 is 0 (radians) $\leq$ F31 $< 2x\pi$ (radians).

It is assumed that the phase changer 305B performs phase change on the symbols belonging to the fourth carrier group_1 in FIG. 74 by using $e^{jxF41}$ as the phase change value yp(i). It is assumed that F41 is a real number. For example, F41 is 0 (radians) $\leq$ F41 $< 2x\pi$ (radians).

It is assumed that the phase changer 305B performs phase change on the symbols belonging to the fifth carrier group_1 in FIG. 74 by using $e^{jxF51}$ as the phase change value yp(i). It is assumed that F51 is a real number. For example, F51 is 0 (radians) $\leq$ F51 $< 2x\pi$ (radians).

As a first example, there is a method in which "F11$\neq$F21 and F11$\neq$F31 and F11$\neq$F41 and F11$\neq$F51 and F21$\neq$F31 and F21$\neq$F41 and F21$\neq$F51 and F31$\neq$F41 and F31$\neq$F51 and F41$\neq$F51" holds. When generalized, this is a method in which "x is an integer equal to or greater than 1, y is an integer equal to or greater than 1, x$\neq$y holds, and Fx1$\neq$Fy1 holds in all x and all y satisfying these conditions".

As a second example, there is a method in which "F11$\neq$F21 or F11$\neq$F31 or F11$\neq$F41 orF11$\neq$F51 orF21$\neq$F31 orF21$\neq$F41 orF21$\neq$F51 or F31$\neq$F41 or F31$\neq$F51 or F41$\neq$F51" holds. When generalized, this is a method in which "there is a set of x and y in which x is an integer equal to or greater than 1, y is an integer equal to or greater than 1, x$\neq$y holds, and Fx1$\neq$Fy1 holds".

In addition, it is assumed that the phase changer 3801A performs phase change on the symbols belonging to the first carrier group_1 in FIG. 74 by using $e^{jxG11}$ as the phase change value Vp(i). It is assumed that G11 is a real number. For example, G11 is 0 (radians) $\leq$ G11 $< 2x\pi$ (radians).

Also, it is assumed that the phase changer 3801A performs phase change on the symbols belonging to the second carrier group_1 in FIG. 74 by using $e^{jxG21}$ as the phase change value Vp(i). It is assumed that G21 is a real number. For example, G21 is 0 (radians) $\leq$ G21 $< 2x\pi$ (radians).

It is assumed that the phase changer 3801A performs phase change on the symbols belonging to the third carrier group_1 in FIG. 74 by using $e^{jxG31}$ as the phase change value Vp(i). It is assumed that G31 is a real number. For example, G31 is 0 (radians) $\leq$ G31 $< 2x\pi$ (radians).

It is assumed that the phase changer 3801A performs phase change on the symbols belonging to the fourth carrier group_1 in FIG. 74 by using $e^{jxG41}$ as the phase change value Vp(i). It is assumed that G41 is a real number. For example, G41 is 0 (radians) $\leq$ G41 $< 2x\pi$ (radians).

It is assumed that the phase changer 3801A performs phase change on the symbols belonging to the fifth carrier group_1 in FIG. 74 by using $e^{jxG51}$ as the phase change value Vp(i). It is assumed that G51 is a real number. For example, G51 is 0 (radians) $\leq$ G51 $< 2x\pi$ (radians).

For example, as a first example, there is a method in which "G11$\neq$G21 and G11$\neq$G31 and G11$\neq$G41 and G11$\neq$G51 and G21$\neq$G31 and G21$\neq$G41 and G21$\neq$G51 and G31$\neq$G41 and G31$\neq$G51 and G41$\neq$G51" holds. When generalized, this is a method in which "x is an integer equal to or greater than 1, y is an integer equal to or greater than 1, x$\neq$y holds, and Gx1$\neq$Gy1 holds in all x and all y satisfying these conditions".

As a second example, there is a method in which "G11$\neq$G21 or G11$\neq$G31 or G11$\neq$G41 orG11$\neq$G51 or G21$\neq$G31 or G21$\neq$G41 or G21$\neq$G51 or G31$\neq$G41 or G31$\neq$G51 or G41$\neq$G51" holds. When generalized, this is a method in which "there is a set of x and y in which x is an integer equal to or greater than 1, y is an integer equal to or greater than 1, x≠y holds, and Gx1≠Gy1 holds".

In addition, it is assumed that the phase changer 3801B performs phase change on the symbols belonging to the first carrier *group_1* in FIG. 74 by using $e^{jxH11}$ as the phase change value vp(i). It is assumed that H11 is a real number. For example, H11 is 0 (radians) ≤H11 < 2xπ (radians).

Also, it is assumed that the phase changer 3801B performs phase change on the symbols belonging to the second carrier *group_1* in FIG. 74 by using $e^{jxH21}$ as the phase change value vp(i). It is assumed that H21 is a real number. For example, H21 is 0 (radians) ≤H21 < 2xπ (radians).

It is assumed that the phase changer 3801B performs phase change on the symbols belonging to the third carrier *group_1* in FIG. 74 by using $e^{jxH31}$ as the phase change value vp(i). It is assumed that H31 is a real number. For example, H31 is 0 (radians) ≤H31 < 2xπ (radians).

It is assumed that the phase changer 3801B performs phase change on the symbols belonging to the fourth carrier *group_1* in FIG. 74 by using $e^{jxH41}$ as the phase change value vp(i). It is assumed that H41 is a real number. For example, H41 is 0 (radians) ≤H41 < 2xπ (radians).

It is assumed that the phase changer 3801B performs phase change on the symbols belonging to the fifth carrier *group_1* in FIG. 74 by using $e^{jxH51}$ as the phase change value vp(i). It is assumed that H51 is a real number. For example, H51 is 0 (radians) ≤H51 < 2xπ (radians).

As a first example, there is a method in which "H11≠H21 and H11≠H31 and H11≠H41 and H11≠H51 and H21≠H31 and H21≠H41 and H21≠H51 and H31≠H41 and H31≠H51 and H41≠H51" holds. When generalized, this is a method in which "x is an integer equal to or greater than 1, y is an integer equal to or greater than 1, x≠y holds, and Hx1≠Hy1 holds in all x and all y satisfying these conditions".

As a second example, there is a method in which "H11≠H21 or H11≠H31 or H11≠H41 or H11≠H51 or H21≠H31 or H21≠H41 or H21≠H51 or H31≠H41 or H31≠H51 or H41≠H51" holds. When generalized, this is a method in which "there is a set of x and y in which x is an integer equal to or greater than 1, y is an integer equal to or greater than 1, x≠y holds, and Hx1≠Hy1 holds".

It is assumed that the phase changer 305A performs phase change on the symbols belonging to the first carrier *group_2* in FIG. 74 by using $e^{jxE12}$ as the phase change value Yp(i). It is assumed that E12 is a real number. For example, E12 is 0 (radians) ≤E12 < 2xπ (radians).

Also, it is assumed that the phase changer 305A performs phase change on the symbols belonging to the second carrier *group_2* in FIG. 74 by using $e^{jxE22}$ as the phase change value Yp(i). It is assumed that E22 is a real number. For example, E22 is 0 (radians) ≤E22 < 2xπ (radians).

It is assumed that the phase changer 305A performs phase change on the symbols belonging to the third carrier *group_2* in FIG. 74 by using $e^{jxE32}$ as the phase change value Yp(i). It is assumed that E32 is a real number. For example, E32 is 0 (radians) ≤E32 < 2xπ (radians).

It is assumed that the phase changer 305A performs phase change on the symbols belonging to the fourth carrier *group_2* in FIG. 74 by using $e^{jxE42}$ as the phase change value Yp(i). It is assumed that E42 is a real number. For example, E42 is 0 (radians) ≤E42 < 2xπ (radians).

It is assumed that the phase changer 305A performs phase change on the symbols belonging to the fifth carrier *group_2* in FIG. 74 by using $e^{jxE52}$ as the phase change value Yp(i). It is assumed that E52 is a real number. For example, E52 is 0 (radians) ≤E52 < 2xπ (radians).

As a first example, there is a method in which "E12≠E22 and E12≠E32 and E12≠E42 and E12≠E52 and E22≠E32 and E22≠E42 and E22≠E52 and E32≠E42 and E32≠E52 and E42≠E52" holds. When generalized, this is a method in which "x is an integer equal to or greater than 1, y is an integer equal to or greater than 1, x≠y holds, and Ex2≠Ey2 holds in all x and all y satisfying these conditions".

As a second example, there is a method in which "E12≠E22 or E12≠E32 or E12≠E42 or E12≠E52 or E22≠E32 or E22≠E42 or E22≠E52 or E32≠E42 or E32≠E52 or E42≠E52" holds. When generalized, this is a method in which "there is a set of x and y in which x is an integer equal to or greater than 1, y is an integer equal to or greater than 1, x≠y holds, and Ex2≠Ey2 holds".

In addition, it is assumed that the phase changer 305B performs phase change on the symbols belonging to the first carrier *group_2* in FIG. 74 by using $e^{jxF12}$ as the phase change value yp(i). It is assumed that F12 is a real number. For example, F12 is 0 (radians) ≤F12 < 2xπ (radians).

Also, it is assumed that the phase changer 305B performs phase change on the symbols belonging to the second carrier *group_2* in FIG. 74 by using $e^{jxF22}$ as the phase change value yp(i). It is assumed that F22 is a real number. For example, F22 is 0 (radians) ≤F22 < 2xπ (radians).

It is assumed that the phase changer 305B performs phase change on the symbols belonging to the third carrier *group_2* in FIG. 74 by using $e^{jxF32}$ as the phase change value yp(i). It is assumed that F32 is a real number. For example, F32 is 0 (radians) ≤F32 < 2xπ (radians).

It is assumed that the phase changer 305B performs phase change on the symbols belonging to the fourth carrier *group_2* in FIG. 74 by using $e^{jxF42}$ as the phase change value yp(i). It is assumed that F42 is a real number. For example, F42 is 0 (radians) ≤F42 < 2xπ (radians).

It is assumed that the phase changer 305B performs phase change on the symbols belonging to the fifth carrier *group_2* in FIG. 74 by using $e^{jxF52}$ as the phase change value yp(i). It is assumed that F52 is a real number. For example, F52 is 0 (radians) ≤F52 < 2xπ (radians).

As a first example, there is a method in which "F12≠F22 and F12≠F32 and F12≠F42 and F12≠F52 and F22≠F32 and F22≠F42 and F22≠F52 and F32≠F42 and F32≠F52 and F42≠F52" holds. When generalized, this is a method in which "x is an integer equal to or greater than 1, y is an integer equal to or greater than 1, x≠y holds, and Fx2≠Fy2 holds in all x and all y satisfying these conditions".

As a second example, there is a method in which "F12≠F22 or F12≠F32 or F12≠F42 or F12≠F52 or F22≠F32 or F22≠F42 or F22≠F52 or F32≠F42 or F32≠F52 or F42≠F52" holds. When generalized, this is a method in which "there is a set of x and y in which x is an integer equal to or greater than 1, y is an integer equal to or greater than 1, x≠y holds, and Fx2≠Fy2 holds".

In addition, it is assumed that the phase changer 3801A performs phase change on the symbols belonging to the first carrier *group_2* in FIG. 74 by using $e^{jxG12}$ as the phase change value Vp(i). It is assumed that G12 is a real number. For example, G12 is 0 (radians) ≤G12 < 2xπ (radians).

Also, it is assumed that the phase changer 3801A performs phase change on the symbols belonging to the second carrier *group_2* in FIG. 74 by using $e^{jxG22}$ as the phase change value Vp(i). It is assumed that G22 is a real number. For example, G22 is 0 (radians) ≤G22 < 2xπ (radians).

It is assumed that the phase changer 3801A performs phase change on the symbols belonging to the third carrier *group_2* in FIG. 74 by using $e^{jxG32}$ as the phase change value Vp(i). It is assumed that G32 is a real number. For example, G32 is 0 (radians) ≤G32 < 2xπ (radians).

It is assumed that the phase changer 3801A performs phase change on the symbols belonging to the fourth carrier *group_2* in FIG. 74 by using $e^{j\times G42}$ as the phase change value Vp(i). It is assumed that G42 is a real number. For example, G42 is 0 (radians) ≤G42 ≤ 2xπ (radians).

It is assumed that the phase changer 3801A performs phase change on the symbols belonging to the fifth carrier *group_2* in FIG. 74 by using $e^{j\times G52}$ as the phase change value Vp(i). It is assumed that G52 is a real number. For example, G52 is 0 (radians) ≤G52 < 2xπ (radians).

As a first example, there is a method in which "G12≠G22 and G12≠G32 and G12≠G42 and G12≠G52 and G22≠G32 and G22≠G42 and G22≠G52 and G32≠G42 and G32≠G52 and G42≠G52" holds. When generalized, this is a method in which "x is an integer equal to or greater than 1, y is an integer equal to or greater than 1, x≠y holds, and Gx2≠Gy2 holds in all x and all y satisfying these conditions".

As a second example, there is a method in which "G12≠G22 or G12≠G32 or G12≠G42 or G12≠G52 or G22≠G32 or G22≠G42 or G22≠G52 or G32≠G42 or G32≠G52 or G42≠G52" holds. When generalized, this is a method in which "there is a set of x and y in which x is an integer equal to or greater than 1, y is an integer equal to or greater than 1, x≠y holds, and Gx2≠Gy2 holds".

In addition, it is assumed that the phase changer 3801B performs phase change on the symbols belonging to the first carrier *group_2* in FIG. 74 by using $e^{j\times H12}$ as the phase change value vp(i). It is assumed that H12 is a real number. For example, H12 is 0 (radians) ≤H12 < 2xπ (radians).

Also, it is assumed that the phase changer 3801B performs phase change on the symbols belonging to the second carrier *group_2* in FIG. 74 by using $e^{j\times H22}$ as the phase change value vp(i). It is assumed that H22 is a real number. For example, H22 is 0 (radians) ≤H22 < 2xπ (radians).

It is assumed that the phase changer 3801B performs phase change on the symbols belonging to the third carrier *group_2* in FIG. 74 by using $e^{j\times H32}$ as the phase change value vp(i). It is assumed that H32 is a real number. For example, H32 is 0 (radians) ≤H32 < 2xπ (radians).

It is assumed that the phase changer 3801B performs phase change on the symbols belonging to the fourth carrier *group_2* in FIG. 74 by using $e^{j\times H42}$ as the phase change value vp(i). It is assumed that H42 is a real number. For example, H42 is 0 (radians) ≤H42 < 2xπ (radians).

It is assumed that the phase changer 3801B performs phase change on the symbols belonging to the fifth carrier *group_2* in FIG. 74 by using $e^{j\times H52}$ as the phase change value vp(i). It is assumed that H52 is a real number. For example, H52 is 0 (radians) ≤H52 < 2xπ (radians).

As a first example, there is a method in which "H12≠H22 and H12≠H32 and H12≠H42 and H12≠H52 and H22≠H32 and H22≠H42 and H22≠H52 and H32≠H42 and H32≠H52 and H42≠H52" holds. When generalized, this is a method in which "x is an integer equal to or greater than 1, y is an integer equal to or greater than 1, x≠y holds, and Hx2≠Hy2 holds in all x and all y satisfying these conditions".

As a second example, there is a method in which "H12≠H22 or H12≠H32 or H12≠H42 or H12≠H52 or H22≠H32 or H22≠H42 or H22≠H52 or H32≠H42 or H32≠H52 or H42≠H52" holds. When generalized, this is a method in which "there is a set of x and y in which x is an integer equal to or greater than 1, y is an integer equal to or greater than 1, x≠y holds, and Hx2≠Hy2 holds".

It is assumed that the phase changer 305A performs phase change on the symbols belonging to the first carrier *group_3* in FIG. 74 by using $e^{j\times E13}$ as the phase change value Yp(i). It is assumed that E13 is a real number. For example, E13 is 0 (radians) ≤ E13 < 2×π (radians).

It is assumed that the phase changer 305A performs phase change on the symbols belonging to the first carrier *group_4* in FIG. 74 by using $e^{j\times E14}$ as the phase change value Yp(i). It is assumed that E14 is a real number. For example, E14 is 0 (radians) ≤ E14 < 2×π (radians).

Also, it is assumed that the phase changer 305A performs phase change on the symbols belonging to the second carrier *group_4* in FIG. 74 by using $e^{j\times E24}$ as the phase change value Yp(i). It is assumed that E24 is a real number. For example, E24 is 0 (radians) ≤ E24 < 2×π (radians).

It is assumed that the phase changer 305A performs phase change on the symbols belonging to the third carrier *group_4* in FIG. 74 by using $e^{j\times E34}$ as the phase change value Yp(i). It is assumed that E34 is a real number. For example, E34 is 0 (radians) ≤ E34 < 2×π (radians).

As a first example, there is a method in which "E14≠E24 and E14≠E34 and E24≠E34" holds. When generalized, this is a method in which "x is an integer equal to or greater than 1, y is an integer equal to or greater than 1, x≠y holds, and Ex4≠Ey4 holds in all x and all y satisfying these conditions".

As a second example, there is a method in which "E14≠E24 or E14≠E34 or E24≠E34" holds. When generalized, this is a method in which "there is a set of x and y in which x is an integer equal to or greater than 1, y is an integer equal to or greater than 1, x≠y holds, and Ex4≠Ey4 holds".

In addition, it is assumed that the phase changer 305B performs phase change on the symbols belonging to the first carrier *group_4* in FIG. 74 by using $e^{j\times F14}$ as the phase change value yp(i). It is assumed that F14 is a real number. For example, F14 is 0 (radians) ≤ F14 < 2×π (radians).

Also, it is assumed that the phase changer 305B performs phase change on the symbols belonging to the second carrier *group_4* in FIG. 74 by using $e^{j\times F24}$ as the phase change value yp(i). It is assumed that F24 is a real number. For example, F24 is 0 (radians) ≤ F24 < 2×π (radians).

It is assumed that the phase changer 305B performs phase change on the symbols belonging to the third carrier *group_4* in FIG. 74 by using $e^{j\times F34}$ as the phase change value yp(i). It is assumed that F34 is a real number. For example, F34 is 0 (radians) ≤ F34 < 2×π (radians).

As a first example, there is a method in which "F14≠F24 and F14≠F34 and F24≠F34" holds. When generalized, this is a method in which "x is an integer equal to or greater than 1, y is an integer equal to or greater than 1, x≠y holds, and Fx4≠Fy4 holds in all x and all y satisfying these conditions".

As a second example, there is a method in which "F14≠F24 or F14≠F34 or F24≠F34" holds. When generalized, this is a method in which "there is a set of x and y in which x is an integer equal to or greater than 1, y is an integer equal to or greater than 1, x≠y holds, and Fx4≠Fy4 holds".

In addition, it is assumed that the phase changer 3801A performs phase change on the symbols belonging to the first carrier *group_4* in FIG. 74 by using $e^{j\times G14}$ as the phase change value Vp(i). It is assumed that G14 is a real number. For example, G14 is 0 (radians) ≤ G14 < 2×π (radians).

Also, it is assumed that the phase changer 3801A performs phase change on the symbols belonging to the second carrier *group_4* in FIG. 74 by using $e^{j\times G24}$ as the phase change value Vp(i). It is assumed that G24 is a real number. For example, G24 is 0 (radians) ≤ G24 < 2×π (radians).

It is assumed that the phase changer 3801A performs phase change on the symbols belonging to the third carrier *group_4* in FIG. 74 by using $e^{j \times G34}$ as the phase change value Vp(i). It is assumed that G34 is a real number. For example, G34 is 0 (radians) ≤ G34 < 2×π (radians).

For example, as a first example, there is a method in which "G14≠G24 and G14≠G34 and G24≠G34" holds. When generalized, this is a method in which "x is an integer equal to or greater than 1, y is an integer equal to or greater than 1, x≠y holds, and Gx4≠Gy4 holds in all x and all y satisfying these conditions".

As a second example, there is a method in which "G14≠G24 or G14≠G34 or G24≠G34" holds. When generalized, this is a method in which "there is a set of x and y in which x is an integer equal to or greater than 1, y is an integer equal to or greater than 1, x≠y holds, and Gx4≠Gy4 holds".

In addition, it is assumed that the phase changer 3801B performs phase change on the symbols belonging to the first carrier *group_4* in FIG. 74 by using $e^{j \times H14}$ as the phase change value vp(i). It is assumed that H14 is a real number. For example, H14 is 0 (radians) ≤ H14 < 2×π (radians).

Also, it is assumed that the phase changer 3801B performs phase change on the symbols belonging to the second carrier *group_4* in FIG. 74 by using $e^{j \times H24}$ as the phase change value vp(i). It is assumed that H24 is a real number. For example, H24 is 0 (radians) ≤ H24 < 2×π (radians).

It is assumed that the phase changer 3801B performs phase change on the symbols belonging to the third carrier *group_4* in FIG. 74 by using $e^{j \times H34}$ as the phase change value vp(i). It is assumed that H34 is a real number. For example, H34 is 0 (radians) ≤ H34 < 2×π (radians).

As a first example, there is a method in which "H14≠H24 and H14≠H34 and H24≠H34" holds. When generalized, this is a method in which "x is an integer equal to or greater than 1, y is an integer equal to or greater than 1, x≠y holds, and Hx4≠Hy4 holds in all x and all y satisfying these conditions".

As a second example, there is a method in which "H14≠H24 or H14≠H34 or H24≠H34" holds. When generalized, this is a method in which "there is a set of x and y in which x is an integer equal to or greater than 1, y is an integer equal to or greater than 1, x≠y holds, and Hx4≠Hy4 holds".

At this time, the following characteristic may be included.

When the method for dividing frequencies is the same, like "the section from time $1 to time $3" and "from time $4 to time $9" (the frequency used by the first carrier *group_1* and the frequency used by the first carrier *group_2* are identical to each other, or the frequency used by the second carrier *group_1* and the frequency used by the second carrier *group_2* are identical to each other, or the frequency used by the third carrier *group_1* and the frequency used by the third carrier *group_2* are identical to each other, or the frequency used by the fourth carrier *group_1* and the frequency used by the fourth carrier *group_2* are identical to each other, or the frequency used by the fifth carrier *group_1* and the frequency used by the fifth carrier *group_2* are identical to each other), the phase change value used by the X-th carrier *group_1* (X is 1, 2, 3, 4, or 5) in "the section from time $1 to time $3" and the phase change value used by the X-th carrier *group_2* in "the section from time $4 to time $9" may be identical to or different from each other.

For example, E11=E12 may hold, or E11≠E12 may hold. E21=E22 may hold, or E21≠E22 may hold. E31=E32 may hold, or E31≠E32 may hold. E41=E42 may hold, or E41≠E42 may hold. E51=E52 may hold, or E51≠E52 may hold.

Also, F11=F12 may hold, or F11≠F12 may hold. F21=F22 may hold, or F21≠F22 may hold. F31=F32 may hold, or F31≠F32 may hold. F41=F42 may hold, or F41≠F42 may hold. F51=F52 may hold, or F51≠F52 may hold.

G11=G12 may hold, or G11≠G12 may hold. G21=G22 may hold, or G21≠G22 may hold. G31=G32 may hold, or G31≠G32 may hold. G41=G42 may hold, or G41≠G42 may hold. G51=G52 may hold, or G51≠G52 may hold.

H11=H12 may hold, or H11≠H12 may hold. H21=H22 may hold, or H21≠H22 may hold. H31=H32 may hold, or H31≠H32 may hold. H41=H42 may hold, or H41≠H42 may hold. H51=H52 may hold, or H51≠H52 may hold.

The method for dividing frequencies may be changed along the time axis. For example, "from time $1 to time $3" in FIG. 74, carrier #1 to carrier #25 are divided into five groups to generate five carrier groups. Also, "from time $10 to time $11", one carrier group made up of carrier #1 to carrier #25 is generated. In addition, "from time $12 to time $14", carrier #1 to carrier #25 are divided into three groups to generate three carrier groups.

The method for dividing frequencies is not limited to the method in FIG. 74. The frequencies allocated to a certain user may serve as one carrier group, or two or more carrier groups may be generated. In addition, it is sufficient that the number of carriers constituting a carrier group be one or more.

According to the description given above using FIG. 74, "carrier #1 to carrier #25 and time $1 to time $14 are used by the base station or AP to transmit data to a certain terminal (certain user) (terminal #p)". Alternatively, carrier #1 to carrier #25 and time $1 to time $14 may be allocated for transmitting data to multiple terminals (multiple users) by the base station or AP. Hereinafter, this point will be described. The settings for each carrier group of the phase change value Yp(i) used by the phase changer 305A, the phase change value yp(i) used by the phase changer 305B, the phase change value Vp(i) used by the phase changer 3801A, and the phase change value vp(i) used by the phase changer 3801B in FIGS. 3, 4, 26, 38, 39, 40, 41, 42, 43, 44, 45, 46, 47, 48, 52, and so forth are as described above, and thus the description thereof is omitted.

As a first example, in FIG. 74, terminal allocation (user allocation) may be performed by using time division.

For example, it is assumed that the base station or AP transmits data to a terminal (user) p1 (i.e., p = p1) by using "time $1 to time #3". Also, it is assumed that the base station or AP transmits data to a terminal (user) p2 (i.e., p = p2) by using "time $4 to time #9". It is assumed that the base station or AP transmits data to a terminal (user) p3 (i.e., p = p3) by using "time $10 to time $11". It is assumed that the base station or AP transmits data to a terminal (user) p4 (i.e., p = p4) by using "time $12 to time $14".

As a second example, in FIG. 74, terminal allocation (user allocation) may be performed by using frequency division.

For example, it is assumed that the base station or AP transmits data to the terminal (user) p1 (i.e., p = p1) by using the first carrier *group_1* and the second carrier *group_1*. Also, it is assumed that the base station or AP transmits data to the terminal (user) p2 (i.e., p = p2) by using the third carrier *group_1*, the fourth carrier *group_1*, and the fifth carrier *group_1*.

As a third example, in FIG. 74, terminal allocation (user allocation) may be performed by using both time division and frequency division.

For example, it is assumed that the base station or AP transmits data to the terminal (user) p1 (i.e., p = p1) by using the first carrier group_1, the first carrier group_2, the second carrier group_1, and the second carrier group_2. Also, it is assumed that the base station or AP transmits data to the terminal (user) p2 (i.e., p = p2) by using the third carrier group_1, the fourth carrier group_1, and the fifth carrier group_1. It is assumed that the base station or AP transmits data to the terminal (user) p3 (i.e., p = p3) by using the third carrier group_2 and the fourth carrier group_2. It is assumed that the base station or AP transmits data to the terminal (user) p4 (i.e., p = p4) by using the fifth carrier group_2. It is assumed that the base station or AP transmits data to a terminal (user) p5 (i.e., p = p5) by using the first carrier group_3. It is assumed that the base station or AP transmits data to a terminal (user) p6 (i.e., p = p6) by using the first carrier group_4. It is assumed that the base station or AP transmits data to a terminal (user) p7 (i.e., p = p7) by using the second carrier group_4 and the third carrier group_4.

In the description given above, the method for configuring carrier groups is not limited to FIG. 74. For example, the number of carriers constituting a carrier group is not specified as long as the number is one or more. In addition, the time interval for configuring carrier groups is not limited to the configuration in FIG. 74. In addition, the frequency division method, the time division method, and the time and frequency division method for user allocation are not limited to the examples described above, and any type of division may be used to carry out the embodiment.

In accordance with the above examples, by "changing the phase periodically or regularly" in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth described in the first to fifteenth embodiments, the first to fourth supplements, and so forth, the effects described in the first to fifteenth embodiments, the first to fourth supplements, and so forth can be obtained.

Figure 75:
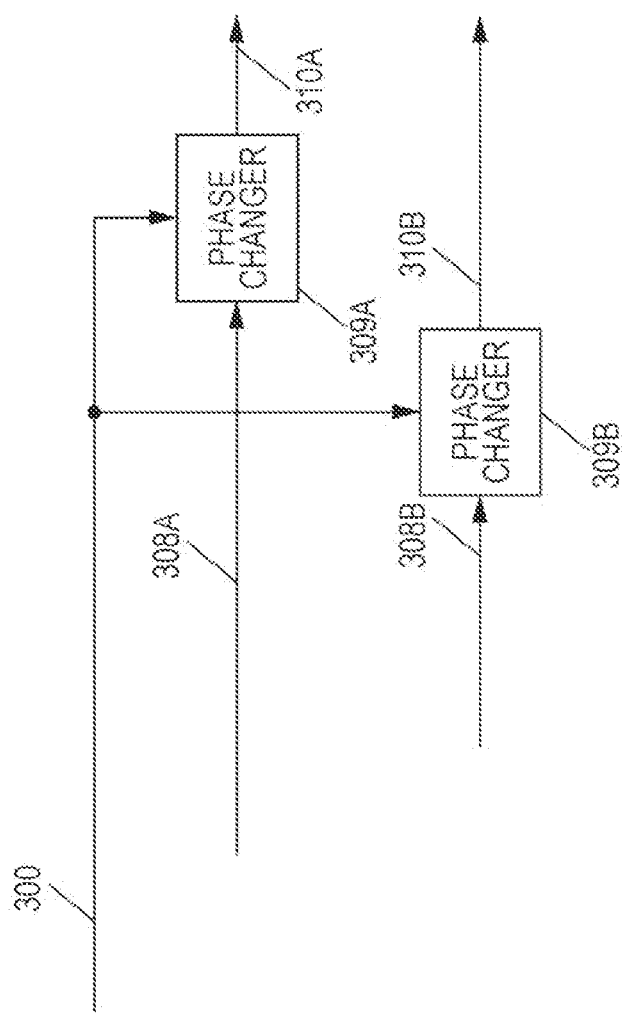
FIG. 75 is a diagram illustrating an example of a configuration added with a phase changer.

In FIGS. 3, 4, 26, 38, 39, 40, 41, 42, 43, 44, 45, 46, 47, 48, and so forth, the portion located downstream of the inserter 307A and the inserter 307B may have the configuration in FIG. 75. FIG. 75 is a diagram illustrating an example of a configuration added with a phase changer. The characteristic point of FIG. 75 is that the phase changer 309A is inserted. The operation of the phase changer 309A is, like that of the phase changer 309B, signal processing for phase change or CDD (CSD).

Seventeenth Embodiment

In the first to fifteenth embodiments, the first to fourth supplements, and so forth, when both "the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" and the computation in the weight combiner 303 are considered together, for example, this corresponds to switching of the precoding matrix by i when consideration is given with reference to Expression (37), Expression (42), Expression (49), Expression (51), Expression (64), and Expression (65), for example.

In addition, in a case where Expression (21), Expression (22), Expression (23), Expression (24), Expression (25), Expression (26), Expression (27), and Expression (28) are used in the weight combiner 303, for example, this corresponds to switching of the precoding matrix by i.

When consideration is given with reference to Expression (37), Expression (42), Expression (49), Expression (51), Expression (64), and Expression (65), when the precoding matrix is switched by i, Expression (69) holds. Here, i is a symbol number, and i is an integer equal to or greater than 0, for example.

$$\begin{pmatrix} zp1(i) \\ zp2(i) \end{pmatrix} = Fp(i) \begin{pmatrix} sp1(i) \\ sp2(i) \end{pmatrix} \qquad \text{Expression (69)}$$
$$= \begin{pmatrix} ap(i) & bp(i) \\ cp(i) & dp(i) \end{pmatrix} \begin{pmatrix} sp1(i) \\ sp2(i) \end{pmatrix}$$

In Expression (69), $zp1(i)$ represents a first phase-changed signal, $zp2(i)$ represents a second phase-changer signal, $sp1(i)$ represents the user #p mapped signal 301A, and $sp2(i)$ represents the user #p mapped signal 301B. Fp(i) represents a matrix used for weight combining, that is, a precoding matrix. The precoding matrix can be regarded as a function of i. For example, the precoding matrix may be switched periodically or regularly. Note that, in the present embodiment, $zp1(i)$ is called a first precoded signal, and $zp2(i)$ is called a second precoded signal. On the basis of Expression (69), Expression (70) holds.

$$Fp(i) = \begin{pmatrix} ap(i) & bp(i) \\ cp(i) & dp(i) \end{pmatrix} \qquad \text{Expression (70)}$$

In Expression (70), ap(i) can be defined as a complex number. Thus, ap(i) may be a real number. In addition, bp(i) can be defined as a complex number. Thus, bp(i) may be a real number. In addition, cp(i) can be defined as a complex number. Thus, cp(i) may be a real number. In addition, dp(i) can be defined as a complex number. Thus, dp(i) may be a real number.

Similarly to the description of Expression (37), Expression (42), Expression (49), Expression (51), Expression (64), and Expression (65), $zp1(i)$ corresponds to 103_p_1 in FIG. 1, and $zp2(i)$ corresponds to 103_p_2 in FIG. 1. Alternatively, $zp1(i)$ corresponds to 103_p_1 in FIG. 70, and $zp2(i)$ corresponds to 103_p_2 in FIG. 70. Here, $zp1(i)$ $zp2(i)$ are transmitted by using identical frequencies and identical times.

Figure 76:
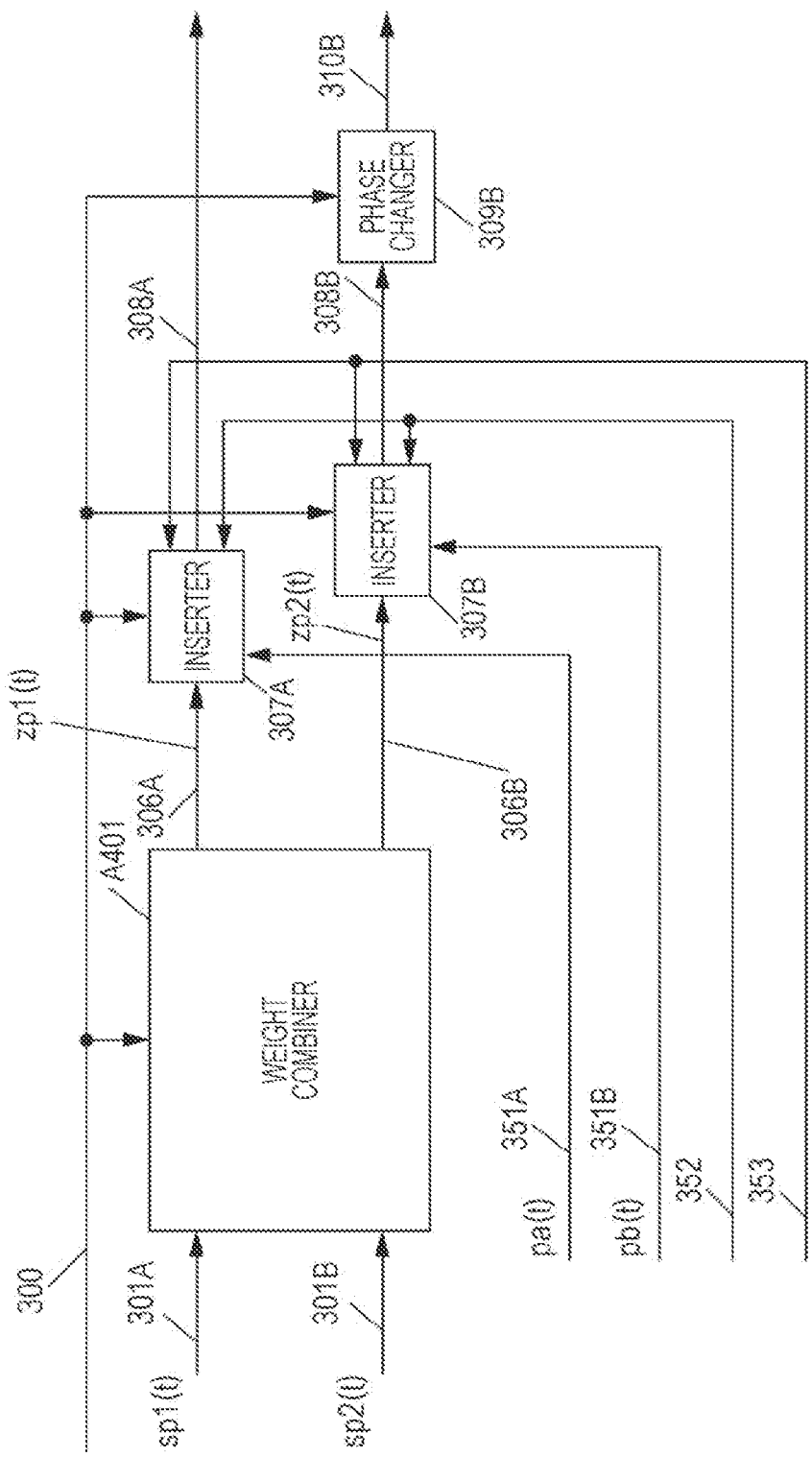
FIG. 76 is a diagram illustrating a first example configuration of the signal processor for the user #p in FIGS. 1 and 70.

FIG. 76 is a diagram illustrating a first example configuration of the user #p signal processor 102_p in FIGS. 1 and 70 including the above computation (Expression (69)). In FIG. 76, the elements that operate similarly to those in FIG. 3 and so forth are denoted by the same numerals, and the detailed description thereof is omitted.

The computation of Expression (69) is performed by a weight combiner A401 in FIG. 76.

Figure 77:
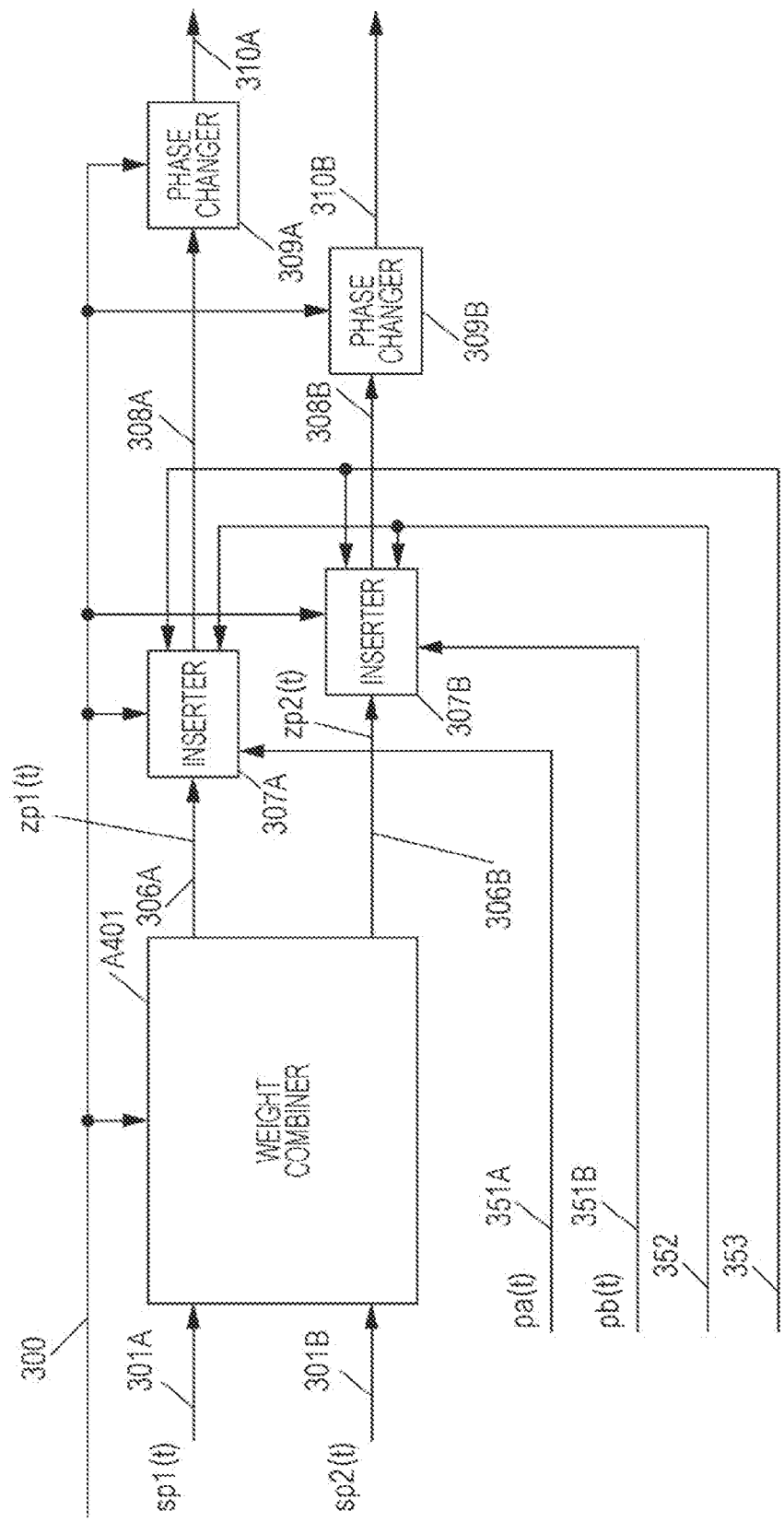
FIG. 77 is a diagram illustrating a second example configuration of the signal processor for the user #p in FIGS. 1 and 70.

FIG. 77 is a diagram illustrating a second example configuration of the user #p signal processor 102_p in FIGS. 1 and 70 including the above computation (Expression (69)). In FIG. 77, the elements that operate similarly to those in FIG. 3 and so forth are denoted by the same numerals, and the detailed description thereof is omitted.

As in FIG. 76, the computation of Expression (69) is performed by the weight combiner A401 in FIG. 77. The characteristic point is that the weight combiner A401 performs precoding processing by switching the precoding matrix regularly or periodically, for example. In FIG. 77, the point different from FIG. 76 is that the phase changer 309A is inserted. The details of the operation of switching of precoding will be described below. The operation of the phase changer 309A is, like that of the phase changer 309B, signal processing for phase change or CDD (CSD).

Although not illustrated in FIGS. 76 and 77, the pilot symbol signal (pa(t)) (351A), the pilot symbol signal (pb(t)) (351B), the preamble signal 352, and the control information symbol signal 353 may be signals that have been subjected to processing such as phase change.

Also, $zp1(i)$ and $zp2(i)$ are subjected to the processing illustrated in FIGS. 1 or 70. This point is as described in the foregoing embodiments.

Meanwhile, in the first to fifteenth embodiments, the first to fourth supplements, and so forth, a description is given, using, for example, Expression (2), Expression (50), and so forth, of the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth, and also a description is given that the value of the phase change value need not be based on these expressions and "it is sufficient to change the phase periodically or regularly". Thus, the precoding matrix expressed by Expression (70) in Expression (69) "may be changed periodically or regularly". Hereinafter, a description will be given of an example of changing the precoding matrix periodically or regularly.

For example, as in FIG. 73, the first carrier group made up of carrier #1 to carrier #5, the second carrier group made up of carrier #6 to carrier #10, the third carrier group made up of carrier #11 to carrier #15, the fourth carrier group made up of carrier #16 to carrier #20, and the fifth carrier group made up of carrier #21 to carrier #25 are considered, and it is assumed that the base station or AP uses the first carrier group, the second carrier group, the third carrier group, the fourth carrier group, and the fifth carrier group to transmit data to a certain terminal (certain user) (terminal #p).

At this time, it is assumed that precoding is performed on the symbol (set) ($sp1(i)$ and $sp2(i)$) belonging to the first carrier group in FIG. 73 by using u1 as the precoding matrix Fp(i) in Expression (69) and Expression (70).

Also, it is assumed that precoding is performed on the symbol (set) ($sp1(i)$ and $sp2(i)$) belonging to the second carrier group in FIG. 73 by using u2 as the precoding matrix Fp(i) in Expression (69) and Expression (70).

It is assumed that precoding is performed on the symbol (set) ($sp1(i)$ and $sp2(i)$) belonging to the third carrier group in FIG. 73 by using U3 as the precoding matrix Fp(i) in Expression (69) and Expression (70).

It is assumed that precoding is performed on the symbol (set) ($sp1(i)$ and $sp2(i)$) belonging to the fourth carrier group in FIG. 73 by using U4 as the precoding matrix Fp(i) in Expression (69) and Expression (70).

It is assumed that precoding is performed on the symbol (set) ($sp1(i)$ and $sp2(i)$) belonging to the fifth carrier group in FIG. 73 by using U5 as the precoding matrix Fp(i) in Expression (69) and Expression (70).

As a first example, there is a method in which "u1≠u2 and u1≠U3 and u1≠U4 and u1≠U5 and u2≠U3 and u2≠U4 and u2≠U5 and U3≠U4 and U3≠U5 and U4≠U5" holds. When generalized, this is a method in which "x is an integer equal to or greater than 1, y is an integer equal to or greater than 1, x≠y holds, and Ux≠Uy holds in all x and all y satisfying these conditions".

As a second example, there is a method in which "u1≠u2 or u1≠U3 or u1≠U4 or u1≠U5 or u2≠U3 or u2≠U4 or u2≠U5 or U3≠U4 or U3≠U5 or U4≠U5" holds. When generalized, this is a method in which "there is a set of x and y in which x is an integer equal to or greater than 1, y is an integer equal to or greater than 1, x≠y holds, and Ux≠Uy holds".

FIG. 73 illustrates the first carrier group to the fifth carrier group, but the number of carrier groups is not limited to five. The embodiment can be carried out similarly when two or more carrier groups exist. Alternatively, the number of carrier groups may be set to one. For example, one or more carrier groups may exist on the basis of a communication situation, feedback information from a terminal, or the like. When there is one carrier group, the precoding matrix is not changed. As in the example in FIG. 73, each carrier group may be set to a value of a fixed number.

In addition, each of the first carrier group, the second carrier group, the third carrier group, the fourth carrier group, and the fifth carrier group has a configuration including five carriers, but the configuration is not limited thereto. Thus, it is sufficient for each carrier group to include one or more carriers. Among different carrier groups, the number of carriers included may be identical or different. For example, in FIG. 73, the number of carriers included in the first carrier group is five, and the number of carriers included in the second carrier group is also five (identical). For another example, in FIG. 73, the number of carriers included in the first carrier group may be five, and the number of carriers included in the second carrier group may be different, for example, ten.

The matrices u1, u2, U3, U4, and U5 may be expressed by, for example, the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), the matrix on the left side of Expression (36), and so forth, but the matrices are not limited thereto.

That is, the precoding matrix Fp(i) may be any kind of matrix, such as the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), and the matrix on the left side of Expression (36).

FIG. 74 illustrates an example of carrier groups of modulated signals transmitted by the base station or AP different from the example in FIG. 73, in which the horizontal axis indicates frequency (carrier) and the vertical axis indicates time.

The first carrier *group_1* is made up of carrier #1 to carrier #5 and time $1 to time $3. The second carrier *group_1* is made up of carrier #6 to carrier #10 and time $1 to time $3. The third carrier *group_1* is made up of carrier #11 to carrier #15 and time $1 to time $3. The fourth carrier *group_1* is made up of carrier #16 to carrier #20 and time $1 to time $3. The fifth carrier *group_1* is made up of carrier #21 to carrier #25 and time $1 to time $3.

The first carrier *group_2* is made up of carrier #1 to carrier #5 and time $4 to time $9. The second carrier *group_2* is made up of carrier #6 to carrier #10 and time $4 to time $9. The third carrier *group_2* is made up of carrier #11 to carrier #15 and time $4 to time $9. The fourth carrier *group_2* is made up of carrier #16 to carrier #20 and time $4 to time $9. The fifth carrier *group_2* is made up of carrier #21 to carrier #25 and time $4 to time $9.

The first carrier *group_3* is made up of carrier #1 to carrier #25 and time $10 to time $11.

The first carrier *group_4* is made up of carrier #1 to carrier #10 and time $12 to time $14. The second carrier *group_4* is made up of carrier #11 to carrier #15 and time $12 to time $14. The third carrier *group_4* is made up of carrier #16 to carrier #25 and time $12 to time $14.

In FIG. 74, it is assumed that the base station or AP uses carrier #1 to carrier #25 and time $1 to time $14 to transmit data to a certain terminal (certain user) (terminal #p).

At this time, it is assumed that precoding is performed on the symbol (set) (*sp1(i)* and *sp2(i)*) belonging to the first carrier *group_1* in FIG. 74 by using a matrix u11 as the precoding matrix Fp(i) in Expression (69) and Expression (70).

Also, it is assumed that precoding is performed on the symbol (set) (*sp1(i)* and *sp2(i)*) belonging to the second carrier *group_1* in FIG. 74 by using a matrix u21 as the precoding matrix Fp(i) in Expression (69) and Expression (70).

It is assumed that precoding is performed on the symbol (set) (*sp1(i)* and *sp2(i)*) belonging to the third carrier *group_1* in FIG. 74 by using a matrix U31 as the precoding matrix Fp(i) in Expression (69) and Expression (70).

It is assumed that precoding is performed on the symbol (set) (*sp1(i)* and *sp2(i)*) belonging to the fourth carrier *group_1* in FIG. 74 by using a matrix U41 as the precoding matrix Fp(i) in Expression (69) and Expression (70).

It is assumed that precoding is performed on the symbol (set) (*sp1(i)* and *sp2(i)*) belonging to the fifth carrier *group_1* in FIG. 74 by using a matrix U51 as the precoding matrix Fp(i) in Expression (69) and Expression (70).

As a first example, there is a method in which "U11≠U21 and U11≠U31 and U11≠U41 and U11≠u51 and U21≠U31 and U21≠U41 and U21≠U51 and U31≠U41 and U31≠U51 and U41≠U51" holds. When generalized, this is a method in which "x is an integer equal to or greater than 1, y is an integer equal to or greater than 1, x≠y holds, and Ux1≠Uy1 holds in all x and all y satisfying these conditions".

As a second example, there is a method in which "U11≠U21 or U11≠U31 or U11≠U41 or U11≠U51 or U21≠U31 or U21≠U41 or U21≠U51 or U31≠U41 or U31≠U51 or U41≠U51" holds. When generalized, this is a method in which "there is a set of x and y in which x is an integer equal to or greater than 1, y is an integer equal to or greater than 1, x≠y holds, and Ux1≠Uy1 holds".

The matrices U11, U21, U31, U41, and U51 may be expressed by, for example, the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), the matrix on the left side of Expression (36), and so forth, but the matrices are not limited thereto.

That is, the precoding matrix Fp(i) may be any kind of matrix, such as the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), and the matrix on the left side of Expression (36).

In addition, it is assumed that precoding is performed on the symbol (set) ($sp1(i)$ and $sp2(i)$) belonging to the first carrier *group_2* in FIG. 74 by using a matrix u12 as the precoding matrix Fp(i) in Expression (69) and Expression (70).

Also, it is assumed that precoding is performed on the symbol (set) ($sp1(i)$ and $sp2(i)$) belonging to the second carrier *group_2* in FIG. 74 by using a matrix u22 as the precoding matrix Fp(i) in Expression (69) and Expression (70).

It is assumed that precoding is performed on the symbol (set) ($sp1(i)$ and $sp2(i)$) belonging to the third carrier *group_2* in FIG. 74 by using a matrix U32 as the precoding matrix Fp(i) in Expression (69) and Expression (70).

It is assumed that precoding is performed on the symbol (set) ($sp1(i)$ and $sp2(i)$) belonging to the fourth carrier *group_2* in FIG. 74 by using a matrix U42 as the precoding matrix Fp(i) in Expression (69) and Expression (70).

It is assumed that precoding is performed on the symbol (set) ($sp1(i)$ and $sp2(i)$) belonging to the fifth carrier *group_2* in FIG. 74 by using a matrix U52 as the precoding matrix Fp(i) in Expression (69) and Expression (70).

As a first example, there is a method in which "U12≠u22 and U12≠U32 and U12≠U42 and U12≠U52 and U22≠U32 and U22≠U42 and U22≠U52 and U32≠U42 and U32≠U52 and U42≠U52" holds. When generalized, this is a method in which "x is an integer equal to or greater than 1, y is an integer equal to or greater than 1, x≠y holds, and Ux2≠Uy2 holds in all x and all y satisfying these conditions".

As a second example, there is a method in which "U12≠u22 or U12≠U32 or U12≠U42 or U12≠U52 or U22≠U32 or U22≠U42 or U22≠U52 or U32≠U42 or U32≠U52 or U42≠U52" holds. When generalized, this is a method in which "there is a set of x and y in which x is an integer equal to or greater than 1, y is an integer equal to or greater than 1, x≠y holds, and Ux2≠Uy2 holds".

The matrices U12, U22, U32, U42, and U52 may be expressed by, for example, the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), the matrix on the left side of Expression (36), and so forth, but the matrices are not limited thereto.

That is, the precoding matrix Fp(i) may be any kind of matrix, such as the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), and the matrix on the left side of Expression (36).

It is assumed that precoding is performed on the symbol (set) ($sp1(i)$ and $sp2(i)$) belonging to the first carrier *group_3* in FIG. 74 by using a matrix U13 as the precoding matrix Fp(i) in Expression (69) and Expression (70).

It is assumed that precoding is performed on the symbol (set) ($sp1(i)$ and $sp2(i)$) belonging to the first carrier *group_4* in FIG. 74 by using a matrix U14 as the precoding matrix Fp(i) in Expression (69) and Expression (70).

It is assumed that precoding is performed on the symbol (set) ($sp1(i)$ and $sp2(i)$) belonging to the second carrier *group_4* in FIG. 74 by using a matrix U24 as the precoding matrix Fp(i) in Expression (69) and Expression (70).

It is assumed that precoding is performed on the symbol (set) ($sp1(i)$ and $sp2(i)$) belonging to the third carrier *group_4* in FIG. 74 by using a matrix U34 as the precoding matrix Fp(i) in Expression (69) and Expression (70).

As a first example, there is a method in which "U14≠u24 and U14≠U34 and U24≠U34" holds. When generalized, this is a method in which "x is an integer equal to or greater than 1, y is an integer equal to or greater than 1, x≠y holds, and Ux4≠Uy4 holds in all x and all y satisfying these conditions".

As a second example, there is a method in which "U14≠U24 or U14≠U34 or U24≠U34" holds. When generalized, this is a method in which "there is a set of x and y in which x is an integer equal to or greater than 1, y is an integer equal to or greater than 1, x≠y holds, and Ux4≠Uy4 holds".

The matrices U14, U24, and U34 may be expressed by, for example, the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), the matrix on the left side of Expression (36), and so forth, but the matrices are not limited thereto.

That is, the precoding matrix Fp(i) may be any kind of matrix, such as the matrix on the left side of Expression (5), the matrix on the left side of Expression (6), the matrix on the left side of Expression (7), the matrix on the left side of Expression (8), the matrix on the left side of Expression (9), the matrix on the left side of Expression (10), the matrix on the left side of Expression (11), the matrix on the left side of Expression (12), the matrix on the left side of Expression (13), the matrix on the left side of Expression (14), the matrix on the left side of Expression (15), the matrix on the left side of Expression (16), the matrix on the left side of Expression (17), the matrix on the left side of Expression (18), the matrix on the left side of Expression (19), the matrix on the left side of Expression (20), the matrix on the left side of Expression (21), the matrix on the left side of Expression (22), the matrix on the left side of Expression (23), the matrix on the left side of Expression (24), the matrix on the left side of Expression (25), the matrix on the left side of Expression (26), the matrix on the left side of Expression (27), the matrix on the left side of Expression (28), the matrix on the left side of Expression (29), the matrix on the left side of Expression (30), the matrix on the left side of Expression (31), the matrix on the left side of Expression (32), the matrix on the left side of Expression (33), the matrix on the left side of Expression (34), the matrix on the left side of Expression (35), and the matrix on the left side of Expression (36).

At this time, the following characteristic may be included.

When the method for dividing frequencies is the same, like "the section from time $1 to time $3" and "from time $4 to time $9" (the frequency used by the first carrier group_1 and the frequency used by the first carrier group_2 are identical to each other, or the frequency used by the second carrier group_1 and the frequency used by the second carrier group_2 are identical to each other, or the frequency used by the third carrier group_1 and the frequency used by the third carrier group_2 are identical to each other, or the frequency used by the fourth carrier group_1 and the frequency used by the fourth carrier group_2 are identical to each other, or the frequency used by the fifth carrier group_1 and the frequency used by the fifth carrier group_2 are identical to each other), the precoding matrix used by the X-th carrier group_1 (X is 1, 2, 3, 4, or 5) in "the section from time $1 to time $3" and the precoding matrix used by the X-th carrier group_2 in "the section from time $4 to time $9" may be identical to or different from each other.

For example, U11=U12 may hold, or U11≠U12 may hold. U21=U22 may hold, or U21≠U22 may hold. U31=U32 may hold, or U31≠U32 may hold. U41=U42 may hold, or U41≠U42 may hold. U51=U52 may hold, or U51≠U52 may hold.

The method for dividing frequencies may be changed along the time axis. For example, "from time $1 to time $3" in FIG. 74, carrier #1 to carrier #25 are divided into five groups to generate five carrier groups. Also, "from time $10 to time $11", one carrier group made up of carrier #1 to carrier #25 is generated. In addition, "from time $12 to time $14", carrier #1 to carrier #25 are divided into three groups to generate three carrier groups.

The method for dividing frequencies is not limited to the method in FIG. 74. The frequencies allocated to a certain user may serve as one carrier group, or two or more carrier groups may be generated. In addition, it is sufficient that the number of carriers constituting a carrier group be one or more.

According to the description given above using FIG. 74, "carrier #1 to carrier #25 and time $1 to time $14 are used by the base station or AP to transmit data to a certain terminal (certain user) (terminal #p)". Alternatively, carrier #1 to carrier #25 and time $1 to time $14 may be allocated for transmitting data to multiple terminals (multiple users) by the base station or AP. Hereinafter, this point will be described. The settings for each carrier group of the precoding matrix Fp(i) are as described above, and thus the description thereof is omitted.

For example, as a first example, in FIG. 74, terminal allocation (user allocation) may be performed by using time division.

For example, it is assumed that the base station or AP transmits data to the terminal (user) p1 (i.e., p = p1) by using "time $1 to time #3". Also, it is assumed that the base station or AP transmits data to the terminal (user) p2 (i.e., p = p2) by using "time $4 to time #9". It is assumed that the base station or AP transmits data to the terminal (user) p3 (i.e., p = p3) by using "time $10 to time $11". It is assumed that the base station or AP transmits data to the terminal (user) p4 (i.e., p = p4) by using "time $12 to time $14".

As a second example, in FIG. 74, terminal allocation (user allocation) may be performed by using frequency division.

For example, it is assumed that the base station or AP transmits data to the terminal (user) p1 (i.e., p = p1) by using the first carrier group_1 and the second carrier group_1. Also, it is assumed that the base station or AP transmits data to the terminal (user) p2 (i.e., p = p2) by using the third carrier group_1, the fourth carrier group_1, and the fifth carrier group_1.

As a third example, in FIG. 74, terminal allocation (user allocation) may be performed by using both time division and frequency division.

For example, it is assumed that the base station or AP transmits data to the terminal (user) p1 (i.e., p = p1) by using the first carrier group_1, the first carrier group_2, the second carrier group_1, and the second carrier group_2.

Also, it is assumed that the base station or AP transmits data to the terminal (user) p2 (i.e., p = p2) by using the third carrier *group_1*, the fourth carrier *group_1*, and the fifth carrier *group_1*. It is assumed that the base station or AP transmits data to the terminal (user) p3 (i.e., p = p3) by using the third carrier *group_2* and the fourth carrier *group_2*. It is assumed that the base station or AP transmits data to the terminal (user) p4 (i.e., p = p4) by using the fifth carrier *group_2*. It is assumed that the base station or AP transmits data to the terminal (user) p5 (i.e., p = p5) by using the first carrier *group_3*. It is assumed that the base station or AP transmits data to the terminal (user) p6 (i.e., p = p6) by using the first carrier *group_4*. It is assumed that the base station or AP transmits data to the terminal (user) p7 (i.e., p = p7) by using the second carrier *group_4* and the third carrier *group_4*.

In the description given above, the method for configuring carrier groups is not limited to FIG. 74. For example, the number of carriers constituting a carrier group is not specified as long as the number is one or more. In addition, the time interval for configuring carrier groups is not limited to the configuration in FIG. 74. In addition, the frequency division method, the time division method, and the time and frequency division method for user allocation are not limited to the examples described above, and any type of division may be used to carry out the embodiment.

In accordance with the above examples, by "changing the precoding matrix periodically or regularly", which is processing equivalent to "changing the phase periodically or regularly" described in the first to fifteenth embodiments, the first to fourth supplements, and so forth, the effects described in the first to fifteenth embodiments, the first to fourth supplements, and so forth can be obtained.

Eighteenth Embodiment

The first embodiment, the third embodiment, and so forth describe phase change before precoding (weight combining) and/or phase change after precoding (weight combining), that is, switching between perform and not perform phase change in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth.

The first embodiment, the second supplement, and so forth describe switching between perform and not perform phase change in the phase changer 309B in FIGS. 3, 4, 26, 38, 39, and so forth (switching between perform and not perform CDD (CSD) processing). Obviously, switching between perform and not perform phase change (switching between perform and not perform CDD (CSD) processing) may be performed in the phase changer 309A in FIGS. 75 and 77.

In the present embodiment, a supplemental description will be given of this point.

The first embodiment, the third embodiment, and so forth describe phase change before precoding (weight combining) and/or phase change after precoding (weight combining), that is, switching between perform and not perform phase change in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth. This phase change is described as the operation of the user #p signal processor 102_*p* in FIGS. 1 and 70.

Thus, in the signal processor for each user, "selection of performing or not performing phase change in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" is performed. That is, in the user #p signal processor 102_*p* (p is 1 to M) in FIGS. 1 and 70, "selection of performing or not performing phase change in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" is performed individually.

The first embodiment, the second supplement, and so forth describe switching between perform and not perform phase change (switching between perform and not perform CDD (CSD) processing) in the phase changer 309B in FIGS. 3, 4, 26, 38, 39, and so forth. Obviously, switching between perform and not perform phase change (switching between perform and not perform CDD (CSD) processing) in the phase changer 309A in FIGS. 75 and 77 is described. The processing is described as the operation of the user #p signal processor 102_*p* in FIGS. 1 and 70.

Thus, in the signal processor for each user, "selection of performing or not performing phase change (selection of performing or not performing CDD (CSD) processing) in the phase changer 309B in FIGS. 3, 4, 26, 38, 39, and so forth" and/or "selection of performing or not performing phase change (selection of performing or not performing CDD (CSD) processing) in the phase changer 309A in FIGS. 75 and 77" is performed. That is, in the user #p signal processor 102_*p* (p is 1 to M) in FIGS. 1 and 70, "selection of performing or not performing phase change (selection of performing or not performing CDD (CSD) processing) in the phase changer 309B in FIGS. 3, 4, 26, 38, 39, and so forth" and/or "selection of performing or not performing phase change (selection of performing or not performing CDD (CSD) processing) in the phase changer 309A in FIGS. 75 and 77" is performed individually.

In addition, the first embodiment and the third embodiment describe that the base station or AP transmits "information indicating whether or not phase change is performed in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" by using the control information symbols included in the other symbols 603 and 703 in FIGS. 8 and 9, for example, and also describe that the base station or AP transmits "information indicating whether or not phase change is performed in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" by using the preambles 1001 and 1101 and the control information symbols 1002 and 1102 in FIGS. 10 and 11, for example.

In the present embodiment, a supplemental description will be given of this point.

For example, it is assumed that the base station or AP transmits modulated signals addressed to the user #p by using the frame configurations in FIGS. 8 and 9. As an example, it is assumed that modulated signals of multiple streams are transmitted.

Figure 78:
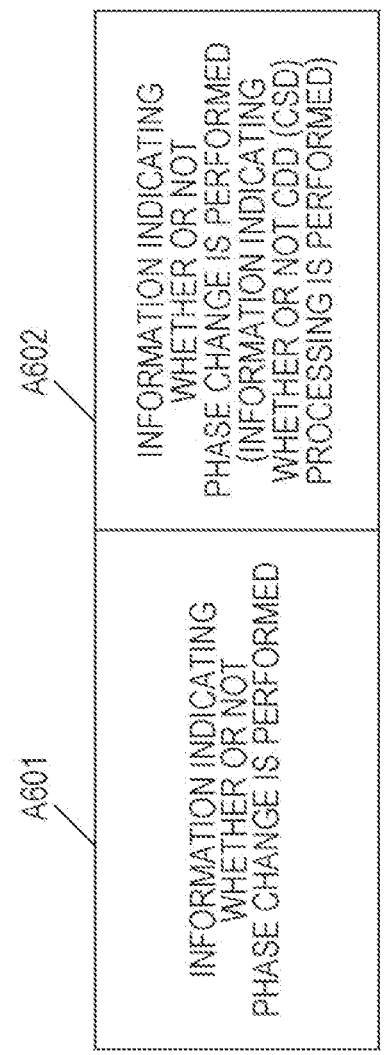

At this time, it is assumed that the control information symbols included in the other symbols 603 and 703 in FIGS. 8 and 9 include "information indicating whether or not phase change is performed" A601 and/or "information indicating whether or not phase change is performed (information indicating whether or not CDD (CSD) processing is performed)" A602 illustrated in FIG. 78.

The "information indicating whether or not phase change is performed" A601 is information indicating "whether or not phase change has been performed in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" in the base station or AP. The terminal as the user #p obtains the "information indicating whether or not phase change is performed" A601, thereby performing demodulation/decoding of the data symbols of the user #p modulated signals transmitted by the base station or AP.

The "information indicating whether or not phase change is performed (information indicating whether or not CDD (CSD) processing is performed)" A602 is information indicating "whether or not phase change has been performed (whether or not CDD (CSD) processing has been performed) in the phase changer 309A and the phase changer 309B in FIGS. 3, 4, 26, 38, 39, 75, 77, and so forth" in the base station or AP. The terminal as the user #p obtains the "information indicating whether or not phase change is performed (information indicating whether or not CDD (CSD) processing is performed)" A602, thereby performing demodulation/decoding of the data symbols of the user #p modulated signals transmitted by the base station or AP.

The "information indicating whether or not phase change is performed" A601 may be generated for each user. That is, for example, "information indicating whether or not phase change is performed" A601 addressed to the user #1, "information indicating whether or not phase change is performed" A601 addressed to the user #2, "information indicating whether or not phase change is performed" A601 addressed to the user #3, ... may exist. The "information indicating whether or not phase change is performed" A601 need not necessarily be generated for each user.

Likewise, the "information indicating whether or not phase change is performed (information indicating whether or not CDD (CSD) processing is performed)" A602 may be generated for each user. That is, "information indicating whether or not phase change is performed (information indicating whether or not CDD (CSD) processing is performed)" A602 addressed to the user #1, "information indicating whether or not phase change is performed (information indicating whether or not CDD (CSD) processing is performed)" A602 addressed to the user #2, "information indicating whether or not phase change is performed (information indicating whether or not CDD (CSD) processing is performed)" A602 addressed to the user #3, ... may exist. The "information indicating whether or not phase change is performed (information indicating whether or not CDD (CSD) processing is performed)" A602 need not necessarily be generated for each user.

In FIG. 78, a description has been given of an example in which the control information symbols include both the "information indicating whether or not phase change is performed" A601 and the "information indicating whether or not phase change is performed (information indicating whether or not CDD (CSD) processing is performed)" A602, but a configuration including either of them may be used.

Next, it is assumed that the base station or AP transmits modulated signals addressed to the user #p by using the frame configurations in FIGS. 10 and 11. As an example, a description will be given of the case of transmitting modulated signals of multiple streams.

At this time, it is assumed that the preambles 1001 and 1101 and the control information symbols 1002 and 1102 in FIGS. 10 and 11 include the "information indicating whether or not phase change is performed" A601 and/or the "information indicating whether or not phase change is performed (information indicating whether or not CDD (CSD) processing is performed)" A602 illustrated in FIG. 78.

The "information indicating whether or not phase change is performed" A601 is information indicating "whether or not phase change has been performed in the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" in the base station or AP. The terminal as the user #p obtains the "information indicating whether or not phase change is performed" A601, thereby performing demodulation/decoding of the data symbols of the user #p modulated signals transmitted by the base station or AP.

The "information indicating whether or not phase change is performed (information indicating whether or not CDD (CSD) processing is performed)" A602 is information indicating "whether or not phase change has been performed (whether or not CDD (CSD) processing has been performed) in the phase changer 309A and the phase changer 309B in FIGS. 3, 4, 26, 38, 39, 75, 77, and so forth" in the base station or AP. The terminal as the user #p obtains the "information indicating whether or not phase change is performed (information indicating whether or not CDD (CSD) processing is performed)" A602, thereby performing demodulation/decoding of the data symbols of the user #p modulated signals transmitted by the base station or AP.

The "information indicating whether or not phase change is performed" A601 may be generated for each user. That is, for example, "information indicating whether or not phase change is performed" A601 addressed to the user #1, "information indicating whether or not phase change is performed" A601 addressed to the user #2, "information indicating whether or not phase change is performed" A601 addressed to the user #3, ... may exist. The "information indicating whether or not phase change is performed" A601 need not necessarily be generated for each user.

Likewise, the "information indicating whether or not phase change is performed (information indicating whether or not CDD (CSD) processing is performed)" A602 may be generated for each user. That is, "information indicating whether or not phase change is performed (information indicating whether or not CDD (CSD) processing is performed)" A602 addressed to the user #1, "information indicating whether or not phase change is performed (information indicating whether or not CDD (CSD) processing is performed)" A602 addressed to the user #2, "information indicating whether or not phase change is performed (information indicating whether or not CDD (CSD) processing is performed)" A602 addressed to the user #3, ... may exist. The "information indicating whether or not phase change is performed (information indicating whether or not CDD (CSD) processing is performed)" A602 need not necessarily be generated for each user.

In FIG. 78, a description has been given of an example in which the control information symbols include both the "information indicating whether or not phase change is performed" A601 and the "information indicating whether or not phase change is performed (information indicating whether or not CDD (CSD) processing is performed)" A602, but a configuration including either of them may be used.

Next, the operation of the reception apparatus will be described.

The configuration and the operation of the reception apparatus have been described in the first embodiment by using FIG. 19, and thus the description given in the first embodiment is omitted here.

The control information decoder 1909 in FIG. 19 obtains the information in FIG. 78 included in an input signal and outputs the control information signal 1901 including the information.

On the basis of the information in FIG. 78 included in the control information signal 1901, the signal processor 1911 demodulates and decodes data symbols, and obtains and outputs the reception data 1912.

As a result of carrying out the embodiment in the above-described manner, the effects described in this specification can be obtained.

Nineteenth Embodiment

In the first to fifteenth embodiments, the first to fourth supplements, and so forth, when both "the phase changer 305B, the phase changer 305A, the phase changer 309A, the phase changer 3801B, and the phase changer 3801A in FIGS. 3, 4, 26, 38, 39, 40, 41, 42, 43, 44, 45, 46, 47, 48, 52, and so forth" and the computation in the weight combiner 303 are considered together, for example, this corresponds to switching of the precoding matrix by i when consideration is given with reference to Expression (37), Expression (42), Expression (49), Expression (51), Expression (64), and Expression (65), for example.

In addition, in a case where Expression (21), Expression (22), Expression (23), Expression (24), Expression (25), Expression (26), Expression (27), and Expression (28) are used in the weight combiner 303, for example, this corresponds to switching of the precoding matrix by i.

This point has been described in the seventeenth embodiment, and FIGS. 76 and 77 illustrate the configurations of the user #p signal processor 102_*p* in FIGS. 1 and 70.

In the present embodiment, a description will be given of switching between perform and not perform change of the precoding matrix in the weight combiner A401 in FIGS. 76 and 77, which is an operation similar to that in the seventeenth embodiment.

FIGS. 76 and 77 described in the seventeenth embodiment correspond to the user #p signal processor 102_*p* in FIGS. 1 and 70. Thus, in the signal processor for each user, selection of performing or not performing change of the precoding matrix is performed by the weight combiner A401. That is, in the user #p signal processor 102_*p* (p is 1 to M) in FIGS. 1 and 70, selection of performing or not performing change of the precoding matrix is performed individually by the weight combiner A401.

For example, it is assumed that the base station or AP transmits modulated signals addressed to the user #p by using the frame configurations in FIGS. 8 and 9. As an example, it is assumed that modulated signals of multiple streams are transmitted.

Figure 79:
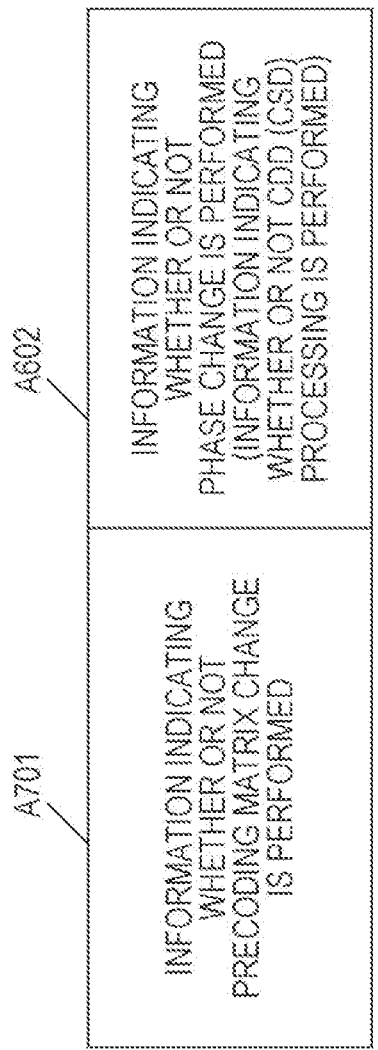

At this time, it is assumed that the control information symbols included in the other symbols 603 and 703 in FIGS. 8 and 9 include "information indicating whether or not precoding matrix change is performed" A701 and/or the "information indicating whether or not phase change is performed (information indicating whether or not CDD (CSD) processing is performed)" A602 illustrated in FIG. 79.

The "information indicating whether or not precoding matrix change is performed" A701 is information indicating "whether or not precoding matrix change is performed in the weight combiner A401 in FIGS. 76 and 77" in the base station or AP. The terminal as the user #p obtains the "information indicating whether or not precoding matrix change is performed" A701, thereby performing demodulation/decoding of the data symbols of the user #p modulated signals transmitted by the base station or AP.

The "information indicating whether or not phase change is performed (information indicating whether or not CDD (CSD) processing is performed)" A602 is information indicating "whether or not phase change has been performed (whether or not CDD (CSD) processing has been performed) in the phase changer 309A and the phase changer 309B in FIGS. 76, 77, and so forth" in the base station or AP. The terminal as the user #p obtains the "information indicating whether or not phase change is performed (information indicating whether or not CDD (CSD) processing is performed)" A602, thereby performing demodulation/decoding of the data symbols of the user #p modulated signals transmitted by the base station or AP.

The "information indicating whether or not precoding matrix change is performed" A701 may be generated for each user. That is, for example, "information indicating whether or not precoding matrix change is performed" A701 addressed to the user #1, "information indicating whether or not precoding matrix change is performed" A701 addressed to the user #2, "information indicating whether or not precoding matrix change is performed" A701 addressed to the user #3, ... may exist. The "information indicating whether or not precoding matrix change is performed" A701 need not necessarily be generated for each user.

Likewise, the "information indicating whether or not phase change is performed (information indicating whether or not CDD (CSD) processing is performed)" A602 may be generated for each user. That is, "information indicating whether or not phase change is performed (information indicating whether or not CDD (CSD) processing is performed)" A602 addressed to the user #1, "information indicating whether or not phase change is performed (information indicating whether or not CDD (CSD) processing is performed)" A602 addressed to the user #2, "information indicating whether or not phase change is performed (information indicating whether or not CDD (CSD) processing is performed)" A602 addressed to the user #3, ... may exist. The "information indicating whether or not phase change is performed (information indicating whether or not CDD (CSD) processing is performed)" A602 need not necessarily be generated for each user.

In FIG. 79, a description has been given of an example in which the control information symbols include both the "information indicating whether or not precoding matrix change is performed" A701 and the "information indicating whether or not phase change is performed (information indicating whether or not CDD (CSD) processing is performed)" A602, but a configuration including either of them may be used.

Next, it is assumed that the base station or AP transmits modulated signals addressed to the user #p by using the frame configurations in FIGS. 10 and 11. As an example, a description will be given of the case of transmitting modulated signals of multiple streams.

At this time, it is assumed that the preambles 1001 and 1101 and the control information symbols 1002 and 1102 in FIGS. 10 and 11 include the "information indicating whether or not precoding matrix change is performed" A701 and/or the "information indicating whether or not phase change is performed (information indicating whether or not CDD (CSD) processing is performed)" A602 illustrated in FIG. 79.

The "information indicating whether or not precoding matrix change is performed" A701 is information indicating "whether or not precoding matrix change is performed in the weight combiner A401 in FIGS. 76 and 77" in the base station or AP. The terminal as the user #p obtains the "information indicating whether or not precoding matrix change is performed" A701, thereby performing demodulation/decoding of the data symbols of the user #p modulated signals transmitted by the base station or AP.

The "information indicating whether or not phase change is performed (information indicating whether or not CDD (CSD) processing is performed)" A602 is information indicating "whether or not phase change has been performed (whether or not CDD (CSD) processing has been performed) in the phase changer 309A and the phase changer 309B in FIGS. 76, 77, and so forth" in the base station or AP. The terminal as the user #p obtains the "information indicating whether or not phase change is performed (information indicating whether or not CDD (CSD) processing is performed)" A602, thereby performing demodulation/decoding of the data symbols of the user #p modulated signals transmitted by the base station or AP.

The "information indicating whether or not precoding matrix change is performed" A701 may be generated for each user. That is, for example, "information indicating whether or not precoding matrix change is performed" A701 addressed to the user #1, "information indicating whether or not precoding matrix change is performed" A701 addressed to the user #2, "information indicating whether or not precoding matrix change is performed" A701 addressed to the user #3, ... may exist. The "information indicating whether or not precoding matrix change is performed" A701 need not necessarily be generated for each user.

Likewise, the "information indicating whether or not phase change is performed (information indicating whether or not CDD (CSD) processing is performed)" A602 may be generated for each user. That is, "information indicating whether or not phase change is performed (information indicating whether or not CDD (CSD) processing is performed)" A602 addressed to the user #1, "information indicating whether or not phase change is performed (information indicating whether or not CDD (CSD) processing is performed)" A602 addressed to the user #2, "information indicating whether or not phase change is performed (information indicating whether or not CDD (CSD) processing is performed)" A602 addressed to the user #3, ... may exist. The "information indicating whether or not phase change is performed (information indicating whether or not CDD (CSD) processing is performed)" A602 need not necessarily be generated for each user.

In FIG. 79, a description has been given of an example in which the control information symbols include both the "information indicating whether or not precoding matrix change is performed" A701 and the "information indicating whether or not phase change is performed (information indicating whether or not CDD (CSD) processing is performed)" A602, but a configuration including either of them may be used.

Next, the operation of the reception apparatus will be described.

The configuration and the operation of the reception apparatus have been described in the first embodiment by using FIG. 19, and thus the description given in the first embodiment is omitted here.

The control information decoder 1909 in FIG. 19 obtains the information in FIG. 79 included in an input signal and outputs the control information signal 1901 including the information.

On the basis of the information in FIG. 79 included in the control information signal 1901, the signal processor 1911 demodulates and decodes data symbols, and obtains and outputs the reception data 1912.

As a result of carrying out the embodiment in the above-described manner, the effects described in this specification can be obtained.

Fifth Supplement

Although not illustrated in FIGS. 3, 4, 26, 38, 39, 75, 76 and so forth, the pilot symbol signal (pa(t)) (351A), the pilot symbol signal (pb(t)) (351B), the preamble signal 352, and the control information symbol signal 353 may be signals that have been subjected to processing such as phase change.

Twentieth Embodiment

In the present embodiment, a description will be given of another method for carrying out the operation of the terminal #p that has been described in the third embodiment, the fifth embodiment, the fifteenth embodiment, and so forth.

The base station or AP has the configuration illustrated in FIG. 22, for example, and receives a signal transmitted by the terminal #p. The configuration in FIG. 22 has already been described, and thus the description thereof is omitted.

FIG. 34 is an example of the configuration of the terminal #p, which is a communication partner of the base station or AP. The description has already been given, and thus the description is omitted.

FIG. 27 illustrates an example of communication between the base station or AP and the terminal #p. The details thereof have been described in the third embodiment, the fifth embodiment, the fifteenth embodiment, and so forth, and thus the description thereof is omitted.

Figure 80:
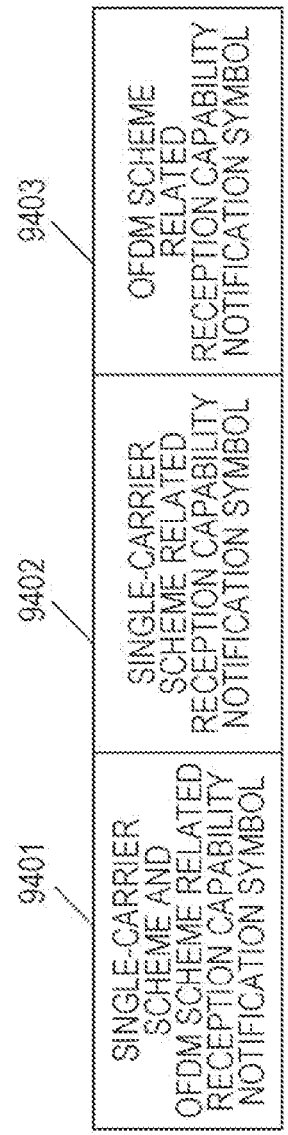
FIG. 80 is a diagram illustrating a specific example configuration of the reception capability notification symbol transmitted by the terminal #p illustrated in FIG. 27.

FIG. 80 illustrates a specific example configuration of the reception capability notification symbol 2702 transmitted by the terminal #p illustrated in FIG. 27.

Before describing FIG. 80, a description will be given of the configuration of the terminal #p that exists as the terminal #p that communicates with the base station or AP.

In the present embodiment, it is assumed that the following types of terminals #p may exist.

Terminal Type #1

It is possible to demodulate a modulated signal of the single-carrier scheme and single-stream transmission.

Terminal Type #2

It is possible to demodulate a modulated signal of the single-carrier scheme and single-stream transmission. Additionally, it is possible to receive and demodulate multiple modulated signals of the single-carrier scheme transmitted by a communication partner by using multiple antennas.

Terminal Type #3

It is possible to demodulate a modulated signal of the single-carrier scheme and single-stream transmission. Furthermore, it is possible to demodulate a modulated signal of the OFDM scheme and single-stream transmission.

Terminal Type #4

It is possible to demodulate a modulated signal of the single-carrier scheme and single-stream transmission. Additionally, it is possible to receive and demodulate multiple modulated signals of the single-carrier scheme transmitted by a communication partner by using multiple antennas. Furthermore, it is possible to demodulate a modulated signal of the OFDM scheme and single-stream transmission. Additionally, it is possible to receive and demodulate multiple modulated signals of the OFDM scheme transmitted by a communication partner by using multiple antennas.

Terminal Type #5

It is possible to demodulate a modulated signal of the OFDM scheme and single-stream transmission.

Terminal Type #6

It is possible to demodulate a modulated signal of the OFDM scheme and single-stream transmission. Additionally, it is possible to receive and demodulate multiple modulated signals of the OFDM scheme transmitted by a communication partner by using multiple antennas.

In the present embodiment, for example, it is assumed that the terminals #p of the terminal type #1 to the terminal type #6 may communicate with the base station or AP. Note that the base station or AP may communicate with the terminal #p of a type different from the terminal type #1 to the terminal type #6.

In view of the above, the reception capability notification symbol in FIG. 80 will be described.

FIG. 80 illustrates an example of a specific configuration of the reception capability notification symbol 2702 transmitted by the terminal #p illustrated in FIG. 27.

As illustrated in FIG. 80, a "single-carrier scheme and OFDM scheme related reception capability notification symbol 9401", a "single-carrier scheme related reception capability notification symbol 9402", and an "OFDM scheme related reception capability notification symbol 9403" constitute a reception capability notification symbol. A reception capability notification symbol other than those illustrated in FIG. 80 may be included.

It is assumed that the "single-carrier scheme and OFDM scheme related reception capability notification symbol 9401" includes data for notifying a communication partner (in this case, for example, the base station or AP) of the reception capability for both a modulated signal of the single-carrier scheme and a modulated signal of the OFDM scheme.

Also, it is assumed that the "single-carrier scheme related reception capability notification symbol 9402" includes data for notifying a communication partner (in this case, for example, the base station or AP) of the reception capability for a modulated signal of the single-carrier scheme.

It is assumed that the "OFDM scheme related reception capability notification symbol 9403" includes data for notifying a communication partner (in this case, for example, the base station or AP) of the reception capability for a modulated signal of the OFDM scheme.

Figure 81:
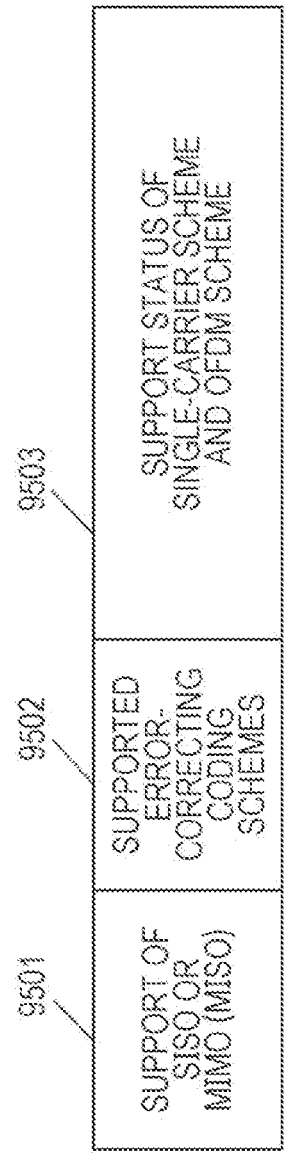
FIG. 81 is a diagram illustrating an example of the configuration of "single-carrier scheme and OFDM scheme related reception capability notification symbol" illustrated in FIG. 80.

FIG. 81 illustrates an example of the configuration of the "single-carrier scheme and OFDM scheme related reception capability notification symbol 9401" illustrated in FIG. 80.

It is assumed that the "single-carrier scheme and OFDM scheme related reception capability notification symbol 9401" illustrated in FIG. 80 includes data 9501 about "support of SISO or MIMO (MISO)", data 9502 about "supported error-correcting coding schemes", and data 9503 about "support status of single-carrier scheme and OFDM scheme" in FIG. 81.

When the data 9501 about "support of SISO or MIMO (MISO)" is g0 and g1, the terminal #p performs the following operation, for example.

For example, it is assumed that, in a case where the communication partner of the terminal #p transmits a modulated signal of a single stream and the terminal #p is able to demodulate the modulated signal, the terminal #p sets g0 = 1 and g1 = 0, and the terminal #p transmits a reception capability notification symbol including g0 and g1.

It is assumed that, in a case where the communication partner of the terminal #p transmits multiple different modulated signals by using multiple antennas and the terminal #p is able to demodulate the modulated signals, the terminal #p sets g0 = 0 and g1 = 1, and the terminal #p transmits a reception capability notification symbol including g0 and g1.

It is assumed that, in a case where the communication partner of the terminal #p transmits a modulated signal of a single stream and the terminal #p is able to demodulate the modulated signal, and in a case where the communication partner of the terminal #p transmits multiple different modulated signals by using multiple antennas and the terminal #p is able to demodulate the modulated signals, the terminal #p sets g0 = 1 and g1 = 1, and the terminal #p transmits a reception capability notification symbol including g0 and g1.

When the data 9502 about "supported error-correcting coding schemes" is g2, the terminal #p performs the following operation, for example.

For example, it is assumed that, in a case where the terminal #p is able to perform error-correcting decoding on data of a first error-correcting coding scheme, the terminal #p sets g2 = 0, and the terminal #p transmits a reception capability notification symbol including g2.

It is assumed that, in a case where the terminal #p is able to perform error-correcting decoding on data of the first error-correcting coding scheme and is able to perform error-correcting decoding on data of a second error-correcting coding scheme, the terminal #p sets g2 = 1, and the terminal #p transmits a reception capability notification symbol including g2.

As another case, it is assumed that each terminal #p is able to perform error-correcting decoding on data of the first error-correcting coding scheme. Furthermore, in a case where the terminal #p is able to perform error-correcting decoding on data of the second error-correcting coding scheme, the terminal #p sets g2 = 1, and in a case where the terminal #p does not support error-correcting decoding on data of the second error-correcting coding scheme, the terminal #p sets g2 = 0. It is assumed that the terminal #p transmits a reception capability notification symbol including g2.

It is assumed that the first error-correcting coding scheme and the second error-correcting coding scheme are different schemes. For example, it is assumed that the block length (code length) of the first error-correcting coding scheme is A bits (A is an integer equal to or greater than 2), the block length (code length) of the second error-correcting coding scheme is B bits (B is an integer equal to or greater than 2), and A≠B holds. However, an example of the different schemes is not limited thereto, and the error-correcting code used in the first error-correcting coding scheme and the error-correcting code used in the second error-correcting coding scheme may be different from each other.

When the data 9503 about "support status of single-carrier scheme and OFDM scheme" is g3 and g4, the terminal #p performs the following operation, for example.

For example, it is assumed that, in a case where the terminal #p is able to demodulate a modulated signal of the single-carrier scheme, the terminal #p sets g3 = 1 and g4 = 0 (in this case, the terminal #p does not support demodulation of a modulated signal of OFDM), and the terminal #p transmits a reception capability notification symbol including g3 and g4.

It is assumed that, in a case where the terminal #p is able to demodulate a modulated signal of the OFDM scheme, the terminal #p sets g3 = 0 and g4 = 1 (in this case, the terminal #p does not support demodulation of a modulated signal of the single-carrier scheme), and the terminal #p transmits a reception capability notification symbol including g3 and g4.

It is assumed that, in a case where the terminal #p is able to demodulate a modulated signal of the single-carrier scheme and is able to demodulate a modulated signal of the OFDM scheme, the terminal #p sets g3 = 1 and g4 = 1, and the terminal #p transmits a reception capability notification symbol including g3 and g4.

Figure 82:
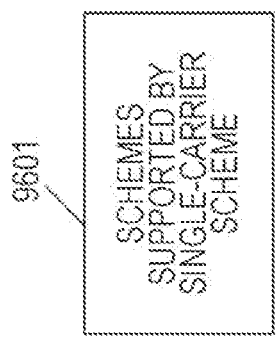
FIG. 82 is a diagram illustrating an example of the configuration of "single-carrier scheme related reception capability notification symbol" illustrated in FIG. 80.

FIG. 82 illustrates an example of the configuration of the "single-carrier scheme related reception capability notification symbol 9402" illustrated in FIG. 80.

It is assumed that the "single-carrier scheme related reception capability notification symbol 9402" illustrated in FIG. 80 includes data 9601 about "schemes supported by single-carrier scheme" in FIG. 82.

When the data 9601 about "schemes supported by single-carrier scheme" is h0 and h1, the terminal #p performs the following operation, for example.

For example, it is assumed that, in a case where the communication partner of the terminal #p transmits a modulated signal by performing channel bonding and the terminal #p is able to demodulate the modulated signal, the terminal #p sets h0 = 1, whereas in a case where the terminal #p does not support demodulation of the modulated signal, the terminal #p sets h0 = 0, and the terminal #p transmits a reception capability notification symbol including h0.

It is assumed that, in a case where the communication partner of the terminal #p transmits a modulated signal by performing channel aggregation and the terminal #p is able to demodulate the modulated signal, the terminal #p sets h1 = 1, whereas in a case where the terminal #p does not support demodulation of the modulated signal, the terminal #p sets h1 = 0, and the terminal #p transmits a reception capability notification symbol including h1.

In a case where the terminal #p sets g3 to 0 and g4 to 1, since the terminal #p does not support demodulation of a modulated signal of the single-carrier scheme, the bit (field) of h0 is an invalid bit (field), and also the bit (field) of h1 is an invalid bit (field).

In a case where the terminal #p sets g3 to 0 and g4 to 1, the above h0 and h1 may be regarded as a reserved (maintained for the future) bit (field) according to the prescription given in advance, or the terminal #p may determine the above h0 and h1 to be an invalid bit (field) (may determine the above h0 or h1 to be an invalid bit (field)), or the base station or AP may obtain the above h0 and h1 and determine h0 and h1 to be an invalid bit (field) (may determine the above h0 or h1 to be an invalid bit (field)).

According to the description given above, there is a case where the terminal #p sets g3 to 0 and g4 to 1, that is, a case where the terminal #p does not support demodulation of a modulated signal of the single-carrier scheme, but an embodiment is possible in which each terminal #p "supports the demodulation of the single-carrier scheme". In this case, the bit (field) of g3 described above is not necessary.

Figure 83:
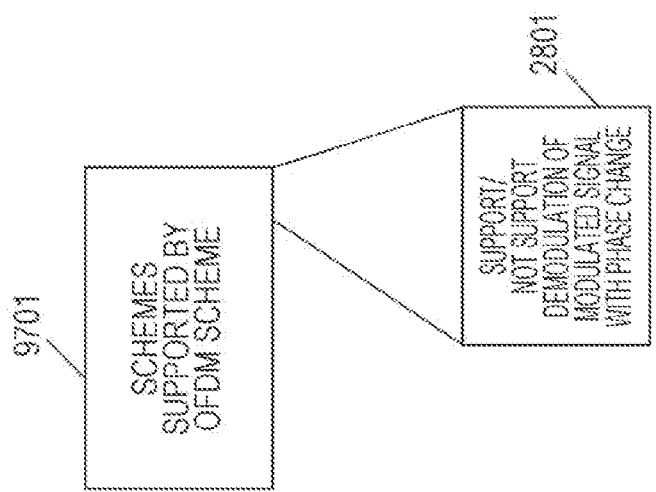
FIG. 83 is a diagram illustrating an example of the configuration of "OFDM scheme related reception capability notification symbol" illustrated in FIG. 80.

FIG. 83 illustrates an example of the configuration of the "OFDM scheme related reception capability notification symbol 9403" illustrated in FIG. 80.

It is assumed that the "OFDM scheme related reception capability notification symbol 9403" illustrated in FIG. 80 includes data 9701 about "schemes supported by OFDM scheme" in FIG. 83.

In addition, it is assumed that the data 9701 about "schemes supported by OFDM scheme" includes the data 2801 about "support/not support demodulation of modulated signal with phase change" illustrated in FIGS. 28, 30, 71, and so forth. The data 2801 about "support/not support demodulation of modulated signal with phase change" has been described in the third embodiment, the fifth embodiment, the fifteenth embodiment, and so forth, and thus the detailed description thereof is omitted.

When the data 2801 about "support/not support demodulation of modulated signal with phase change" is k0, the terminal #p performs the following operation, for example.

For example, assume a case where the communication partner of the terminal #p generates multiple modulated signals by performing phase change processing and transmits the generated multiple modulated signals by using multiple antennas. In this case, it is assumed that, in a case where the terminal #p is able to demodulate the modulated signals, the terminal #p sets k0 = 1, whereas in a case where the terminal #p does not support demodulation of the modulated signals, the terminal #p sets k0 = 0, and the terminal #p transmits a reception capability notification symbol including k0.

In a case where the terminal #p sets g3 to 1 and g4 to 0, since the terminal #p does not support demodulation of a modulated signal of the OFDM scheme, the bit (field) of k0 is an invalid bit (field).

In a case where the terminal #p sets g3 to 1 and g4 to 0, the above k0 may be regarded as a reserved (maintained for the future) bit (field) according to the prescription given in advance, or the terminal #p may determine the above k0 to be an invalid bit (field), or the base station or AP may obtain the above k0 and determine k0 to be an invalid bit (field).

In the description given above, an embodiment is possible in which each terminal #p "supports the demodulation of the single-carrier scheme". In this case, the bit (field) of g3 described above is not necessary.

The base station that has received the reception capability notification symbol transmitted by the terminal #p described above generates and transmits a modulated signal on the basis of the reception capability notification symbol, and accordingly the terminal #p is able to receive a transmission signal that can be demodulated. A specific example of the operation of the base station has been described in embodiments, such as the third embodiment, the fifth embodiment, and the fifteenth embodiment.

With the embodiment being carried out in the above-described manner, the following example characteristics can be obtained.

Characteristic #1

"A first reception apparatus, where
the reception apparatus generates control information indicating a signal receivable by the reception apparatus, the control information including a first region, a second region, a third region, and a fourth region,
the first region is a region storing information indicating whether or not it is possible to receive a signal for transmitting data generated by using a single-carrier scheme and information indicating whether or not it is possible to receive a signal generated by using a multi-carrier scheme,
the second region is a region storing information indicating whether or not it is possible to receive a signal generated by using any one of one or more schemes usable in both or either of a case of generating a signal by using the single-carrier scheme and a case of generating a signal by using the multi-carrier scheme,
the third region is
in a case of storing, in the first region, information indicating that it is possible to receive a signal for transmitting data generated by using the single-carrier scheme, a region storing information indicating whether or not it is possible to receive a signal generated by using any one of one or more schemes usable in a case of generating a signal by using the single-carrier scheme, and
in a case of storing, in the first region, information indicating that it is impossible to receive a signal for transmitting data generated by using the single-carrier scheme, an invalid or reserved region,
the fourth region is
in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and
in a case of storing, in the first region, information indicating that it is impossible to receive a signal for transmitting data generated by using the multi-carrier scheme, an invalid or reserved region, and
the reception apparatus generates a control signal from the control information and transmits the control signal to a transmission apparatus."

"The above-described first reception apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A first transmission apparatus that
receives the control signal from the above-described first reception apparatus,
demodulates the received control signal to obtain the control signal, and
decides, on the basis of the control signal, a scheme to be used to generate a signal to be transmitted to the reception apparatus."

"The above-described first transmission apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

Characteristic #2

"A second reception apparatus, where
the reception apparatus generates control information indicating a signal receivable by the reception apparatus, the control information including a first region, a second region, a third region, and a fourth region,
the first region is a region storing information indicating whether or not it is possible to receive a signal generated by using a multi-carrier scheme,
the second region is a region storing information indicating whether or not it is possible to receive a signal generated by using any one of one or more schemes usable in both or either of a case of generating a signal by using a single-carrier scheme and a case of generating a signal by using the multi-carrier scheme,
the third region is a region storing information indicating whether or not it is possible to receive a signal generated by using any one of one or more schemes usable in a case of generating a signal by using the single-carrier scheme,
the fourth region is
in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and in a case of storing, in the first region, information indicating that it is impossible to receive a signal for transmitting data generated by using the multi-carrier scheme, an invalid or reserved region, and the reception apparatus generates a control signal from the control information and transmits the control signal to a transmission apparatus."

"The above-described second reception apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A second transmission apparatus that receives the control signal from the above-described second reception apparatus, demodulates the received control signal to obtain the control signal, and decides, on the basis of the control signal, a scheme to be used to generate a signal to be transmitted to the reception apparatus."

"The above-described second transmission apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

In the present embodiment, the configuration in FIG. 80 has been described as an example of the configuration of the reception capability notification symbol 2702 in FIG. 27, but the configuration is not limited thereto, and a reception capability notification symbol different from that in FIG. 80 may exist. For example, the configuration in FIG. 84 may be used.

Figure 84:
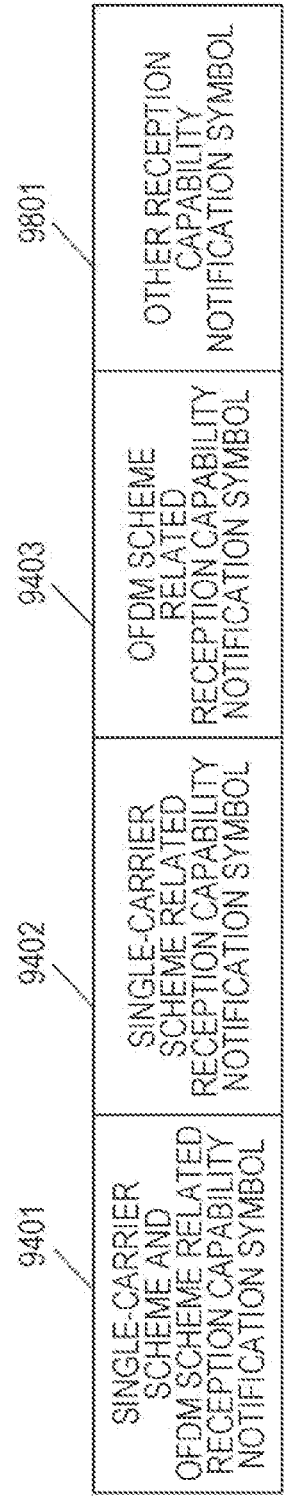
FIG. 84 is a diagram illustrating another example of a specific configuration of the reception capability notification symbol transmitted by the terminal #p illustrated in FIG. 27.

In FIG. 84, the elements that operate similarly to those in FIG. 80 are denoted by the same numerals, and the description thereof is omitted. In FIG. 84, the other reception capability notification symbol 9801 is added as a reception capability notification symbol.

The other reception capability notification symbol 9801 is, for example, a reception capability notification symbol that is not the "single-carrier scheme and OFDM scheme related reception capability notification symbol 9401", that is not the "single-carrier scheme related reception capability notification symbol 9402", and that is not the "OFDM scheme related reception capability notification symbol 9403".

Also with such a reception capability notification symbol, the above-described embodiments can be carried out similarly.

In FIG. 80, a description has been given of an example of the reception capability notification symbol in which the "single-carrier scheme and OFDM scheme related reception capability notification symbol 9401", the "single-carrier scheme related reception capability notification symbol 9402", and the "OFDM scheme related reception capability notification symbol 9403" are arranged in this order, but the reception capability notification symbol is not limited thereto. An example thereof will be described below.

In FIG. 80, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403".

In the case of FIG. 80, it is assumed that bit r1, bit r2, bit r3, bit r4, bit r5, bit r6, bit r7, bit r8, bit r9, bit r10, and bit r11 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, and bit r11" is changed, for example, a bit sequence of "bit r7, bit r2, bit r4, bit r6, bit r1, bit r8, bit r9, bit r5, bit r10, bit r3, and bit r11″ may be located in this order with respect to a frame. The order in the bit sequence is not limited to this example.

In addition, in FIG. 80, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". It is assumed that a "field" is made up of one or more bits.

In the case of FIG. 80, it is assumed that field s1, field s2, field s3, field s4, field s5, field s6, field s7, field s8, field s9, field s10, and field s11 are arranged in order, and are located in this order with respect to a frame, for example.

As another method, a field sequence in which the order of "field s1, field s2, field s3, field s4, field s5, field s6, field s7, field s8, field s9, field s10, and field s11″ is changed, for example, a field sequence of "field s7, field s2, field s4, field s6, field s1, field s8, field s9, field s5, field s10, field s3, and field s11" may be located in this order with respect to a frame. The order in the field sequence is not limited to this example.

In FIG. 84, a description has been given of an example of the reception capability notification symbol in which the "single-carrier scheme and OFDM scheme related reception capability notification symbol 9401", the "single-carrier scheme related reception capability notification symbol 9402", the "OFDM scheme related reception capability notification symbol 9403", and the "other reception capability notification symbol 9801" are arranged in this order, but the reception capability notification symbol is not limited thereto. An example thereof will be described below.

In FIG. 84, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403". Also, it is assumed that bit r12, bit r13, bit r14, and bit r15 exist as the "other reception capability notification symbol 9801".

In the case of FIG. 84, it is assumed that bit r1, bit r2, bit r3, bit r4, bit r5, bit r6, bit r7, bit r8, bit r9, bit r10, bit r11, bit r12, bit r13, bit r14, and bit r15 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, bit r11, bit r12, bit r13, bit r14, and bit r15" is changed, for example, a bit sequence of "bit r7, bit r2, bit r4, bit r6, bit r13, bit r1, bit r8, bit r12, bit r9, bit r5, bit r10, bit r3, bit r15, bit r11, and bit r14" may be located in this order with respect to a frame. The order in the bit sequence is not limited to this example.

In addition, in FIG. 84, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". Also, it is assumed that field s12, field s13, field s14, and field s15 exist as the "other reception capability notification symbol 9801". It is assumed that a "field" is made up of one or more bits.

In the case of FIG. 84, it is assumed that field s1, field s2, field s3, field s4, field s5, field s6, field s7, field s8, field s9, field s10, field s11, field s12, field s13, field s14, and field s15 are arranged in order, and are located in this order with respect to a frame, for example.

As another method, a field sequence in which the order of "field s1, field s2, field s3, field s4, field s5, field s6, field s7, field s8, field s9, field s10, field s11, field s12, field s13, field s14, and field s15" is changed, for example, a field sequence of "field s7, field s2, field s4, field s6, field s13, field s1, field s8, field s12, field s9, field s5, field s10, field s3, field s15, field s11, and field s14" may be located in this order with respect to a frame. The order in the field sequence is not limited to this example.

It is not always explicitly indicated that the information transmitted by the "single-carrier scheme related reception capability notification symbol" is information directed to the single-carrier scheme. The information transmitted by the "single-carrier scheme related reception capability notification symbol" described in the present embodiment is, for example, information for giving a notice about a selectable scheme in a case where the transmission apparatus transmits a signal in the single-carrier scheme. In another example, the information transmitted by the "single-carrier scheme related reception capability notification symbol" described in the present embodiment is, for example, information that is not used (ignored) to select a scheme to be used for transmitting a signal in a case where the transmission apparatus transmits a signal in a scheme other than the single-carrier scheme, such as the OFDM scheme. In still another example, the information transmitted by the "single-carrier scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the single-carrier scheme (notifies the transmission apparatus of non-support). In the above description, the term "single-carrier scheme related reception capability notification symbol 9402" is used, but the term is not limited thereto, and another term may be used. For example, the term "symbol indicating the reception capability of the (first) terminal #p" may be used. In addition, the "single-carrier scheme related reception capability notification symbol 9402" may include information other than information for giving a notice about a receivable signal.

Likewise, it is not always explicitly indicated that the information transmitted by the "OFDM scheme related reception capability notification symbol" is information directed to the OFDM scheme. The information transmitted by the "OFDM scheme related reception capability notification symbol" described in the present embodiment is, for example, information for giving a notice about a selectable scheme in a case where the transmission apparatus transmits a signal in the OFDM scheme. In another example, the information transmitted by the "OFDM scheme related reception capability notification symbol" described in the present embodiment is, for example, information that is not used (ignored) to select a scheme to be used for transmitting a signal in a case where the transmission apparatus transmits a signal in a scheme other than the OFDM scheme, such as the single-carrier scheme. In still another example, the information transmitted by the "OFDM scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the OFDM scheme. In the above description, the term "OFDM scheme related reception capability notification symbol 9403" is used, but the term is not limited thereto, and another term may be used. For example, the term "symbol indicating the reception capability of the (second) terminal #p" may be used. In addition, the "OFDM scheme related reception capability notification symbol 9403" may include information other than information for giving a notice about a receivable signal.

The term "single-carrier scheme and OFDM scheme related reception capability notification symbol 9401" is used, but the term is not limited thereto, and another term may be used. For example, the term "symbol indicating the reception capability of the (third) terminal #p" may be used. In addition, the "single-carrier scheme and OFDM scheme related reception capability notification symbol 9401" may include information other than information for giving a notice about a receivable signal.

As in the present embodiment, the terminal #p forms and transmits a reception capability notification symbol, and the base station receives the reception capability notification symbol, generates a modulated signal by considering the effectiveness of the value thereof, and transmits the modulated signal. Accordingly, the terminal #p is able to receive the modulated signal that can be demodulated, and is thus able to appropriately obtain data and improve the data reception quality. In addition, the terminal #p generates data of each bit (each field) of the reception capability notification symbol while determining the effectiveness of the bit (the field), and is thus able to reliably transmit the reception capability notification symbol to the base station and obtain an effect of improving the communication quality.

Twenty-First Embodiment

In the present embodiment, a supplemental description for the third embodiment, the fifth embodiment, and the fifteenth embodiment will be given.

As illustrated in FIGS. 29 and 30, the terminal #p transmits the data 2901 about "support/not support reception for multiple streams" as a part of the reception capability notification symbol to the base station or AP as a communication partner.

In the third embodiment, the fifth embodiment, the fifteenth embodiment, and so forth, the term "data 2901 about support/not support reception for multiple streams" is used, but the term is not limited thereto, and any reception capability notification symbol can be similarly used as long as "support/not support reception for multiple streams" can be identified. Hereinafter, an example thereof will be described.

For example, the following modulation and coding schemes (MCSs) are considered.

MCS #1

An error-correcting coding scheme #A, a modulation scheme QPSK, and single-stream transmission are used to transmit data symbols. Accordingly, a transmission speed of 10 Mbps (bps: bits per second) can be realized.

MCS #2

The error-correcting coding scheme #A, the modulation scheme 16QAM, and single-stream transmission are used to transmit data symbols. Accordingly, a transmission speed of 20 Mbps can be realized.

MCS #3

An error-correcting coding scheme #B, the modulation scheme QPSK, and single-stream transmission are used to transmit data symbols. Accordingly, a transmission speed of 15 Mbps can be realized.

MCS #4

The error-correcting coding scheme #B, the modulation scheme 16QAM, and single-stream transmission are used to transmit data symbols. Accordingly, a transmission speed of 30 Mbps can be realized.

MCS #5

The error-correcting coding scheme #A, the modulation scheme QPSK, and multi-stream transmission with multiple antennas are used to transmit data symbols. Accordingly, a transmission speed of 20 Mbps (bps: bits per second) can be realized.

MCS #6

The error-correcting coding scheme #A, the modulation scheme 16QAM, and multi-stream transmission with multiple antennas are used to transmit data symbols. Accordingly, a transmission speed of 40 Mbps can be realized.

MCS #7

The error-correcting coding scheme #B, the modulation scheme QPSK, and multi-stream transmission with multiple antennas are used to transmit data symbols. Accordingly, a transmission speed of 30 Mbps can be realized.

MCS #8

The error-correcting coding scheme #B, the modulation scheme 16QAM, and multi-stream transmission with multiple antennas are used to transmit data symbols. Accordingly, a transmission speed of 60 Mbps can be realized.

At this time, it is assumed that the terminal #p transmits the reception capability notification symbol to notify the base station or AP as a communication partner that "demodulation of "MCS #1, MCS #2, MCS #3, and MCS #4" can be performed", or "demodulation of "MCS #1, MCS #2, MCS #3, MCS #4, MCS #5, MCS #6, MCS #7, and MCS #8" can be performed". In this case, the communication partner is notified that demodulation of single-stream transmission can be performed, or the communication partner is notified that "demodulation of single-stream transmission can be performed" and "demodulation of multi-stream transmission with multiple antennas can be performed", and a function similar to notification of the data 2901 about "support/not support reception for multiple streams" is realized.

However, in a case where the terminal #p uses the reception capability notification symbol to notify the base station or AP as a communication partner of an MCS set in which the terminal #p supports the demodulation, there is an advantage that the terminal #p is able to notify the base station or AP as a communication partner of the details of the MCS set in which the terminal #p supports the demodulation.

In addition, FIG. 27 illustrates an example of communication between the base station or AP and the terminal #p, but the style of communication between the base station or AP and the terminal #p is not limited to that in FIG. 27. For example, it is important in the present disclosure that the terminal #p transmits the reception capability notification symbol to a communication partner (for example, the base station or AP) in the third embodiment, the fifth embodiment, the fifteenth embodiment, the twentieth embodiment, and so forth. Accordingly, the effects described in the individual embodiments can be obtained. At this time, the communication between the terminal #p and the communication partner of the terminal #p before the terminal #p transmits the reception capability notification symbol to the communication partner is not limited to that in FIG. 27.

Twenty-Second Embodiment

In the present embodiment, a description will be given of another method for carrying out the operation of the terminal #p that has been described in the third embodiment, the fifth embodiment, the fifteenth embodiment, and so forth.

The base station or AP has the configuration illustrated in FIG. 22, for example, and receives a signal transmitted by the terminal #p. The configuration in FIG. 22 has already been described, and thus the description thereof is omitted.

FIG. 34 is an example of the configuration of the terminal #p, which is a communication partner of the base station or AP. The description has already been given, and thus the description is omitted.

FIG. 27 illustrates an example of communication between the base station or AP and the terminal #p. The details thereof have been described in the third embodiment, the fifth embodiment, the fifteenth embodiment, and so forth, and thus the description thereof is omitted.

FIG. 80 illustrates a specific example configuration of the reception capability notification symbol 2702 transmitted by the terminal #p illustrated in FIG. 27.

Before describing FIG. 80, a description will be given of the configuration of the terminal #p that exists as the terminal #p that communicates with the base station or AP.

In the present embodiment, it is assumed that the following types of terminals #p may exist.

Terminal Type #1

It is possible to demodulate a modulated signal of the single-carrier scheme and single-stream transmission.

Terminal Type #2

It is possible to demodulate a modulated signal of the single-carrier scheme and single-stream transmission. Additionally, it is possible to receive and demodulate multiple modulated signals of the single-carrier scheme transmitted by a communication partner by using multiple antennas.

Terminal Type #3

It is possible to demodulate a modulated signal of the single-carrier scheme and single-stream transmission. Furthermore, it is possible to demodulate a modulated signal of the OFDM scheme and single-stream transmission.

Terminal Type #4

It is possible to demodulate a modulated signal of the single-carrier scheme and single-stream transmission. Additionally, it is possible to receive and demodulate multiple modulated signals of the single-carrier scheme transmitted by a communication partner by using multiple antennas. Furthermore, it is possible to demodulate a modulated signal of the OFDM scheme and single-stream transmission. Additionally, it is possible to receive and demodulate multiple modulated signals of the OFDM scheme transmitted by a communication partner by using multiple antennas.

Terminal Type #5

It is possible to demodulate a modulated signal of the OFDM scheme and single-stream transmission.

Terminal Type #6

It is possible to demodulate a modulated signal of the OFDM scheme and single-stream transmission. Additionally, it is possible to receive and demodulate multiple modulated signals of the OFDM scheme transmitted by a communication partner by using multiple antennas.

In the present embodiment, for example, it is assumed that the terminals #p of the terminal type #1 to the terminal type #6 may communicate with the base station or AP. Note that the base station or AP may communicate with the terminal #p of a type different from the terminal type #1 to the terminal type #6.

In view of the above, the reception capability notification symbol in FIG. 80 will be described.

FIG. 80 illustrates an example of a specific configuration of the reception capability notification symbol 2702 transmitted by the terminal #p illustrated in FIG. 27.

As illustrated in FIG. 80, the "single-carrier scheme and OFDM scheme related reception capability notification symbol 9401", the "single-carrier scheme related reception capability notification symbol 9402", and the "OFDM scheme related reception capability notification symbol 9403" constitute a reception capability notification symbol. A reception capability notification symbol other than those illustrated in FIG. 80 may be included.

It is assumed that the "single-carrier scheme and OFDM scheme related reception capability notification symbol 9401" includes data for notifying a communication partner (in this case, for example, the base station or AP) of the reception capability for both a modulated signal of the single-carrier scheme and a modulated signal of the OFDM scheme.

Also, it is assumed that the "single-carrier scheme related reception capability notification symbol 9402" includes data for notifying a communication partner (in this case, for example, the base station or AP) of the reception capability for a modulated signal of the single-carrier scheme.

It is assumed that the "OFDM scheme related reception capability notification symbol 9403" includes data for notifying a communication partner (in this case, for example, the base station or AP) of the reception capability for a modulated signal of the OFDM scheme.

FIG. 81 illustrates an example of the configuration of the "single-carrier scheme and OFDM scheme related reception capability notification symbol 9401" illustrated in FIG. 80.

It is assumed that the "single-carrier scheme and OFDM scheme related reception capability notification symbol 9401" illustrated in FIG. 80 includes the data 9501 about "support of SISO or MIMO (MISO)", the data 9502 about "supported error-correcting coding schemes", and the data 9503 about "support status of single-carrier scheme and OFDM scheme" in FIG. 81.

When the data 9501 about "support of SISO or MIMO (MISO)" is g0 and g1, the terminal #p performs the following operation, for example.

For example, it is assumed that, in a case where the communication partner of the terminal #p transmits a modulated signal of a single stream and the terminal #p is able to demodulate the modulated signal, the terminal #p sets g0 = 1 and g1 = 0, and the terminal #p transmits a reception capability notification symbol including g0 and g1.

It is assumed that, in a case where the communication partner of the terminal #p transmits multiple different modulated signals by using multiple antennas and the terminal #p is able to demodulate the modulated signals, the terminal #p sets g0 = 0 and g1 = 1, and the terminal #p transmits a reception capability notification symbol including g0 and g1.

It is assumed that, in a case where the communication partner of the terminal #p transmits a modulated signal of a single stream and the terminal #p is able to demodulate the modulated signal, and in a case where the communication partner of the terminal #p transmits multiple different modulated signals by using multiple antennas and the terminal #p is able to demodulate the modulated signals, the terminal #p sets g0 = 1 and g1 = 1, and the terminal #p transmits a reception capability notification symbol including g0 and g1.

When the data 9502 about "supported error-correcting coding schemes" is g2, the terminal #p performs the following operation, for example.

For example, it is assumed that, in a case where the terminal #p is able to perform error-correcting decoding on data of a first error-correcting coding scheme, the terminal #p sets g2 = 0, and the terminal #p transmits a reception capability notification symbol including g2.

It is assumed that, in a case where the terminal #p is able to perform error-correcting decoding on data of the first error-correcting coding scheme and is able to perform error-correcting decoding on data of a second error-correcting coding scheme, the terminal #p sets g2 = 1, and the terminal #p transmits a reception capability notification symbol including g2.

As another case, it is assumed that each terminal #p is able to perform error-correcting decoding on data of the first error-correcting coding scheme. Furthermore, in a case where the terminal #p is able to perform error-correcting decoding on data of the second error-correcting coding scheme, the terminal #p sets g2 = 1, and in a case where the terminal #p does not support error-correcting decoding on data of the second error-correcting coding scheme, the terminal #p sets g2 = 0. It is assumed that the terminal #p transmits a reception capability notification symbol including g2.

It is assumed that the first error-correcting coding scheme and the second error-correcting coding scheme are different schemes. For example, it is assumed that the block length (code length) of the first error-correcting coding scheme is A bits (A is an integer equal to or greater than 2), the block length (code length) of the second error-correcting coding scheme is B bits (B is an integer equal to or greater than 2), and A≠B holds. However, an example of the different schemes is not limited thereto, and the error-correcting code used in the first error-correcting coding scheme and the error-correcting code used in the second error-correcting coding scheme may be different from each other.

When the data 9503 about "support status of single-carrier scheme and OFDM scheme" is g3 and g4, the terminal #p performs the following operation, for example.

For example, it is assumed that, in a case where the terminal #p is able to demodulate a modulated signal of the single-carrier scheme, the terminal #p sets g3 = 1 and g4 = 0 (in this case, the terminal #p does not support demodulation of a modulated signal of OFDM), and the terminal #p transmits a reception capability notification symbol including g3 and g4.

It is assumed that, in a case where the terminal #p is able to demodulate a modulated signal of the OFDM scheme, the terminal #p sets g3 = 0 and g4 = 1 (in this case, the terminal #p does not support demodulation of a modulated signal of the single-carrier scheme), and the terminal #p transmits a reception capability notification symbol including g3 and g4.

It is assumed that, in a case where the terminal #p is able to demodulate a modulated signal of the single-carrier scheme and is able to demodulate a modulated signal of the OFDM scheme, the terminal #p sets g3 = 1 and g4 = 1, and the terminal #p transmits a reception capability notification symbol including g3 and g4.

FIG. 82 illustrates an example of the configuration of the "single-carrier scheme related reception capability notification symbol 9402" illustrated in FIG. 80.

It is assumed that the "single-carrier scheme related reception capability notification symbol 9402" illustrated in FIG. 80 includes the data 9601 about "schemes supported by single-carrier scheme" in FIG. 82.

When the data 9601 about "schemes supported by single-carrier scheme" is h0 and h1, the terminal #p performs the following operation, for example.

For example, it is assumed that, in a case where the communication partner of the terminal #p transmits a modulated signal by performing channel bonding and the terminal #p is able to demodulate the modulated signal, the terminal #p sets h0 = 1, whereas in a case where the terminal #p does not support demodulation of the modulated signal, the terminal #p sets h0 = 0, and the terminal #p transmits a reception capability notification symbol including h0.

It is assumed that, in a case where the communication partner of the terminal #p transmits a modulated signal by performing channel aggregation and the terminal #p is able to demodulate the modulated signal, the terminal #p sets h1 = 1, whereas in a case where the terminal #p does not support demodulation of the modulated signal, the terminal #p sets h1 = 0, and the terminal #p transmits a reception capability notification symbol including h1.

In a case where the terminal #p sets g3 to 0 and g4 to 1, since the terminal #p does not support demodulation of a modulated signal of the single-carrier scheme, the bit (field) of h0 is an invalid bit (field), and also the bit (field) of h1 is an invalid bit (field).

In a case where the terminal #p sets g3 to 0 and g4 to 1, the above h0 and h1 may be regarded as a reserved (maintained for the future) bit (field) according to the prescription given in advance, or the terminal #p may determine the above h0 and h1 to be an invalid bit (field) (may determine the above h0 or h1 to be an invalid bit (field)), or the base station or AP may obtain the above h0 and h1 and determine h0 and h1 to be an invalid bit (field) (may determine the above h0 or h1 to be an invalid bit (field)).

According to the description given above, there is a case where the terminal #p sets g3 to 0 and g4 to 1, that is, a case where the terminal #p does not support demodulation of a modulated signal of the single-carrier scheme, but an embodiment is possible in which each terminal #p "supports the demodulation of the single-carrier scheme". In this case, the bit (field) of g3 described above is not necessary.

Figure 85:
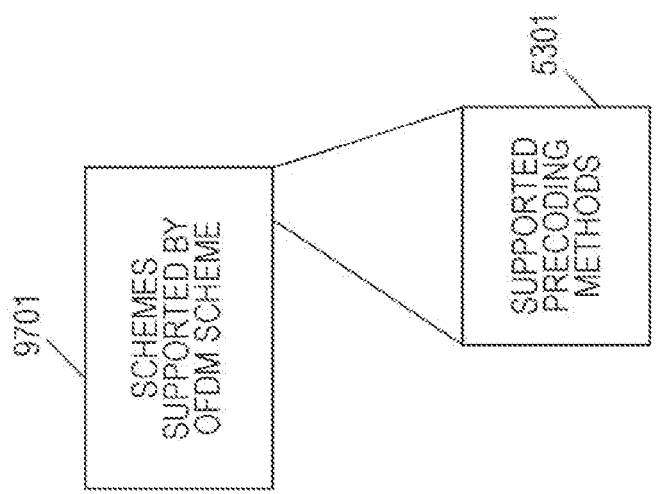
FIG. 85 is a diagram illustrating an example of the configuration of "OFDM scheme related reception capability notification symbol" illustrated in FIG. 80.

FIG. 85 illustrates an example of the configuration of the "OFDM scheme related reception capability notification symbol 9403" illustrated in FIG. 80.

It is assumed that the "OFDM scheme related reception capability notification symbol 9403" illustrated in FIG. 80 includes the data 9701 about "schemes supported by OFDM scheme" in FIG. 85.

In addition, it is assumed that the data 9701 about "schemes supported by OFDM scheme" includes the data 5301 about "supported precoding methods" illustrated in FIG. 71 and so forth. The data 5301 about "supported precoding methods" has been described in the fifteenth embodiment and so forth, and thus the detailed description thereof is omitted. In the fifteenth embodiment, a description is given using the precoding method #A and the precoding method #B, but the precoding matrix in the precoding method #A is not limited to that using the precoding matrix described in the fifteenth embodiment, and a precoding matrix described in this specification may be applied, for example. Also, the precoding matrix in the precoding method #B is not limited to that using the precoding matrix described in the fifteenth embodiment, and a precoding matrix described in this specification may be applied, for example (it is assumed that the precoding method #A and the precoding method #B are different from each other, and, for example, the precoding matrix in the precoding method #A and the precoding matrix in the precoding method #B are different from each other).

The precoding method #A may be a "method of not performing precoding processing", and the precoding method #B may be a "method of not performing precoding processing".

When the data 5301 about "supported precoding methods" is m0, the terminal #p performs the following operation, for example.

For example, assume a case where the communication partner of the terminal #p generates multiple modulated signals by performing precoding processing corresponding to the precoding method #A and transmits the generated multiple modulated signals by using multiple antennas. In this case, it is assumed that, in a case where the terminal #p is able to demodulate the modulated signals, the terminal #p sets m0 = 0, and the terminal #p transmits a reception capability notification symbol including m0.

Also, assume a case where the communication partner of the terminal #p generates multiple modulated signals by performing precoding processing corresponding to the precoding method #B and transmits the generated multiple modulated signals by using multiple antennas. In this case, it is assumed that, in a case where the terminal #p is able to demodulate the modulated signals, the terminal #p sets m0 = 1, and the terminal #p transmits a reception capability notification symbol including m0.

In a case where the terminal #p sets g3 to 1 and g4 to 0, since the terminal #p does not support demodulation of a modulated signal of the OFDM scheme, the bit (field) of m0 is an invalid bit (field).

In a case where the terminal #p sets g3 to 1 and g4 to 0, the above m0 may be regarded as a reserved (maintained for the future) bit (field) according to the prescription given in advance, or the terminal #p may determine the above m0 to be an invalid bit (field), or the base station or AP may obtain the above m0 and determine m0 to be an invalid bit (field).

In the description given above, an embodiment is possible in which each terminal #p "supports the demodulation of the single-carrier scheme". In this case, the bit (field) of g3 described above is not necessary.

The base station that has received the reception capability notification symbol transmitted by the terminal #p described above generates and transmits a modulated signal on the basis of the reception capability notification symbol, and accordingly the terminal #p is able to receive a transmission signal that can be demodulated. A specific example of the operation of the base station has been described in embodiments, such as the third embodiment, the fifth embodiment, and the fifteenth embodiment.

An example of the precoding method #A and the precoding method #B will be described. As an example, the case of transmitting two streams is considered. A first mapped signal and a second mapped signal for generating the two streams are represented by s1(i) and s2(i), respectively.

At this time, it is assumed that the precoding method #A is a scheme of not performing precoding (or precoding (weight combining) using Expression (33) or Expression (34)).

Also, for example, it is assumed that the precoding method #B is the following precoding method.

When the modulation scheme for $s1(i)$ is BPSK or $\pi/2$ shift BPSK and the modulation scheme for $s2(i)$ is BPSK or $\pi/2$ shift BPSK, it is assumed that a precoding matrix F is expressed by the following Expression (71).

$$F = \begin{pmatrix} a_b & b_b \\ c_b & d_b \end{pmatrix} \quad \text{Expression (71)}$$

It is assumed that $a_b$, $b_b$, $c_b$, and $d_b$ are expressed by complex numbers (also may be real numbers). It is assumed that $a_b$ is not zero, $b_b$ is not zero, $c_b$ is not zero, and $d_b$ is not zero.

When the modulation scheme for $s1(i)$ is QPSK or $\pi/2$ shift QPSK and the modulation scheme for $s2(i)$ is QPSK or $\pi/2$ shift QPSK, it is assumed that a precoding matrix F is expressed by the following Expression (72).

$$F = \begin{pmatrix} a_q & b_q \\ c_q & d_q \end{pmatrix} \quad \text{Expression (72)}$$

It is assumed that $a_q$, $b_q$, $c_q$, and $d_q$ are expressed by complex numbers (also may be real numbers). It is assumed that $a_q$ is not zero, $b_q$ is not zero, $c_q$ is not zero, and $d_q$ is not zero.

When the modulation scheme for $s1(i)$ is 16QAM or $\pi/2$ shift 16QAM and the modulation scheme for $s2(i)$ is 16QAM or $\pi/2$ shift 16QAM, it is assumed that a precoding matrix F is expressed by the following Expression (73).

$$F = \begin{pmatrix} a_{16} & b_{16} \\ c_{16} & d_{16} \end{pmatrix} \quad \text{Expression (73)}$$

It is assumed that $a_{16}$, $b_{16}$, $c_{16}$, and $d_{16}$ are expressed by complex numbers (also may be real numbers). It is assumed that $a_{16}$ is not zero, $b_{16}$ is not zero, $c_{16}$ is not zero, and $d_{16}$ is not zero.

When the modulation scheme for $s1(i)$ is 64QAM or $\pi/2$ shift 64QAM and the modulation scheme for $s2(i)$ is 64QAM or $\pi/2$ shift 64QAM, it is assumed that a precoding matrix F is expressed by the following Expression (74).

$$F = \begin{pmatrix} a_{64} & b_{64} \\ c_{64} & d_{64} \end{pmatrix}$$ Expression (74)

It is assumed that $a_{64}$, $b_{64}$, $c_{64}$, and $d_{64}$ are expressed by complex numbers (also may be real numbers). It is assumed that $a_{64}$ is not zero, $b_{64}$ is not zero, $c_{64}$ is not zero, and $d_{64}$ is not zero.

In the precoding method #A and the precoding method #B, the set of the modulation scheme for $s1(i)$ and the modulation scheme for $s2(i)$ is not limited to the above-described sets. The modulation scheme for $s1(i)$ and the modulation scheme for $s2(i)$ may be different, for example, "the modulation scheme for $s1(i)$ is BPSK or π/2 shift BPSK and the modulation scheme for $s2(i)$ is QPSK or π/2 shift QPSK" or "the modulation scheme for $s1(i)$ is QPSK or π/2 shift QPSK and the modulation scheme for $s2(i)$ is 16QAM or π/2 shift 16QAM".

Next, the configuration in FIG. 86 will be described as the configuration of the "OFDM scheme related reception capability notification symbol 9403" illustrated in FIG. 80, different from FIG. 85.

Figure 86:
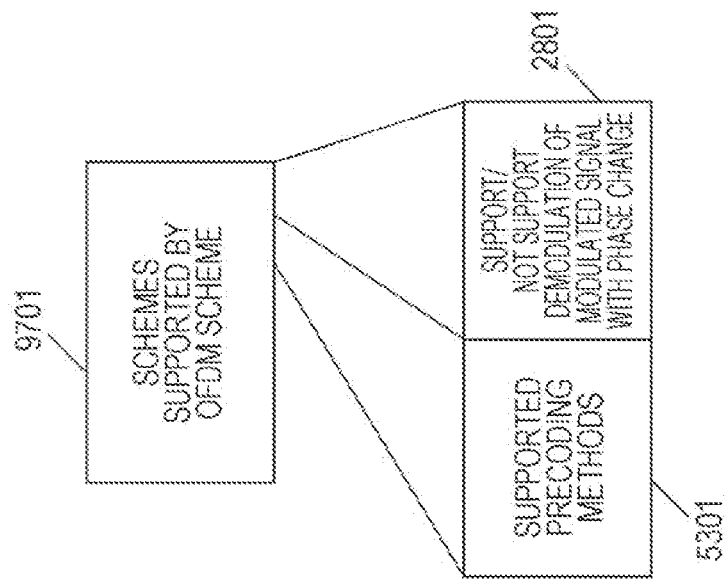
FIG. 86 is a diagram illustrating an example of the configuration of "OFDM scheme related reception capability notification symbol" illustrated in FIG. 80.

It is assumed that the "OFDM scheme related reception capability notification symbol 9403" illustrated in FIG. 80 includes the data 9701 about "schemes supported by OFDM scheme" in FIG. 86.

In addition, it is assumed that the data 9701 about "schemes supported by OFDM scheme" includes the data 5301 about "supported precoding methods" illustrated in FIG. 71 and so forth. The data 5301 about "supported precoding methods" has been described in the fifteenth embodiment and so forth, and thus the detailed description thereof is omitted. In the fifteenth embodiment, a description is given using the precoding method #A and the precoding method #B, but the precoding matrix in the precoding method #A is not limited to that using the precoding matrix described in the fifteenth embodiment, and a precoding matrix described in this specification may be applied, for example. Also, the precoding matrix in the precoding method #B is not limited to that using the precoding matrix described in the fifteenth embodiment, and a precoding matrix described in this specification may be applied, for example (it is assumed that the precoding method #A and the precoding method #B are different from each other, and, for example, the precoding matrix in the precoding method #A and the precoding matrix in the precoding method #B are different from each other).

The precoding method #A may be a "method of not performing precoding processing", and the precoding method #B may be a "method of not performing precoding processing".

Furthermore, it is assumed that the data 9701 about "schemes supported by OFDM scheme" includes the data 2801 about "support/not support demodulation of modulated signal with phase change" illustrated in FIGS. 28, 30, 71, and so forth. The data 2801 about "support/not support demodulation of modulated signal with phase change" has been described in the third embodiment, the fifth embodiment, the fifteenth embodiment, and so forth, and thus the detailed description is omitted.

When the data 5301 about "supported precoding methods" is m0, the terminal #p performs the following operation, for example.

For example, assume a case where the communication partner of the terminal #p generates multiple modulated signals by performing precoding processing corresponding to the precoding method #A and transmits the generated multiple modulated signals by using multiple antennas. In this case, it is assumed that, in a case where the terminal #p is able to demodulate the modulated signals, the terminal #p sets m0 = 0, and the terminal #p transmits a reception capability notification symbol including m0.

Also, assume a case where the communication partner of the terminal #p generates multiple modulated signals by performing precoding processing corresponding to the precoding method #B and transmits the generated multiple modulated signals by using multiple antennas. In this case, it is assumed that, in a case where the terminal #p is able to demodulate the modulated signals, the terminal #p sets m0 = 1, and the terminal #p transmits a reception capability notification symbol including m0.

In a case where the terminal #p sets g3 to 1 and g4 to 0, since the terminal #p does not support demodulation of a modulated signal of the OFDM scheme, the bit (field) of m0 is an invalid bit (field).

In a case where the terminal #p sets g3 to 1 and g4 to 0, the above m0 may be regarded as a reserved (maintained for the future) bit (field) according to the prescription given in advance, or the terminal #p may determine the above m0 to be an invalid bit (field), or the base station or AP may obtain the above m0 and determine m0 to be an invalid bit (field).

In the description given above, an embodiment is possible in which each terminal #p "supports the demodulation of the single-carrier scheme". In this case, the bit (field) of g3 described above is not necessary.

When the data 2801 about "support/not support demodulation of modulated signal with phase change" is m1, the terminal #p performs the following operation, for example.

For example, assume a case where the communication partner of the terminal #p generates multiple modulated signals by performing phase change processing and transmits the generated multiple modulated signals by using multiple antennas. In this case, it is assumed that, in a case where the terminal #p is able to demodulate the modulated signals, the terminal #p sets m1 = 1, whereas in a case where the terminal #p does not support demodulation of the modulated signals, the terminal #p sets m1 = 0, and the terminal #p transmits a reception capability notification symbol including m1.

In a case where the terminal #p sets g3 to 1 and g4 to 0, since the terminal #p does not support demodulation of a modulated signal of the OFDM scheme, the bit (field) of m1 is an invalid bit (field).

In a case where the terminal #p sets g3 to 1 and g4 to 0, the above m1 may be regarded as a reserved (maintained for the future) bit (field) according to the prescription given in advance, or the terminal #p may determine the above m1 to be an invalid bit (field), or the base station or AP may obtain the above m1 and determine m1 to be an invalid bit (field).

In the description given above, an embodiment is possible in which each terminal #p "supports the demodulation of the single-carrier scheme". In this case, the bit (field) of g3 described above is not necessary.

In the example in FIG. 86, a supported precoding method in the data 5301 about "supported precoding methods" may be a precoding method when perform/not perform phase change can be set in the data 2801 about "support/not support demodulation of modulated signal with phase change". Alternatively, a supported precoding method in the data 5301 about "supported precoding methods" does not depend on the setting of perform/not perform phase change, and the precoding method may be set.

With the embodiment being carried out in the above-described manner, the following example characteristics can be obtained.

Characteristic #1

"A first reception apparatus, where the reception apparatus generates control information indicating a signal receivable by the reception apparatus, the control information including a first region, a second region, a third region, and a fourth region, the first region is a region storing information indicating whether or not it is possible to receive a signal for transmitting data generated by using a single-carrier scheme and information indicating whether or not it is possible to receive a signal generated by using a multi-carrier scheme, the second region is a region storing information indicating whether or not it is possible to receive a signal generated by using any one of one or more schemes usable in both or either of a case of generating a signal by using the single-carrier scheme and a case of generating a signal by using the multi-carrier scheme, the third region is in a case of storing, in the first region, information indicating that it is possible to receive a signal for transmitting data generated by using the single-carrier scheme, a region storing information indicating whether or not it is possible to receive a signal generated by using any one of one or more schemes usable in a case of generating a signal by using the single-carrier scheme, and in a case of storing, in the first region, information indicating that it is impossible to receive a signal for transmitting data generated by using the single-carrier scheme, an invalid or reserved region, the fourth region is in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and in a case of storing, in the first region, information indicating that it is impossible to receive a signal for transmitting data generated by using the multi-carrier scheme, an invalid or reserved region, and the reception apparatus generates a control signal from the control information and transmits the control signal to a transmission apparatus."

"The above-described first reception apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A first transmission apparatus that receives the control signal from the above-described first reception apparatus, demodulates the received control signal to obtain the control signal, and decides, on the basis of the control signal, a scheme to be used to generate a signal to be transmitted to the reception apparatus."

"The above-described first transmission apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

Characteristic #2

"A second reception apparatus, where the reception apparatus generates control information indicating a signal receivable by the reception apparatus, the control information including a first region, a second region, a third region, and a fourth region, the first region is a region storing information indicating whether or not it is possible to receive a signal generated by using a multi-carrier scheme, the second region is a region storing information indicating whether or not it is possible to receive a signal generated by using any one of one or more schemes usable in both or either of a case of generating a signal by using a single-carrier scheme and a case of generating a signal by using the multi-carrier scheme, the third region is a region storing information indicating whether or not it is possible to receive a signal generated by using any one of one or more schemes usable in a case of generating a signal by using the single-carrier scheme, the fourth region is in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and in a case of storing, in the first region, information indicating that it is impossible to receive a signal for transmitting data generated by using the multi-carrier scheme, an invalid or reserved region, and the reception apparatus generates a control signal from the control information and transmits the control signal to a transmission apparatus."

"The above-described second reception apparatus, where
the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A second transmission apparatus that
receives the control signal from the above-described second reception apparatus, demodulates the received control signal to obtain the control signal, and decides, on the basis of the control signal, a scheme to be used to generate a signal to be transmitted to the reception apparatus."

"The above-described second transmission apparatus, where
the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

In the present embodiment, the configuration in FIG. 80 has been described as an example of the configuration of the reception capability notification symbol 2702 in FIG. 27, but the configuration is not limited thereto, and a reception capability notification symbol different from that in FIG. 80 may exist. For example, the configuration in FIG. 84 may be used.

In FIG. 84, the elements that operate similarly to those in FIG. 80 are denoted by the same numerals, and the description thereof is omitted. In FIG. 84, the other reception capability notification symbol 9801 is added as a reception capability notification symbol.

The other reception capability notification symbol 9801 is, for example, a reception capability notification symbol that is not the "single-carrier scheme and OFDM scheme related reception capability notification symbol 9401", that is not the "single-carrier scheme related reception capability notification symbol 9402", and that is not the "OFDM scheme related reception capability notification symbol 9403".

Also with such a reception capability notification symbol, the above-described embodiments can be carried out similarly.

In FIG. 80, a description has been given of an example of the reception capability notification symbol in which the "single-carrier scheme and OFDM scheme related reception capability notification symbol 9401", the "single-carrier scheme related reception capability notification symbol 9402", and the "OFDM scheme related reception capability notification symbol 9403" are arranged in this order, but the reception capability notification symbol is not limited thereto. An example thereof will be described below.

In FIG. 80, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403".

In the case of FIG. 80, it is assumed that bit r1, bit r2, bit r3, bit r4, bit r5, bit r6, bit r7, bit r8, bit r9, bit r10, and bit r11 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, and bit r11" is changed, for example, a bit sequence of "bit r7, bit r2, bit r4, bit r6, bit r1, bit r8, bit r9, bit r5, bit r10, bit r3, and bit r11" may be located in this order with respect to a frame. The order in the bit sequence is not limited to this example.

In addition, in FIG. 80, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". It is assumed that a "field" is made up of one or more bits.

In the case of FIG. 80, it is assumed that field s1, field s2, field s3, field s4, field s5, field s6, field s7, field s8, field s9, field s10, and field s11 are arranged in order, and are located in this order with respect to a frame, for example.

As another method, a field sequence in which the order of "field s1, field s2, field s3, field s4, field s5, field s6, field s7, field s8, field s9, field s10, and field s11" is changed, for example, a field sequence of "field s7, field s2, field s4, field s6, field s1, field s8, field s9, field s5, field s10, field s3, and field s11" may be located in this order with respect to a frame. The order in the field sequence is not limited to this example.

In FIG. 84, a description has been given of an example of the reception capability notification symbol in which the "single-carrier scheme and OFDM scheme related reception capability notification symbol 9401", the "single-carrier scheme related reception capability notification symbol 9402", the "OFDM scheme related reception capability notification symbol 9403", and the "other reception capability notification symbol 9801" are arranged in this order, but the reception capability notification symbol is not limited thereto. An example thereof will be described below.

In FIG. 84, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403". Also, it is assumed that bit r12, bit r13, bit r14, and bit r15 exist as the "other reception capability notification symbol 9801".

In the case of FIG. 84, it is assumed that bit r1, bit r2, bit r3, bit r4, bit r5, bit r6, bit r7, bit r8, bit r9, bit r10, bit r11, bit r12, bit r13, bit r14, and bit r15 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, bit r11, bit r12, bit r13, bit r14, and bit r15" is changed, for example, a bit sequence of "bit r7, bit r2, bit r4, bit r6, bit r13, bit r1, bit r8, bit r12, bit r9, bit r5, bit r10, bit r3, bit r15, bit r11, and bit r14" may be located in this order with respect to a frame. The order in the bit sequence is not limited to this example.

In addition, in FIG. 84, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". Also, it is assumed that field s12, field s13, field s14, and field s15 exist as the "other reception capability notification symbol 9801". It is assumed that a "field" is made up of one or more bits.

In the case of FIG. 84, it is assumed that field s1, field s2, field s3, field s4, field s5, field s6, field s7, field s8, field s9, field s10, field s11, field s12, field s13, field s14, and field s15 are arranged in order, and are located in this order with respect to a frame, for example.

As another method, a field sequence in which the order of "field s1, field s2, field s3, field s4, field s5, field s6, field s7, field s8, field s9, field s10, field s11, field s12, field s13, field s14, and field s15" is changed, for example, a field sequence of "field s7, field s2, field s4, field s6, field s13, field s1, field s8, field s12, field s9, field s5, field s10, field s3, field s15, field s11, and field s14" may be located in this order with respect to a frame. The order in the field sequence is not limited to this example.

It is not always explicitly indicated that the information transmitted by the "single-carrier scheme related reception capability notification symbol" is information directed to the single-carrier scheme. The information transmitted by the "single-carrier scheme related reception capability notification symbol" described in the present embodiment is, for example, information for giving a notice about a selectable scheme in a case where the transmission apparatus transmits a signal in the single-carrier scheme. In another example, the information transmitted by the "single-carrier scheme related reception capability notification symbol" described in the present embodiment is, for example, information that is not used (ignored) to select a scheme to be used for transmitting a signal in a case where the transmission apparatus transmits a signal in a scheme other than the single-carrier scheme, such as the OFDM scheme. In still another example, the information transmitted by the "single-carrier scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the single-carrier scheme (notifies the transmission apparatus of non-support). In the above description, the term "single-carrier scheme related reception capability notification symbol 9402" is used, but the term is not limited thereto, and another term may be used. For example, the term "symbol indicating the reception capability of the (first) terminal #p" may be used. In addition, the "single-carrier scheme related reception capability notification symbol 9402" may include information other than information for giving a notice about a receivable signal.

Likewise, it is not always explicitly indicated that the information transmitted by the "OFDM scheme related reception capability notification symbol" is information directed to the OFDM scheme. The information transmitted by the "OFDM scheme related reception capability notification symbol" described in the present embodiment is, for example, information for giving a notice about a selectable scheme in a case where the transmission apparatus transmits a signal in the OFDM scheme. In another example, the information transmitted by the "OFDM scheme related reception capability notification symbol" described in the present embodiment is, for example, information that is not used (ignored) to select a scheme to be used for transmitting a signal in a case where the transmission apparatus transmits a signal in a scheme other than the OFDM scheme, such as the single-carrier scheme. In still another example, the information transmitted by the "OFDM scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the OFDM scheme. In the above description, the term "OFDM scheme related reception capability notification symbol 9403" is used, but the term is not limited thereto, and another term may be used. For example, the term "symbol indicating the reception capability of the (second) terminal #p" may be used. In addition, the "OFDM scheme related reception capability notification symbol 9403" may include information other than information for giving a notice about a receivable signal.

The term "single-carrier scheme and OFDM scheme related reception capability notification symbol 9401" is used, but the term is not limited thereto, and another term may be used. For example, the term "symbol indicating the reception capability of the (third) terminal #p" may be used. In addition, the "single-carrier scheme and OFDM scheme related reception capability notification symbol 9401" may include information other than information for giving a notice about a receivable signal.

As in the present embodiment, the terminal #p forms and transmits a reception capability notification symbol, and the base station receives the reception capability notification symbol, generates a modulated signal by considering the effectiveness of the value thereof, and transmits the modulated signal. Accordingly, the terminal #p is able to receive the modulated signal that can be demodulated, and is thus able to appropriately obtain data and improve the data reception quality. In addition, the terminal #p generates data of each bit (each field) of the reception capability notification symbol while determining the effectiveness of the bit (the field), and is thus able to reliably transmit the reception capability notification symbol to the base station and improve the communication quality.

In the present embodiment, in a case where the base station or AP does not support precoding or does not support switching between the precoding method #A and the precoding method #B (in this case, the base station or AP supports either the precoding method #A or the precoding method #B), the base station or AP transmits a modulated signal without performing precoding (or transmits a modulated signal by using either of the precoding methods) even if the terminal #p supports the precoding method.

In addition, in the present embodiment, a description has been given of a case where there are two types of precoding methods: the precoding method #A and the precoding method #B, in a case where the terminal #p (and the base station or AP) supports precoding methods, but the embodiment is not limited thereto, and N types of precoding methods may be supported (N is an integer equal to or greater than 2).

In the present embodiment, the twentieth embodiment, and so forth, in a case where the base station or AP does not support the transmission of a modulated signal that has been subjected to phase change, the base station or AP transmits a modulated signal without performing phase change even if the terminal #p supports the demodulation of a modulated signal whose phase has been changed.

Twenty-Third Embodiment

In the present embodiment, a description will be given of another method for carrying out the operation of the terminal #p described in the third embodiment, the fifth embodiment, and the fifteenth embodiment.

The present embodiment is an embodiment about a case where the base station or AP performs transmission and reception by using the robust communication method described in the twelfth embodiment.

Regarding the transmission method in the robust communication method described in the twelfth embodiment, a description is given of, as an example, the case where "processing of phase change and weight combining is performed in FIGS. 3, 38, 39, 40, 41, 42, 43, 44, 45, 46, 47, 48, and so forth corresponding to the signal processor 206 in FIG. 2", but phase change need not necessarily be performed by the phase changer 305A, the phase changer 305B, the phase changer 309A, and the phase changer 309B in FIGS. 3, 40, and 41. At this time, an input signal is output as is without being subjected to phase change. For example, (in FIG. 3,) in a case where phase change is not performed by the phase changer 305B, the signal 304B corresponds to the signal 306B. In a case where phase change is not performed by the phase changer 309B, the signal 308B corresponds to the signal 310B. In a case where phase change is not performed by the phase changer 305A, the signal 304A corresponds to the signal 306A. In a case where phase change is not performed by the phase changer 309A, the signal 308A corresponds to the signal 310A.

The phase changer 305A, the phase changer 305B, the phase changer 309A, and the phase changer 309B need not necessarily exist. For example, (in FIG. 3,) in a case where there is not the phase changer 305B, the input 306B to the inserter 307B corresponds to the signal 304B. In a case where there is not the phase changer 309B, the signal 310B corresponds to the signal 308B. In a case where there is not the phase changer 305A, the input 306A to the inserter 307A corresponds to the signal 304A. In a case where there is not the phase changer 309A, the signal 310A corresponds to the signal 308A.

The base station or AP has the configuration illustrated in FIG. 22, for example, and receives a signal transmitted by the terminal #p. The configuration in FIG. 22 has already been described, and thus the description thereof is omitted.

FIG. 34 is an example of the configuration of the terminal #p, which is a communication partner of the base station or AP. The description has already been given, and thus the description is omitted.

FIG. 27 illustrates an example of communication between the base station or AP and the terminal #p. The details thereof have been described in the third embodiment, the fifth embodiment, the fifteenth embodiment, and so forth, and thus the description thereof is omitted.

FIG. 80 illustrates a specific example configuration of the reception capability notification symbol 2702 transmitted by the terminal #p illustrated in FIG. 27.

Before describing FIG. 80, a description will be given of the configuration of the terminal #p that exists as the terminal #p that communicates with the base station or AP.

In the present embodiment, it is assumed that the following types of terminals #p may exist.

Terminal Type #1

It is possible to demodulate a modulated signal of the single-carrier scheme and single-stream transmission.

Terminal Type #2

It is possible to demodulate a modulated signal of the single-carrier scheme and single-stream transmission. Additionally, it is possible to receive and demodulate multiple modulated signals of the single-carrier scheme transmitted by a communication partner by using multiple antennas.

Terminal Type #3

It is possible to demodulate a modulated signal of the single-carrier scheme and single-stream transmission. Furthermore, it is possible to demodulate a modulated signal of the OFDM scheme and single-stream transmission.

Terminal Type #4

It is possible to demodulate a modulated signal of the single-carrier scheme and single-stream transmission. Additionally, it is possible to receive and demodulate multiple modulated signals of the single-carrier scheme transmitted by a communication partner by using multiple antennas. Furthermore, it is possible to demodulate a modulated signal of the OFDM scheme and single-stream transmission. Additionally, it is possible to receive and demodulate multiple modulated signals of the OFDM scheme transmitted by a communication partner by using multiple antennas.

Terminal Type #5

It is possible to demodulate a modulated signal of the OFDM scheme and single-stream transmission.

Terminal Type #6

It is possible to demodulate a modulated signal of the OFDM scheme and single-stream transmission. Additionally, it is possible to receive and demodulate multiple modulated signals of the OFDM scheme transmitted by a communication partner by using multiple antennas.

In the present embodiment, for example, it is assumed that the terminals #p of the terminal type #1 to the terminal type #6 may communicate with the base station or AP. Note that the base station or AP may communicate with the terminal #p of a type different from the terminal type #1 to the terminal type #6.

In view of the above, the reception capability notification symbol in FIG. 80 will be described.

FIG. 80 illustrates an example of a specific configuration of the reception capability notification symbol 2702 transmitted by the terminal #p illustrated in FIG. 27.

As illustrated in FIG. 80, the "single-carrier scheme and OFDM scheme related reception capability notification symbol 9401", the "single-carrier scheme related reception capability notification symbol 9402", and the "OFDM scheme related reception capability notification symbol 9403" constitute a reception capability notification symbol. A reception capability notification symbol other than those illustrated in FIG. 80 may be included.

It is assumed that the "single-carrier scheme and OFDM scheme related reception capability notification symbol 9401" includes data for notifying a communication partner (in this case, for example, the base station or AP) of the reception capability for both a modulated signal of the single-carrier scheme and a modulated signal of the OFDM scheme.

Also, it is assumed that the "single-carrier scheme related reception capability notification symbol 9402" includes data for notifying a communication partner (in this case, for example, the base station or AP) of the reception capability for a modulated signal of the single-carrier scheme.

It is assumed that the "OFDM scheme related reception capability notification symbol 9403" includes data for notifying a communication partner (in this case, for example, the base station or AP) of the reception capability for a modulated signal of the OFDM scheme.

FIG. 81 illustrates an example of the configuration of the "single-carrier scheme and OFDM scheme related reception capability notification symbol 9401" illustrated in FIG. 80.

It is assumed that the "single-carrier scheme and OFDM scheme related reception capability notification symbol 9401" illustrated in FIG. 80 includes the data 9501 about "support of SISO or MIMO (MISO)", the data 9502 about "supported error-correcting coding schemes", and the data 9503 about "support status of single-carrier scheme and OFDM scheme" in FIG. 81.

When the data 9501 about "support of SISO or MIMO (MISO)" is g0 and g1, the terminal #p performs the following operation, for example.

For example, it is assumed that, in a case where the communication partner of the terminal #p transmits a modulated signal of a single stream and the terminal #p is able to demodulate the modulated signal, the terminal #p sets g0 = 1 and g1 = 0, and the terminal #p transmits a reception capability notification symbol including g0 and g1.

It is assumed that, in a case where the communication partner of the terminal #p transmits multiple different modulated signals by using multiple antennas and the terminal #p is able to demodulate the modulated signals, the terminal #p sets g0 = 0 and g1 = 1, and the terminal #p transmits a reception capability notification symbol including g0 and g1.

It is assumed that, in a case where the communication partner of the terminal #p transmits a modulated signal of a single stream and the terminal #p is able to demodulate the modulated signal, and in a case where the communication partner of the terminal #p transmits multiple different modulated signals by using multiple antennas and the terminal #p is able to demodulate the modulated signals, the terminal #p sets g0 = 1 and g1 = 1, and the terminal #p transmits a reception capability notification symbol including g0 and g1.

When the data 9502 about "supported error-correcting coding schemes" is g2, the terminal #p performs the following operation, for example.

For example, it is assumed that, in a case where the terminal #p is able to perform error-correcting decoding on data of a first error-correcting coding scheme, the terminal #p sets g2 = 0, and the terminal #p transmits a reception capability notification symbol including g2.

It is assumed that, in a case where the terminal #p is able to perform error-correcting decoding on data of the first error-correcting coding scheme and is able to perform error-correcting decoding on data of a second error-correcting coding scheme, the terminal #p sets g2 = 1, and the terminal #p transmits a reception capability notification symbol including g2.

As another case, it is assumed that each terminal #p is able to perform error-correcting decoding on data of the first error-correcting coding scheme. Furthermore, in a case where the terminal #p is able to perform error-correcting decoding on data of the second error-correcting coding scheme, the terminal #p sets g2 = 1, and in a case where the terminal #p does not support error-correcting decoding on data of the second error-correcting coding scheme, the terminal #p sets g2 = 0. It is assumed that the terminal #p transmits a reception capability notification symbol including g2.

It is assumed that the first error-correcting coding scheme and the second error-correcting coding scheme are different schemes. For example, it is assumed that the block length (code length) of the first error-correcting coding scheme is A bits (A is an integer equal to or greater than 2), the block length (code length) of the second error-correcting coding scheme is B bits (B is an integer equal to or greater than 2), and A≠B holds. However, an example of the different schemes is not limited thereto, and the error-correcting code used in the first error-correcting coding scheme and the error-correcting code used in the second error-correcting coding scheme may be different from each other.

When the data 9503 about "support status of single-carrier scheme and OFDM scheme" is g3 and g4, the terminal #p performs the following operation, for example.

For example, it is assumed that, in a case where the terminal #p is able to demodulate a modulated signal of the single-carrier scheme, the terminal #p sets g3 = 1 and g4 = 0 (in this case, the terminal #p does not support demodulation of a modulated signal of OFDM), and the terminal #p transmits a reception capability notification symbol including g3 and g4.

It is assumed that, in a case where the terminal #p is able to demodulate a modulated signal of the OFDM scheme, the terminal #p sets g3 = 0 and g4 = 1 (in this case, the terminal #p does not support demodulation of a modulated signal of the single-carrier scheme), and the terminal #p transmits a reception capability notification symbol including g3 and g4.

It is assumed that, in a case where the terminal #p is able to demodulate a modulated signal of the single-carrier scheme and is able to demodulate a modulated signal of the OFDM scheme, the terminal #p sets g3 = 1 and g4 = 1, and the terminal #p transmits a reception capability notification symbol including g3 and g4.

FIG. 82 illustrates an example of the configuration of the "single-carrier scheme related reception capability notification symbol 9402" illustrated in FIG. 80.

It is assumed that the "single-carrier scheme related reception capability notification symbol 9402" illustrated in FIG. 80 includes the data 9601 about "schemes supported by single-carrier scheme" in FIG. 82.

When the data 9601 about "schemes supported by single-carrier scheme" is h0 and h1, the terminal #p performs the following operation, for example.

For example, it is assumed that, in a case where the communication partner of the terminal #p transmits a modulated signal by performing channel bonding and the terminal #p is able to demodulate the modulated signal, the terminal #p sets h0 = 1, whereas in a case where the terminal #p does not support demodulation of the modulated signal, the terminal #p sets h0 = 0, and the terminal #p transmits a reception capability notification symbol including h0.

It is assumed that, in a case where the communication partner of the terminal #p transmits a modulated signal by performing channel aggregation and the terminal #p is able to demodulate the modulated signal, the terminal #p sets h1 = 1, whereas in a case where the terminal #p does not support demodulation of the modulated signal, the terminal #p sets h1 = 0, and the terminal #p transmits a reception capability notification symbol including h1.

In a case where the terminal #p sets g3 to 0 and g4 to 1, since the terminal #p does not support demodulation of a modulated signal of the single-carrier scheme, the bit (field) of h0 is an invalid bit (field), and also the bit (field) of h1 is an invalid bit (field).

In a case where the terminal #p sets g3 to 0 and g4 to 1, the above h0 and h1 may be regarded as a reserved (maintained for the future) bit (field) according to the prescription given in advance, or the terminal #p may determine the above h0 and h1 to be an invalid bit (field) (may determine the above h0 or h1 to be an invalid bit (field)), or the base station or AP may obtain the above h0 and h1 and determine h0 and h1 to be an invalid bit (field) (may determine the above h0 or h1 to be an invalid bit (field)).

According to the description given above, there is a case where the terminal #p sets g3 to 0 and g4 to 1, that is, a case where the terminal #p does not support demodulation of a modulated signal of the single-carrier scheme, but an embodiment is possible in which each terminal #p "supports the demodulation of the single-carrier scheme". In this case, the bit (field) of g3 described above is not necessary.

Figure 87:
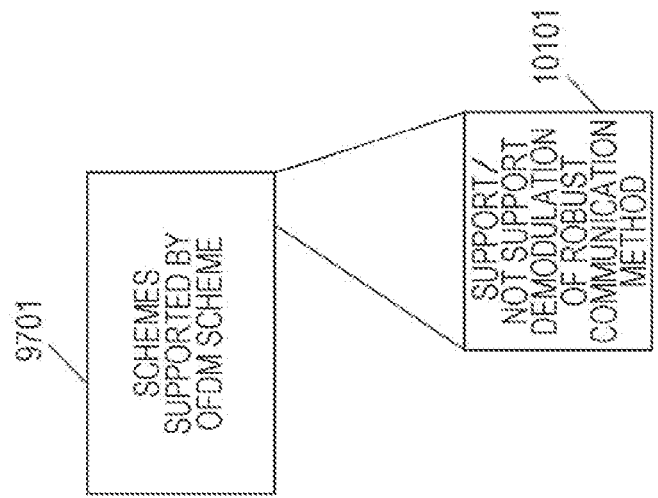
FIG. 87 is a diagram illustrating an example of the configuration of "OFDM scheme related reception capability notification symbol" illustrated in FIG. 80.

FIG. 87 illustrates an example of the configuration of the "OFDM scheme related reception capability notification symbol 9403" illustrated in FIG. 80.

It is assumed that the "OFDM scheme related reception capability notification symbol 9403" illustrated in FIG. 80 includes the data 9701 about "schemes supported by OFDM scheme" in FIG. 87.

In addition, it is assumed that the data 9701 about "schemes supported by OFDM scheme" includes data 10101 about "support/not support demodulation of robust communication method (in twelfth embodiment)".

In a case where the base station or AP as a communication partner transmits a modulated signal in the communication method described in the twelfth embodiment and the present embodiment and the terminal #p is able to demodulate the modulated signal, the terminal #p embeds data indicating "support demodulation" in the data 10101 about "support/not support demodulation of robust communication method (in twelfth embodiment)" and transmits the data.

On the other hand, in a case where the base station or AP as a communication partner transmits a modulated signal in the communication method described in the twelfth embodiment and the present embodiment and the terminal #p does not support demodulation of the modulated signal, the terminal #p embeds data indicating "not support demodulation" in the data 10101 about "support/not support demodulation of robust communication method (in twelfth embodiment)" and transmits the data.

For example, when the data 10101 about "support/not support demodulation of robust communication method (in twelfth embodiment)" is n0, the terminal #p performs the following operation, for example.

It is assumes that, in a case where the terminal #p "does not support demodulation" described above, the terminal #p sets n0 = 0, and the terminal #p transmits a reception capability notification symbol including n0.

Also, it is assumed that, in a case where the terminal #p "supports demodulation (is able to perform demodulation)" described above, the terminal #p sets n0 = 1, and the terminal #p transmits a reception capability notification symbol including n0.

In a case where the terminal #p sets g3 to 1 and g4 to 0, since the terminal #p does not support demodulation of a modulated signal of the OFDM scheme, the bit (field) of n0 is an invalid bit (field).

In a case where the terminal #p sets g3 to 1 and g4 to 0, the above n0 may be regarded as a reserved (maintained for the future) bit (field) according to the prescription given in advance, or the terminal #p may determine the above n0 to be an invalid bit (field), or the base station or AP may obtain the above n0 and determine n0 to be an invalid bit (field).

In the description given above, an embodiment is possible in which each terminal #p "supports the demodulation of the single-carrier scheme". In this case, the bit (field) of g3 described above is not necessary.

The base station that has received the reception capability notification symbol transmitted by the terminal #p described above generates and transmits a modulated signal on the basis of the reception capability notification symbol, and accordingly the terminal #p is able to receive a transmission signal that can be demodulated. A specific example of the operation of the base station has been described in embodiments, such as the third embodiment, the fifth embodiment, and the fifteenth embodiment.

With the embodiment being carried out in the above-described manner, the following example characteristics can be obtained.

Characteristic #1

"A first reception apparatus, where
the reception apparatus generates control information indicating a signal receivable by the reception apparatus, the control information including a first region, a second region, a third region, and a fourth region,
the first region is a region storing information indicating whether or not it is possible to receive a signal for transmitting data generated by using a single-carrier scheme and information indicating whether or not it is possible to receive a signal generated by using a multi-carrier scheme,
the second region is a region storing information indicating whether or not it is possible to receive a signal generated by using any one of one or more schemes usable in both or either of a case of generating a signal by using the single-carrier scheme and a case of generating a signal by using the multi-carrier scheme,
the third region is
in a case of storing, in the first region, information indicating that it is possible to receive a signal for transmitting data generated by using the single-carrier scheme, a region storing information indicating whether or not it is possible to receive a signal generated by using any one of one or more schemes usable in a case of generating a signal by using the single-carrier scheme, and
in a case of storing, in the first region, information indicating that it is impossible to receive a signal for transmitting data generated by using the single-carrier scheme, an invalid or reserved region,
the fourth region is
in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and
in a case of storing, in the first region, information indicating that it is impossible to receive a signal for transmitting data generated by using the multi-carrier scheme, an invalid or reserved region, and
the reception apparatus generates a control signal from the control information and transmits the control signal to a transmission apparatus."

"The above-described first reception apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A first transmission apparatus that
receives the control signal from the above-described first reception apparatus,
demodulates the received control signal to obtain the control signal, and
decides, on the basis of the control signal, a scheme to be used to generate a signal to be transmitted to the reception apparatus."

"The above-described first transmission apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

Characteristic #2

"A second reception apparatus, where
the reception apparatus generates control information indicating a signal receivable by the reception apparatus, the control information including a first region, a second region, a third region, and a fourth region,
the first region is a region storing information indicating whether or not it is possible to receive a signal generated by using a multi-carrier scheme, the second region is a region storing information indicating whether or not it is possible to receive a signal generated by using any one of one or more schemes usable in both or either of a case of generating a signal by using a single-carrier scheme and a case of generating a signal by using the multi-carrier scheme, the third region is a region storing information indicating whether or not it is possible to receive a signal generated by using any one of one or more schemes usable in a case of generating a signal by using the single-carrier scheme, the fourth region is in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and in a case of storing, in the first region, information indicating that it is impossible to receive a signal for transmitting data generated by using the multi-carrier scheme, an invalid or reserved region, and the reception apparatus generates a control signal from the control information and transmits the control signal to a transmission apparatus."

"The above-described second reception apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A second transmission apparatus that receives the control signal from the above-described second reception apparatus, demodulates the received control signal to obtain the control signal, and decides, on the basis of the control signal, a scheme to be used to generate a signal to be transmitted to the reception apparatus."

"The above-described second transmission apparatus, where the second region includes a fifth region storing information indicating whether or not it is possible to receive a signal generated by using the Multiple-Input Multiple-Output (MIMO) scheme, the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

In the present embodiment, the configuration in FIG. 80 has been described as an example of the configuration of the reception capability notification symbol 2702 in FIG. 27, but the configuration is not limited thereto, and a reception capability notification symbol different from that in FIG. 80 may exist. For example, the configuration in FIG. 84 may be used.

In FIG. 84, the elements that operate similarly to those in FIG. 80 are denoted by the same numerals, and the description thereof is omitted. In FIG. 84, the other reception capability notification symbol 9801 is added as a reception capability notification symbol.

The other reception capability notification symbol 9801 is, for example, a reception capability notification symbol that is not the "single-carrier scheme and OFDM scheme related reception capability notification symbol 9401", that is not the "single-carrier scheme related reception capability notification symbol 9402", and that is not the "OFDM scheme related reception capability notification symbol 9403".

Also with such a reception capability notification symbol, the above-described embodiments can be carried out similarly.

In FIG. 80, a description has been given of an example of the reception capability notification symbol in which the "single-carrier scheme and OFDM scheme related reception capability notification symbol 9401", the "single-carrier scheme related reception capability notification symbol 9402", and the "OFDM scheme related reception capability notification symbol 9403" are arranged in this order, but the reception capability notification symbol is not limited thereto. An example thereof will be described below.

In FIG. 80, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403".

In the case of FIG. 80, it is assumed that bit r1, bit r2, bit r3, bit r4, bit r5, bit r6, bit r7, bit r8, bit r9, bit r10, and bit r11 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, and bit r11" is changed, for example, a bit sequence of "bit r7, bit r2, bit r4, bit r6, bit r1, bit r8, bit r9, bit r5, bit r10, bit r3, and bit r11" may be located in this order with respect to a frame. The order in the bit sequence is not limited to this example.

In addition, in FIG. 80, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". It is assumed that a "field" is made up of one or more bits.

In the case of FIG. 80, it is assumed that field s1, field s2, field s3, field s4, field s5, field s6, field s7, field s8, field s9, field s10, and field s11 are arranged in order, and are located in this order with respect to a frame, for example.

As another method, a field sequence in which the order of "field s1, field s2, field s3, field s4, field s5, field s6, field s7, field s8, field s9, field s10, and field s11" is changed, for example, a field sequence of "field s7, field s2, field s4, field s6, field s1, field s8, field s9, field s5, field s10, field s3, and field s11" may be located in this order with respect to a frame. The order in the field sequence is not limited to this example.

In FIG. 84, a description has been given of an example of the reception capability notification symbol in which the "single-carrier scheme and OFDM scheme related reception capability notification symbol 9401", the "single-carrier scheme related reception capability notification symbol 9402", the "OFDM scheme related reception capability notification symbol 9403", and the "other reception capability notification symbol 9801" are arranged in this order, but the reception capability notification symbol is not limited thereto. An example thereof will be described below.

In FIG. 84, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403". Also, it is assumed that bit r12, bit r13, bit r14, and bit r15 exist as the "other reception capability notification symbol 9801".

In the case of FIG. 84, it is assumed that bit r1, bit r2, bit r3, bit r4, bit r5, bit r6, bit r7, bit r8, bit r9, bit r10, bit r11, bit r12, bit r13, bit r14, and bit r15 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, bit r11, bit r12, bit r13, bit r14, and bit r15" is changed, for example, a bit sequence of "bit r7, bit r2, bit r4, bit r6, bit r13, bit r1, bit r8, bit r12, bit r9, bit r5, bit r10, bit r3, bit r15, bit r11, and bit r14" may be located in this order with respect to a frame. The order in the bit sequence is not limited to this example.

In addition, in FIG. 84, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". Also, it is assumed that field s12, field s13, field s14, and field s15 exist as the "other reception capability notification symbol 9801". It is assumed that a "field" is made up of one or more bits.

In the case of FIG. 84, it is assumed that field s1, field s2, field s3, field s4, field s5, field s6, field s7, field s8, field s9, field s10, field s11, field s12, field s13, field s14, and field s15 are arranged in order, and are located in this order with respect to a frame, for example.

As another method, a field sequence in which the order of "field s1, field s2, field s3, field s4, field s5, field s6, field s7, field s8, field s9, field s10, field s11, field s12, field s13, field s14, and field s15" is changed, for example, a field sequence of "field s7, field s2, field s4, field s6, field s13, field s1, field s8, field s12, field s9, field s5, field s10, field s3, field s15, field s11, and field s14" may be located in this order with respect to a frame. The order in the field sequence is not limited to this example.

It is not always explicitly indicated that the information transmitted by the "single-carrier scheme related reception capability notification symbol" is information directed to the single-carrier scheme. The information transmitted by the "single-carrier scheme related reception capability notification symbol" described in the present embodiment is, for example, information for giving a notice about a selectable scheme in a case where the transmission apparatus transmits a signal in the single-carrier scheme. In another example, the information transmitted by the "single-carrier scheme related reception capability notification symbol" described in the present embodiment is, for example, information that is not used (ignored) to select a scheme to be used for transmitting a signal in a case where the transmission apparatus transmits a signal in a scheme other than the single-carrier scheme, such as the OFDM scheme. In still another example, the information transmitted by the "single-carrier scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the single-carrier scheme (notifies the transmission apparatus of non-support). In the above description, the term "single-carrier scheme related reception capability notification symbol 9402" is used, but the term is not limited thereto, and another term may be used. For example, the term "symbol indicating the reception capability of the (first) terminal #p" may be used. In addition, the "single-carrier scheme related reception capability notification symbol 9402" may include information other than information for giving a notice about a receivable signal.

Likewise, it is not always explicitly indicated that the information transmitted by the "OFDM scheme related reception capability notification symbol" is information directed to the OFDM scheme. The information transmitted by the "OFDM scheme related reception capability notification symbol" described in the present embodiment is, for example, information for giving a notice about a selectable scheme in a case where the transmission apparatus transmits a signal in the OFDM scheme. In another example, the information transmitted by the "OFDM scheme related reception capability notification symbol" described in the present embodiment is, for example, information that is not used (ignored) to select a scheme to be used for transmitting a signal in a case where the transmission apparatus transmits a signal in a scheme other than the OFDM scheme, such as the single-carrier scheme. In still another example, the information transmitted by the "OFDM scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the OFDM scheme. In the above description, the term "OFDM scheme related reception capability notification symbol 9403" is used, but the term is not limited thereto, and another term may be used. For example, the term "symbol indicating the reception capability of the (second) terminal #p" may be used. In addition, the "OFDM scheme related reception capability notification symbol 9403" may include information other than information for giving a notice about a receivable signal.

The term "single-carrier scheme and OFDM scheme related reception capability notification symbol 9401" is used, but the term is not limited thereto, and another term may be used. For example, the term "symbol indicating the reception capability of the (third) terminal #p" may be used. In addition, the "single-carrier scheme and OFDM scheme related reception capability notification symbol 9401" may include information other than information for giving a notice about a receivable signal.

As in the present embodiment, the terminal #p forms and transmits a reception capability notification symbol, and the base station receives the reception capability notification symbol, generates a modulated signal by considering the effectiveness of the value thereof, and transmits the modulated signal. Accordingly, the terminal #p is able to receive the modulated signal that can be demodulated, and is thus able to appropriately obtain data and improve the data reception quality. In addition, the terminal #p generates data of each bit (each field) of the reception capability notification symbol while determining the effectiveness of the bit (the field), and is thus able to reliably transmit the reception capability notification symbol to the base station and improve the communication quality.

In the present embodiment, in a case where the base station or AP does not support the transmission of a modulated signal using the robust communication method described in the twelfth embodiment and the present embodiment, the base station or AP does not transmit a modulated signal using the above-described robust communication method even if the terminal #p supports the demodulation of the above-described robust communication method.

Twenty-Fourth Embodiment

In the present embodiment, a description will be given of another method for carrying out the operation of the terminal #p described in the third embodiment, the fifth embodiment, and the fifteenth embodiment.

In the present embodiment, a description will be given of an example in which the base station or AP is able to switch between the case of transmitting a modulated signal of the OFDM scheme and the case of transmitting a modulated signal of the Orthogonal Frequency-Division Multiple Access (OFDMA) scheme, and the terminal #p supports/does not support demodulation of a modulated signal of OFDMA.

First, a description will be given of the case of transmitting a modulated signal of the OFDM scheme and the case of transmitting a modulated signal of the OFDMA scheme.

An example of the frame configuration in a case where the base station or AP transmits a modulated signal of the OFDM scheme may be the frame configuration in FIG. 36. FIG. 36 has been described in the fifth embodiment, for example, and thus the detailed description thereof is omitted. The frame configuration in FIG. 36 is a frame configuration for transmitting a modulated signal of a single stream.

In a case where a modulated signal of the OFDM scheme is being transmitted, a situation does not occur where the terminal #p as the address varies according to a carrier in a certain time interval. Thus, for example, the symbols existing in the frame configuration in FIG. 36 are symbols addressed to a certain terminal #p. For another example, in a case where the base station or AP transmits multiple modulated signals by using multiple antennas, the frame configurations of the modulated signals of the OFDM scheme are "FIGS. 8 and 9". In the case of the frame configurations in "FIGS. 8 and 9", the frames in FIGS. 8 and 9 correspond to the symbols addressed to a certain terminal #p.

A description will be given of a case where the base station or AP transmits a modulated signal of the OFDMA scheme. In a case where a modulated signal of the OFDMA scheme is being transmitted, a situation may occur where the terminal #p as the address varies according to a carrier in a certain time interval.

For example, it is assumed that, in a case where the base station or AP transmits a modulated signal of the OFDM scheme having the frame configuration in FIG. 36, the data symbols 3602 exist from time 5, carrier 1 to carrier 12 from time 5 are the symbols addressed to a terminal #A, carrier 13 to carrier 24 from time 5 are the symbols addressed to a terminal #B, and carrier 25 to carrier 36 from time 5 are the symbols addressed to a terminal #C. However, the relationships between carriers and the terminals #p as addressees are not limited thereto. For example, a method for allocating the symbols in carrier 1 to carrier 36 from time 5 to two or more terminals is conceivable. Also, it is assumed that the other symbols 3603 include information about the relationships between carriers and terminals as addresses. Thus, each terminal #p is able to learn the relationships between carriers and terminals as addresses by obtaining the other symbols 3603, and accordingly each terminal is able to learn the portion in the frame where the symbols addressed to the terminal exist. The frame configuration in FIG. 36 is an example when the base station or AP is transmitting a modulated signal of a single stream, and the frame configuration is not limited to the configuration in FIG. 36.

For another example, a description will be given of a method for configuring a modulated signal of the OFDMA scheme when the base station or AP transmits multiple modulated signals by using multiple antennas. For example, a case where the base station or AP transmits multiple modulated signals having the frame configurations in "FIGS. 8 and 9" by using multiple antennas is considered.

At this time, in FIG. 8, it is assumed that carrier 1 to carrier 12 from time 5 are the symbols addressed to the terminal #A, carrier 13 to carrier 24 from time 5 are the symbols addressed to the terminal #B, and carrier 25 to carrier 36 from time 5 are the symbols addressed to the terminal #C. However, the relationships between carriers and the terminals #p as addressees are not limited thereto. For example, a method for allocating the symbols in carrier 1 to carrier 36 from time 5 to two or more terminals is conceivable. Also, it is assumed that the other symbols 603 include information about the relationships between carriers and terminals as addresses.

Likewise, in FIG. 9, it is assumed that carrier 1 to carrier 12 from time 5 are the symbols addressed to the terminal #A, carrier 13 to carrier 24 from time 5 are the symbols addressed to the terminal #B, and carrier 25 to carrier 36 from time 5 are the symbols addressed to the terminal #C. However, the relationships between carriers and the terminals #p as addressees are not limited thereto. For example, a method for allocating the symbols in carrier 1 to carrier 36 from time 5 to two or more terminals is conceivable. Also, it is assumed that the other symbols 703 include information about the relationships between carriers and terminals as addresses.

Thus, each terminal #p is able to learn the relationships between carriers and terminals as addresses by obtaining the other symbols 603 and/or the other symbols 703, and accordingly each terminal is able to learn the portion in the frame where the symbols addressed to the terminal exist.

The base station or AP has the configuration illustrated in FIG. 22, for example, and receives a signal transmitted by the terminal #p. The configuration in FIG. 22 has already been described, and thus the description thereof is omitted.

FIG. 34 is an example of the configuration of the terminal #p, which is a communication partner of the base station or AP. The description has already been given, and thus the description is omitted.

FIG. 27 illustrates an example of communication between the base station or AP and the terminal #p. The details thereof have been described in the third embodiment, the fifth embodiment, the fifteenth embodiment, and so forth, and thus the description thereof is omitted.

FIG. 80 illustrates a specific example configuration of the reception capability notification symbol 2702 transmitted by the terminal #p illustrated in FIG. 27.

Before describing FIG. 80, a description will be given of the configuration of the terminal #p that exists as the terminal #p that communicates with the base station or AP.

In the present embodiment, it is assumed that the following types of terminals #p may exist.

Terminal Type #1

It is possible to demodulate a modulated signal of the single-carrier scheme and single-stream transmission.

Terminal Type #2

It is possible to demodulate a modulated signal of the single-carrier scheme and single-stream transmission. Additionally, it is possible to receive and demodulate multiple modulated signals of the single-carrier scheme transmitted by a communication partner by using multiple antennas.

Terminal Type #3

It is possible to demodulate a modulated signal of the single-carrier scheme and single-stream transmission. Furthermore, it is possible to demodulate a modulated signal of the OFDM scheme and single-stream transmission.

Terminal Type #4

It is possible to demodulate a modulated signal of the single-carrier scheme and single-stream transmission. Additionally, it is possible to receive and demodulate multiple modulated signals of the single-carrier scheme transmitted by a communication partner by using multiple antennas. Furthermore, it is possible to demodulate a modulated signal of the OFDM scheme and single-stream transmission. Additionally, it is possible to receive and demodulate multiple modulated signals of the OFDM scheme transmitted by a communication partner by using multiple antennas.

Terminal Type #5

It is possible to demodulate a modulated signal of the OFDM scheme and single-stream transmission.

Terminal Type #6

It is possible to demodulate a modulated signal of the OFDM scheme and single-stream transmission. Additionally, it is possible to receive and demodulate multiple modulated signals of the OFDM scheme transmitted by a communication partner by using multiple antennas.

In the present embodime'nt, for example, it is assumed that the terminals #p of the terminal type #1 to the terminal type #6 may communicate with the base station or AP. Note that the base station or AP may communicate with the terminal #p of a type different from the terminal type #1 to the terminal type #6.

In view of the above, the reception capability notification symbol in FIG. 80 will be described.

FIG. 80 illustrates an example of a specific configuration of the reception capability notification symbol 2702 transmitted by the terminal #p illustrated in FIG. 27.

As illustrated in FIG. 80, the "single-carrier scheme and OFDM scheme related reception capability notification symbol 9401", the "single-carrier scheme related reception capability notification symbol 9402", and the "OFDM scheme related reception capability notification symbol 9403" constitute a reception capability notification symbol. A reception capability notification symbol other than those illustrated in FIG. 80 may be included.

It is assumed that the "single-carrier scheme and OFDM scheme related reception capability notification symbol 9401" includes data for notifying a communication partner (in this case, for example, the base station or AP) of the reception capability for both a modulated signal of the single-carrier scheme and a modulated signal of the OFDM scheme.

Also, it is assumed that the "single-carrier scheme related reception capability notification symbol 9402" includes data for notifying a communication partner (in this case, for example, the base station or AP) of the reception capability for a modulated signal of the single-carrier scheme.

It is assumed that the "OFDM scheme related reception capability notification symbol 9403" includes data for notifying a communication partner (in this case, for example, the base station or AP) of the reception capability for a modulated signal of the OFDM scheme.

FIG. 81 illustrates an example of the configuration of the "single-carrier scheme and OFDM scheme related reception capability notification symbol 9401" illustrated in FIG. 80.

It is assumed that the "single-carrier scheme and OFDM scheme related reception capability notification symbol 9401" illustrated in FIG. 80 includes the data 9501 about "support of SISO or MIMO (MISO)", the data 9502 about "supported error-correcting coding schemes", and the data 9503 about "support status of single-carrier scheme and OFDM scheme" in FIG. 81.

When the data 9501 about "support of SISO or MIMO (MISO)" is g0 and g1, the terminal #p performs the following operation, for example.

For example, it is assumed that, in a case where the communication partner of the terminal #p transmits a modulated signal of a single stream and the terminal #p is able to demodulate the modulated signal, the terminal #p sets g0 = 1 and g1 = 0, and the terminal #p transmits a reception capability notification symbol including g0 and g1.

It is assumed that, in a case where the communication partner of the terminal #p transmits multiple different modulated signals by using multiple antennas and the terminal #p is able to demodulate the modulated signals, the terminal #p sets g0 = 0 and g1 = 1, and the terminal #p transmits a reception capability notification symbol including g0 and g1.

It is assumed that, in a case where the communication partner of the terminal #p transmits a modulated signal of a single stream and the terminal #p is able to demodulate the modulated signal, and in a case where the communication partner of the terminal #p transmits multiple different modulated signals by using multiple antennas and the terminal #p is able to demodulate the modulated signals, the terminal #p sets g0 = 1 and g1 = 1, and the terminal #p transmits a reception capability notification symbol including g0 and g1.

When the data 9502 about "supported error-correcting coding schemes" is g2, the terminal #p performs the following operation, for example.

For example, it is assumed that, in a case where the terminal #p is able to perform error-correcting decoding on data of a first error-correcting coding scheme, the terminal #p sets g2 = 0, and the terminal #p transmits a reception capability notification symbol including g2.

It is assumed that, in a case where the terminal #p is able to perform error-correcting decoding on data of the first error-correcting coding scheme and is able to perform error-correcting decoding on data of a second error-correcting coding scheme, the terminal #p sets g2 = 1, and the terminal #p transmits a reception capability notification symbol including g2.

As another case, it is assumed that each terminal #p is able to perform error-correcting decoding on data of the first error-correcting coding scheme. Furthermore, in a case where the terminal #p is able to perform error-correcting decoding on data of the second error-correcting coding scheme, the terminal #p sets g2 = 1, and in a case where the terminal #p does not support error-correcting decoding on data of the second error-correcting coding scheme, the terminal #p sets g2 = 0. It is assumed that the terminal #p transmits a reception capability notification symbol including g2.

It is assumed that the first error-correcting coding scheme and the second error-correcting coding scheme are different schemes. For example, it is assumed that the block length (code length) of the first error-correcting coding scheme is A bits (A is an integer equal to or greater than 2), the block length (code length) of the second error-correcting coding scheme is B bits (B is an integer equal to or greater than 2), and A≠B holds. However, an example of the different schemes is not limited thereto, and the error-correcting code used in the first error-correcting coding scheme and the error-correcting code used in the second error-correcting coding scheme may be different from each other.

When the data 9503 about "support status of single-carrier scheme and OFDM scheme" is g3 and g4, the terminal #p performs the following operation, for example.

For example, it is assumed that, in a case where the terminal #p is able to demodulate a modulated signal of the single-carrier scheme, the terminal #p sets g3 = 1 and g4 = 0 (in this case, the terminal #p does not support demodulation of a modulated signal of OFDM), and the terminal #p transmits a reception capability notification symbol including g3 and g4.

It is assumed that, in a case where the terminal #p is able to demodulate a modulated signal of the OFDM scheme, the terminal #p sets g3 = 0 and g4 = 1 (in this case, the terminal #p does not support demodulation of a modulated signal of the single-carrier scheme), and the terminal #p transmits a reception capability notification symbol including g3 and g4.

It is assumed that, in a case where the terminal #p is able to demodulate a modulated signal of the single-carrier scheme and is able to demodulate a modulated signal of the OFDM scheme, the terminal #p sets g3 = 1 and g4 = 1, and the terminal #p transmits a reception capability notification symbol including g3 and g4.

FIG. 82 illustrates an example of the configuration of the "single-carrier scheme related reception capability notification symbol 9402" illustrated in FIG. 80.

It is assumed that the "single-carrier scheme related reception capability notification symbol 9402" illustrated in FIG. 80 includes the data 9601 about "schemes supported by single-carrier scheme" in FIG. 82.

When the data 9601 about "schemes supported by single-carrier scheme" is h0 and h1, the terminal #p performs the following operation, for example.

For example, it is assumed that, in a case where the communication partner of the terminal #p transmits a modulated signal by performing channel bonding and the terminal #p is able to demodulate the modulated signal, the terminal #p sets h0 = 1, whereas in a case where the terminal #p does not support demodulation of the modulated signal, the terminal #p sets h0 = 0, and the terminal #p transmits a reception capability notification symbol including h0.

It is assumed that, in a case where the communication partner of the terminal #p transmits a modulated signal by performing channel aggregation and the terminal #p is able to demodulate the modulated signal, the terminal #p sets h1 = 1, whereas in a case where the terminal #p does not support demodulation of the modulated signal, the terminal #p sets h1 = 0, and the terminal #p transmits a reception capability notification symbol including h1.

In a case where the terminal #p sets g3 to 0 and g4 to 1, since the terminal #p does not support demodulation of a modulated signal of the single-carrier scheme, the bit (field) of h0 is an invalid bit (field), and also the bit (field) of h1 is an invalid bit (field).

In a case where the terminal #p sets g3 to 0 and g4 to 1, the above h0 and h1 may be regarded as a reserved (maintained for the future) bit (field) according to the prescription given in advance, or the terminal #p may determine the above h0 and h1 to be an invalid bit (field) (may determine the above h0 or h1 to be an invalid bit (field)), or the base station or AP may obtain the above h0 and h1 and determine h0 and h1 to be an invalid bit (field) (may determine the above h0 or h1 to be an invalid bit (field)).

According to the description given above, there is a case where the terminal #p sets g3 to 0 and g4 to 1, that is, a case where the terminal #p does not support demodulation of a modulated signal of the single-carrier scheme, but an embodiment is possible in which each terminal #p "supports the demodulation of the single-carrier scheme". In this case, the bit (field) of g3 described above is not necessary.

Figure 88:
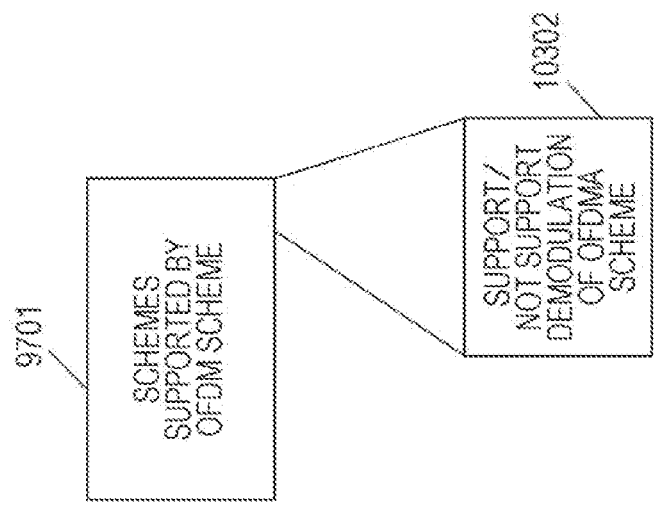
FIG. 88 is a diagram illustrating an example of the configuration of "OFDM scheme related reception capability notification symbol" illustrated in FIG. 80.

FIG. 88 illustrates an example of the configuration of the "OFDM scheme related reception capability notification symbol 9403" illustrated in FIG. 80.

It is assumed that the "OFDM scheme related reception capability notification symbol 9403" illustrated in FIG. 80 includes the data 9701 about "schemes supported by OFDM scheme" in FIG. 88.

In addition, it is assumed that the data 9701 about "schemes supported by OFDM scheme" includes data 10302 about "support/not support demodulation of OFDMA scheme" indicating "whether the terminal #p is able to demodulate a modulated signal of the OFDMA scheme when the base station or AP as a communication partner transmits the modulated signal of the OFDMA scheme".

For example, when the data 10302 about "support/not support demodulation of OFDMA scheme" is p0, the terminal #p performs the following operation, for example.

It is assumes that, in a case where the terminal #p does not support demodulation of a modulated signal of the OFDMA scheme, the terminal #p sets p0 = 0, and the terminal #p transmits a reception capability notification symbol including p0.

Also, it is assumed that, in a case where the terminal #p supports demodulation of a modulated signal of the OFDMA scheme, the terminal #p sets p0 = 1, and the terminal #p transmits a reception capability notification symbol including p0.

In a case where the terminal #p sets g3 to 1 and g4 to 0, since the terminal #p does not support demodulation of a modulated signal of the OFDM scheme, the bit (field) of p0 is an invalid bit (field).

In a case where the terminal #p sets g3 to 1 and g4 to 0, the above p0 may be regarded as a reserved (maintained for the future) bit (field) according to the prescription given in advance, or the terminal #p may determine the above p0 to be an invalid bit (field), or the base station or AP may obtain the above p0 and determine p0 to be an invalid bit (field).

In the description given above, an embodiment is possible in which each terminal #p "supports the demodulation of the single-carrier scheme". In this case, the bit (field) of g3 described above is not necessary.

The base station that has received the reception capability notification symbol transmitted by the terminal #p described above generates and transmits a modulated signal on the basis of the reception capability notification symbol, and accordingly the terminal #p is able to receive a transmission signal that can be demodulated. A specific example of the operation of the base station has been described in embodiments, such as the third embodiment, the fifth embodiment, and the fifteenth embodiment.

With the embodiment being carried out in the above-described manner, the following example characteristics can be obtained.

Characteristic #1

"A first reception apparatus, where
the reception apparatus generates control information indicating a signal receivable by the reception apparatus, the control information including a first region, a second region, a third region, and a fourth region,
the first region is a region storing information indicating whether or not it is possible to receive a signal for transmitting data generated by using a single-carrier scheme and information indicating whether or not it is possible to receive a signal generated by using a multi-carrier scheme,
the second region is a region storing information indicating whether or not it is possible to receive a signal generated by using any one of one or more schemes usable in both or either of a case of generating a signal by using the single-carrier scheme and a case of generating a signal by using the multi-carrier scheme,
the third region is
in a case of storing, in the first region, information indicating that it is possible to receive a signal for transmitting data generated by using the single-carrier scheme, a region storing information indicating whether or not it is possible to receive a signal generated by using any one of one or more schemes usable in a case of generating a signal by using the single-carrier scheme, and
in a case of storing, in the first region, information indicating that it is impossible to receive a signal for transmitting data generated by using the single-carrier scheme, an invalid or reserved region,
the fourth region is
in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and
in a case of storing, in the first region, information indicating that it is impossible to receive a signal for transmitting data generated by using the multi-carrier scheme, an invalid or reserved region, and
the reception apparatus generates a control signal from the control information and transmits the control signal to a transmission apparatus."
"The above-described first reception apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A first transmission apparatus that
receives the control signal from the above-described first reception apparatus,
demodulates the received control signal to obtain the control signal, and
decides, on the basis of the control signal, a scheme to be used to generate a signal to be transmitted to the reception apparatus."

"The above-described first transmission apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

Characteristic #2

"A second reception apparatus, where
the reception apparatus generates control information indicating a signal receivable by the reception apparatus, the control information including a first region, a second region, a third region, and a fourth region,
the first region is a region storing information indicating whether or not it is possible to receive a signal generated by using a multi-carrier scheme,
the second region is a region storing information indicating whether or not it is possible to receive a signal generated by using any one of one or more schemes usable in both or either of a case of generating a signal by using a single-carrier scheme and a case of generating a signal by using the multi-carrier scheme,
the third region is a region storing information indicating whether or not it is possible to receive a signal generated by using any one of one or more schemes usable in a case of generating a signal by using the single-carrier scheme,
the fourth region is
in a case of storing, in the first region, information indicating that it is possible to receive a signal for transmitting data generated by using the multi-carrier scheme, a region storing information indicating whether or not it is possible to receive a signal generated by using any one of one or more schemes usable in a case of generating a signal by using the multi-carrier scheme, and
in a case of storing, in the first region, information indicating that it is impossible to receive a signal for transmitting data generated by using the multi-carrier scheme, an invalid or reserved region, and
the reception apparatus generates a control signal from the control information and transmits the control signal to a transmission apparatus."

"The above-described second reception apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the reception apparatus sets a bit located in the sixth region to a predetermined value in a case of storing, in the first region, information indicating that it is impossible to receive a signal for transmitting data generated by using the multi-carrier scheme, or in a case of storing, in the first region, information indicating that it is possible to receive a signal for transmitting data generated by using the multi-carrier scheme and storing, in the fifth region, information indicating that it is impossible to receive a signal of the MIMO scheme."

"A second transmission apparatus that
receives the control signal from the above-described second reception apparatus,
demodulates the received control signal to obtain the control signal, and
decides, on the basis of the control signal, a scheme to be used to generate a signal to be transmitted to the reception apparatus."

"The above-described second transmission apparatus, where
the second region includes a fifth region storing information indicating whether or not it is possible to receive a signal generated by using the Multiple-Input Multiple-Output (MIMO) scheme,
the second region or the fourth region includes a sixth region storing information indicating whether or not it is possible to receive a signal generated by using a phase change scheme for performing phase change while regularly switching a phase change value with respect to at least any one of signals of multiple transmission systems for transmitting data, and
the transmission apparatus decides a scheme to be used to generate a signal to be transmitted to the reception apparatus without using a value of a bit located in the sixth region in a case where the first region includes information indicating that it is impossible to receive a signal for transmitting data generated by using the multi-carrier scheme, or in a case where the first region includes information indicating that it is possible to receive a signal for transmitting data generated by using the multi-carrier scheme and the fifth region includes information indicating that it is impossible to receive a signal of the MIMO scheme."

In the present embodiment, the configuration in FIG. 80 has been described as an example of the configuration of the reception capability notification symbol 2702 in FIG. 27, but the configuration is not limited thereto, and a reception capability notification symbol different from that in FIG. 80 may exist. For example, the configuration in FIG. 84 may be used.

In FIG. 84, the elements that operate similarly to those in FIG. 80 are denoted by the same numerals, and the description thereof is omitted. In FIG. 84, the other reception capability notification symbol 9801 is added as a reception capability notification symbol.

The other reception capability notification symbol 9801 is, for example, a reception capability notification symbol that is not the "single-carrier scheme and OFDM scheme related reception capability notification symbol 9401", that is not the "single-carrier scheme related reception capability notification symbol 9402", and that is not the "OFDM scheme related reception capability notification symbol 9403".

Also with such a reception capability notification symbol, the above-described embodiments can be carried out similarly.

In FIG. 80, a description has been given of an example of the reception capability notification symbol in which the "single-carrier scheme and OFDM scheme related reception capability notification symbol 9401", the "single-carrier scheme related reception capability notification symbol 9402", and the "OFDM scheme related reception capability notification symbol 9403" are arranged in this order, but the reception capability notification symbol is not limited thereto. An example thereof will be described below.

In FIG. 80, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403".

In the case of FIG. 80, it is assumed that bit r1, bit r2, bit r3, bit r4, bit r5, bit r6, bit r7, bit r8, bit r9, bit r10, and bit r11 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, and bit r11" is changed, for example, a bit sequence of "bit r7, bit r2, bit r4, bit r6, bit r1, bit r8, bit r9, bit r5, bit r10, bit r3, and bit r11" may be located in this order with respect to a frame. The order in the bit sequence is not limited to this example.

In addition, in FIG. 80, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". It is assumed that a "field" is made up of one or more bits.

In the case of FIG. 80, it is assumed that field s1, field s2, field s3, field s4, field s5, field s6, field s7, field s8, field s9, field s10, and field s11 are arranged in order, and are located in this order with respect to a frame, for example.

As another method, a field sequence in which the order of "field s1, field s2, field s3, field s4, field s5, field s6, field s7, field s8, field s9, field s10, and field s11" is changed, for example, a field sequence of "field s7, field s2, field s4, field s6, field s1, field s8, field s9, field s5, field s10, field s3, and field s11" may be located in this order with respect to a frame. The order in the field sequence is not limited to this example.

In FIG. 84, a description has been given of an example of the reception capability notification symbol in which the "single-carrier scheme and OFDM scheme related reception capability notification symbol 9401", the "single-carrier scheme related reception capability notification symbol 9402", the "OFDM scheme related reception capability notification symbol 9403", and the "other reception capability notification symbol 9801" are arranged in this order, but the reception capability notification symbol is not limited thereto. An example thereof will be described below.

In FIG. 84, it is assumed that bit r0, bit r1, bit r2, and bit r3 exist as the "single-carrier scheme and OFDM scheme related reception capability notification symbol 9401". Also, it is assumed that bit r4, bit r5, bit r6, and bit r7 exist as the "single-carrier scheme related reception capability notification symbol 9402". Also, it is assumed that bit r8, bit r9, bit r10, and bit r11 exist as the "OFDM scheme related reception capability notification symbol 9403". Also, it is assumed that bit r12, bit r13, bit r14, and bit r15 exist as the "other reception capability notification symbol 9801".

In the case of FIG. 84, it is assumed that bit r1, bit r2, bit r3, bit r4, bit r5, bit r6, bit r7, bit r8, bit r9, bit r10, bit r11, bit r12, bit r13, bit r14, and bit r15 are arranged in order, and are located in this order with respect to a frame, for example.

As another method, a bit sequence in which the order of "bit r1, bit r2, bit r3, bit r4, bit r5, bit r6, bit r7, bit r8, bit r9, bit r10, bit r11, bit r12, bit r13, bit r14, and bit r15" is changed, for example, a bit sequence of "bit r7, bit r2, bit r4, bit r6, bit r13, bit r1, bit r8, bit r12, bit r9, bit r5, bit r10, bit r3, bit r15, bit r11, and bit r14" may be located in this order with respect to a frame. The order in the bit sequence is not limited to this example.

In addition, in FIG. 84, it is assumed that field s0, field s1, field s2, and field s3 exist as the "single-carrier scheme and OFDM scheme related reception capability notification symbol 9401". Also, it is assumed that field s4, field s5, field s6, and field s7 exist as the "single-carrier scheme related reception capability notification symbol 9402". Also, it is assumed that field s8, field s9, field s10, and field s11 exist as the "OFDM scheme related reception capability notification symbol 9403". Also, it is assumed that field s12, field s13, field s14, and field s15 exist as the "other reception capability notification symbol 9801". It is assumed that a "field" is made up of one or more bits.

In the case of FIG. 84, it is assumed that field s1, field s2, field s3, field s4, field s5, field s6, field s7, field s8, field s9, field s10, field s11, field s12, field s13, field s14, and field s15 are arranged in order, and are located in this order with respect to a frame, for example.

As another method, a field sequence in which the order of "field s1, field s2, field s3, field s4, field s5, field s6, field s7, field s8, field s9, field s10, field s11, field s12, field s13, field s14, and field s15" is changed, for example, a field sequence of "field s7, field s2, field s4, field s6, field s13, field s1, field s8, field s12, field s9, field s5, field s10, field s3, field s15, field s11, and field s14" may be located in this order with respect to a frame. The order in the field sequence is not limited to this example.

It is not always explicitly indicated that the information transmitted by the "single-carrier scheme related reception capability notification symbol" is information directed to the single-carrier scheme. The information transmitted by the "single-carrier scheme related reception capability notification symbol" described in the present embodiment is, for example, information for giving a notice about a selectable scheme in a case where the transmission apparatus transmits a signal in the single-carrier scheme. In another example, the information transmitted by the "single-carrier scheme related reception capability notification symbol" described in the present embodiment is, for example, information that is not used (ignored) to select a scheme to be used for transmitting a signal in a case where the transmission apparatus transmits a signal in a scheme other than the single-carrier scheme, such as the OFDM scheme. In still another example, the information transmitted by the "single-carrier scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the single-carrier scheme (notifies the transmission apparatus of non-support). In the above description, the term "single-carrier scheme related reception capability notification symbol 9402" is used, but the term is not limited thereto, and another term may be used. For example, the term "symbol indicating the reception capability of the (first) terminal #p" may be used. In addition, the "single-carrier scheme related reception capability notification symbol 9402" may include information other than information for giving a notice about a receivable signal.

Likewise, it is not always explicitly indicated that the information transmitted by the "OFDM scheme related reception capability notification symbol" is information directed to the OFDM scheme. The information transmitted by the "OFDM scheme related reception capability notification symbol" described in the present embodiment is, for example, information for giving a notice about a selectable scheme in a case where the transmission apparatus transmits a signal in the OFDM scheme. In another example, the information transmitted by the "OFDM scheme related reception capability notification symbol" described in the present embodiment is, for example, information that is not used (ignored) to select a scheme to be used for transmitting a signal in a case where the transmission apparatus transmits a signal in a scheme other than the OFDM scheme, such as the single-carrier scheme. In still another example, the information transmitted by the "OFDM scheme related reception capability notification symbol" described in the present embodiment is, for example, information that is transmitted by using a region determined to be an invalid region or reserved region by the transmission apparatus or the reception apparatus in a case where the reception apparatus does not support the reception of a signal of the OFDM scheme. In the above description, the term "OFDM scheme related reception capability notification symbol 9403" is used, but the term is not limited thereto, and another term may be used. For example, the term "symbol indicating the reception capability of the (second) terminal #p" may be used. In addition, the "OFDM scheme related reception capability notification symbol 9403" may include information other than information for giving a notice about a receivable signal.

The term "single-carrier scheme and OFDM scheme related reception capability notification symbol 9401" is used, but the term is not limited thereto, and another term may be used. For example, the term "symbol indicating the reception capability of the (third) terminal #p" may be used. In addition, the "single-carrier scheme and OFDM scheme related reception capability notification symbol 9401" may include information other than information for giving a notice about a receivable signal.

As in the present embodiment, the terminal #p forms and transmits a reception capability notification symbol, and the base station receives the reception capability notification symbol, generates a modulated signal by considering the effectiveness of the value thereof, and transmits the modulated signal. Accordingly, the terminal #p is able to receive the modulated signal that can be demodulated, and is thus able to appropriately obtain data and improve the data reception quality. In addition, the terminal #p generates data of each bit (each field) of the reception capability notification symbol while determining the effectiveness of the bit (the field), and is thus able to reliably transmit the reception capability notification symbol to the base station and improve the communication quality.

In the present embodiment, in a case where the base station or AP does not support the transmission of a modulated signal of the OFDMA scheme, the base station or AP does not transmit a modulated signal of the OFDMA scheme even if the terminal #p supports the demodulation of the OFDMA scheme.

Twenty-Fifth Embodiment

In the present embodiment, a description will be given of another method for carrying out the operation of the terminal #p described in the third embodiment, the fifth embodiment, the fifteenth embodiment, the twentieth embodiment, the twenty-first embodiment, the twenty-second embodiment, the twenty-third embodiment, the twenty-fourth embodiment, and so forth.

Figure 89:
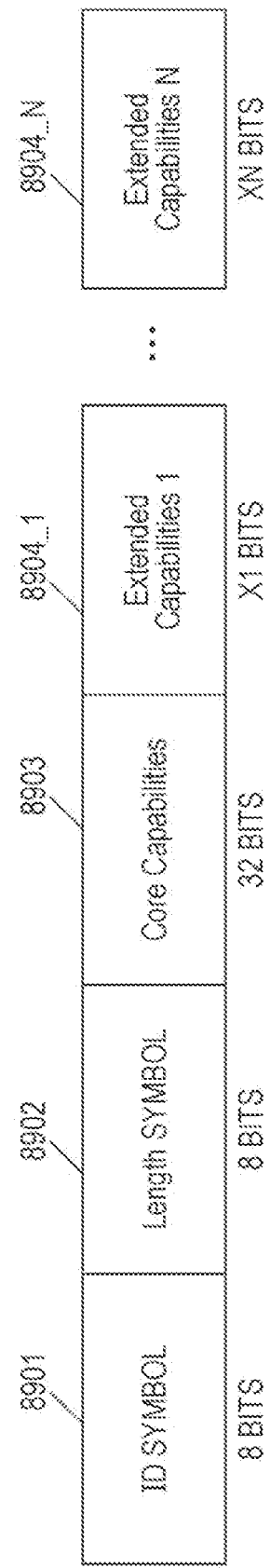
FIG. 89 is a diagram illustrating an example of the format of the reception capability notification symbol.

FIG. 89 is a diagram illustrating an example of the format of a reception capability notification symbol. The format of the reception capability notification symbol in FIG. 89 includes an ID symbol field 8901, a Length symbol field 8902, a Core Capabilities field 8903, and N Extended Capabilities fields (Extended Capabilities 1 (8904_1) to Extended Capabilities N (8904_N)) (N is an integer equal to or greater than 1). An ID Extension symbol field may be included between the Length symbol field 8902 and the Core Capabilities field 8903.

The ID symbol field 8901 has a length of 8 bits, the Length symbol field 8902 has a length of 8 bits, the Core Capabilities field 8903 has a length of 32 bits, the Extended Capabilities 1 (8904_1) has a length of X1 bits (X1 is an integer equal to or greater than 1), and the Extended Capabilities N (8904_N) has a length of XN bits (XN is an integer equal to or greater than 1). In a case where the format of the reception capability notification symbol includes an ID Extension symbol field, the ID Extension symbol field has a length of 8 bits.

Figure 90:
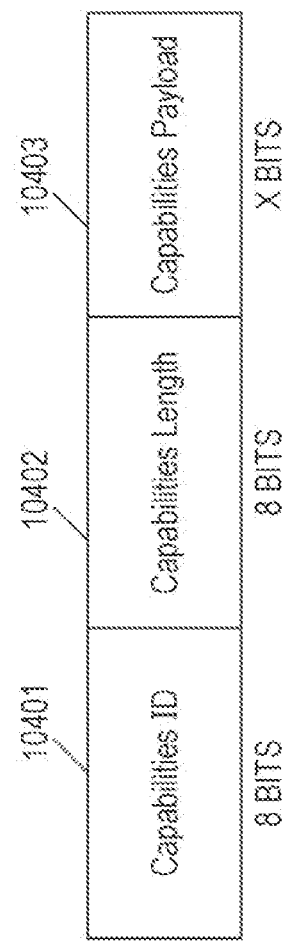
FIG. 90 is a diagram illustrating an example of the format of an Extended Capabilities field.

FIG. 90 is a diagram illustrating an example of the format of the Extended Capabilities field in FIG. 89. The Extended Capabilities field in FIG. 90 includes, as subfields, a Capabilities ID 10401, a Capabilities Length 10402, and a Capabilities Payload 10403. The Capabilities ID 10401 has a length of 8 bits, the Capabilities Length 10402 has a length of 8 bits, and the Capabilities Payload 10403 has a length of X bits (X is an integer equal to or greater than 1).

Each of the N Extended Capabilities fields (Extended Capabilities 1 (8904_1) to Extended Capabilities N (8904_N)) illustrated in FIG. 89 (N is an integer equal to or greater than 1) includes the fields (subfields) illustrated in FIG. 90.

The terminal #p transmits not all the N Extended Capabilities fields (Extended Capabilities 1 (8904_1) to Extended Capabilities N (8904_N)) (N is an integer equal to or greater than 1) to the base station (AP), but designates ID (identification) and Length (length) to transmit one or more designated Extended Capabilities fields to the base station (AP). Note that it is possible that the terminal #p does not transmit an Extended Capabilities field.

For example, the terminal #p that does not support all Capabilities (reception capabilities) indicated by the Capabilities ID "2" need not transmit the Extended Capabilities field having the Capabilities ID "2" to the base station (AP). However, the terminal #p may transmit the Extended Capabilities field having the Capabilities ID "2" to the base station (AP).

First Example

For example, the Extended Capabilities field with a Capabilities ID 0 (zero) includes the following.

FIG. 91 is a diagram illustrating a first example of the Extended Capabilities field. In the Extended Capabilities field in FIG. 91, the data 2801 about "support/not support demodulation of modulated signal with phase change" and the data 2901 about "support/not support reception for multiple streams" in FIG. 29 are transmitted with the same Capabilities ID.

Accordingly, the terminal #p that does not support reception for multiple streams need not transmit the Extended Capabilities field illustrated in FIG. 91, and thus the data transmission speed increases. This is because unnecessary resources can be allocated to the time for data transmission.

In addition, the terminal #p that supports reception for multiple streams transmits the "Extended Capabilities field" in FIG. 91, thereby being able to transmit information indicating whether or not phase change demodulation is supported, together with information indicating that reception for multiple streams is supported. In this way, information about two types of reception capabilities can be transmitted by using a single "Extended Capabilities field", and thus the data transmission speed increases. On the other hand, in the case of individually transmitting the data 2801 about "support/not support demodulation of modulated signal with phase change" and the data 2901 about "support/not support reception for multiple streams" by using Extended Capabilities fields having Capabilities IDs different from each other, the terminal #p needs to transmit multiple (two) Extended Capabilities fields corresponding to multiple Capabilities IDs, and accordingly the data transmission speed decreases. The Extended Capabilities field in FIG. 91 may include another reception capability notification symbol.

Second Example

For example, the "Extended Capabilities field" with a Capabilities ID 0 (zero) includes the following.

FIG. 92 is a diagram illustrating a second example of the Extended Capabilities field. In the Extended Capabilities field in FIG. 92, the data 5301 about "supported precoding method" in FIG. 71 as well as the data 2801 about "support/not support demodulation of modulated signal with phase change" and the data 2901 about "support/not support reception for multiple streams" in FIG. 29 are transmitted with the same Capabilities ID.

Accordingly, the terminal #p that does not support reception for multiple streams need not transmit the "Extended Capabilities field" illustrated in FIG. 92, and thus the data transmission speed increases. This is because unnecessary resources can be allocated to the time for data transmission.

On the other hand, the terminal #p that supports reception for multiple streams transmits the "Extended Capabilities field" in FIG. 92 including the data 5301 about "supported precoding method" in FIG. 71 as well as the data 2801 about "support/not support demodulation of modulated signal with phase change" and the data 2901 about "support/not support reception for multiple streams". At this time, information about "support/not support demodulation of modulated signal with phase change" and information about "supported precoding methods" can be transmitted by using the single "Extended Capabilities field", and thus the data transmission speed increases. On the other hand, in the case of transmitting the data 2801 about "support/not support demodulation of modulated signal with phase change" and the data 5301 about "supported precoding methods" by using an Extended Capabilities field having a Capabilities ID different from the Capabilities ID for transmitting the data 2901 about "support/not support reception for multiple streams", it is necessary to transmit multiple Extended Capabilities fields corresponding to multiple Capabilities IDs, and accordingly the data transmission speed decreases. The Extended Capabilities field in FIG. 92 may include another reception capability notification symbol.

Third Example

Figure 93:
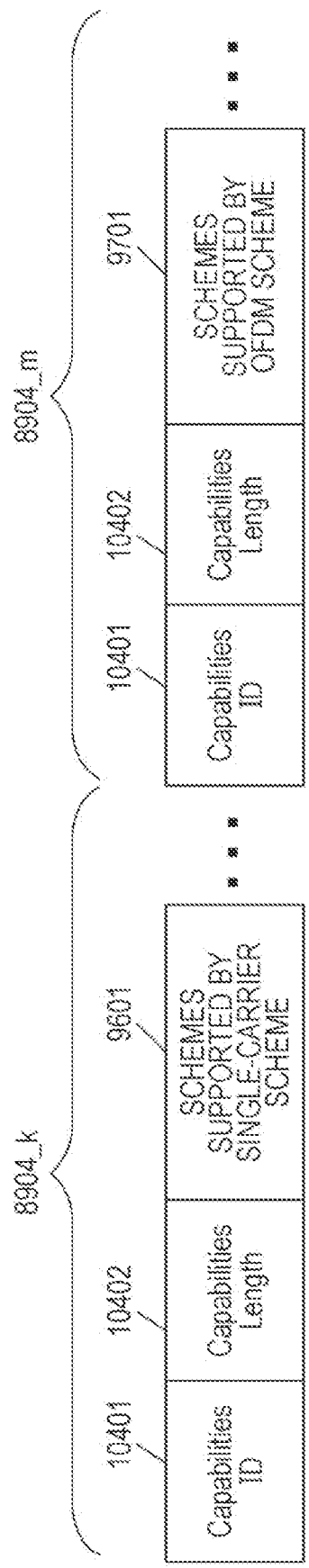
FIG. 93 is a diagram illustrating a third example of the Extended Capabilities field.

FIG. 93 is a diagram illustrating a third example of the Extended Capabilities field. In FIG. 93, the data 9601 about "schemes supported by single-carrier scheme" in FIG. 82 is transmitted by using an Extended Capabilities field 8904_k (k is an integer from 1 to N) having a first Capabilities ID, and the data 9701 about "schemes supported by OFDM scheme" in FIGS. 83, 85, 86, 87, 88, and so forth is transmitted by using an Extended Capabilities field 8904_m (m is different from k and is an integer from 1 to N) having a second Capabilities ID. Note that the first Capabilities ID and the second Capabilities ID are different from each other.

At this time, the terminal #p that supports transmission of a modulated signal of the single-carrier scheme and that does not support transmission of a modulated signal of the OFDM scheme does not need to transmit the Extended Capabilities field 8904_m having the second Capabilities ID and for transmitting the data 9701 about "schemes supported by OFDM scheme", and thus the data transmission speed increases. However, the terminal #p may transmit the Extended Capabilities field 8904_m.

Likewise, the terminal #p that supports transmission of a modulated signal of the OFDM scheme and that does not support transmission of a modulated signal of the single-carrier scheme does not need to transmit the Extended Capabilities field 8904_k having the first Capabilities ID and for transmitting the data 9601 about "schemes supported by the single-carrier scheme", and thus the data transmission speed increases. However, the terminal #p may transmit the Extended Capabilities field 8904_k.

Furthermore, it is assumed that the data 5301 about "supported precoding methods", the data 2801 about "support/not support demodulation of modulated signal with phase change", and the data 2901 about "support/not support reception for multiple streams" illustrated in FIG. 71 and so forth are transmitted by using the "Extended Capabilities field" having the same Capability ID.

Accordingly, the terminal #p that supports the OFDM scheme and that does not support reception for multiple streams does not need to transmit this Extended Capabilities field, and thus the data transmission speed increases. This is because unnecessary resources can be allocated to the time for data transmission.

In addition, the terminal #p that supports the OFDM scheme and that supports reception for multiple streams transmits this Extended Capabilities field. At this time, the terminal #p is able to transmit information indicating whether or not phase change demodulation is supported and information about supported precoding methods by using a single "Extended Capabilities field", and thus the data transmission speed increases. The reason for this is as described above.

Fourth Example

Figure 94:
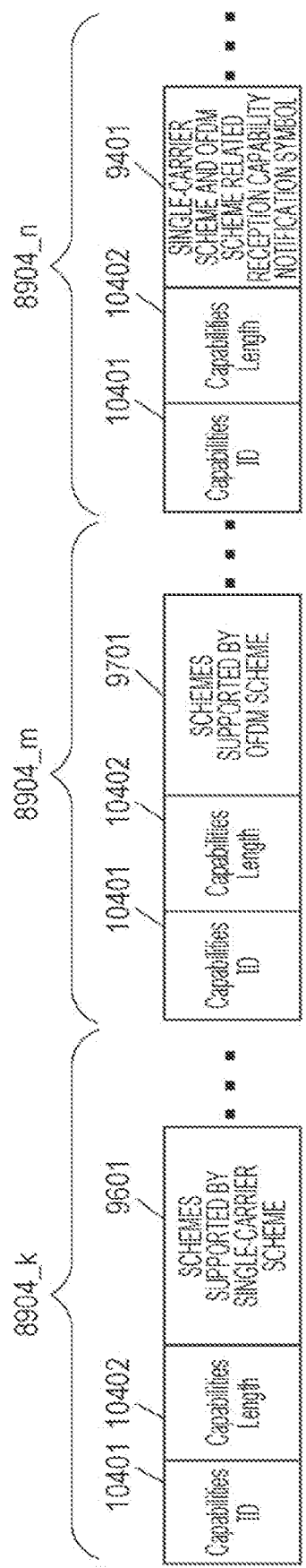
FIG. 94 is a diagram illustrating a fourth example of the Extended Capabilities field.

FIG. 94 is a diagram illustrating a fourth example of the Extended Capabilities field. In FIG. 94, the data 9601 about "schemes supported by single-carrier scheme" in FIG. 82 is transmitted by using the Extended Capabilities field 8904_k (k is an integer from 1 to N) having the first Capabilities ID, the data 9701 about "schemes supported by OFDM scheme" in FIGS. 83, 85, 86, 87, 88, and so forth is transmitted by using the Extended Capabilities field 8904_m (m is different from k and is an integer from 1 to N) having the second Capabilities ID, and the "single-carrier scheme and OFDM scheme related reception capability notification symbol 9401" in FIG. 80 is transmitted by using an Extended Capabilities field 8904_N (n is different from k and m and is an integer from 1 to N) having a third Capabilities ID. Note that the first Capabilities ID and the second Capabilities ID are different from each other, the first Capabilities ID and the third Capabilities ID are different from each other, and the second Capabilities ID and the third Capabilities ID are different from each other.

At this time, the terminal #p that supports transmission of a modulated signal of the single-carrier scheme and that does not support transmission of a modulated signal of the OFDM scheme does not need to transmit the Extended Capabilities field 8904_m having the second Capabilities ID and for transmitting the data 9701 about "schemes supported by OFDM scheme", and thus the data transmission speed increases. This is because unnecessary resources can be allocated to the time for data transmission. However, the terminal #p may transmit the Extended Capabilities field 8904_m.

Fifth Example

Figure 95:
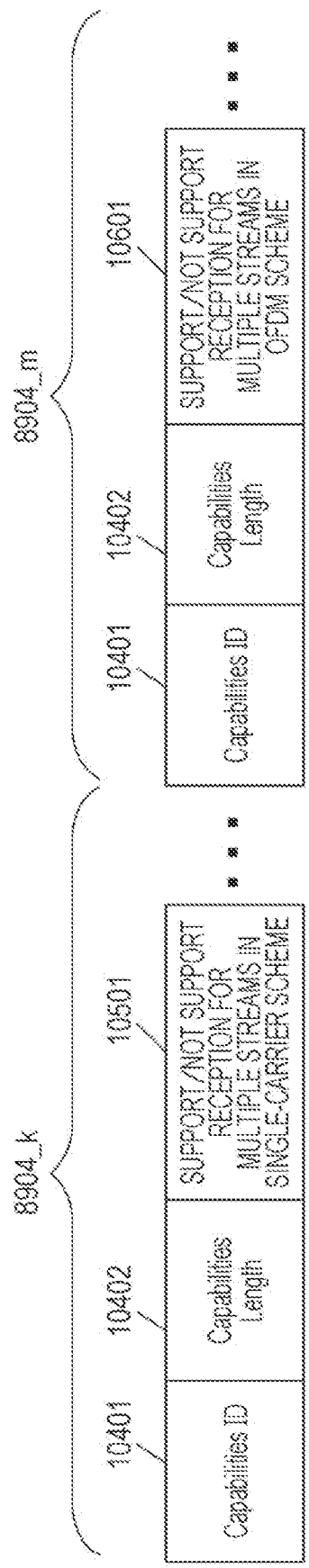
FIG. 95 is a diagram illustrating a fifth example of the Extended Capabilities field.

FIG. 95 is a diagram illustrating a fifth example of the Extended Capabilities field. In FIG. 95, a symbol 10501 about "support/not support reception for multiple streams in single-carrier scheme" is transmitted by using the Extended Capabilities field 8904_k (k is an integer from 1 to N) having the first Capabilities ID, and a symbol 10601 about "support/not support reception for multiple streams in OFDM scheme" is transmitted by using the Extended Capabilities field 8904_m (m is different from k and is an integer from 1 to N) having the second Capabilities ID. Note that the first Capabilities ID and the second Capabilities ID are different from each other. The symbol 10501 about "support/not support reception for multiple streams in single-carrier scheme" is a symbol for transmitting information about "support/not support reception for multiple streams in single-carrier scheme". The symbol 10601 about "support/not support reception for multiple streams in OFDM scheme" is a symbol for transmitting information about "support/not support reception for multiple streams in OFDM scheme".

At this time, the terminal #p that does not support reception for multiple streams in the single-carrier scheme does not need to transmit the Extended Capabilities field 8904_k having the first Capabilities ID, and thus the data transmission speed increases. This is because unnecessary resources can be allocated to the time for data transmission.

Likewise, the terminal #p that does not support reception for multiple streams in the OFDM scheme does not need to transmit the Extended Capabilities field 8904_m having the second Capabilities ID, and thus the data transmission speed increases. In the above-described first to fourth examples, the effects similar to those described above can be obtained.

Sixth Example

Figure 96:
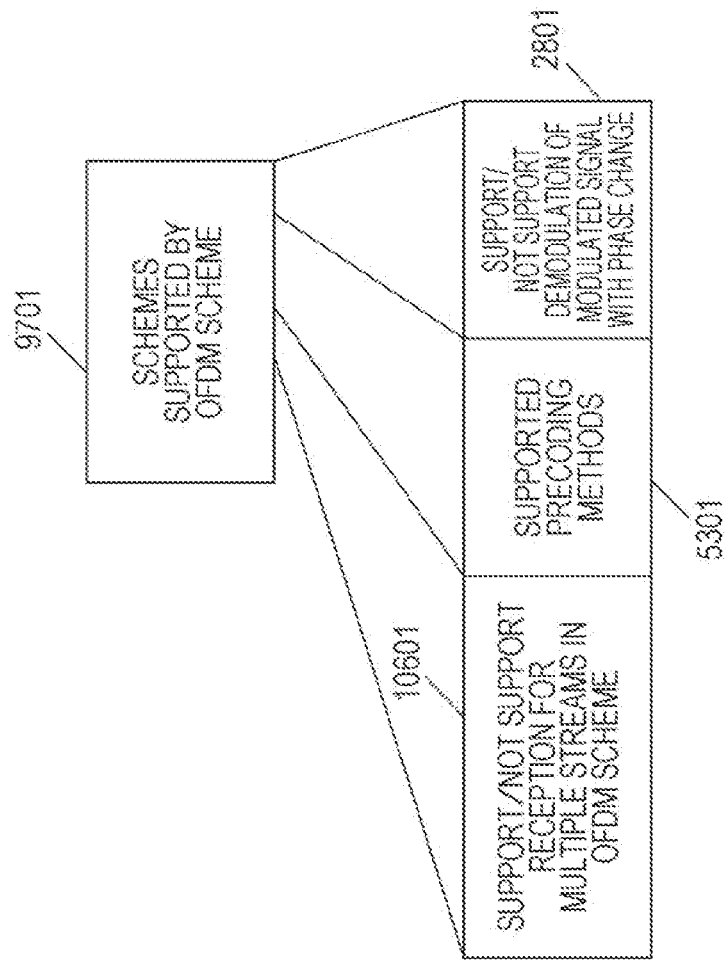
FIG. 96 is a diagram illustrating an example of data included in the reception capability notification symbol.
Figure 97:
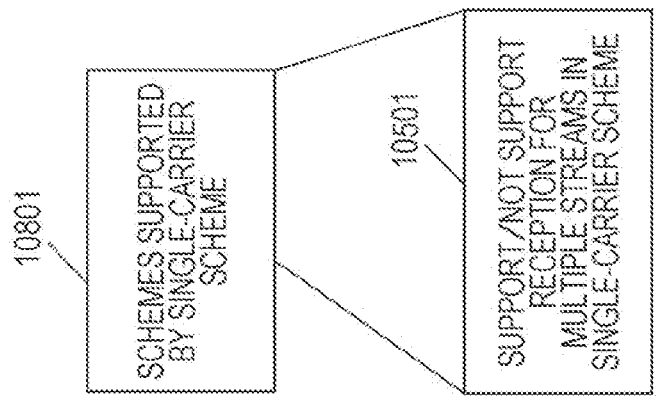
FIG. 97 is a diagram illustrating another example of data included in the reception capability notification symbol.

As a modification example of the above-described fifth example, symbols for transmitting the data 9701 about "schemes supported by OFDM scheme" in FIG. 96 are transmitted by using the Extended Capabilities field having the first Capabilities ID, and data 10801 about "schemes supported by single-carrier scheme" in FIG. 97 is transmitted by using the Extended Capabilities field having the second Capabilities ID. Note that the first Capabilities ID and the second Capabilities ID are different from each other.

As illustrated in FIG. 96, the data 9701 about "schemes supported by OFDM scheme" includes the symbol 10601 about "support/not support reception for multiple streams in OFDM scheme", the data 5301 about "supported precoding methods", and the data 2801 about "support/not support demodulation of modulated signal with phase change". Accordingly, the effects described in the first example and the second example can be obtained.

In addition, as illustrated in FIG. 97, the data 10801 about "schemes supported by single-carrier scheme" includes the symbol 10501 about "support/not support reception for multiple streams in single-carrier scheme". Accordingly, the effects similar to those described in the fifth example can be obtained.

Seventh Example

It is assumed that the symbol 10601 about "support/not support reception for multiple streams in OFDM scheme", the data 5301 about "supported precoding methods", and the data 2801 about "support/not support demodulation of modulated signal with phase change" included in the data 9701 about "schemes supported by OFDM scheme" in FIG. 96, and the symbol 10501 about "support/not support reception for multiple streams in single-carrier scheme"

included in the data 10801 about "schemes supported by single-carrier scheme" in FIG. 97 are transmitted by using the Extended Capabilities field having the first Capabilities ID.

Accordingly, it is sufficient that the terminal #p that supports reception of multiple streams transmit the Extended Capabilities field having a single Capabilities ID, and thus the number of Extended Capabilities fields having other Capabilities IDs to be transmitted can be reduced. Thus, the data transmission speed can be increased advantageously. In the seventh example, in a case where "reception for multiple streams in the OFDM scheme is supported and reception for multiple streams in the single-carrier scheme is supported", and in a case where "reception for multiple streams in the OFDM scheme is not supported and reception for multiple streams in the single-carrier scheme is not supported", it is not necessary to separate the symbol 10601 about "support/not support reception for multiple streams in OFDM scheme" and the symbol 10501 about "support/not support reception for multiple streams in single-carrier scheme". Thus, in these cases, it is only necessary to transmit a symbol about "support/not support reception for multiple streams" by using the Extended Capabilities field having the first Capabilities ID.

Eighth Example

The "single-carrier scheme and OFDM scheme related reception capability notification symbol 9401" illustrated in FIG. 80 and so forth may be transmitted by using a Core Capabilities field (for example, the Core Capabilities field 8903 illustrated in FIG. 89), and the "OFDM scheme related reception capability notification symbol 9403" illustrated in FIG. 80 and so forth may be transmitted by using an Extended Capabilities field (for example, at least any one of Extended Capabilities 1 (8904_1) to Extended Capabilities N (8904_N) in FIG. 89).

Ninth Example

Figure 98:
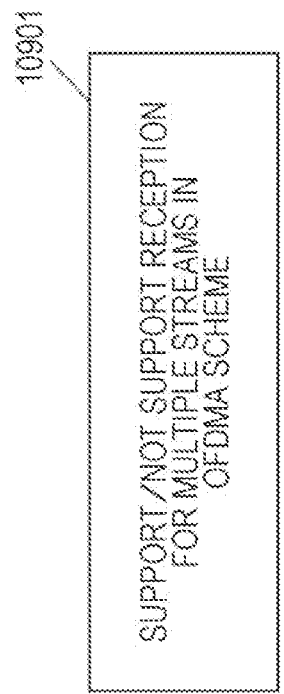
FIG. 98 is a diagram illustrating still another example of data included in the reception capability notification symbol.

When the base station (AP) transmits modulated signals including multiple streams in the OFDMA scheme to the terminal #p by using multiple antennas, a symbol indicating whether or not the terminal #p is able to demodulate these modulated signals is data 10901 about "support/not support reception for multiple streams in OFDMA scheme" in FIG. 98. In the OFDMA scheme, the data 10901 about "support/not support reception for multiple streams in OFDMA scheme" is data (for example, symbol) for transmitting information about "support/not support reception for multiple streams in OFDMA scheme". On the basis of the data 10901 about "support/not support reception for multiple streams in OFDMA scheme" transmitted from the terminal #p, the base station (AP) determines whether or not to transmit modulated signals of multiple streams. This method is as described in another embodiment. Accordingly, the base station (AP) is able to transmit a modulated signal that can be demodulated by the terminal #p.

Figure 99:
FIG. 99 is a diagram illustrating still another example of data included in the reception capability notification symbol.

In addition, as in FIG. 99, the terminal #p transmits the data 10302 about "support/not support demodulation of OFDMA scheme" and the data 10901 about "support/not support reception for multiple streams in OFDMA scheme" by using the Extended Capabilities field having the first (same) Capabilities ID.

Accordingly, the terminal #p that supports reception for multiple streams in the OFDMA scheme transmits the Extended Capabilities field having the first Capabilities ID. On the basis of the Extended Capabilities field having the first Capabilities ID received from the terminal #p, the base station (AP) is able to determine whether or not to transmit modulated signals of multiple streams in the OFDMA scheme. In this method, it is not necessary to transmit Extended Capabilities fields having other Capabilities IDs, and thus an effect that the data transmission speed increases can be obtained.

Figure 100:
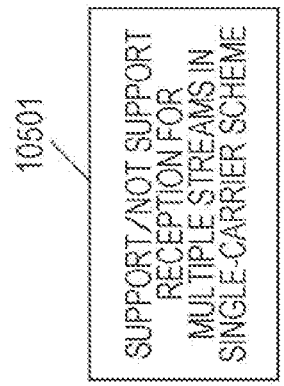
FIG. 100 is a diagram illustrating still another example of data included in the reception capability notification symbol.
Figure 101:
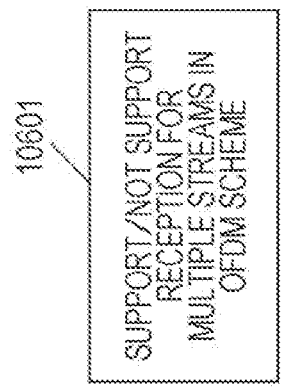
FIG. 101 is a diagram illustrating still another example of data included in the reception capability notification symbol.

In addition, the terminal #p transmits, to the base station (AP), any two or more of the symbol 10501 about "support/not support reception for multiple streams in single-carrier scheme" in FIG. 100 and the symbol 10601 about "support/not support reception for multiple streams in OFDM scheme" in FIG. 101, and the data 10901 about "support/not support reception for multiple streams in OFDMA scheme" in FIG. 98, and accordingly the base station (AP) is able to transmit a modulated signal in an appropriate scheme. Thus, an effect that the data transmission speed increases can be obtained.

Preferably, the terminal #p may transmit, by using the Extended Capabilities field, any two or more of the symbol 10501 about "support/not support reception for multiple streams in single-carrier scheme" in FIG. 100 and the symbol 10601 about "support/not support reception for multiple streams in OFDM scheme" in FIG. 101, and the data 10901 about "support/not support reception for multiple streams in OFDMA scheme" in FIG. 98. Accordingly, there is a possibility that the terminal #p that does not support demodulation of multiple streams is able to reduce the number of Extended Capabilities fields to be transmitted, and thus the data transmission speed increases.

Tenth Example

The terminal #p transmits at least two or more symbols among the data 2801 about "support/not support demodulation of modulated signal with phase change", the data 2901 about "support/not support reception for multiple streams", the data 3001 about "supported schemes, the data 3002 about "support/not support multi-carrier scheme", the data 3003 about "supported error-correcting coding schemes", and the data 5301 about "supported precoding methods" illustrated in FIGS. 30 and 71, by using the Extended Capabilities field having the first Capabilities ID.

Accordingly, when the terminal #p transmits a reception capability notification symbol related to a physical layer by using Extended Capabilities fields, the number of Extended Capabilities fields to be transmitted can be reduced. Accordingly, the data transmission speed can be increased. This is because saved resources can be allocated to the time for data transmission.

Obviously, it is possible to carry out the present embodiment and "the twentieth to twenty-fourth embodiments" in combination with each other. At this time, it is obviously possible to implement the reception capability notification symbol, the configuration of individual parameters constituting the reception capability notification symbol, and the usage method therefor described in the present embodiment in the manner described in the twentieth to twenty-fourth embodiments. In addition, a combination with another embodiment is obviously possible.

Supplemental Description

A description has been given above of a symbol for transmitting information indicating "support/not support reception for multiple streams" (for example, 2901), a symbol for transmitting information indicating "support/not support reception for multiple streams in single-carrier scheme" (for example, 10501), and a symbol for transmitting information indicating "support/not support reception for multiple streams in OFDM scheme" (for example, 10601). At this time, the following three methods are conceivable as a method for transmitting information indicating "support/not support reception for multiple streams", for example.

First Method

Information indicating whether or not reception for multiple streams is supported is transmitted. For example, "1" is transmitted in a case where the terminal #p supports reception for multiple streams, and "0" is transmitted in a case where the terminal #p does not support reception for multiple streams.

Second Method

The symbol for transmitting information indicating "support/not support reception for multiple streams" (for example, 2901, 10501, 10601, or the like) is made up of a symbol for transmitting information indicating "the number of receivable streams" or a symbol for transmitting information indicating "the maximum number of receivable streams".

Third Method

The terminal #p transmits information indicating "whether or not reception for multiple streams is supported" as described in the first method, and transmits a symbol for transmitting information indicating "the number of receivable streams" or a symbol for transmitting information indicating "the maximum number of receivable streams" as described in the second method.

Now, a description will be given of a case where the symbol for transmitting information indicating "support/not support reception for multiple streams" is made up of a symbol for transmitting information indicating "the number of receivable streams" or a symbol for transmitting information indicating "the maximum number of receivable streams" in the second method described above.

For example, a modulated signal obtained by modulating a first data sequence (performing mapping in a certain modulation scheme) by the base station (AP) is represented by $s1(i)$ (i is a symbol number), a modulated signal obtained by modulating a second data sequence (performing mapping in a certain modulation scheme) by the base station (AP) is represented by $s2(i)$, a modulated signal obtained by modulating a third data sequence (performing mapping in a certain modulation scheme) by the base station (AP) is represented by $s3(i)$, and a modulated signal obtained by modulating a fourth data sequence (performing mapping in a certain modulation scheme) by the base station (AP) is represented by $s4(i)$.

Also, it is assumed that the base station (AP) supports some of the following transmissions.

<1> Transmission of the modulated signal (stream) of $s1(i)$.

<2> Transmission of the modulated signal (stream) of $s1(i)$ and the modulated signal (stream) of $s2(i)$ at identical times and identical frequencies with use of multiple antennas. The base station (AP) may or may not perform precoding.

<3> Transmission of the modulated signal (stream) of $s1(i)$, the modulated signal (stream) of $s2(i)$, and the modulated signal (stream) of $s3(i)$ at identical times and identical frequencies with use of multiple antennas. The base station (AP) may or may not perform precoding.

<4> Transmission of the modulated signal (stream) of $s1(i)$, the modulated signal (stream) of $s2(i)$, the modulated signal (stream) of $s3(i)$, and the modulated signal (stream) of $s4(i)$ at identical times and identical frequencies with use of multiple antennas. The base station (AP) may or may not perform precoding.

For example, it is assumed that the terminal #p is able to perform demodulation in the above-described cases <1> and <2>. At this time, the maximum number of streams that can be demodulated by the terminal #p is 2, and thus the terminal #p transmits information "2" by using the symbol for transmitting information indicating "the number of receivable streams" or the symbol for transmitting information indicating "the maximum number of receivable streams".

For another example, it is assumed that the terminal #p is able to perform demodulation in all the above-described cases <1>, <2>, <3>, and <4>. At this time, the maximum number of streams that can be demodulated by the terminal #p is 4, and thus the terminal #p transmits information "4" by using the symbol for transmitting information indicating "the number of receivable streams" or the symbol for transmitting information indicating "the maximum number of receivable streams".

For still another example, it is assumed that the terminal #p is able to perform demodulation only in the case <1>. At this time, the maximum number of streams that can be demodulated by the terminal #p is 1, and thus the terminal #p transmits information "1" by using the symbol for transmitting information indicating "the number of receivable streams" or the symbol for transmitting information indicating "the maximum number of receivable streams".

For another example, it is assumed that the terminal #p is able to perform demodulation only in the case <2>. At this time, the maximum number of streams that can be demodulated by the terminal #p is 2, and thus the terminal #p transmits information "2" by using the symbol for transmitting information indicating "the number of receivable streams" or the symbol for transmitting information indicating "the maximum number of receivable streams".

For another example, it is assumed that the terminal #p is able to perform demodulation in the cases <3> and <4>. At this time, the maximum number of streams that can be demodulated by the terminal #p is 4, and thus the terminal #p transmits information "4" by using the symbol for transmitting information indicating "the number of receivable streams" or the symbol for transmitting information indicating "the maximum number of receivable streams".

For another example, it is assumed that the terminal #p is able to perform demodulation in the case <4>. At this time, the maximum number of streams that can be demodulated by the terminal #p is 4, and thus the terminal #p transmits information "4" by using the symbol for transmitting information indicating "the number of receivable streams" or the symbol for transmitting information indicating "the maximum number of receivable streams".

For another example, it is assumed that the terminal #p is able to perform demodulation in the cases <1> and <4>. At this time, the maximum number of streams that can be demodulated by the terminal #p is 4, and thus the terminal #p transmits information "4" by using the symbol for transmitting information indicating "the number of receivable streams" or the symbol for transmitting information indicating "the maximum number of receivable streams".

For another example, it is assumed that the terminal #p is able to perform demodulation in the cases <1> and <2>. At this time, the number of streams that can be demodulated by the terminal #p is 1 and 2, and thus the terminal #p transmits information "1 and 2" by using the symbol for transmitting information indicating "the number of receivable streams".

For another example, it is assumed that the terminal #p is able to perform demodulation in the cases <1>, <2>, <3>, and <4>. At this time, the number of streams that can be demodulated by the terminal #p is 1, 2, 3, and 4, and thus the terminal #p transmits information "1 and 2 and 3 and 4" by using the symbol for transmitting information indicating "the number of receivable streams".

For another example, it is assumed that the terminal #p is able to perform demodulation in the case <1>. At this time, the number of streams that can be demodulated by the terminal #p is 1, and thus the terminal #p transmits information "1" by using the symbol for transmitting information indicating "the number of receivable streams".

For another example, it is assumed that the terminal #p is able to perform demodulation in the case <2>. At this time, the number of streams that can be demodulated by the terminal #p is 2, and thus the terminal #p transmits information "2" by using the symbol for transmitting information indicating "the number of receivable streams".

For another example, it is assumed that the terminal #p is able to perform demodulation in the cases <3> and <4>. At this time, the number of streams that can be demodulated by the terminal #p is 3 and 4, and thus the terminal #p transmits information "3 and 4" by using the symbol for transmitting information indicating "the number of receivable streams".

For another example, it is assumed that the terminal #p is able to perform demodulation in the case <4>. At this time, the number of streams that can be demodulated by the terminal #p is 4, and thus the terminal #p transmits information "4" by using the symbol for transmitting information indicating "the number of receivable streams".

For another example, it is assumed that the terminal #p is able to perform demodulation in the cases <1> and <4>. At this time, the number of streams that can be demodulated by the terminal #p is 1 and 4, and thus the terminal #p transmits information "1 and 4" by using the symbol for transmitting information indicating "the number of receivable streams".

For another example, it is assumed that the terminal #p is able to perform demodulation in the cases <1>, <2>, and <4>. At this time, the number of streams that can be demodulated by the terminal #p is 1, 2, and 4, and thus the terminal #p transmits information "1, 2, and 4" by using the symbol for transmitting information indicating "the number of receivable streams".

The "reception capability notification symbol" has been mainly described above, but the terminal #p may transmit a "transmission capability notification symbol" in addition to the "reception capability notification symbol". In a case where the terminal #p transmits the "transmission capability notification symbol", the operation may be carried out similarly to the case of transmitting the "reception capability notification symbol".

An example of the "transmission capability notification symbol" will be described. The terminal #p may transmit, to the base station (AP), the "transmission capability notification symbol" that includes information indicating "support/not support MIMO transmission", information indicating "the number of transmittable streams", information indicating "the maximum number of transmittable streams", or information indicating "support/not support transmission of multiple streams". Accordingly, the base station (AP) is able to transmit, to the terminal #p, a request for a modulated signal transmitted from the terminal #p. Here, the streams mean streams that are different from each other.

The information indicating "the number of transmittable streams" and the information indicating "the maximum number of transmittable streams" as described above may be transmitted by using the "Extended Capabilities field" or the "Core Capabilities field", similarly to the case of the "reception capability notification symbol" described above.

In addition, both the "reception capability notification symbol" and the "transmission capability notification symbol" for the same terminal may be transmitted by including them in a single capability element format or in different capability element formats. Furthermore, the "reception capability notification symbol" and the "transmission capability notification symbol" may be correctively referred to as a "transmission and reception capabilities notification symbol".

Twenty-Sixth Embodiment

In embodiments such as the first embodiment, the second embodiment, and the third embodiment, a description has been given of configurations including the weight combiner 303, the phase changer 305A, and/or the phase changer 305B in FIGS. 3, 4, 26, 40, 41, 42, 43, 44, 45, 46, 47, and 48, for example. Hereinafter, a description will be given of a configuration method for obtaining favorable reception quality in an embodiment in which direct waves are dominant or an environment in which a multipath or the like exists.

First, a description will be given of a phase change method in a case where the weight combiner 303 and the phase changer 305B exist, as in FIGS. 3, 4, 41, 45, 47, and so forth.

For example, as described in the above-described embodiments, it is assumed that the phase change value in the phase changer 305B is given as yp(i). Here, i is a symbol number, and i is an integer equal to or greater than 0, for example.

For example, supposing that the phase change value yp(i) is the period of N, N values are prepared as the phase change value. Here, N is an integer equal to or greater than 2. For example, Phase[0], Phase[1], Phase[2], Phase[3], ..., Phase[N-2], and Phase[N-1] are prepared as the N values. That is, Phase[k] is prepared, where k is an integer from 0 to N-1. Also, Phase[k] is a real number from 0 radians to $2\pi$ radians. In addition, u is an integer from 0 to N-1, v is an integer from 0 to N-1, and u≠v holds. In all u and v satisfying these conditions, Phase[u]≠Phase[v] holds. The method for setting the phase change value yp(i) when the period is supposed to be N is as described in another embodiment in this specification. M values are extracted from Phase[0], Phase[1], Phase[2], Phase[3], ..., Phase[N-2], and Phase[N-1], and these M values are expressed as Phase_1[0], Phase_1[1], Phase_1[2], ..., Phase_1[M-2], and Phase_1[M-1]. That is, Phase_1[k] is given, where k is an integer from 0 to M-1. Here, M is an integer smaller than N and equal to or greater than 2.

At this time, it is assumed that the phase change value yp(i) takes any value from among Phase_1[0], Phase_1[1], Phase_1[2], ..., Phase_1[M-2], and Phase_1[M-1]. Also, it is assumed that each of Phase_1[0], Phase_1[1], Phase_1[2], ..., Phase_1[M-2], and Phase_1[M-1] is used as the phase change value yp(i) at least once.

For example, as one example thereof, there is a method in which the period of the phase change value yp(i) is M. At this time, the following expression holds.

$$yp(i=u+v\times M) = \text{Phase\_1}[u] \quad \text{Expression (75)}$$

Here, u is an integer from 0 to M-1. Also, v is an integer equal to or greater than 0.

Figure 102:
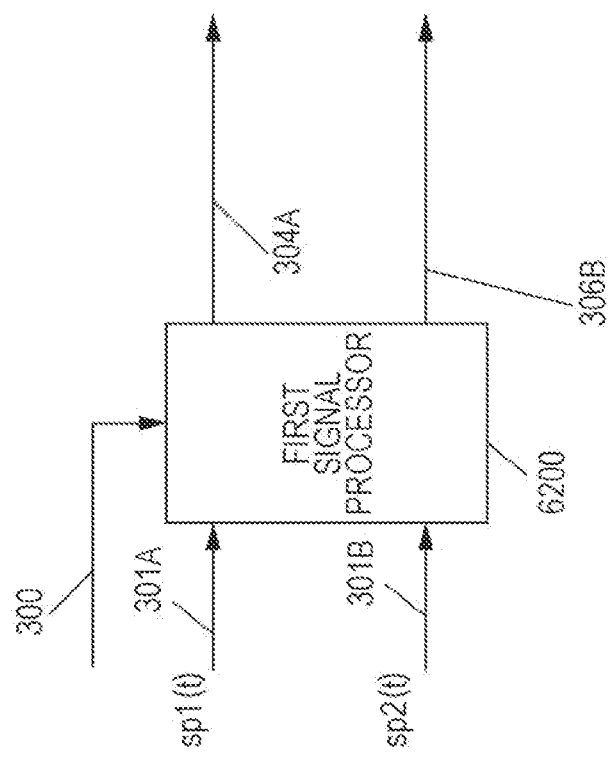
FIG. 102 is a diagram illustrating an example of the configuration of a first signal processor.

In addition, weight combining processing and phase change processing may be respectively performed by the weight combiner 303 and the phase changer 305B as in FIG. 3 and so forth, or the processing by the weight combiner 303 and the processing by the phase changer 305B may be performed by a first signal processor 6200 as in FIG. 102. In FIG. 102, the elements that operate similarly to those in FIG. 3 are denoted by the same numerals.

For example, in Expression (3), when the matrix for weight combining is represented by Fp and the matrix related to phase change is represented by Pp, a matrix Wp (= Pp×Fp) is prepared in advance. In addition, the first signal processor 6200 in FIG. 102 may generate the signals 304A and 306B by using the matrix Wp, the signal 301A ($sp1(t)$), and the signal 301B ($sp2(t)$).

The phase changers 309A, 309B, 3801A, and 3801B in FIGS. 3, 4, 41, 45, and 47 may or may not perform signal processing for phase change.

As a result of setting the phase change value yp(i) in the foregoing manner, it is possible to obtain an effect of an increased possibility that the reception apparatus is able to obtain favorable reception quality due to the spatial diversity effect in an environment in which direct waves are dominant or an environment in which a multipath or the like exists. Furthermore, as a result of reducing the number of values that can be taken as the phase change value yp(i) and reducing the number of values that can be taken as the phase change value w(i) as described above, the possibility of decreasing the circuit scales of the transmission apparatus and the reception apparatus is increased with the influence on the data reception quality being decreased.

Next, a description will be given of a phase change method in a case where the weight combiner 303, the phase changer 305A, and the phase changer 305B exist, as in FIGS. 26, 40, 43, 44, and so forth.

As described in another embodiment, it is assumed that the phase change value in the phase changer 305B is given as yp(i). Here, i is a symbol number, and i is an integer equal to or greater than 0, for example.

For example, supposing that the phase change value yp(i) is the period of Nb, Nb values are prepared as the phase change value. Here, Nb is an integer equal to or greater than 2. For example, Phase_b[0], Phase_b[1], Phase_b[2], Phase_b[3], ..., Phase_b[Nb-2], and Phase_b[Nb-1] are prepared as the Nb values. That is, Phase_b[k] is prepared, where k is an integer from 0 to Nb-1. Also, Phase_b[k] is a real number from 0 radians to 2π radians. In addition, u is an integer from 0 to Nb-1, v is an integer from 0 to Nb-1, and u≠v holds. In all u and v satisfying these conditions, Phase_b[u]≠Phase_b[v] holds. The method for setting the phase change value yp(i) when the period is supposed to be Nb is as described in another embodiment in this specification. Mb values are extracted from Phase_b[0], Phase_b[1], Phase_b[2], Phase_b[3], ..., Phase_b[Nb-2], and Phase_b[Nb-1], and these Mb values are expressed as Phase_1[0], Phase_1[1], Phase_1[2], ..., Phase_1[Mb-2], and Phase_1[Mb-1]. That is, Phase_1[k] is given, where k is an integer from 0 to Mb-1. Here, Mb is an integer smaller than Nb and equal to or greater than 2.

At this time, it is assumed that the phase change value yp(i) takes any value from among Phase_1[0], Phase_1[1], Phase_1[2], ..., Phase_1[Mb-2], and Phase_1[Mb-1]. Also, it is assumed that each of Phase_1[0], Phase_1[1], Phase_1[2], ..., Phase_1[Mb-2], and Phase_1[Mb-1] is used as the phase change value yp(i) at least once.

For example, as one example thereof, there is a method in which the period of the phase change value yp(i) is Mb. At this time, the following expression holds.

$$yp(i=u+v\times Mb) = \text{Phase\_1}[u] \quad \text{Expression (76)}$$

Here, u is an integer from 0 to Mb-1. Also, v is an integer equal to or greater than 0.

As described in another embodiment, it is assumed that the phase change value in the phase changer 305A is given as Yp(i). Here, i is a symbol number, and i is an integer equal to or greater than 0, for example. For example, supposing that the phase change value Yp(i) is the period of Na, Na values are prepared as the phase change value. Here, Na is an integer equal to or greater than 2. For example, Phase_a[0], Phase_a[1], Phase_a[2], Phase_a[3], ..., Phase_a[Na-2], and Phase_a[Na-1] are prepared as the Na values. That is, Phase_a[k] is prepared, where k is an integer from 0 to Na-1. Also, Phase_a[k] is a real number from 0 radians to 2π radians. In addition, u is an integer from 0 to Na-1, v is an integer from 0 to Na-1, and u≠v holds. In all u and v satisfying these conditions, Phase_a[u]≠Phase_a[v] holds. The method for setting the phase change value Yp(i) when the period is supposed to be Na is as described in another embodiment in this specification. Ma values are extracted from Phase_a[0], Phase_a[1], Phase_a[2], Phase_a[3], ..., Phase_a[Na-2], and Phase_a[Na-1], and these Ma values are expressed as Phase_2[0], Phase_2[1], Phase_2[2], ..., Phase_2[Ma-2], and Phase_2[Ma-1]. That is, Phase_2[k] is given, where k is an integer from 0 to Ma-1. Here, Ma is an integer smaller than Na and equal to or greater than 2.

At this time, it is assumed that the phase change value Yp(i) takes any value from among Phase_2[0], Phase_2[1], Phase_2[2], ..., Phase_2[Ma-2], and Phase_2[Ma-1]. Also, it is assumed that each of Phase_2[0], Phase_2[1], Phase_2[2], ..., Phase_2[Ma-2], and Phase_2[Ma-1] is used as the phase change value Yp(i) at least once.

For example, as one example thereof, there is a method in which the period of the phase change value Yp(i) is Ma. At this time, the following expression holds.

$$Yp(i=u+v\times Ma) = \text{Phase\_2}[u] \quad \text{Expression (77)}$$

Here, u is an integer from 0 to Ma-1. Also, v is an integer equal to or greater than 0.

Figure 103:
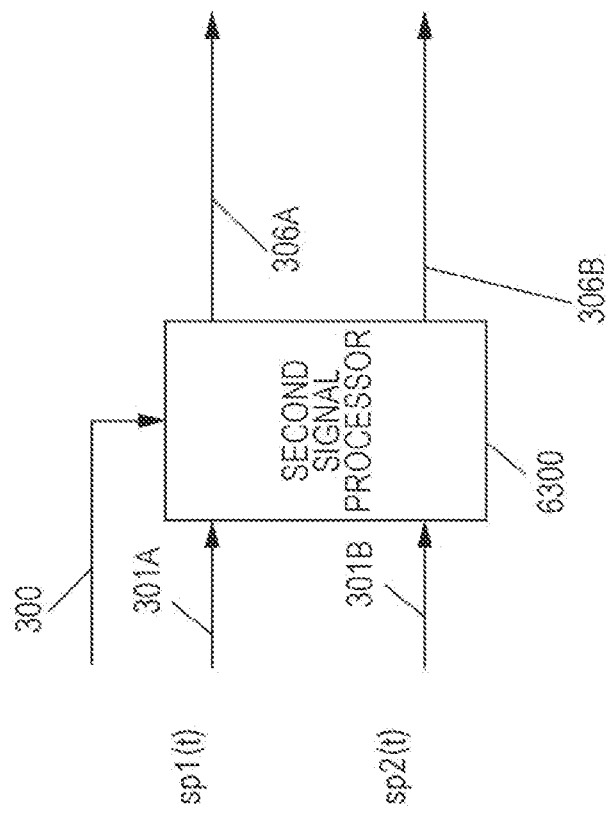
FIG. 103 is a diagram illustrating an example of the configuration of a second signal processor.

In addition, weight combining processing and phase change processing may be respectively performed by the weight combiner 303 and the phase changers 305A and 305B as in FIGS. 26, 40, 43, 44, and so forth, or the processing by the weight combiner 303 and the processing by the phase changers 305A and 305B may be performed by a second signal processor 6300 as in FIG. 103. In FIG. 103, the elements that operate similarly to those in FIGS. 26, 40, 43, and 44 are denoted by the same numerals.

For example, in Expression (42), when the matrix for weight combining is represented by Fp and the matrix related to phase change is represented by Pp, a matrix Wp (= Pp×Fp) is prepared in advance. In addition, the second signal processor 6300 in FIG. 103 may generate the signals 306A and 306B by using the matrix Wp, the signal 301A ($sp1(t)$), and the signal 301B ($sp2(t)$).

The phase changers 309A, 309B, 3801A, and 3801B in FIGS. 26, 40, 43, and 44 may or may not perform signal processing for phase change.

In addition, Na and Nb may be identical values or different values. Also, Ma and Mb may be identical values or different values.

As a result of setting the phase change value yp(i) and the phase change value Yp(i) in the foregoing manner, it is possible to obtain an effect of an increased possibility that the reception apparatus is able to obtain favorable reception quality due to the spatial diversity effect in an environment in which direct waves are dominant or an environment in which a multipath or the like exists. Furthermore, as a result of reducing the number of values that can be taken as the phase change value yp(i) or reducing the number of values that can be taken as the phase change value Yp(i) as described above, the possibility of decreasing the circuit scales of the transmission apparatus and the reception apparatus is increased with the influence on the data reception quality being decreased.

The present embodiment is highly likely to be effective when being applied to the phase change method described in another embodiment in this specification. However, even when being applied to another phase change method, the present embodiment can be carried out similarly.

Twenty-seventh Embodiment

In the present embodiment, a description will be given of a phase change method in a case where the weight combiner 303 and the phase changer 305B exist, as in FIGS. 3, 4, 41, 45, 47, and so forth.

For example, as described in the embodiments, it is assumed that the phase change value in the phase changer 305B is given as yp(i). Here, i is a symbol number, and i is an integer equal to or greater than 0, for example.

For example, it is assumed that the phase change value yp(i) is the period of N. Here, N is an integer equal to or greater than 2. Phase[0], Phase[1], Phase[2], Phase[3], ..., Phase[N-2], and Phase[N-1] are prepared as the N values. That is, Phase[k] is prepared, where k is an integer from 0 to N-1. Also, Phase[k] is a real number from 0 radians to $2\pi$ radians. In addition, u is an integer from 0 to N-1, v is an integer from 0 to N-1, and u≠v holds. In all u and v satisfying these conditions, Phase[u]≠Phase[v] holds. At this time, Phase[k] is expressed by the following expression. Here, k is an integer from 0 to N-1.

$$Phase[k] = \frac{k\pi}{N} \quad \text{Expression (78)}$$

Note that the unit of Expression (78) is the radian. In addition, Phase[0], Phase[1], Phase[2], Phase[3], ..., Phase[N-2], and Phase[N-1] are used to allow the period of the phase change value yp(i) to be N. To obtain the period N, Phase[0], Phase[1], Phase[2], Phase[3], ..., Phase[N-2], and Phase[N-1] may be arranged in any manner. To obtain the period N, the following holds, for example.

$$yp(i=u+v\times N) = yp(i=u+(v+1)\times N) \quad \text{Expression (79)}$$

Here, u is an integer from 0 to N-1, and v is an integer equal to or greater than 0. With all u and v satisfying these conditions, Expression (79) holds.

In addition, weight combining processing and phase change processing may be respectively performed by the weight combiner 303 and the phase changer 305B as in FIG. 3 and so forth, or the processing by the weight combiner 303 and the processing by the phase changer 305B may be performed by the first signal processor 6200 as in FIG. 102. In FIG. 102, the elements that operate similarly to those in FIG. 3 are denoted by the same numerals.

For example, in Expression (3), when the matrix for weight combining is represented by Fp and the matrix related to phase change is represented by Pp, a matrix Wp (= Pp×Fp) is prepared in advance. In addition, the first signal processor 6200 in FIG. 102 may generate the signals 304A and 306B by using the matrix Wp, the signal 301A ($sp1(t)$), and the signal 301B ($sp2(t)$).

The phase changers 309A, 309B, 3801A, and 3801B in FIGS. 3, 4, 41, 45, and 47 may or may not perform signal processing for phase change.

As a result of setting the phase change value yp(i) in the foregoing manner, it is possible to obtain an effect of an increased possibility that the reception apparatus is able to obtain favorable reception quality due to the spatial diversity effect in an environment in which direct waves are dominant or an environment in which a multipath or the like exists. Furthermore, as a result of limiting the number of values that can be taken as the phase change value yp(i) as described above, the possibility of decreasing the circuit scales of the transmission apparatus and the reception apparatus is increased with the influence on the data reception quality being decreased.

Next, a description will be given of a phase change method in a case where the weight combiner 303, the phase changer 305A, and the phase changer 305B exist, as in FIGS. 26, 40, 43, 44, and so forth.

As described in another embodiment, it is assumed that the phase change value in the phase changer 305B is given as yp(i). Here, i is a symbol number, and i is an integer equal to or greater than 0, for example.

For example, it is assumed that the phase change value yp(i) is the period of Nb. Here, Nb is an integer equal to or greater than 2. Phase_b[0], Phase_b[1], Phase_b[2], Phase_b[3], ..., Phase_b[Nb-2], and Phase_b[Nb-1] are prepared as the Nb values. That is, Phase_b[k] is prepared, where k is an integer from 0 to Nb-1. Also, Phase_b[k] is a real number from 0 radians to $2\pi$ radians. In addition, u is an integer from 0 to Nb-1, v is an integer from 0 to Nb-1, and u≠v holds. In all u and v satisfying these conditions, Phase_b[u]≠Phase_b[v] holds. At this time, Phase_b[k] is expressed by the following expression. Here, k is an integer from 0 to Nb-1.

$$Phase\_b[k] = \frac{k\pi}{Nb} \qquad \text{Expression (80)}$$

Note that the unit of Expression (80) is the radian. In addition, Phase_b[0], Phase_b[1], Phase_b[2], Phase_b[3], ..., Phase_b[Nb-2], and Phase_b[Nb-1] are used to allow the period of the phase change value yp(i) to be Nb. To obtain the period Nb, Phase_b[0], Phase_b[1], Phase_b[2], Phase_b[3], ..., Phase_b[Nb-2], and Phase_b[Nb-1] may be arranged in any manner. To obtain the period Nb, the following holds, for example.

$$yp(i=u+v\times Nb) = yp(i=u+(v+1)\times Nb) \qquad \text{Expression (81)}$$

Here, u is an integer from 0 to Nb-1, and v is an integer equal to or greater than 0. With all u and v satisfying these conditions, Expression (81) holds.

As described in another embodiment, it is assumed that the phase change value in the phase changer 305A is given as Yp(i). Here, i is a symbol number, and i is an integer equal to or greater than 0, for example. For example, it is assumed that the phase change value Yp(i) is the period of Na. Here, Na is an integer equal to or greater than 2. Phase_a[0], Phase_a[1], Phase_a[2], Phase_a[3], ..., Phase_a[Na-2], and Phase_a[Na-1] are prepared as the Na values. That is, Phase_a[k] is prepared, where k is an integer from 0 to Na-1. Also, Phase_a[k] is a real number from 0 radians to 2π radians. In addition, u is an integer from 0 to Na-1, v is an integer from 0 to Na-1, and u≠v holds. In all u and v satisfying these conditions, Phase_a[u]≠Phase_a[v] holds. At this time, Phase_a[k] is expressed by the following expression. Here, k is an integer from 0 to Na-1.

$$Phase\_a[k] = \frac{k\pi}{Na} \qquad \text{Expression (82)}$$

Note that the unit of Expression (82) is the radian. In addition, Phase_a[0], Phase_a[1], Phase_a[2], Phase_a[3], ..., Phase_a[Na-2], and Phase_a[Na-1] are used to allow the period of the phase change value Yp(i) to be Na. To obtain the period Na, Phase_a[0], Phase_a[1], Phase_a[2], Phase_a[3], ..., Phase_a[Na-2], and Phase_a[Na-1] may be arranged in any manner. To obtain the period Na, the following holds, for example.

$$Yp(i=u+v\times Na) = Yp(i=u+(v+1)\times Na) \qquad \text{Expression (83)}$$

Here, u is an integer from 0 to Na-1, and v is an integer equal to or greater than 0. With all u and v satisfying these conditions, Expression (83) holds.

In addition, weight combining processing and phase change processing may be respectively performed by the weight combiner 303 and the phase changers 305A and 305B as in FIGS. 26, 40, 43, 44, and so forth, or the processing by the weight combiner 303 and the processing by the phase changers 305A and 305B may be performed by the second signal processor 6300 as in FIG. 103. In FIG. 103, the elements that operate similarly to those in FIGS. 26, 40, 43, and 44 are denoted by the same numerals.

For example, in Expression (42), when the matrix for weight combining is represented by Fp and the matrix related to phase change is represented by Pp, a matrix Wp (= Pp×Fp) is prepared in advance. In addition, the second signal processor 6300 in FIG. 103 may generate the signals 306A and 306B by using the matrix Wp, the signal 301A (sp1(t)), and the signal 301B (sp2(t)).

The phase changers 309A, 309B, 3801A, and 3801B in FIGS. 26, 40, 43, and 44 may or may not perform signal processing for phase change.

In addition, Na and Nb may be identical values or different values.

As a result of setting the phase change value yp(i) and the phase change value Yp(i) in the foregoing manner, it is possible to obtain an effect of an increased possibility that the reception apparatus is able to obtain favorable reception quality due to the spatial diversity effect in an environment in which direct waves are dominant or an environment in which a multipath or the like exists. Furthermore, as a result of limiting the number of values that can be taken as the phase change value yp(i) and the phase change value Yp(i) as described above, the possibility of decreasing the circuit scales of the transmission apparatus and the reception apparatus is increased with the influence on the data reception quality being decreased.

The present embodiment is highly likely to be effective when being applied to the phase change method described in another embodiment in this specification. However, even when being applied to another phase change method, the present embodiment can be carried out similarly.

Obviously, the present embodiment and the sixteenth embodiment may be carried out in combination with each other. That is, M phase change values may be extracted from Expression (78). Also, Mb phase change values may be extracted from Expression (80), or Ma phase change values may be extracted from Expression (82).

Twenty-eighth Embodiment

In the present embodiment, a description will be given of a phase change method in a case where the weight combiner 303 and the phase changer 305B exist, as in FIGS. 3, 4, 41, 45, 47, and so forth.

For example, as described in the embodiments, it is assumed that the phase change value in the phase changer 305B is given as yp(i). Here, i is a symbol number, and i is an integer equal to or greater than 0, for example.

For example, it is assumed that the phase change value yp(i) is the period of N. Here, N is an integer equal to or greater than 2. Phase[0], Phase[1], Phase[2], Phase[3], ..., Phase[N-2], and Phase[N-1] are prepared as the N values. That is, Phase[k] is prepared, where k is an integer from 0 to N-1. Also, Phase[k] is a real number from 0 radians to 2π radians. In addition, u is an integer from 0 to N-1, v is an integer from 0 to N-1, and u≠v holds. In all u and v satisfying these conditions, Phase[u]≠Phase[v] holds. At this time, Phase[k] is expressed by the following expression. Here, k is an integer from 0 to N-1.

$$Phase[k] = \frac{k\times 2\times \pi}{N} \qquad \text{Expression (84)}$$

Note that the unit of Expression (84) is the radian. In addition, Phase[0], Phase[1], Phase[2], Phase[3], ..., Phase[N-2], and Phase[N-1] are used to allow the period of the phase change value yp(i) to be N. To obtain the period N, Phase[0], Phase[1], Phase[2], Phase[3], ..., Phase[N-2], and Phase[N-1] may be arranged in any manner. To obtain the period N, the following holds, for example.

$$yp(i=u+v\times N) = yp(i=u+(v+1)\times N) \quad \text{Expression (85)}$$

Here, u is an integer from 0 to N-1, and v is an integer equal to or greater than 0. With all u and v satisfying these conditions, Expression (85) holds.

In addition, weight combining processing and phase change processing may be respectively performed by the weight combiner 303 and the phase changer 305B as in FIG. 3 and so forth, or the processing by the weight combiner 303 and the processing by the phase changer 305B may be performed by the first signal processor 6200 as in FIG. 102. In FIG. 102, the elements that operate similarly to those in FIG. 3 are denoted by the same numerals.

For example, in Expression (3), when the matrix for weight combining is represented by Fp and the matrix related to phase change is represented by Pp, a matrix Wp (= Pp×Fp) is prepared in advance. In addition, the first signal processor 6200 in FIG. 102 may generate the signals 304A and 306B by using the matrix Wp, the signal 301A (sp1(t)), and the signal 301B (sp2(t)).

The phase changers 309A, 309B, 3801A, and 3801B in FIGS. 3, 4, 41, 45, and 47 may or may not perform signal processing for phase change.

As a result of setting the phase change value yp(i) in the foregoing manner, the values that can be taken as the phase change value yp(i) exist evenly on the complex plane from the viewpoint of the phase, and thus the spatial diversity effect can be obtained. Accordingly, it is possible to obtain an effect of an increased possibility that the reception apparatus is able to obtain favorable reception quality in an environment in which direct waves are dominant or an environment in which a multipath or the like exists.

Next, a description will be given of a phase change method in a case where the weight combiner 303, the phase changer 305A, and the phase changer 305B exist, as in FIGS. 26, 40, 43, 44, and so forth.

As described in another embodiment, it is assumed that the phase change value in the phase changer 305B is given as yp(i). Here, i is a symbol number, and i is an integer equal to or greater than 0, for example.

For example, it is assumed that the phase change value yp(i) is the period of Nb. Here, Nb is an integer equal to or greater than 2. Phase_b[0], Phase_b[1], Phase_b[2], Phase_b[3], ..., Phase_b[Nb-2], and Phase_b[Nb-1] are prepared as the Nb values. That is, Phase_b[k] is prepared, where k is an integer from 0 to Nb-1. Also, Phase_b[k] is a real number from 0 radians to 2 π radians. In addition, u is an integer from 0 to Nb-1, v is an integer from 0 to Nb-1, and u≠v holds. In all u and v satisfying these conditions, Phase_b[u]≠Phase_b[v] holds. At this time, Phase_b[k] is expressed by the following expression. Here, k is an integer from 0 to Nb-1.

$$Phase\_b[k] = \frac{k \times 2 \times \pi}{Nb} \quad \text{Expression (86)}$$

Note that the unit of Expression (86) is the radian. In addition, Phase_b[0], Phase_b[1], Phase_b[2], Phase_b[3], ..., Phase_b[Nb-2], and Phase_b[Nb-1] are used to allow the period of the phase change value yp(i) to be Nb. To obtain the period Nb, Phase_b[0], Phase_b[1], Phase_b[2], Phase_b[3], ..., Phase_b[Nb-2], and Phase_b[Nb-1] may be arranged in any manner. To obtain the period Nb, the following holds, for example.

$$yp(i=u+v\times Nb) = yp(i=u+(v+1)\times Nb) \quad \text{Expression (87)}$$

Here, u is an integer from 0 to Nb-1, and v is an integer equal to or greater than 0. With all u and v satisfying these conditions, Expression (87) holds.

As described in another embodiment, it is assumed that the phase change value in the phase changer 305A is given as Yp(i). Here, i is a symbol number, and i is an integer equal to or greater than 0, for example. For example, it is assumed that the phase change value Yp(i) is the period of Na. Here, Na is an integer equal to or greater than 2. Phase_a[0], Phase_a[1], Phase_a[2], Phase_a[3], ..., Phase_a[Na-2], and Phase_a[Na-1] are prepared as the Na values. That is, Phase_a[k] is prepared, where k is an integer from 0 to Na-1. Also, Phase_a[k] is a real number from 0 radians to 2π radians. In addition, u is an integer from 0 to Na-1, v is an integer from 0 to Na-1, and u≠v holds. In all u and v satisfying these conditions, Phase_a[u]≠Phase_a[v] holds. At this time, Phase_a[k] is expressed by the following expression. Here, k is an integer from 0 to Na-1.

$$Phase\_a[k] = \frac{k \times 2 \times \pi}{Na} \quad \text{Expression (88)}$$

Note that the unit of Expression (88) is the radian. In addition, Phase_a[0], Phase_a[1], Phase_a[2], Phase_a[3], ..., Phase_a[Na-2], and Phase_a[Na-1] are used to allow the period of the phase change value w(i) to be Na. To obtain the period Na, Phase_a[0], Phase_a[1], Phase_a[2], Phase_a[3], ..., Phase_a[Na-2], and Phase_a[Na-1] may be arranged in any manner. To obtain the period Na, the following holds, for example.

$$Yp(i=u+v\times Na) = Yp(i=u+(v+1)\times Na) \quad \text{Expression (89)}$$

Here, u is an integer from 0 to Na-1, and v is an integer equal to or greater than 0. With all u and v satisfying these conditions, Expression (89) holds.

In addition, weight combining processing and phase change processing may be respectively performed by the weight combiner 303 and the phase changers 305A and 305B as in FIGS. 26, 40, 43, 44, and so forth, or the processing by the weight combiner 303 and the processing by the phase changers 305A and 305B may be performed by the second signal processor 6300 as in FIG. 103. In FIG. 103, the elements that operate similarly to those in FIGS. 26, 40, 43, and 44 are denoted by the same numerals.

For example, in Expression (42), when the matrix for weight combining is represented by Fp and the matrix related to phase change is represented by Pp, a matrix Wp (= Pp×Fp) is prepared in advance. In addition, the second signal processor 6300 in FIG. 103 may generate the signals 306A and 306B by using the matrix Wp, the signal 301A (*sp*1(*t*)), and the signal 301B (*sp*2(*t*)).

The phase changers 309A, 309B, 3801A, and 3801B in FIGS. 26, 40, 43, and 44 may or may not perform signal processing for phase change.

In addition, Na and Nb may be identical values or different values.

As a result of setting the phase change value yp(i) and the phase change value Yp(i) in the foregoing manner, the values that can be taken as the phase change value yp(i) and the phase change value Yp(i) exist evenly on the complex plane from the viewpoint of the phase, and thus the spatial diversity effect can be obtained. Accordingly, it is possible to obtain an effect of an increased possibility that the reception apparatus is able to obtain favorable reception quality in an environment in which direct waves are dominant or an environment in which a multipath or the like exists.

The present embodiment is highly likely to be effective when being applied to the phase change method described in another embodiment in this specification. However, even when being applied to another phase change method, the present embodiment can be carried out similarly.

Obviously, the present embodiment and the sixteenth embodiment may be carried out in combination with each other. That is, M phase change values may be extracted from Expression (84). Also, Mb phase change values may be extracted from Expression (86), or Ma phase change values may be extracted from Expression (88).

Sixth Supplement

Regarding the modulation scheme, even if a modulation scheme other than the modulation schemes described in this specification is used, the embodiments and the like described in this specification can be carried out. For example, non-uniform (NU)-QAM, π/2 shift BPSK, π/4 shift QPSK, a PSK scheme in which the phase of a certain value is shifted, or the like may be used.

The phase changers 309A and 309B may perform Cyclic Delay Diversity (CDD) or Cyclic Shift Diversity (CSD).

In this specification, a description has been given of the mapped signal *sp*1(*t*) and the mapped signal *sp*2(*t*) that transmit pieces of data different from each other in FIGS. 3, 4, 26, 33, 38, 39, 40, 41, 42, 43, 44, 45, 46, 47, 48, 76, 77, and so forth, for example, but an embodiment is not limited thereto. That is, the mapped signal *sp*1(*t*) and the mapped signal *sp*2(*t*) may transmit pieces of data identical to each other. For example, when the symbol number i = a (a is an integer equal to or greater than 0, for example), the mapped signal *sp*1(*i*=*a*) and the mapped signal *sp*2(*i*=*a*) may transmit pieces of data identical to each other.

The method in which the mapped signal *sp*1(*i*=*a*) and the mapped signal *sp*2(*i*=*a*) transmit pieces of data identical to each other is not limited to the foregoing method. For example, the mapped signal *sp*1(*i*=*a*) and the mapped signal *sp*2(*i*=*b*) may transmit pieces of data identical to each other (b is an integer equal to or greater than 0, and a≠b). Furthermore, a first data sequence may be transmitted by using multiple symbols of *sp*1(*i*), and a second data sequence may be transmitted by using multiple symbols of *sp*2(*i*). Twenty-ninth Embodiment In this specification, in the "user #p signal processor" 102_*p* included in the base station in FIGS. 1, 52, and so forth, the weight combiner (for example, 303) in FIGS. 3, 4, 26, 38, 39, 40, 41, 42, 43, 44, 45, 46, 47, 48, 76, 77, and so forth may include multiple precoding matrices that can be switched, that is, multiple codebooks. On the basis of feedback information transmitted by the user #p, that is, the terminal #p, the base station may select a precoding matrix for generating a modulated signal to be transmitted to the user #p from among the switchable precoding matrices, that is, from among switchable codebooks, and the "user #p signal processor" 102_*p* may perform computation of the precoding matrix. The selection of the precoding matrix or codebook in the base station may be decided by the base station. Hereinafter, this point will be described.

Figure 104:
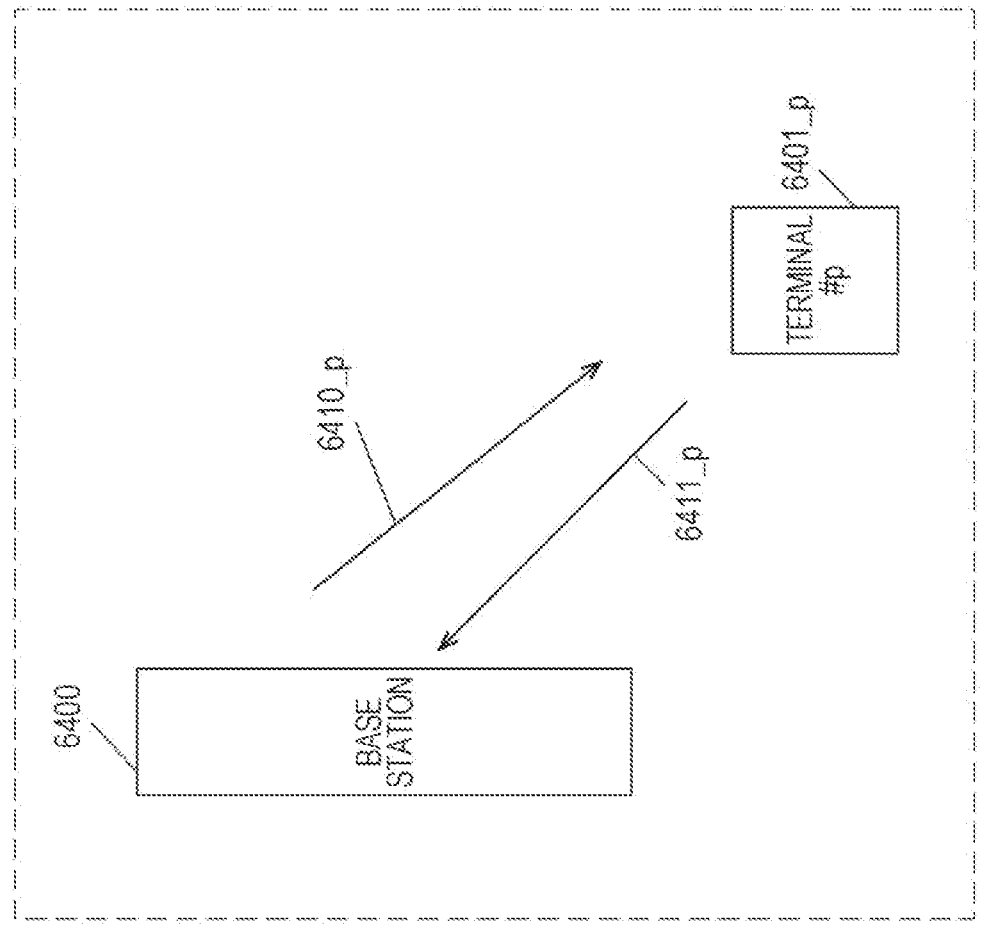
FIG. 104 is a diagram illustrating an example of the relationship between the base station (AP) and the terminal.

FIG. 104 illustrates the relationship between the base station and the user #p, that is, the terminal #p. A base station 6400 transmits a modulated signal (i.e., 6410_*p*), and the terminal #p denoted by 6401_*p* receives the modulated signal transmitted by the base station.

For example, it is assumed that the modulated signal transmitted by the base station 6400 includes reference symbols, a reference signal, a preamble, and the like for estimating the channel state, such as the reception electric field strength.

The terminal #p 6401_*p* estimates the channel state on the basis of the reference symbols, reference signal, preamble, and the like transmitted by the base station. Subsequently, the terminal #p 6401_*p* transmits a modulated signal including information about the channel state to the base station (6411_*p*). Additionally, in accordance with the channel state, the terminal #p 6401_*p* may transmit an indicator of a precoding matrix that is used by the base station to generate a modulated signal to be transmitted to the terminal #p.

On the basis of the feedback information obtained from the terminal, the base station 6400 selects a precoding matrix, that is, a codebook, to be used for generating a modulated signal to be transmitted to the terminal #p. A specific example of this operation will be described below.

It is assumed that the weight combiner of the base station is able to compute "matrix A, matrix B, matrix C, and matrix D" as precoding matrices, that is, codebooks, which are usable to generate a modulated signal to be transmitted to the user #p, that is, the terminal #p. In a case where the base station decides to use "matrix A" as weight combining to generate a modulated signal to be transmitted to the user #p, that is, the terminal #p, the base station performs weight combining, that is, precoding, by using "matrix A" in the weight combiner (for example, 303) in FIGS. 3, 4, 26, 38, 39, 40, 41, 42, 43, 44, 45, 46, 47, 48, 76, 77, and so forth included in the base station, and the base station generates a modulated signal for the user #p, that is, the terminal #p. Subsequently, the base station transmits the generated modulated signal.

Likewise, in a case where the base station decides to use "matrix B" as weight combining to generate a modulated signal to be transmitted to the user #p, that is, the terminal #p, the base station performs weight combining, that is, precoding, by using "matrix B" in the weight combiner (for example, 303) in FIGS. 3, 4, 26, 38, 39, 40, 41, 42, 43, 44, 45, 46, 47, 48, 76, 77, and so forth included in the base station, and the base station generates a modulated signal for the user #p, that is, the terminal #p. Subsequently, the base station transmits the generated modulated signal.

In a case where the base station decides to use "matrix C" as weight combining to generate a modulated signal to be transmitted to the user #p, that is, the terminal #p, the base station performs weight combining, that is, precoding, by using "matrix C" in the weight combiner (for example, 303) in FIGS. 3, 4, 26, 38, 39, 40, 41, 42, 43, 44, 45, 46, 47, 48, 76, 77, and so forth included in the base station, and the base station generates a modulated signal for the user #p, that is, the terminal #p. Subsequently, the base station transmits the generated modulated signal.

In a case where the base station decides to use "matrix D" as weight combining to generate a modulated signal to be transmitted to the user #p, that is, the terminal #p, the base station performs weight combining, that is, precoding, by using "matrix D" in the weight combiner (for example, 303) in FIGS. 3, 4, 26, 38, 39, 40, 41, 42, 43, 44, 45, 46, 47, 48, 76, 77, and so forth included in the base station, and the base station generates a modulated signal for the user #p, that is, the terminal #p. Subsequently, the base station transmits the generated modulated signal.

In the above-described example, four types of matrices are included as precoding matrices, that is, codebooks, usable by the base station to generate a modulated signal. However, the number of matrices that are included is not limited four, and the embodiment can be carried out similarly as long as multiple matrices are included. In addition, the phase change described in this specification may or may not be performed after the weight combining. At this time, whether or not to perform the phase change may be switched by a control signal or the like.

Likewise, also in the multiplexing signal processor 104 in FIG. 1, multiple matrices (also be called codebooks) to be used to generate an output signal (modulated signal) may be prepared, and the base station may select a matrix to be used in the multiplexing signal processor 104 in FIG. 1 on the basis of the feedback information from the terminal, and may generate an output signal by using the selected matrix. The selection of the matrix to be used may be decided by the base station. Hereinafter, this point will be described. The communication between the base station and the terminal has been described above by using FIG. 104, and thus the description is omitted.

It is assumed that the multiplexing signal processor 104 of the base station is able to compute "matrix α, matrix β, matrix γ, and matrix δ" as matrices, that is, codebooks, which are usable to generate a modulated signal to be transmitted to the terminal. In a case where the base station decides to use "matrix α" as processing in the multiplexing signal processor, the base station performs multiplexing signal processing by using "matrix α" in the multiplexing signal processor in FIG. 1 and so forth included in the base station to generate a modulated signal, and the base station transmits the generated modulated signal.

Likewise, in a case where the base station decides to use "matrix β" as processing in the multiplexing signal processor, the base station performs multiplexing signal processing by using "matrix β" in the multiplexing signal processor in FIG. 1 and so forth included in the base station to generate a modulated signal, and the base station transmits the generated modulated signal.

In a case where the base station decides to use "matrix γ" as processing in the multiplexing signal processor, the base station performs multiplexing signal processing by using "matrix γ" in the multiplexing signal processor in FIG. 1 and so forth included in the base station to generate a modulated signal, and the base station transmits the generated modulated signal.

In a case where the base station decides to use "matrix δ" as processing in the multiplexing signal processor, the base station performs multiplexing signal processing by using "matrix δ" in the multiplexing signal processor in FIG. 1 and so forth included in the base station to generate a modulated signal, and the base station transmits the generated modulated signal.

In the above-described example, four types of matrices are included as matrices, that is, codebooks, usable by the base station to generate a modulated signal. However, the number of matrices that are included is not limited four, and the embodiment can be carried out similarly as long as multiple matrices are included.

It is assumed that the multiplexing signal processor 7000_p in FIG. 70 of the base station is able to compute "matrix P, matrix Q, matrix R, and matrix S" as precoding matrices, that is, codebooks, which are usable to generate a modulated signal to be transmitted to the user #p, that is, the terminal #p. Here, p is an integer from 1 to M. In a case where the base station decides to use "matrix P" as multiplexing signal processing to generate a modulated signal to be transmitted to the user #p, that is, the terminal #p, the base station performs multiplexing signal processing by using "matrix P" in the multiplexing signal processor 7000_p in FIG. 70 included in the base station to generate a modulated signal for the user #p, that is, the terminal #p. Subsequently, the base station transmits the generated modulated signal.

Likewise, in a case where the base station decides to use "matrix Q" as multiplexing signal processing to generate a modulated signal to be transmitted to the user #p, that is, the terminal #p, the base station performs multiplexing signal processing by using "matrix "Q" in the multiplexing signal processor 7000_p in FIG. 70 included in the base station to generate a modulated signal for the user #p, that is, the terminal #p. Subsequently, the base station transmits the generated modulated signal.

In a case where the base station decides to use "matrix R" as multiplexing signal processing to generate a modulated signal to be transmitted to the user #p, that is, the terminal #p, the base station performs multiplexing signal processing by using "matrix "R" in the multiplexing signal processor 7000_p in FIG. 70 included in the base station to generate a modulated signal for the user #p, that is, the terminal #p. Subsequently, the base station transmits the generated modulated signal.

In a case where the base station decides to use "matrix S" as multiplexing signal processing to generate a modulated signal to be transmitted to the user #p, that is, the terminal #p, the base station performs multiplexing signal processing by using "matrix "S" in the multiplexing signal processor 7000_p in FIG. 70 included in the base station to generate a modulated signal for the user #p, that is, the terminal #p. Subsequently, the base station transmits the generated modulated signal.

In the above-described example, four types of matrices are included as precoding matrices, that is, codebooks, usable by the base station to generate a modulated signal. However, the number of matrices that are included is not limited four, and the embodiment can be carried out similarly as long as multiple matrices are included.

When the individual elements operate in the manner described above in the present embodiment, the effects described in this specification can be obtained similarly. Thus, the present embodiment can be carried out in combination with another embodiment described in this specification, and the effects described in each embodiment can be obtained similarly.

Thirtieth Embodiment

In the description of the first embodiment to the twenty-ninth embodiment, a description has been given of the cases of the configurations in FIGS. 1, 70, and so forth as the configuration of the base station or AP. That is, a description has been given of a case where the base station is able to simultaneously transmit modulated signals to multiple users, that is, multiple terminals. In the present embodiment, a description will be given of an example of a case where the base station or AP has the configuration in FIG. 105.

Figure 105:
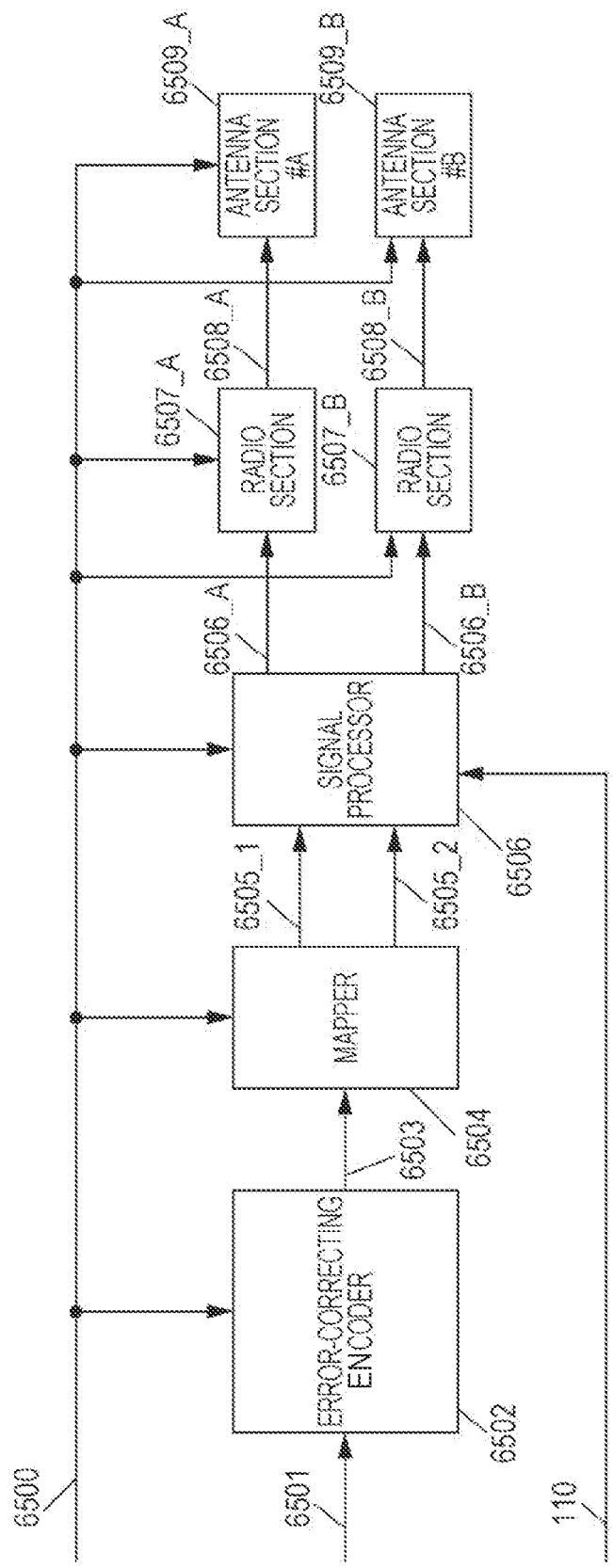
FIG. 105 is a diagram illustrating an example configuration of the transmission apparatus of the base station (AP) different from FIG. 1.

FIG. 105 illustrates the configuration of the base station or AP in the present embodiment.

An error-correcting encoder 6502 receives data 6501 and a control signal 6500, performs error-correcting coding on the data 6501 on the basis of information about an error-correcting code included in the control signal 6500, for example, information about an error-correcting coding scheme, a coding rate, or the like, and outputs error-correcting coded data 6503.

A mapper 6504 receives the control signal 6500 and the error-correcting coded data 6503, performs mapping on the basis of information about a modulation scheme included in the control signal 6500, and outputs a stream #1 baseband signal 6505_1 and a stream #2 baseband signal 6505_2.

A signal processor 6506 receives the control signal 6500, the stream #1 baseband signal 6505_1, the stream #2 baseband signal 6505_2, and a signal group 110, performs signal processing on the stream #1 baseband signal 6505_1 and the stream #2 baseband signal 6505_2 on the basis of information about a transmission method included in the control signal 6500, and generates and outputs a first modulated signal 6506_A and a second modulated signal 6506_B.

A radio section 6507_A receives the first modulated signal 6506_A and the control signal 6500, performs processing such as frequency conversion on the first modulated signal 6506_A, and outputs a first transmission signal 6508_A. The first transmission signal 6508_A is outputs as a radio wave from an antenna section #A 6509_A.

Likewise, a radio section 6507_B receives the second modulated signal 6506_B and the control signal 6500, performs processing such as frequency conversion on the second modulated signal 6506_B, and outputs a second transmission signal 6508_B. The second transmission signal 6508_B is outputs as a radio wave from an antenna section #B 6509_B.

The first transmission signal 6508_A and the second transmission signal 6508_B are signals at identical times and identical frequencies (bands).

The signal processor 6506 in FIG. 105 has the configuration in any of FIGS. 3, 4, 26, 38, 39, 40, 41, 42, 43, 44, 45, 46, 47, 48, 76, and 77, for example. At this time, the signal 6505_1 in FIG. 105 corresponds to the signal 301A, the signal 6505_2 corresponds to the signal 301B, and the signal 6500 corresponds to the signal 300. There are output signals of two systems in FIGS. 3, 4, 26, 38, 39, 40, 41, 42, 43, 44, 45, 46, 47, 48, 76, and 77. The output signals of two systems correspond to the signals 6506_A and 6506_B in FIG. 105.

The signal processor 6506 in FIG. 105 has any one of the configurations in FIGS. 3, 4, 26, 38, 39, 40, 41, 42, 43, 44, 45, 46, 47, 48, 76, and 77, for example. That is, it may be considered as a transmission apparatus supporting a single user Multiple Input Multiple Output (MIMO).

Thus, in the case of carrying out each of the first embodiment to the twenty-ninth embodiment, the base station transmits modulated signals to multiple terminals in a certain time band and a certain frequency band, as illustrated in FIG. 24, but the base station including the transmission apparatus in FIG. 105 transmits a modulated signal to a single terminal in a certain time band and a certain frequency band. Thus, the base station including the transmission apparatus in FIG. 105 communicates with the terminal #p = 1 in each of the first embodiment to the twenty-ninth embodiment, and carries out each of the first embodiment to the twenty-ninth embodiment. In this way, each of the first embodiment to the twenty-ninth embodiment can be carried out, and the effects described in each embodiment can be obtained similarly.

The base station including the transmission apparatus in FIG. 105 is able to communicate with multiple terminals by using Time Division Multiple Access (TDMA) and/or Frequency Division Multiple Access (FDMA) and/or Code Division Multiple Access (CDMA).

Obviously, the embodiments and the like described in this specification may be carried out in combination with one another.

Each embodiment is merely an example. For example, even if a "modulation scheme, error-correcting coding scheme (error-correcting code, code length, and coding rate to be used), control information, and so forth" are given as examples, the embodiment can be carried out with a similar configuration by applying another "modulation scheme, error-correcting coding scheme (error-correcting code, code length, and coding rate to be used), control information, and so forth".

Regarding the modulation scheme, even if a modulation scheme other than the modulation schemes described in this specification is used, the embodiments and the like described in this specification can be carried out. For example, Amplitude Phase Shift Keying (APSK) (for example, 16APSK, 64APSK, 128APSK, 256APSK, 1024APSK, 4096APSK, and the like), Pulse Amplitude Modulation (PAM) (for example, 4PAM, 8PAM, 16PAM, 64PAM, 128PAM, 256PAM, 1024PAM, 4096PAM, and the like), Phase Shift Keying (PSK) (for example, BPSK, QPSK, 8PSK, 16PSK, 64PSK, 128PSK, 256PSK, 1024PSK, 4096PSK, and the like), Quadrature Amplitude Modulation (QAM) (for example, 4QAM, 8QAM, 16QAM, 64QAM, 128QAM, 256QAM, 1024QAM, 4096QAM, and the like), and the like may be used, and uniform mapping or non-uniform mapping may be used in each modulation scheme. In addition, the method for arranging 2, 4, 8, 16, 64, 128, 256, and 1024 signal points on the I-Q plane (the modulation scheme having 2, 4, 8, 16, 64, 128, 256, and 1024 signal points) is not limited to the signal point arrangement method in the modulation schemes described in this specification.

In this specification, the transmission apparatus may be included in, for example, a communication /broadcasting apparatus such as a broadcast station, a base station, an access point, a terminal, or a mobile phone. At this time, the reception apparatus may be included in a communication apparatus such as a television receiver, a radio, a terminal, a personal computer, a mobile phone, an access point, or a base station. In addition, the transmission apparatus and the reception apparatus in the present disclosure are apparatuses having a communication function. These apparatuses may be connectable to an apparatus for executing an application, such as a television receiver, a radio, a personal computer, or a mobile phone, through a certain interface. In addition, in the present embodiment, symbols other than data symbols, for example, pilot symbols (preamble, unique word, postamble, reference symbols, or the like), control information symbols, and so forth may be arranged in a frame in any manner. Here, the terms "pilot symbols" and "control information symbols" are used, but other terms may also be used, and the functions thereof are important.

For example, the pilot symbols may be known symbols modulated by using PSK modulation in a transmitter/receiver (or the receiver may be able to learn symbols transmitted by the transmitter by synchronization). The receiver performs frequency synchronization, time synchronization, channel estimation (estimation of channel state information (CSI) for each modulated signal, signal detection, and so forth by using these symbols.

The control information symbols are symbols for transmitting information that needs to be transmitted to a communication partner for realizing communication other than data (of an application or the like) (for example, the modulation scheme, the error-correcting coding scheme, and the coding rate of the error-correcting coding scheme used in communication, setting information in an upper layer, and so forth).

The present disclosure is not limited to the individual embodiments, and various modifications may be carried out. For example, each embodiment describes a case where the present disclosure is applied to a communication apparatus, but the present disclosure is not limited thereto. The communication method can be implemented as software.

For example, a program that executes the above-described communication method may be store in a read only memory (ROM) in advance, and the program may be executed by a central processing unit (CPU).

In addition, a program that executes the above-described communication method may be stored in a computer-readable storage medium, the program stored in the storage medium may be recorded in a random access memory (RAM) of a computer, and the computer may be allowed to operate in accordance with the program.

The individual elements of each of the above-described embodiments may typically be implemented as large scale integration (LSI) serving as an integrated circuit. These elements may be individually formed on chips, or all or some of the elements of each embodiment may be formed on a single chip. Although LSI is used here, the terms such as an integrated circuit (IC), system LSI, super LSI, or ultra LSI may be used in accordance with the degree of integration. The method for circuit integration is not limited to LSI, and may be realized by using a dedicated circuit or general-purpose processor. A field programmable gate array (FPGA) that can be programmed after LSI manufacturing, or a reconfigurable processor in which the connections and settings of a circuit cell in LSI are reconfigurable may be used. Furthermore, if the progress of semiconductor technologies or other derived technologies produce a circuit integration technology that replaces LSI, integration of functional blocks may of course be performed by using the technology. Application of biotechnology or the like is possible.

In this specification, various frame configurations have been described. It is assumed that a modulated signal having a frame configuration described in this specification is transmitted by, for example, a base station (AP) including the transmission apparatus in FIG. 1 by using a multi-carrier scheme such as the OFDM scheme. At this time, an application method can be considered in which, when the terminal (user) communicating with the base station (AP) transmits a modulated signal, the modulated signal transmitted by the terminal is based on a single-carrier scheme (the base station (AP) is able to simultaneously transmit a data symbol group to multiple terminals by using the OFDM scheme, and the terminal is able to reduce power consumption by using the single-carrier scheme).

The embodiment using the single-carrier scheme is also applicable to the multi-carrier scheme. Furthermore, if the method described as a method for increasing the reception quality in an environment in which direct waves are dominant is applied to another channel mode, there is a possibility that the reception quality increases. Thus, the present disclosure can generally be applied to wireless communication.

In addition, by using a part of the frequency band used by a modulated signal transmitted by the base station (AP), the terminal may apply a Time Division Duplex (TDD) scheme for transmitting a modulated signal.

The present disclosure is useful to a communication apparatus, such as a base station.

What is claimed is:

1. An integrated circuit comprising:
at least one input which, in operation, receives an input; and
control circuity, which is coupled to the at least one input and which, in operation, controls:
receiving a first precoded signal and a second precoded signal; and
performing a decoding and demodulation process on the first precoded signal and the second precoded signal, wherein
in response to only one of the first precoded signal and the second precoded signal having its phase changed through precoding by a communication partner apparatus, the decoding and demodulation process generates one layer of signal and performs demodulation with phase change on the one layer of signal, and
in response to both of the first precoded signal and the second precoded signal having their phase changed through precoding by the communication partner apparatus, the decoding and demodulation process generates two layers of signals and performs demodulation without phase change on the two layers of signals.

2. The integrated circuit according to claim 1, wherein when both the first precoded signal and the second precoded signal have their phase changed through the precoding by the communication partner apparatus, an amount of the phase change is selected from a plurality of candidate amounts by the communication partner apparatus.

3. The integrated circuit according to claim 1, wherein the first precoded signal and the second precoded signal are transmitted from the communication partner apparatus using at least one of a first orthogonal frequency-division multiplexing (OFDM) transmission mode and another transmission mode different from the first OFDM transmission mode.

4. The integrated circuit according to claim 1, wherein, in response to only one of the first precoded signal and the second precoded signal having its phase changed through precoding by the communication partner apparatus, the decoding and demodulation process performs the demodulation with a phase change, which corresponds to π/2 shift Binary Phase Shift Keying (BPSK), wherein an amount of the phase change is switched symbol by symbol.

5. The integrated circuit according to claim 1, wherein, in response to only one of the first precoded signal and the second precoded signal having its phase changed through precoding by the communication partner apparatus, the decoding and demodulation process performs the demodulation with phase change wherein an amount of the phase change is fixed.

6. The integrated circuit according to claim 1, wherein each of the first precoded signal and the second precoded signal is an orthogonal frequency-division multiplexing (OFDM) symbol sequence.

7. The integrated circuit according to claim 1, wherein the receiving is performed by using a plurality of antenna ports, and each of the plurality of antenna ports receives one of the first precoded signal and the second precoded signal.

* * * * *